US011656771B2

(12) United States Patent
Harata et al.

(10) Patent No.: US 11,656,771 B2
(45) Date of Patent: May 23, 2023

(54) ELECTRONIC CONTROL UNIT, VEHICLE ELECTRONIC CONTROL SYSTEM, ACTIVATION EXECUTION CONTROL METHOD AND COMPUTER PROGRAM PRODUCT

(71) Applicant: DENSO CORPORATION, Kariya (JP)

(72) Inventors: Yuzo Harata, Kariya (JP); Kazuhiro Uehara, Kariya (JP); Mitsuyoshi Natsume, Kariya (JP); Takuya Kawasaki, Kariya (JP)

(73) Assignee: DENSO CORPORATION, Kariya (JP)

(*) Notice: Subject to any disclaimer, the term of this patent is extended or adjusted under 35 U.S.C. 154(b) by 108 days.

(21) Appl. No.: 17/170,104

(22) Filed: Feb. 8, 2021

(65) Prior Publication Data

US 2021/0165585 A1 Jun. 3, 2021

Related U.S. Application Data

(63) Continuation of application No. PCT/JP2019/031453, filed on Aug. 8, 2019.

(30) Foreign Application Priority Data

Aug. 10, 2018 (JP) ............................ JP2018-151423
Jul. 12, 2019 (JP) ............................ JP2019-129961

(51) Int. Cl.
*G06F 3/06* (2006.01)
*B60W 60/00* (2020.01)
(Continued)

(52) U.S. Cl.
CPC ........ *G06F 3/0625* (2013.01); *B60R 16/0231* (2013.01); *B60W 60/001* (2020.02);
(Continued)

(58) Field of Classification Search
CPC .... G06F 3/0625; G06F 3/0653; G06F 3/0679; G06F 8/65; G06F 8/71; B60W 60/001; B60R 16/0231
(Continued)

(56) References Cited

U.S. PATENT DOCUMENTS 10,592,231 B2 3/2020 Sakurai et al.
10,678,454 B2 6/2020 Sakurai et al.
(Continued)

FOREIGN PATENT DOCUMENTS

JP 4548601 B2 9/2010
JP 5152297 B2 2/2013
(Continued)

OTHER PUBLICATIONS

Onuma et al, "ECU Software Updating in Future Vehicle Networks", 2017, [Online], pp. 35-40, [retrieved from internet on Dec. 19, 2022], <https://ieeexplore.ieee.org/stamp/stamp.jsp?arnumber=7929650> (Year: 2017).*
(Continued)

*Primary Examiner* — S. Sough
*Assistant Examiner* — Zengpu Wei
(74) *Attorney, Agent, or Firm* — Harness, Dickey & Pierce, P.L.C.

(57) ABSTRACT

An electronic control unit includes an active bank information update unit that is configured to update active bank information indicative of which bank is an active bank between the first data storage bank and the second data storage bank when a program rewrite on the second data storage bank is completed and the vehicle master device gives an instruction for an activation request, an execution condition determination unit that is configured to determine whether an activation execution condition is satisfied, and an execution control unit that is configured to activate the
(Continued)

second data storage bank as the active bank based on the active bank information after a restart when the execution condition determination unit determines that the activation execution condition is satisfied.

6 Claims, 253 Drawing Sheets

(51) Int. Cl.
*B60R 16/023* (2006.01)
*G06F 8/65* (2018.01)
*G06F 8/71* (2018.01)

(52) U.S. Cl.
CPC .......... *G06F 3/0653* (2013.01); *G06F 3/0679* (2013.01); *G06F 8/65* (2013.01); *G06F 8/71* (2013.01)

(58) Field of Classification Search
USPC .......................................................... 717/168
See application file for complete search history.

(56) References Cited

U.S. PATENT DOCUMENTS

| | | | | |
|---|---|---|---|---|
| 2006/0259207 | A1 | 11/2006 | Natsume | |
| 2010/0313192 | A1 | 12/2010 | Natsume | |
| 2012/0110296 | A1 | 5/2012 | Harata | |
| 2012/0239246 | A1 | 9/2012 | Tanaka et al. | |
| 2012/0320927 | A1 | 12/2012 | Katou et al. | |
| 2013/0031212 | A1 | 1/2013 | Enosaki et al. | |
| 2013/0081106 | A1 | 3/2013 | Harata et al. | |
| 2013/0173112 | A1 | 7/2013 | Takahashi et al. | |
| 2013/0212571 | A1* | 8/2013 | Matsuura | G06F 8/65 717/170 |
| 2013/0219170 | A1 | 8/2013 | Naitou et al. | |
| 2014/0068590 | A1 | 3/2014 | Natsume | |
| 2014/0277925 | A1 | 9/2014 | Tanaka et al. | |
| 2014/0317729 | A1 | 10/2014 | Naitou et al. | |
| 2015/0057840 | A1 | 2/2015 | Katou et al. | |
| 2015/0113520 | A1 | 4/2015 | Kotani et al. | |
| 2015/0254909 | A1 | 9/2015 | Harata et al. | |
| 2015/0281022 | A1 | 10/2015 | Harata et al. | |
| 2015/0301822 | A1 | 10/2015 | Takahashi et al. | |
| 2016/0318522 | A1 | 11/2016 | Tanaka et al. | |
| 2018/0018160 | A1 | 1/2018 | Teraoka et al. | |
| 2018/0203685 | A1 | 7/2018 | Nakamura et al. | |
| 2018/0246711 | A1* | 8/2018 | Kurosawa | G06F 8/65 |
| 2019/0018669 | A1* | 1/2019 | Cook | G06F 9/4401 |
| 2019/0108014 | A1 | 4/2019 | Nakamura et al. | |
| 2019/0111907 | A1 | 4/2019 | Harata et al. | |
| 2019/0266017 | A1 | 8/2019 | Nakamura et al. | |
| 2019/0287626 | A1 | 9/2019 | Kawasaki et al. | |
| 2020/0183676 | A1 | 6/2020 | Sakurai et al. | |
| 2020/0216083 | A1 | 7/2020 | Kawasaki et al. | |
| 2020/0241771 | A1 | 7/2020 | Sakurai et al. | |

FOREIGN PATENT DOCUMENTS

| | | | |
|---|---|---|---|
| JP | 5375905 | B2 | 12/2013 |
| JP | 5423754 | B2 | 2/2014 |
| JP | 5435022 | B2 | 3/2014 |
| JP | 5454517 | B2 | 3/2014 |
| JP | 2014088150 | A | 5/2014 |
| JP | 5556824 | B2 | 7/2014 |
| JP | 5601239 | B2 | 10/2014 |
| JP | 2014201085 | A | 10/2014 |
| JP | 5709055 | B2 | 4/2015 |
| JP | 2015079440 | A | 4/2015 |
| JP | 5783103 | B2 | 9/2015 |
| JP | 5838898 | B2 | 1/2016 |
| JP | 2016015020 | A | 1/2016 |
| JP | 2016032274 | A | 3/2016 |
| JP | 5949416 | B2 | 7/2016 |
| JP | 5949417 | B2 | 7/2016 |
| JP | 2016224898 | A | 12/2016 |
| JP | 6056424 | B2 | 1/2017 |
| JP | 2017028523 | A | 2/2017 |
| JP | 2017114156 | A | 6/2017 |
| JP | 6216730 | B2 | 10/2017 |
| JP | 2017220092 | A | 12/2017 |
| JP | 2018013837 | A | 1/2018 |
| JP | 2018065410 | A | 4/2018 |
| JP | 2018092577 | A | 6/2018 |
| JP | 2018097571 | A | 6/2018 |
| JP | 2019066181 | A | 4/2019 |
| JP | 2020009483 | A | 1/2020 |
| WO | WO-2016098376 | A1 | 6/2016 |

OTHER PUBLICATIONS

U.S. Appl. No. 17/153,341, filed Jan. 20, 2021, Harata et al.
U.S. Appl. No. 17/166,453, filed Feb. 3, 2021, Sakurai et al.
U.S. Appl. No. 17/166,498, filed Feb. 3, 2021, Ogawa et al.
U.S. Appl. No. 17/166,610, filed Feb. 3, 2021, Sakurai et al.
U.S. Appl. No. 17/166,729, filed Feb. 3, 2021, Ogawa et al.
U.S. Appl. No. 17/166,840, filed Feb. 3, 2021, Harata et al.
U.S. Appl. No. 17/166,891, filed Feb. 3, 2021, Sakurai et al.
U.S. Appl. No. 17/167,342, filed Feb. 4, 2021, Sakurai et al.
U.S. Appl. No. 17/167,373, filed Feb. 4, 2021, Harata et al.
U.S. Appl. No. 17/167,443, filed Feb. 4, 2021, Harata et al.
U.S. Appl. No. 17/167,547, filed Feb. 4, 2021, Harata et al.
U.S. Appl. No. 17/167,580, filed Feb. 4, 2021, Harata et al.
U.S. Appl. No. 17/167,668, filed Feb. 4, 2021, Harata et al.
U.S. Appl. No. 17/167,702, filed Feb. 4, 2021, Harata et al.
U.S. Appl. No. 17/167,747, filed Feb. 4, 2021, Harata et al.
U.S. Appl. No. 17/167,836, filed Feb. 4, 2021, Harata et al.
U.S. Appl. No. 17/168,653, filed Feb. 5, 2021, Sakurai et al.
U.S. Appl. No. 17/168,738, filed Feb. 5, 2021, Abe et al.
U.S. Appl. No. 17/168,812, filed Feb. 5, 2021, Harata et al.
U.S. Appl. No. 17/168,969, filed Feb. 5, 2021, Harata et al.
U.S. Appl. No. 17/169,026, filed Feb. 5, 2021, Harata et al.
U.S. Appl. No. 17/169,075, filed Feb. 5, 2021, Harata et al.
U.S. Appl. No. 17/169,932, filed Feb. 8, 2021, Harata et al.
U.S. Appl. No. 17/170,155, filed Feb. 8, 2021, Harata et al.
U.S. Appl. No. 17/170,193, filed Feb. 8, 2021, Harata et al.
U.S. Appl. No. 17/170,222, filed Feb. 8, 2021, Harata et al.
U.S. Appl. No. 17/170,251, filed Feb. 8, 2021, Harata et al.
U.S. Appl. No. 17/170,306, filed Feb. 8, 2021, Harata et al.

* cited by examiner

FIG. 7

Rewrite specification data for DCM

| Item | | Values (example) |
|---|---|---|
| Specification data info | Address info | 0x10000000 |
| | File name | Specification. bin |
| ECU (ID1) info | ECU_ID | 1 |
| | Update program acquisition address | 0x10000000 |
| | Update program size | 1Mbyte |
| | Rollback program acquisition address | 0x20000000 |
| | Rollback program size | 1Mbyte |
| ECU (ID2) info | ECU_ID | 2 |
| | Update program acquisition address | 0x30000000 |
| | Update program size | 1Mbyte |
| | Rollback program acquisition address | 0x40000000 |
| | Rollback program size | 1Mbyte |
| ECU (ID3) info | ECU_ID | 3 |
| | Update program acquisition address | 0x50000000 |
| | Update program size | 1Mbyte |
| | Rollback program acquisition address | 0x60000000 |
| | Rollback program size | 1Mbyte |
| ECU (ID4) info | ECU_ID | 4 |
| | Update program acquisition address | 0x70000000 |
| | Update program size | 1Mbyte |
| | Rollback program acquisition address | 0x80000000 |
| | Rollback program size | 1Mbyte |
| ECU (ID5) info | ECU_ID | 5 |
| | Update program acquisition address | 0x90000000 |
| | Update program size | 1Mbyte |
| | Rollback program acquisition address | 0xA0000000 |
| | Rollback program size | 1Mbyte |
| ECU (ID6) info | ECU_ID | 6 |
| | Update program acquisition address | 0xB0000000 |
| | Update program size | 1Mbyte |
| | Rollback program acquisition address | 0xC0000000 |
| | Rollback program size | 1Mbyte |

FIG. 8

Rewrite specification data for CGW

| Item | | Values (example) |
|---|---|---|
| Group info | First group info | ECU(ID1)→ECU(ID2)→ECU(ID3) |
| | Second group info | ECU(ID4)→ECU(ID5)→ECU(ID6) |
| Bus load table | | Refer to FIG. 100 |
| Battery load | | 40% |
| Vehicle condition during rewriting | | All parked/All traveling/Optimal |
| Scene info | | Recall/Dealer/Factory/<br>Function update notification/Forced execution |
| ECU (IDn) info<br>n=1~6 | ECU_ID | ECU_ID |
| | Connected bus | First bus |
| | Connected power supply | +B power, ACC power, IG Power |
| | Security access key info | Random number value |
| | | Key pattern |
| | | Decryption operation pattern |
| | Memory type | Single-bank memory/Virtual-double-bank memory/Double-bank memory |
| | Rewrite method | Self-retention power/Power supply control |
| | Self-retention power time | 5 minutes |
| | Rewrite bank info | Bank-A is start bank and bank-B is rewrite bank |
| | Update program version | 2.0 |
| | Update program acquisition address | 1 |
| | Update program size | 10Mbyte |
| | Rollback program version | 1.0 |
| | Rollback program acquisition address | 0x8000 |
| | Rollback program size | 10Mbyte |
| | Update program data type | Difference data/entire data |
| | Rollback program data type | Difference data/Entire data |

Embedded type double-bank memory (during normal operation)

FIG. 100

Bus load table (First correspondence relationship)

| | | First bus | Second bus | Third bus |
|---|---|---|---|---|
| Allowable transmission amount | | 80% | 70% | 90% |
| IG power state | Vehicle control data | 50% | 20% | 40% |
| | Write data | 30% | 50% | 50% |
| ACC power state | Vehicle control data | 30% | 30% | 20% |
| | Write data | 50% | 40% | 70% |
| +B power state | Vehicle control data | 20% | 10% | 50% |
| | Write data | 60% | 60% | 40% |

FIG. 101

Rewrite target ECU-belonging table (Second correspondence relationship)

| | Belonging bus | +B power state | ACC power state | IG power state |
|---|---|---|---|---|
| First rewrite target ECU | First bus | Start | Start | Start |
| Second rewrite target ECU | Second bus | Sleep | Start | Start |
| Third rewrite target ECU | Third bus | Sleep | Sleep | Start |

FIG. 137

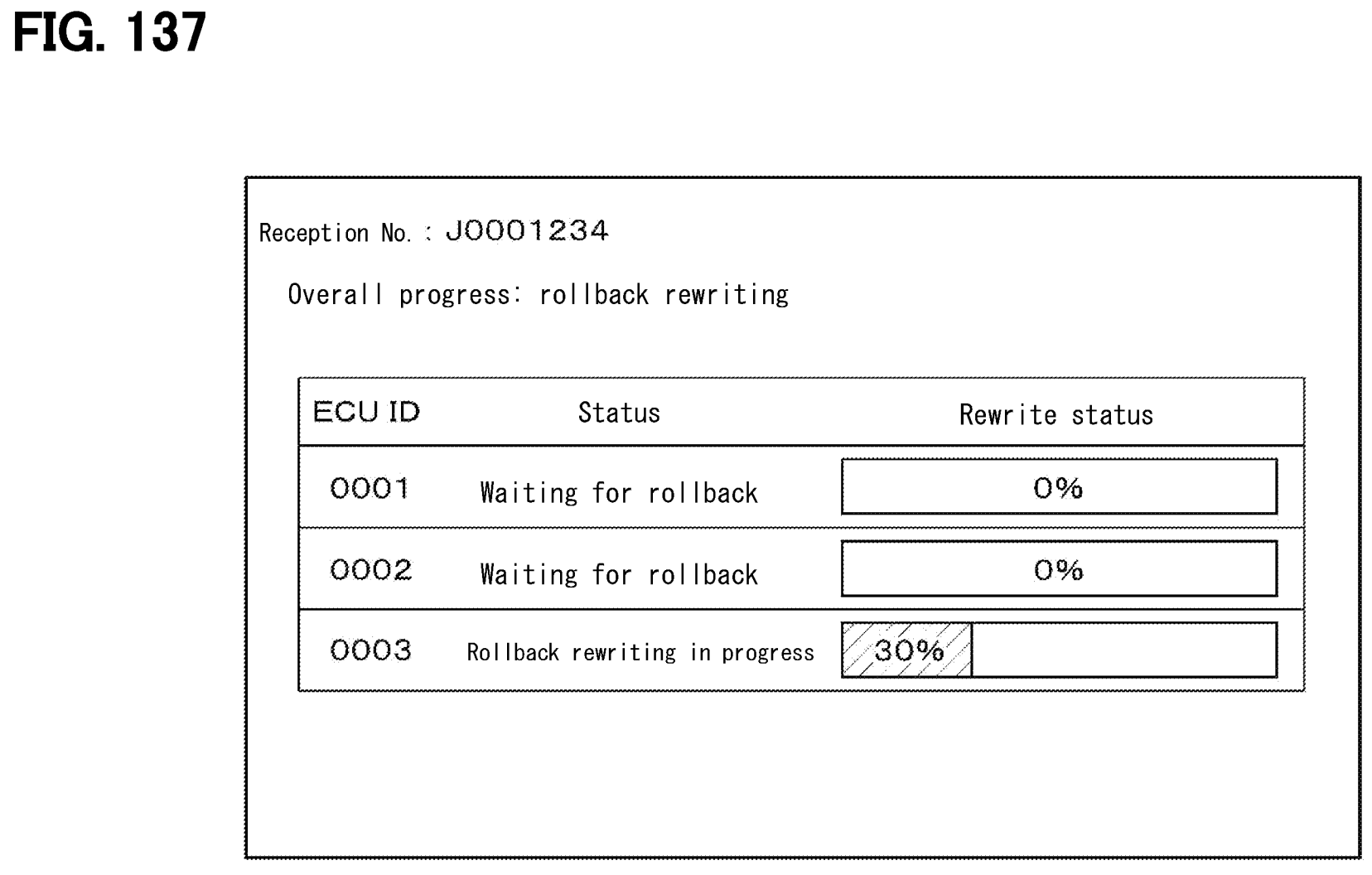

Reception No. : J0001234

Overall progress: rollback rewriting

| ECU ID | Status | Rewrite status |
| --- | --- | --- |
| 0001 | Waiting for rollback | 0% |
| 0002 | Waiting for rollback | 0% |
| 0003 | Rollback rewriting in progress | 30% |

FIG. 161

| Second state \ First state | Default session | Wired diagnostic session | Wired rewrite session |
|---|---|---|---|
| Default session | ○ Vehicle control | ○ Wired diagnosis<br>○ Vehicle control | ○ Wired rewriting<br>× Vehicle control |
| Wireless diagnostic session | ○ Wireless diagnosis<br>○ Vehicle control | ○ Wired diagnosis<br>○ Wireless diagnosis<br>○ Vehicle control | ○ Wired rewriting<br>× Wireless diagnosis<br>× Vehicle control |
| Wireless rewrite session | ○ Wireless rewriting<br>○ Vehicle control | ○ Wireless rewriting<br>○ Wired diagnosis<br>○ Vehicle control | ○ Wired rewriting<br>× Wireless rewriting<br>(in cases of wired rewriting priority)<br>× Vehicle control |

○ : Executable
× : Inexecutable

FIG. 162

| Second state \ First state | Default session | Wired diagnostic session | Wired rewrite session |
|---|---|---|---|
| Default session | ○ Vehicle control | ○ Wired diagnosis<br>○ Vehicle control | ○ Wired rewriting<br>○ Vehicle control |
| Wireless diagnostic session | ○ Wireless diagnosis<br>○ Vehicle control | ○ Wired diagnosis<br>○ Wireless diagnosis<br>○ Vehicle control | ○ Wired rewriting<br>○ Wireless diagnosis<br>○ Vehicle control |
| Wireless rewrite session | ○ Wireless rewriting<br>○ Vehicle control | ○ Wireless rewriting<br>○ Wired diagnosis<br>○ Vehicle control | ○ Wired rewriting<br>× Wireless rewriting (in cases of wired rewriting priority)<br>○ Vehicle control |

○ : Executable
× : Inexecutable

State transition management of first state

Rewrite specification data

| | |
|---|---|
| Scene info | Recall flag |
| | Dealer flag |
| | Factory flag |
| | Function update notification flag |
| | Forced execution flag |
| Expiration date info | |
| Position info | |

| Item | Display/non-display |
|---|---|
| Campaign··· | Display |
| Update name A··· | Display |
| Update name B ··· | Display |
| Details check | Display |
| Back | Display |
| OK | Display |

| Item | Display/non-display |
|---|---|
| Campaign ··· | Display |
| Update name A ··· | Display |
| Update name B ··· | Display |
| Details check | Display |
| Back | Non-display |
| OK | Display |

FIG. 203

| | | At initial setting | Customization | Recall flag | Forced execution flag |
|---|---|---|---|---|---|
| At normal times | | FIG. 31 | FIG. 31 | FIG. .1 | FIG. 31 |
| Campaign notification | | FIGs. 32, 33 | FIGs. 32, 33 | FIGs. 32, 204 | Omission |
| Download | Approval | FIGs. 34, 35 | Omission | FIGs. 205, 206 | |
| | In execution | FIGs. 36, 37 | | FIGs. 36, 207 | |
| Installation | Approval | FIGs. 38, 39, 40 | | FIGs. 40, 208, 209 | |
| | In execution | FIGs. 41, 42 | | FIGs. 41, 42 | |
| Activation | Approval | FIG. 43 | | FIG. 210 | |
| | In execution | — | — | — | |
| At IG-OFF | | — | — | — | |
| At IG-ON | | FIG. 44 | FIG. 44 | FIG. 44 | FIG. 44 |
| In check operation | | FIGs. 45, 46 | FIGs. 45, 46 | FIGs. 45, 46 | FIGs. 45, 46 |

FIG. 213

| | | Meter device | | | In-vehicle display |
|---|---|---|---|---|---|
| | | Double-bank memory | Single-bank suspend memory | Single-bank memory | |
| At normal times | | Light off | Light off | Light off | FIG. 31 |
| Campaign notification | | Steady light | Steady light | Steady light | FIGs. 32, 33 |
| Download | Approval | Steady light | Steady light | Steady light | FIGs. 34, 35 |
| | In execution | Steady light | Steady light | Steady light | FIGs. 36, 37 |
| Installation | Approval | Steady light | Steady light | Steady light | FIGs. 38, 39, 40 |
| | In execution | Steady light | Steady light (IG-ON), Flashing (IG-OFF) | Flashing | FIGs. 41, 42 |
| Activation | Approval | Steady light | Flashing | Flashing | FIG. 43 |
| | In execution | Flashing | Flashing | Flashing | |
| At IG-OFF | | Light off | Light off | Light off | |
| At IG-ON | | Steady light | Steady light | Steady light | FIG. 44 |
| In check operation | | Light off | Light off | Light off | FIGs. 45, 46 |

| Vehicle type | Vehicle SW ID | Sys ID | ECU ID | ECU SW ID |
|---|---|---|---|---|
| aaa | 0001 | SA01_01 | ADS | ads_001 |
| aaa | 0001 | SA02_01 | ENG | eng_010 |
| aaa | 0001 | SA02_01 | BRK | brk_001 |
| aaa | 0001 | SA02_01 | EPS | eps_010 |

⋮

| | | | | |
|---|---|---|---|---|
| aaa | 0002 | SA01_02 | ADS | ads_002 |
| aaa | 0002 | SA02_02 | ENG | eng_010 |
| aaa | 0002 | SA02_02 | BRK | brk_005 |
| aaa | 0002 | SA02_02 | EPS | eps_011 |

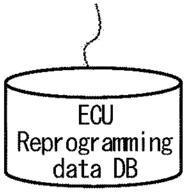

| ECU SW ID | ECU program (old) | ECU program (new) | Integrity verification data of ECU program (old) | Integrity verification data of ECU program (new) | Update data (difference data) | Integrity verification data of update data | Rollback data (difference data) | Integrity verification data of rollback data (difference data) |
|---|---|---|---|---|---|---|---|---|
| ads_002 | adsfile001 | adsfile002 | w1 | z1 | adsfile001~002 | x1 | adsfile002~001 | y1 |
| brk_005 | brkfile001 | brkfile005 | w2 | z2 | brkfile001-005 | x2 | brkfile005-001 | y2 |
| eps_011 | epsfile010 | epsfile011 | w3 | z3 | epsfile010-011 | x3 | epsfile011-010 | y3 |

| ECU SW ID | Update data size | Rollback data size | Bank | Transfer size | Read address |
|---|---|---|---|---|---|
| ads_002 | N1 Mbyte | M1 Mbyte | — | 1Kbyte | **** |
| brk_005 | N2 Mbyte | M2 Mbyte | For bank-B | 4Kbyte | **** |
| eps_011 | N3 Mbyte | M3 Mbyte | For bank-B | 1Kbyte | **** |

| Vehicle type | ECU ID | Memory | Bus | Power supply | Key |
|---|---|---|---|---|---|
| aaa | ADS | Single-bank | Second | IG | ads_key |
| aaa | ENG | Double-bank | First | ACC | eng_key |
| aaa | BRK | Suspend | First | +B | brk_key |
| aaa | EPS | Double-bank | First | +B | eps_key |

213

| VIN | Vehicle type | Vehicle SW ID | Digest | Sys ID | ECU ID | ECU SW ID | Active bank | Access log | Reprogramming status |
|---|---|---|---|---|---|---|---|---|---|
| 1 | aaa | 0001 | xxxxxx | SA01_01 | ADS | aaa_ads_001 | — | 2018/12/10 07:05 | None |
| | | | | SA02_01 | ENG | aaa_eng_010 | Bank-A | | |
| | | | | SA02_01 | BRK | aaa_brk_001 | Bank-A | | |
| | | | | SA02_01 | EPS | aaa_eps_010 | Bank-A | | |
| ⋮ | | | | | | | | | |
| 2 | aaa | 0002 | yyyyyy | SA01 | ADS | bbb_ads_002 | — | 2018/12/30 12:10 | Activation completed |
| ⋮ | | | | | | | | | |
| 3 | bbb | 1001 | zzzzzz | SA01 | ADS | bbb_ads_001 | — | 2018/11/04 08:23 | Download completed |
| ⋮ | | | | | | | | | |

| Package ID | File | Integrity verification data |
|---|---|---|
| pkg_001 | pkg001.dat | xx1.dat |
| pkg_002 | pkg002.dat | xx2.dat |

| Campaign ID | Package ID | Campaign details | Target VIN list | Before-update Vehicle SW ID | After-update Vehicle SW ID | Before-update ECU SW ID list | After-update ECU SW ID list |
|---|---|---|---|---|---|---|---|
| cpn_001 | pkg_001 | Text message | ... | 0001 | 0002 | ads_001,brk_001, eps_010 | ads_002,brk_005, eps_011 |
| cpn_002 | pkg_002 | Text message | ... | 1001 | 1002 | ... | ... |

FIG. 250

Specification data

| Item | | Values (example) |
|---|---|---|
| Rewrite environment | Vehicle condition | Permitted during traveling (IG-ON)/Parked (IG-OFF) only |
| | Battery load (remaining charge) | 40% or mor |
| | Bus load table | Refer to FIG. 251 |
| Group info | First group info | ECU(ID1)→ECU(ID2)→ECU(ID3) |
| | Second group info | ECU(ID4)→ECU(ID5)→ECU(ID6) |
| ECU(IDn) info n=1~6 | ECU ID | ECU ID |
| | Connected bus | First bus |
| | Connected power supply | +B power, ACC power, IG power |
| | Memory type | SIngle-bank memory/Virtual-double-bank memory/Double-bank memory |
| | Rewrite bank info | Bank-A is start bank and Bank-B is rewrite bank |
| | Security access key info | Random number value (key derivation key) |
| | | Key pattern |
| | | Decryption operation pattern |
| | Rewrite method | Self-retention power/Power supply control |
| | Transfer size | 1Kbyte |
| | Update program version | 2.0 |
| | Update program acquisition address | 1 |
| | Update program size | 10Mbyte |
| | Rollback program version | 1.0 |
| | Rollback program acquisition address | 0x80000 |
| | Rollback program size | 10Mbyte |
| | Write data type | Difference data/Entire data |
| | Write bank | For bank-B |

Bus load table

| | | First bus | Second bus | Third bus |
|---|---|---|---|---|
| Allowable transmission amount | | 80% | 70% | 90% |
| IG power state | Vehicle control data | 50% | 20% | 40% |
| | Write data | 30% | 50% | 50% |
| ACC power state | Vehicle control data | 30% | 30% | 20% |
| | Write data | 50% | 40% | 70% |
| +B power state | Vehicle control data | 20% | 10% | 50% |
| | Write data | 60% | 60% | 40% |

FIG. 256

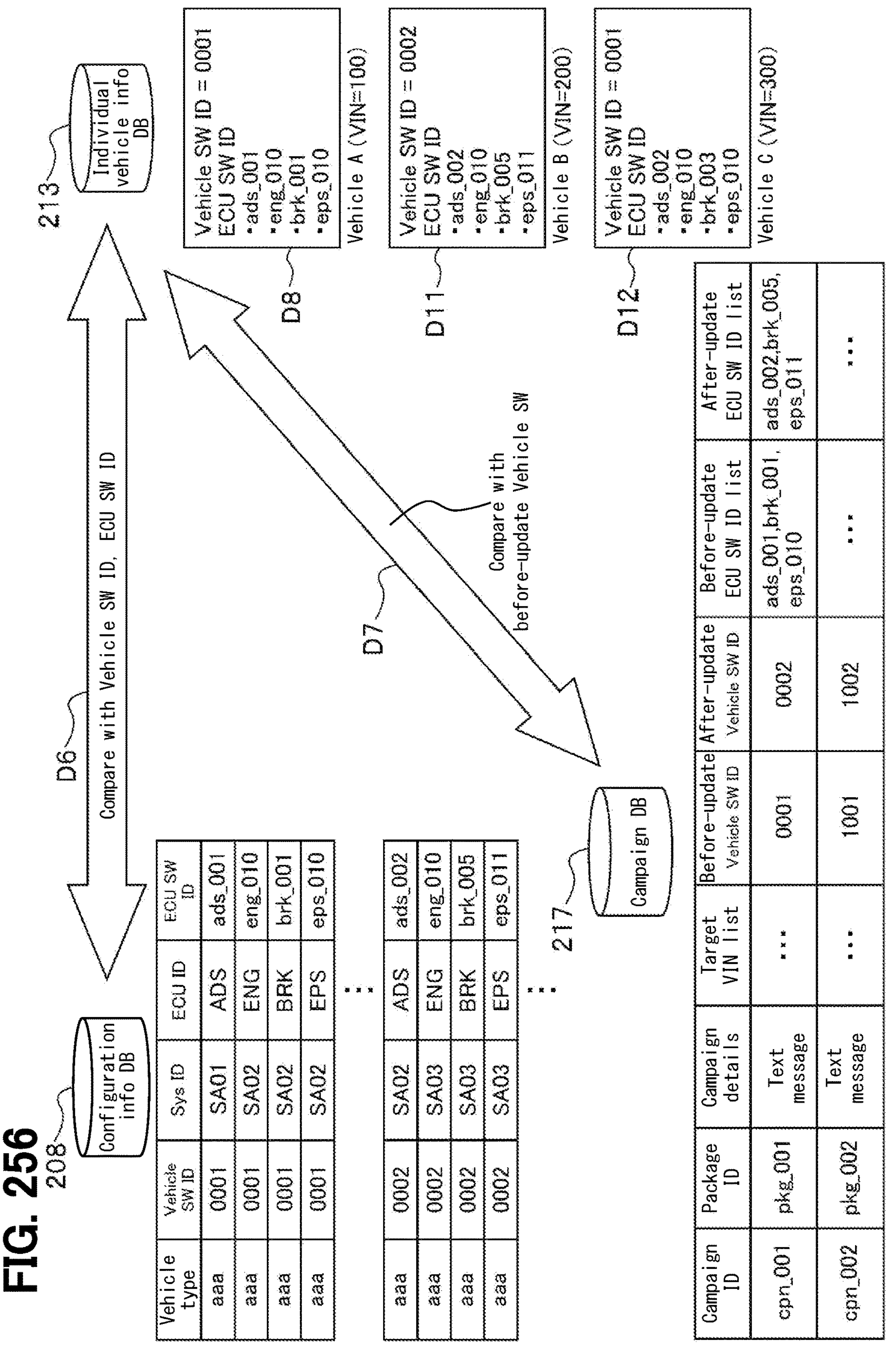

| Vehicle type | Vehicle SW ID | Sys ID | ECU ID | ECU SW ID |
|---|---|---|---|---|
| aaa | 0001 | SA01 | ADS | ads_001 |
| aaa | 0001 | SA02 | ENG | eng_010 |
| aaa | 0001 | SA02 | BRK | brk_001 |
| aaa | 0001 | SA02 | EPS | eps_010 |

⋮

| | | | | |
|---|---|---|---|---|
| aaa | 0002 | SA02 | ADS | ads_002 |
| aaa | 0002 | SA03 | ENG | eng_010 |
| aaa | 0002 | SA03 | BRK | brk_005 |
| aaa | 0002 | SA03 | EPS | eps_011 |

⋮

| Campaign ID | Package ID | Campaign details | Target VIN list | Before-update Vehicle SW ID | After-update Vehicle SW ID | Before-update ECU SW ID list | After-update ECU SW ID list |
|---|---|---|---|---|---|---|---|
| cpn_001 | pkg_001 | Text message | ... | 0001 | 0002 | ads_001,brk_001, eps_010 | ads_002,brk_005, eps_011 |
| cpn_002 | pkg_002 | Text message | ... | 1001 | 1002 | ... | ... |

| Package ID | File | Integrity verification data |
|---|---|---|
| pkg_001_1 | pkg001_1.dat | xx1_1.dat |
| pkg_001_2 | pkg001_2.dat | xx1_2.dat |
| pkg_002 | pkg002.dat | xx2.dat |

| Campaign ID | Package ID | Campaign details | Target VIN list | Before-update Vehicle SW ID | After-update Vehicle SW ID | Before-update ECU SW ID list | After-update ECU SW ID list |
|---|---|---|---|---|---|---|---|
| cpn_001 | pkg_001_1 pkg_001_2 | Text message | ••• | 0001 | 0002 | ads_001,brk_001, eps_010,••• | ads_002,brk_005, eps_011,••• |
| cpn_002 | pkg_002 | Text message | ••• | 1001 | 1002 | ••• | ••• |

ELECTRONIC CONTROL UNIT, VEHICLE ELECTRONIC CONTROL SYSTEM, ACTIVATION EXECUTION CONTROL METHOD AND COMPUTER PROGRAM PRODUCT

CROSS REFERENCE TO RELATED APPLICATIONS

This application is a continuation application of International Patent Application No. PCT/JP2019/031453 filed on Aug. 8, 2019, which designated the U.S. and claims the benefit of priority from Japanese Patent Application No. 2018-151423 filed on Aug. 10, 2018 and Japanese Patent Application No. 2019-129961 filed on Jul. 12, 2019. The entire disclosure of all of the above applications is incorporated herein by reference.

TECHNICAL FIELD

The present disclosure relates to an electronic control unit, a vehicle electronic control system, an activation execution control method, and a computer program product.

BACKGROUND ART

In recent years, the scale of a program for vehicle control, diagnosis, and the like, installed in an electronic control device (hereinafter, referred to as an electronic control unit (ECU)) of a vehicle, has been increased due to the diversification of vehicle control such as a driving support function and an autonomous driving function. An opportunity to rewrite (reprogram) a program of an ECU has been increased in accordance with upgrading based on functional improvement. On the other hand, a technique for connected cars has also been spread with the progress of communication networks or the like. In light of such circumstances, for example, a vehicle master device as a relay device is provided on a vehicle side, and the vehicle master device distributes update data received wirelessly from a center device to a rewrite target ECU such that a program of the rewrite target ECU is rewritten through Over The Air (OTA).

SUMMARY

According to one aspect of the present disclosure, an electronic control unit includes a non-volatile memory that includes a first data storage bank and a second data storage bank, and the electronic control unit is configured to receive update data from a vehicle master device and to write the received update data into the second data storage bank to rewrite a program on the second data storage bank. An active bank information update unit is configured to update active bank information indicative of which bank is an active bank between the first data storage bank and the second data storage bank when a program rewrite on the second data storage bank is completed and the vehicle master device gives an instruction for an activation request. An execution condition determination unit is configured to determine whether an activation execution condition is satisfied. An execution control unit is configured to activate the second data storage bank as the active bank based on the active bank information after a restart when the execution condition determination unit determines that the activation execution condition is satisfied.

BRIEF DESCRIPTION OF DRAWINGS

The above-described object and other objects, features and advantages of the present disclosure will become more apparent from the following detailed description with reference to the accompanying drawings. In the drawings:

FIG. 7 is a diagram illustrating rewrite specification data for DCM, FIG. 8 is a diagram illustrating rewrite specification data for CGW, FIG. 9 a diagram illustrating the distribution specification data, FIG. 100 is a diagram illustrating a bus load table, FIG. 101 is a diagram illustrating a table to which the rewrite target ECU belongs, FIG. 137 is a diagram illustrating the rewrite progress situation screen, FIG. 161 is a diagram illustrating session arbitration, FIG. 162 is a diagram illustrating session arbitration, FIG. 203 is a diagram illustrating screen transition, FIG. 204 a diagram illustrating a screen when a campaign notification occurs, FIG. 213 is a diagram illustrating an indicator notification aspect.

FIG. 243 is a diagram illustrating an example of a program or data registered in an ECU reprogramming data DB, FIG. 250 is a diagram illustrating an example of specification data, FIG. 256 is an image diagram illustrating contents of processes performed in steps D6 and D7 in the flowchart of FIG. 248.

DESCRIPTION OF EMBODIMENTS

Figure 1:
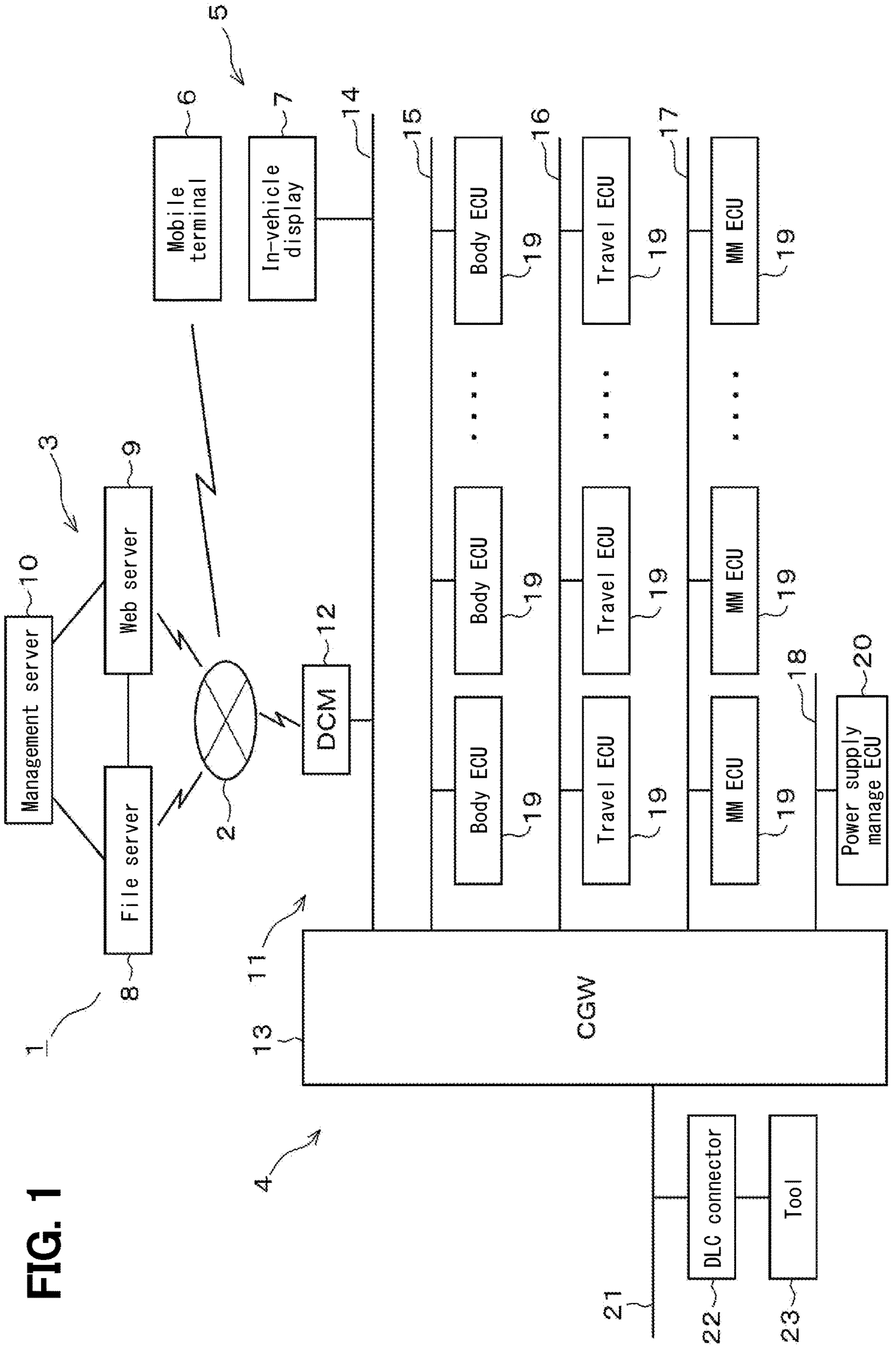
FIG. 1 is a diagram illustrating the overall configuration according to an embodiment.

To begin with, a relevant technology will be described first only for understanding the following embodiments. In a vehicle master device, the rewrite target ECU is instructed to write update data downloaded from the center device 3 into the non-volatile memory (for example, a flash memory). The types of non-volatile memory mounted in the ECU include a single-bank independent memory having a single data storage bank for storing data such as control programs, a single-bank suspend memory having pseudo-double banks, and a double-bank memory having double substantial data storage banks.

Since an ECU having the single-bank suspended memory or the double-bank memory has double data storage banks, one of the double banks is used as an active bank and the other is used as an inactive bank. When a program is rewritten, an inactive bank is used as a rewrite bank, and the program rewrite on the inactive bank can be done by writing a new program into the rewrite bank. When rewriting of the new program on the inactive bank is completed, the ECU having the single-bank suspended memory or the double-bank memory switches between the active bank and the inactive bank, and activates the new program by restarting.

However, if the rewrite target ECU makes activation at the timing the program rewrite is completed, a problem may occur in a cooperation process with other ECUs.

The present disclosure has been made in view of the above circumstances, and an objective thereof is to provide an electronic control unit, a vehicle electronic control system, an activation execution control method, and a computer program product, which are capable of appropriately controlling activation based on an instruction from outside when an electronic control unit having a plurality of data storage banks is a rewrite target.

As described above, according to the one aspect of the present disclosure, an electronic control unit includes a non-volatile memory that includes a first data storage bank and a second data storage bank, and the electronic control unit is configured to receive update data from a vehicle master device and to write the received update data into the second data storage bank to rewrite a program on the second data storage bank. An active bank information update unit is configured to update active bank information indicative of which bank is an active bank between the first data storage bank and the second data storage bank when a program rewrite on the second data storage bank is completed and the vehicle master device gives an instruction for an activation request. An execution condition determination unit is configured to determine whether an activation execution condition is satisfied. An execution control unit is configured to activate the second data storage bank as the active bank based on the active bank information after a restart when the execution condition determination unit determines that the activation execution condition is satisfied.

When the activation execution condition is determined to be satisfied, the second data storage bank is activated as the active bank based on the active bank information after restarting. Thus, when an electronic control device having a plurality of data storage banks is a rewrite target, activation can be appropriately controlled based on an instruction from outside.

Hereinafter, one embodiment will be described with reference to the drawings. A vehicle program rewriting system (corresponding to a vehicle electronic control system) is a system in which application programs for vehicle control, diagnosis, and the like, installed in an electronic control device (hereinafter referred to as an electronic control unit (ECU)) can be rewritten through Over The Air (OTA). In the present embodiment, a case where an application program is rewritten in a wired or wireless manner will be described, but the present disclosure may be applied to a case where data used in various applications, such as map data used in a map application, and control parameters used in an ECU is rewritten in a wired or wireless manner.

The rewriting of an application program in a wire manner includes not only acquiring and rewriting the application program from the outside of a vehicle in the wired manner but also acquiring and rewriting various pieces of data used when the application program is executed from the outside of the vehicle in the wire manner. The rewriting of the application program in a wireless manner includes not only acquiring and rewriting an application program from the outside of a vehicle in the wireless manner but also acquiring and rewriting various pieces of data used when the application program is executed from the outside of the vehicle in the wireless manner.

As illustrated in FIG. 1, a vehicle program rewriting system 1 includes a center device 3 on a communication network 2 side, a vehicle-side system 4 on a vehicle side, and a display terminal 5. The communication network 2 is configured to include, for example, a mobile communication network such as a 4G line, the Internet, and Wireless Fidelity (Wi-Fi (registered trademark)). In the present embodiment, the following description will focus on a configuration of the vehicle side, and a configuration of the center device 3 will be described in detail with reference to FIGS. 234 to 270.

The display terminal 5 is a terminal having a function of receiving operation input from a user and a function of displaying various screens, and is, for example, a mobile terminal 6 such as a smartphone or a tablet computer that can be carried by a user, and an in-vehicle display 7 disposed in a vehicle compartment. The mobile terminal 6 can perform data communication with the center device 3 via the communication network 2 as long as the mobile terminal 6 is within a communication range of a mobile communication network. The in-vehicle display 7 is connected to the vehicle-side system 4, and may also have a navigation function. The in-vehicle display 7 may be an in-vehicle display ECU having an ECU function, or may have a function of controlling display on a center display, a meter display, or the like.

As long as a user is located outside the vehicle compartment and is within the communication range of the mobile communication network, the user can perform operation input while checking various screens related to rewriting of an application program with the mobile terminal 6, and can perform a procedure related to the rewriting of the application program. In the vehicle compartment, the user can perform operation input while checking various screens related to rewriting of the application program with the in-vehicle display 7, and can perform a procedure related to rewriting of the application program. That is, the user can use the mobile terminal 6 and the in-vehicle display 7 separately outside the vehicle compartment and in the vehicle compartment, and can perform a procedure related to rewriting of the application program.

The center device 3 controls a program update function of the communication network 2 side in the vehicle program rewriting system 1, and functions as an OTA center. The center device 3 includes a file server 8, a web server 9, and a management server 10, and each of the servers 8 to 10 is configured to be able to perform data communication with each other. That is, the center device 3 is configured to include a plurality of different servers for each function.

The file server 8 is a server that manages a file of an application program distributed from the center device 3 to the vehicle-side system 4. The file server 8 manages update data (hereinafter, also referred to as reprogramming data or write data) provided from a supplier or the like, which is a provider of an application program distributed from the center device 3 to the vehicle-side system 4, distribution specification data provided from an original equipment manufacturer (OEM), vehicle conditions acquired from the vehicle-side system 4, and the like. The file server 8 can perform data communication with the vehicle-side system 4 via the communication network 2, and transmits a distribution package in which the reprogramming data and the distribution specification data are packaged into one file to the vehicle-side system 4 when a download request for the distribution package is generated.

The web server 9 is a server that manages web information. The web server 9 transmits web data managed thereby in response to a request from a web browser of the mobile terminal 6 or the like. The management server 10 is a server that manages personal information of a user registered in a service of rewriting an application program, a rewrite history of an application program for each vehicle, and the like.

The vehicle-side system 4 has a master device 11 (corresponding to a vehicle master device). The master device 11 includes a data communication module (DCM) 12 (corresponding to an in-vehicle communication device) and a central gate way (CGW) 13 (corresponding to a vehicle gateway device). The DCM 12 and the CGW 13 are connected to each other via a first bus 14 to be able to perform data communication. The DCM 12 performs data communication with the center device 3 via the communication network 2. When the DCM 12 downloads the distribution package from the file server 8, the DCM extracts write data from the downloaded distribution package and transfers the extracted write data to the CGW 13.

The CGW 13 has a data relay function, and, when the write data is acquired from the DCM 12, the CGW instructs a rewrite target ECU that is a rewrite target of an application program to write the acquired write data, and distributes the write data to the rewrite target ECU. When writing of the write data has been completed in the rewrite target ECU and rewriting of the application program has been completed, the CGW 13 instructs the rewrite target ECU to perform activation for validating the application program after being rewritten.

The master device 11 controls a program update function of the vehicle side in the vehicle program rewriting system 1, and functions as an OTA master. In FIG. 1, although the DCM 12 and the in-vehicle display 7 are configured to be connected to the same first bus 14 as an example, the DCM 12 and the in-vehicle display 7 may be configured to be connected to separate buses. The CGW 13 may have some or all of the functions of the DCM 12, or the DCM 12 may have some or all of the functions of the CGW 13. That is, in the master device 11, function sharing between the DCM 12 and the CGW 13 may be configured in any manner. The master device 11 may be configured with two ECUs such as the DCM 12 and the CGW 13, or may be configured with a single integrated ECU having the functions of the DCM 12 and the functions of the CGW 13.

In addition to the first bus 14, a second bus 15, a third bus 16, a fourth bus 17, and a fifth bus 18 are connected to the CGW 13 as buses inside the vehicle, and various ECUs 19 are connected via the buses 15 to 17, and a power supply management ECU 20 is connected via the bus 18.

The second bus 15 is, for example, a body system network bus. The ECUs 19 connected to the second bus 15 are ECUs controlling a body system. The ECUs controlling the body system include, for example, a door ECU controlling locking/unlocking of a door, a meter ECU controlling display on the meter display, an air conditioner ECU controlling driving of an air conditioner, a window ECU controlling opening and closing of a window, and a security ECU driven to prevent theft of the vehicle.

The third bus 16 is, for example, a traveling system network bus. The ECUs 19 connected to the third bus 16 are ECUs controlling a traveling system. The ECUs controlling the traveling system include, for example, an engine ECU controlling driving of an engine, a brake ECU controlling driving of a brake, an electronic controlled transmission (ECT) ECU controlling driving of an automatic transmission, and a power steering ECU controlling a driving of a power steering.

The fourth bus 17 is, for example, a multimedia system network bus. The ECUs 19 connected to the fourth bus 17 are ECUs controlling a multimedia system. The ECUs controlling the multimedia system include, for example, a navigation ECU controlling a navigation system, and an ETC ECU controlling an electronic toll collection system (ETC) (registered trademark). The buses 15 to 17 may be system buses other than the body system network bus, the traveling system network bus, and the multimedia system network bus. The number of buses and the number of the ECUs 19 are not limited to the exemplified configuration. The power supply management ECU 20 is an ECU that manages power to be supplied to the DCM 12, the CGW 13, the various ECUs 19, and the like.

A sixth bus 21 is connected to the CGW 13 as a bus outside the vehicle. A data link coupler (DLC) connector 22 to which a tool 23 (corresponding to a service tool) is detachably connected is connected to the sixth bus 21. The buses 14 to 18 inside the vehicle and the bus 21 outside the vehicle are configured with, for example, Controller Area Network (CAN) (registered trademark) buses, and the CGW 13 performs data communication with the DCM 12, the various ECUs 19, and the tool 23 in accordance with the CAN data communication standard and the diagnosis communication standard (Unified Diagnosis Services (UDS): ISO14229). The DCM 12 and the CGW 13 may be connected to each other via Ethernet, and the DLC connector 22 and the CGW 13 may be connected to each other via Ethernet.

When write data is received from the CGW 13, the rewrite target ECU 19 writes the received write data into a flash memory (corresponding to a non-volatile memory) to rewrite an application program. In the above configuration, when a request for acquiring write data is received from the rewrite target ECU 19, the CGW 13 functions as a reprogramming master that distributes the write data to the rewrite target ECU 19. When the write data is received from the CGW 13, the rewrite target ECU 19 functions as a reprogramming slave that writes the received write data into the flash memory to rewrite the application program.

As an aspect of rewriting the application program, there are a wired rewrite aspect and a wireless rewrite aspect. The aspect in which the application program is rewritten in a wired manner is an aspect in which the rewrite target ECU 19 is rewritten by using an application program acquired from the outside of the vehicle in a wired manner. Specifically, when the tool 23 is connected to the DLC connector 22, the tool 23 transfers the write data to the CGW 13. The CGW 13 functions as a gateway, transmits a wired rewrite request to the rewrite target ECU 19, instructs the rewrite target ECU 19 to write (install) the write data, and distributes the write data transferred from the tool 23 to the rewrite target ECU 19. Distributing the write data to the rewrite target ECU 19 is to relay the write data.

The aspect in which the application program is rewritten in a wireless manner is an aspect in which the rewrite target ECU 19 is rewritten by using an application program acquired from the outside of the vehicle in a wireless manner. Specifically, when a distribution package is downloaded from the file server 8, the DCM 12 extracts write data from the downloaded distribution package, and transfers the write data to the CGW 13. The CGW 13 functions as a rewrite tool, instructs the rewrite target ECU 19 to write (install) the write data, and distributes the write data transferred from the DCM 12 to the rewrite target ECU 19.

Aspects of diagnosing the ECU 19 include a wired diagnosis aspect and a wireless diagnosis aspect. The wired diagnosis aspect is an aspect in which the ECU 19 is diagnosed from the outside of the vehicle in a wired manner. Specifically, when the tool 23 is connected to the DLC connector 22, the tool 23 transfers a diagnosis request to the CGW 13. The CGW 13 functions as a gateway, transmits a diagnosis request to the diagnosis target ECU 19, and distributes a diagnosis command transferred from the tool 23 to a diagnosis target ECU 19. The diagnosis target ECU 19 performs a diagnosis process in accordance with the diagnosis command received from the CGW 13.

The wireless diagnosis aspect is an aspect in which the ECU 19 is diagnosed from the outside of the vehicle in a wireless manner. Specifically, when a diagnosis command is transmitted as a diagnosis request from the center device 3 to the DCM 12, the DCM 12 transfers the diagnosis command to the CGW 13. The CGW 13 functions as a gateway and distributes the diagnosis command as a diagnosis request to the diagnosis target ECU 19. The diagnosis target ECU performs a diagnosis process in accordance with the diagnosis command received from the CGW 13.

Figure 2:
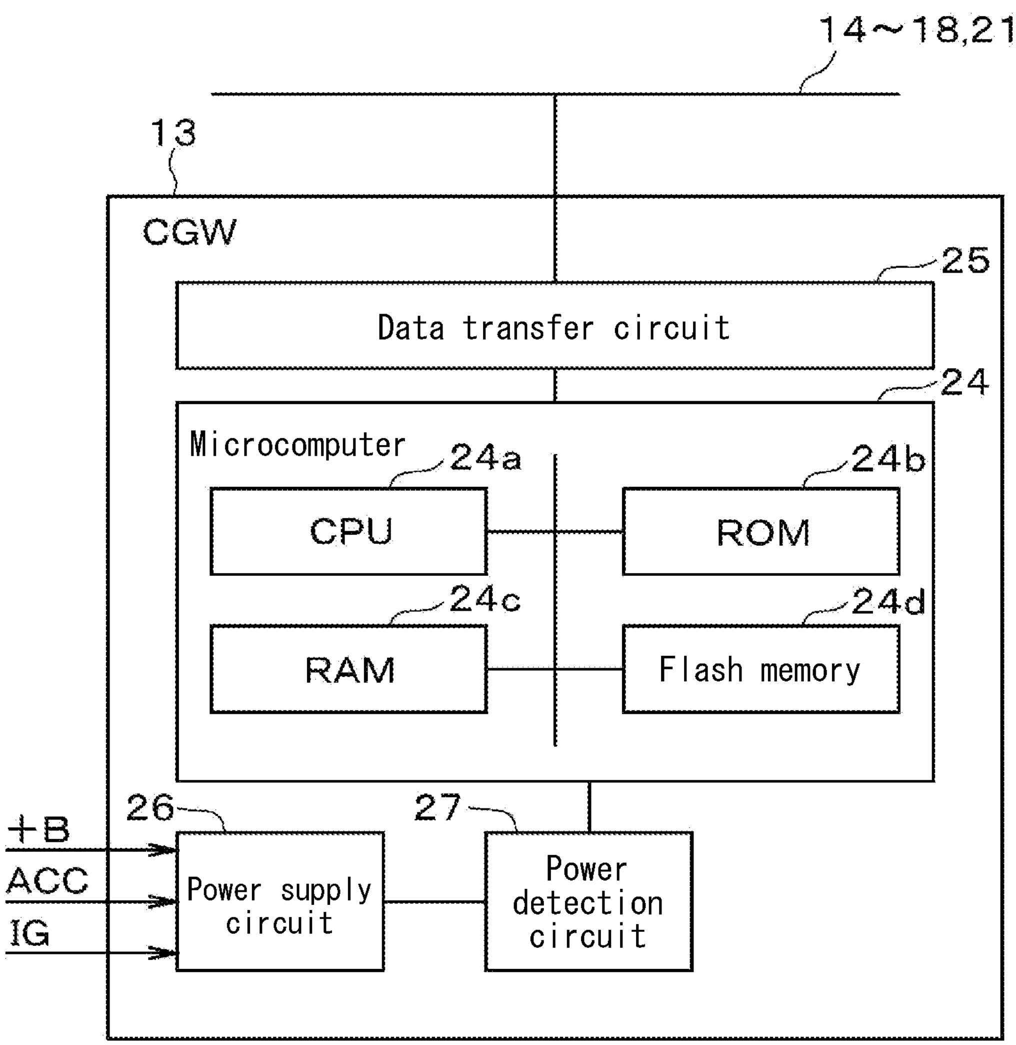
FIG. 2 is a diagram illustrating an electrical configuration of a CGW.

As illustrated in FIG. 2, the CGW 13 includes a microcomputer 24, a data transfer circuit 25, a power supply circuit 26, and a power detection circuit 27 as electrical functional blocks. The microcomputer 24 includes a central processing unit (CPU) 24*a*, a read only memory (ROM) 24*b*, a random access memory (RAM) 24*c*, and a flash memory 24*d*. The flash memory 24*d* includes a secure area in which information cannot be read from the outside of the CGW 13. The microcomputer 24 performs various processes by executing various control programs stored in a non-transitory tangible storage medium, and controls an operation of the CGW 13.

The data transfer circuit 25 controls data communication with the buses 14 to 18 and 21 in accordance with the CAN data communication standard and the diagnosis communication standard. The power supply circuit 26 receives battery power (hereinafter, referred to as +B power), accessory power (hereinafter, referred to as ACC power), and ignition power (hereinafter, referred to as IG power). The power detection circuit 27 detects a voltage value of the +B power, a voltage value of the ACC power, and a voltage value of the IG power received by the power supply circuit 26, compares the detected voltage values with predetermined voltage threshold values, and outputs comparison results to the microcomputer 24. The microcomputer 24 determines whether the +B power, the ACC power, and the IG power supplied to the CGW 13 from the outside are normal or abnormal on the basis of the comparison results that are input from the power detection circuit 27.

Figure 3:
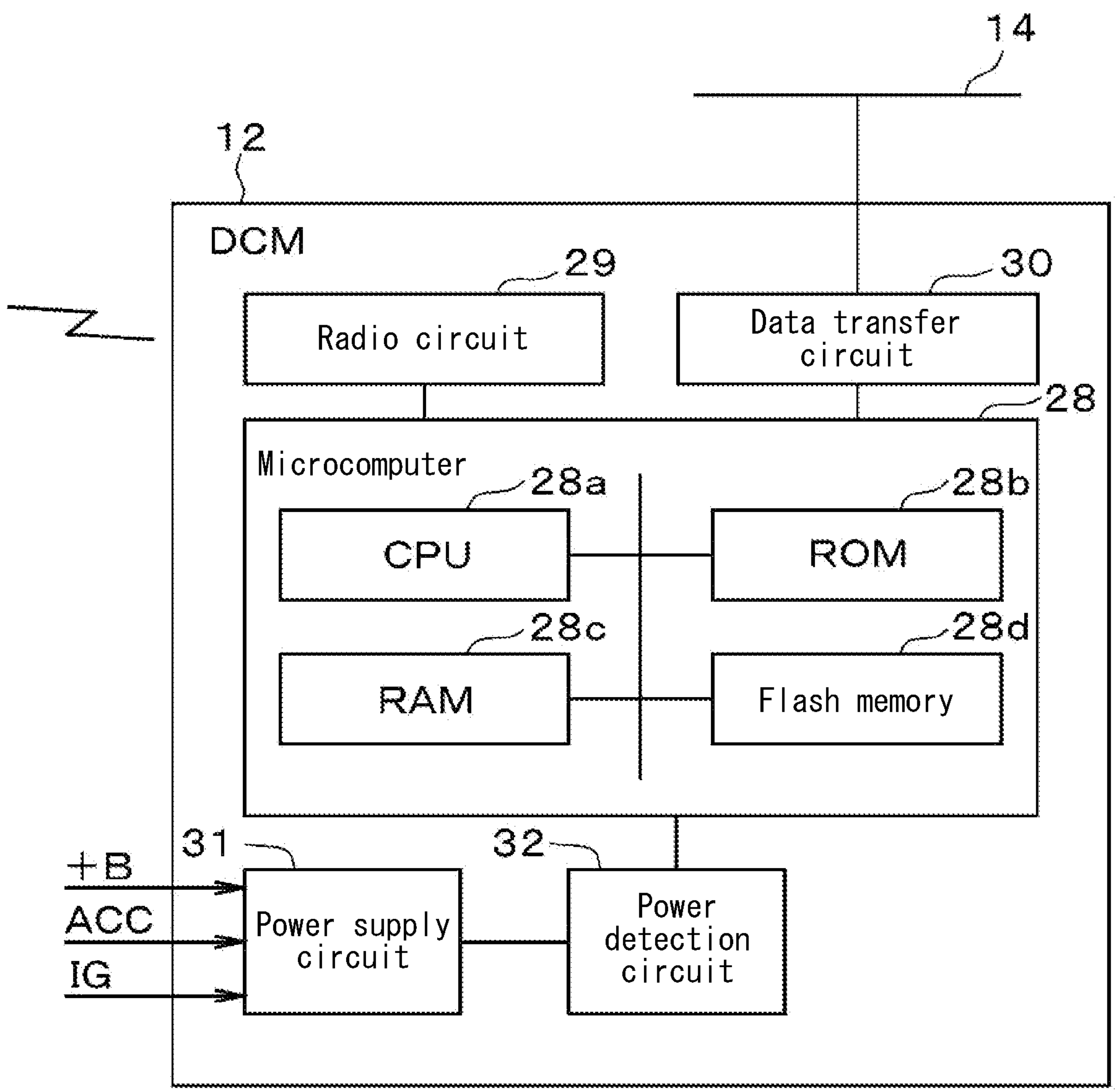
FIG. 3 is a diagram illustrating an electrical configuration of a DCM.

As illustrated in FIG. 3, the DCM 12 includes a microcomputer 28, a radio circuit 29, a data transfer circuit 30, a power supply circuit 31, and a power detection circuit 32 as electrical functional blocks. The microcomputer 28 includes a CPU 28*a*, a ROM 28*b*, a RAM 28*c*, and a flash memory 28*d*. The flash memory 28*d* includes a secure area in which information cannot be read from the outside of the DCM 12. The microcomputer 28 performs various processes by executing various control programs stored in a non-transitory tangible storage medium, and controls an operation of the DCM 12. The flash memory storing data to be downloaded from the center device 3 may be provided in the CGW 13.

The radio circuit 29 controls data communication with the center device 3 via the communication network 2. The data transfer circuit 30 controls data communication with the bus 14 in accordance with the CAN data communication standard. The power supply circuit 31 receives +B power, ACC power, and IG power. The power detection circuit 32 detects a voltage value of the +B power, a voltage value of the ACC power, and a voltage value of the IG power received by the power supply circuit 31, compares the detected voltage values with predetermined voltage threshold values, and outputs comparison results to the microcomputer 28. The microcomputer 28 determines whether the +B power, the ACC power, and the IG power supplied to the DCM 12 from the outside are normal or abnormal on the basis of the comparison results that are input from the power detection circuit 32.

The DCM 12 has a vehicle position detection function of detecting a vehicle position, for example, by using a global positioning system (GPS). The flash memory 28*d* of the DCM 12 has a memory capacity sufficient to store a distribution package downloaded from the center device 3 and has a memory capacity larger than that of the flash memory 24*d* of the CGW 13. That is, since the flash memory 28*d* of the DCM 12 has a sufficient memory capacity, even though the flash memory 24*d* of the CGW 13 does not have a sufficient memory capacity, the master device 11 can download the distribution package from the center device 3 and store the downloaded distribution package in the DCM 12.

Figure 4:
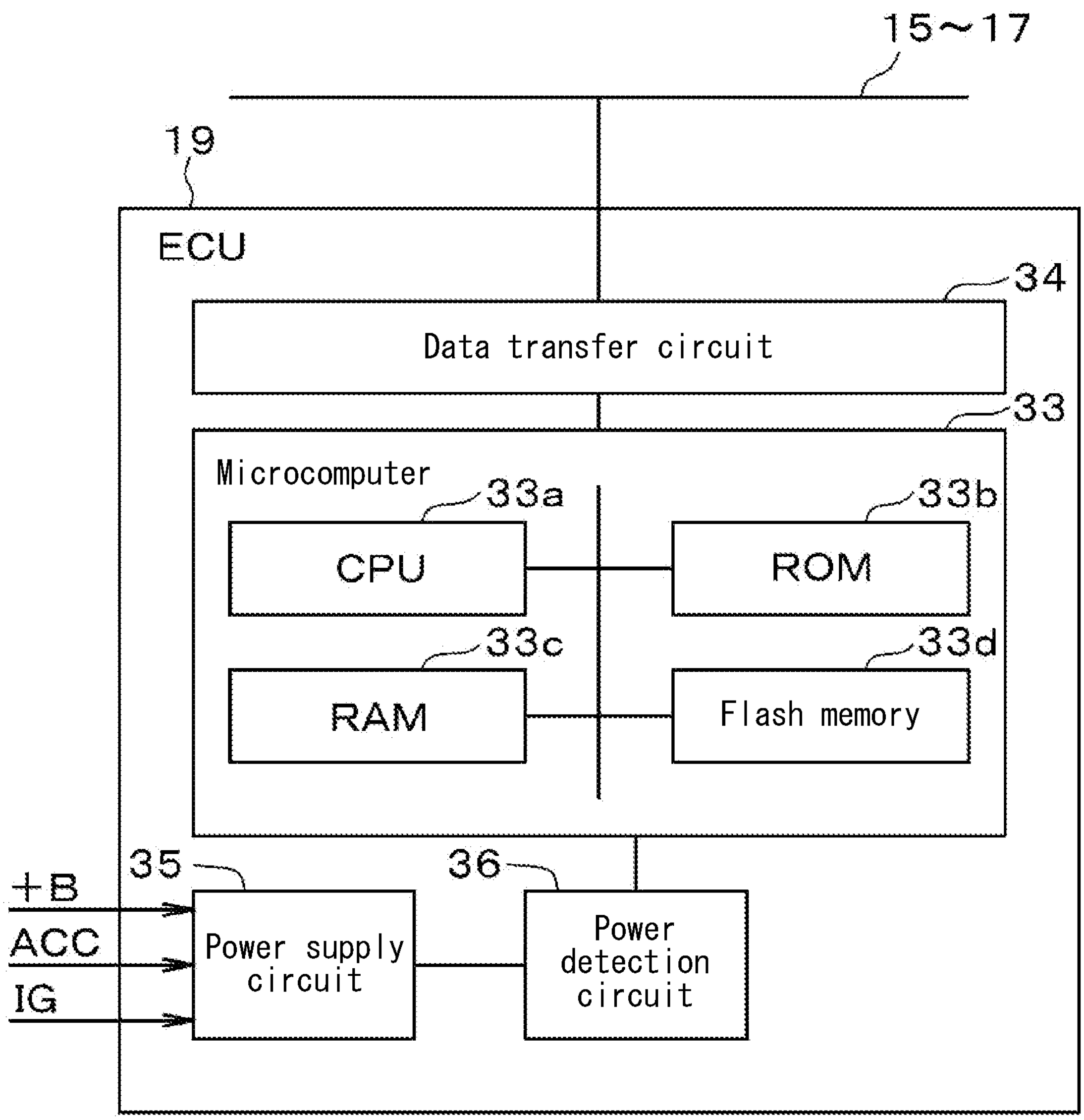
FIG. 4 is a diagram illustrating an electrical configuration of an ECU.

As illustrated in FIG. 4, the ECU 19 includes a microcomputer 33, a data transfer circuit 34, a power supply circuit 35, and a power detection circuit 36 as electrical functional blocks. The microcomputer 33 includes a CPU 28*a*, a ROM 28*b*, a RAM 33*c*, and a flash memory 28*d*. The flash memory 28*d* includes a secure area in which information cannot be read from the outside of the ECU 19. The microcomputer 33 performs various processes by executing various control programs stored in a non-transitory tangible storage medium, and controls an operation of the ECU 19.

The data transfer circuit 34 controls data communication with the buses 15 to 17 in accordance with the CAN data communication standard. The power supply circuit 35 receives +B power, ACC power, and IG power. The power detection circuit 36 detects a voltage value of the +B power, a voltage value of the ACC power, and a voltage value of the IG power received by the power supply circuit 35, compares the detected voltage values with predetermined voltage threshold values, and outputs comparison results to the microcomputer 33. The microcomputer 33 determines whether the +B power, the ACC power, and the IG power supplied to the ECU 19 from the outside are normal or abnormal on the basis of the comparison results that are input from the power detection circuit 27. The ECUs 19 fundamentally have the same configuration except that loads such as sensors or actuators connected thereto are different from each other.

The in-vehicle display 7 has the same configuration as that of the ECU 19 illustrated in FIG. 4. The power supply management ECU 20 has the same configuration as that of the ECU 19 illustrated in FIG. 4. The power supply management ECU 20 is connected to a power supply control circuit 43 which will be described later so as to enable data communication therebetween.

Figure 5:
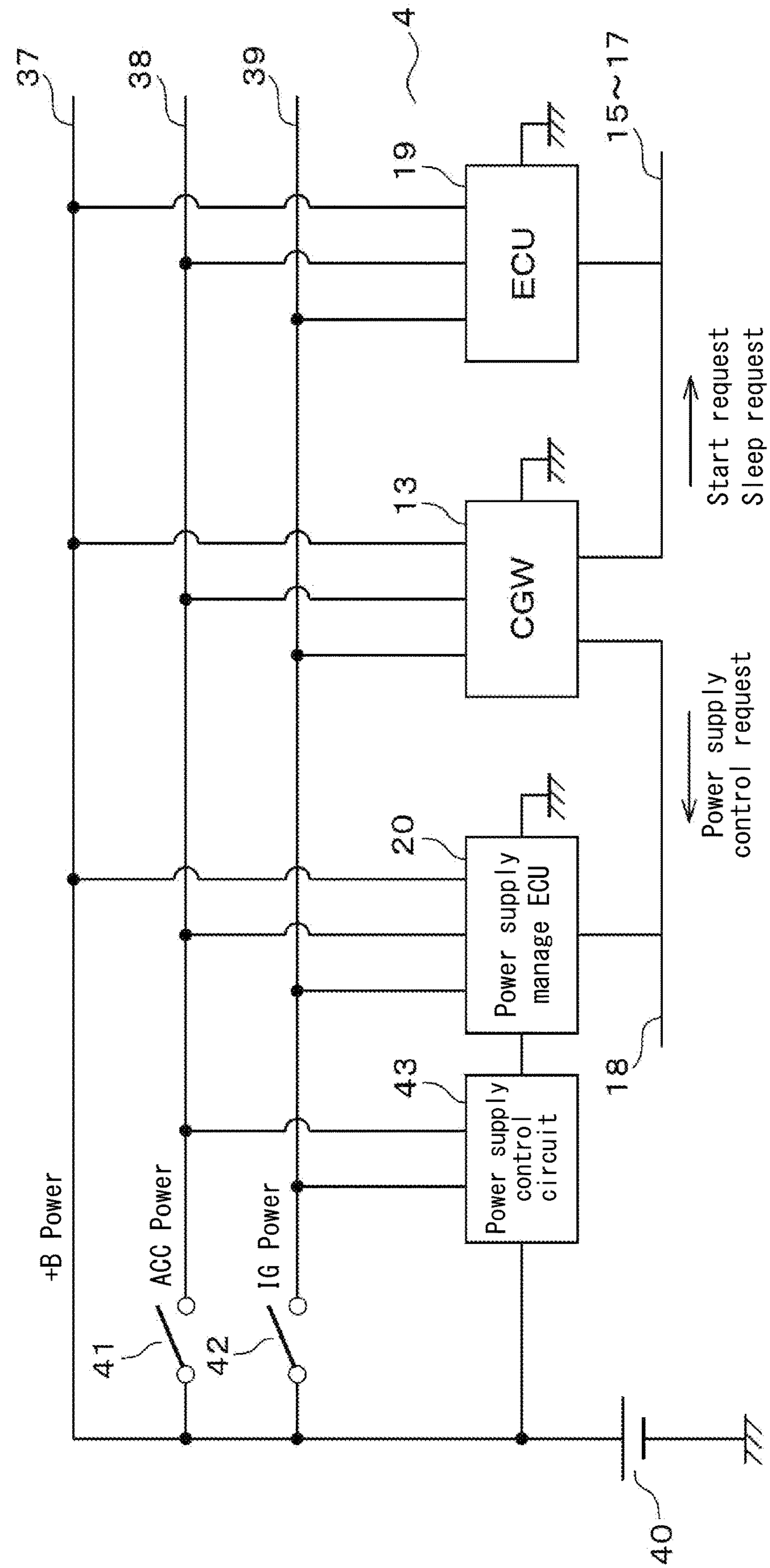
FIG. 5 is a diagram illustrating a connection aspect of a power line.

As illustrated in FIG. 5, the power supply management ECU 20, the CGW 13, and the ECU 19 are connected to a +B power line 37, an ACC power line 38, and an IG power line 39 that are power supply lines. The +B power line 37 is connected to a positive electrode of a vehicle battery 40. The ACC power line 38 is connected to the positive electrode of the vehicle battery 40 via an ACC switch 41. When the user performs an ACC operation, the ACC switch 41 switches from an OFF state to an ON state, and an output voltage of the vehicle battery 40 is applied to the ACC power line 38. For example, in a case of a vehicle of the type to insert a key into an insertion port, the ACC operation is an operation of rotating the key from an "OFF" position to an "ACC" position by inserting the key into the insertion port, and, in a case of a vehicle of the type to press a start button, the ACC operation is an operation of pressing the start button once.

The IG power line 39 is connected to the positive electrode of the vehicle battery 40 via an IG switch 42. When the user performs an IG operation, the IG switch 42 switches from an OFF state to an ON state, and an output voltage of the vehicle battery 40 is applied to the IG power line 39. For example, in a case of a vehicle of the type to insert a key into an insertion port, the IG operation is an operation of rotating the key from an "OFF" position to an "ON" position by inserting the key into the insertion port, and, in a case of a vehicle of the type to press a start button, the IG operation is an operation of pressing the start button twice. A negative electrode of the vehicle battery 40 is grounded.

When both of the ACC switch 41 and the IG switch 42 are in an OFF state, only the +B power is supplied to the vehicle-side system 4. The state in which only the +B power is supplied to the vehicle-side system 4 will be referred to as a +B power supply state. When the ACC switch 41 is in an ON state and the IG switch 42 is in an OFF state, the ACC power and the +B power are supplied to the vehicle-side system 4. The state in which the ACC power and the +B power are supplied to the vehicle-side system 4 will be referred to as an ACC power supply state. When of both the ACC switch 41 and the IG switch 42 are in an ON state, the +B power, the ACC power, and the IG power are supplied to the vehicle-side system 4. The state in which the +B power, the ACC power, and the IG power are supplied to the vehicle-side system 4 will be referred to as an IG power supply state. In addition to each of the above-described power supply states, a power supply state or the like for providing power suitable for program update in a wireless manner is also conceivable.

The ECUs 19 have different start conditions depending on power supply states, and are classified as a +B power ECU that is started in the +B power supply state, an ACC ECU that is started in the ACC power supply state, and an IG ECU that is started in the IG power supply state. For example, the ECU 19 driven in an application such as vehicle theft is classified as the +B power ECU. For example, the ECU 19 driven in a non-traveling application such as an audio is classified as the ACC ECUs. For example, the ECU 19 driven in a traveling application such as engine control is classified as the IG ECU.

The +B power ECU is connected to the +B power line 37, the ACC power line 38, and the IG power line 39, and is configured to select the +B power line 37 in the +B power supply state, select the ACC power line 38 in the ACC power supply state, and select the IG power line 39 in the IG power supply state. The ACC ECU is connected to the ACC power line 38 and the IG power line 39, and is configured to select the ACC power line 38 in the ACC power supply state, and select the IG power line 39 in the IG power supply state. The IG ECU is connected to the IG power line 39.

The CGW 13 transmits a start request to the ECU 19 that is in a sleep state, and thus causes the ECU 19 that is a transmission destination of the start request to transition from the sleep state to an active state. The CGW 13 also transmits a sleep request to the ECU 19 that is in an active state, and thus causes the ECU 19 that is a transmission destination of the sleep request to transition from the active state to a sleep state. The CGW 13 can cause a specific ECU 19 to transition to an active state or a sleep state, for example, by making waveforms of the transmission signals to be transmitted to the buses 15 to 17 different from each other. That is, a start request waveform and a sleep request waveform are predefined for each ECU 19, and the ECU 19 transitions from the sleep state to the active state when a start request waveform conforming thereto is received, and transitions from the active state to the sleep state when a sleep request waveform conforming thereto is received from the CGW 13.

For example, in a case where an ECU (ID1) and an ECU (ID2) are in the active state, the CGW 13 transmits a first waveforms, and thus causes the ECU (ID1) to transition from the active state to the sleep state and maintains the ECU (ID2) in the active state. In a case where the ECU (ID1) and the ECU (ID2) are in the active state, the CGW 13 transmits a second waveform, and thus maintains the ECU (ID1) in the active state and causes the ECU (ID2) to transition from the active state to the sleep state.

The power supply control circuit 43 is connected in parallel to the ACC switch 41 and the IG switch 42. The CGW 13 transmits a power supply control request to the power supply management ECU 20 and causes the power supply management ECU 20 to control the power supply control circuit 43. That is, the CGW 13 transmits a power supply start request as the power supply control request to the power supply management ECU 20, to connect the ACC power line 38 or the IG power line 39 to the positive electrode of the vehicle battery 40 in the power supply control circuit 43. In this state, the ACC power or IG power is supplied to the vehicle-side system 4 even though the ACC switch 41 or the IG switch 42 is turned off. The CGW 13 transmits a power supply stop request as the power supply control request to the power supply management ECU 20, to disconnect the ACC power line 38 or IG power line 39 from the positive electrode of the vehicle battery 40 in the power supply control circuit 43.

Each of the DCM 12, the CGW 13, the ECU 19, and the power supply management ECU 20 has a self-retention power circuit, and has a self-retention power function of retaining power supplied from the vehicle battery 40. That is, when vehicle power switches from the ACC power or the IG power to the +B power in the active state, the DCM 12, the CGW 13, the ECU 19, and the power supply management ECU 20 do not transition from the active state to the stop state or the sleep state immediately after the switching, but continue the active state for a predetermined time (for example, a few minutes) with power supplied from the vehicle battery 40 and thus self-retain drive power. The DCM 12, the CGW 13, the ECU 19, and the power supply management ECU 20 transition from the active state to the stop state or the sleep state when a predetermined time has elapsed immediately after the vehicle power switches from the ACC power or IG power to the +B power. For example, in the ECU 19 of the engine control system, the self-retention power function is activated after the vehicle power switches from the ACC power or the IG power to the +B power, and thus stores various pieces of data regarding the engine control acquired during traveling of the vehicle as a log.

Figure 6:
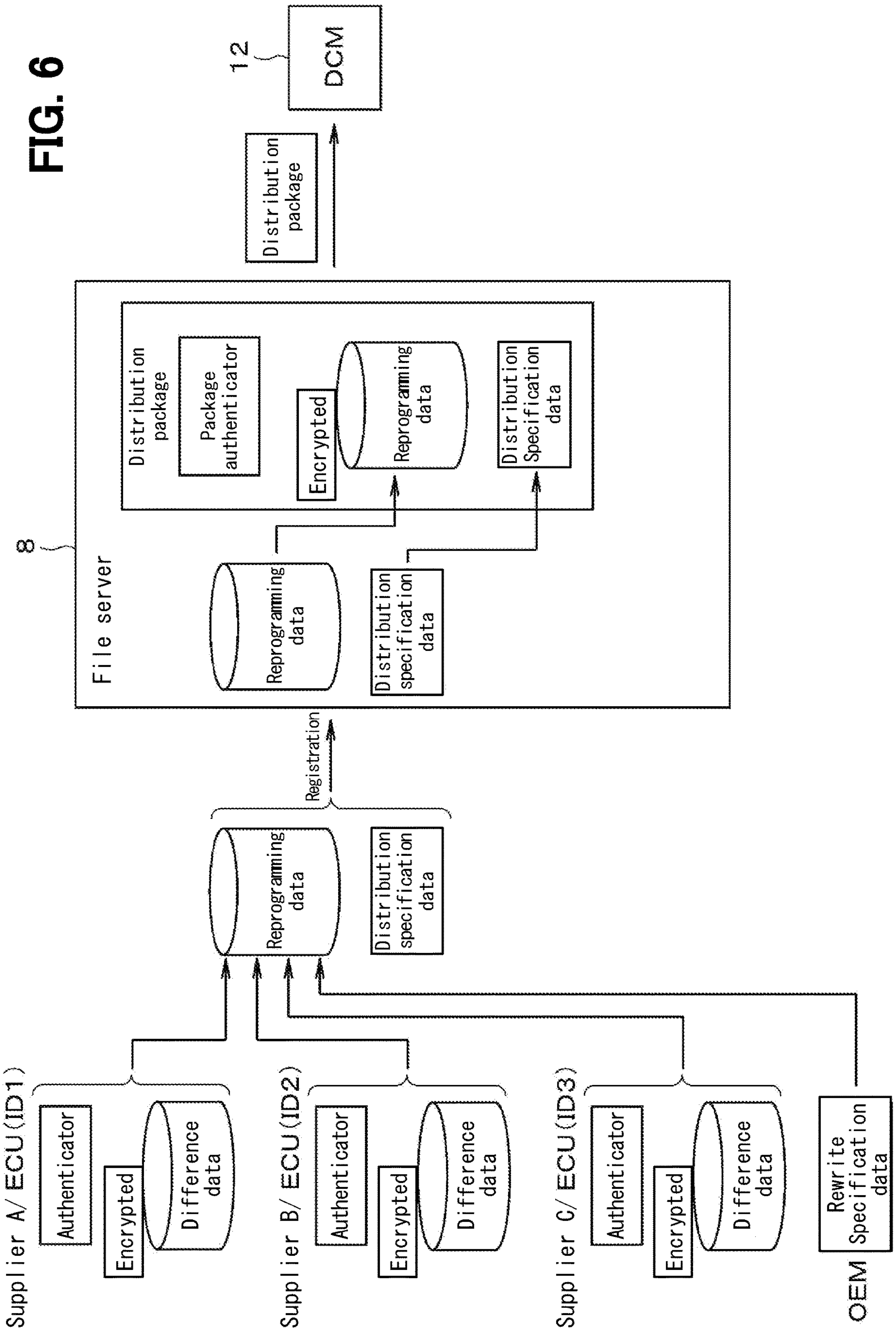
FIG. 6 is a diagram illustrating an aspect of packaging reprogramming data and distribution specification data.

Next, a distribution package distributed from the center device 3 to the master device 11 will be described. As illustrated in FIG. 6, in the vehicle program rewriting system 1, reprogramming data including write data provided from a supplier as a provider of an application program and rewrite specification data (corresponding to specification data) provided from an OEM is generated. The rewrite specification data may be generated by the center device 3. The write data provided from the supplier includes difference data corresponding to a difference between an old application program and a new application program, and the entire data corresponding to the whole of the new application program. The difference data or the entire data may be compressed by using a well-known data compression technique. FIG. 6 exemplifies a case where difference data is provided as write data from suppliers A to C, and reprogramming data is generated from encrypted difference data and an authenticator of the ECU (ID1) provided from the supplier A, encrypted difference data and an authenticator of the ECU (ID2) provided from the supplier B, and encrypted difference data and an authenticator of the ECU (ID3) provided from the supplier C, and rewrite specification data provided from the OEM.

The authenticator is data added to each piece of write data in order to verify the integrity of the difference data, and is generated from, for example, an ECU (ID), key information linked to the ECU (ID), and difference data. Here, write data for rollback to an old version may be included in the reprogramming data in preparation for a case where rewriting of an application program is cancelled halfway.

The rewrite specification data provided from the OEM includes, as information related to rewriting of the application program, information for specifying the rewrite target ECU 19, information for specifying a rewrite order when there are a plurality of rewrite target ECUs 19, information for specifying a rollback method described later, and the like. The rewrite specification data is data defining an operation related to rewriting in the DCM 12, the CGW 13, the rewrite target ECU 19, and the like. The rewrite specification data is classified into DCM rewrite specification data used by the DCM 12 and CGW rewrite specification data used by the CGW 13.

As illustrated in FIG. 7, the DCM rewrite specification data includes specification data information and ECU information. The specification data information includes address information and a file name. The ECU information includes address information, or the like referenced when an update program (write data) of each rewrite target ECU 19 is transmitted to the CGW 13 by the number of rewrite target ECUs 19. Specifically, the ECU information includes at least an ID (ECU (ID)) for identifying an ECU, a reference address (update program acquisition address) for acquiring an update program, an update program size, a reference address (rollback program acquisition address) for acquiring a rollback program, and a rollback program size. The rollback program is a program (write data) for returning an application program to an original version when rewriting of the application program is canceled halfway.

As illustrated in FIG. 8, the CGW rewrite specification data includes group information, a bus load table, a battery load, a vehicle condition during rewriting, and ECU information. The CGW rewrite specification data may include rewrite procedure information, display scene information, and the like in addition to the information. The group information is information indicating a group to which the rewrite target ECU 19 belongs and a rewrite order, and defines that application programs are rewritten in an order of the ECU (ID1), the ECU (ID2), and the ECU (ID3) as first group information, and that application programs are rewritten in an order of an ECU (ID4), an ECU (ID5), and an ECU (ID6) as second group information, for example. The bus load table is a table illustrated in FIG. 100 which will be described later, and details thereof will be described later. The battery load is information indicating a lower limit value of a remaining battery charge of the vehicle battery 40 allowable in the vehicle. The vehicle condition during rewriting is information indicating in what kind of vehicle condition rewriting is performed.

The ECU information is information regarding the rewrite target ECU 19, and includes at least an ECU_ID (corresponding to device identification information), a connection bus (corresponding to bus identification information), a connection power supply, security access key information, a memory type, a rewrite method, a self-retention power time, rewrite bank information, an update program version, an update program acquisition address, an update program size, a rollback program version, a rollback program acquisition address, a rollback program size, and a write data type.

The connection bus indicates a bus to which the ECU 19 is connected. The connection power supply indicates a power line to which the ECU 19 is connected. The security access key information indicates key information used for authentication performed by the CGW 13 in order to access the rewrite target ECU 19, and includes a random number value or unique information, a key pattern, and a decryption operation pattern. The memory type indicates whether a memory mounted on the rewrite target ECU 19 is a single-bank memory, a single-bank suspend memory (also referred to as a pseudo-double-bank memory), or a double-bank memory. The rewrite method indicates whether the rewriting is performed on the basis of self-retention power or power supply control. The self-retention power time indicates a time for continuing the self-retention power when the rewrite method is rewriting based on self-retention power. The rewrite bank information indicates which bank is an active bank and which bank is an inactive bank. The active bank is also referred to as a start bank, and the inactive bank is also referred to as a rewrite bank.

The update program version indicates a version of an update program. The update program acquisition address indicates an address of the update program. The update program size indicates a data size of the update program. The rollback program version indicates a version of a rollback program. The rollback program acquisition address indicates an address of the rollback program. The rollback program size indicates a data size of the rollback program. The write data type indicates whether the write data is difference data or the entire data. In addition to these pieces of information, the rewrite specification data may include information uniquely defined by the system.

When the DCM rewrite specification data is acquired, the DCM 12 analyzes the acquired DCM rewrite specification data. When the DCM rewrite specification data is analyzed, the DCM 12 controls operations related to rewriting such as acquiring write data from an address in which an update program of the rewrite target ECU 19 is stored and transferring the acquired write data to the CGW 13.

When the CGW rewrite specification data is acquired, the CGW 13 analyzes the acquired CGW rewrite specification data. When the CGW rewrite specification data is analyzed, the CGW 13 controls operations related to rewriting such as requesting the DCM 12 to transfer a predetermined size of an update program of the rewrite target ECU 19 in accordance with the analysis result, or distributing the write data to the rewrite target ECU 19 in a designated order.

Figure 9:
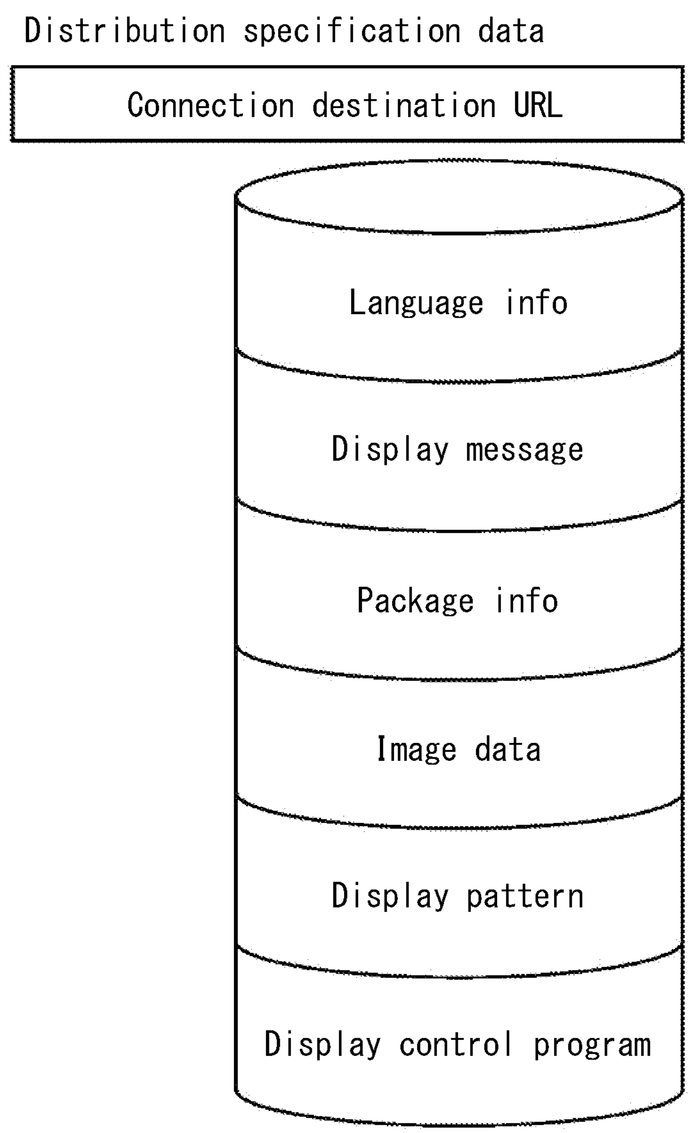

In the file server 8, the above-described reprogramming data is registered, and the distribution specification data provided from the OEM is registered. The distribution specification data provided from the OEM is data defining an operation related to display of various screens in the display terminal 5. As illustrated in FIG. 9, the distribution specification data includes language information, a display text, package information, image data, a display pattern, a display control program, and the like.

When the distribution specification data is acquired from the CGW 13, the display terminal 5 analyzes the acquired distribution specification data, and controls display of various screens according to the analysis result. For example, the display terminal 5 superimposes a display text acquired from the distribution specification data on a display frame stored in advance, and executes a display control program acquired from the distribution specification data. In addition to these pieces of information, the distribution specification data may include information uniquely defined by the system.

When the reprogramming data and the distribution specification data are registered, the file server 8 encrypts the registered reprogramming data, and generates a distribution package storing a package authenticator for authenticating the package, the encrypted reprogramming data, and the distribution specification data. The authenticator is data added to verify the integrity of the reprogramming data and the distribution specification data, and is generated from, for example, key information, the reprogramming data, and the distribution specification data linked to the CGW 13. When a download request for the distribution package is received from the outside, the file server 8 transmits the distribution package to the DCM 12. In FIG. 6, a case is exemplified in which the file server 8 generates the distribution package storing the reprogramming data and the distribution specification data and transmits the reprogramming data and the distribution specification data to the DCM 12 as a single file together, but the reprogramming data and the distribution specification data may be transmitted to the DCM 12 as separate files. That is, the file server 8 may transmit the distribution specification data to the DCM 12 first, and may transmit the reprogramming data to the DCM 12 later. In this case, an authenticator may be added to each of the distribution specification data and the reprogramming data.

Figure 10:
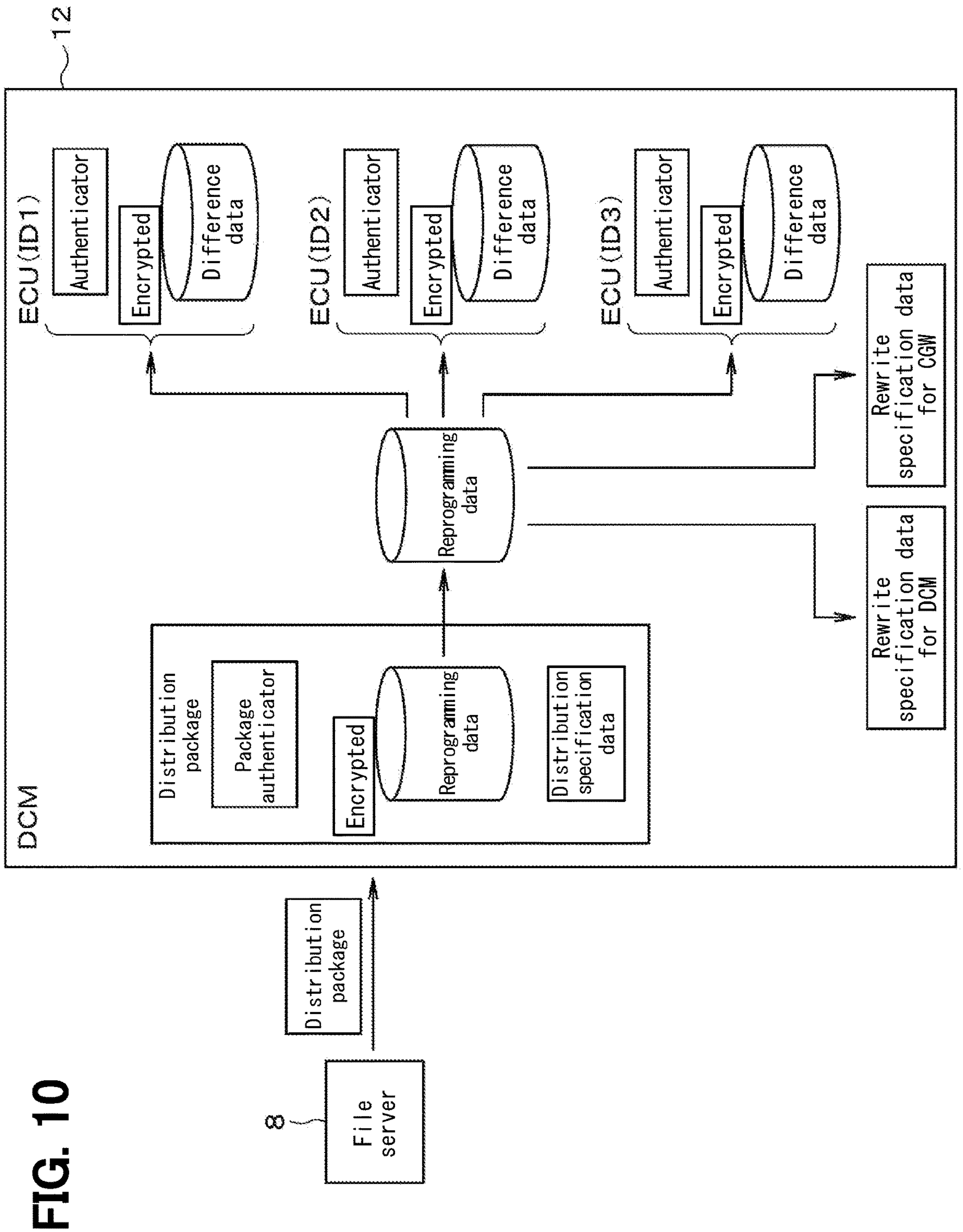
FIG. 10 is a diagram illustrating an aspect of unpackaging a distribution package.

As illustrated in FIG. 10, when the distribution package is downloaded from the file server 8, the DCM 12 verifies the integrity of the encrypted reprogramming data by using the package authenticator stored in the downloaded distribution package. The DCM 12 decrypts the encrypted reprogramming data when the verification result is positive. When the encrypted reprogramming data is decrypted, the DCM 12 unpacks (hereinafter, also referred to as unpackages) the decrypted reprogramming data, and divionally extracts the encrypted difference data, the authenticator, the DCM rewrite specification data, and the CGW rewrite specification data. FIG. 10 illustrates a case where the encrypted difference data and the authenticator of the ECU (ID1), the encrypted difference data and the authenticator of the ECU (ID2), the encrypted difference data and the authenticator of the ECU (ID3), the DCM rewrite specification data, and the CGW rewrite specification data are divisionally extracted.

Next, the flash memory **33*d* of the ECU 19 will be described with reference to FIGS. 11 to 22. The flash memory 33*d* of the ECU 19 is classified into a single-bank memory having a single flash bank, a single-bank suspend memory having pseudo-double flash banks, and a double-bank memory having double substantial flash banks depending on memory configurations. Thereafter, the ECU 19 equipped with the single-bank memory will be referred to as the single-bank memory ECU, the ECU 19 equipped with the single-bank suspend memory will be referred to as a single-bank suspend memory ECU, and the ECU 19** equipped with the double-bank memory will be referred to as a double-bank memory ECU.

Since the single-bank memory has a single flash bank, there is no concept of an active bank and an inactive bank, and an application program cannot be rewritten while the application program is being executed. On the other hand, since the single-bank suspend memory or the double-bank memory has double flash banks, there is a concept of an active bank and an inactive bank, and an application program in the inactive bank can be rewritten while the application program in the active bank is being executed. Since the double-bank memory has double flash banks that are completely separated from each other, an application program can be rewritten at any timing, for example, when the vehicle is traveling. Since the single-bank suspend memory has a configuration in which the single-bank memory is divided into pseudo-double banks, there are restrictions on a timing at which reading and writing can be normally performed, and an application program cannot be rewritten while the vehicle is traveling, and the application program can be rewritten while the IG power is turned off and the vehicle is parked.

Each of the single-bank memory, the single-bank suspend memory, and the double-bank memory includes a reprogramming firmware embedded type (hereinafter, referred to as the embedded type) in which reprogramming firmware is embedded, and a reprogramming firmware download type (hereinafter, referred to as the download type) in which the reprogramming firmware is downloaded from the outside. The reprogramming firmware is firmware for rewriting an application program.

A configuration of each flash memory will be described below in order.

(A) Single-Bank Memory (A-1) Embedded Type Single-Bank Memory

The embedded type single-bank memory will be described with reference to FIGS. 11 and 12. The embedded type single-bank memory has a difference engine work area, an application program area, and a boot program area. Version information, parameter data, an application program, firmware, and a normal time vector table are located in the application program area. A boot program, a progress state point 2, a progress state point 1, start determination information, wireless reprogramming firmware, wired reprogramming firmware, a start determination program, and a boot time vector table are located in the boot area.

Figure 11:
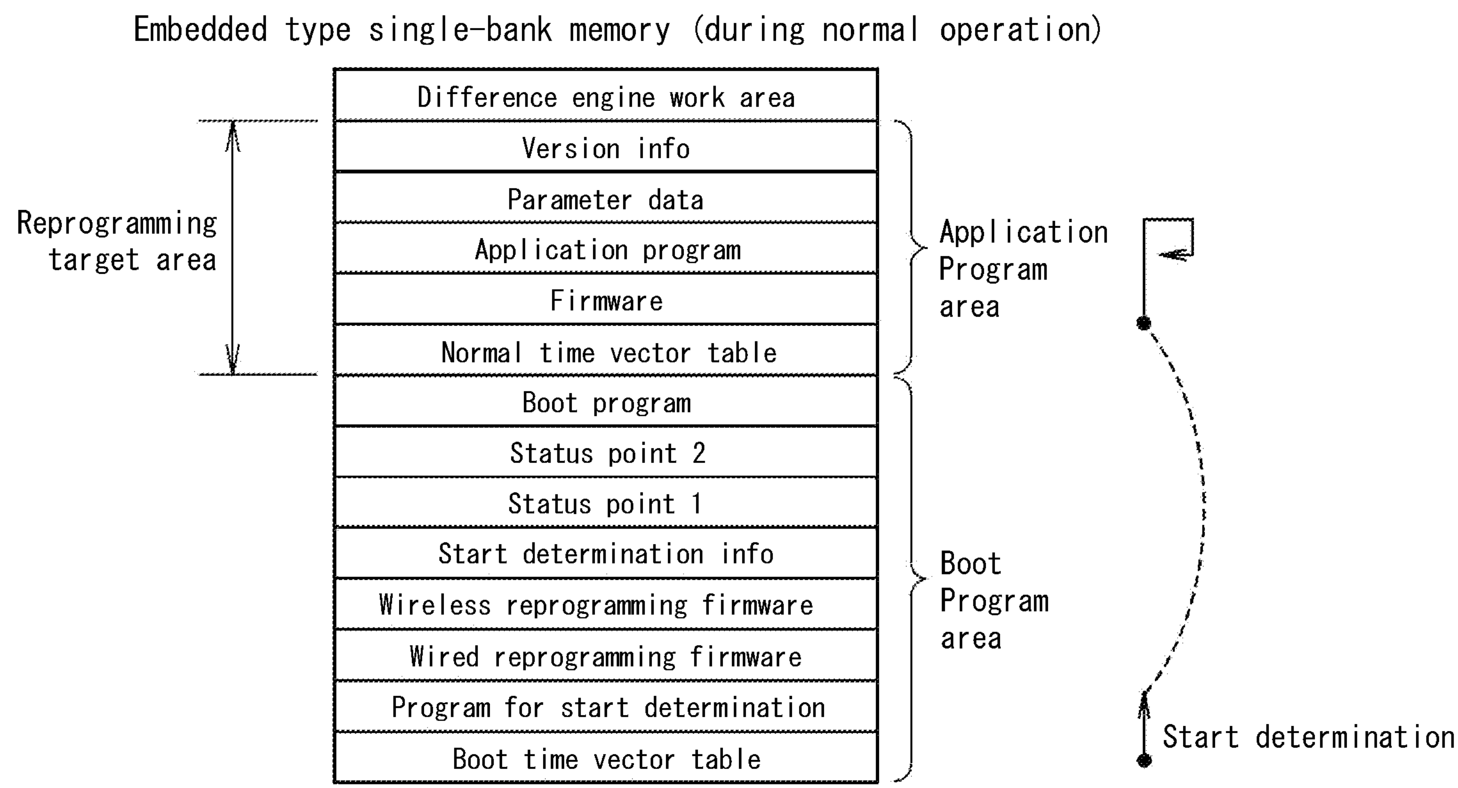
FIG. 11 is a diagram illustrating an aspect during a normal operation in an embedded type single-bank memory.
Figure 12:
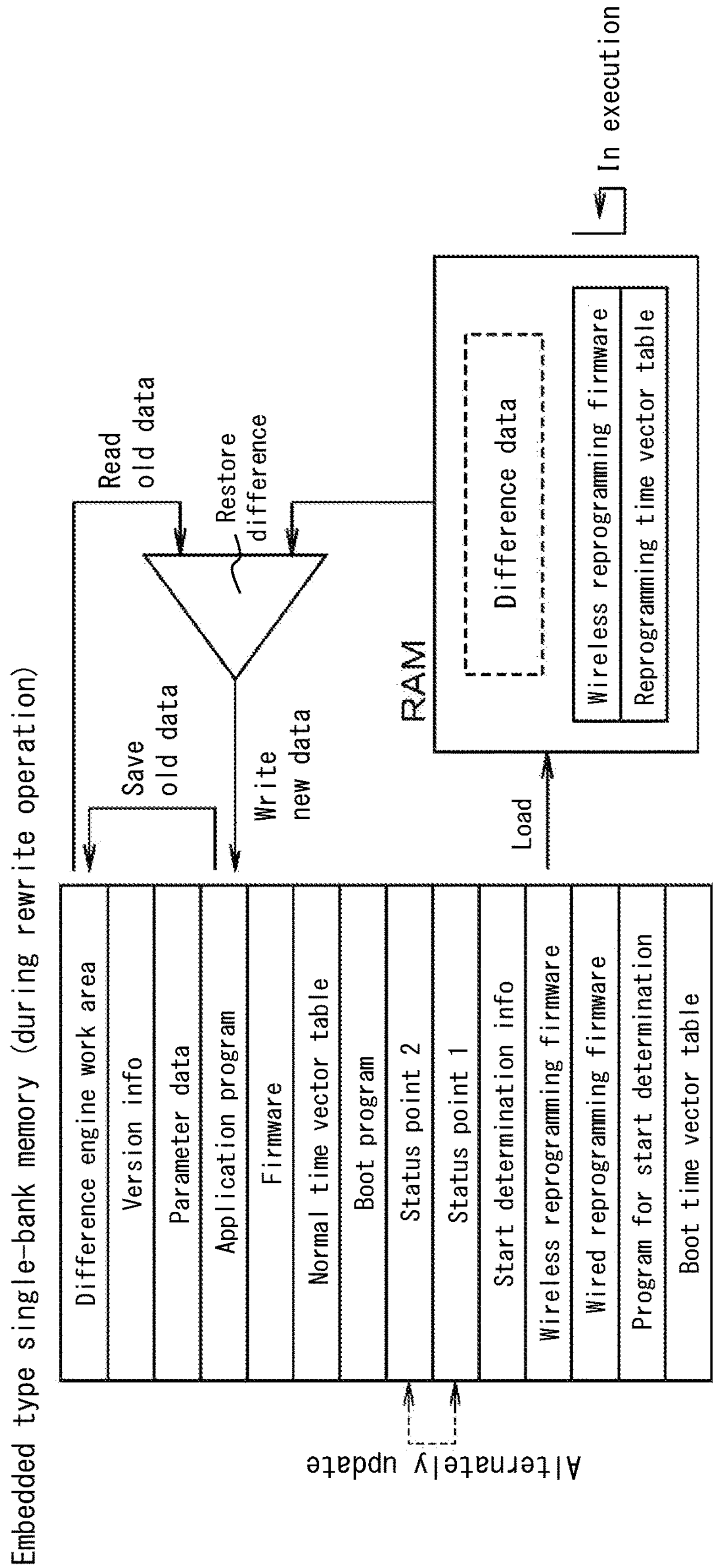
FIG. 12 is a diagram illustrating an aspect during a rewrite operation in the embedded type single-bank memory.

As illustrated in FIG. 11, during a normal operation of executing application processes such as a vehicle control process and a diagnosis process, the microcomputer 33 executes the start determination program, refers to the boot time vector table and the normal time vector table to search for a leading address, and executes a predetermined address of an application program.

The microcomputer 33 executes the wireless or wired reprogramming firmware instead of the application program in a rewrite operation of executing a rewrite process on the application program. FIG. 12 illustrates an operation of rewriting an application program by using difference data as an update program. As illustrated in FIG. 12, the microcomputer 33 temporarily saves the application program as old data into the difference engine work area. The microcomputer 33 reads the old data temporarily saved in the difference engine work area, and restores new data from the read old data and the difference data stored in the RAM **33*c* by using a difference engine included in the embedded reprogramming firmware. When the new data is generated from the old data and the difference data, the microcomputer 33** writes the new data to a predetermined address of the memory to rewrite the application program.

(A-2) Download Type Single-Bank Memory

The download type single-bank memory will be described with reference to FIGS. 13 and 14. The download type differs from the embedded type described above in that the wireless reprogramming firmware or the wired reprogramming firmware is downloaded from the outside, the application program is rewritten, and then the wireless reprogramming firmware or the wired reprogramming firmware is deleted. When the application program is updated wirelessly, for example, the wireless reprogramming firmware to be executed in each the ECU 19 is included in the reprogramming data illustrated in FIG. 6. The ECU 19 receives wireless reprogramming firmware for use only by the ECU from the CGW 13, and stores the received wireless reprogramming firmware for use only by the ECU into the RAM.

Figure 13:
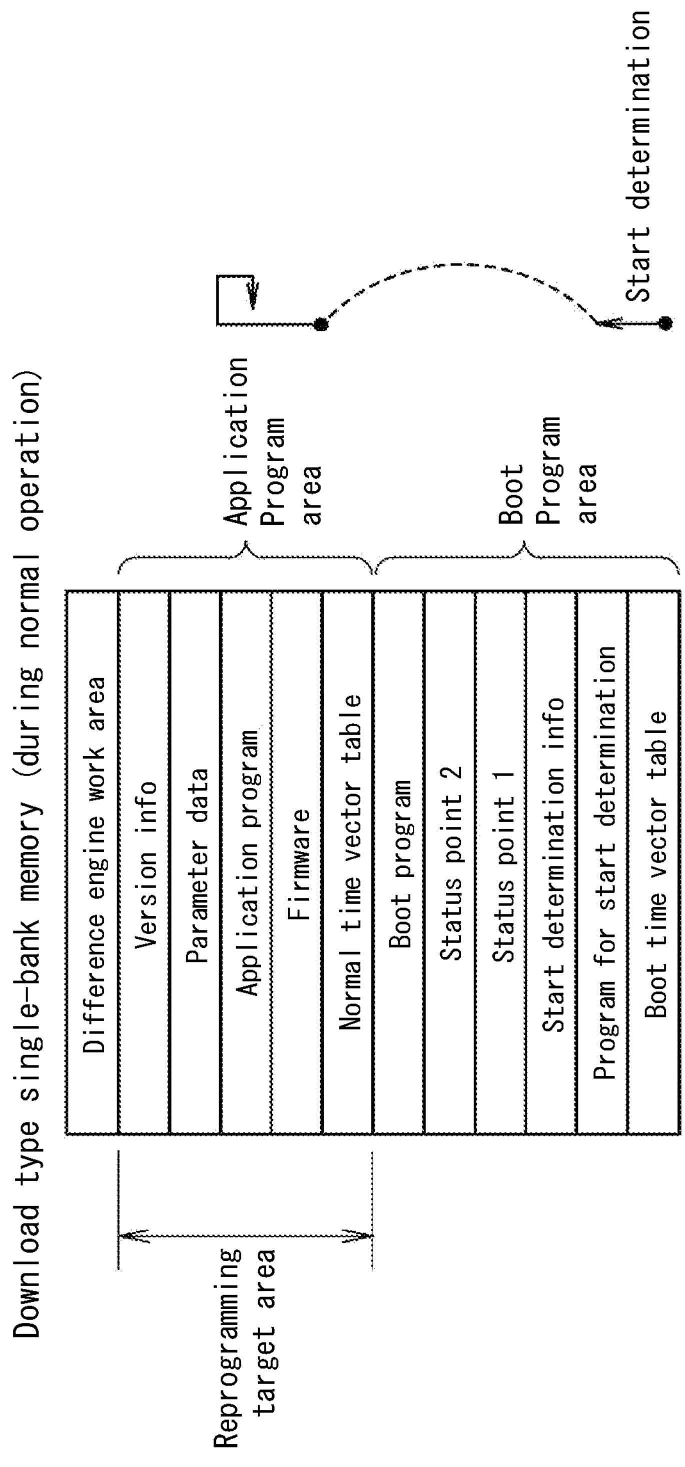
FIG. 13 is a diagram illustrating an aspect during a normal operation in a download type single-bank memory.

As illustrated in FIG. 13, during a normal operation of executing application processes such as a vehicle control process and a diagnosis process, in the same manner as in the embedded type, the microcomputer 33 executes the start determination program, refers to the boot time vector table and the normal time vector table to search for a leading address, and executes a predetermined address of an application program.

Figure 14:
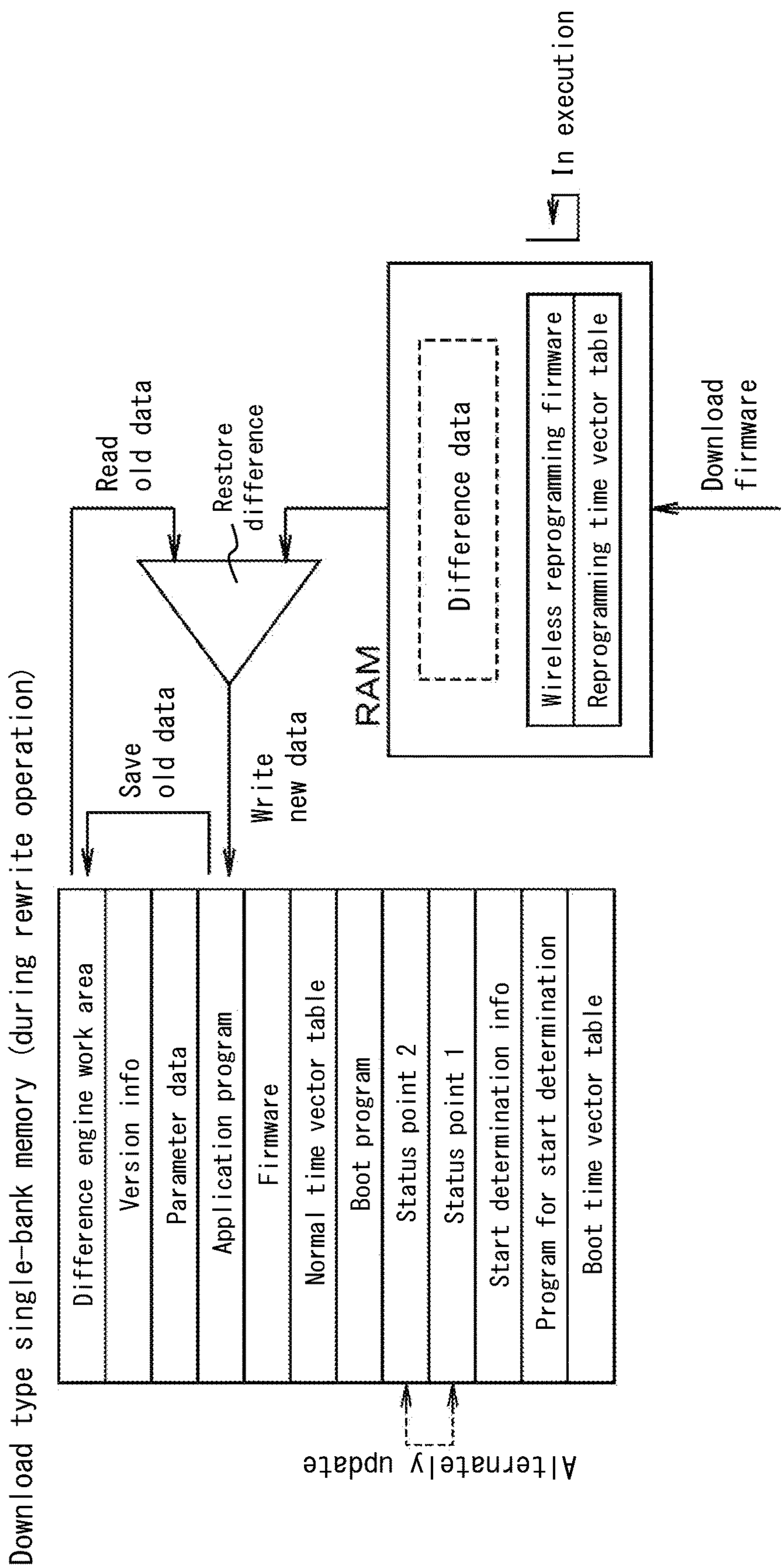
FIG. 14 is a diagram illustrating an aspect during a rewrite operation in the download type single-bank memory.

As illustrated in FIG. 14, the microcomputer 33 temporarily saves the application program as old data into the difference engine work area during a rewrite operation of executing a rewrite process on the application program. The microcomputer 33 reads the old data temporarily saved in the difference engine work area, and restores new data from the read old data and the difference data stored in the RAM 33*c* by using difference engine included in the reprogramming firmware downloaded from the outside. When the new data is generated from the old data and the difference data, the microcomputer 33 writes the new data to rewrite the application program.

(B) Single-Bank Suspend Memory (B-1) Embedded Type Single-Bank Suspend Memory

The embedded type single-bank suspend memory will be described with reference to FIGS. 15 and 16. The embedded type single-bank suspend memory has a difference engine work area, an application program area, and a boot program area. Reprogramming firmware for updating a program is located in the boot program area in the same manner as in the single-bank memory, and is not subjected to program update. The application program area that is a program update target has pseudo-bank-A and bank-B, and version information, an application program, and a normal time vector table are located in each of the bank-A and the bank-B. A boot program, reprogramming firmware, a reprogramming time vector table, an active bank determination function, active bank determination information, and a boot time vector table are located in the boot area.

Figure 15:
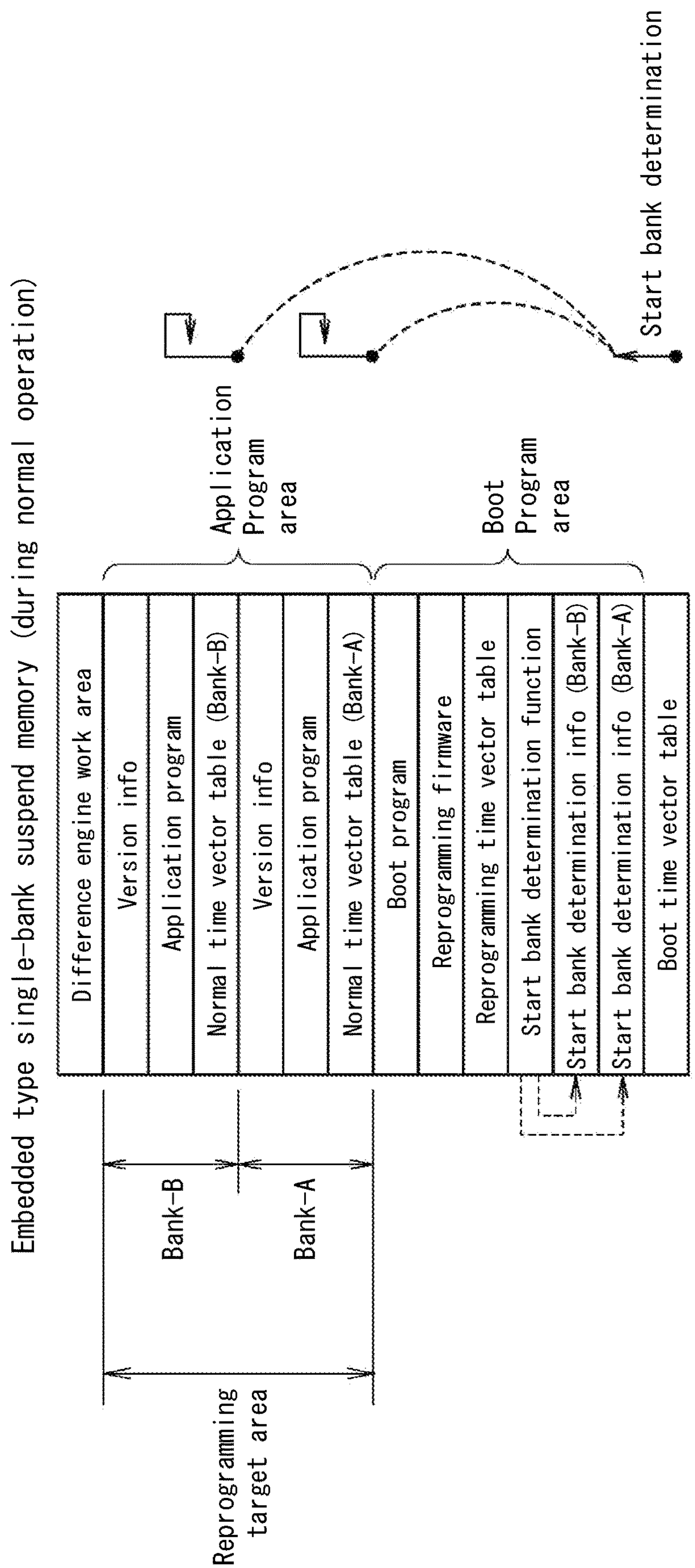
FIG. 15 is a diagram illustrating an aspect during a normal operation in an embedded type single-bank suspend memory.

As illustrated in FIG. 15, during a normal operation of executing application processes such as a vehicle control process and a diagnosis process, the microcomputer 33 executes the boot program to determine which of the bank-A and the bank-B is an active bank on the basis of the active bank determination information of the bank-A and the bank-B according to the active bank determination function. When it is determined that the bank-A is an active bank, the microcomputer 33 refers to the normal time vector table of the bank-A to search for a leading address and executes the application program of the bank-A. Similarly, when it is determined that the bank-B is an active bank, the microcomputer 33 refers to the normal time vector table of the bank-B to search for a leading address and executes the application program of the bank-B. In FIG. 15, although the reprogramming firmware is located in the boot program area, the reprogramming firmware may also be subjected to program update and located in each area of the bank-A or the bank-B.

Figure 16:
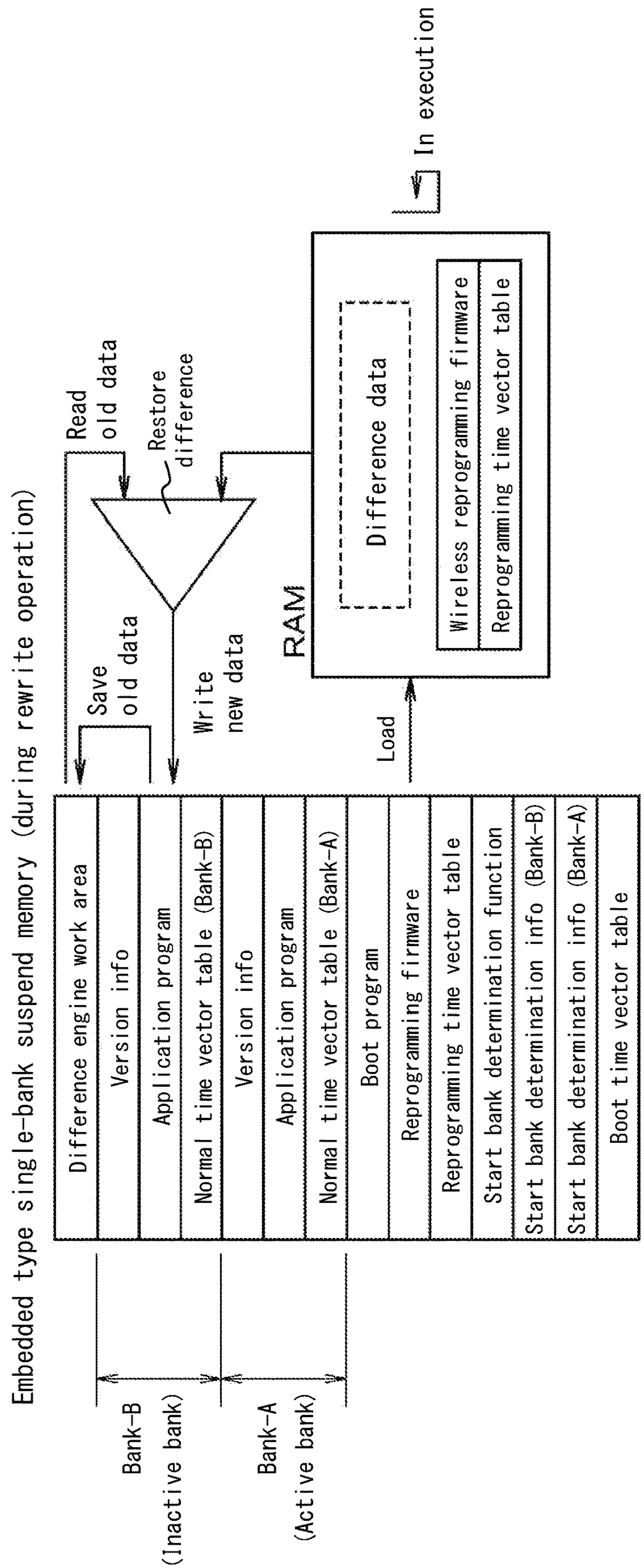
FIG. 16 is a diagram illustrating an aspect during a rewrite operation in the embedded type single-bank suspend memory.

As illustrated in FIG. 16, during a rewrite operation of executing a rewrite process on an application program of an inactive bank, the microcomputer 33 temporarily saves the application program of the inactive bank as old data into the difference engine work area. The microcomputer 33 reads the old data temporarily saved in the difference engine work area, and restores new data from the read old data and the difference data stored in the RAM 33*c* by using a difference engine in the embedded type reprogramming firmware. When the new data is generated from the old data and the difference data, the microcomputer 33 writes the new data into the inactive bank to rewrite the application program of the inactive bank. FIG. 16 exemplifies a case where the bank-A is an active bank and the bank-B is an inactive bank.

(B-2) Download Type Single-Bank Suspend Memory

The download type single-bank suspend memory will be described with reference to FIGS. 17 and 18. The download type differs from the embedded type described above in that reprogramming firmware and a reprogramming time vector table are downloaded from the outside, an application program is rewritten, and then the reprogramming firmware and the reprogramming time vector table are deleted.

Figure 17:
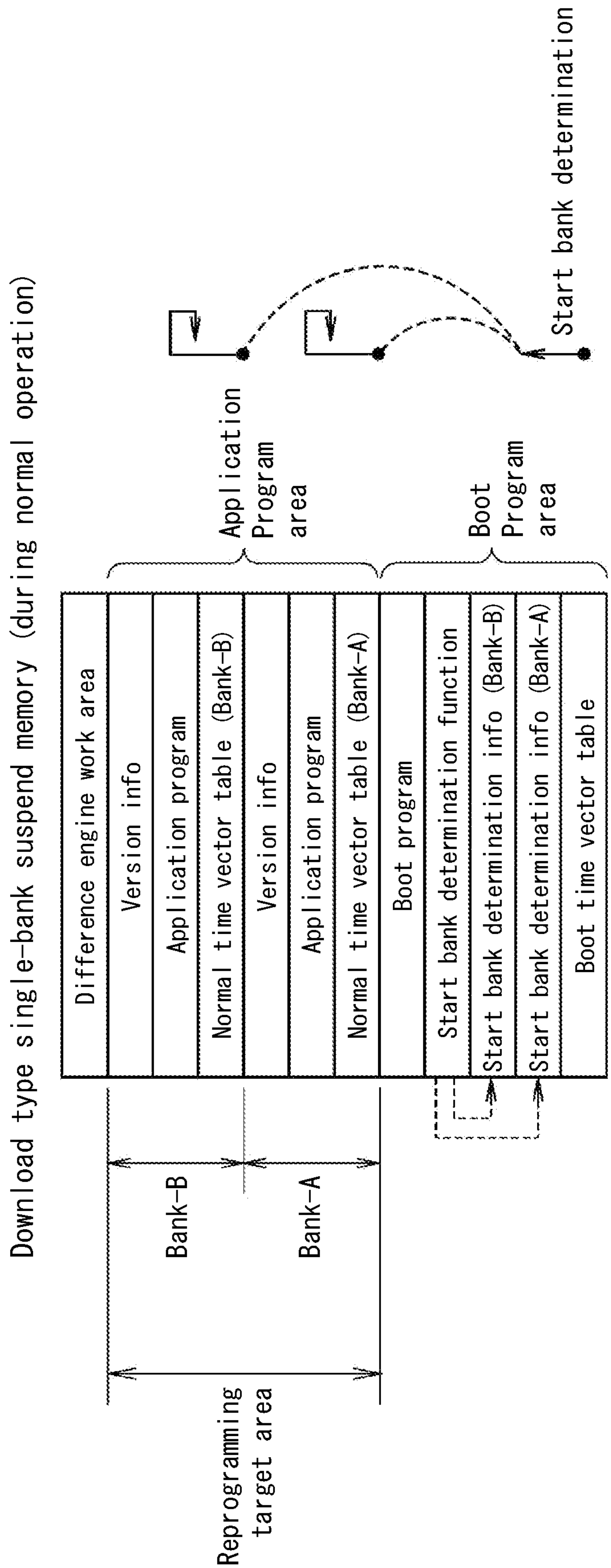
FIG. 17 is a diagram illustrating an aspect during a normal operation in a download type single-bank suspend memory.

As illustrated in FIG. 17, during a normal operation of executing application processes such as a vehicle control process and a diagnosis process, in the same manner as the embedded type, the microcomputer 33 executes the boot program to determine whether the application program is new or old on the basis of the active bank determination information of each of the bank-A and the bank-B according to the active bank determination function, and determines which of the bank-A and the bank-B is an active bank. When it is determined that the bank-A is an active bank, the microcomputer 33 refers to the normal time vector table of the bank-A to search for a leading address and executes the application program of the bank-A. Similarly, when it is determined that the bank-B is an active bank, the microcomputer 33 refers to the normal time vector table of the bank-B to search for a leading address and executes the application program of the bank-B.

Figure 18:
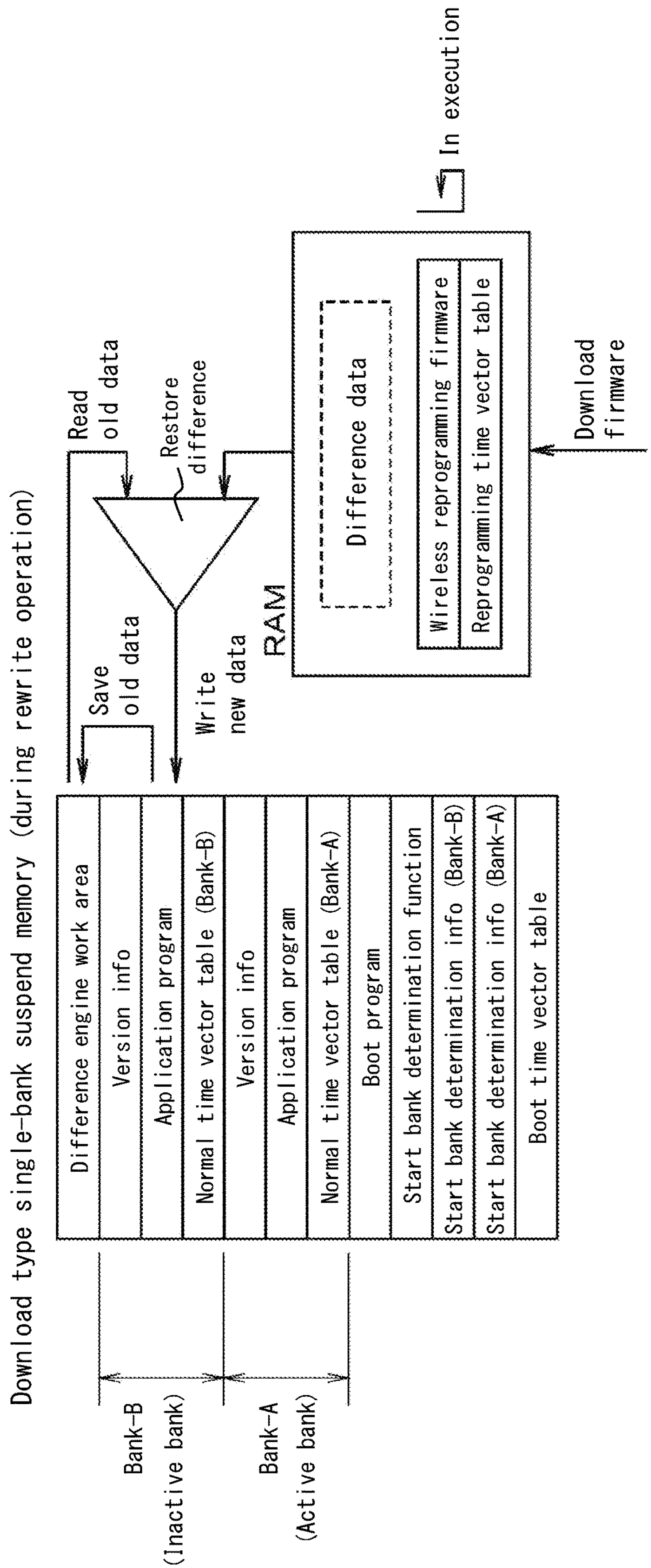
FIG. 18 is a diagram illustrating an aspect during a rewrite operation in the download type single-bank suspend memory.

As illustrated in FIG. 18, during a rewrite operation of executing a rewrite process on an application program, the microcomputer 33 temporarily saves the application program of the inactive bank as old data into the difference engine work area. The microcomputer 33 reads the old data temporarily saved in the difference engine work area, and restores new data from the read old data and the difference data stored in the RAM 33*c* by using a difference engine in the reprogramming firmware downloaded from the outside. When the new data is generated from the old data and the difference data, the microcomputer 33 writes the new data to rewrite the application program. FIG. 18 exemplifies a case where the bank-A is an active bank and the bank-B is an inactive bank. As described above, in the single-bank suspend memory, rewriting of the application program of the bank-B can be executed on the background while executing the application program of the bank-A.

(C) Double-Bank Memory (C-1) Embedded Type Double-Bank Memory

Figure 19:
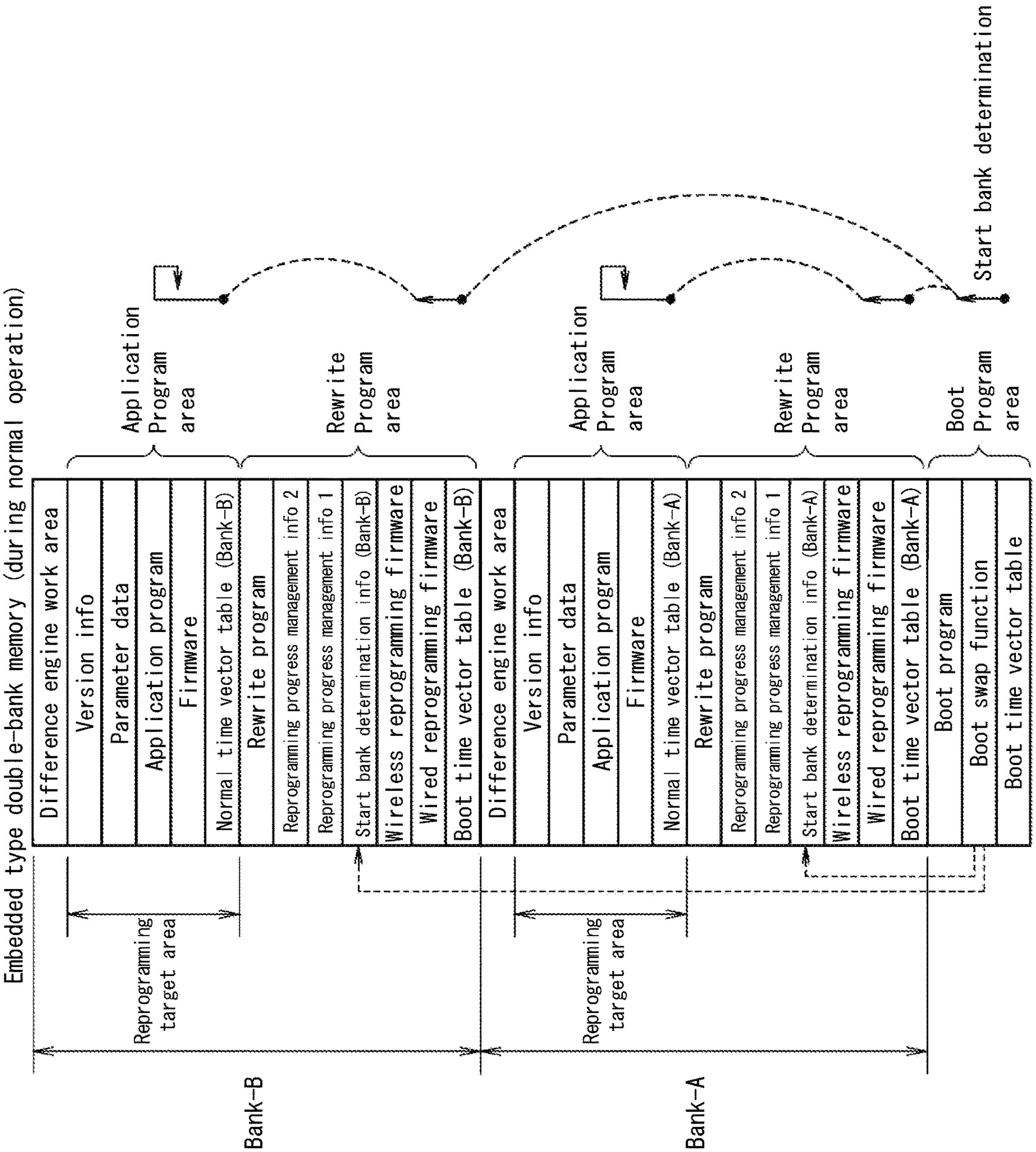
FIG. 19 is a diagram illustrating an aspect during a normal operation in an embedded type double-bank memory.

The embedded type double-bank memory will be described with reference to FIGS. 19 and 20. The embedded type single-bank memory includes an application program area and a rewrite program area of the bank-A, an application program area and a rewrite program area of the bank-B, and a boot program area. A boot program is located in the boot area as non-rewritable. The boot program includes a boot swap function and a boot time vector table. Version information, parameter data, an application program, firmware, and a normal time vector table are located in each application program area. A program for controlling rewriting, reprogramming progress management information 2, reprogramming progress management information 1, active bank determination information, wireless reprogramming firmware, wired reprogramming firmware, and a boot time vector table are located in each rewrite program area. A boot program, a boot swap function, and a boot time vector table are located in the boot area. As illustrated in FIG. 19, during a normal operation of executing application processes such as a vehicle control process and a diagnosis process and during a rewrite operation of executing a rewrite process on an application program of an inactive bank, the microcomputer 33 executes the boot program to determine whether the application program is new or old according to the boot swap function on the basis of each of the active bank determination information of the bank-A and the bank-B, and determines which of the bank-A and the bank-B is an active bank. When it is determined that the bank-A is an active bank, the microcomputer 33 refers to the boot time vector table of the bank-A and the normal time vector table of the bank-A to search for a leading address and executes the application program of the bank-A. Similarly, when it is determined that the bank-B is an active bank, the microcomputer 33 refers to the boot time vector table of the bank-B and the normal time vector table of the bank-B to search for a leading address and executes the application program of the bank-B.

Figure 20:
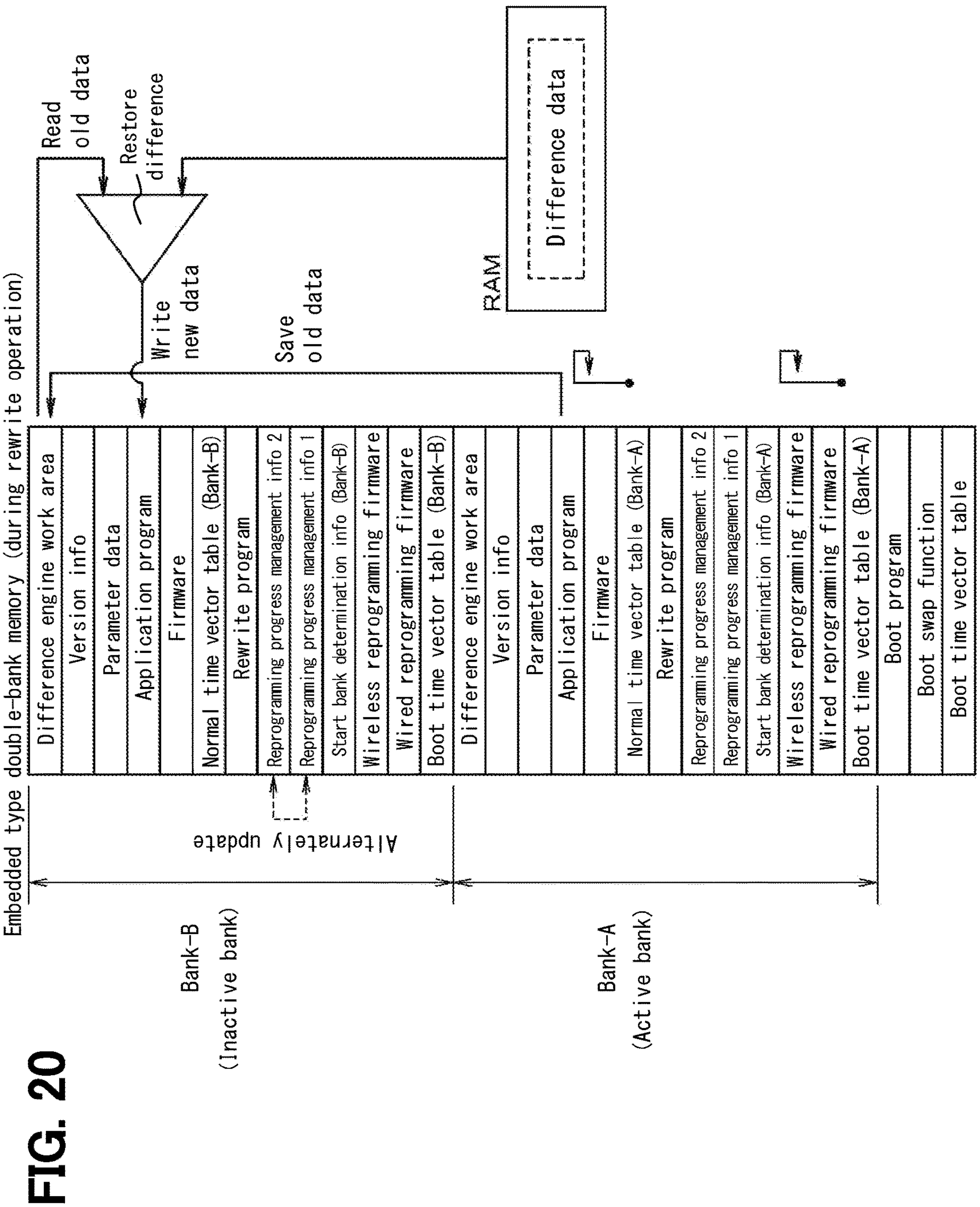
FIG. 20 is a diagram illustrating an aspect during a rewrite operation in the embedded type double-bank memory.

As illustrated in FIG. 20, during a rewrite operation of executing a rewrite process on an application program of an inactive bank, the microcomputer 33 temporarily saves the application program of the inactive bank as old data into the difference engine work area. The microcomputer 33 reads the old data temporarily saved in the difference engine work area, and restores new data from the read old data and the difference data stored in the RAM 33*c* by using a difference engine in the embedded type reprogramming firmware. When the new data is generated from the old data and the difference data, the microcomputer 33 writes the new data into the inactive bank to rewrite the application program of the inactive bank. Old data temporarily saved in the difference engine work area may be an application program of an active bank or an application program of an inactive bank. In this case, in a case where the application program of the active bank is a target, data of the inactive bank is deleted before writing new data. Here, in a case where reprogramming data acquired from the outside of the vehicle is not difference data but entire data (full data), the acquired reprogramming data is written as new data to the inactive bank. FIG. 20 exemplifies a case where the bank-A is an active bank and the bank-B is an inactive bank. Old data temporarily saved in the difference engine work area may be an application program of an active bank or an application program of an inactive bank. In a case where it is necessary to match execution addresses of the application programs with each other, the application program of the inactive bank is saved as old data.

(C-2) Download Type Double-Bank Memory

The download type double-bank memory will be described with reference to FIGS. 21 and 22. The download type differs from the embedded type described above in that the wireless reprogramming firmware or the wired reprogramming firmware is downloaded from the outside, the application program is rewritten, and then the wireless reprogramming firmware or the wired reprogramming firmware is deleted.

Figure 21:
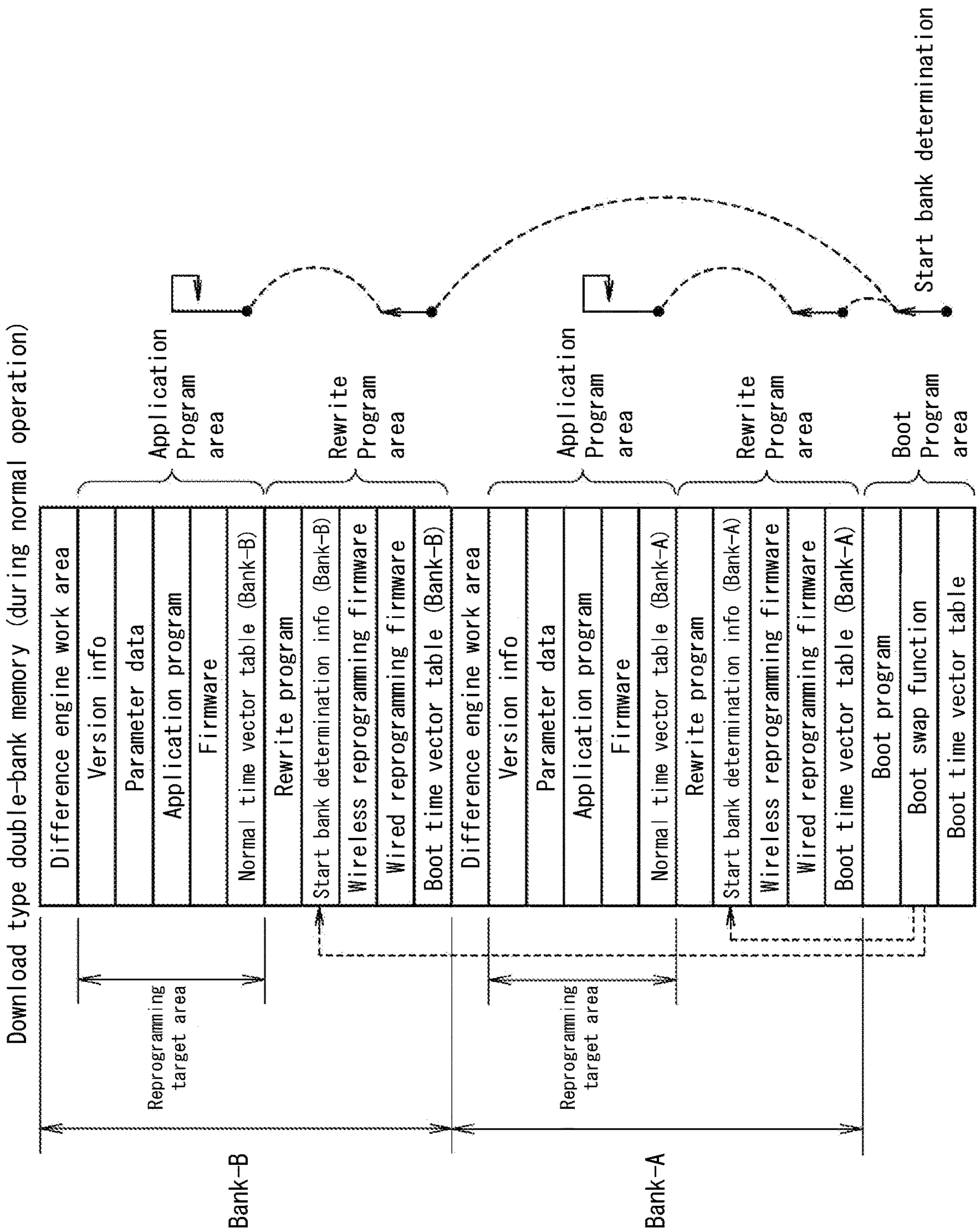
FIG. 21 is a diagram illustrating an aspect during a normal operation in a download type double-bank memory.

As illustrated in FIG. 21, during a normal operation of executing application processes such as a vehicle control process and a diagnosis process and during a rewrite operation of executing a rewrite process on an application program of an inactive bank, in the same manner as in the embedded type, the microcomputer 33 executes the boot program to determine whether the application program is new or old according to the boot swap function on the basis of each of the active bank determination information of the bank-A and the bank-B and to determine which of the bank-A and the bank-B is an active bank, and executes an application program of the active bank to execute an application process.

Figure 22:
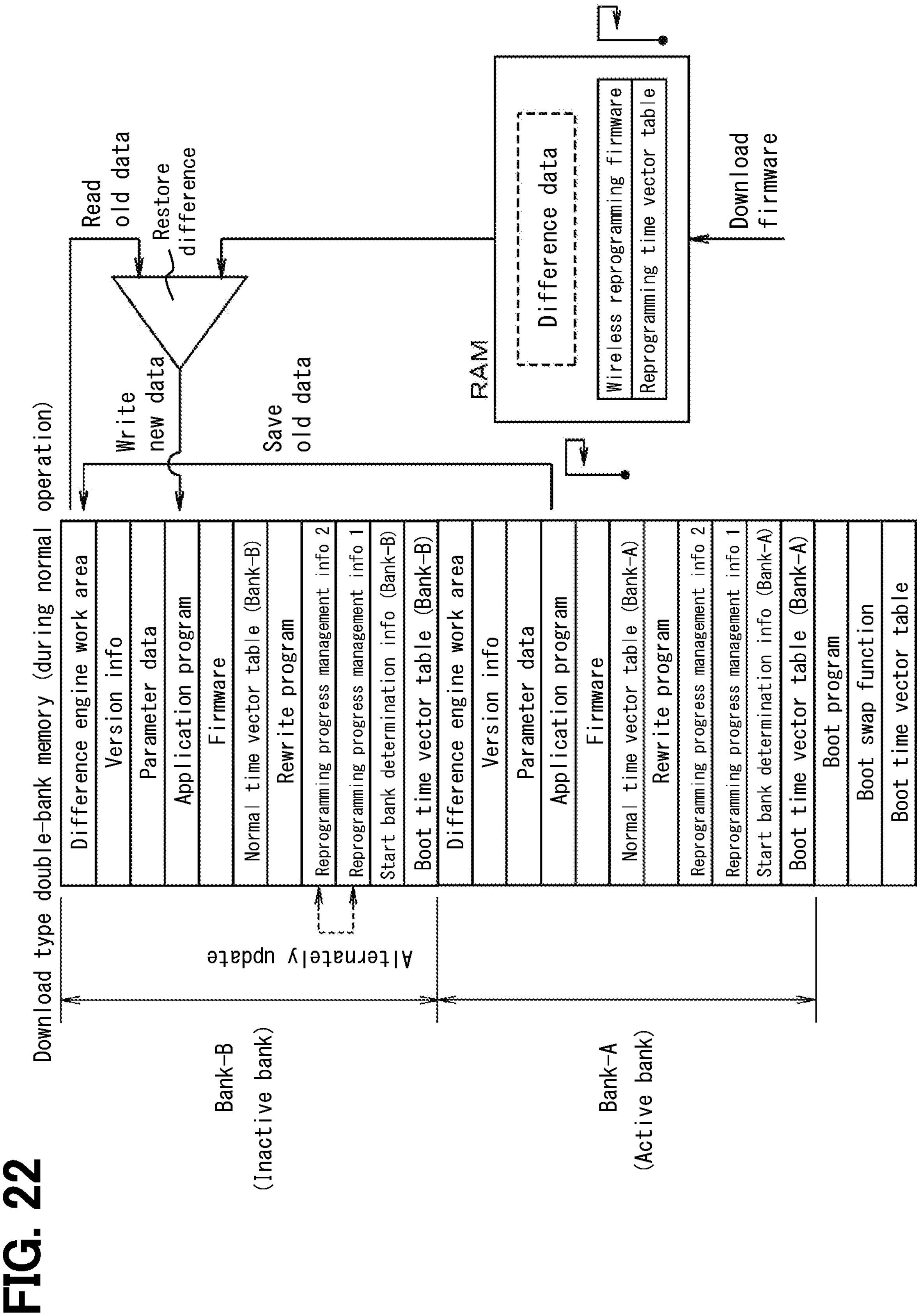
FIG. 22 is a diagram illustrating an aspect during a rewrite operation in the download type double-bank memory.

As illustrated in FIG. 22, during a rewrite operation of executing a rewrite process on the application program, the microcomputer 33 temporarily saves the application program of the inactive bank as old data in the difference engine work area. The microcomputer 33 reads the old data temporarily saved in the difference engine work area, and restores new data from the read old data and the difference data stored in the RAM 33*c* by using the reprogramming firmware downloaded from the outside. When the new data is generated from the old data and the difference data, the microcomputer 33 writes the new data into the inactive bank to rewrite the application program of the inactive bank. Old data temporarily saved in the difference engine work area may be an application program of an active bank or an application program of an inactive bank. In this case, in a case where the application program of the active bank is a target, data of the inactive bank is deleted before writing new data. Here, in a case where reprogramming data acquired from the outside of the vehicle is not difference data but entire data (full data), the acquired reprogramming data is written as new data to the inactive bank. FIG. 22 exemplifies a case where the bank-A is an active bank and the bank-B is an inactive bank. Old data temporarily saved in the difference engine work area may be an application program of an active bank or an application program of an inactive bank. As described above, in the double-bank memory, rewriting of the application program of the bank-B can be executed on the background while executing the application program of the bank-A.

As described above, in both configurations of the embedded type and the download type, the application program and the rewrite programs for rewriting the application program are located in each application area. In FIG. 20 and FIG. 22, the application program has been described as a reprogramming target, but the rewrite program may also be a reprogramming target. In a case where it is desired that the rewrite program cannot be rewritten, the rewrite program may be located in the boot area. For example, a program for wired rewriting may be located in the boot area such that the wired rewriting using the tool 23 can be reliably performed in a dealer or the like.

Figure 23:
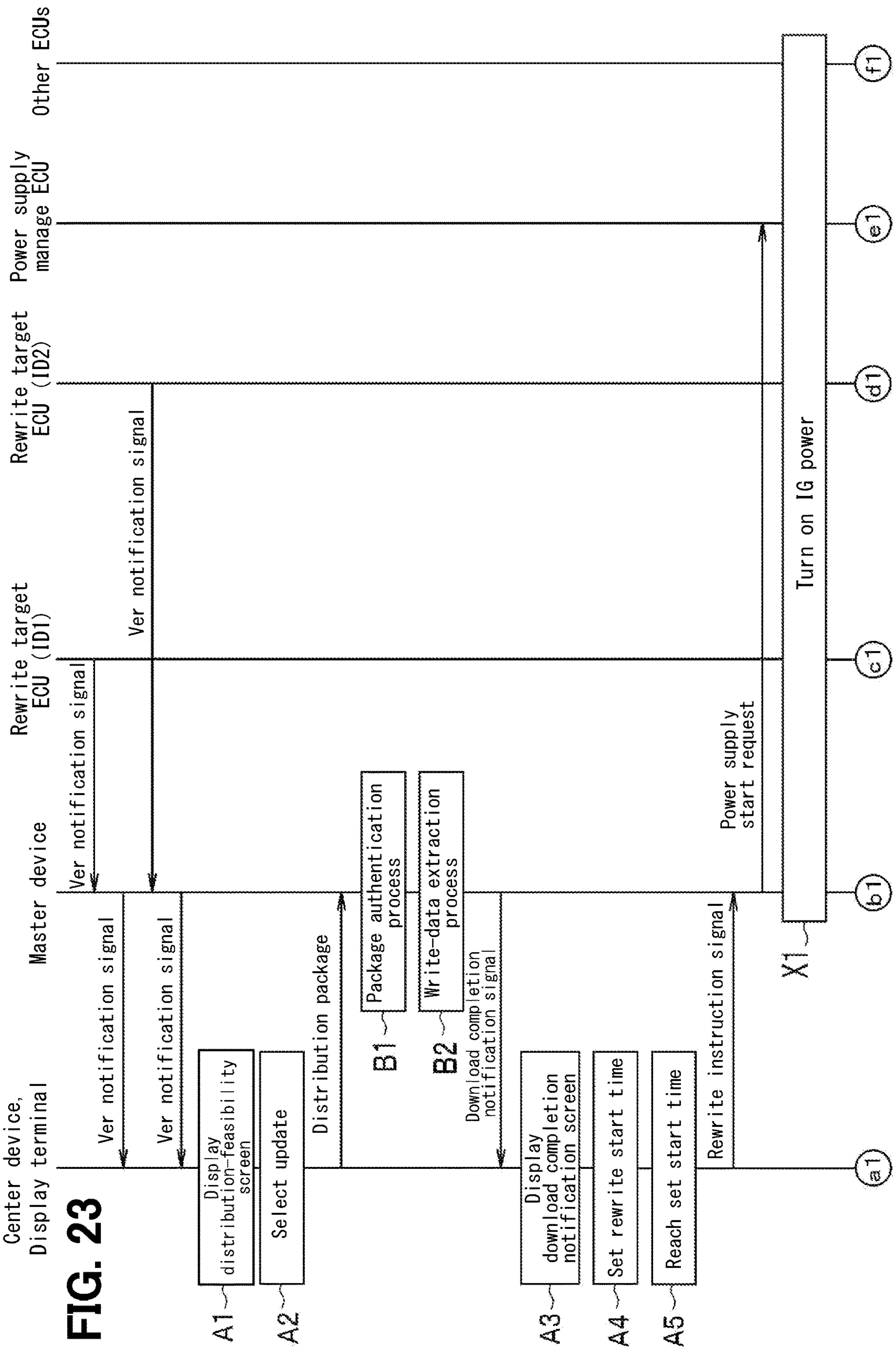
FIG. 23 is a diagram illustrating an aspect of rewriting an application program.
Figure 24:
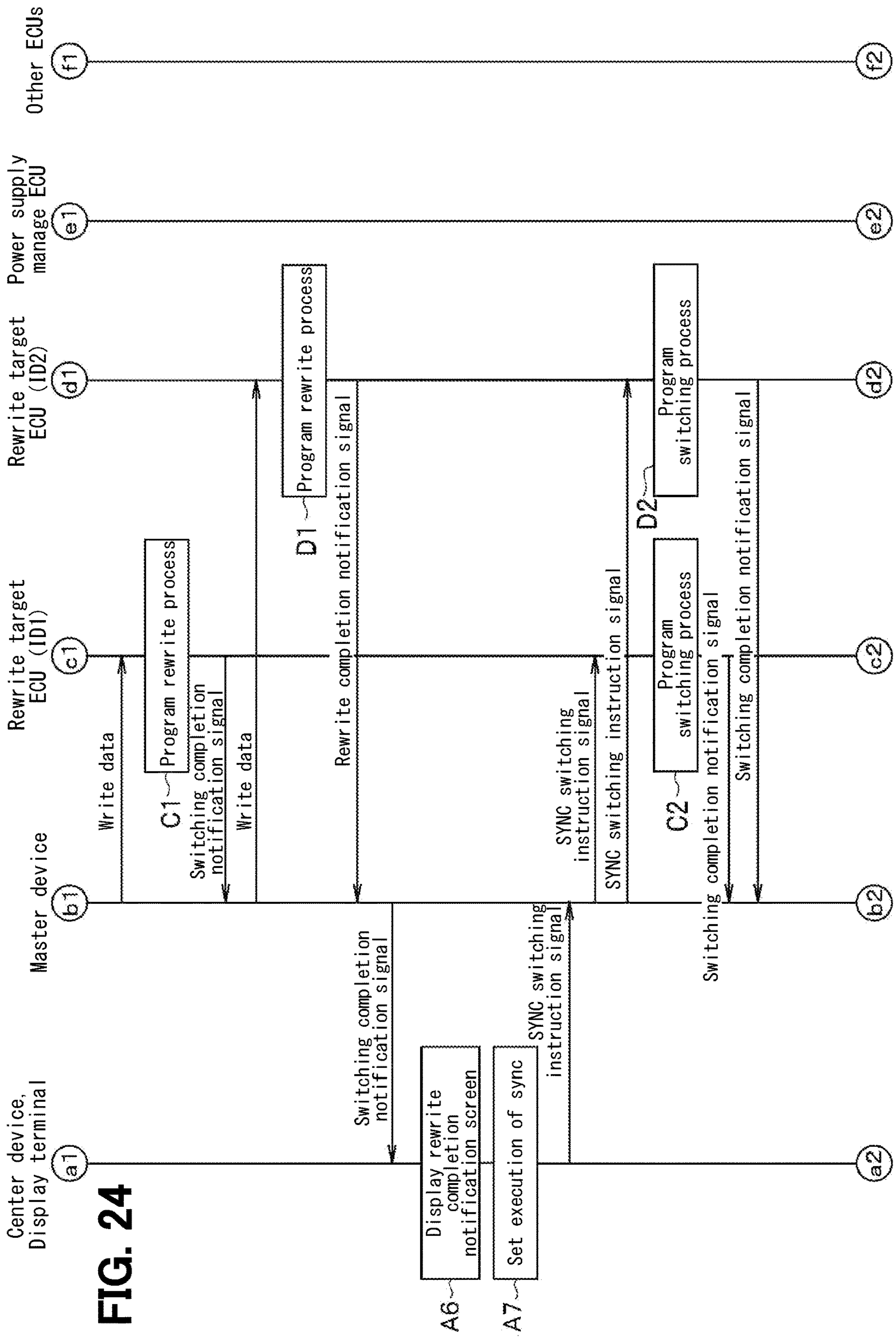
FIG. 24 is a diagram illustrating an aspect of rewriting the application program.
Figure 25:
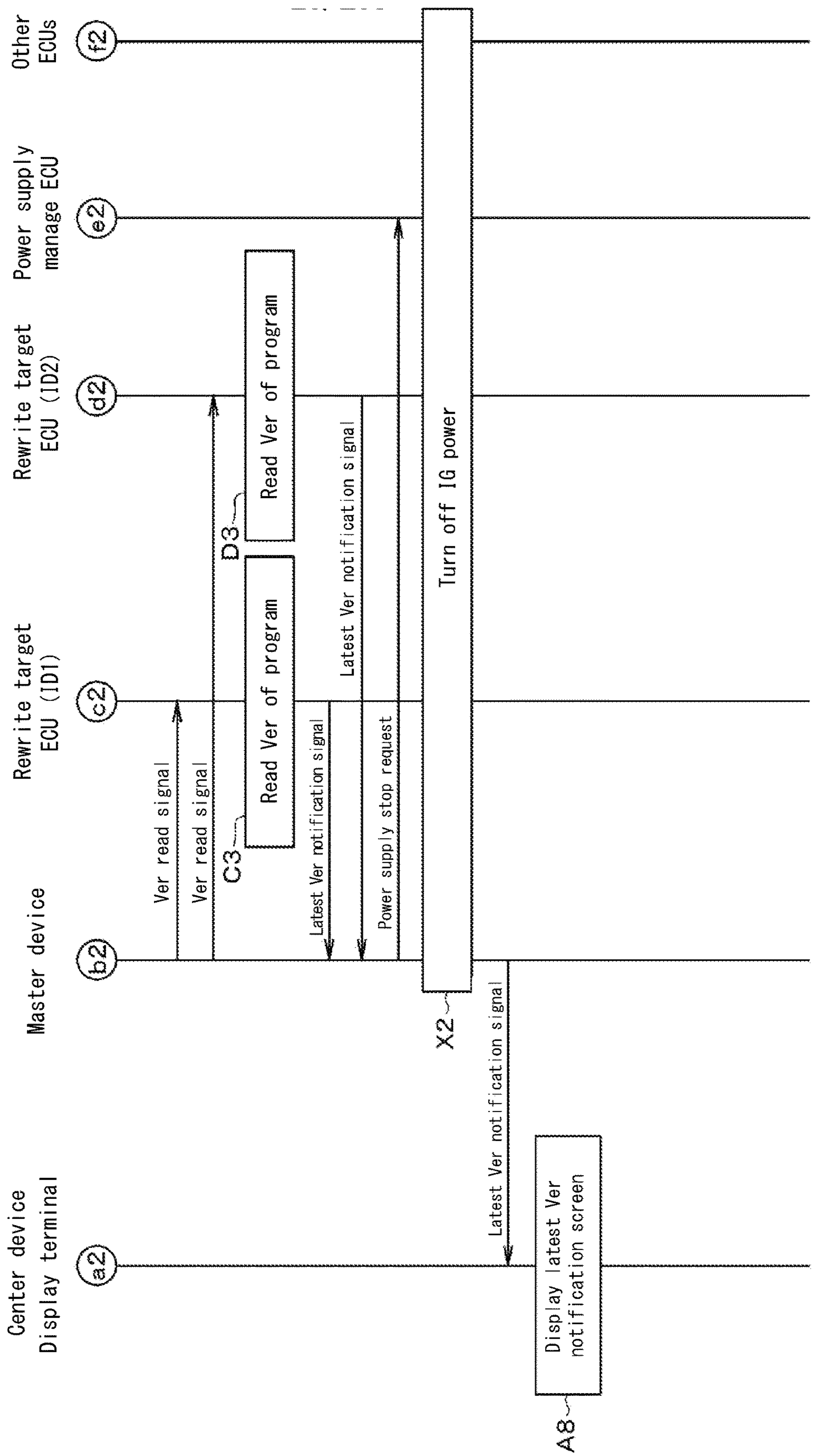
FIG. 25 is a diagram illustrating an aspect of rewriting the application program.

Next, the overall sequence of rewriting an application program will be described with reference to FIGS. 23 to 25. Here, a description will be made of a case where a user operates the mobile terminal 6 as the display terminal 5 to rewrite an application program during parking, but the same applies to a case where the application program is rewritten during parking by operating the in-vehicle display 7. The distribution package transmitted from the center device 3 to the DCM 12 stores write data of one or more rewrite target ECUs 19. That is, when there is a single rewrite target ECU 19, one piece of write data for the single rewrite target ECU 19 is stored in the distribution package, and, when there are a plurality of rewrite target ECUs 19, a plurality of pieces of write data for the respective a plurality of rewrite target ECUs 19 are stored in the distribution package. Here, there are two rewrite target ECUs 19, and the two rewrite target ECUs 19 will be referred to as a rewrite target ECU (ID1) and a rewrite target ECU (ID2). The ECUs 19 other than the rewrite target ECU (ID1) and the rewrite target ECU (ID2) will be referred to as other ECUs.

Each of the rewrite target ECU (ID1) and the rewrite target ECU (ID2) determines that a transmission condition for a version notification signal is established, for example, when it is determined that a transmission request for the version notification signal has been received from the master device 11. When the transmission condition for the version notification signal is established, the rewrite target ECU (ID1) transmits the version notification signal including version information of an application program stored therein and an ECU (ID) that can identify the ECU to the master device 11. When the version notification signal is received from the rewrite target ECU (ID1), the master device 11 transmits the received version notification signal to the center device 3. Similarly, when the transmission condition for the version notification signal is established, the rewrite target ECU (ID2) transmits the version notification signal including a version of an application program stored therein and an ECU (ID) that can identify the ECU to the master device 11. When the version notification signal is received from the rewrite target ECU (ID2), the master device 11 transmits the received version notification signal to the center device 3.

When the version notification signals are received from the rewrite target ECU (ID1) and the rewrite target ECU (ID2), the center device 3 specifies the versions of the application programs included in the received version notification signals and the ECUs (ID), and determines availability of write data to be distributed to the rewrite target ECU 19 that is a transmission source of the version notification signal. The center device 3 specifies the version of the current application program of the rewrite target ECU 19 from the version notification signal received from the rewrite target, and collates the version of the current application program with the managed latest version.

When the version specified from the version notification signal has the same value as that of the managed latest version, the center device 3 determines that write data to be distributed to the rewrite target ECU 19 that is a transmission source of the version notification signal is unavailable, and the application program stored in the rewrite target ECU 19 does not need to be updated. On the other hand, when the version specified from the version notification signal has a value smaller than that of the managed newest version, the center device 3 determines that write data to be distributed to the rewrite target ECU 19 that is a transmission source of the version notification signal is available, and the application program stored in the rewrite target ECU 19 needs to be updated.

When it is determined that the application program stored in the rewrite target ECU 19 needs to be updated, the center device 3 notifies the mobile terminal 6 of information indicating that update is necessary. When the mobile terminal 6 is notified of the information indicating that update is necessary, the mobile terminal displays a distribution feasibility screen (A1). The distribution feasibility screen is the same as a campaign notification screen which will be described later. The user can check the necessity of update from the distribution feasibility screen displayed on the mobile terminal 6, and can thus select whether or not to perform the update.

When the user selects that the update is to be performed on the mobile terminal 6 (A2), the mobile terminal 6 notifies the center device 3 of a download request for a distribution package. When the center device 3 is notified of the download request for the distribution package from the mobile terminal 6, the center device transmits the distribution package to the master device 11.

When the master device 11 downloads the distribution package from the center device 3, the master device initiates a package authentication process on the downloaded distribution package (B1). When the master device 11 authenticates the distribution package and completes the package authentication process, the master device initiates a write data extraction process (B2). When the master device 11 extracts the write data from the distribution package, and completes the write data extraction process, the master device transmits a download completion notification signal to the center device 3.

When the center device 3 receives the download completion notification signal from the master device 11, the center device 3 notifies the mobile terminal 6 of completion of the download. When the mobile terminal 6 is notified of completion of the download from the center device 3, the mobile terminal 6 displays a download completion notification screen (A3). The user can check that the download has been completed from the download completion notification screen displayed on the mobile terminal 6, and can thus set a rewrite initiation time of an application program on the vehicle side.

When the user sets the rewrite initiation time of the application program on the vehicle side on the mobile terminal 6 (A4), the mobile terminal 6 notifies the center device 3 of the rewrite initiation time. When the center device 3 is notified of the rewrite initiation time from the mobile terminal 6, the center device 3 stores the rewrite initiation time set by the user as a set initiation time. When the current time reaches the set initiation time (A5), the center device 3 transmits a rewrite instruction signal to the master device 11.

When the rewrite instruction signal is received from the center device 3, the master device 11 transmits a power supply start request to the power supply management ECU 20, and thus causes the rewrite target ECU (ID1), the rewrite target ECU (ID2), and the other ECUs to transition from a stop state or a sleep state to an active state (X1).

The master device 11 initiates to distribute the write data to the rewrite target ECU (ID1) and instructs the rewrite target ECU (ID1) to write the write data. The rewrite target ECU (ID1) initiates to receive the write data from the master device 11, and initiates to write the write data and initiates a program rewrite process when the write data is instructed to be written (C1). When the rewrite target ECU (ID1) completes reception of the write data from the master device 11, completes writing of the write data, and completes the program rewrite process, the rewrite target ECU (ID1) transmits a rewrite completion notification signal to the master device 11.

When the rewrite completion notification signal is received from the rewrite target ECU (ID1), the master device 11 initiates to distribute the write data to the rewrite target ECU (ID2), and instructs the rewrite target ECU (ID2) to write the write data. The rewrite target ECU (ID2) initiates to receive the write data from the master device 11, and initiates to write the write data and initiates a program rewrite process when the write data is instructed to be written (D1). When the rewrite target ECU (ID2) completes reception of the write data from the master device 11, completes writing of the write data, and completes the program rewrite process, the rewrite target ECU (ID2) transmits a rewrite completion notification signal to the master device 11. When the rewrite completion notification signal is received from the rewrite target ECU (ID2), the master device 11 transmits the rewrite completion notification signal to the center device 3.

When the rewrite completion notification signal is received from the master device 11, the center device 3 notifies the mobile terminal 6 of the completion of rewriting of the application program. When the mobile terminal 6 is notified of the completion of rewriting of the application program from the center device 3, the mobile terminal 6 displays a rewrite completion notification screen (A6). The user can check that rewriting of the application program has been completed from the rewrite completion notification screen displayed on the mobile terminal 6, and can thus set execution of synchronization as activation.

When the user sets the execution of synchronization on the mobile terminal 6 (A7), that is, when the user sets an approval for activation of a new program, the mobile terminal 6 notifies the center device 3 of the execution of synchronization. When the center device 3 is notified of the execution of synchronization from the mobile terminal 6, the center device transmits a synchronization switching instruction signal to the master device 11. When the synchronization switching instruction signal is received from the center device 3, the master device 11 distributes the received synchronization switching instruction signal to the rewrite target ECU (ID1) and the rewrite target ECU (ID2).

When the synchronization switching instruction signal is received from the master device 11, each of the rewrite target ECU (ID1) and the rewrite target ECU (ID2) initiates a program switching process of switching an application program to be started next time from the old application program to the new application program (C2 and D2). When the program switching process has been completed, each of the rewrite target ECU (ID1) and the rewrite target ECU (ID2) transmits a switching completion notification signal to the master device 11.

When the switching completion notification signal is received from the rewrite target ECU (ID1) and the rewrite target ECU (ID2), the master device 11 distributes a version read signal to the rewrite target ECU (ID1) and the rewrite target ECU (ID2). When the version read signal is received from the master device 11, each of the rewrite target ECU (ID1) and the rewrite target ECU (ID2) reads a version of an application program to be operated thereafter (C3 and D3), and transmits a latest version notification signal including the read version to the master device 11. The master device 11 checks a version of software or performs rollback as necessary by receiving the version notification signal from the rewrite target ECU (ID1) and the rewrite target ECU (ID2).

When the version notification signal is received from the rewrite target ECU (ID1) and the rewrite target ECU (ID2), the master device 11 transmits a power supply stop request to the power supply management ECU 20, and thus causes the rewrite target ECU (ID1), the rewrite target ECU (ID2), and the other ECUs to transition from the active state to the stop state or the sleep state (X2).

The master device 11 transmits the latest version notification signal to the center device 3. When the latest version notification signal is received from the master device 11, the center device 3 specifies the latest versions of the application programs of the rewrite target ECU (ID1) and the rewrite target ECU (ID2) from the received latest version notification signal, and notifies the mobile terminal 6 of the specified latest versions. When a notification of the latest versions is sent from the center device 3, the mobile terminal 6 displays a latest version notification screen indicating the latest versions of which the notification is sent on the mobile terminal 6 (A8). The user can check the latest versions from the latest version notification screen displayed on the mobile terminal 6, and can thus check that the activation has been completed.

Next, with reference to FIGS. 26 to 29, a description will be made of timing charts for operations of the DCM 12, the CGW 13 and the rewrite target ECU 19 when an application program is rewritten. Here, a description will be made of a case where an application program of the double-bank memory ECU is rewritten during a period in which the IG switch 42 is turned on by a user operation, that is, while the vehicle can travel, and application programs of the single-bank suspend memory ECU and the single-bank memory ECU are rewritten during parking after the IG switch 42 is turned off by the user operation. A description will be made of a case where the application program is rewritten by using power supply control and a case where the application program is rewritten by using self-retention power.

(a) Case where Application Program is Rewritten by Using Power Supply Control

Figure 26:
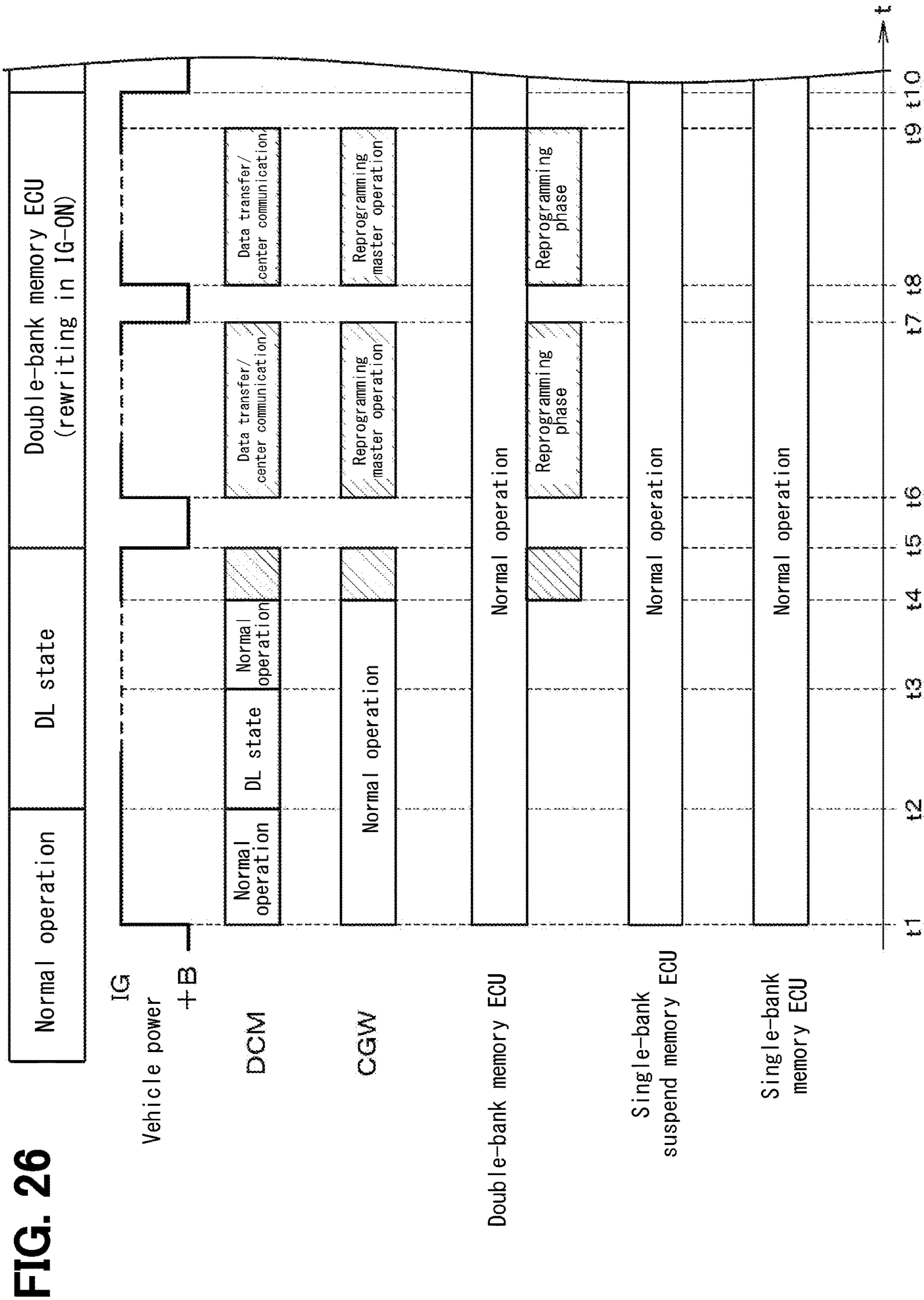
FIG. 26 is a timing chart illustrating an aspect in which an application program is rewritten by using power supply control.
Figure 27:
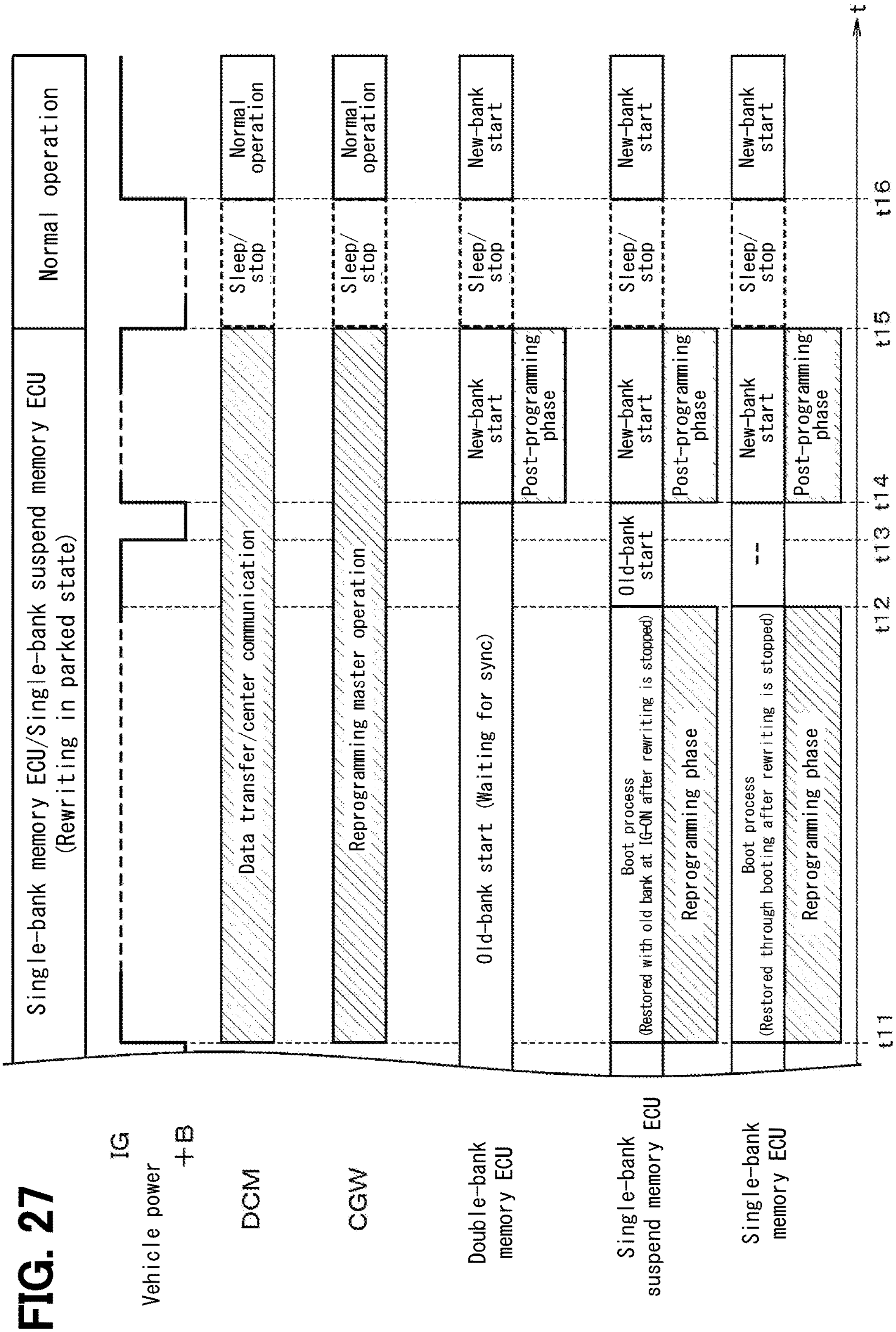
FIG. 27 is a timing chart illustrating an aspect in which the application program is rewritten by using the power supply control.

The case where the application program is rewritten by using power supply control will be described with reference to FIGS. 26 and 27. The rewriting of the application program by using power supply control indicates a configuration in which a rewrite operation is controlled in accordance with switching of a power supply without using the self-retention power circuit. When the user switches on the IG switch in an OFF state and thus the vehicle power switches from the +B power to the IG power, each of the DCM 12, the CGW 13, the double-bank memory ECU, the single-bank suspend memory ECU, and the single-bank memory ECU initiates a normal operation (t1).

When a notification of download initiation is sent from the center device 3, the DCM 12 transitions from the normal operation to a download operation, and initiates to download a distribution package from the center device 3 (t2). The DCM 12 may download the distribution package on the background while performing the normal operation. When the download of the distribution package from the center device 3 has been completed, the DCM 12 returns from the download operation to the normal operation (t3).

When a notification of a rewrite instruction signal (installation instruction signal) is sent from the center device 3 or the CGW 13, the DCM 12 transitions from the normal operation to a data transfer/center communication operation, and initiates the data transfer/center communication operation (t4). That is, the DCM 12 extracts write data from the distribution package, initiates to transfer the write data to the CGW 13, acquires a rewrite progress situation from the CGW 13, and initiates to notify the center device 3 of the rewrite progress situation.

When acquisition of the write data from the DCM 12 is initiated, the CGW 13 transitions from the normal operation to a reprogramming master operation, initiates the reprogramming master operation, initiates to distribute the write data to the double-bank memory ECU, and instructs the double-bank memory ECU to write the write data. When the double-bank memory ECU initiates to receive write data from the CGW 13, the double-bank memory ECU initiates a programming phase (hereinafter, also referred to as an installation phase) in a normal operation. That is, the double-bank memory ECU performs the installation of the application program on the background while performing the normal operation. The double-bank memory ECU initiates to write the received write data into the flash memory and initiates to rewrite the application program.

When the user switches off the IG switch in an ON state such that the vehicle power switches from the IG power to the +B power during rewriting of the application program in the double-bank memory ECU, the DCM 12 stops the data transfer/center communication operation, the CGW 13 stops the reprogramming master operation, and the double-bank memory ECU stops the installation phase and stops rewriting of the application program (t5).

Thereafter, when the user switches on the IG switch in an OFF state such that the vehicle power switches from the +B power to the IG power, the DCM 12 resumes the data transfer/center communication operation, the CGW 13 resumes the reprogramming master operation, and the double-bank memory ECU resumes the installation phase and resumes rewriting of the application program (t6). That is, the user switches off the IG switch in an ON state such that the vehicle power switches from the IG power to +B power, and then the user switches on the IG switch in an OFF state such that the vehicle power switches from the +B power to the IG power, and, each time a trip occurs, the double-bank memory ECU repeats stopping and resuming of rewriting of the application program (t7 and t8).

When the double-bank memory ECU completes writing of the write data, and completes rewriting of the application program, the double-bank memory ECU finishes the installation phase, and transitions from the normal operation to activation standby. That is, the double-bank memory ECU is not started on the new bank (bank-B) in which the application program is rewritten at the time point when the activation phase is not performed, and remains started on the old bank (bank-A) (t9).

After the user switches off the IG switch in an ON state such that the vehicle power switches from the IG power to the +B power (t10), when the double-bank memory ECU completes rewriting of the application program at that time, the CGW 13 transmits a power supply start request to the power supply management ECU 20. When the vehicle power switches from the +B power to the IG power by the CGW 13 transmitting the power supply start request to the power supply management ECU 20, the DCM 12 resumes the data transfer/center communication operation, and the CGW 13 resumes the reprogramming master operation, and initiates to distribute the write data to the single-bank suspend memory ECU and the single-bank memory ECU. When reception of the write data from the CGW 13 is initiated, the single-bank suspend memory ECU and the single-bank memory ECU transition from the normal operation to a boot process and initiate the installation phase in the boot process (t11). That is, the single-bank suspend memory ECU and the single-bank memory ECU do not perform installation in parallel to the normal operation, and perform installation in the boot process in which the application program is not operated.

When rewriting of the application program is initiated, the single-bank suspend memory ECU stops rewriting of the application program in a case where the IG switch 42 switches from an OFF state to an ON state due to the user operation before rewriting of the application program is completed. The single-bank suspend memory ECU returns to an active bank (bank-A) as a start bank instead of an inactive bank (bank-B) in which rewriting of the application program is stopped. When rewriting of the application program is initiated, the single-bank memory ECU continues rewriting of the application program even though the IG switch 42 switches from an OFF state to an ON state due to the user operation before rewriting of the application program is completed. This is because the single-bank memory ECU cannot return to the normal operation if rewriting of the application program is stopped halfway. Preferably, after rewriting of the application program of the single-bank memory ECU is initiated, it is desirable to disable the user operation on the IG switch 42 until rewriting of the application program is completed.

When the single-bank suspend memory ECU completes writing of the write data and completes rewriting of the application program, the single-bank suspend memory ECU finishes the installation phase in the boot process and transitions from the boot process to activation standby. That is, the single-bank suspend memory ECU is not started on the new bank (bank-B) in which the application program is rewritten at the time point when the activation phase is not performed, and remains started on the old bank (bank-A). When the single-bank memory ECU completes writing of the write data and completes rewriting of the application program, the single-bank memory ECU finishes the installation phase in the boot process and waits for activation (t12).

When the power supply management ECU 20 switches the vehicle power from the IG power to the +B power in response to an activation instruction from the CGW 13, each of the double-bank memory ECU and the single-bank suspend memory ECU switches from the old bank to the new bank to be started in the new bank, and initiates a post-programming phase (hereinafter, also referred to as an activation phase) in the new bank start. The single-bank memory ECU initiates restart, and initiates the activation phase in restart after installation is completed (t13 and t14). In the activation, for example, it is checked that accurate start is performed by the new program, or the CGW 13 is notified of version information.

When the activation has been completed, and the power supply management ECU 20 switches the vehicle power from the IG power to the +B power in response to an activation completion instruction from the CGW 13, the DCM 12 transitions from the data transfer/center communication operation to a sleep/stop operation and initiates the sleep/stop operation. The CGW 13 transitions from the reprogramming master operation to the sleep/stop operation and initiates the sleep/stop operation. Each of the double-bank memory ECU, single-bank suspend memory ECU, and single-bank memory ECU transitions from the new bank start to the sleep/stop operation (t15).

Thereafter, when the user switches on the IG switch in an OFF state such that the vehicle power switches from the +B power to the IG power, each of the double-bank memory ECU and the single-bank suspend memory ECU starts the new application program with the new bank (bank-B) as an active bank, and the single-bank memory ECU starts the new application program (t16).

(b) Case where Application Program is Rewritten by Using Self-Retention Power

Figure 28:
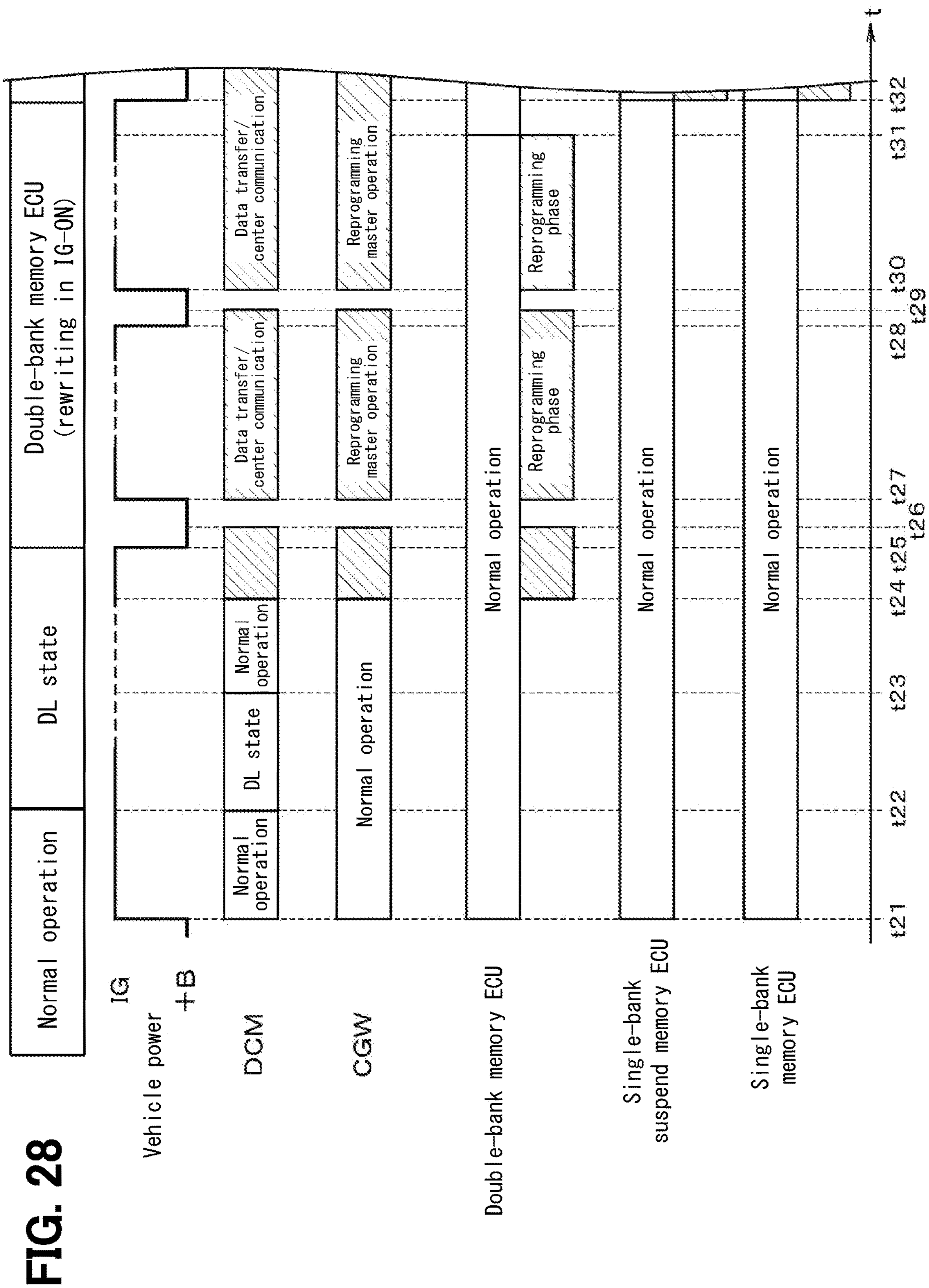
FIG. 28 is a timing chart illustrating an aspect in which the application program is rewritten by using self-retention power.
Figure 29:
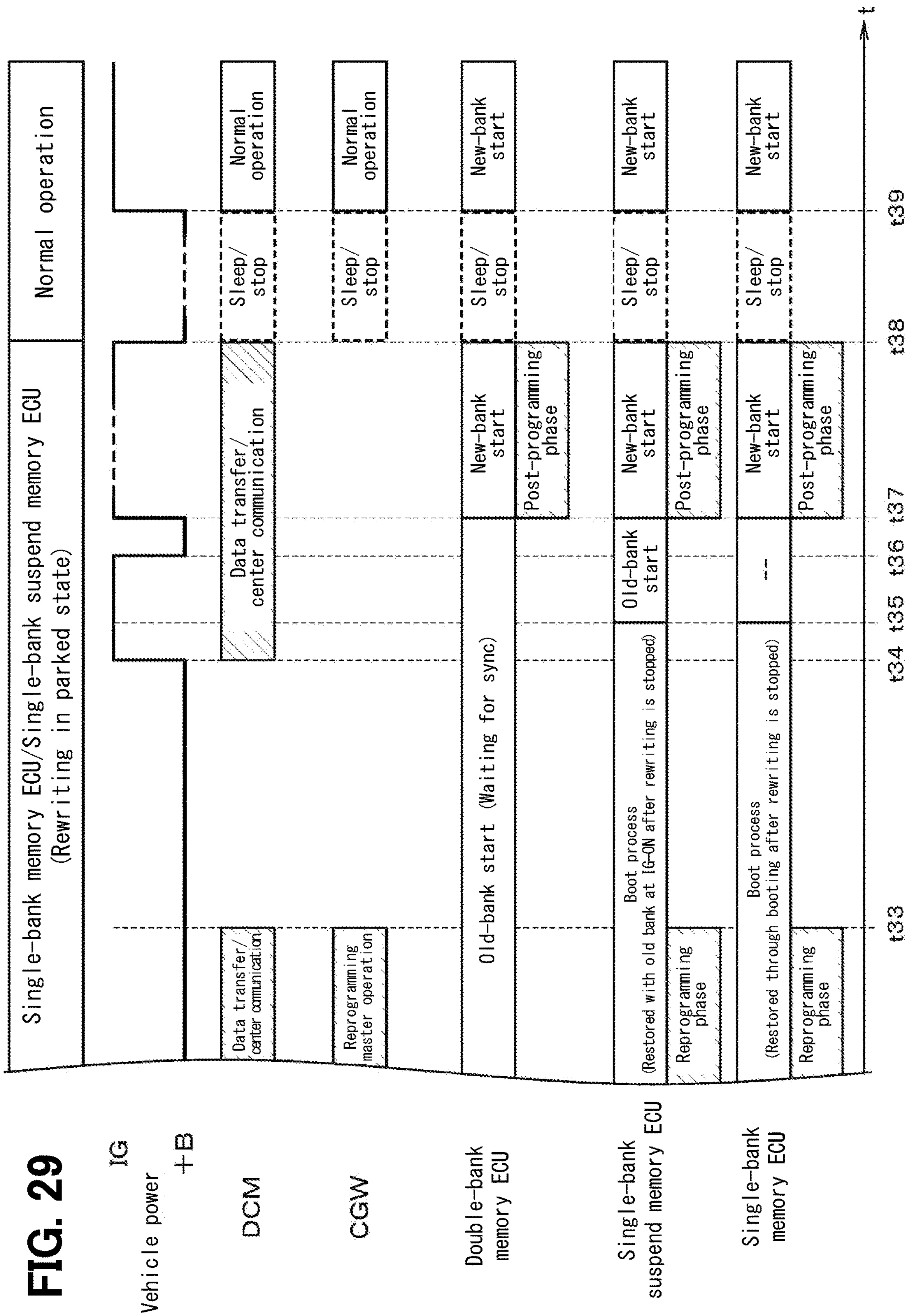
FIG. 29 is a timing chart illustrating an aspect in which the application program is rewritten by using self-retention power.

The case where an application program is rewritten by using self-retention power will be described with reference to FIGS. 28 and 29. Rewriting of the application program using the self-retention power indicates a configuration in which a rewrite operation is controlled by using the self-retention power circuit. When the user switches on the IG switch in an OFF state such that the vehicle power switches from the +B power to the IG power, each of the DCM 12, the CGW 13, the double-bank memory ECU, the single-bank suspend memory ECU, and the single-bank memory ECU initiates a normal operation (t21).

When a notification of initiation of download is sent from the center device 3, that is, when a notification that update is available due to a new program is sent, the DCM 12 transitions from the normal operation to a download operation, and initiates to download a distribution package from the center device 3 (t22). When the download of the distribution package from the center device 3 has been completed, the DCM 12 returns from the download operation to the normal operation (t23).

When a notification of a rewrite instruction signal (installation instruction signal) is sent from the center device 3 or the CGW 13, the DCM 12 transitions from the normal operation to a data transfer/center communication operation, and initiates the data transfer/center communication operation (t24). That is, the DCM 12 extracts write data from the distribution package, initiates to transfer the write data to the CGW 13, acquires a rewrite progress situation from the CGW 13, and initiates to notify the center device 3 of the rewrite progress situation.

When acquisition of the write data from the DCM 12 is initiated, the CGW 13 transitions from the normal operation to a reprogramming master operation, initiates the reprogramming master operation, initiates to distribute the write data to the double-bank memory ECU, and instructs the double-bank memory ECU to write the write data. When the double-bank memory ECU initiates to receive write data from the CGW 13, the double-bank memory ECU initiates a programming phase (hereinafter, also referred to as an installation phase) in a normal operation. That is, the double-bank memory ECU performs the installation of the application program on the background while performing the normal operation. The double-bank memory ECU initiates to write the received write data into the flash memory and initiates to rewrite the application program.

When the user switches off the IG switch in an ON state such that the vehicle power switches from the IG power to the +B power during rewriting of the application program in the double-bank memory ECU (t25), the DCM 12 continues the data transfer/center communication operation, the CGW 13 continues the reprogramming master operation, and the double-bank memory ECU continues the installation phase and continues rewriting of the application program immediately after the vehicle power switches from the IG power to the +B power. When a self-retention period that is a preset period elapses after the vehicle power switches from the IG power to the +B power, the DCM 12 stops the data transfer/center communication operation, the CGW 13 stops the reprogramming master operation, and the double-bank memory ECU stops the installation phase and stops rewriting of the application program (t26). That is, the installation is continued by supplying power from the vehicle battery 40 until a predetermined time elapses after the IG switch 42 is turned off.

Thereafter, when the user switches on the IG switch in an OFF state such that the vehicle power switches from the +B power to the IG power, the DCM 12 resumes the data transfer/center communication operation, the CGW 13 resumes the reprogramming master operation, and the double-bank memory ECU resumes the installation phase and resumes rewriting of the application program (t27). That is, the user switches off IG switch in an ON state such that the vehicle power switches from IG power to +B power, and then the user switches on the IG switch in an OFF state such that the vehicle power switches from +B power to IG power, and, each time a trip occurs, the double-bank memory ECU repeats stopping and resuming of rewriting of the application program (t28 to t30). However, until the self-retention period elapses after the vehicle power switches from the IG power to the +B power, the DCM 12 continues the data transfer/center communication operation, the CGW 13 continues the reprogramming master operation, and the double-bank memory ECU continues the installation phase and continues rewriting of the application program.

When the double-bank memory ECU completes writing of the write data, and completes rewriting of the application program, the double-bank memory ECU finishes the installation phase, and transitions from the normal operation to activation standby. That is, the double-bank memory ECU is not started on the new bank (bank-B) in which the application program is rewritten at the time point when the activation phase is not performed, and remains started on the old bank (bank-A) (t31).

When the user switches off the IG switch in an ON state such that the vehicle power from the IG power to the +B power and rewriting of the application program is completed at that time in the double-bank memory ECU at that time, each of the single-bank suspend memory ECU and the single-bank memory ECU transitions from the normal operation to a boot process, initiates the boot process, and initiates the installation phase in the boot process (t32).

When the single-bank suspend memory ECU and the single-bank memory ECU complete writing of the write data, and complete rewriting of the application program, the single-bank suspend memory ECU and the single-bank memory ECU finish the installation phase in the boot process (t33). When the vehicle power switches from the +B power to the IG power by the CGW 13 transmitting the power supply start request to the power supply management ECU 20, the DCM 12 resumes the data transfer/center communication operation (t34).

When the single-bank suspend memory ECU completes writing of the write data and completes rewriting of the application program, the single-bank suspend memory ECU transitions from the boot process to activation standby. That is, the single-bank suspend memory ECU is not started on the new bank (bank-B) in which the application program is rewritten at the time point when the activation phase is not performed, and remains started on the old bank (bank-A). When the single-bank memory ECU completes writing of the write data and completes rewriting of the application program, the single-bank memory ECU finishes the installation phase in the boot process and waits for activation (t35).

When the power supply management ECU 20 switches the vehicle power from the IG power to the +B power in response to an activation instruction from the CGW 13, each of the double-bank memory ECU and the single-bank suspend memory ECU switches from the old bank to the new bank to be started on the new bank, and initiates an activation phase in the new bank start. The single-bank memory ECU initiates restart, and initiates the activation phase in restart after installation is completed (t36 and t37).

When the activation has been completed, and the power supply management ECU 20 switches the vehicle power from the IG power to the +B power in response to an activation completion instruction from the CGW 13, the DCM 12 transitions from the data transfer/center communication operation to a sleep/stop operation and initiates the sleep/stop operation. The CGW 13 transitions from the reprogramming master operation to the sleep/stop operation and initiates the sleep/stop operation. Each of the double-bank memory ECU, single-bank suspend memory ECU, and single-bank memory ECU transitions from the new bank start to the sleep/stop operation (t38).

Thereafter, when the user switches on the IG switch in an OFF state such that the vehicle power switches from the +B power to the IG power, each of the double-bank memory ECU and the single-bank suspend memory ECU starts the new application program with the new bank (bank-B) as an active bank, and the single-bank memory ECU starts the new application program (t39).

Prior to download of a distribution package from the center device 3 and distribution of write data to the rewrite target ECU 19, the CGW 13 performs the following checking. Prior to download of a distribution package from the center device 3, the CGW 13 checks a radio wave environment, a remaining battery charge of the vehicle battery 40, and a memory capacity of the DCM 12 such that the distribution package can be downloaded normally. Prior to distribution of write data to the rewrite target ECU 19, the CGW 13 performs detection of an intrusion sensor, detection of a door lock, detection of a curtain, and detection of IG-off as a check of a manned environment in order not to make an installation environment unstable such that write data can be distributed normally, and checks a version and the occurrence of abnormality as a check of whether or not the rewrite target ECU 19 can be written. The CGW 13 performs a falsification check, access authentication, a version check, and the like as a check of write data to be distributed to the rewrite target ECU 19 prior to initiation of installation, performs a communication disruption check, an error occurrence check, and the like during the installation, and performs a version check, an integrity check, a diagnostic trouble code (DTC, error code) check, and the like after the installation is completed.

Figure 30:
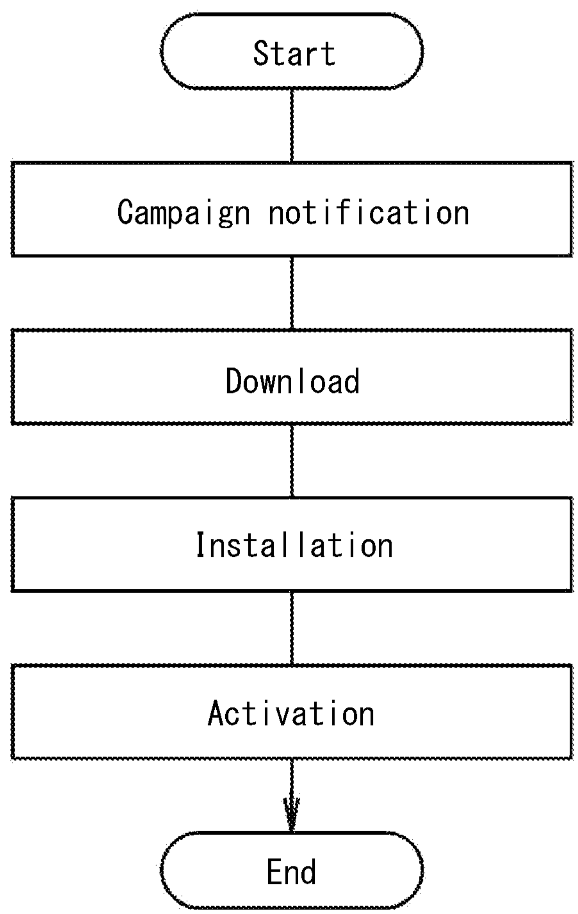
FIG. 30 is a diagram illustrating a phase.

Next, a screen displayed on the display terminal 5 will be described with reference to FIGS. 30 to 46. As illustrated in FIG. 30, in a configuration in which an application program of the rewrite target ECU 19 is rewritten through OTA, there are phases of a campaign notification, download, installation, and activation. The campaign notification is a notification of program update. For example, the campaign notification is that the master device 11 downloads distribution specification data or the like in response to a determination that update of an application program is available in the center device 3. The display terminal 5 displays a screen in each phase as rewriting of the application program progresses. Here, a screen displayed on the in-vehicle display 7 will be described.

Figure 31:
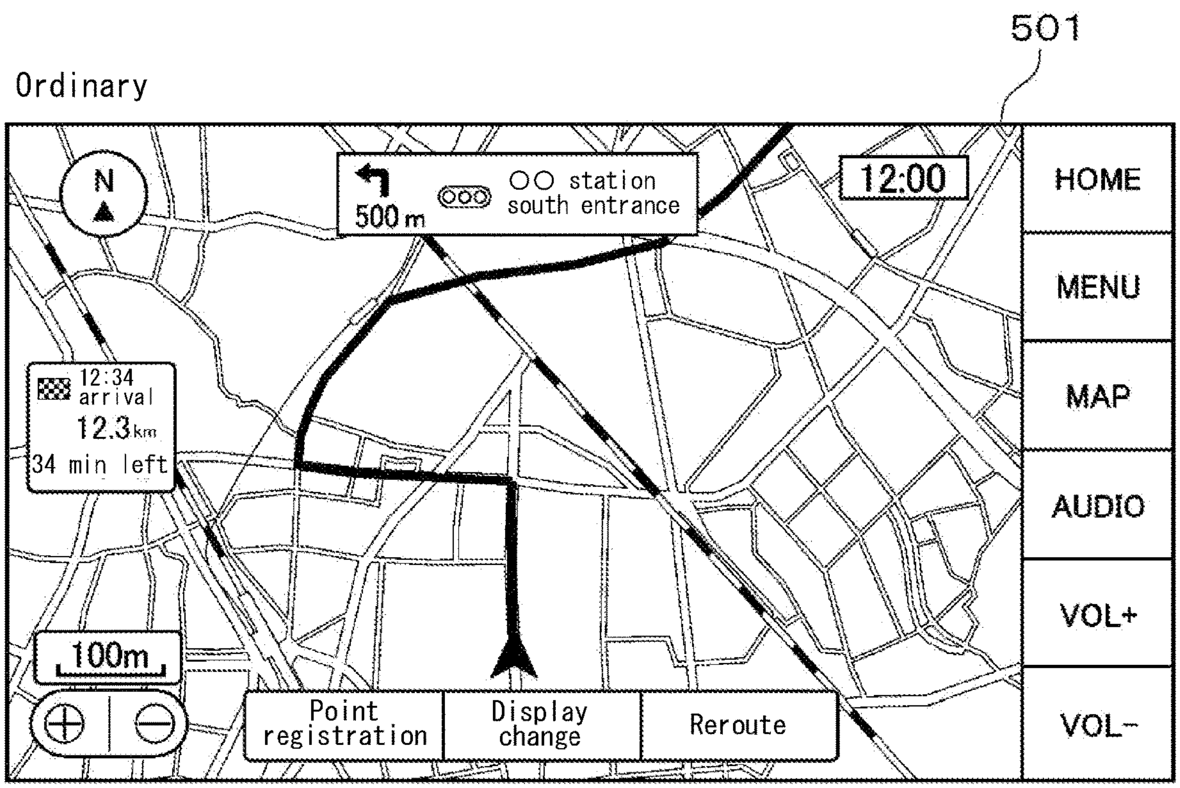
FIG. 31 is a diagram illustrating a screen in a normal state.
Figure 32:
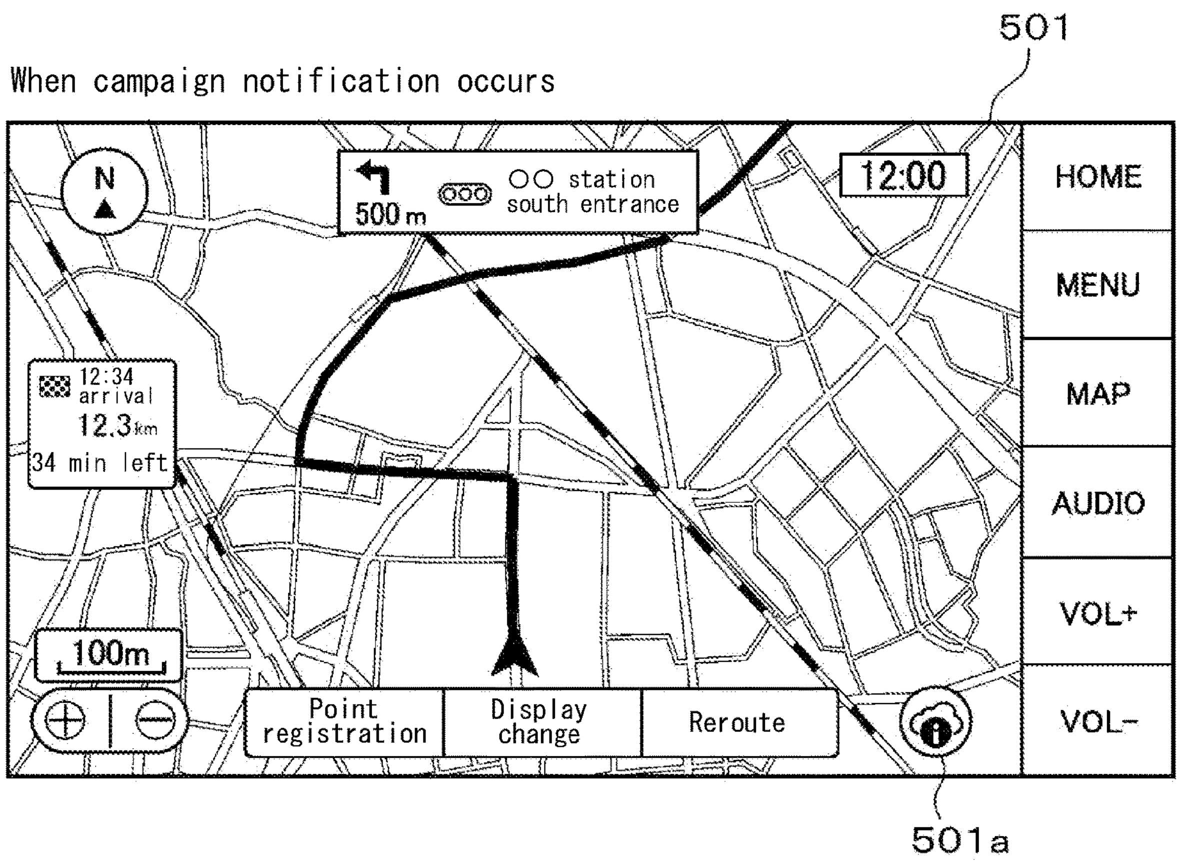
FIG. 32 is a diagram illustrating a screen when a campaign notification occurs.

As illustrated in FIG. 31, the CGW 13 displays a navigation screen 501 such as a well-known route guidance screen, which is one of the navigation functions, on the in-vehicle display 7 at a normal time prior to a campaign notification. When the campaign notification occurs in this state, the CGW 13 displays a campaign notification icon 501*a* indicating the occurrence of the campaign notification on the lower right of the navigation screen 501, as illustrated in FIG. 32. The user can recognize the occurrence of the campaign notification regarding the update of the application program by checking the display of the campaign notification icon 501*a*.

Figure 33:
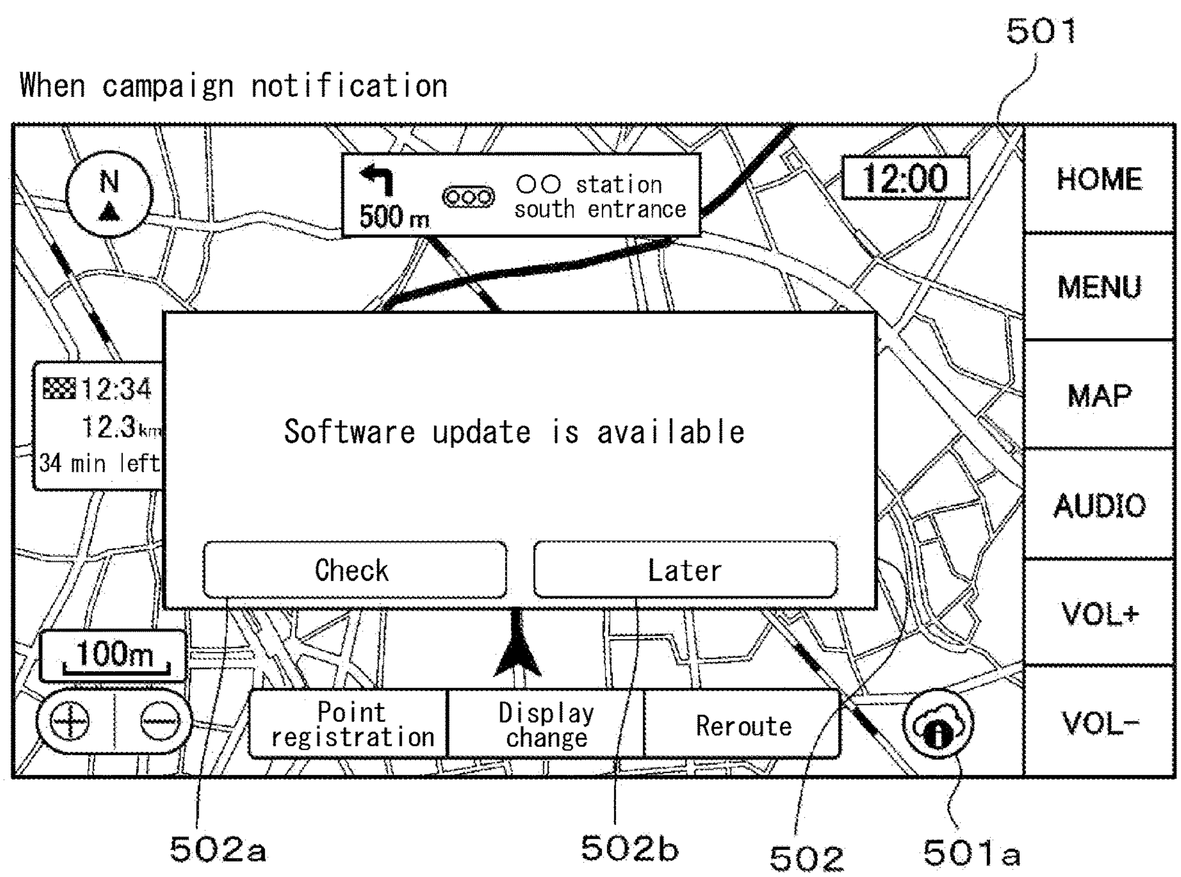
FIG. 33 is a diagram illustrating a screen at the time of the campaign notification, FIG. 34 a diagram illustrating a screen when download is approved.

When the user operates the campaign notification icon 501*a* in this state, as illustrated in FIG. 33, the CGW 13 displays a campaign notification screen 502 in a pop-up form on the navigation screen 501. The CGW 13 is not limited to displaying the campaign notification screen 502 in a pop-up form, and may employ other display aspects. On the campaign notification screen 502, the CGW 13 displays, for example, a guidance such as "software update is available" to notify the user of the occurrence of the campaign notification, and displays a "check" button 502*a* and a "later" button 502*b* to wait for the user operation. In this case, the user may proceed to the next screen for initiating rewriting of the application program by operating the "check" button 502*a*. When the user operates the "later" button 502*b*, the CGW 13 deletes the pop-up display of the campaign notification screen 502, and returns the screen to the screen displaying the campaign notification icon 501*a* illustrated in FIG. 32.

Figure 34:
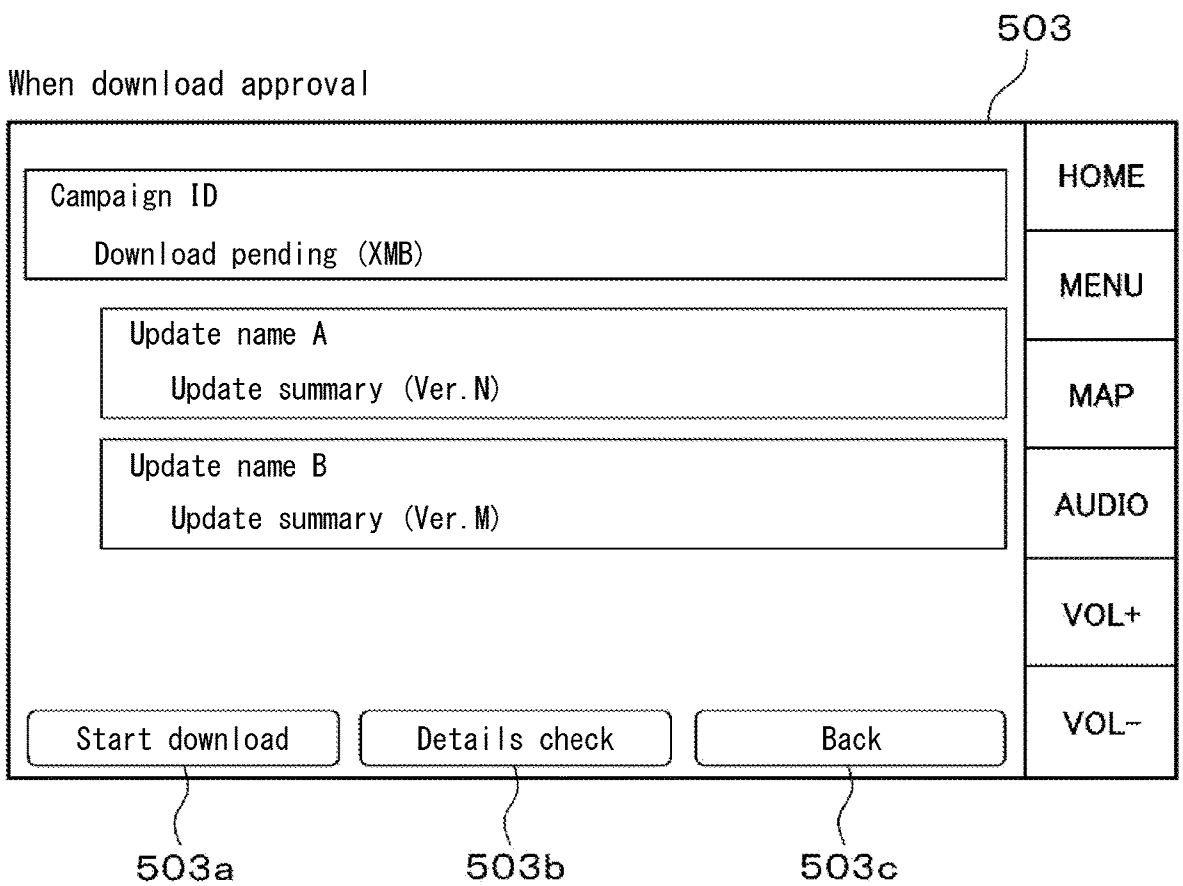

When the user operates the "check" button 502*a* in this state, as illustrated in FIG. 34, the CGW 13 switches the display from the navigation screen 501 to a download approval screen 503, and displays the download approval screen 503 on the in-vehicle display 7. In the download approval screen 503, the CGW 13 notifies the user of a campaign ID or the name of the update, displays a "download initiation" button 503*a*, a "details check" button 503*b*, and a "back" button 503*c*, and waits for the user operation. In this case, the user may initiate download by operating the "download initiation" button 503*a*, display details of the download by operating the "details check" button 503*b*, and reject the download and return to the previous screen by displaying the "back" button 503*c*. In the case where the "back" button 503*c* is operated, the user may proceed to a screen for initiating the download by operating the campaign notification icon 501*a*.

Figure 35:
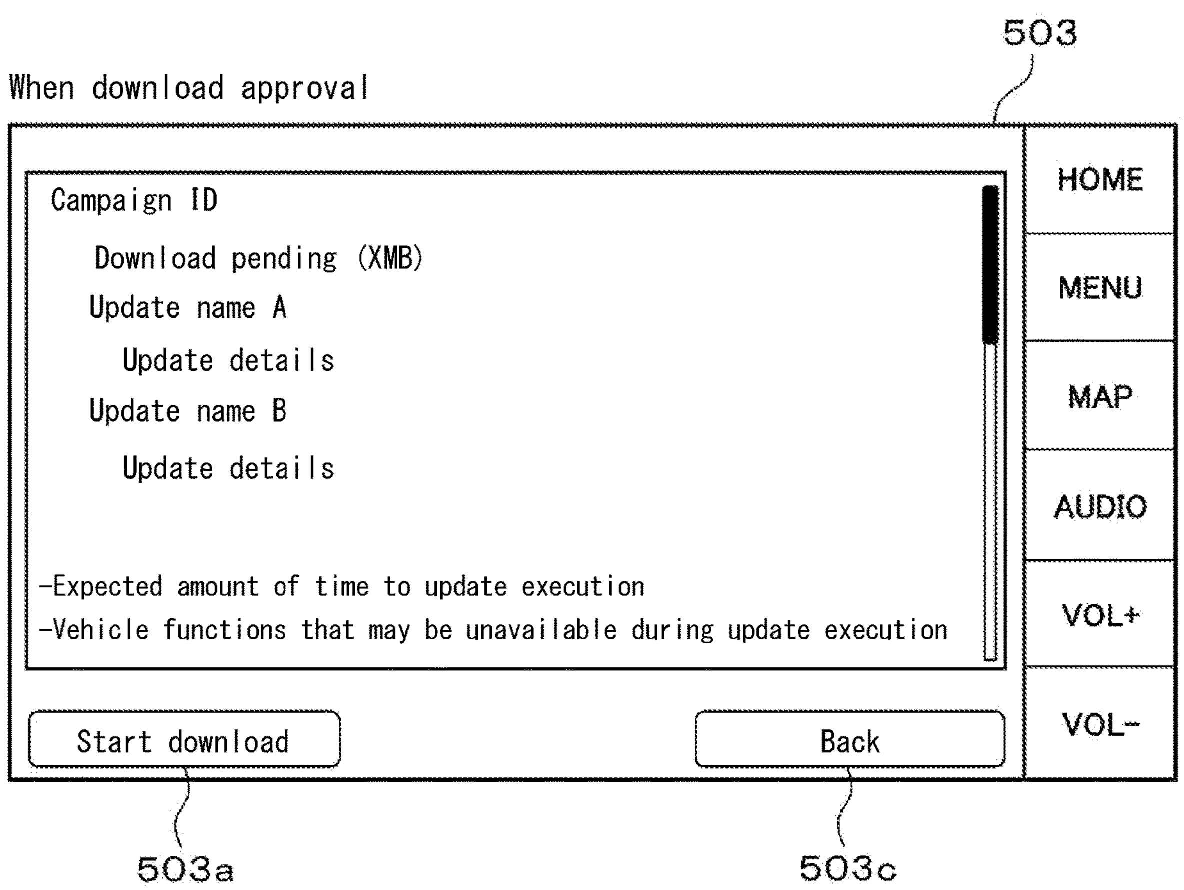
FIG. 35 is a diagram illustrating a screen when the download is approved.
Figure 36:
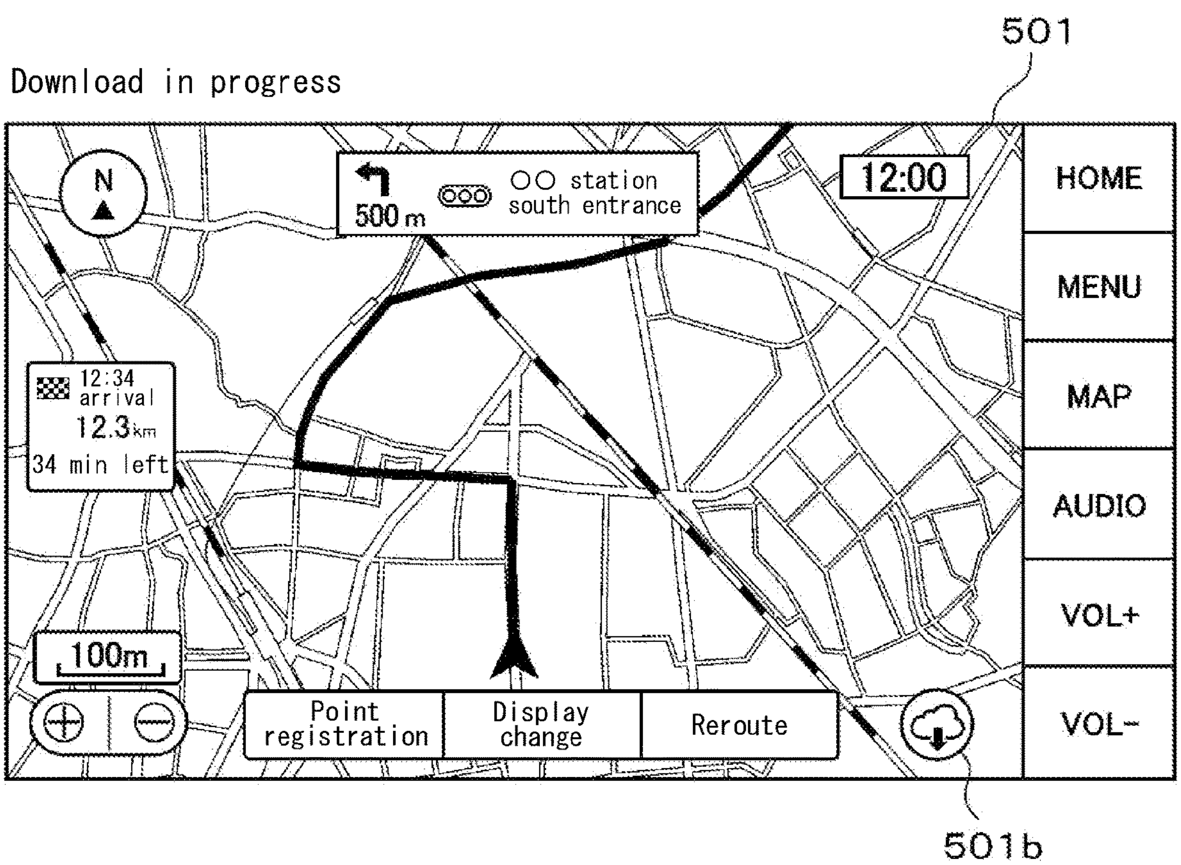
FIG. 36 is a diagram illustrating a screen during execution of the download.

When the user operates the "details check" button 503*b* in a state in which the download approval screen 503 is displayed, as illustrated in FIG. 35, the CGW 13 performs switching of display contents of the download approval screen 503 and displays the details of the download on the in-vehicle display 7. The CGW 13 displays a content of the update, the time required for the update, restrictions on vehicle functions due to the update, and the like by using the received distribution specification data as the details of the download. When the user operates the "download initiation" button 503*a*, the CGW 13 initiates to download a distribution package via the DCM 12. In parallel to initiation of the download of the distribution package, as illustrated in FIG. 36, the CGW 13 switches the display from the download approval screen 503 to the navigation screen 501, displays the navigation screen 501 on the in-vehicle display 7 again, and displays a download-in-progress icon 501*b* indicating that the download is in progress on the lower right of the navigation screen 501. The user can recognize that the download of the distribution package is in progress by checking the display of the download-in-progress icon 501*b*.

Figure 37:
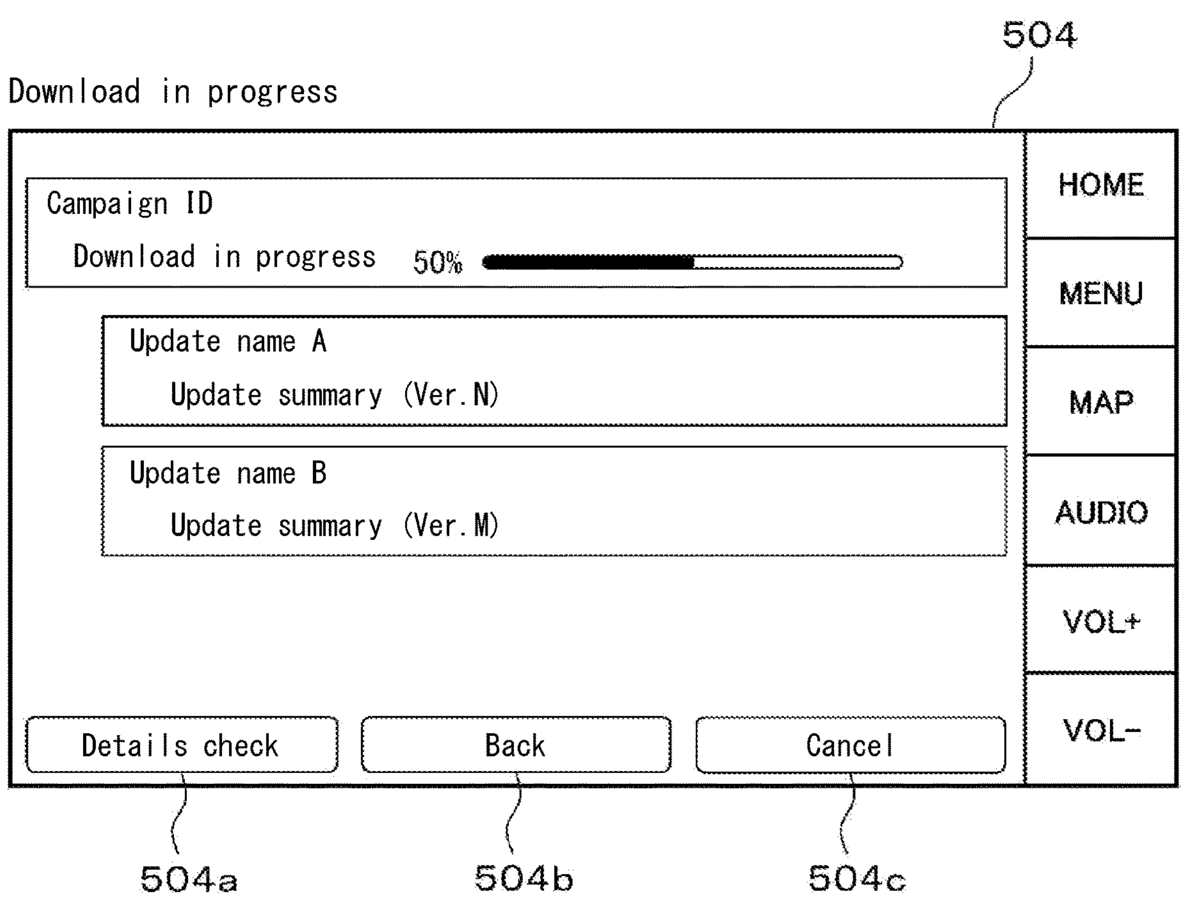
FIG. 37 is a diagram illustrating a screen during execution of the download, FIG. 38 a diagram illustrating a screen when the download is completed, FIG. 39 a diagram illustrating a screen when installation is approved, FIG. 40 a diagram illustrating a screen when the installation is approved.

When the user operates the download-in-progress icon 501*b* in this state, as illustrated in FIG. 37, the CGW 13 switches the display from the navigation screen 501 to a download-in-progress screen 504, and displays the download-in-progress screen 504 on the in-vehicle display 7. The CGW 13 notifies the user that the download is in progress, displays a "details check" button 504*a*, a "back" button 504*b*, and a "cancel" button 504*c* on the download-in-progress screen 504, and waits for the user operation. In this case, the user can display details during download by operating the "details check" button 504*a*, and can stop the download by operating the "cancel" button 504*c*.

Figure 38:
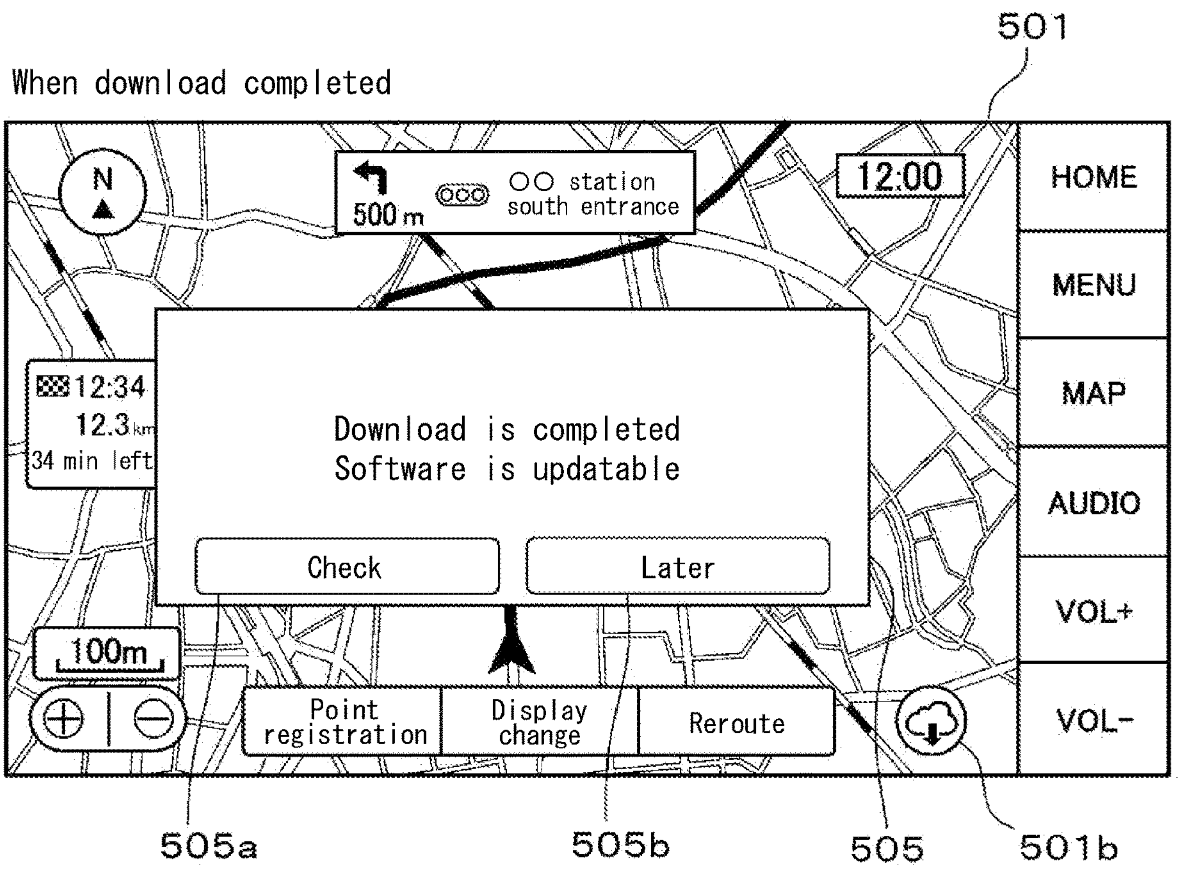

When the download has been completed, the CGW 13 displays a download completion notification screen 505 in a pop-up form on the navigation screen 501 as illustrated in FIG. 38. On the download completion notification screen 505, for example, the CGW 13 displays a guidance such as "downloaded software is updatable" to notify the user of the completion of the download, displays a "check" button 505*a* and a "later" button 505*b*, and waits for the user operation. In this case, the user may proceed to a screen for initiating installation by operating the "check" button 505*a*.

Figure 39:
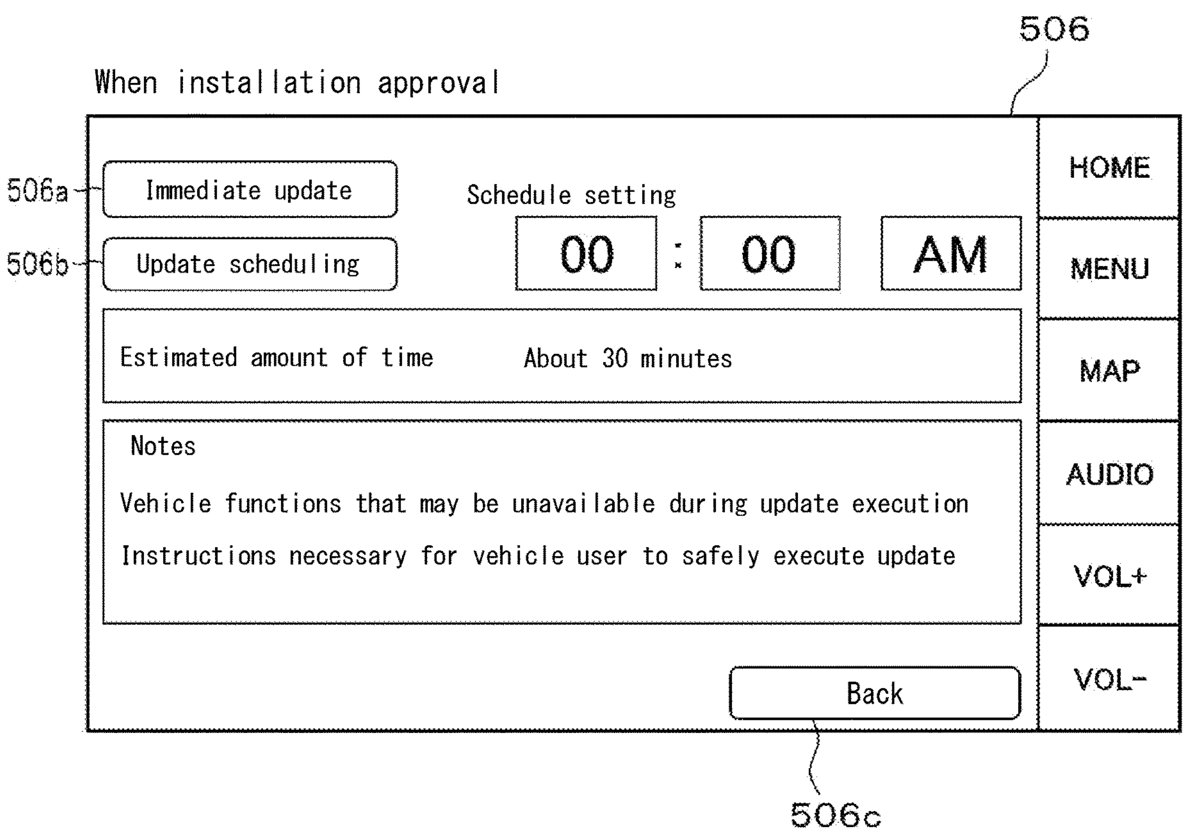

When the user operates the "check" button 505*a* in this state, as illustrated in FIG. 39, the CGW 13 switches the display from the navigation screen 501 to an installation approval screen 506, and displays the installation approval screen 506 on the in-vehicle display 7. On the installation approval screen 506, the CGW 13 notifies the user of the time required for installation, or restrictions and setting of schedules, displays an "immediate update" button 506*a*, an "update reservation" button 506*b*, and a "back" button 506*c*, and waits for the user operation. In this case, the user may immediately initiate the installation by operating the "immediate update" button 506*a*. The user may also reserve and initiate the installation by setting the time at which the installation is to be performed and operating the "update reservation" button 506*b*. The user may reject the installation and return to the previous screen by operating the "back" button 506*c*. In a case where the "back" button 506*c* is operated, the user may proceed to a screen for initiating the installation by operating the download-in-progress icon 501*b*.

Figure 40:
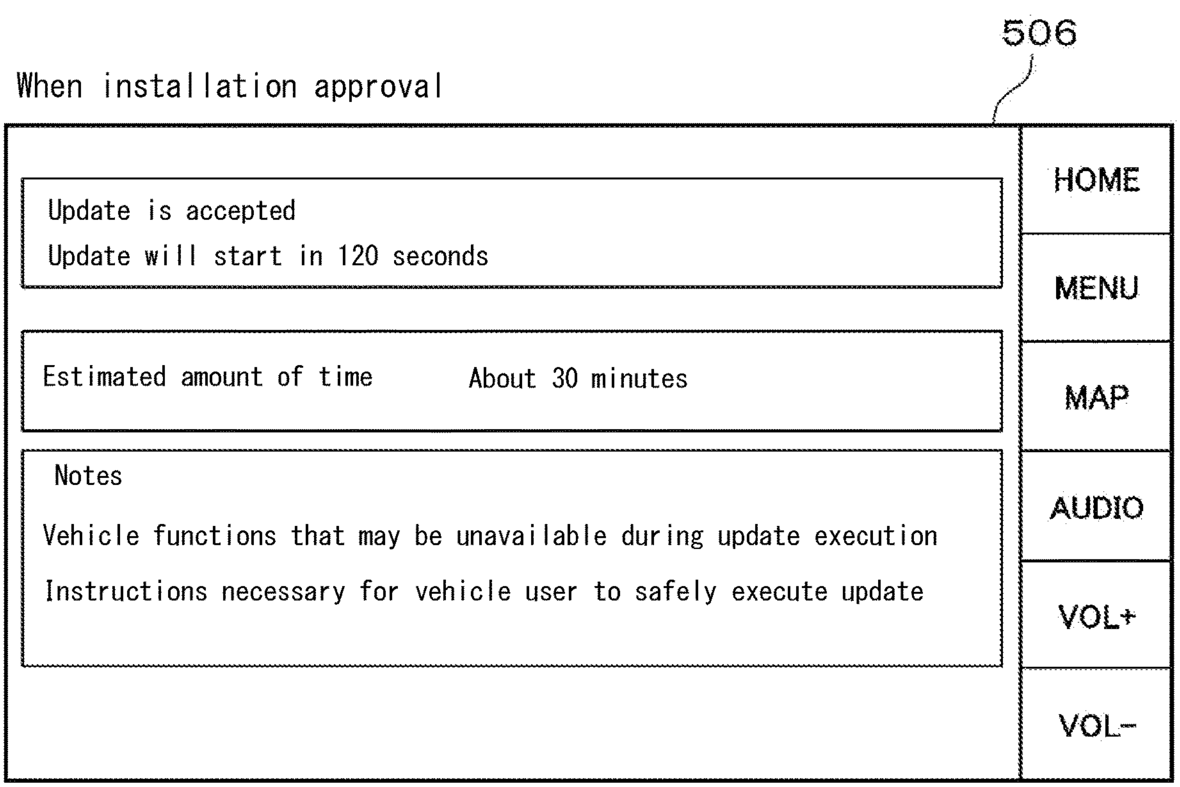

When the user operates the "immediate update" button 506*a* in this state, as illustrated in FIG. 40, the CGW 13 performs switching of display contents of the installation approval screen 506, and displays details of the installation on the in-vehicle display 7. The CGW 13 receives an installation request on the installation approval screen 506 and notifies the user that the installation is to be initiated.

Figure 41:
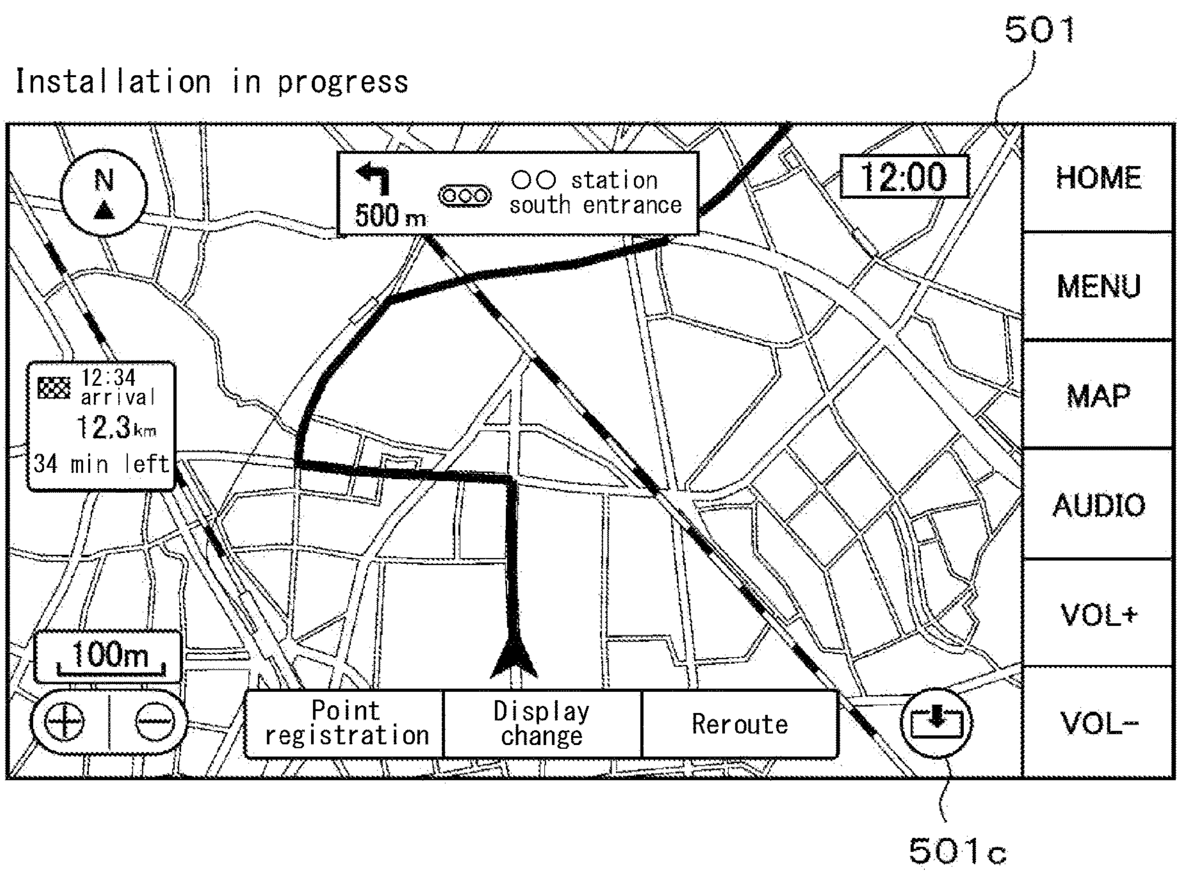
FIG. 41 is a diagram illustrating a screen during execution of the installation.

When the installation is initiated, as illustrated in FIG. 41, the CGW 13 switches the display from the installation approval screen 506 to the navigation screen 501, displays the navigation screen 501 on the in-vehicle display 7 again, and displays an installation-in-progress icon 501*c* indicating that the installation is in progress on the lower right of the navigation screen 501. The user can recognize that the installation is in progress by checking the display of the installation-in-progress icon 501*c*.

Figure 42:
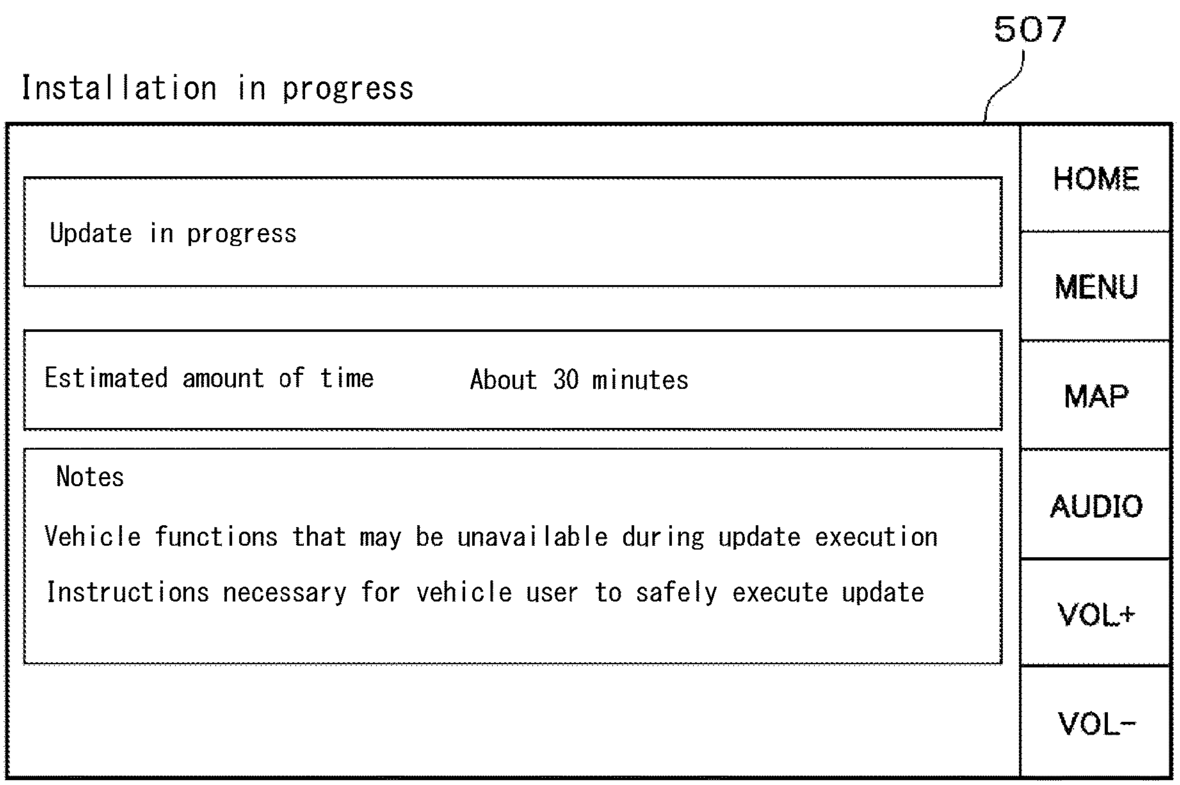
FIG. 42 is a diagram illustrating a screen during execution of the installation, FIG. 43 a diagram illustrating a screen when activation is approved, FIG. 44 a diagram illustrating a screen when IG is ON, FIG. 45 is a diagram illustrating a screen during a check operation.

When the user operates the installation-in-progress icon 501*c* in this state, as illustrated in FIG. 42, the CGW 13 switches the display from the navigation screen 501 to an installation-in-progress screen 507, and displays the installation-in-progress screen 507 on the in-vehicle display 7. The CGW 13 notifies the user that the installation is in progress on the installation-in-progress screen 507. The CGW 13 may, for example, cause the installation-in-progress screen 507 to show the time-remaining or percentage-of-progress of the installation.

Figure 43:
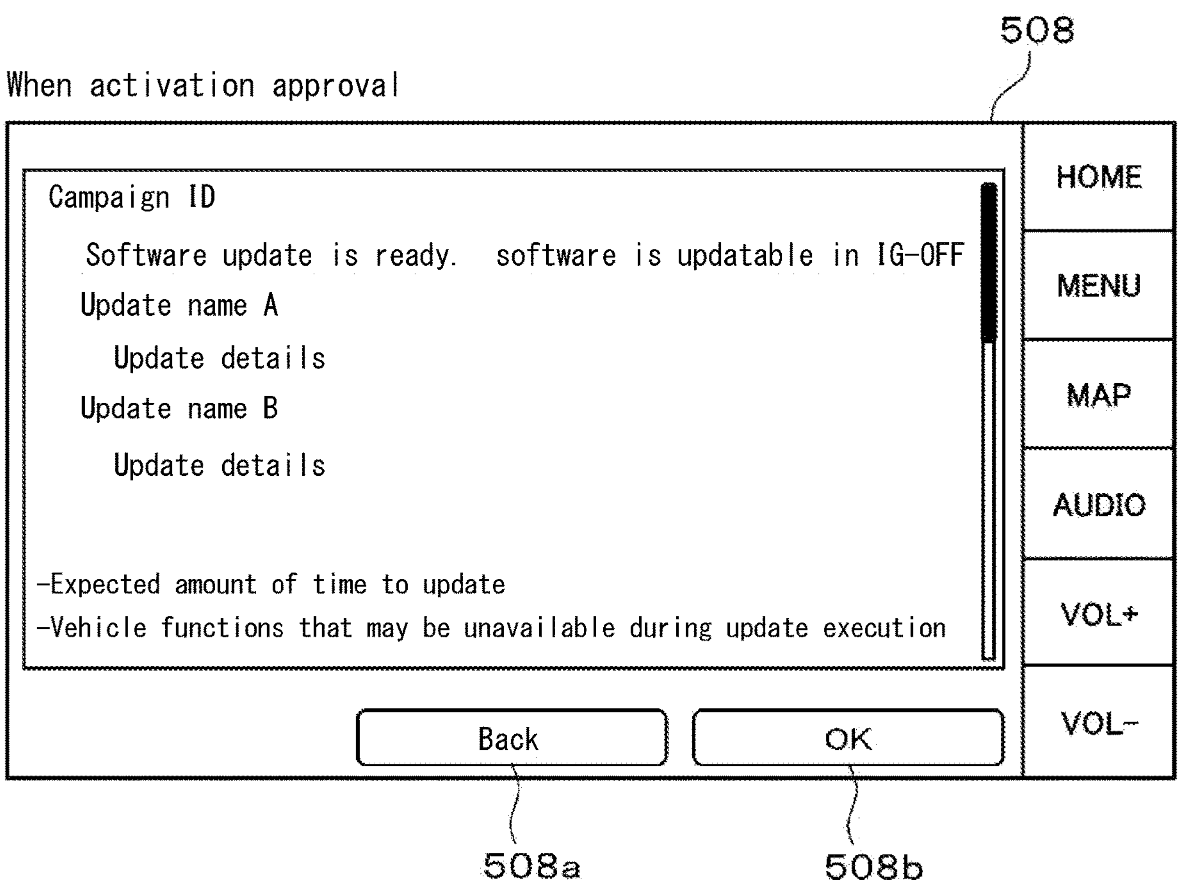

When the installation has been completed, as illustrated in FIG. 43, the CGW 13 switches the display from the navigation screen 501 to an activation approval screen 508, and displays the activation approval screen 508 on the in-vehicle display 7. On the activation approval screen 508, the CGW 13 notifies the user of a content of the activation and displays a "back" button 508*a* and an "OK" button 508*b* to wait for the user operation. In this case, the user may reject the activation and return to the previous screen by operating the "back" button 508*a*. The user may approve the activation by operating the "OK" button 508*b*. In a case where the "back" button 508*a* is operated, the user may proceed to a screen for executing the activation by operating the installation-in-progress icon 501*c*. Such display or approval may be omitted without being displayed by the user's settings or scenes of the program.

Figure 44:
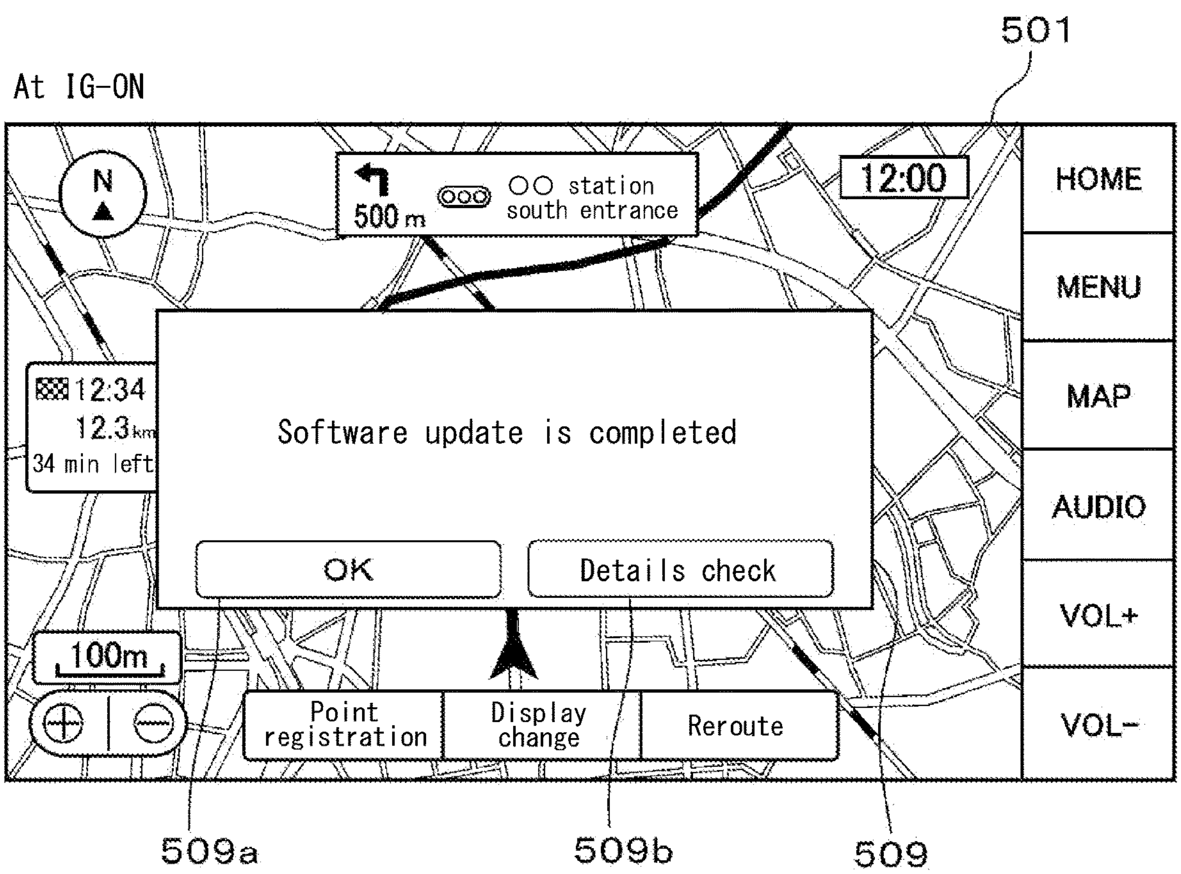

When the user turns on the IG power in the state after the user operates the "OK" button 508*b*, as illustrated in FIG. 44, the CGW 13 displays an activation completion notification screen 509 in a pop-up form on the navigation screen 501. On the activation completion notification screen 509, the CGW 13 displays, for example, a guidance such as "software update has been completed" to notify the user of the completion of the activation, displays an "OK" button 509*a* and a "details check" button 509*b*, and waits for the user operation. In this case, the user may delete the pop-up display on the activation completion notification screen 509 by operating the "OK" button 509*a*, and may display details of the completion of the activation by operating the "details check" button 509*b*.

Figure 45:
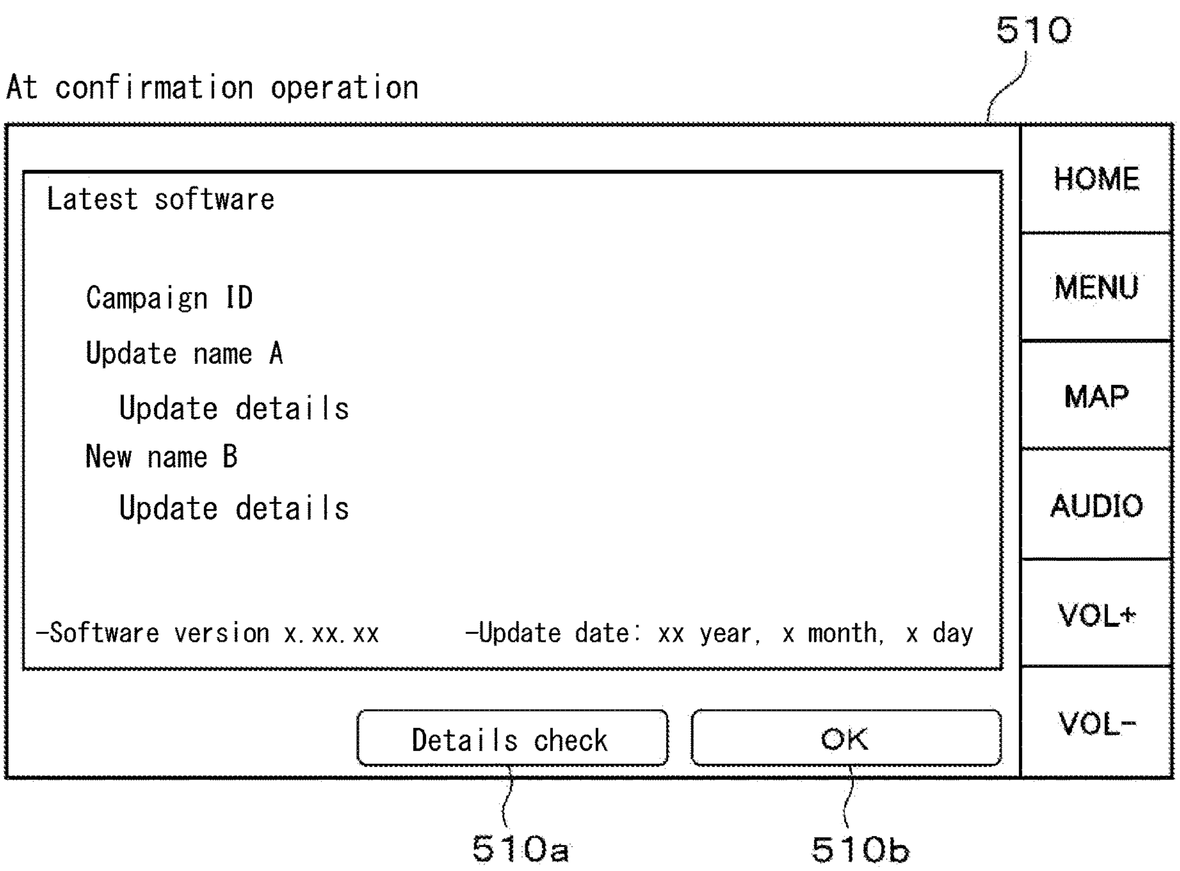

When the user operates the "OK" button 509*a* in this state, as illustrated in FIG. 45, the CGW 13 switches the display from the navigation screen 501 to a check operation screen 510, and displays the check operation screen 510 on the in-vehicle display 7. On the check operation screen 510, the CGW 13 notifies the user of the completion of the activation, displays a "details check" button 510*a* and an "OK" button 510*b*, and waits for the user operation. In this case, the user may display details of the completion of the activation by operating the "details check" button 510*a*.

Figure 46:
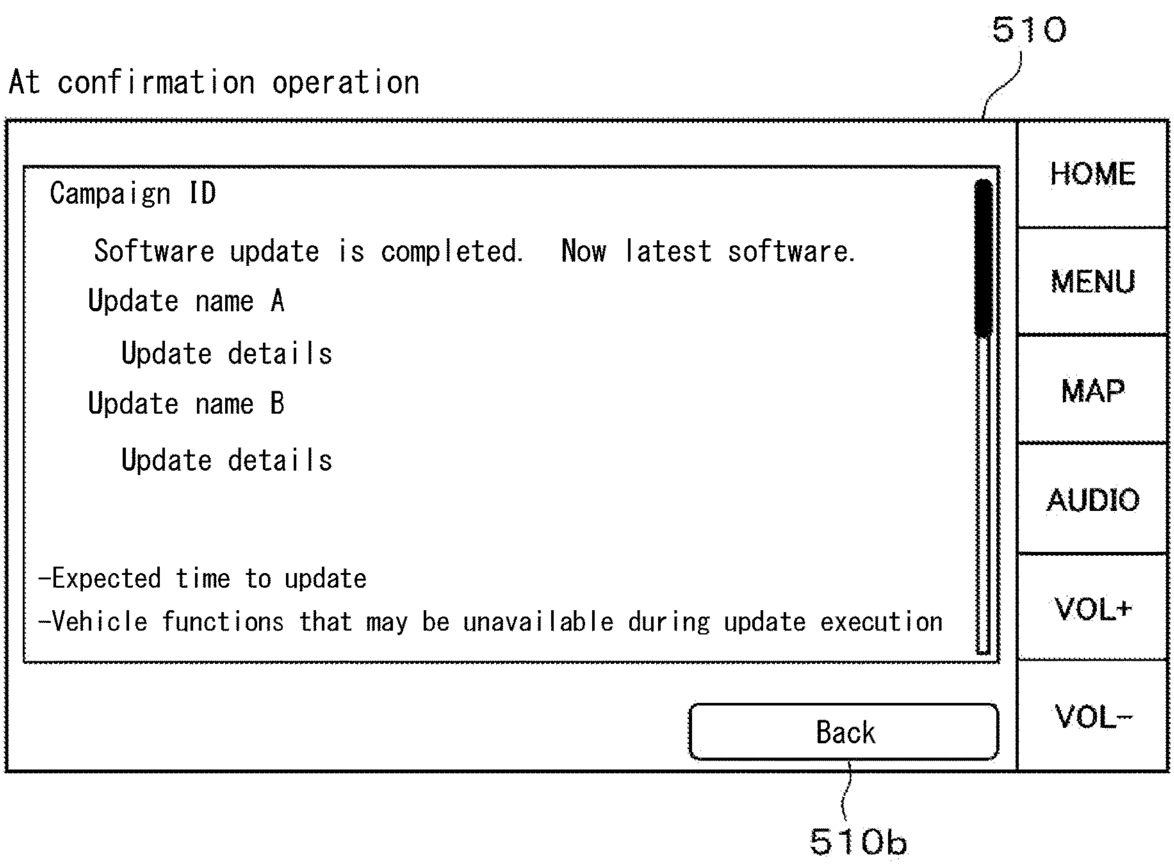
FIG. 46 is a diagram illustrating a screen during the check operation.

When the user operates the "details check" button 510*a* in this state, as illustrated in FIG. 46, the CGW 13 performs switching of display contents of the check operation screen 510, and displays details of the completion of the activation on the in-vehicle display 7. The CGW 13 displays a function added or changed due to the update as update details, and displays the "OK" button 510*b*. When the user operates the "OK" buttons 509*a* and 510*b*, the CGW 13 determines that the user has confirmed the software update completion.

As described above, the vehicle-side system 4 controls the respective operation phases such as the campaign notification, the download, the installation, the activation, and the update completion, and presents display corresponding to each operation phase to the user. In the above description, the CGW 13 is configured to control the display, but the in-vehicle display 7 may be configured to receive an operation phase or distribution specification data from the CGW 13 and to perform the display.

Figure 233:
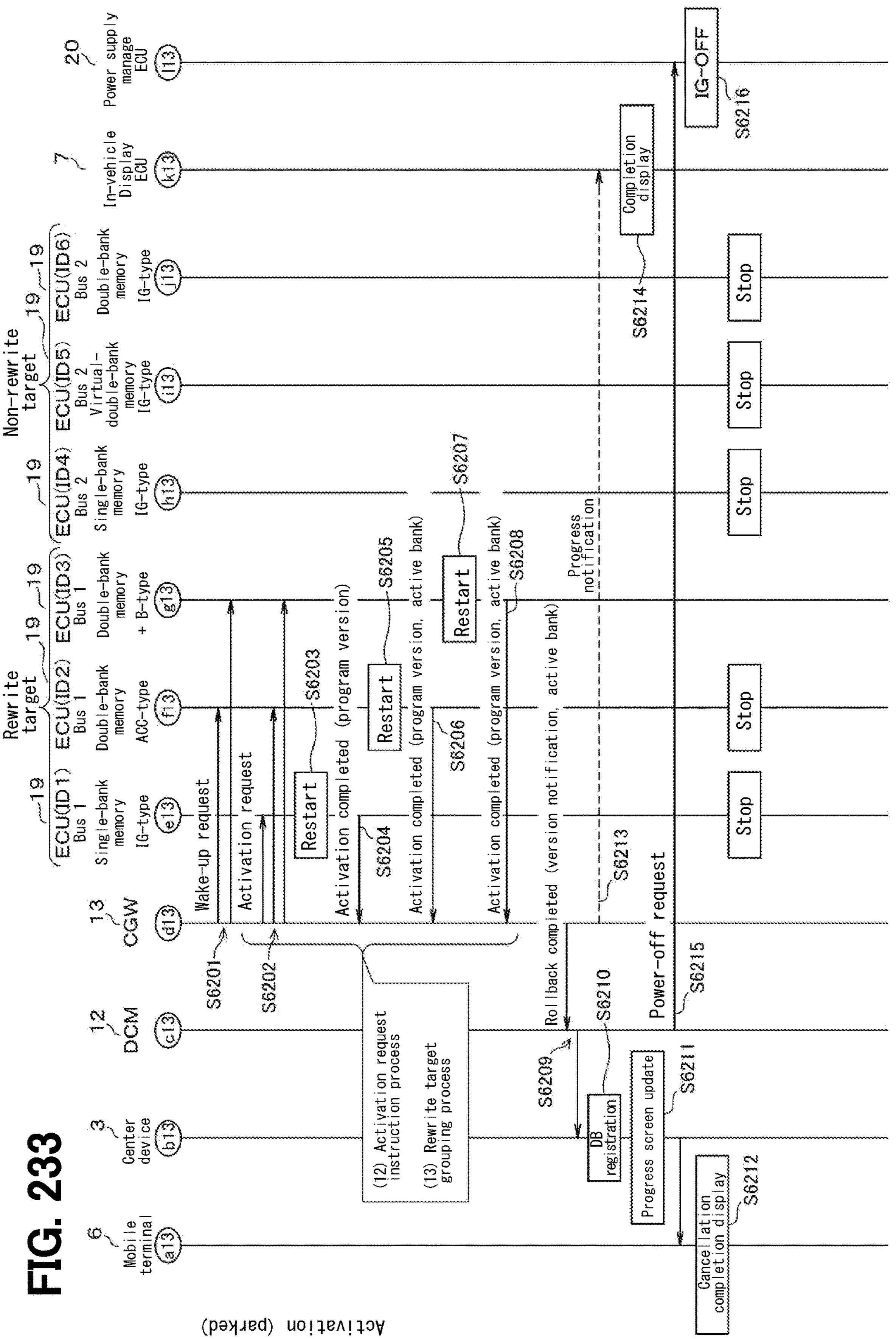
FIG. 233 is an overall sequence diagram illustrating an aspect of rewriting the application program.

Next, characteristic processes performed by the vehicle program rewriting system 1 will be described with reference to FIGS. 47 to 233. The vehicle program rewriting system 1 performs the following characteristic processes.

(1) Distribution package transmission determination process
(2) Distribution package download determination process
(3) Write data transfer determination process
(4) Write data acquisition determination process
(5) Installation instruction determination process
(6) Security access key management process
(7) Write data verification process
(8) Data storage bank information transmission control process
(9) Non-rewrite target power supply management process
(10) File transfer control process
(11) Write data distribution control process
(12) Activation request instruction process
(13) Activation execution control process
(14) Rewrite target group management process
(15) Rollback execution control process
(16) Rewrite progress situation display control process
(17) Difference data consistency determination process
(18) Rewrite execution control process
(19) Session establishment process
(20) Retry point specifying process
(21) Progress state synchronization control process
(22) Display control information transmission control process
(23) Display control information reception control process
(24) Screen display control process for progress display
(25) Program update notification control process
(26) Self-retention power execution control process Each of the center device 3, the DCM 12, the CGW 13, the ECU 19, and the in-vehicle display 7 has the following functional blocks as configurations for performing the characteristic processes (1) to (26) described above.

Figure 47:
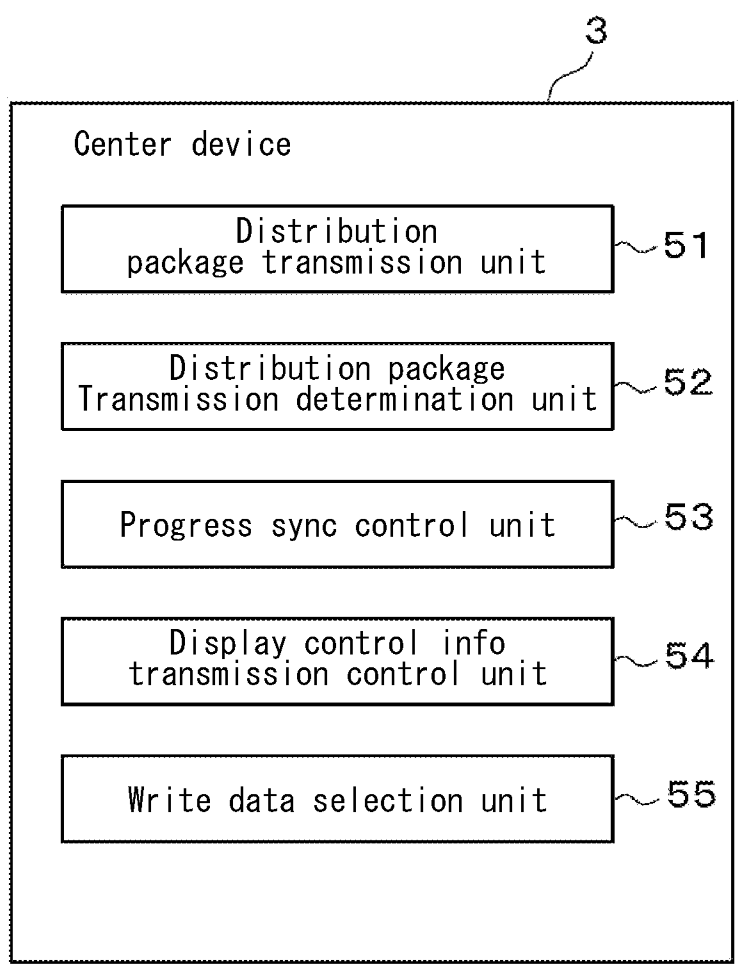
FIG. 47 is a functional block diagram of a center device.

As illustrated in FIG. 47, the center device 3 includes a distribution package transmission unit 51. When a download request for a distribution package is received from the DCM 12, the distribution package transmission unit 51 transmits the distribution package to the DCM 12. In addition to the above-described configuration, the center device 3 includes a distribution package transmission determination unit 52, a progress state synchronization control unit 53, a display control information transmission control unit 54, and a write data selection unit 55 (corresponding to an update data selection unit) as a configuration of performing the characteristic processes. When data storage bank information is received from the master device 11, the write data selection unit 55 (corresponding to an update data selection unit) selects write data compliant to an inactive bank on the basis of a software version and an active bank specified by the received data storage bank information. That is, the distribution package transmission unit 51 transmits the distribution package including the write data selected by the write data selection unit 55 to the DCM 12. The functional blocks performing the characteristic processes will be described later.

Figure 48:
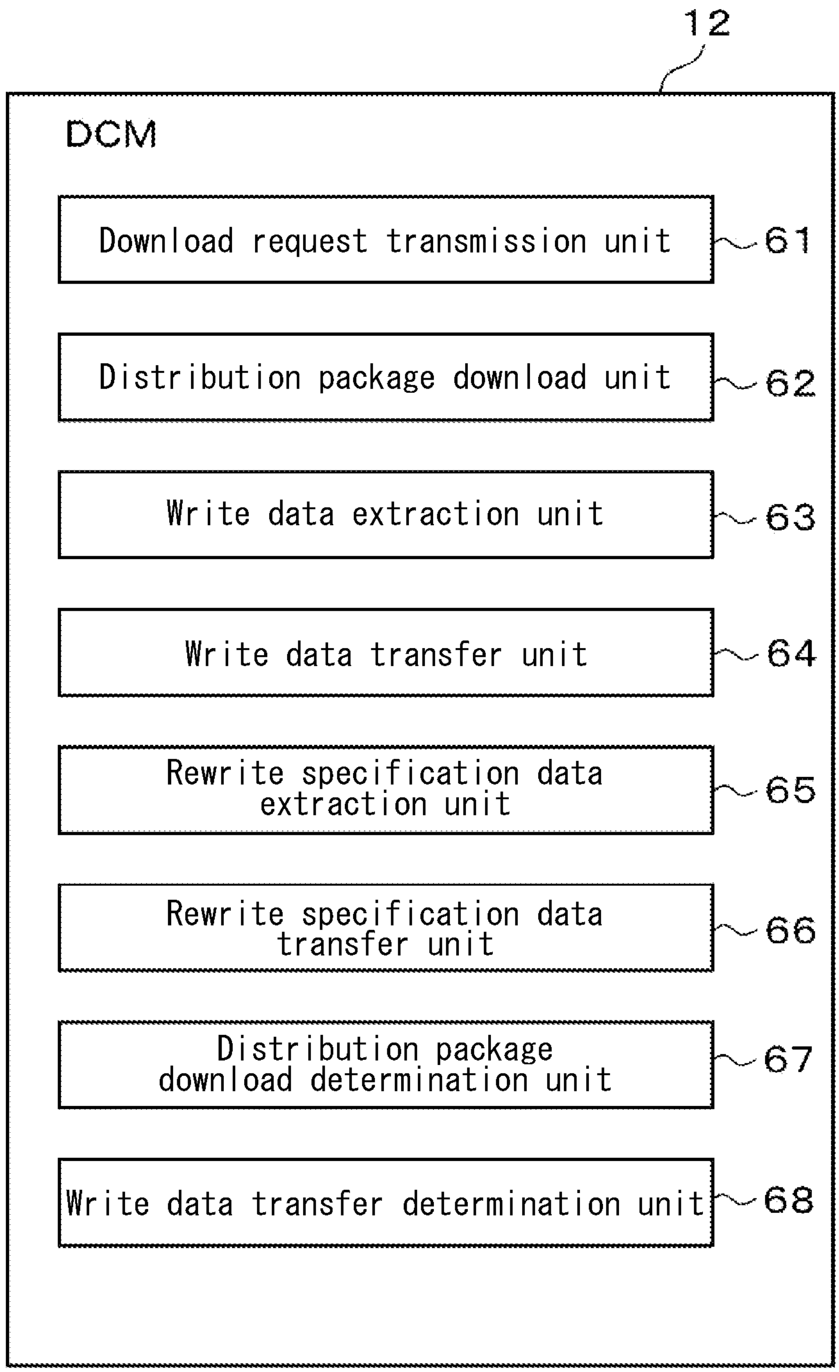
FIG. 48 is a functional block diagram of the DCM.

As illustrated in FIG. 48, the DCM 12 includes a download request transmission unit 61, a distribution package download unit 62, a write data extraction unit 63, a write data transfer unit 64, a rewrite specification data extraction unit 65, and a rewrite specification data transfer unit 66. The download request transmission unit 61 transmits a download request for a distribution package to the center device 3. The distribution package download unit 62 downloads the distribution package from the center device 3. When the distribution package is downloaded from the center device 3 by the distribution package download unit 62, the write data extraction unit 63 extracts write data from the downloaded distribution package.

When the write data is extracted from the distribution package by the write data extraction unit 63, the write data transfer unit 64 transfers the extracted write data to the CGW 13. When the distribution package is downloaded from the center device 3 by the distribution package download unit 62, the rewrite specification data extraction unit 65 extracts rewrite specification data from the downloaded distribution package. When rewrite specification data is extracted from the distribution package by the rewrite specification data extraction unit 56, the rewrite specification data transfer unit 66 transfers the extracted rewrite specification data to the CGW 13. In addition to the above-described configuration, the DCM 12 includes a distribution package download determination unit 67 and a write data transfer determination unit 68 as a configuration of performing the characteristic processes. The functional blocks performing the characteristic processes will be described later.

Figure 49:
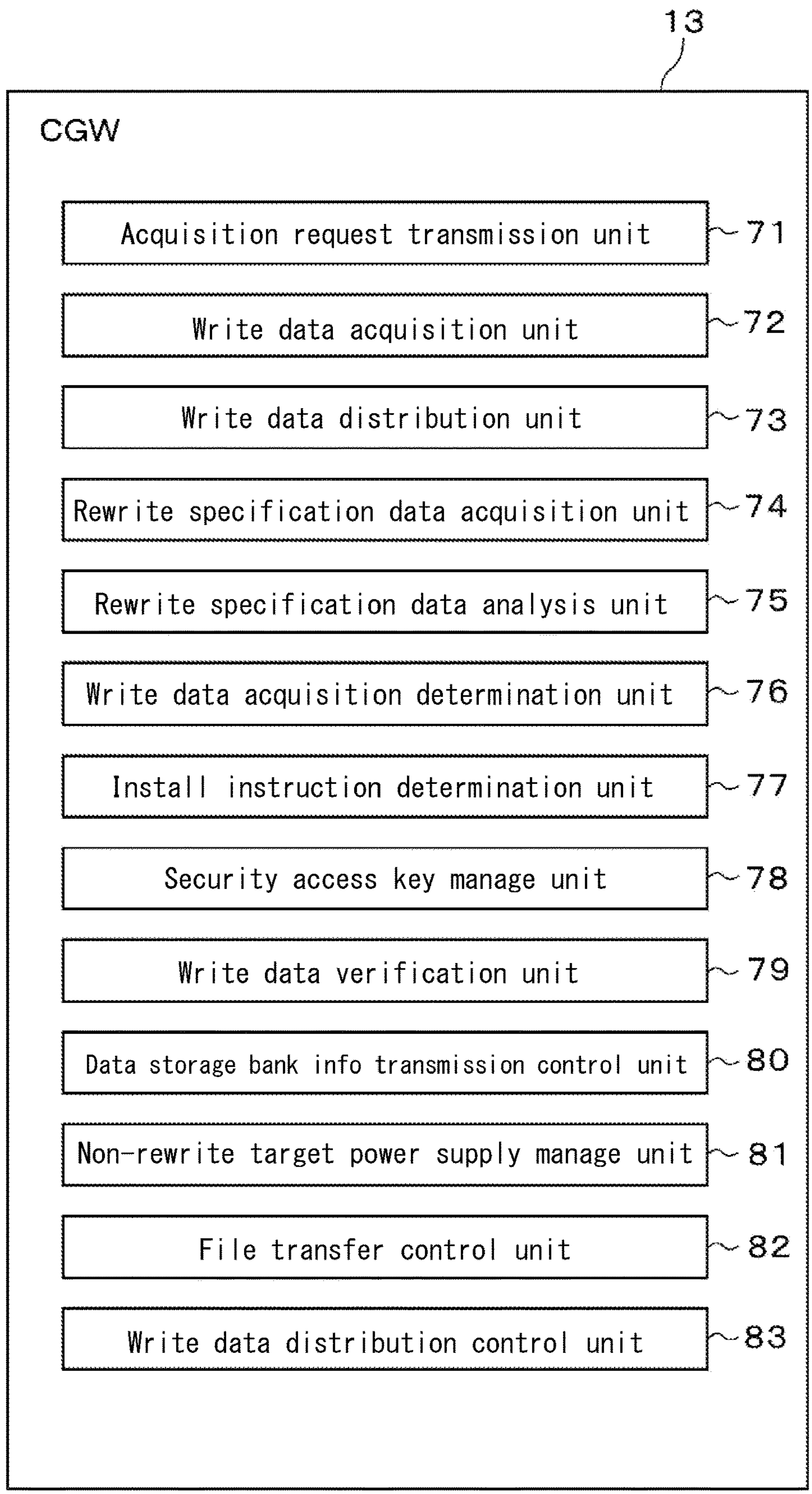
FIG. 49 is a functional block diagram of the CGW.
Figure 50:
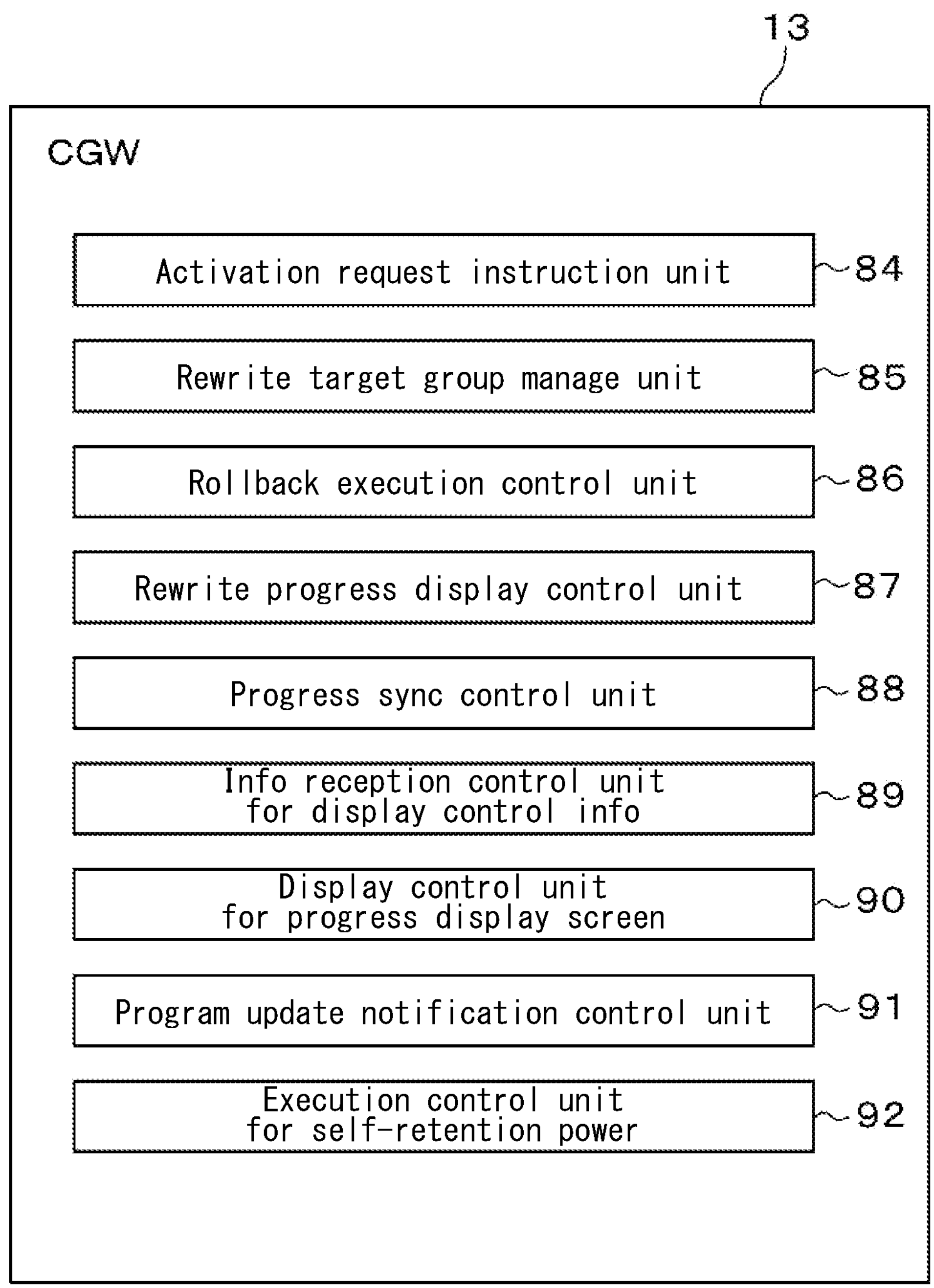
FIG. 50 is a functional block diagram of the CGW.

As illustrated in FIGS. 49 and 50, the CGW 13 includes an acquisition request transmission unit 71, a write data acquisition unit 72 (corresponding to an update data storage unit), a write data distribution unit 73 (corresponding to an update data distribution unit), a rewrite specification data acquisition unit 74, and a rewrite specification data analysis unit 75. The write data acquisition unit 72 acquires write data from the DCM 12 due to transfer of the write data from the DCM 12. In a case where the write data is acquired by the write data acquisition unit 72, the write data distribution unit 73 distributes the acquired write data to the rewrite target ECU 19 when the distribution timing of the write data is reached. The rewrite specification data acquisition unit 74 acquires rewrite specification data from the DCM 12 due to transfer of the rewrite specification data from the DCM 12. When the rewrite specification data is acquired by the rewrite specification data acquisition unit 74, the rewrite specification data analysis unit 75 analyzes the acquired rewrite specification data.

In addition to the above-described configuration, the CGW 13 includes, as a configuration of performing the characteristic processes, a write data acquisition determination unit 76, an installation instruction determination unit 77, a security access key management unit 78, a write data verification unit 79, a data storage bank information transmission control unit 80, a non-rewrite target power supply management unit 81, a file transfer control unit 82, a write data distribution control unit 83, an activation request instruction unit 84, a rewrite target group management unit 85, a rollback execution control unit 86, a rewrite progress situation display control unit 87, a progress state synchronization control unit 88, a display control information reception control unit 89, a progress display screen display control unit 90, a program update notification control unit 91, and a self-retention power execution control unit 92. The functional blocks performing the characteristic processes will be described later.

Figure 51:
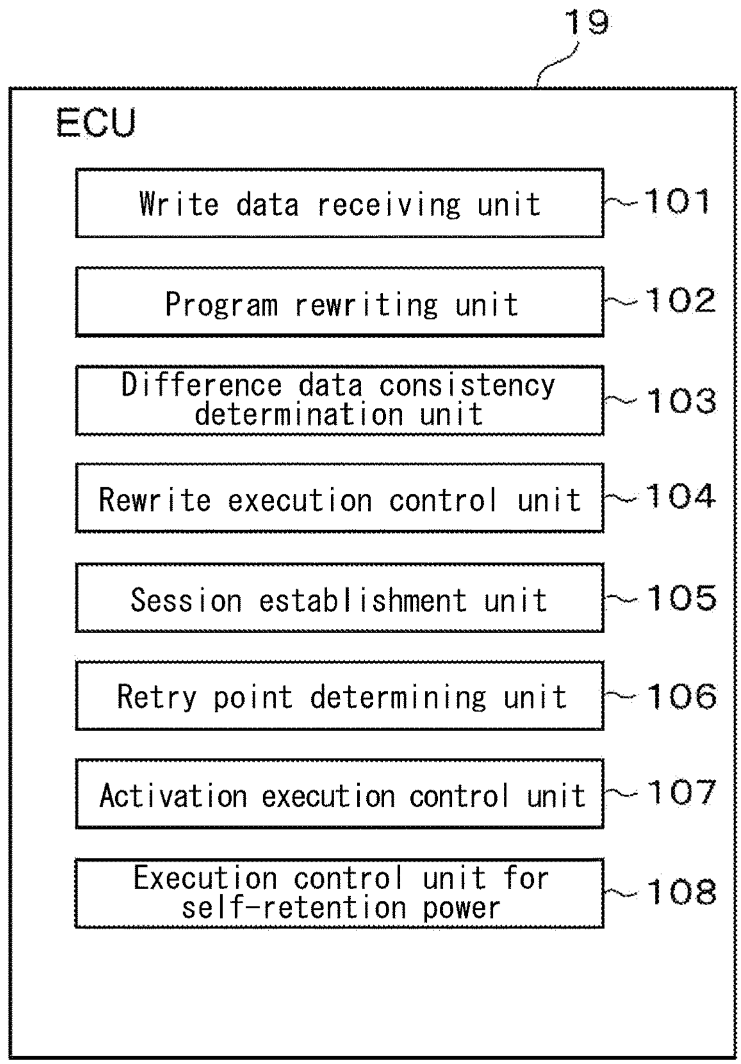
FIG. 51 is a functional block diagram of the ECU.

As illustrated in FIG. 51, the ECU 19 includes a write data receiving unit 101 and a program rewriting unit 102. The write data receiving unit 101 receives write data from the CGW 13. When the write data is received from the CGW 13 by the write data receiving unit 101, the program rewriting unit 102 writes the received write data into a flash memory and thus rewrites an application program. In addition to the above-described configuration, the ECU 19 includes a difference data consistency determination unit 103, a rewrite execution control unit 104, a session establishment unit 105, a retry point specifying unit 106, an activation execution control unit 107, and a self-retention power execution control unit 108 as a configuration of performing the characteristic processes. The functional blocks performing the characteristic processes will be described later.

Figure 52:
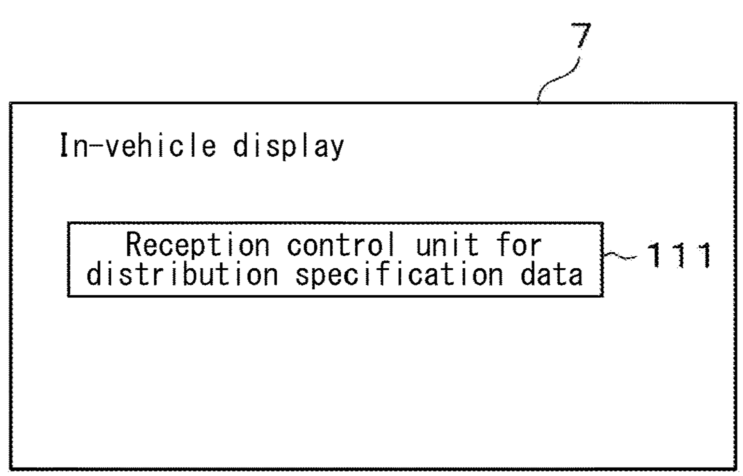
FIG. 52 is a functional block diagram of an in-vehicle display.

As illustrated in FIG. 52, the in-vehicle display 7 includes a distribution specification data reception control unit 111. The distribution specification data reception control unit 111 controls reception of distribution specification data.

Hereinafter, each of the processes (1) to (26) described above will be described in order.

(1) Distribution Package Transmission Determination Process and (2) Distribution Package Download Determination Process The distribution package transmission determination process in the center device 3 will be described with reference to FIGS. 53 and 54, and the distribution package download determination process in the master device 11 will be described with reference to FIGS. 55 and 56.

Figure 53:
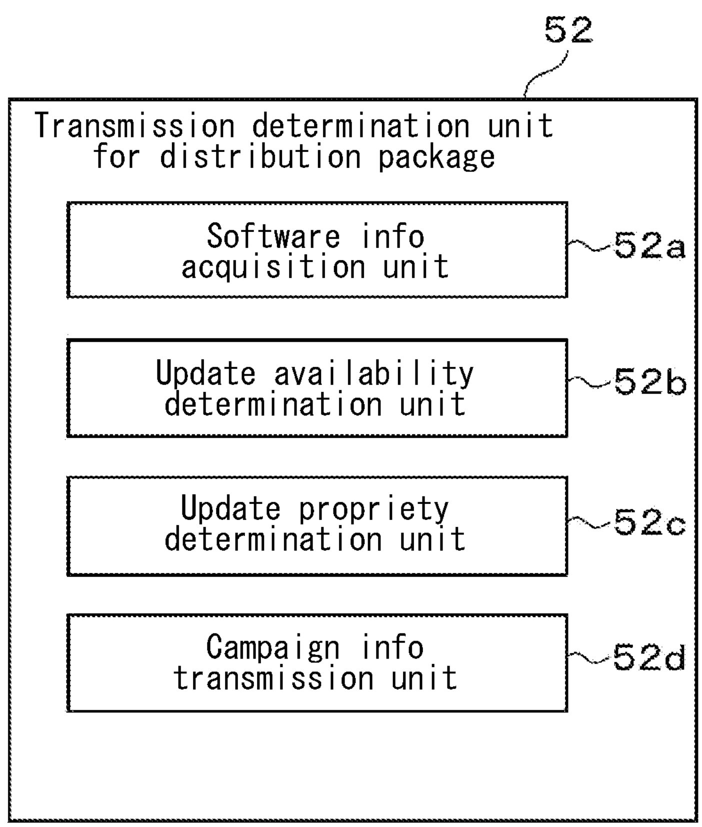
FIG. 53 is a functional block diagram of a distribution package transmission determination unit.
Figure 54:
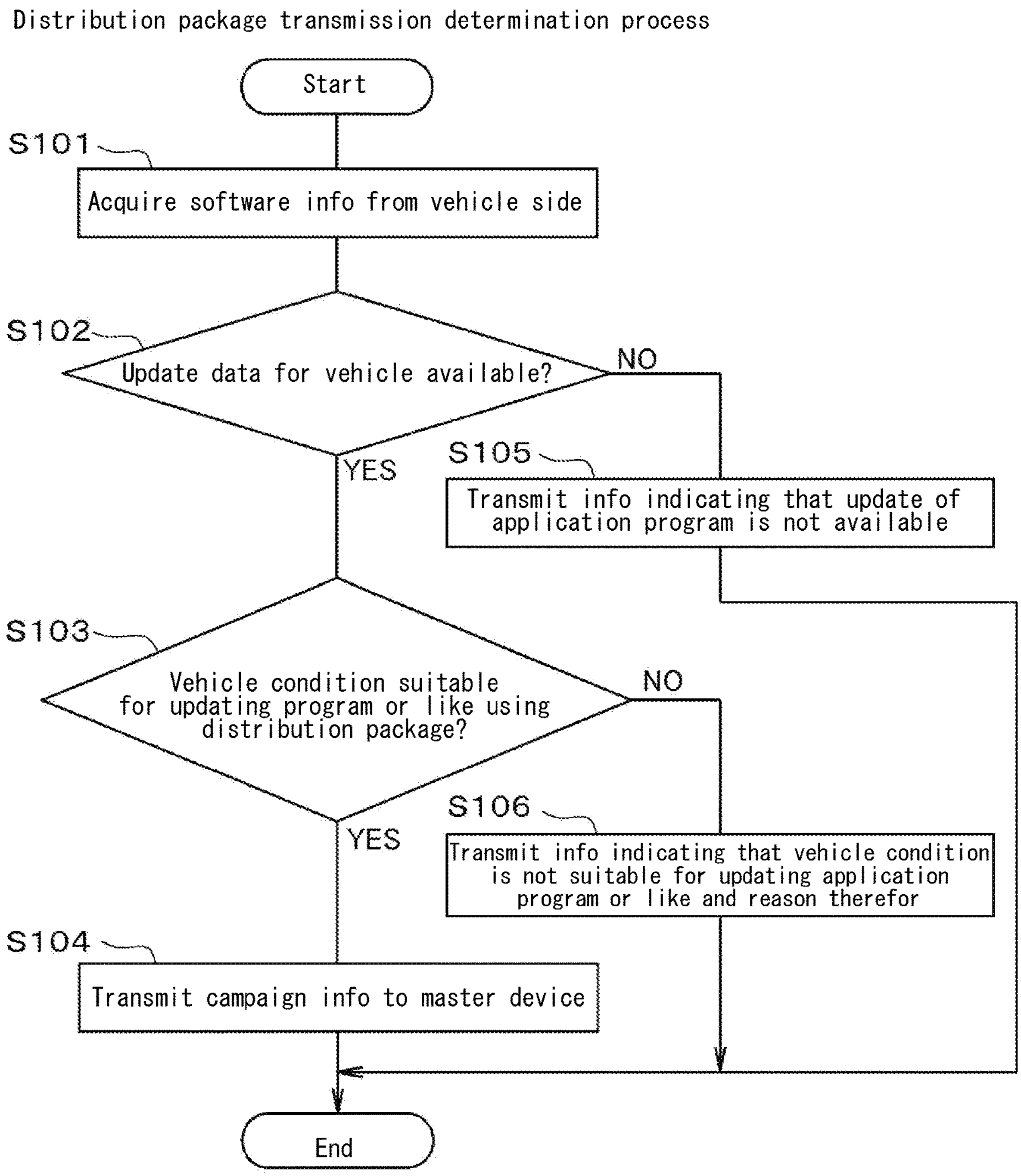
FIG. 54 is a flowchart illustrating a distribution package transmission determination process.

As illustrated in FIG. 53, the center device 3 includes a software information acquisition unit 52*a*, an update availability determination unit 52*b*, an update propriety determination unit 52*c*, and a campaign information transmission unit 52*d* in the distribution package transmission determination unit 52. The software information acquisition unit 52*a* acquires software information of each ECU 19 from the vehicle side. Specifically, the software information acquisition unit 52*a* acquires ECU configuration information including software information such as a version and a write bank and hardware information from the vehicle side. The software information acquisition unit 52*a* may acquire vehicle condition information such as a trouble code, setting of an anti-theft alarm function, and license contract information from the vehicle side in combination with the ECU configuration information.

When the software information is acquired by the software information acquisition unit 52*a*, the update availability determination unit 52*b* determines whether or not availability of update data for the vehicle on the basis of the acquired software information. That is, the update availability determination unit 52*b* compares a version of the acquired software information with a version of the latest software information managed by the update availability determination unit 52*b*, to determine whether both of the versions match each other, and thus determines availability of update data for the vehicle. The update availability determination unit 52*b* determines that there is no update data for the vehicle when it is determined that both of the versions match each other, and determines that update data for the vehicle is available when it is determined that both of the versions do not match each other.

When it is determined by the update availability determination unit 52*b* that update data for the vehicle is available, the update propriety determination unit 52*c* determines whether or not a vehicle condition is a condition suitable for updating a program or the like using a distribution package. Specifically, the update propriety determination unit 52*c* determines whether or not a license contract is established, whether or not a vehicle position is within a predetermined range registered in advance by the user, whether or not a setting of an alarm function of the vehicle is validated, whether or not trouble information regarding the ECU 19 is generated, and determines whether or not a vehicle condition is a condition suitable for downloading a distribution package. That is, the update propriety determination unit 52*c* determines whether or not the vehicle is a vehicle in which a program would be updated against the intention of the user, or a vehicle in which installation would fail after download even when the download is successful.

When it is determined that the license contract is established, the vehicle position is within a predetermined range registered in advance by the user, the setting of the alarm function of the vehicle is validated, and the trouble information regarding the ECU 19 is not issued, the update propriety determination unit 52*c* determines that the vehicle condition is a condition suitable for updating a program or the like using a distribution package. The update propriety determination unit 52*c* determines that the vehicle condition is not a condition suitable for updating a program or the like using a distribution package when it is determined that at least any of the following is true: the license contract is not established, the vehicle position is not within a predetermined range registered in advance by the user, the setting of the alarm function of the vehicle is not validated, and the trouble information regarding the ECU 19 is generated.

The campaign information transmission unit 52*d* transmits campaign information to the master device 11 when the update propriety determination unit 52*c* determines that the vehicle condition is a condition suitable for updating a program or the like using a distribution package. The campaign information transmission unit 52*d* does not transmit the campaign information to the master device 11 when it is determined by the update propriety determination unit 52*c* that the vehicle condition is not a condition suitable for updating a program or the like using a distribution package. The campaign information transmission unit 52*d* performs the determination described above, and thus stores information regarding a vehicle in which the campaign information is not transmitted to the master device 11. The center device 3 may display the information regarding a vehicle in which the campaign information is not transmitted to the master device 11.

Next, an operation of the distribution package transmission determination unit 52 in the center device 3 will be described with reference to FIG. 54. The center device 3 executes a distribution package transmission determination program and performs a distribution package transmission determination process.

When the distribution package transmission determination process is initiated, the center device 3 acquires software information from the vehicle side (S101; corresponding to a software information acquisition step). That is, the center device 3 determines whether or not software update for the vehicle is available. The center device 3 determines availability of update data for the vehicle on the basis of the acquired software information (S102; corresponding to an update availability determination step). When it is determined that update data for the vehicle is available (S102: YES), the center device 3, it is determined whether the vehicle condition is in a condition suitable for updating the program or the like using the distribution package (S103; corresponding to an update propriety determination step). When it is determined that the vehicle condition is a condition suitable for updating a program or the like using a distribution package (S103: YES), the center device 3 transmits campaign information to the master device 11 (S104; corresponding to a campaign information transmission step), and finishes the distribution package transmission determination process.

When it is determined that update data for the vehicle is not available (S102: NO), the center device 3 transmits, to the master device 11, information indicating that the vehicle is not a distribution package transmission target, that is, update of an application program is not available (S105), and finishes the transmission determination process of the distribution package. When it is determined that the vehicle condition is not a condition suitable for updating a program or the like using the distribution package (S103: NO), the center device 3 transmits, to the master device 11, information indicating that the vehicle condition is not suitable for updating a program or the like and the reason therefor (S106), and finishes the distribution package transmission determination process. In this case, the master device 11 displays, on the in-vehicle display 7, the information indicating that the vehicle condition is not suitable for updating a program or the like and the reason therefor. For example, when a license contract is not established, the master device 11 displays the content that "the program cannot be updated because the license is not valid; please contact your dealer" on the in-vehicle display 7. Consequently, it is possible to present the reason why the vehicle condition is not suitable for updating a program or the like to the user, and thus to present appropriate information to the user.

As described above, the center device 3 can determine whether or not a condition is suitable for updating a program or the like using a distribution package by performing the distribution package transmission determination process before transmitting the distribution package to the master device 11 and before transmitting campaign information. The center device 3 can transmit campaign information to the master device 11 so as to transmit a distribution package to the master device 11 only in a case where it is determined that a condition is suitable for updating a program or the like using the distribution package.

The center device 3 can transmit the campaign information to the master device 11 in a case where a license contract is established, a vehicle position is within a predetermined range registered in advance by the user, a setting of an alarm function of the vehicle is validated, and trouble information regarding the ECU 19 is not generated as a case where a condition is suitable for updating a program or the like using a distribution package. That is, the center device 3 can prevent a situation in which the campaign information is transmitted to the master device 11 even if the license contract is not established, the vehicle position is out of a predetermined range such as a position far away from the home, the setting of the alarm function of the vehicle is invalidated, or the trouble information regarding the ECU 19 is generated. As described above, the center device 3 can prevent the campaign information from being transmitted to the master device 11 for a vehicle in which a program update would be unintended for the user, or installation would fail after download even when the download is successful.

The center device 3 may perform the distribution package transmission determination process during transmission of a distribution package. In this case, when it is determined that a vehicle condition is suitable for updating a program using the distribution package during the transmission of the distribution package, the center device 3 continues the transmission of the distribution package, but, when it is determined that the vehicle condition is not suitable for updating a program using the distribution package during transmission of the distribution package, the center device stops transmission of the distribution package. That is, the center device 3 stops the transmission of the distribution package, for example, when trouble information regarding the ECU 19 is issued during the transmission of the distribution package.

Next, a description will be made of a process in the master device 11 that has received the campaign information transmitted from the center device 3. The distribution package download determination process in the master device 11 will be described with reference to FIGS. 55 and 56. The vehicle program rewriting system 1 performs the distribution package download determination process in the master device 11. The above-described distribution package transmission determination process (1) is a determination process performed by the center device 3 in the campaign notification phase before the download phase, but the distribution package download determination process is a determination process performed by the master device 11 in the download phase. In the present embodiment, a description will be made of a case where the DCM 12 performs the distribution package download determination process in the master device 11, but the CGW 13 may have the function of the DCM 12 to perform the distribution package download determination process.

Figure 55:
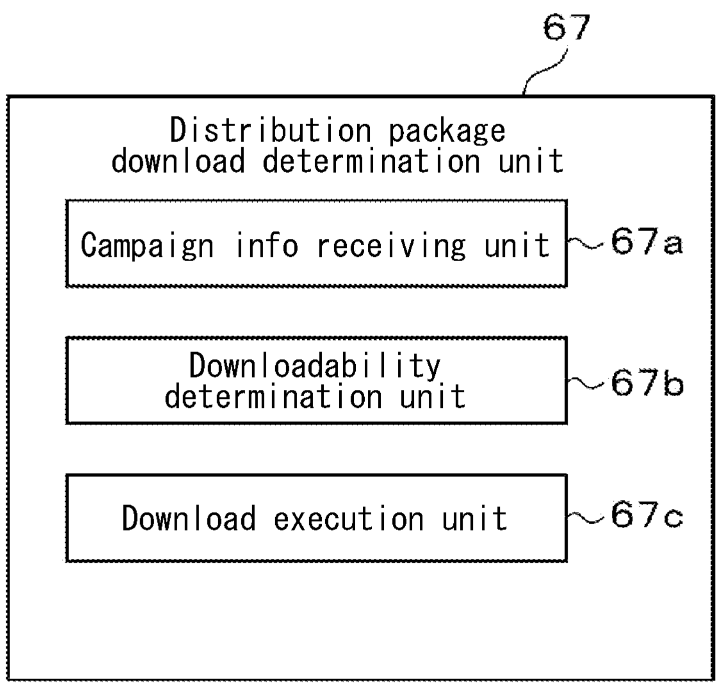
FIG. 55 is a functional block diagram of a distribution package download determination unit.
Figure 56:
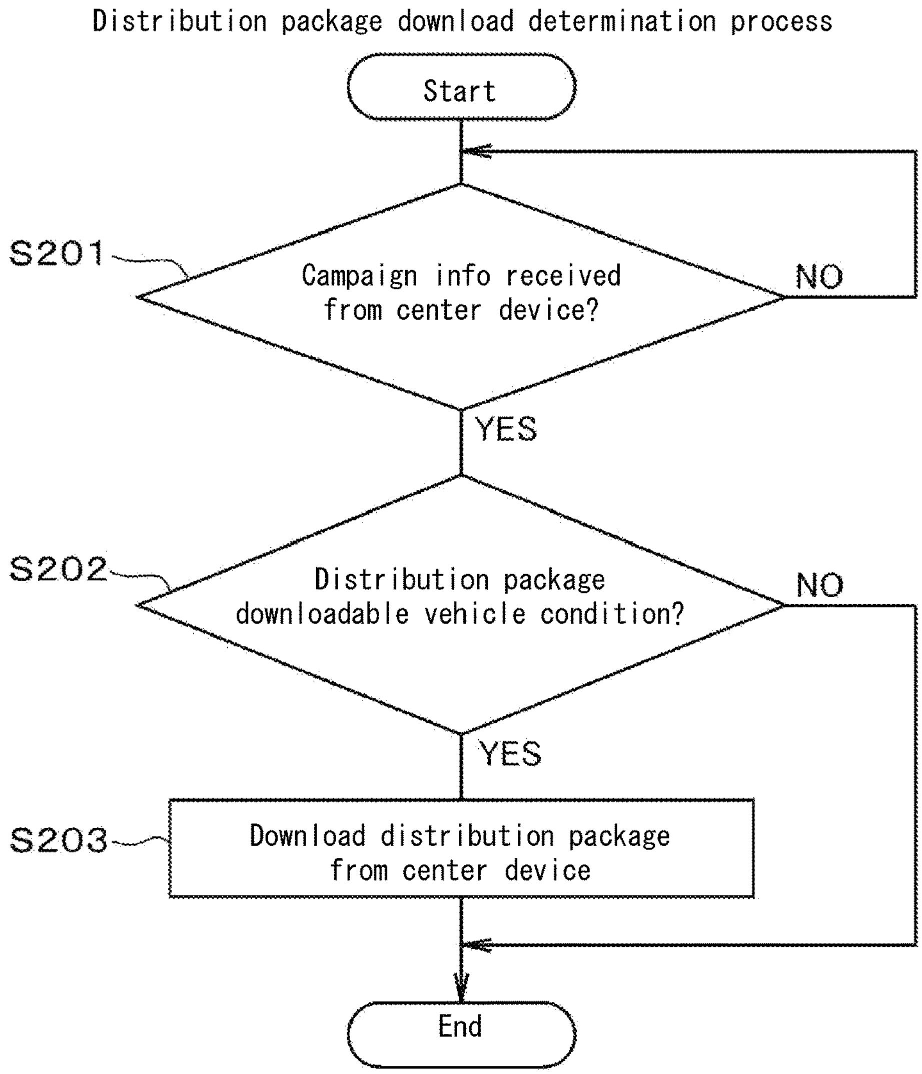
FIG. 56 is a flowchart illustrating a distribution package download determination process.

As illustrated in FIG. 55, the DCM 12 includes a campaign information receiving unit 67*a*, a downloadability determination unit 67*b*, and a download execution unit 67*c* in the distribution package download determination unit 67. The campaign information receiving unit 67*a* receives campaign information from the center device 3. When the campaign information is received from the center device 3, the campaign notification icon 501*a* illustrated in FIG. 32 is displayed. When the campaign information is received by the campaign information receiving unit 67*a*, the downloadability determination unit 67*b* determines whether or not a vehicle condition is a condition in which the distribution package is downloadable. That is, the downloadability determination unit 67*b* determines whether or not a radio wave environment for communicating with the center device 3 is favorable, whether or not a remaining battery charge of the vehicle battery 40 is equal to or greater than a predetermined capacity, and whether or not a free memory capacity of the DCM 12 is equal to or larger than a predetermined capacity, and determines whether or not a vehicle condition is a condition in which the distribution package is downloadable.

When it is determined that the radio wave environment is favorable, the remaining battery charge of the vehicle battery 40 is equal to or greater than the predetermined capacity, and the free memory capacity of the DCM 12 is equal to or larger than the predetermined capacity, the downloadability determination unit 67*b* determines that the vehicle condition is a condition in which the distribution package is downloadable. The downloadability determination unit 67*b* determines that the vehicle condition is not a condition in which the distribution package is downloadable when it is determined that at least any of the following is true: the radio wave environment is not favorable, and the remaining battery charge of the vehicle battery 40 is not equal to or greater than the predetermined capacity, and the free memory capacity of the DCM 12 is not equal to or larger than the predetermined capacity.

As mentioned above, the downloadability determination unit 67*b* determines whether or not there is a possibility that the download cannot be completed normally. The determination in the downloadability determination unit 67*b* is performed on the condition that the "download initiation" button 503*a* is operated by the user on the download approval screen 503 illustrated in FIGS. 34 and 35. The downloadability determination unit 67*b* may be configured to determine a determination item in the center device 3. That is, the downloadability determination unit 67*b* determines that the vehicle is in a downloadable condition, for example, in a case where the setting of the alarm function of the vehicle is validated or the trouble information regarding the ECU 19 is not generated.

The download execution unit 67*c* downloads the distribution package from the center device 3 when the downloadability determination unit 67*b* determines that the vehicle condition is a condition in which the distribution package is downloadable. That is, the download execution unit 67*c* executes download of the distribution package after confirming that the download can be completed normally.

The download execution unit 67*c* does not download the distribution package from the center device 3 when the downloadability determination unit 67*b* determines that the vehicle condition is not a condition in which the distribution package is downloadable. That is, the download execution unit 67*c* does not execute download of the distribution package in a case where there is a possibility that the download cannot be completed normally. In this case, the download execution unit 67*c* instructs the in-vehicle display 7 to display a pop-up screen indicating that the download cannot be initiated and the reason therefor on the navigation screen 501.

Next, a description will be made of an operation of the distribution package download determination unit 67 in the master device 11 with reference to FIG. 56. The master device 11 executes a distribution package download determination program and thus performs the distribution package download determination process.

The master device 11 receives campaign information from the center device 3 when the distribution package download determination process is initiated (S201; corresponding to a campaign information receipt step). The master device 11 determines whether or not a vehicle condition is a condition in which the distribution package is downloadable (S202; corresponding to a downloadability determination step). When it is determined that the vehicle condition is a condition in which the distribution package is downloadable (S202: YES), the master device 11 downloads the distribution package corresponding to the campaign from the center device 3 (S203; corresponding to a download execution step), and finishes the distribution package download determination process. When it is determined that the vehicle condition is not a condition in which the distribution package is downloadable (S202: NO), the master device 11 does not download the distribution package from the center device 3 and ends the distribution package download determination process.

As described above, the master device 11 can determine whether or not a vehicle condition is a condition in which a distribution package is downloadable by performing the distribution package download determination process before downloading the distribution package from the center device 3. The master device 11 can download the distribution package only when the vehicle condition is a condition in which the distribution package is downloadable.

The master device 11 can download the distribution package from the center device 3 when the radio wave environment is favorable, the remaining battery charge of the vehicle battery 40 is equal to or greater than the predetermined capacity, and the free memory capacity of the DCM 12 is equal to or larger than the predetermined capacity, as a case suitable for downloading the distribution package. That is, in a case where the radio wave environment is not favorable, the remaining battery charge of the vehicle battery 40 is less than the predetermined capacity, or the free memory capacity of the DCM 12 is smaller than the predetermined capacity, it is possible to prevent a situation in which the distribution package is downloaded from the center device 3.

The master device 11 may perform the distribution package download determination process during download of the distribution package. In this case, when it is determined that the vehicle condition is a condition in which the distribution package is downloadable during download of the distribution package, the master device 11 continues download of the distribution package from the center device 3, but, when it is determined that the vehicle condition is not a condition in which the distribution package is downloadable during download of the distribution package, the master device stops download of the distribution package from the center device 3. That is, the master device 11 stops download of the distribution package, for example, in a case where the radio wave environment becomes unfavorable, the remaining battery charge of the vehicle battery 40 becomes less than the predetermined capacity, or the free memory capacity of the DCM 12 becomes smaller than the predetermined capacity, during download of the distribution package.

In the above-described way, the center device 3 determines whether or not the vehicle is a vehicle in which a program update would be unintended for the user, or installation would be likely to fail, and the master device 11 determines whether or not there is a possibility that the download would fail in the master device 11, so that transmission of unnecessary campaign information and a distribution package from the center device 3 to the master device 11 can be avoided.

The center device 3 has the following configuration. The center device includes the software information acquisition unit 52*a* acquiring software information of an electronic control unit from a vehicle side, the update availability determination unit 52*b* determining availability of update data for the vehicle on the basis of the software information acquired by the software information acquisition unit, the update propriety determination unit 52*c* determining whether or not a vehicle condition is a condition suitable for update in a case where it is determined by the update availability determination unit that update data is available, and the campaign information transmission unit 52*d* transmitting campaign information regarding update to a vehicle master device in a case where it is determined by the update propriety determination unit that the vehicle condition is a condition suitable for the update.

The master device 11 has the following configuration. The master device includes the campaign information receiving unit 67*a* receiving campaign information from a center device, the downloadability determination unit 67*b* determining whether or not a vehicle condition is a condition in which a distribution package is downloadable in a case where the campaign information is received by the campaign information receiving unit, and the download execution unit 67*c* downloading the distribution package from the center device in a case where it is determined by the downloadability determination unit that the vehicle condition is a condition in which the distribution package is downloadable.

(3) Write Data Transfer Determination Process, (4) Write Data Acquisition Determination Process, and (5) Installation Instruction Determination Process The write data transfer determination process will be described with reference to FIGS. 57 and 58, the write data acquisition determination process will be described with reference to FIGS. 59 and 60, and the installation instruction determination process will be described with reference to FIGS. 61 to 64. The vehicle program rewriting system 1 performs the write data transfer determination process in the DCM 12. Here, a state is assumed in which a distribution package transmitted from the center device 3 to the DCM 12 is unpackaged, and write data is extracted from the distribution package.

Figure 57:
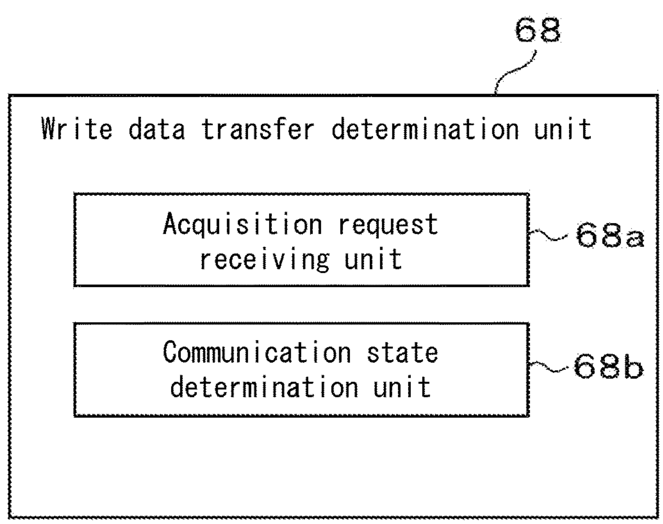
FIG. 57 is a functional block diagram of a write data transfer determination unit.
Figure 58:
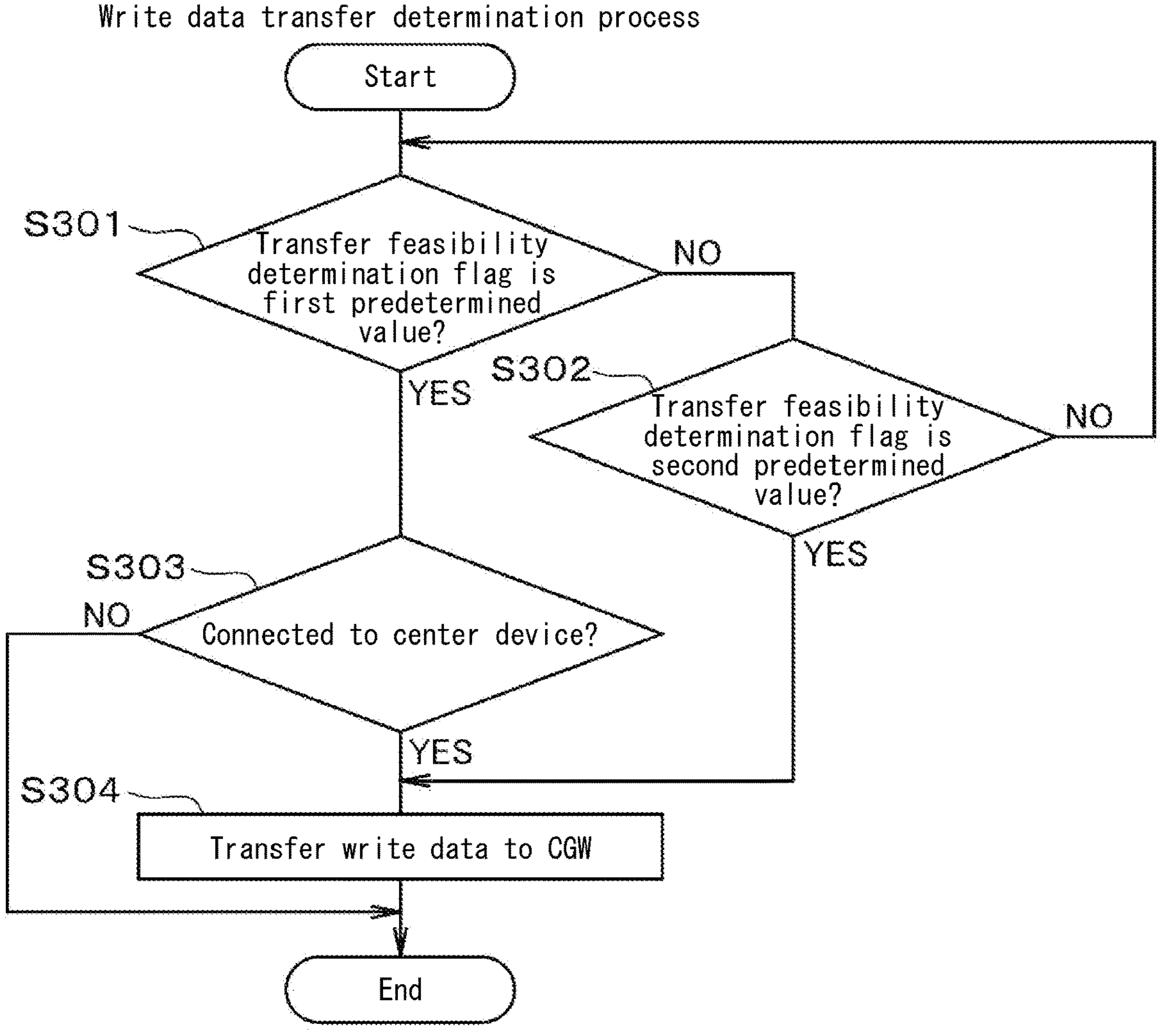
FIG. 58 is a flowchart illustrating a write data transfer determination process.

As illustrated in FIG. 57, the DCM 12 includes an acquisition request receiving unit 68*a* and a communication state determination unit 68*b* in the write data transfer determination unit 68. The acquisition request receiving unit 68*a* receives an acquisition request for a write data from the CGW 13. When the acquisition request of the write data is received by the acquisition request receiving unit 68*a*, the communication state determination unit 68*b* determines a state of data communication between the center device 3 and the DCM 12, for example, in a case where a transfer feasibility determination flag set in advance by the user has a first predetermined value. The transfer feasibility determination flag has, for example, 1 (first predetermined value) in a case where a predetermined condition is checked during installation, 0 (second predetermined value) in a case where the check is omitted. The write data transfer unit 64 transfers the write data to the CGW 13 on the condition that the communication state determination unit 68*b* determines that the data communication between the center device 3 and the DCM 12 is in a connection state.

Next, with reference to FIG. 58, an operation of the write data transfer determination unit 68 in the DCM 12 will be described. The DCM 12 executes a write data transfer determination program and thus performs the write data transfer determination process. Here, a description will be made of a process in a case where the CGW 13 requests the DCM 12 to acquire the write data in response to an installation instruction from the center device 3.

When it is determined that an acquisition request for the write data from the CGW 13 has been received, the DCM 12 initiates the write data transfer determination process. When the write data transfer determination process is initiated, the DCM 12 determines the transfer feasibility determination flag (S301 and S302). When it is determined that the transfer feasibility determination flag has the first predetermined value (S301: YES), the DCM 12 determines a state of data communication between the center device 3 and the DCM 12 (S303). When it is determined that the data communication between the center device 3 and the DCM 12 is in a connection state (S303: YES), the DCM 12 transfers the write data to the CGW 13 (S304) and finishes the write data transfer determination process. When it is determined that the data communication between the center device 3 and the DCM 12 is not in a connection state but in a disconnection state (S303: NO), the DCM 12 does not transfer the write data to the CGW 13 and finishes the write data transfer determination process.

When it is determined that the transfer feasibility determination flag has the second predetermined value (S302: YES), the DCM 12 transfers the write data to the CGW 13 without determining a state of the data communication between the center device 3 and the DCM 12, and finishes the write data transfer determination process.

As described above, the DCM 12 performs the write data transfer determination process prior to transfer of the write data to the CGW 13, and determines a state of a data communication between the center device 3 and the DCM 12 in a case where the transfer feasibility determination flag has the first predetermined value. When it is determined that the data communication is in a connection state, the DCM 12 initiates transfer of the write data, and when it is determined that the data communication is in a disconnection state, the DCM 12 waits without initiating transfer of the write data. In a situation in which data communication with the center device 3 is possible, the write data can be transferred to the CGW 13, and installation can be performed in the rewrite target ECU 19.

For example, in a case where there are a plurality of rewrite target ECUs 19 and installation takes time, the in-vehicle-side system 4 can notify the center device 3 of an installation progress situation, and the mobile terminal 6 can display the progress situation one by one. The DCM 12 may perform the write data transfer determination process during transfer of the write data. In this case, when it is determined that data communication is in a connection state during the transfer of the write data, the DCM 12 continues the transfer of the write data, but when it is determined that the data communication is in a disconnection state during the transfer of the write data, the DCM stops the transfer of the write data.

Next, the write data acquisition determination process will be described. The vehicle program rewriting system 1 performs the write data acquisition determination process in the CGW 13. (3) The write data transfer determination process is a determination process performed by the DCM 12 in the installation phase, and the write data acquisition determination process is a determination process performed by the CGW 13 in the same installation phase.

Figure 59:
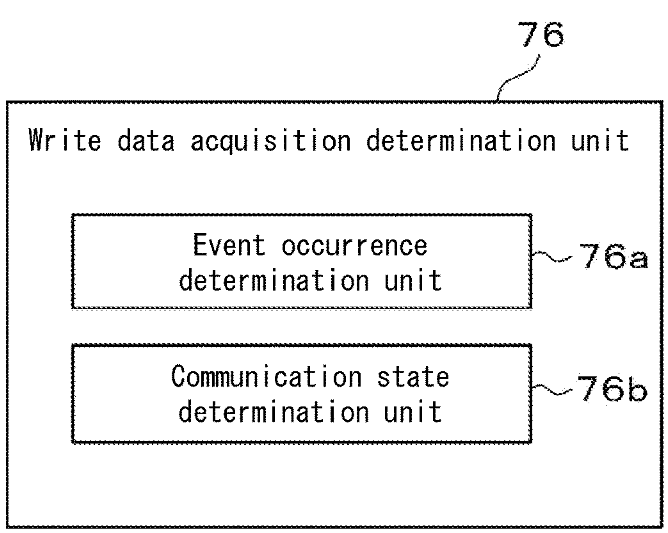
FIG. 59 is a functional block diagram of a write data acquisition determination unit.
Figure 60:
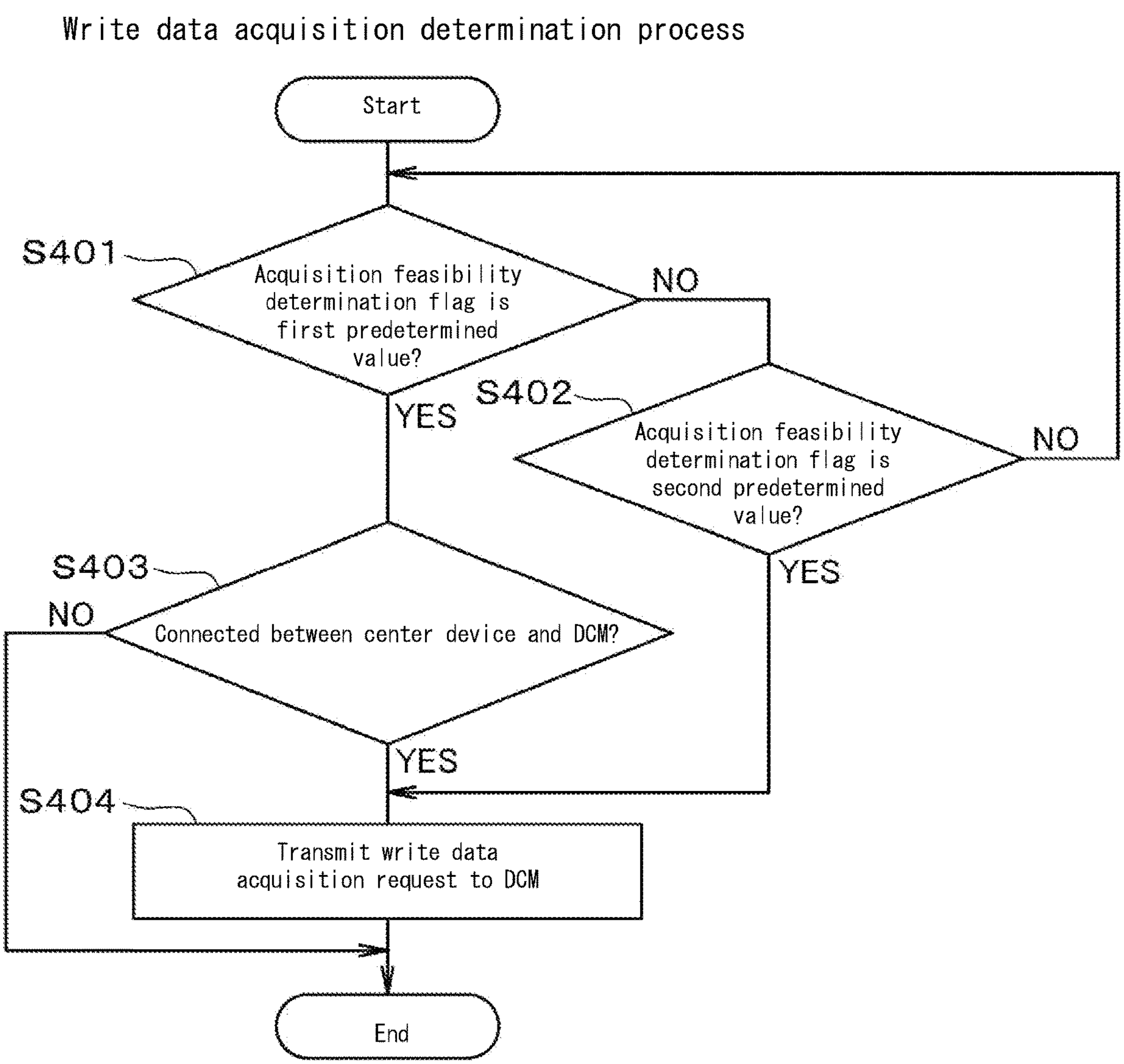
FIG. 60 is a flowchart illustrating a write data acquisition determination process.

As illustrated in FIG. 59, the CGW 13 includes an event occurrence determination unit 76*a* and a communication state determination unit 76*b* in the write data acquisition determination unit 76. The event occurrence determination unit 76*a* determines the occurrence of an event of an acquisition request (installation instruction) for the write data from the center device 3. When the occurrence of the event of the acquisition request of the write data is determined by the event occurrence determination unit 76*a*, the communication state determination unit 76*b* determines a state of data communication between the center device 3 and the DCM 12, for example, in a case where an acquisition feasibility determination flag set in advance by the user has a first predetermined value. The acquisition feasibility determination flag has, for example, 1 (first predetermined value) when a predetermined condition during installation, 0 (second predetermined value) in a case where the check is omitted. Here, the event occurrence determination unit 76*a* may determine the event occurrence on the basis of the user having given an instruction for installation, and determines that an event of an acquisition request for the write data has occurred, for example, when a notification that the user has performed an installation instruction (refer to FIG. 39) on the in-vehicle display 7 is received.

Next, with reference to FIG. 60, an operation of the write data acquisition determination unit 76 in the CGW 13 will be described. The CGW 13 executes a write data acquisition determination program and thus performs the write data acquisition determination process.

When it is determined that the event of the request to acquire the write data has occurred, the CGW 13 initiates the write data acquisition determination process. When the write data acquisition determination process is initiated, the CGW 13 determines the acquisition feasibility determination flag (S401 and S402). When it is determined that the acquisition feasibility determination flag has the first predetermined value (S401: YES), the CGW 13 determines a state of data communication between the center device 3 and the DCM 12 (S403). When it is determined that data communication between the center device 3 and the DCM 12 is a connection state (S403: YES), the CGW 13 transmits an acquisition request for the write data to the DCM 12 (S404), and finishes the write data acquisition determination process. Thereafter, when the write data is transferred from the DCM 12, the CGW 13 distributes the transferred write data to the rewrite target ECU 19. When it is determined that the data communication between the center device 3 and the DCM 12 is not in a connection state but is in a disconnection state (S403: NO), the CGW 13 does not transmit the acquisition request for the write data to the DCM 12 and finishes the write data acquisition determination process.

When it is determined that the acquisition feasibility determination flag has the second predetermined value (S402: YES), the CGW 13 transmits an acquisition request the write data to the DCM 12 without determining a state of the data communication between the center device 3 and the DCM 12, and finishes the write data acquisition determination process.

As described above, the CGW 13 performs the write data acquisition determination process prior to acquisition of the write data from the DCM 12, and determines a state of the data communication between the center device 3 and the DCM 12 in a case where the acquisition feasibility determination flag has the first predetermined value. When it is determined that the data communication is in a connection state, the CGW 13 initiates acquisition of the write data, and, when it is determined that the data communication is in a disconnection state, the CGW waits without initiating acquisition of the write data. In a situation in which communication with the center device 3 is possible, the write data can be acquired from the DCM 12, and installation can be performed in the rewrite target ECU 19.

For example, in a case where there are a plurality of rewrite target ECUs 19 and installation takes time, the in-vehicle-side system 4 can notify the center device 3 of an installation progress situation, and the mobile terminal 6 can display the progress situation one by one. The CGW 13 may perform the write data acquisition determination process during acquisition of the write data. In this case, when it is determined that the data communication is in a connection state during the acquisition of the write data, the CGW 13 continues the acquisition of the write data, but when it is determined that the data communication is in a disconnection state during the acquisition of the write data, the CGW stops the acquisition of the write data.

Next, the write data acquisition determination described above will be described in more detail. Acquisition of the write data is one of the processes related to installation, and the installation instruction determination process will be described here with reference to FIGS. 61 to 64. The vehicle program rewriting system 1 performs the installation instruction determination process in the CGW 13. (1) The distribution package transmission determination process and (2) the distribution package download determination process are determination processes performed in the download phase, (3) the write data transfer determination process and (4) the write data acquisition determination process are processes performed in the installation phase after download is completed, and (5) the installation instruction determination process is a process performed in the installation phase and the activation phase. Here, a state is assumed in which a distribution package is downloaded to the DCM 12, and, as illustrated in FIG. 10, the write data (update data or difference data) for the write target ECU 19 is unpackaged.

Figure 61:
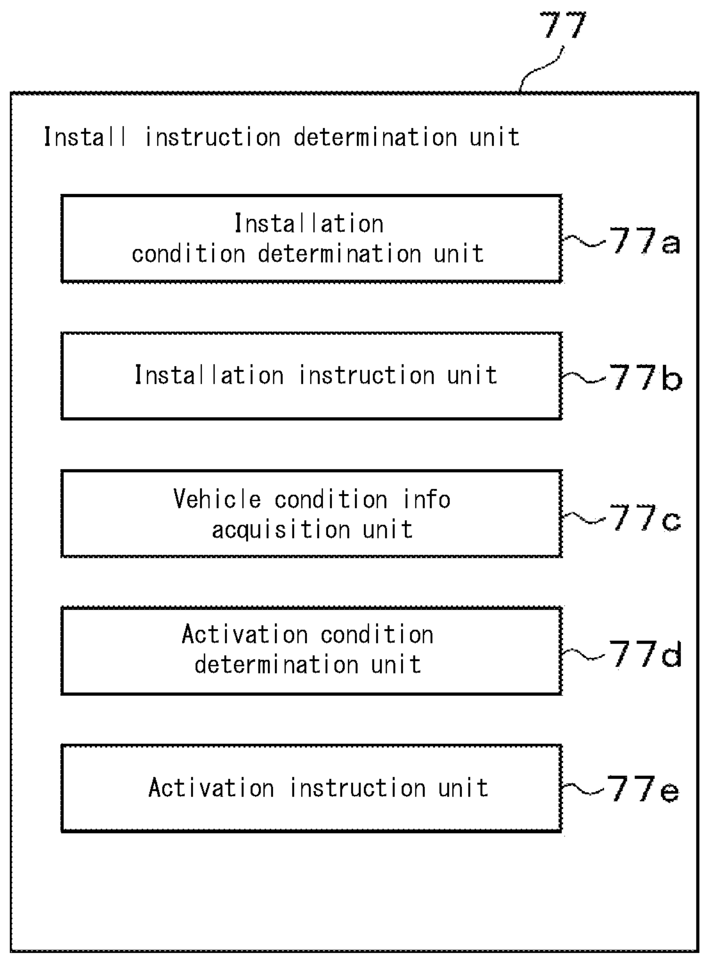
FIG. 61 is a functional block diagram of an installation instruction determination unit.

As illustrated in FIG. 61, the CGW 13 includes an installation condition determination unit 77*a*, an installation instruction unit 77*b*, a vehicle condition information acquisition unit 77*c*, an activation condition determination unit 77*d*, and an activation instruction unit 77*e* in the installation instruction determination unit 77. The installation condition determination unit 77*a* determines whether or not a first condition, a second condition, a third condition, a fourth condition, and a fifth condition are established. The first condition is a condition that the user's approval for installation is obtained. The user approval for installation indicates a user's approval operation for installation (for example, pressing the "immediate update" button 506*a*) on the screen illustrated in FIG. 39, for example. Alternatively, operations from download to activation may be regarded as one update, and the user's approval operation for update may be regarded as the above user's approval operation for installation.

The second condition is a condition that the CGW 13 can perform data communication with the center device 3. The third condition is a condition that a vehicle condition is an installable condition. The fourth condition is a condition that installation can be performed in the rewrite target ECU 19. Here, the fourth condition includes not only that installation can be performed in a rewrite target ECU 19 which is an installation target, but also that installation can be performed in another rewrite target ECU 19 that cooperates with the rewrite target ECU 19 which is the installation target. The fifth condition is a condition that the write data is normal data. Here, the normal data includes data suitable for the rewrite target ECU 19, data that is not falsified, and the like.

When it is determined by the installation condition determination unit 77*a* that all of the first condition, the second condition, the third condition, the fourth condition, and the fifth condition are established, the installation instruction unit 77*b* instructs the rewrite target ECU 19 to install an application program. That is, when the installation instruction unit 77*b* obtains the user's approval for the installation, the CGW 13 can perform data communication with the center device 3, the vehicle condition is an installable condition, the installation can be performed in the rewrite target ECU 19, and it is determined by the installation condition determination unit 77*a* that the write data is normal data, the rewrite target ECU 19 is instructed to install the application program. Specifically, the installation instruction unit 77*b* acquires the write data from the DCM 12, and transfers the acquired write data to the rewrite target ECU 19. When it is determined by the installation condition determination unit 77*a* that at least any of the first condition, the second condition, the third condition, the fourth condition, and the fifth condition is not established, the installation instruction unit 77*b* does not instruct the rewrite target ECU 19 to install the application program, and waits or presents to the user information indicating that installation cannot be initiated and the reason therefor.

The vehicle condition information acquisition unit 77*c* acquires vehicle condition information from the center device 3. The activation condition determination unit 77*d* determines whether or not a sixth condition, a seventh condition, and an eighth condition are established when the installation of the application program has been completed in all of the rewrite target ECUs 19. The sixth condition is a condition that the user's approval for activation is obtained. The user's approval for the activation indicates the user's approval operation (for example, pressing the "OK" button 508*b*) for the activation on the screen illustrated in FIG. 43, for example. Alternatively, operations from download to activation may be regarded as one update, and the user's approval operation for update may be regarded as the above-mentioned approval operation for activation. The seventh condition is a condition that the vehicle condition is an activatable condition. The eighth condition is a condition that the rewrite target ECU 19 is in an activatable condition.

When it is determined by the activation condition determination unit 77*d* that all of the sixth condition, the seventh condition, and the eighth condition are established, the activation instruction unit 77*e* instructs the rewrite target ECU 19 to activate the application program. A detailed description will be made of the activation request instruction process (12) which will be described later. That is, the activation instruction unit 77*e* instructs the rewrite target ECU 19 to activate the application program when the activation condition determination unit 77*d* determines that the user's approval for the activation is obtained, the vehicle condition is an activatable condition, and the rewrite target ECU 19 is in an activatable condition. The activation is performed, and thus an update program written in the rewrite target ECU 19 is validated. When it is determined by the activation condition determination unit 77*d* that at least any of the sixth condition, the seventh condition, and the eighth condition is not established, the activation instruction unit 77*e* does not instruct the rewrite target ECU 19 to activate the application program, and waits or presents to the user information indicating that the activation cannot be initiated and the reason therefor.

Figure 62:
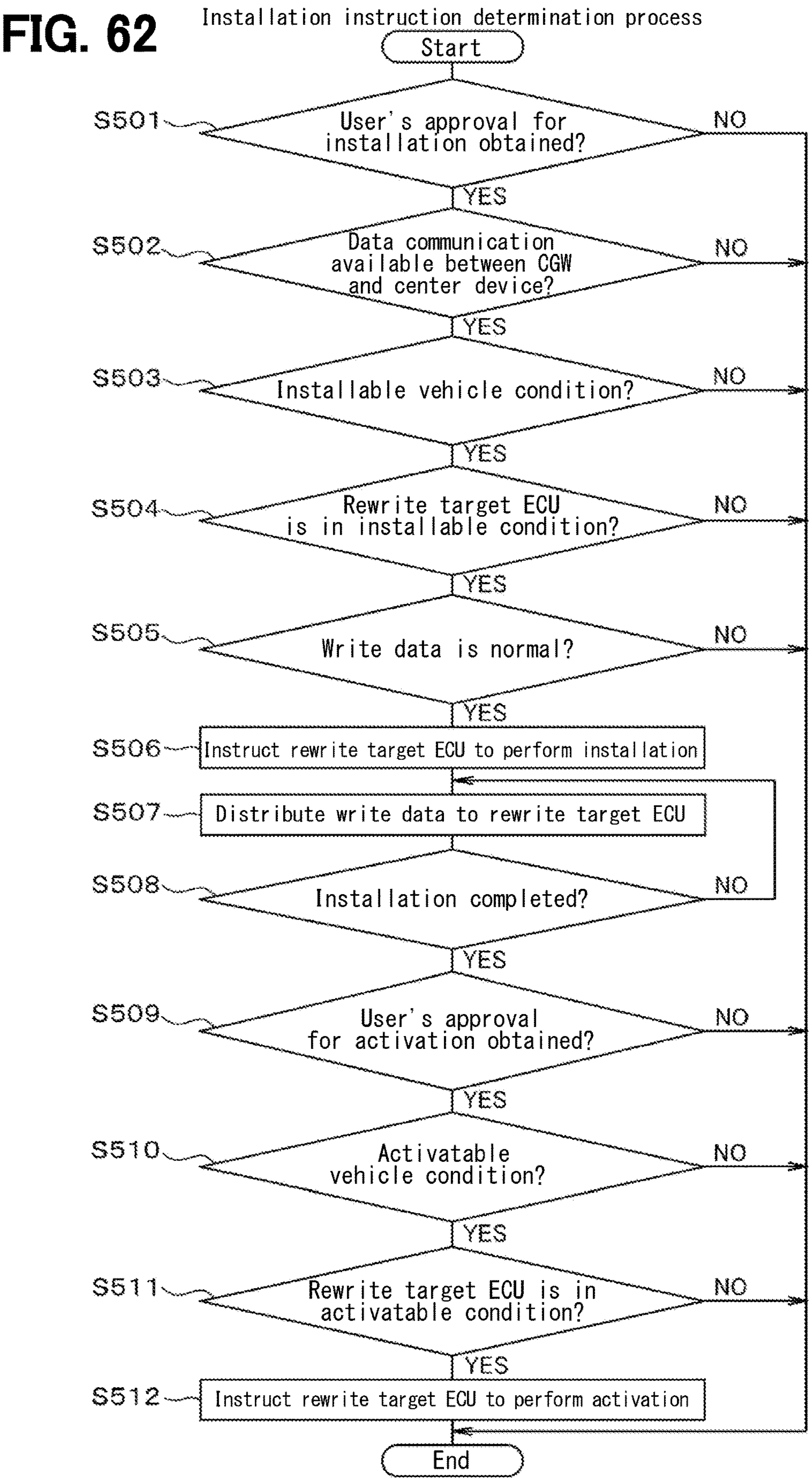
FIG. 62 is a flowchart illustrating an installation instruction determination process.
Figure 63:
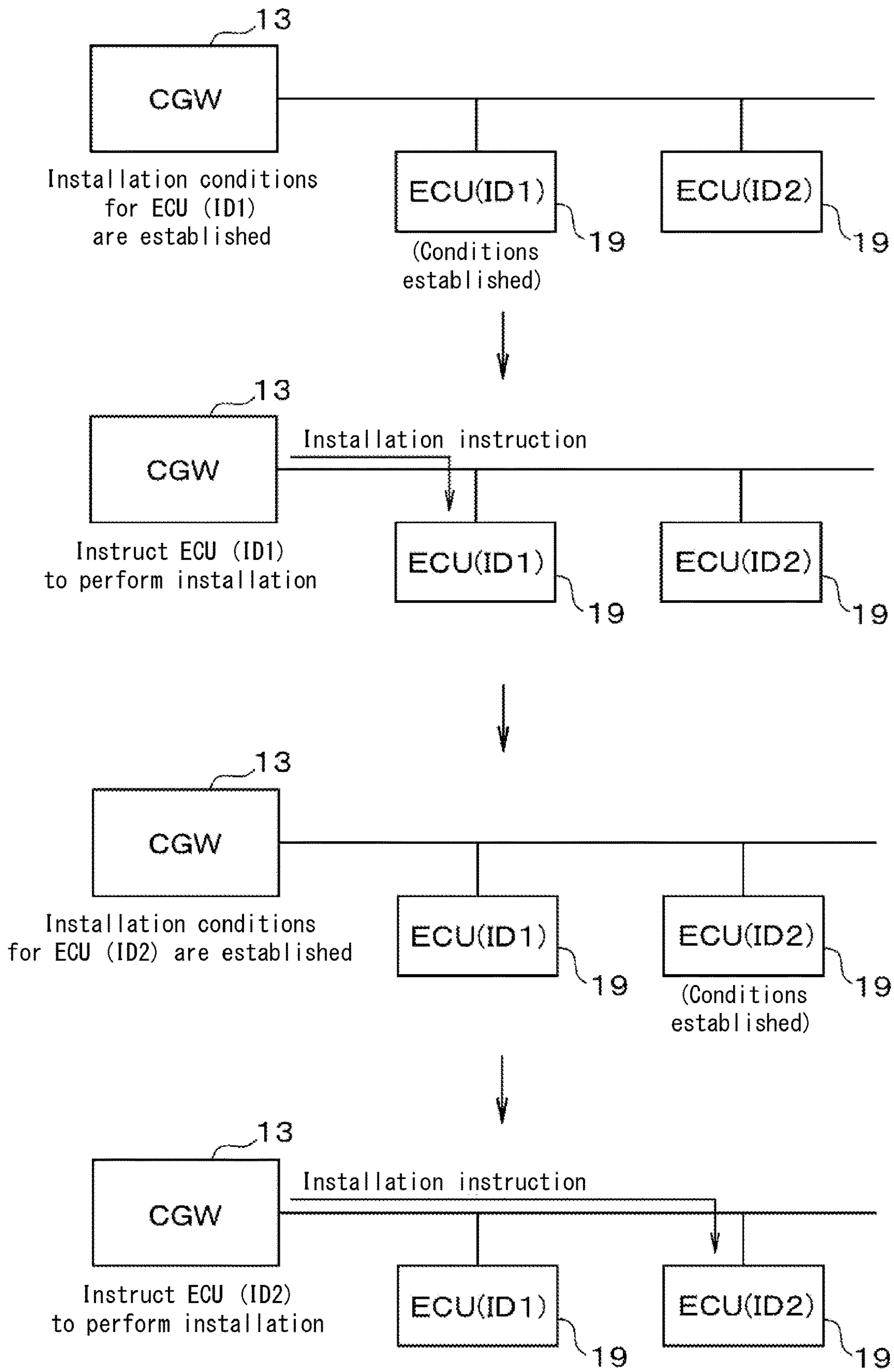
FIG. 63 is a diagram illustrating an aspect of giving an instruction for installation.

Next, an operation of the installation instruction determination unit 77 in the CGW 13 will be described with reference to FIGS. 62 to 64. The CGW 13 executes an installation instruction determination program and thus performs the installation instruction determination process.

When the installation instruction determination process is initiated, the CGW 13 determines whether or not the first condition is established, and determines whether or not the user's approval for the installation is obtained (S501; corresponding to a part of an installation condition determination step). When it is determined that the user's approval for installation is obtained (S501: YES), the CGW 13 determines whether or not the second condition is established, and determines whether or not data communication with the center device 3 is available (S502; corresponding to a part of the installation condition determination step). The CGW 13 determines whether or not data communication with the center device 3 is available on the basis of a communication radio wave status in the DCM 12.

When it is determined that data communication with the center device 3 is possible (S502: YES), the CGW 13 determines whether or not the third condition is established, and determines whether or not a vehicle condition is an installable condition (S503; corresponding to a part of the installation condition determination step). The CGW 13 determines, as the vehicle condition, for example, whether or not a remaining battery charge of the vehicle battery 40 is equal to or greater than a predetermined capacity, or whether or not the vehicle is in a parking state (IG OFF state) in a case where a memory configuration of the rewrite target ECU 19 is a single-bank memory, and thus determines whether or not the vehicle condition is an installable condition. The condition of the vehicle condition may refer to received rewrite specification data (refer to FIG. 8). The CGW 13 determines that the vehicle condition is an installable condition, for example, in a case where a remaining battery charge of the vehicle battery 40 is equal to or greater than a predetermined capacity specified in the rewrite specification data, and the vehicle condition matches a vehicle condition (installable only in a parking state, installable only in a traveling state, or installable in both the parking state and the traveling state) specified in the rewrite specification data.

When it is determined that the vehicle condition is an installable condition (S503: YES), the CGW 13 determines whether or not the fourth condition is established, and determines whether or not the rewrite target ECU 19 is in an installable condition (S504; corresponding to a part of the install condition determination step). The CGW 13 determines that the rewrite target ECU 19 is in an installable condition, for example, when a trouble code is not generated in the rewrite target ECU 19 and security access to the rewrite target ECU 19 is successful. Here, whether or not the trouble code is generated may be checked not only for the rewrite target ECU 19 to which the write data is written but also for another ECU 19 performing cooperative control with the rewrite target ECU 19. That is, the CGW 13 determines whether or not the trouble code is generated not only for the rewrite target ECU 19 but also for the ECU 19 performing cooperative control with the rewrite target ECU 19.

When it is determined that the rewrite target ECU 19 is an installable condition (S504: YES), the CGW 13 determines whether or not the fifth condition is established, and determines whether or not the write data is normal data (S505; corresponding to a part of an installation condition determination step). The CGW 13 determines that the write data is normal data when the write data matches a write bank (inactive bank) of the rewrite target ECU 19, and a verification result of the integrity of the write data is normal. When it is determined that the write data is normal data (S505: YES), the CGW 13 instructs the rewrite target ECU 19 to install the application program (S506; corresponding to an installation instruction step), and thus the CGW 13 performs determination of the second condition and the subsequent conditions on the condition that the first condition is satisfied. The CGW 13 determines the fifth condition at the end. When it is determined that all of the first to fifth conditions are established, the CGW 13 instructs the rewrite target ECU 19 to install the application program.

On the other hand, when the CGW 13 determines that the user's approval for installation is not obtained (S501: NO), determines that data communication with the center device 3 is not possible (S502: NO), determines that the vehicle condition is not an installable condition (S503: NO), determines that the rewrite target ECU 19 is not in an installable condition (S504: NO), or determines that the write data is not normal data (S505: NO), the CGW does not instruct the rewrite target ECU 19 to install the application program. In the above-described process, a configuration has been described in which the condition that the user's approval for installation is obtained is determined prior to determination of the other conditions, but a configuration in which the condition is determined after determination of the other conditions may be used.

When the CGW 13 instructs the rewrite target ECU 19 to install the application program, the CGW distributes the write data to the rewrite target ECU 19 (S507), and determines whether or not the installation has been completed (S508). When it is determined that the installation has been completed (S508: YES), the CGW 13 determines whether or not the sixth condition is established, and determines whether or not the user's approval for the activation is obtained (S509). When it is determined that the user's approval for the activation is obtained (S509: YES), the CGW 13 determines whether or not the seventh condition is established, and determines whether or not the vehicle condition is an activatable condition (S510).

When it is determined that the vehicle condition is an activatable condition (S510: YES), the CGW 13 determines whether or not the eighth condition is established, and determines whether or not the rewrite target ECU 19 is in an activatable condition (S511). When it is determined that the rewrite target ECU 19 is in an activatable condition (S511: YES), the CGW 13 instructs the rewrite target ECU 19 to perform activation (S512). As mentioned above, when it is determined that all of the sixth condition to the eighth condition are established, the CGW 13 instructs the rewrite target ECU 19 to perform activation.

When there are a plurality of rewrite target ECUs 19, the CGW 13 may individually or collectively give an instruction for installation. In a case where the rewrite target ECUs 19 are the ECU (ID1) and the ECU (ID2), in an aspect of individually giving an instruction for the installation, the CGW 13 determines whether or not installation conditions are established for the ECU (ID1), as illustrated in FIG. 63. When it is determined that the installation conditions are established for the ECU (ID1), the CGW 13 instructs the ECU (ID1) to perform installation. Next, the CGW 13 determines whether or not installation conditions are established for ECU (ID2). Here, the CGW 13 may determine whether or not the fourth condition and the fifth condition are established for ECU (ID2) as the installation conditions. When it is determined that the installation conditions are established for the ECU (ID2), the CGW 13 instructs the ECU (ID2) to perform installation.

Figure 64:
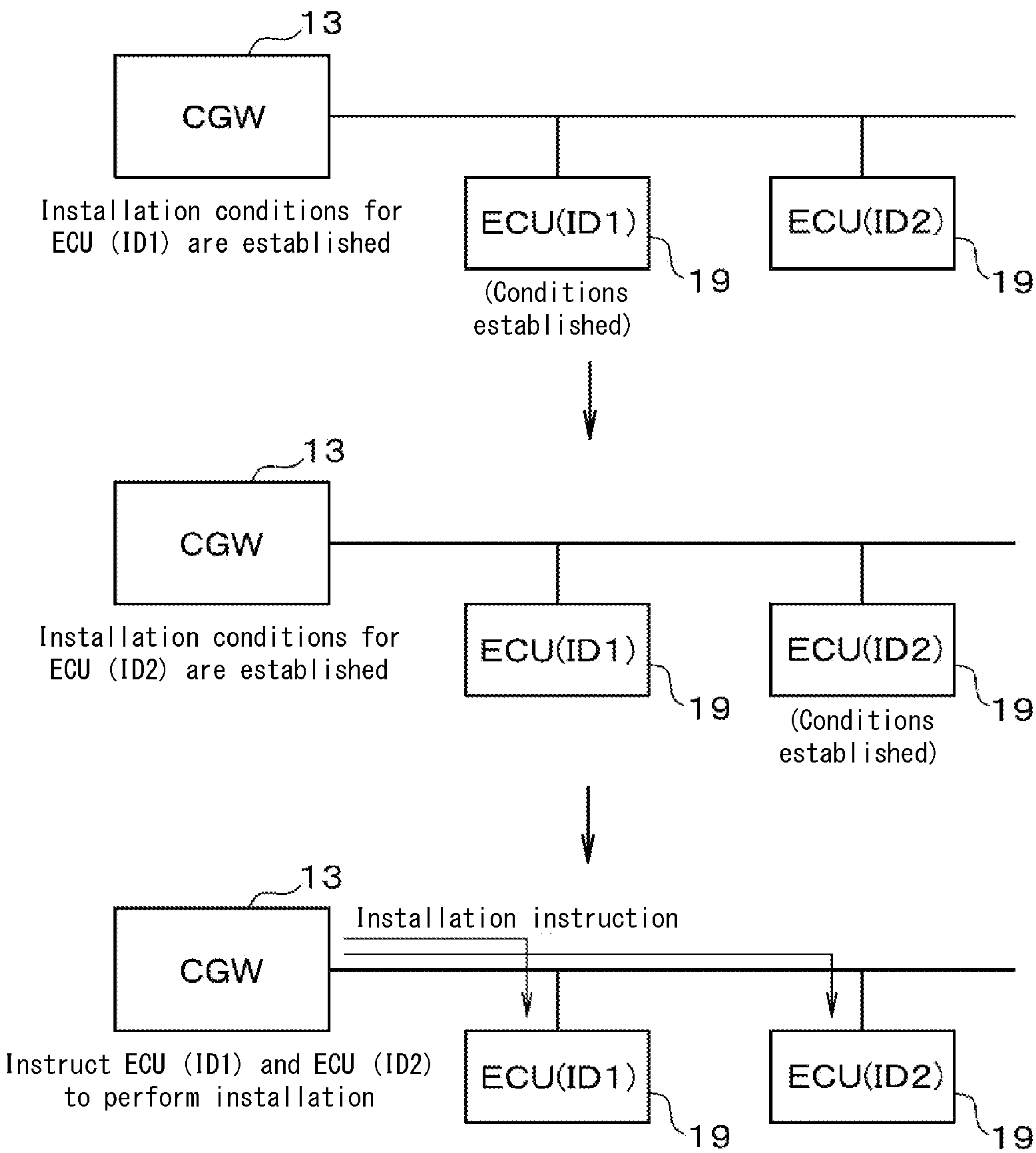
FIG. 64 is a diagram illustrating an aspect of giving an instruction for installation.

When the rewrite target ECUs 19 are the ECU (ID1) and the ECU (ID2), in an aspect of collectively giving an instruction for installation, the CGW 13 determines whether or not installation conditions are established for the ECU (ID1), as illustrated in FIG. 64. That is, the CGW 13 determines the first to third conditions, and the fourth and fifth conditions for the ECU (ID1). When it is determined that the installation conditions are established for the ECU (ID1), the CGW 13 determines whether or not installation conditions are established for the ECU (ID2). That is, the CGW 13 determines the fourth condition and the fifth condition for ECU (ID2). When the installation conditions are established for the ECU (ID2), the CGW 13 instructs the ECU (ID1) and the ECU (ID2) to perform installation. For example, the CGW 13 simultaneously perform transfer of rewrite data to the ECU (ID1) and transfer of rewrite data to the ECU (ID2) in parallel. As described above, in the aspect of collectively giving an instruction for installation, the CGW 13 determines the first condition to the third condition, and the fourth condition and the fifth condition for all the rewrite target ECUs. The CGW 13 gives an instruction for installation after all of the conditions are satisfied.

As described above, the CGW 13 performs the installation instruction determination process before instructing the rewrite target ECU 19 to install an application program, and thus instructs the rewrite target ECU 19 to install the application program when determining that all of the first condition that the user's approval for the installation is obtained, the second condition that data communication with the center device 3 is possible, the third condition that a vehicle condition is an installable condition, the fourth condition that the rewrite target ECU 19 is in an installable condition, and the fifth condition that the write data is normal data are established. It is possible to appropriately instruct the rewrite target ECU 19 to install an application program.

(6) Security Access Key Management Process

The security access key management process will be described with reference to FIGS. 65 to 69. A security access key is used to authenticate a device when the CGW 13 accesses the rewrite target ECU 19 before write data is installed. The vehicle program rewriting system 1 performs the security access key management process in the CGW 13. Here, a description will be made assuming that the CGW 13 is in a state of being able to acquire the write data from the DCM 12 through (3) the write data transfer determination process or (4) the write data acquisition determination process. The device authentication using the security access key corresponds to the fourth condition (step S505) in (5) the installation instruction determination process described above.

When the CGW 13 distributes the write data to the rewrite target ECU 19, the CGW 13 is required to perform security access (device authentication) with the rewrite target ECU 19 by using the security access key. In this case, a method is considered in which the CGW 13 requests the rewrite target ECU 19 to generate a random number value, acquires the random number value generated by the rewrite target ECU 19 from the rewrite target ECU 19, generates a security access key by computing the acquired random number value. However, in such a method, in a case where the random number value is acquired from the rewrite target ECU 19 even when an application program is not rewritten, the security access key can be stored, so that there may be a risk of security access key leakage.

In a configuration in which the CGW 13 transmits a random number value acquired from the rewrite target ECU 19 to the center device 3, and the center device 3 generate a security access key by computing the random number value, it is not necessary to store the security access key, and thus it is possible to reduce the risk of security access key leakage. However, in the configuration in which the center device 3 computes the random number value, the waiting time until the rewrite target ECU 19 acquires the random number value from the center device 3 is increased, and thus it is difficult to satisfy the time specification for the diagnosis communication. In view of such circumstances, the present embodiment employs the following configuration.

Figure 65:
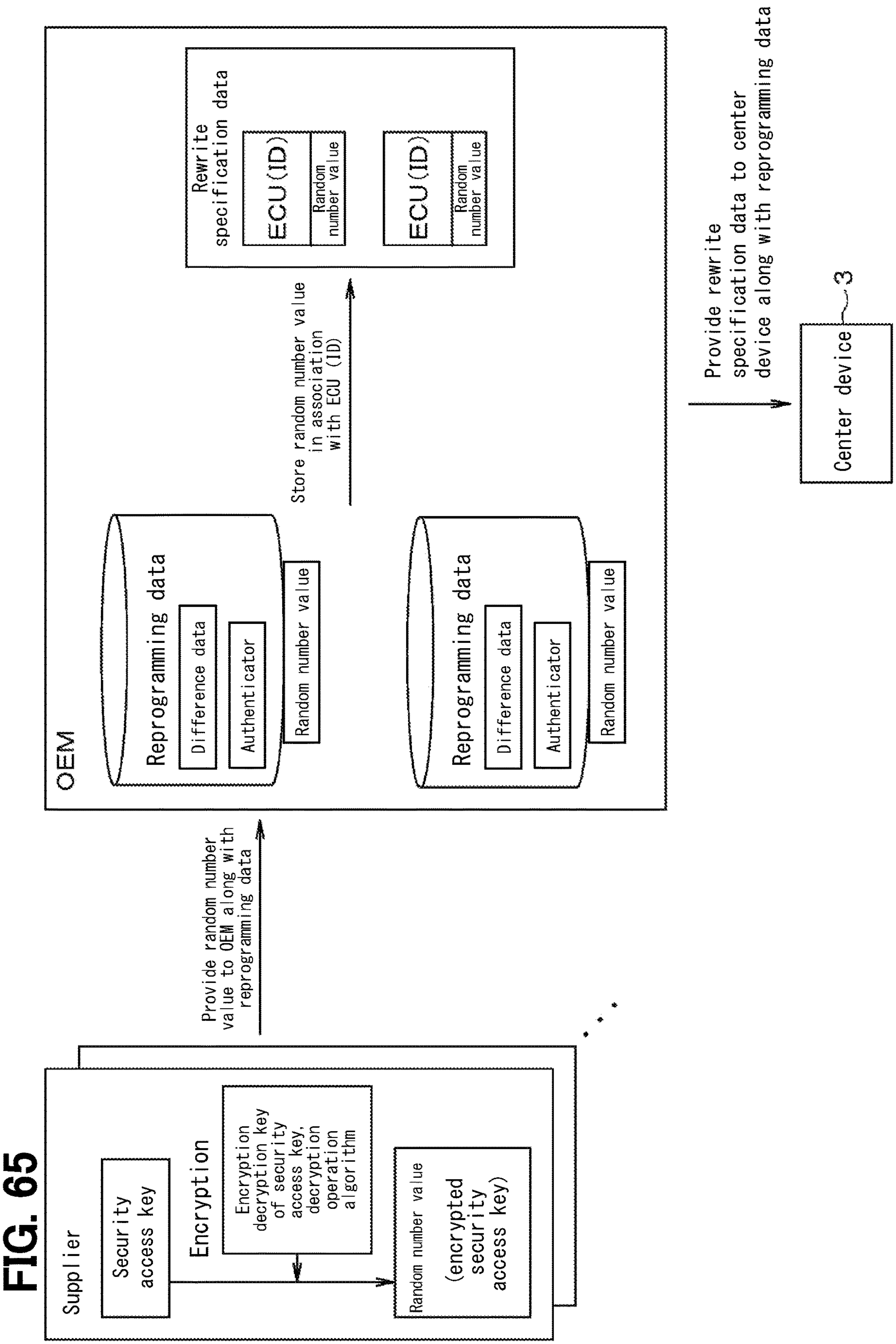
FIG. 65 is a diagram illustrating an aspect of generating a random number value.

As illustrated in FIG. 65, the supplier generates a random number value by encrypting a security access key for each rewrite target ECU 19 by using an encryption/decryption key of the security access key. The random number value mentioned here is a random value including both a value different from the value used in the past or a value same as the value used in the past. The random number value is an encrypted security access key. The supplier provides the generated random number value along with reprogramming data. The security access key, the encryption/decryption key of the security access keys, and the random number value are unique keys to each the ECU 19.

When the OEM is provided with the random number value along with the reprogramming data from the supplier, the OEM correlates the provided random number value with an ECU (ID) for identifying the ECU 19, and stores the random number value into the CGW rewrite specification data illustrated in FIG. 8. The OEM also stores a key pattern or a decryption operation pattern necessary for decrypting the random number value into the CGW rewrite specification data. As the key pattern, a method such as a common key/public key, a key length, and the like are stored, and, as the decryption operation pattern, the type of algorithm used for a decryption operation and the like are stored. When the OEM stores the random number value, the key pattern, and the decryption operation pattern into the CGW rewrite specification data, the OEM provides the CGW rewrite specification data storing the random number value to the center device 3 along with the reprogramming data. The information provided from the supplier is stored in an ECU reprogramming data DB and an ECU metadata DB, which will be described later.

When rewrite specification data (DCM rewrite specification data and CGW rewrite specification data) is provided along with the reprogramming data from the OEM, the center device 3 transmits a distribution package including the provided rewrite specification data and reprogramming data to the master device 11. In the master device 11, when the distribution package is downloaded from the center device 3, the DCM 12 transfers the rewrite specification data and write data to the CGW 13.

Figure 66:
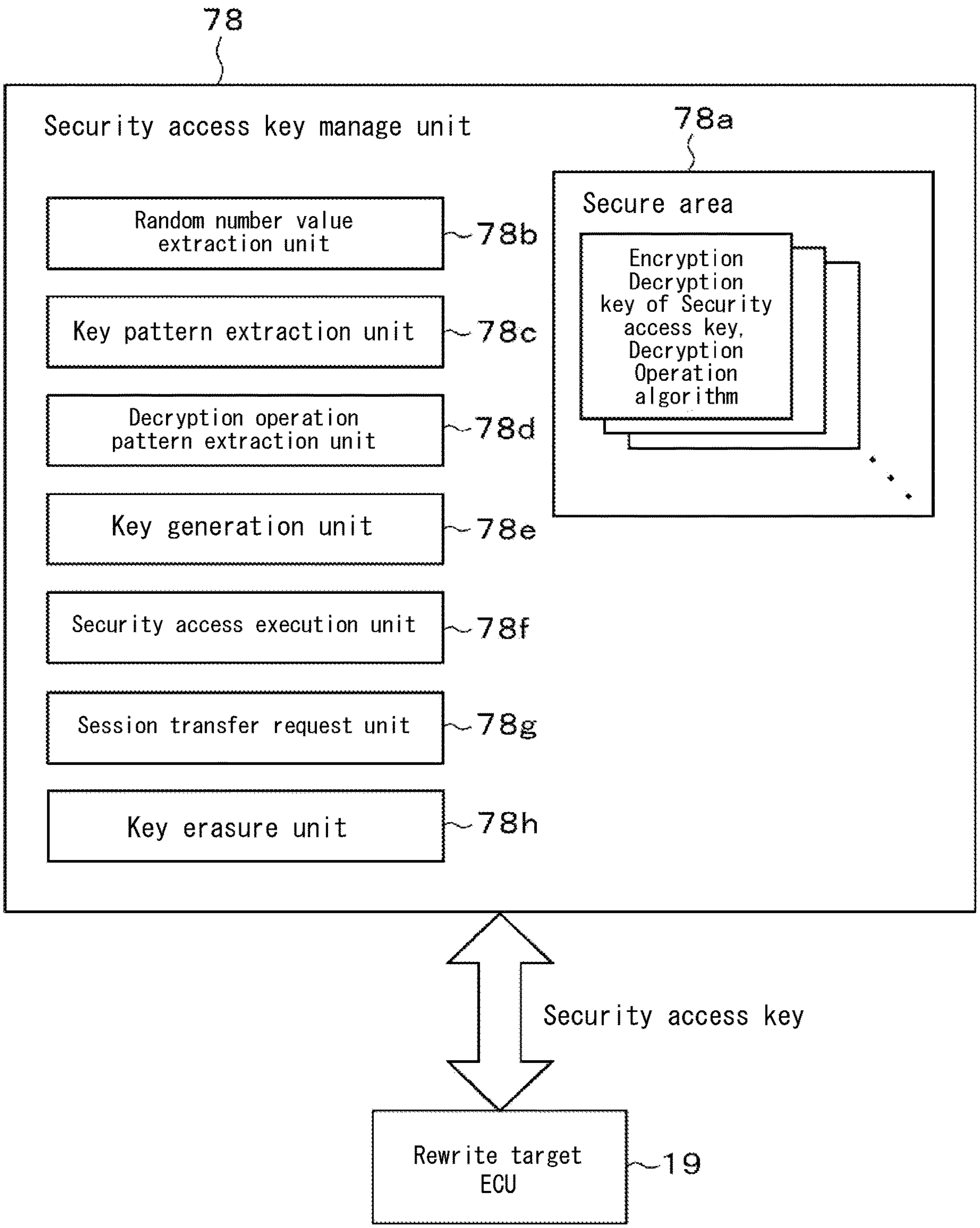
FIG. 66 is a functional block diagram of a security access key management unit.

As illustrated in FIG. 66, the CGW 13 includes a secure area 78*a* (corresponding to a decryption key storage unit), a random number value extraction unit 78*b* (corresponding to a key derivation value extraction unit), a key pattern extraction unit 78*c*, a decryption operation pattern extraction unit 78*d*, a key generation unit 78*e*, a security access execution unit 78*f*, a session transition request unit 78*g*, and a key erasure unit 78*h* in the security access key management unit 78. In the secure area 78*a*, information therein cannot be read from the outside of the ECU 19, and an encryption/decryption key of a security access key and a decryption operation algorithm are located. The random number value extraction unit 78*b* extracts, from an analysis result of the CGW rewrite specification data, a random number value (key derivation value) included in the rewrite specification data. The random number value is a value encrypted in correlation with the ECU (ID) of the rewrite target ECU 19.

The key pattern extraction unit 78*c* extracts, from an analysis result of the CGW rewrite specification data, a key pattern included in the rewrite specification data. The decryption operation pattern extraction unit 78*d* extracts, from an analysis result of the CGW rewrite specification data, a decryption operation pattern included in the rewrite specification data.

When the random number value is extracted by the random number value extraction unit 78*b*, the key generation unit 78*e* searches the secure area 78*a*, decrypts the extracted random number value by using a decryption key corresponding to the ECU (ID) from a bundle of decryption keys of the security access key located in the secure area 78*a*, and generates the security access key. In this case, the key generation unit 78*e* decrypts the key derivation value according to a decryption operation method specified by the decryption operation pattern extracted by the decryption operation pattern extraction unit 78*d* by using a decryption key specified by the key pattern extracted by the key pattern extraction unit 78*c*. That is, a plurality of key patterns and a plurality of decryption operation patterns are prepared, and a key pattern and a decryption operation pattern are specified by the CGW rewrite specification data, and thus the key generation unit 78*e* generates a security access key by using the key pattern and the decryption operation pattern.

When the security access key is generated by the key generation unit 78*e*, the security access execution unit 78*f* executes security access to the rewrite target ECU 19 by using the generated security access key. Specifically, the security access execution unit 78*f* transmits encrypted data in which an ECU (ID) is encrypted by using, for example, a security access key, and requests access to the rewrite target ECU 19. When receiving the encrypted data, the rewrite target ECU 19 decrypts the received encrypted data by using the security access key held by itself. The rewrite target ECU 19 compares decrypted data generated through the decryption with an ECU (ID) thereof, and permits access to the rewrite target ECU in a case where the data matches the ECU (ID), and does not permit access thereto in a case where the data does not match the ECU (ID).

The session transition request unit 78*g* requests transition to a rewrite session. After transition from a default session to the rewrite session, the security access execution unit 78*f* executes security access. After transition to a session (for example, a diagnosis session) other than the default session, security access may be performed, and then transition to the rewrite session may occur. The key erasure unit 78*h* erases the security access key generated by the key generation unit 78*e* after the security access to the rewrite target ECU 19 is executed by the security access execution unit 78*f* and rewriting of an application program in the rewrite target ECU 19 is completed.

Figure 67:
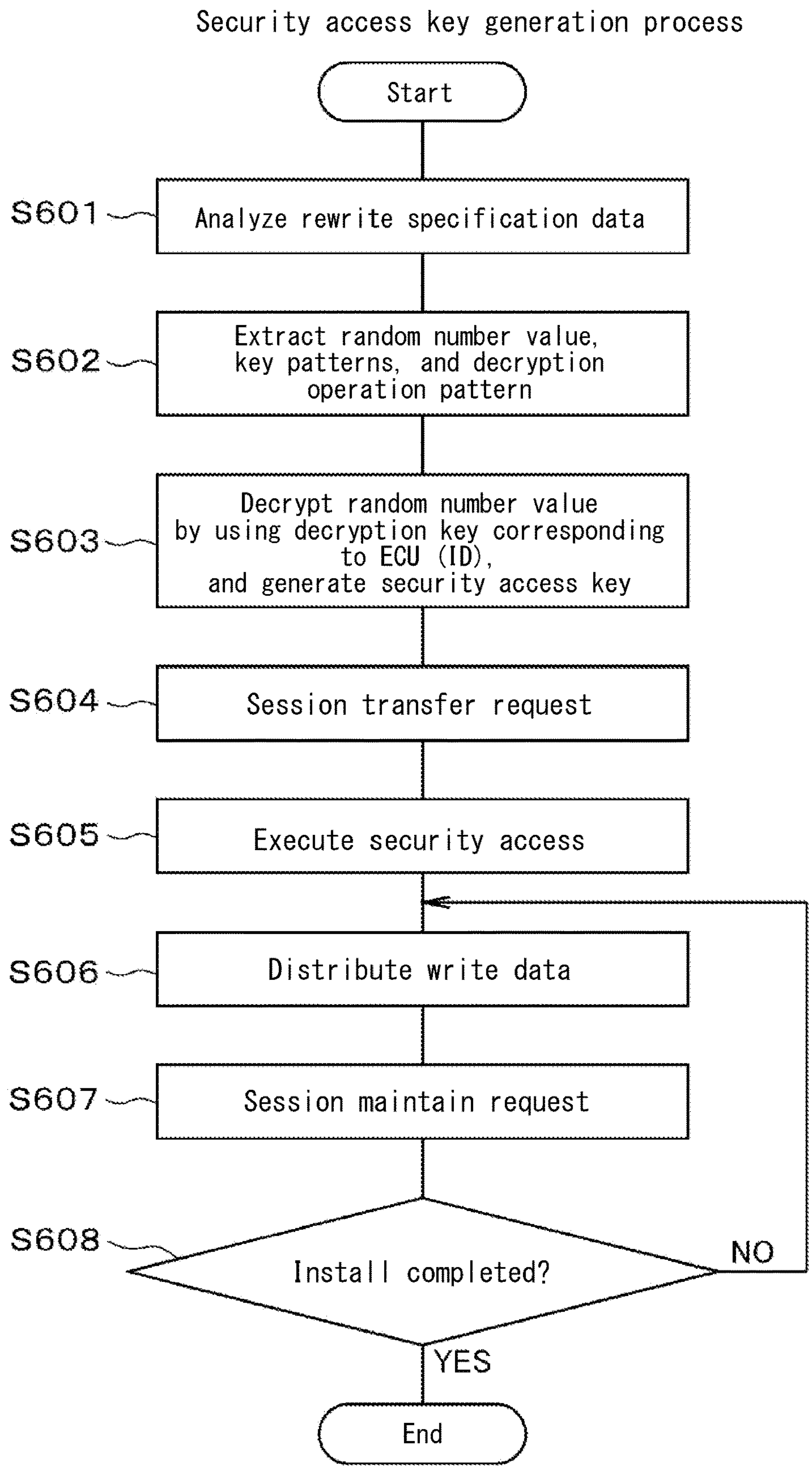
FIG. 67 is a flowchart illustrating a security access key generation process.

Next, an operation of the security access key management unit 78 in the CGW 13 will be described with reference to FIGS. 67 to 69. The CGW 13 executes a security access key management program and thus performs the security access key management process. The CGW 13 performs a security access key generation process and a security access key erasure process as the security access key management process. Hereinafter, each process will be described in order.

(6-1) Security Access Key Generation Process

When the security access key generation process is initiated, the CGW 13 analyzes rewrite specification data acquired from the DCM 12 (S601; corresponding to a rewrite specification data analysis procedure), and extracts a random number value, a key pattern, and a decryption operation pattern from CGW rewrite specification data (S602; corresponding to a key derivation value extraction procedure).

The CGW 13 searches the secure area 78*a*, decrypts the random number value extracted from the CGW rewrite specification data by using a decryption key corresponding to an ECU (ID) from a bundle of decryption keys of a security access key located in the secure area 78*a*, and generates the security access key (S603; corresponding to a key generation procedure).

Figure 68:
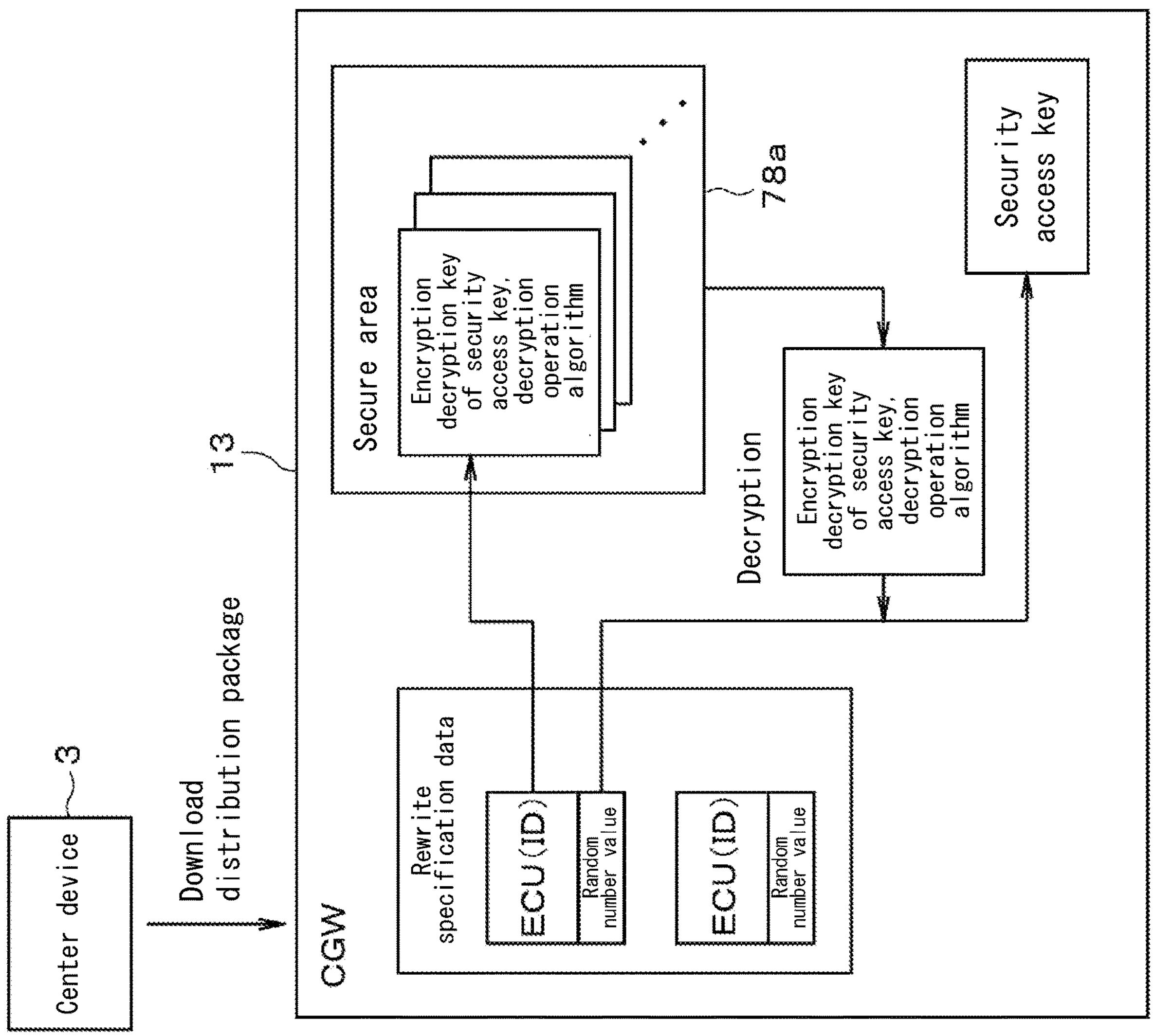
FIG. 68 is a diagram illustrating an aspect of generating a security access key.
Figure 69:
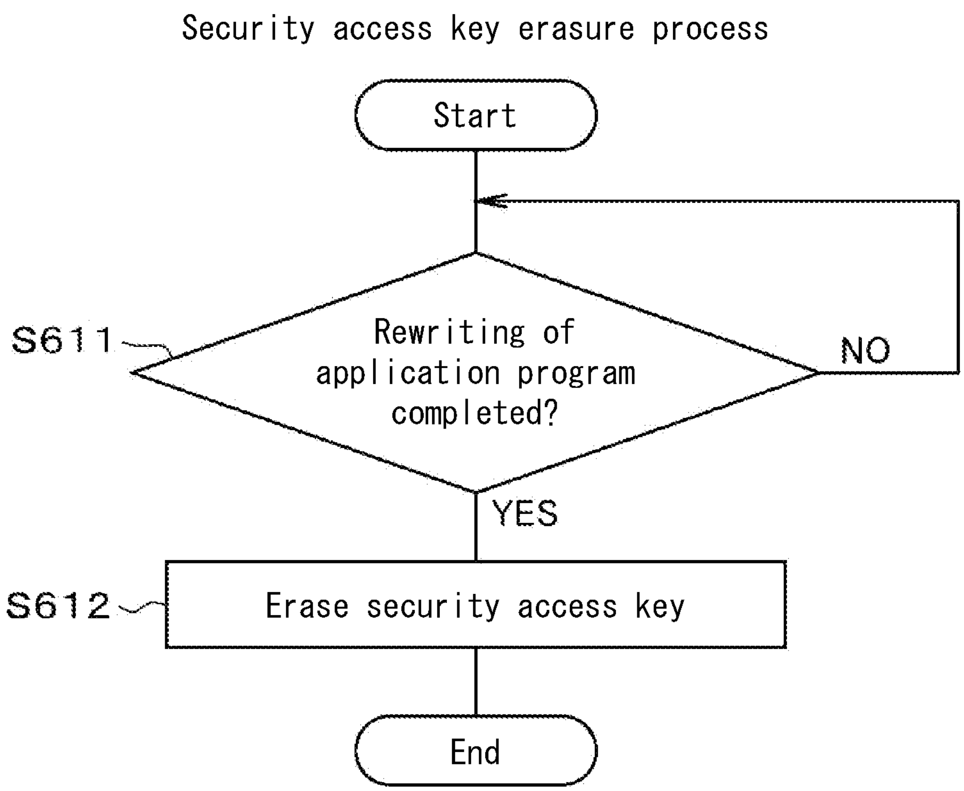
FIG. 69 is a flowchart illustrating a process of erasing a security access key.

As illustrated in FIG. 68, the CGW 13 generates the security access key from the CGW rewrite specification data. The CGW 13 makes a session transition request for transition to a rewrite session that makes write data writable (S604) and executes the security access to the rewrite target ECU 19 by using the security access key (S605). When execution of the security access has been completed, the CGW 13 distributes the write data to the rewrite target ECU 19 (S606) and makes a session maintenance request (S607). When it is determined that installation has been completed (S608: YES), the CGW 13 finishes the security access key generation process.

(6-2) Security Access Key Deletion Process

When the security access key erasure process is initiated, the CGW 13 determines whether or not rewriting of the application program in the rewrite target ECU 19 has been completed (S611). When it is determined that rewriting of the application program in the rewrite target ECU 19 has been completed (S611: YES), the CGW 13 executes the security access key generation process to erase the generated security access key (S612), and finishes the security access key erasure process.

As described above, the CGW 13 executes the security access key management process, extracts a random number value corresponding to the rewrite target ECU 19 from an analysis result of rewrite specification data, decrypts the random number value by using a decryption key corresponding to the rewrite target ECU 19 stored in the secure area 78*a*, and generates a security access key. The CGW 13 generates a security access key without acquiring the security access key from the outside, and thus security access to the rewrite target ECU 19 can be appropriately executed while reducing the risk of security access key leakage.

When there are a plurality of the rewrite target ECUs 19, it is desirable for the CGW 13 to generate a security access key immediately before each piece of write data is installed. In other words, in a case where rewrite target ECUs 19 are the ECU (ID1), the ECU (ID2), and the ECU (ID3), it is desirable for the CGW 13 to execute processes of generating a security access key of the ECU (ID1), installing write data into the ECU (ID1), generating a security access key of the ECU (ID2), installing write data into the ECU (ID2), generating a security access key of the ECU (ID3), and installing write data into the ECU (ID3) in this order. For example, as illustrated in FIG. 63, the CGW 13 performs a security access process as one of whether or not installation conditions for the ECU (ID1) are established, and instructs the ECU (ID1) to perform installation in a case where access is normally permitted. Thereafter, the CGW 13 performs a security access process as one of whether or not installation conditions for the ECU (ID2) are established, and instructs the ECU (ID2) to perform installation in a case where access is normally permitted.

Figure 155:
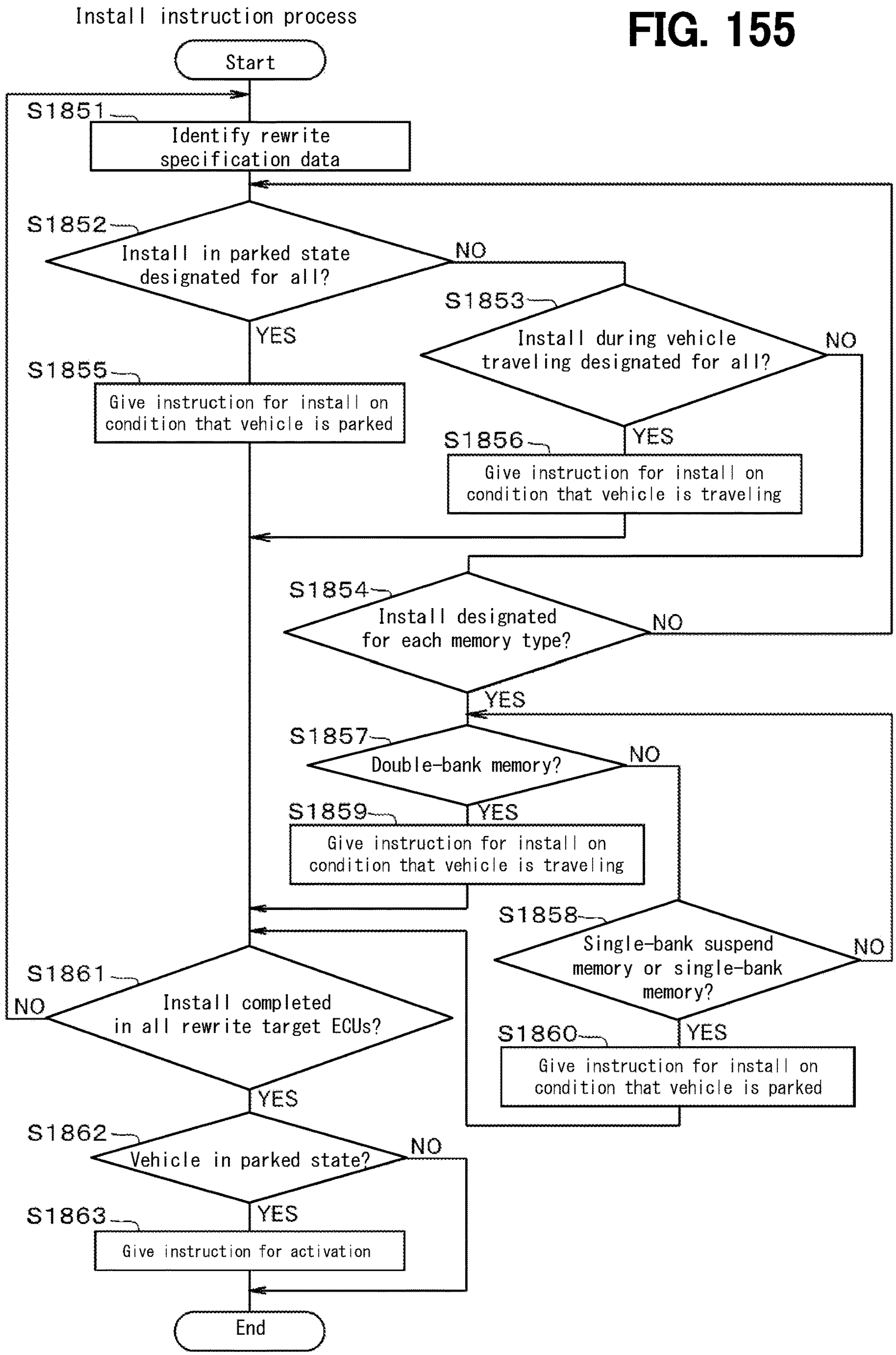
FIG. 155 is a flowchart illustrating an installation instruction process.

When the CGW 13 performs security access to the rewrite target ECU 19 which then permits access thereto, the rewrite target ECU unlocks the security access by receiving a session transition request from the CGW 13, and thus makes write data writable into the flash memory. The session transition request is, for example, a "rewrite session transition request" in a second state illustrated in FIG. 155. Unless the rewrite target ECU 19 receives the session transition request from the CGW 13 within a predetermined time (for example, 5 seconds) after permitting access thereto, the rewrite target ECU times out, locks the security access, and does not accept reception of the session transition request. In a case where the CGW 13 does not transmit the session transition request to the rewrite target ECU 19 within a predetermined time after specifying permission for access to the rewrite target ECU 19, the CGW is required to transmit a session maintenance request to the rewrite target ECU 19, retain the rewrite target ECU 19 not to time out, and transmit the session transition request to the rewrite target ECU 19.

For example, when a campaign notification to the version 2.0 occurs by canceling an operation in the middle of rewriting in a state in which an application program of the version 1.0 is written in an active bank—And an application program of the version 2.0 is written in an inactive bank, and when from this state, it is preferable that only activation is performed without performing installation, and thus the security access process may be omitted.

(7) Write Data Verification Process

The write data verification process will be described with reference to FIGS. 70 to 78. The vehicle program rewriting system 1 verifies write data in the CGW 13. The CGW 13 may perform the write data verification process described in the present embodiment before acquiring an access permission in (6) the security access key management process, or may perform the write data verification process after acquiring the access permission.

Figure 70:
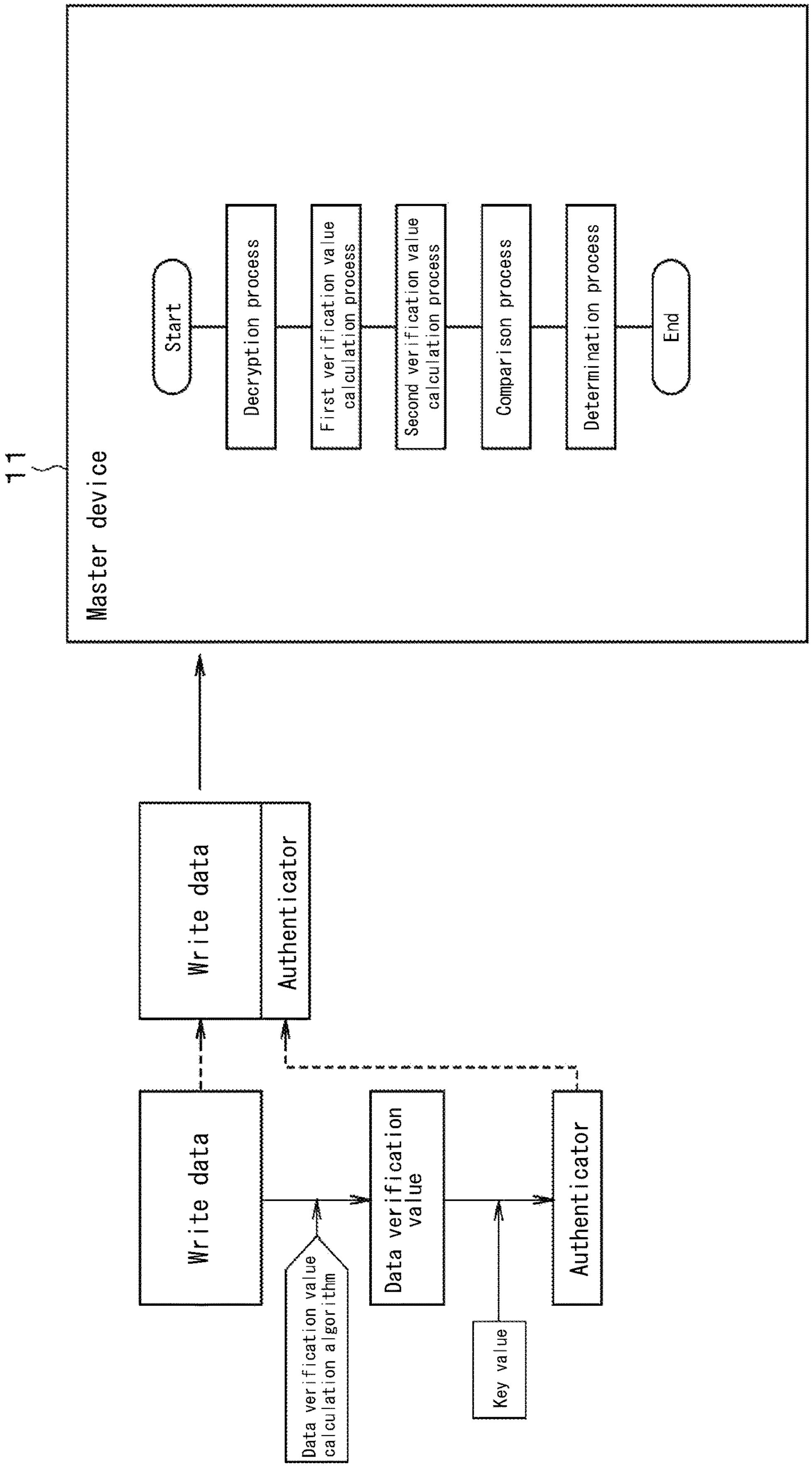
FIG. 70 is a diagram illustrating a flow of process related to verification of write data.

As illustrated in FIG. 70, when the write data is generated, the supplier or the OEM generates a data verification value by applying a data verification value calculation algorithm to the generated write data. Here, the write data may be a new program to be updated, or may be difference data between an old program and a new program. The supplier or OEM generates an authenticator by applying encryption using a predetermined key (key value) to the data verification value, and registers the write data and the authenticator in the center device 3 in correlation with each other. Specifically, the data is stored for each ECU 19 in the reprogramming data DB which will be described later. The center device 3 generates a distribution package including the write data and the authenticator, and stores the distribution package into the package DB.

When a download request for the distribution package from the master device 11 is generated, the center device 3 transmits the distribution package including the write data and the authenticator to the master device 11 in response to the download request. In this case, the write data transmitted from the center device 3 to the master device 11 is ciphertext, and the authenticator transmitted from the center device 3 to the master device 11 is also ciphertext. The authenticator transmitted from the center device 3 to the master device 11 may be plaintext. When the authenticator transmitted from the center device 3 to the master device 11 is plaintext, a decryption process which will be described later is not necessary.

When the distribution package is downloaded from the center device 3, the master device 11 extracts the write data for the rewrite target ECU 19 from the downloaded distribution package, and verifies validity of the write data before distributing the write data to the rewrite target ECU 19. That is, the master device 11 sequentially executes a decryption process, a first verification value calculation process, a second verification value calculation process, a comparison process, and a determination process, and thus verifies the write data. The decryption process is a process of decrypting the authenticator transmitted in the ciphertext. The first verification value calculation process is a process of calculating a first data verification value that is an expected value, from the decrypted authenticator by using the key (key value). The second verification value calculation process is a process of calculating a second data verification value from the write data by using the data verification value calculation algorithm. The comparison process is a process of comparing the first data verification value with the second data verification value. The determination process is a process of determining validity of the write data on the basis of a comparison result in the comparison process.

Figure 71:
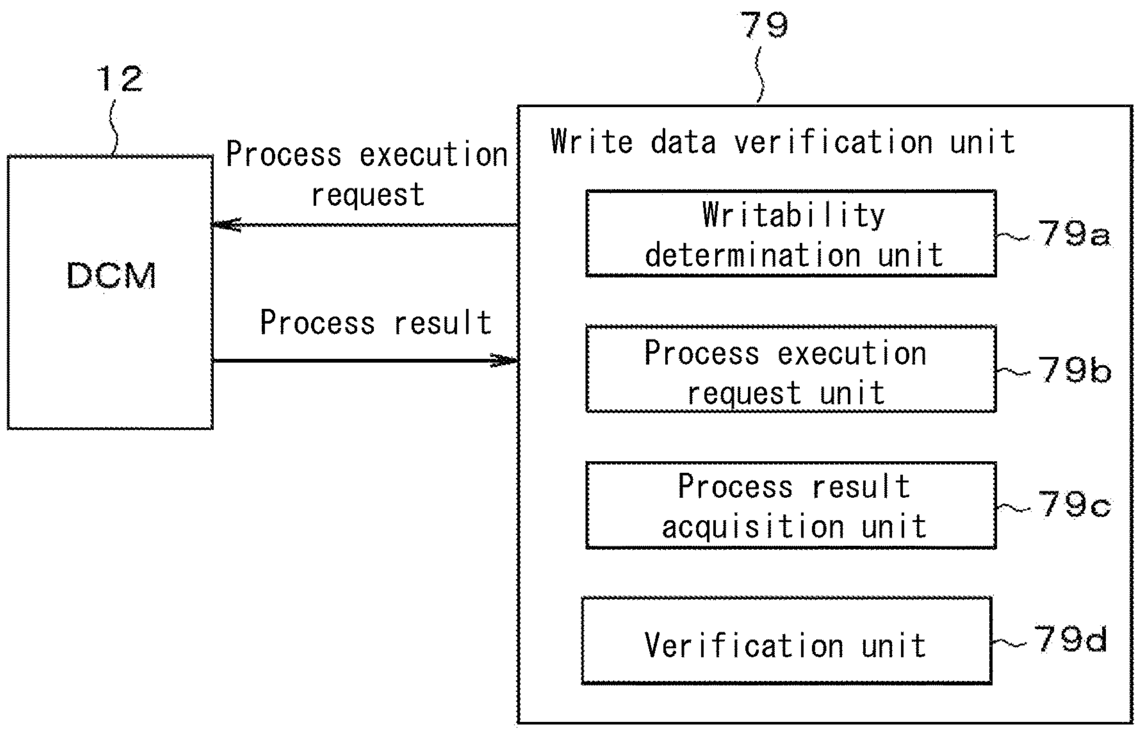
FIG. 71 is a functional block diagram of a write data verification unit.
Figure 72:
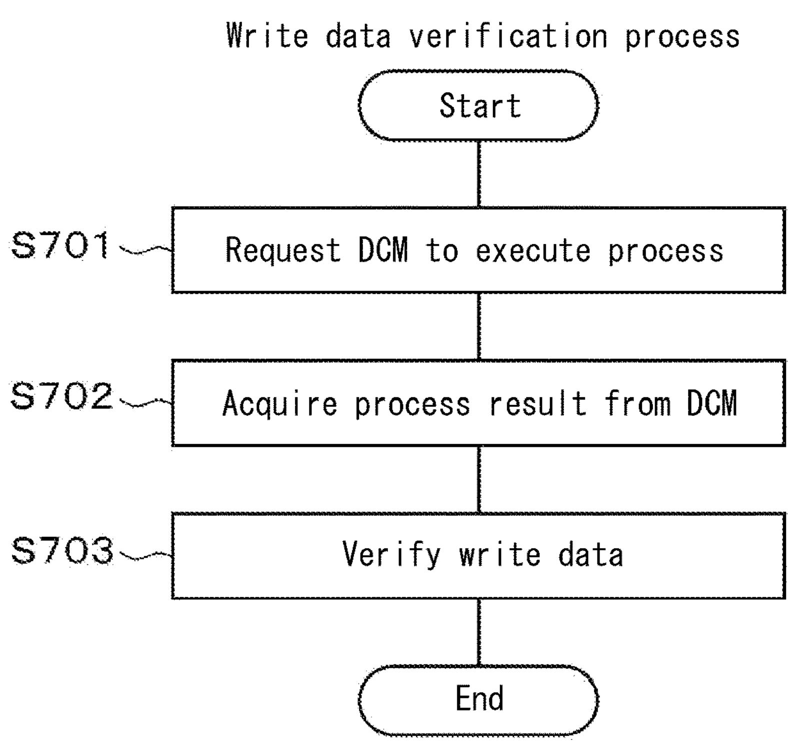
FIG. 72 is a flowchart illustrating a write data verification process.
Figure 73:
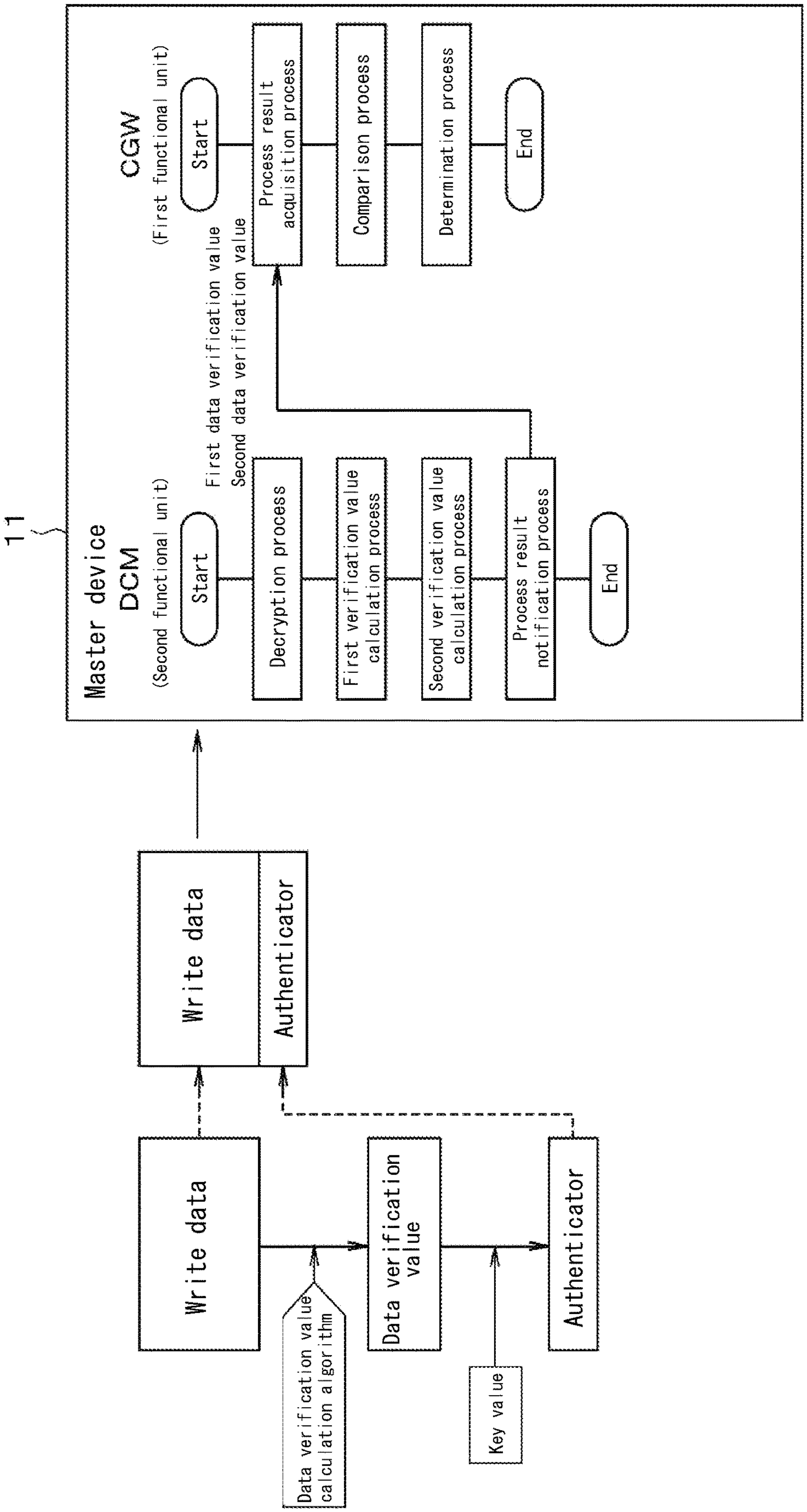
FIG. 73 is a diagram illustrating an aspect in which a process related to verification of write data is distributed.

As illustrated in FIG. 71, the CGW 13 includes a writability determination unit 79*a*, a process execution request unit 79*b*, a process result acquisition unit 79*c*, and a verification unit 79*d* in the write data verification unit 79. The writability determination unit 79*a* determines whether or not write data can be written in the rewrite target ECU 19. When it is determined by the writability determination unit 69*a* that the write data can be written in the rewrite target ECU 19, the process execution request unit 79*b* notifies the DCM 12 of a process execution request and thus requests the DCM 12 to execute a process. The process execution request unit 68*b* notifies the DCM 12 of a request for executing at least any of the decryption process, the first verification value calculation process, the second verification value calculation process, the comparison process, and the determination process. The process result acquisition unit 68*c* is notified of a process result from the DCM 12 and thus acquires the process result from the DCM 12. When the process result is acquired by the process result acquisition unit 68*c*, the verification unit 79*d* verifies the write data by using the process result. That is, in the configuration, the CGW 13 corresponds to a first device and a first functional unit, and the DCM 12 corresponds to a second device and a second functional unit.

Next, an operation of the write data verification unit 79 in the CGW 13 will be described with reference to FIGS. 72 to 77. The CGW 13 executes the verification program of the write data and performs the verification process of the write data.

When the write data verification process is initiated, the CGW 13 notifies the DCM 12 of a process execution request and thus requests the DCM 12 to execute a process (S701; corresponding a process execution request procedure). The CGW 13 notifies the DCM 12 of a process execution request for at least any of the decryption process, the first verification value calculation process, the second verification value calculation process, the comparison process, and the determination process. When a process result is acquired from the DCM 12 (S702; corresponding to a process result acquisition procedure), the CGW 13 verifies the write data by using the acquired process result (S703; corresponding to a verification procedure).

Hereinafter, some cases where the CGW 13 notifies the DCM 12 of a process execution request will be exemplified. In an example illustrated in FIG. 73, the CGW 13 notifies the DCM 12 of process execution requests for the decryption process, the first verification value calculation process, and the second verification value calculation process. When the DCM 12 is notified of the process execution requests for the decryption process from the CGW 13, the first verification value calculation process, and the second verification value calculation process, the DCM sequentially executes the decryption process, the first verification value calculation process, and the second verification value calculation process. The DCM 12 executes a process result notification process, and notifies the CGW 13 of a first data verification value calculated through the first verification value calculation process and a second data verification value calculated through the second verification value calculation process as process results. When the CGW 13 executes a process result acquisition process and acquires the first data verification value and the second data verification value from the DCM 12, the CGW sequentially executes the comparison process and the determination process by using the first data verification value and the second data verification value. The CGW 13 verifies the write data on the basis of the correctness of a determination result in the determination process. In this example, the DCM 12 stores a key for calculating the first data verification value.

Figure 74:
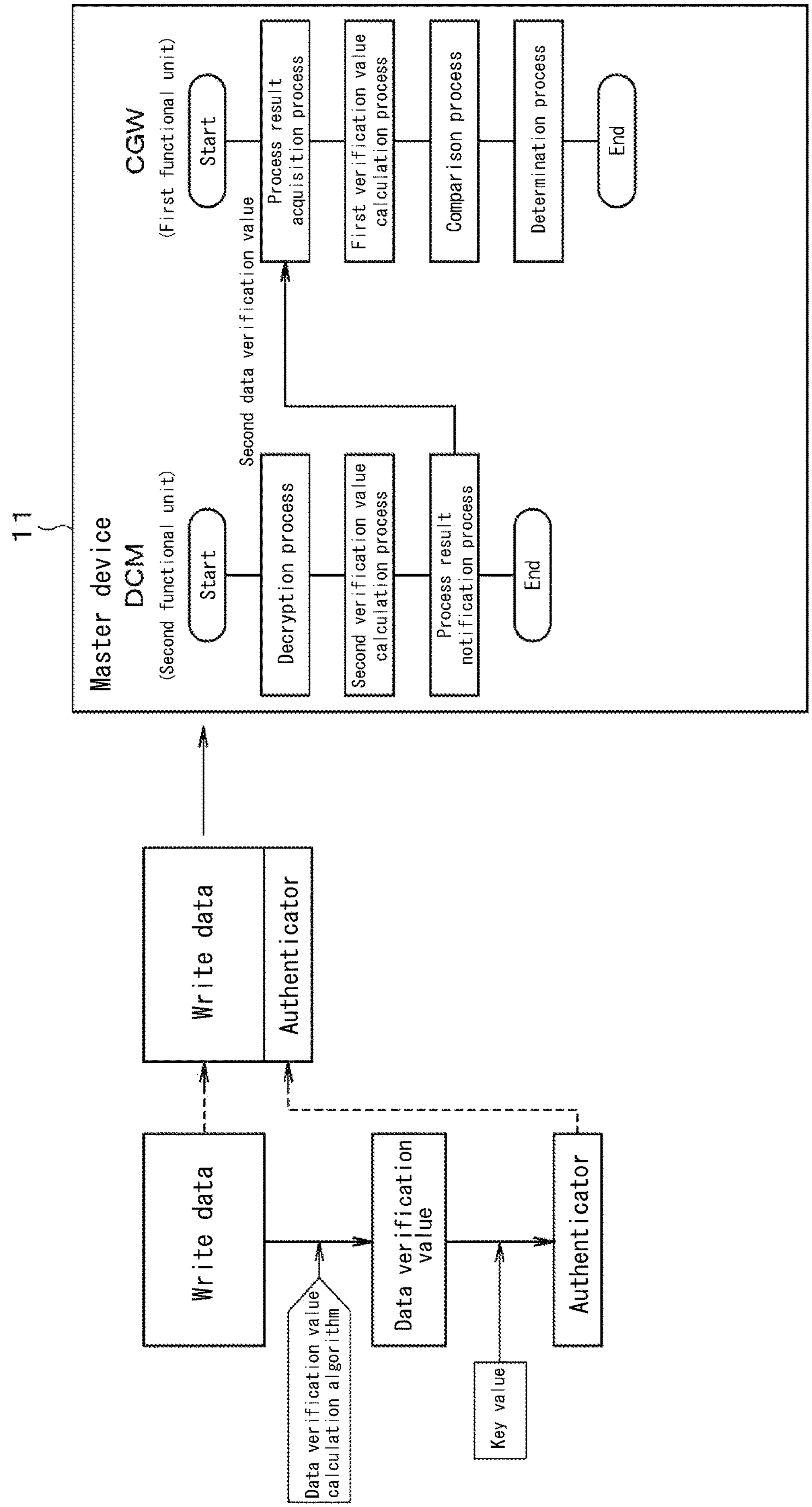
FIG. 74 is a diagram illustrating an aspect in which the process related to verification of write data is distributed.

In an example illustrated in FIG. 74, the CGW 13 notifies the DCM 12 of process execution requests for the decryption process and the second verification value calculation process. When the DCM 12 is notified of the process execution requests for the decryption process and the second verification value calculation process from the CGW 13, the DCM sequentially executes the decryption process and the second verification value calculation process, and notifies the CGW 13 of a second data verification value calculated through the second verification value calculation process. When the CGW 13 executes a process result acquisition process and acquires the second data verification value from the DCM 12, the CGW executes the first verification value calculation process, and sequentially executes the comparison process and the determination process by using the first data verification value calculated through the first verification value calculation process and the second data verification value. The CGW 13 verifies the write data on the basis of the correctness of a determination result in the determination process. In this example, the CGW 13 stores a key for calculating the first data verification value.

Figure 75:
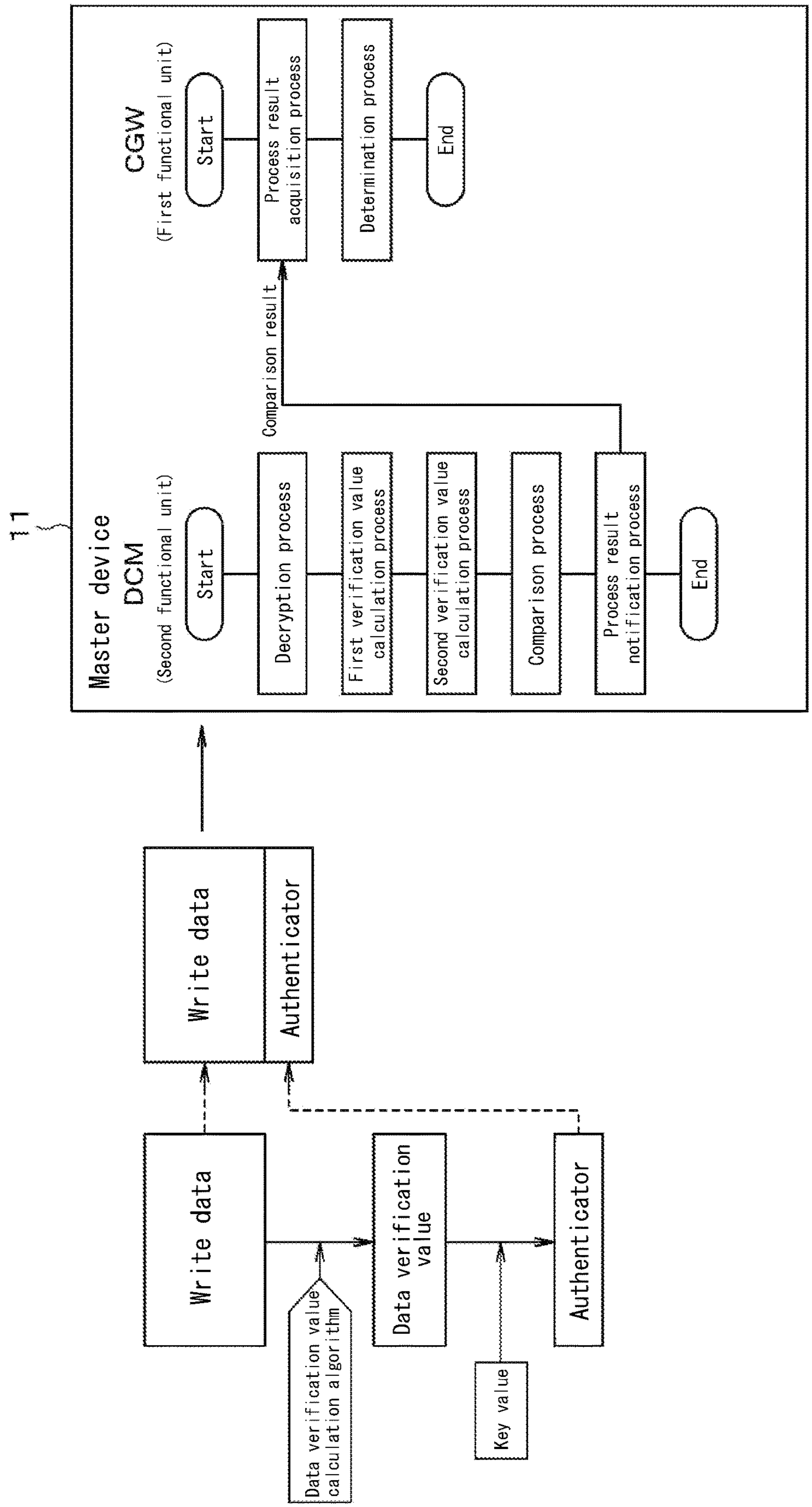
FIG. 75 is a diagram illustrating an aspect in which the process related to verification of write data is distributed.

In the example illustrated in FIG. 75, the CGW 13 notifies the DCM 12 of process execution requests for the decryption process, the first verification value calculation process, the second verification value calculation process, and the comparison process. When the DCM 12 is notified of the process execution requests for the decryption process, the first verification value calculation process, the second verification value calculation process, and the comparison process from the CGW 13, the DCM sequentially executes the decryption process, the first verification value calculation process, the second verification value calculation process, and the comparison process. The DCM 12 executes a process result notification process, and notifies the CGW 13 of a comparison result in the comparison process as a process result. When the CGW 13 executes a process result acquisition process and acquires the comparison result from the DCM 12, the CGW executes the determination process by using the comparison result. The CGW 13 verifies the write data on the basis of the correctness of a determination result in the determination process. In this example, the DCM 12 stores a key for calculating the first data verification value.

Figure 76:
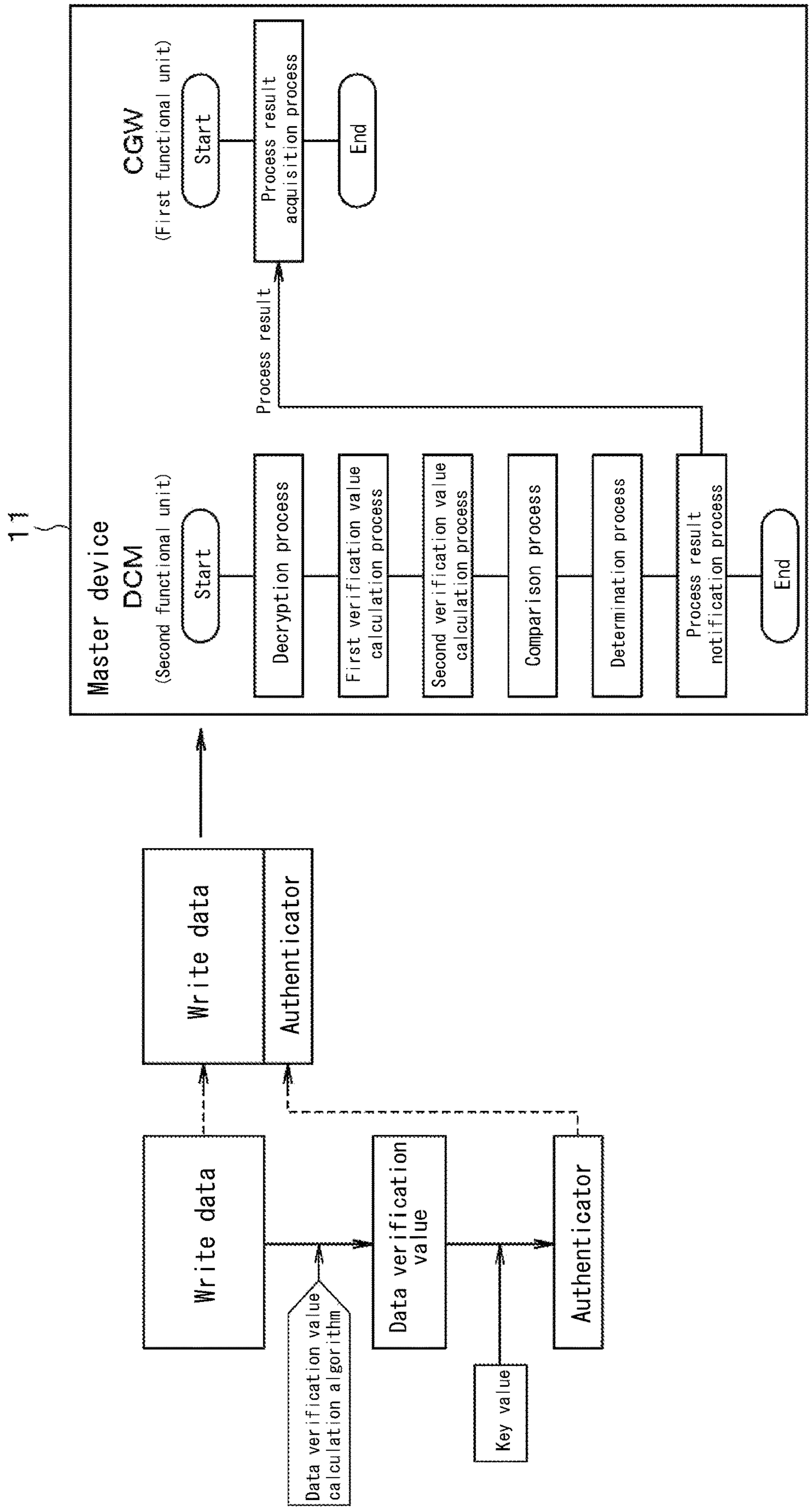
FIG. 76 is a diagram illustrating an aspect in which the process related to verification of write data is distributed.

In an example illustrated in FIG. 76, the CGW 13 notifies the DCM 12 of process execution requests for the decryption process, the first verification value calculation process, the second verification value calculation process, the comparison process, and the determination process. When the DCM 12 is notified of the process execution requests for the decryption process, the first verification value calculation process, the second verification value calculation process, the comparison process, and the determination process from the CGW 13, the DCM sequentially executes the decryption process, the first verification value calculation process, the second verification value calculation process, the comparison process, and the determination process. The DCM 12 executes a process result notification process, and notifies the CGW 13 of a determination result in the determination process as a process result. When the CGW 13 executes a process result acquisition process, and acquires the process result from the DCM 12, the CGW verifies the write data on the basis of the correctness of the determination result indicated by the process result. In this example, the DCM 12 stores a key for calculating the first data verification value.

In a case where there are a plurality of rewrite target ECUs 19, the CGW 13 performs a verification process on write data for two or more the rewrite target ECUs 19 as follows. In a case where there are a plurality of rewrite target ECUs 19, the CGW 13 has a method of collectively verifying write data for the plurality of rewrite target ECU 19 and a method of individually verifying write data.

Figure 77:
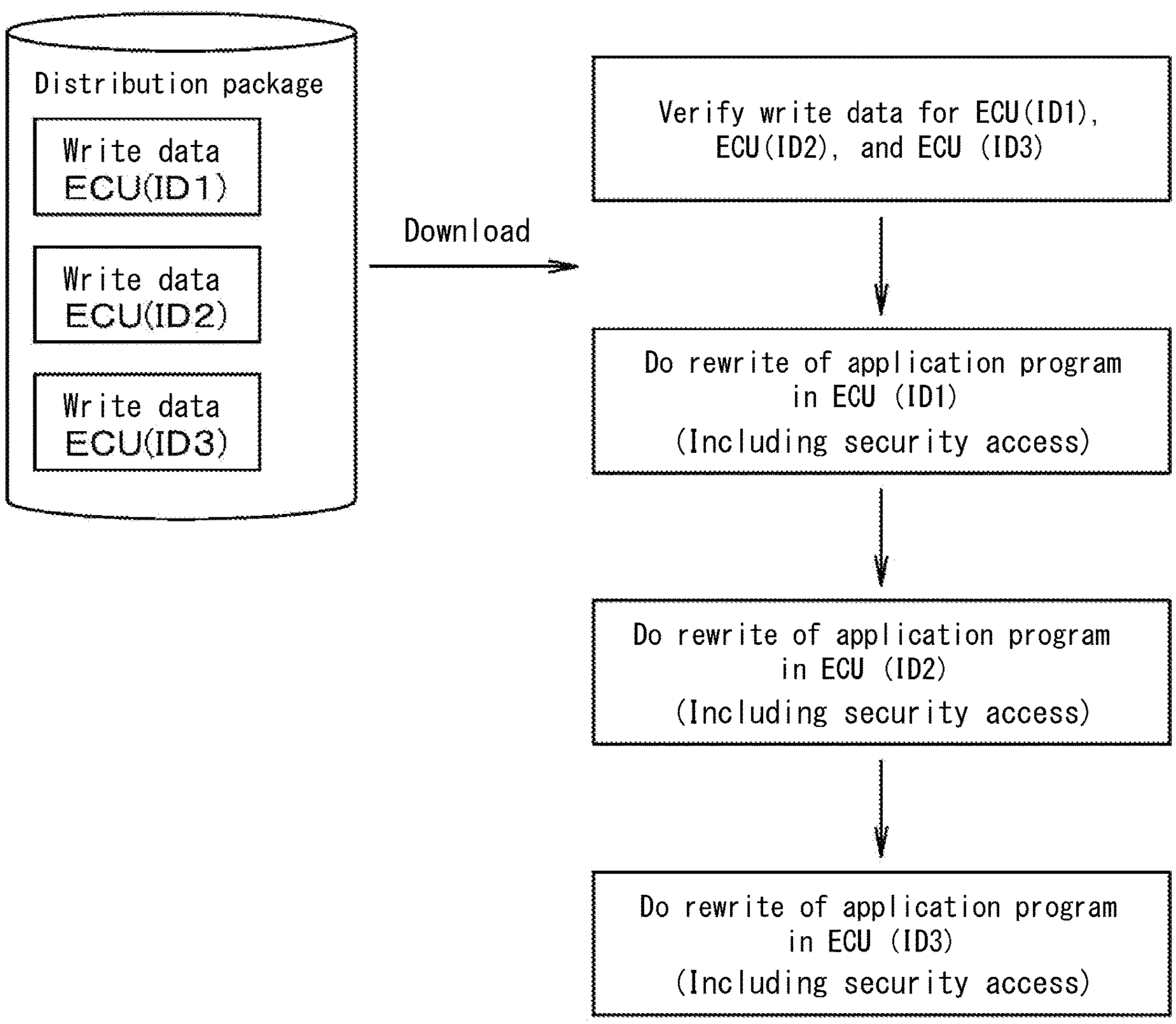
FIG. 77 is a diagram illustrating a flow of verification of write data and rewriting of an application program.

In the method of collectively verifying the write data for a plurality of rewrite target ECUs 19, as illustrated in FIG. 77, the CGW 13 collectively verifies write data of the ECU (ID1), write data of the ECU (ID2), and write data of the ECU (ID3), distributes the write data of the ECU (ID1) to the write target ECU (ID1), distributes the write data of the ECU (ID2) to the write target ECU (ID2), and distributes the write data of the ECU (ID3) to the write target ECU (ID3). In this case, the pieces of write data of the plurality of rewrite target ECUs 19 are collectively verified, and thus it is possible to reduce the time required from initiation of verification of the write data of the plurality of rewrite target ECUs 19 to completion of rewriting of a program. That is, it is possible to reduce the time required from initiation of verification of pieces of write data of a plurality of rewrite target ECUs 19 to completion of rewriting of a program more than in a configuration in which the pieces of write data of the plurality of rewrite target ECUs 19 are individually verified.

Figure 78:
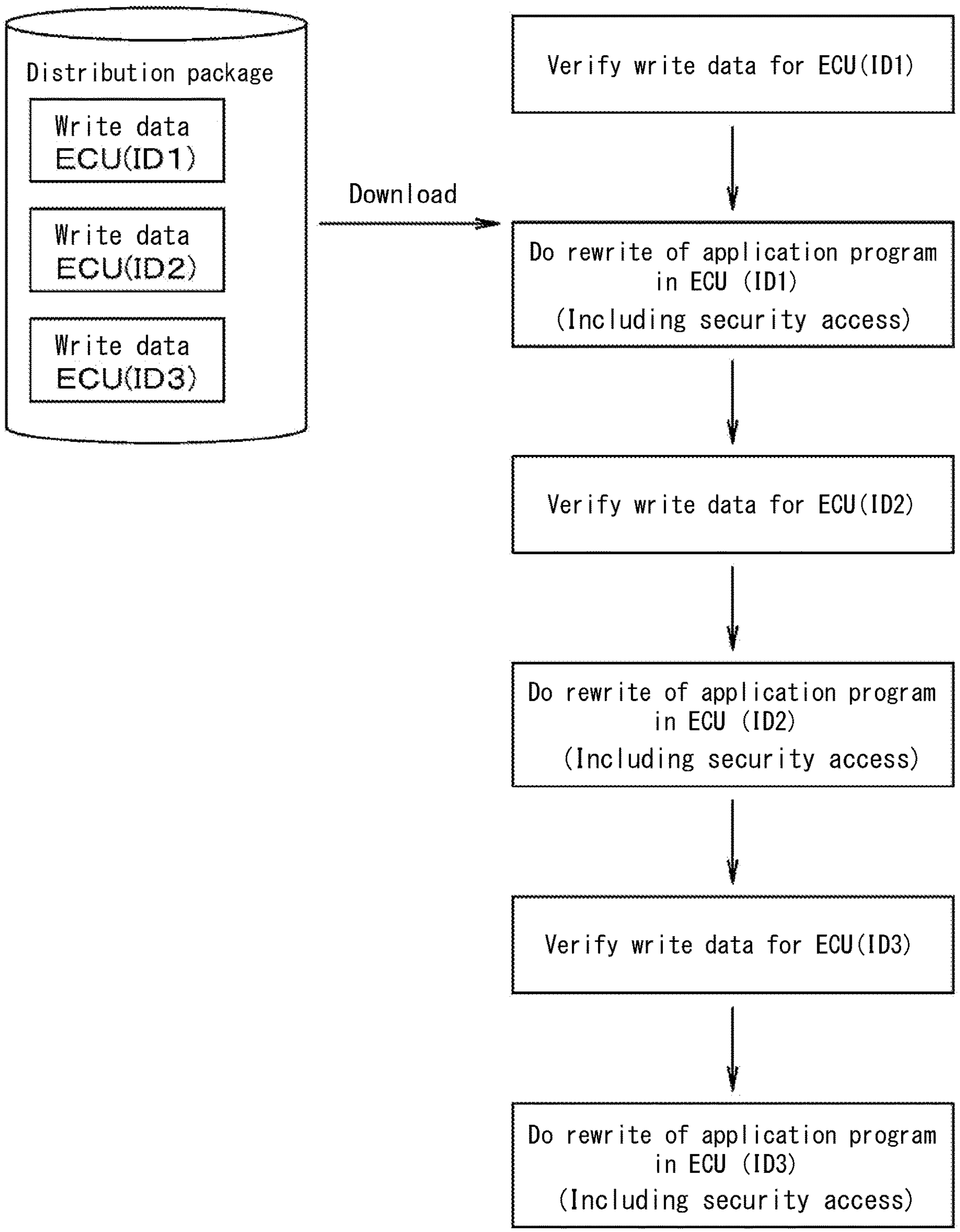
FIG. 78 is a diagram illustrating a flow of verification of the write data and rewriting of the application program.

In the method of individually verifying the write data of a plurality of rewrite target ECUs 19, as illustrated in FIG. 78, the CGW 13 verifies write data of the ECU (ID1), distributes the write data of the ECU (ID1) to the write target ECU (ID1), verifies write data of the ECU (ID2), distributes the write data of the ECU (ID2) to the write target ECU (ID2), verifies write data of the ECU (ID3), and distributes the write data of the ECU (ID3) to the write target ECU (ID2). In this case, the write data is verified immediately before the write data is distributed, and therefore it is possible to prevent illegal access and thus to increase reliability. In other words, in the configuration in which the write data is collectively verified for a plurality of rewrite target ECUs 19, the time from completion of verification according to a rewrite order to distribution of the write data varies depending on the rewrite order, and, when the time from completion of verification to distribution of the write data increases, there is concern that there is a risk of falsification due to illegal access during that time, but such a situation can be prevented by verifying the write data immediately before the write data is distributed.

As described above, the CGW 13 performs write data verification process, and thus causes the DCM 12 downloading a distribution package from the center device 3 to execute at least some of the processes related to verification of the write data. Even though an area for storing write data cannot be allocated or a verification computation program cannot be installed in the CGW 13 or the rewrite target ECU 19, the write data can be appropriately verified before the write data is written to the rewrite target ECU 19.

In the configuration in which the CGW 13 illustrated in FIG. 74 performs the first verification value calculation process, since the CGW 13 stores the key (key value) and performs the verification process without transmitting the key to the DCM 12, security can be increased compared with a configuration in which the DCM 12 performs the first verification value calculation process. In a case where there are a plurality of rewrite target ECUs 19, the first verification value calculation process may be performed by using a common key (key value) that is common to the plurality of rewrite target ECUs 19, and the first verification value calculation process may be performed by using different individual keys (key values) in the plurality of rewrite target ECUs 19.

As described above, although the configuration in which the CGW 13 notifies the DCM 12 of the process execution request has been exemplified, for example, in a case where a processing load increases in the DCM 12 and thus a problem occurs in an original process, a navigation apparatus or an ECU other than the rewrite target ECU 19 may be used instead of the DCM 12 to notify the navigation apparatus or the ECU other than the rewrite target ECU 19 of the process execution request. In a case where the DCM 12 and the CGW 13 are integrated with each other and can cope with an original process without causing a problem, the process execution request may be requested to the process execution unit of the process execution unit itself. For example, the process may be performed between different software components in the same ECU. The above-described configuration may be applied to the master device 11 configured as one integrated ECU having the functions of the DCM 12 and the CGW 13. For example, in FIGS. 73 to 76, the process function in the CGW 13 is set as a first functional unit, and the process function in the DCM 12 is set as a second functional unit, and the first functional unit notifies the second functional unit of a process execution request, and an execution result is returned from the second functional unit to the first functional unit. In the master device 11 configured as an integrated ECU, in a case where a processing load increases and thus a problem occurs in a communication process or a relay process, the navigation apparatus or an ECU other than the rewrite target ECU 19 may be notified of a process execution request instead of the second functional unit.

As the data verification value, a single value may be calculated for the entire application program, and a plurality of values may be calculated for respective blocks of the application program. When the write data is entire data, the data verification value may be used for integrity verification after the write data is completed.

Whereas the security access is a method for verifying whether or not the CGW 13 and the rewrite target ECU 19 are connectable, verification of the write data includes the concepts that the center device 3 which is a distribution destination of the write data is approved (connection and mutual authentication through TLS communication), a communication channel for downloading the write data from the center device 3 is approved (communication channel concealment or encryption), the write data downloaded from the center device 3 is not falsified (falsification detection), and the write data downloaded from the center device 3 cannot be falsified (encryption).

The write data at the time of rewriting a new program has been described, but the same applies to write data during rollback at the time of rollback to an old program. In this case, the CGW 13 may verify the write data during rollback at the time of downloading the write data from the center device 3, but may verify the rollback write data immediately before the rollback write data is distributed to the rewrite target ECU 19 when a write cancellation request is generated.

(8) Data Storage Bank Information Transmission Control Process

Figure 80:
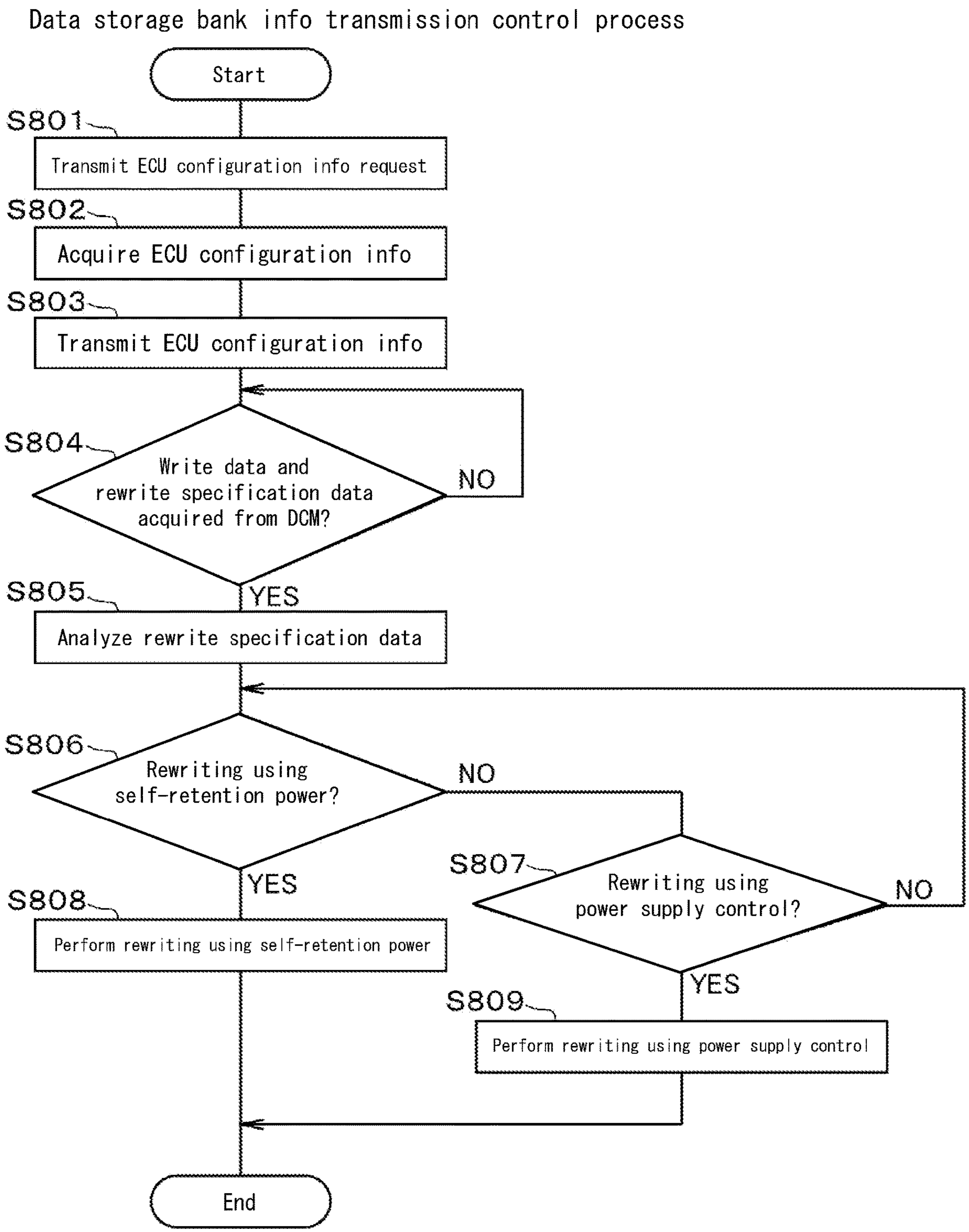
FIG. 80 is a flowchart illustrating a data storage bank information transmission control process.
Figure 81:
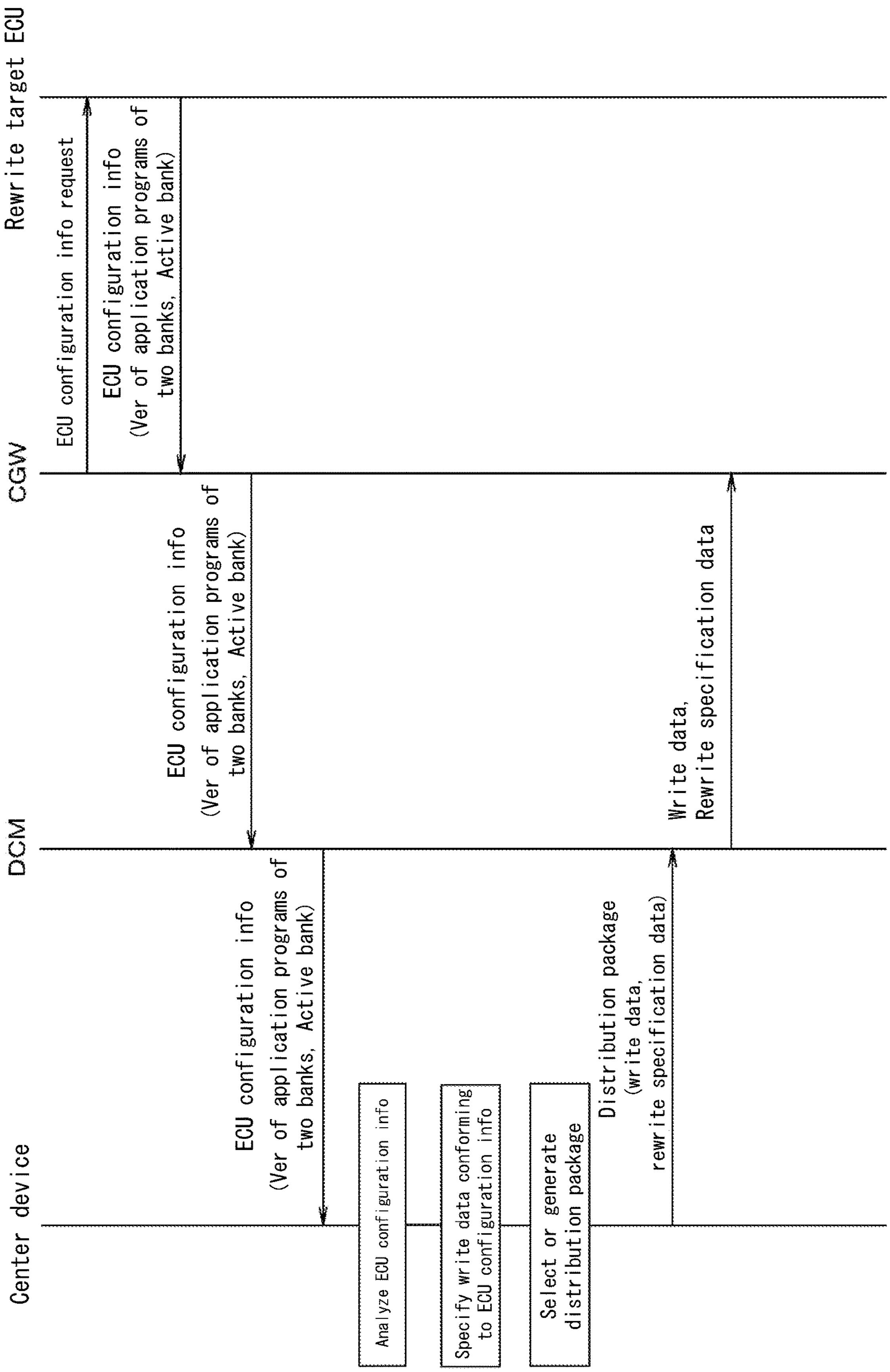
FIG. 81 is a sequence diagram illustrating an aspect of performing a notification of double-bank rewrite information.

The data storage bank information transmission control process will be described with reference to FIGS. 79 to 81. The vehicle program rewriting system 1 performs the data storage bank information transmission control process in the CGW 13.

Figure 79:
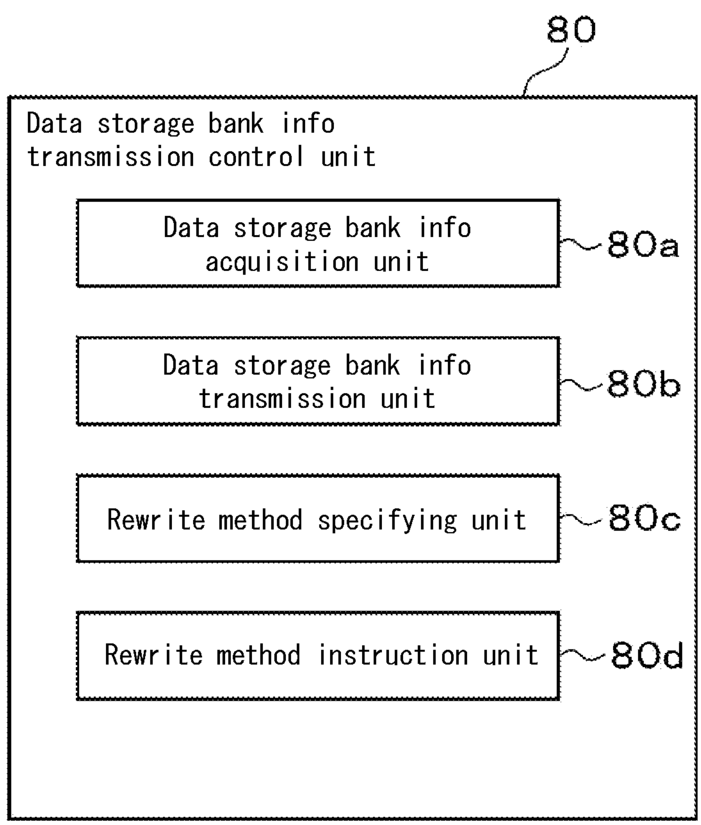
FIG. 79 is a functional block diagram of a data storage bank information transmission control unit.

As illustrated in FIG. 79, the CGW 13 includes a data storage bank information acquisition unit 80*a*, a data storage bank information transmission unit 80*b*, a rewrite method specifying unit 80*c*, and a rewrite method instruction unit 80*d* in the data storage bank information transmission control unit 80. The data storage bank information acquisition unit 80*a* acquires information regarding hardware and software from the respective ECUs 19 as ECU configuration information. Specifically, in a case of a double-bank memory ECU and a single-bank suspend memory ECU having a plurality of data storage banks, a software ID including version information of each of the data storage banks and information that can specify an active bank-A are acquired as double-bank rewrite information (hereinafter, referred to as bank information).

When the ECU configuration information including the bank information is acquired by the data storage bank information acquisition unit 80*a*, the data storage bank information transmission unit 80*b* transmits the acquired bank information from the DCM 12 to the center device 3 as one of the ECU configuration information. The data storage bank information transmission unit 80*b* may transmit the ECU configuration information to the center device 3 each time the IG switch 42 switches between an ON state and an OFF state, and may transmit the ECU configuration information to the center device 3 in response to a request from the center device 3. The data storage bank information transmission unit 80*b* may transmit the ECU configuration information not only to a double-bank memory ECU and a single-bank suspend memory ECU but also to a single-bank memory ECU along with an ECU configuration including the bank information.

The rewrite method specifying unit 80*c* specifies a rewrite method on the basis of an analysis result of rewrite specification data for the CGW 13. The rewrite method indicates a power supply switching method during installation in the rewrite target ECU 19. When the rewrite method is specified by the rewrite method specifying unit 80*c*, the rewrite method instruction unit 80*d* instructs the rewrite target ECU 19 to rewrite an application program according to the specified rewrite method. That is, when a rewrite method based on self-retention power is specified by the rewrite method specifying unit 80*c*, the rewrite method instruction unit 80*d* instructs the rewrite target ECU 19 to rewrite an application program based on the self-retention power. When a rewrite method based on power supply control is specified by the rewrite method specifying unit 80*c*, the rewrite method instruction unit 80*d* instructs the rewrite target ECU 19 to rewrite an application program based on the power supply control without using the self-retention power.

Next, with reference to FIGS. 80 and 81, an operation of the data storage bank information transmission control unit 80 in the CGW 13 will be described. The CGW 13 executes a data storage bank information transmission control program, and thus performs the data storage bank information transmission control process.

When the data storage bank information transmission control process is initiated, the CGW 13 transmits an ECU configuration information request including the bank information to all of the ECUs 19 (S801), and acquires ECU configuration information including the bank information from all of the ECUs 19 (S802; corresponding to a data storage bank information acquisition step). When the ECU configuration information is acquired from each rewrite target ECU 19, the CGW 13 transmits the acquired ECU configuration information to the DCM 12 (S803; corresponding to a data storage bank information transmitting step), and waits for write data and rewrite specification data to be acquired from the DCM 12 (S804). Here, in a case where the rewrite target ECU 19 is specified in advance, the CGW 13 may acquire bank information or the like from only the specified rewrite target ECU 19.

When the ECU configuration information is received from the CGW 13, the DCM 12 temporarily stores the received ECU configuration information, and transmits the ECU configuration information to the center device 3 at a timing of transmitting (uploading) the ECU configuration information to the center device 3. When the ECU configuration information is received from the DCM 12, the center device 3 stores and analyzes the received ECU configuration information.

The center device 3 specifies a version of an application program on each bank of each ECU 19 that is a transmission source of the bank information and which bank is an active bank, and specifies write data compliant to the version of the application program and the active bank corresponding to the specified double banks (corresponding to an update data selection step). For example, in a case where the bank-A is an active bank, the application program stored in the active bank has the version 2.0, the bank-B is an inactive bank, and the application program stored in the inactive bank has the version 1.0, the center device 3 specifies write data of the version 3.0 for the bank-B as the write data. In a case where the write data is difference data, the center device 3 specifies the difference data for update from the version 1.0 to the version 3.0. When the write data is specified, the center device 3 transmits a distribution package including the specified write data and rewrite specification data to the DCM 12 (corresponding to a distribution package transmission step).

The center device 3 may statically select or dynamically generate a distribution package to be transmitted to the DCM 12. In a case where the center device 3 statically selects the distribution package to be transmitted to the DCM 12, the center device manages a plurality of distribution packages in which the write data is stored, selects write data compliant to an inactive bank, selects a distribution package including the selected write data from among the plurality of distribution packages, and transmits the selected distribution package to the DCM 12. In a case where the center device 3 dynamically generates a distribution package to be transmitted to the DCM 12, when write data compliant to the inactive bank is specified, the center device generates a distribution package including the specified write data and transmits the generated distribution package to the DCM 12.

When the distribution package is downloaded from the center device 3, the DCM 12 extracts the write data and the rewrite specification data from the downloaded distribution package, and transfers the extracted write data and rewrite specification data to the CGW 13.

When it is determined that the write data and the rewrite specification data are acquired from the DCM 12 (S804: YES), the CGW 13 analyzes the acquired rewrite specification data (S805), and determines a rewrite method for the rewrite target ECU 19 on the basis of an analysis result of the rewrite specification data (S806 and S807).

When it is determined that the rewrite method is a rewrite method using self-retention power (S806: YES), the CGW 13 transmits a write data acquisition request to the DCM 12 on the condition of being in an installable vehicle condition, acquires the write data from the DCM 12, distributes the acquired write data to the rewrite target ECU 19, rewrites the application program by using self-retention power (S808), and terminates the data storage bank information transmission control process. The method of rewriting the application program by using the self-retention power is the same as described in (b) Case where a application program is rewritten by using self-retention power with reference to FIGS. 28 and 29 described above.

When it is determined that a rewrite method is rewriting based on power supply control (S807: YES), the CGW 13 transmits a write data acquisition request to the DCM 12 on the condition that the vehicle is parked, acquires write data from the DCM 12, distributes the acquired write data to the rewrite target ECU 19, rewrites the application program using the power supply control (S809), and terminates the data storage bank information transmission control process. The method of rewriting the application program by using the power supply control is the same as described in (a) Case where application program is rewritten by using power supply control with reference to FIGS. 26 and 27.

As described above, the CGW 13 performs the data storage bank information transmission control process, and thus notifies the center device 3 of ECU configuration information including bank information, and downloads a distribution package including write data compliant to the ECU configuration information from the center device 3 to the DCM 12. The CGW 13 acquires write data compliant to the bank information from the DCM 12 and distributes the write data to the rewrite target ECU 19. In a case where the ECU 19 equipped with a flash memory having double data storage banks is a rewrite target, an application program can be appropriately rewritten.

As an aspect in which the center device 3 distributes the distribution package, there are the following first to third distribution aspects. In the first distribution aspect, the center device 3 distributes a single distribution package storing, for example, write data of the version 2.0 for the bank-A and write data of the version 2.0 for the bank-B. The DCM 12 extracts the write data of the version 2.0 for the bank-A and the write data of the version 2.0 for the bank-B from the distribution package downloaded from the center device 3, and transfers the extracted write data to the CGW 13. When the write data of the version 2.0 for the bank-A and the write data of the version 2.0 for the bank-B are transferred from the DCM 12, the CGW 13 selects one of the two pieces of write data and distributes the selected write data to the rewrite target ECU 19. That is, there is a configuration in which write data corresponding to each data storage bank is included in a distribution package, and rewrite data suitable for the rewrite target ECU 19 is selected in the master device 11.

In the second distribution aspect, the center device 3 selects and distributes either a distribution package storing write data of the version 2.0 for the bank-A or a distribution package storing write data of the version 2.0 for the bank-B, for example. The DCM 12 extracts the write data from the distribution package downloaded from the center device 3 and transfers the extracted write data to the CGW 13. The CGW 13 distributes the write data transferred from the DCM 12 to the rewrite target ECU 19. That is, there is a configuration in which the center device 3 selects a distribution package including inactive bank write data on the basis of bank information uploaded from the DCM 12.

In the third distribution aspect, the center device 3 distributes a distribution package storing, for example, write data of the version 2.0 shared by the bank-A and the bank-B. The DCM 12 extracts the write data of the version 2.0 shared by the bank-A and the bank-B from the distribution package downloaded from the center device 3, and transfers the extracted write data to the CGW 13. The CGW 13 distributes the write data of the version 2.0 shared by the bank-A and the bank-B transferred from the DCM 12 to the rewrite target ECU 19. When the write data of the version 2.0 shared by the bank-A and the bank-B is received from the CGW 13, the rewrite target ECU 19 writes the received write data to either the bank-A or the bank-B. In this case, when an application program is executed in the rewrite target ECU 19, an address solving function of the microcomputer works, so that the rewrite target ECU 19 is appropriately operated even when the write data is written to either the bank-A or the bank-B. That is, the microcomputer of the write target ECU 19 solves a differences between execution addresses due to a difference between the banks such that the center device 3 and the master device 11 can be operated without being aware of the banks.

The ECU configuration information including the bank information transmitted from the CGW 13 to the center device 3 via the DCM 12 may include not only information for specifying a version of an application program and an active bank corresponding to the double banks but also vehicle specifying information, system specifying information, ECU specifying information, usage environment information, and the like.

The vehicle specifying information is unique information for specifying a vehicle that is a distribution destination of a distribution package, and is, for example, a vehicle identification number (VIN). In vehicles that fall under the on-board diagnostics (OBD) regulations, a VIN can be used in accordance with provisions of the OBD regulations, but in vehicles that do not fall under the OBD Regulations, such as EV vehicles, the VIN is not available, and thus individual vehicle identification information may be used instead of the VIN.

The system specifying information is unique information for identifying the type of reprogramming system. The CGW 13 can perform wireless rewriting for a system in which wired rewriting using diagnosis communication managed by the CGW can be performed, but cannot perform wireless rewriting for other individual systems. That is, this is because the system updates a program that is acquired in a wireless manner by using an update mechanism of a program acquired in a wired manner. Thus, it is necessary for the center device 3 to determine which distribution package is to be distributed to which system, and it is possible to manage which system is mounted on the vehicle by using the system specifying information. The center device 3 can determine a rewrite method for each system, a rewrite order in a case where a plurality of systems are rewrite targets, and the like by determining the system specifying information.

The ECU specifying information is unique information for specifying the rewrite target ECU 19, and is information including a software version for uniquely specifying the rewrite ECU and an application program written in the rewrite target ECU 19, and a hardware version. The ECU specifying information also corresponds to an ECU part number. In a case where the latest software is written with entire data, only the hardware version is required. It is also possible to define information that can be specified by an application program, such as a specification version or a configuration version, and to further define a microcomputer ID, a sub-microcomputer ID, a flash ID, a software child version, a software grandchild version, and the like.

The usage environment information is unique information for specifying an environment in which the user uses the vehicle. When the usage environment information is transmitted from the CGW 13 to the center device 3 via the DCM 12, the center device 3 can distribute an application program suitable for the environment in which the user is using the vehicles. It is possible to distribute application programs suitable for environments in which users use vehicles, for example, application programs specialized for acceleration are distributed to users who prefer sudden acceleration driving from the time of stop, and application programs that are inferior in acceleration performance but specialized for eco-driving are distributed to users who prefer eco-driving.

As described above, the case has been described in which the flash memory is mounted on the microcomputer of the rewrite target ECU 19, but, in a case where an external memory is connected to the microcomputer of the rewrite target ECU 19, the external memory is processed as the same as a double-bank memory, and write data is written by dividing a write area of the external memory into two areas. In a case where the flash memory is mounted on the microcomputer of the rewrite target ECU 19 and the external memory is connected, a program stored in the external memory may be temporarily copied to a memory of the microcomputer in some cases. Since the external memory may generally be used as a storage area of an operation log of the ECU, it is desirable to stop storing the operation log in a case where writing of write data to the external memory is initiated, and to resume storing of the operation log in a case where writing of the write data to the external memory has been completed.

The same applies to a case of rewriting map data because there is a concept of double banks and a version not only in a case of rewriting an application program but also in a case of data having the property of being updated one by one, such as the map data.

(9) Non-Rewrite Target Power Supply Management Process

The power supply management process for the non-rewrite target ECU 19 will be described with reference to FIGS. 82 to 87. The vehicle program rewriting system 1 performs the power supply management process for the non-rewrite target ECU 19 in the CGW 13. In the present embodiment, a situation is assumed in which download of a distribution package has been completed by the DCM 12, the CGW 13 acquires a rewrite specification data, and the CGW 13 distributes a write data to the rewrite target ECU 19 while the vehicle is in a parking state. In a case where the write data is distributed to the rewrite target ECU 19, the CGW 13 requests the power supply management ECU 20 to turn on the IG power to bring all of the ECUs 19 into an active state.

Figure 82:
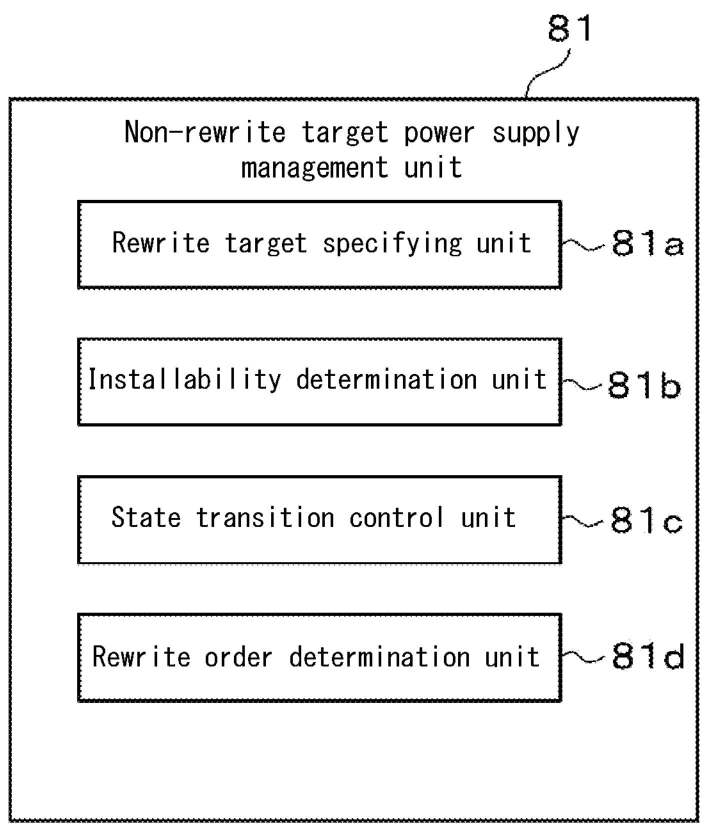
FIG. 82 is a functional block diagram of a power supply management unit for a non-rewrite target.

As illustrated in FIG. 82, the CGW 13 includes a rewrite target specifying unit 81*a*, an installability determination unit 81*b*, a state transition control unit 81*c*, and a rewrite order specifying unit 81*d* in the power supply management unit 81 of the non-rewrite target ECU 19. The rewrite target specifying unit 81*a* specifies the rewrite target ECU 19 and the non-rewrite target ECU 19 on the basis of an analysis result of the rewrite specification data. The installability determination unit 81*b* determines whether or not installation is feasible in the rewrite target ECU 19.

The state transition control unit 81*c* can change a state of the ECU 19, and control the ECU 19 in a stop state or a sleep state to transition to an active state (wake-up state), or control the ECU 19 in the active state to transition to the stop state or the sleep state. The state transition control unit 81*c* causes the ECU 19 in a normal operating state to transition to a power saving operating state or causes the ECU 19 in the power saving operating state to transition to the normal operating state. When it is determined by the installability determination unit 81*b* that the installation is feasible, the state transition control unit 81*c* controls at least one non-rewrite target ECU 19 to be in the stop state, the sleep state, or the power saving operating state. The rewrite order specifying unit 81*d* specifies a rewrite order for the rewrite targets ECU 19 on the basis of the analysis result of the rewrite specification data.

Next, a description will be made of an operation of the power supply management unit 81 of the non-rewrite target ECU 19 in the CGW 13 will be described with reference to FIGS. 83 to 87. The CGW 13 executes a non-rewrite target power supply management program and thus performs a non-rewrite target power supply management process. Here, a description will be made of a case where the ECUs 19 that are management targets are brought into an active state by the CGW 13.

When the power supply management process for the non-rewrite target ECU 19 is initiated, the CGW 13 specifies the rewrite target ECUs 19 and the non-rewrite target ECUs 19 on the basis of an analysis result of the CGW rewrite specification data (S901), and specifies a rewrite order of one or more rewrite target ECUs 19 on the basis of the analysis result of the rewrite specification data (S902). When the CGW 13 determines whether or not write data can be written (S903; corresponding to a writability determination procedure) and determines that the write data can be written (S903: YES), the CGW transmits a power-off request (stop request) to the non-rewrite target ECU 19 of the ACC system and the non-rewrite target ECU 19 of the IG system, and thus causes the non-rewrite target ECU 19 of the ACC system and the non-rewrite target ECU 19 of the IG system to transition from the active state to the stop state (S904; corresponding to a state transition control procedure).

When the CGW 13 determines whether or not transmission of the power-off request to all of the corresponding ECUs 19 has been completed (S905), and determines that transmission of the power-off request to all of the corresponding ECUs 19 has been completed (S905: YES), the CGW transmits a sleep request to the non-rewrite target ECU 19 of the +B power system, and thus causes the non-rewrite target ECU 19 of the +B power system to transition from the active state to the sleep state (S906; corresponding to a state transition control procedure).

When the CGW 13 determines whether or not transmission of the sleep request to all of the corresponding ECUs 19 has been completed (S907), and determines that the transmission of the sleep request to all of the corresponding ECUs 19 has been completed (S907: YES), the CGW determines whether or not rewriting of an application program in all of the rewrite target ECUs 19 has been completed (S908). When it is determined that rewriting of the application program has been completed in all of the rewrite target ECUs 19 (S908: YES), the CGW 13 finishes the power supply management process for the non-rewrite target ECU 19. When it is determined that rewriting of the application program is not completed in all of the rewrite target ECUs 19 (S908: NO), the CGW 13 returns to step S904, and repeatedly performs step S904 and the subsequent steps.

Figure 83:
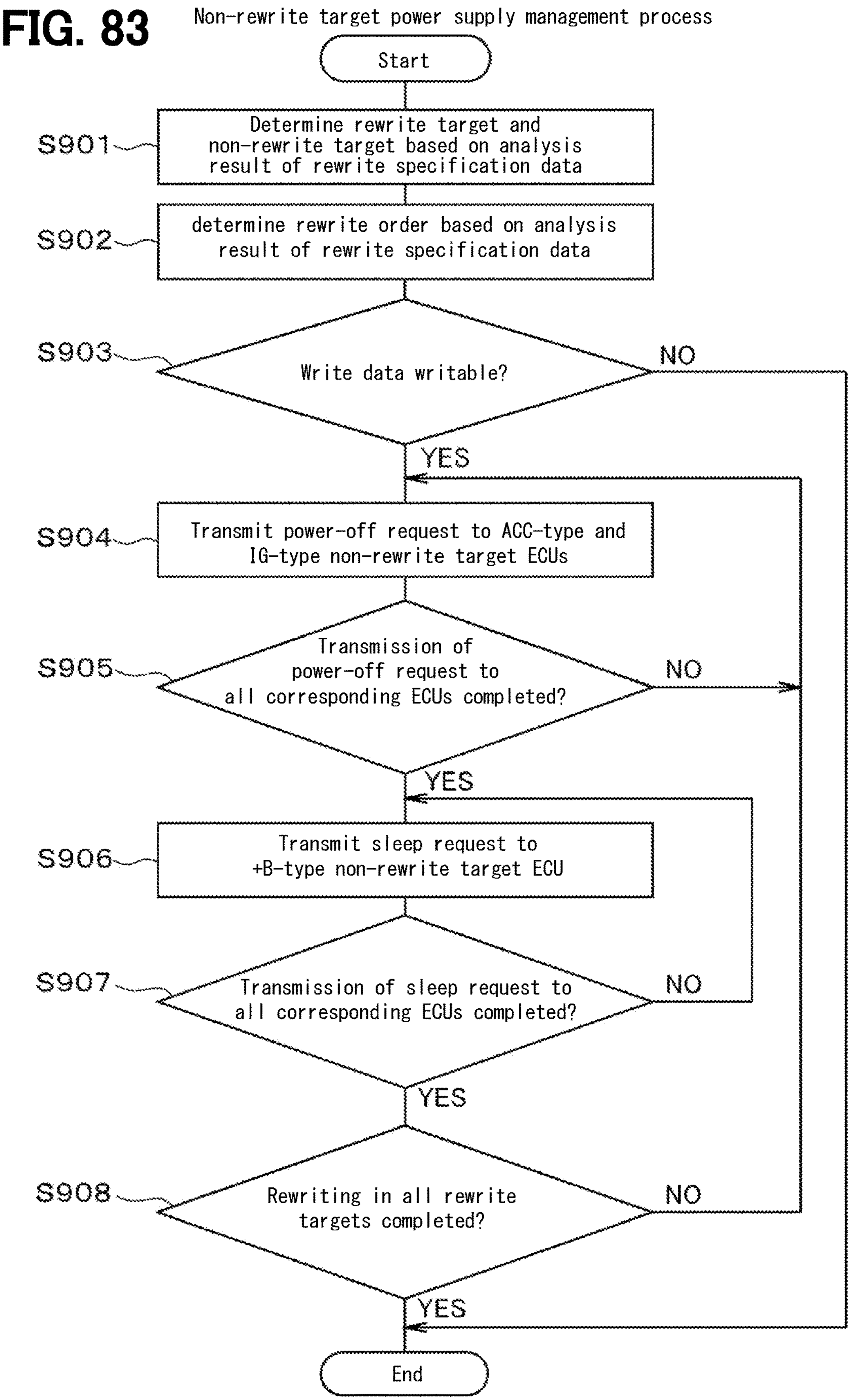
FIG. 83 is a flowchart illustrating a power supply management process for a non-rewrite target.
Figure 84:
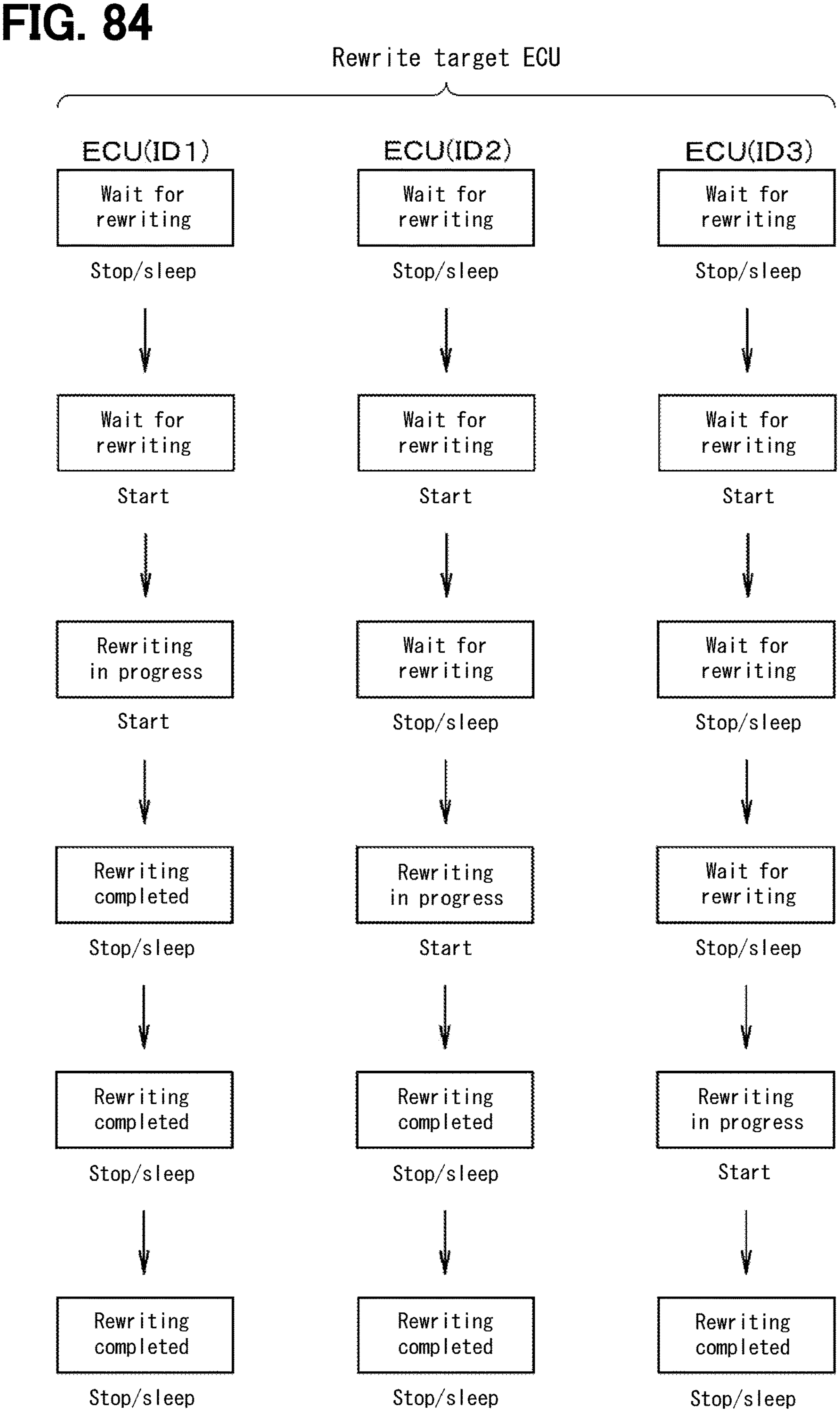
FIG. 84 is a diagram illustrating transition to an active state, a stop state, and a sleep state.
Figure 85:
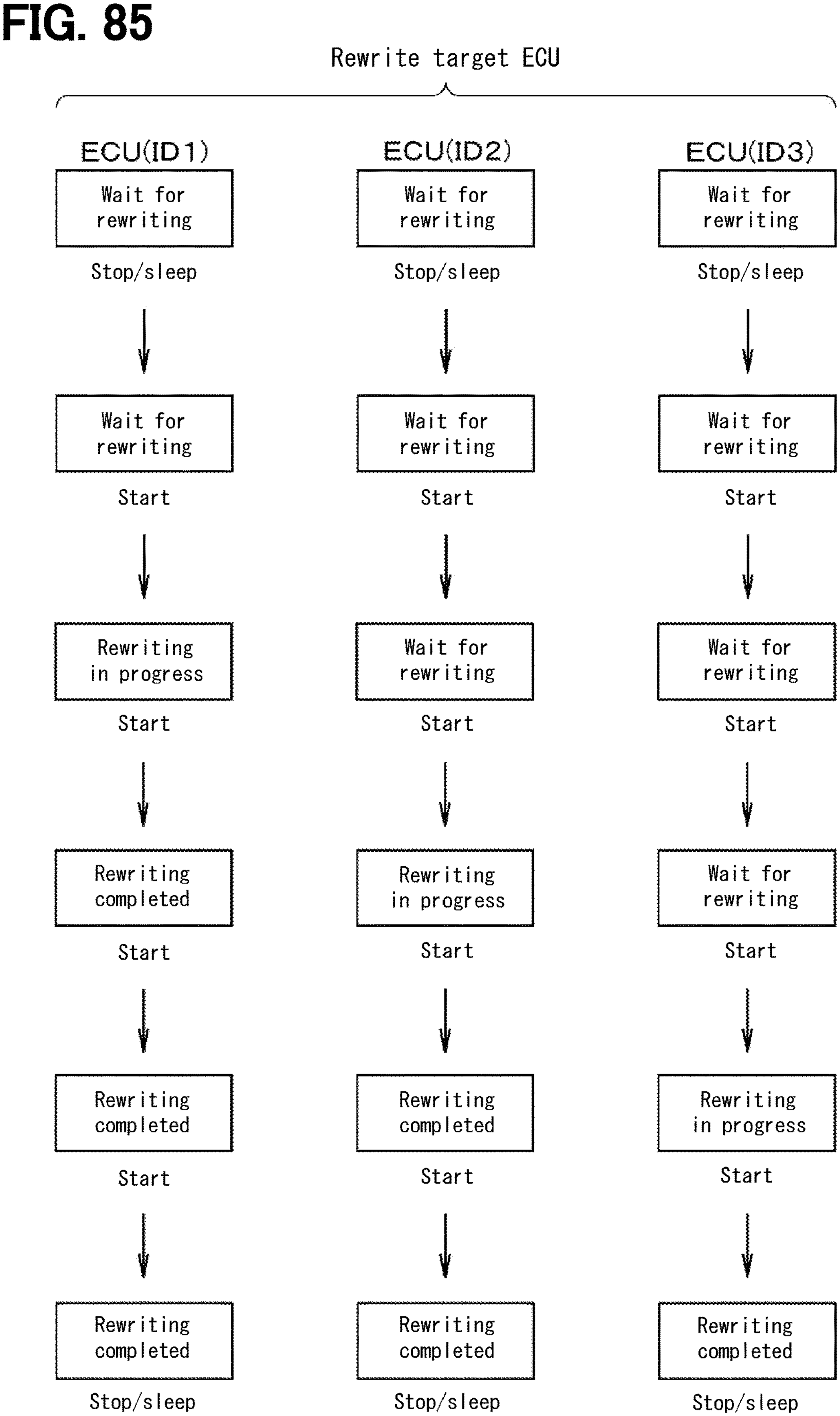
FIG. 85 is a diagram illustrating the transition of the active state, stop state, and sleep state.

In a case where there are a plurality of rewrite target ECUs 19, the CGW 13 may individually cause states of the plurality of rewrite target ECUs 19 to transition, or may collectively cause the states of the plurality of rewrite target ECUs 19 to transition. That is, FIG. 83 illustrates a process in which the CGW 13 transmits a power-off request or a sleep request to the non-rewrite target ECU 19. In FIG. 84 and FIG. 85 described next, a description will be made of a case where the power supply management process for the rewrite target ECU 19 is performed in addition to the power supply management process for the non-rewrite target ECU 19.

First, a description will be made of a case where the CGW 13 individually causes states of a plurality of rewrite target ECUs 19 to transition with reference to FIG. 84. As illustrated in FIG. 84, for example, a description will be made of a case where the rewrite target ECUs 19 are an ECU (ID1), an ECU (ID2), and an ECU (ID3), and the rewrite target ECUs 19 are sequentially subjected to rewriting during parking in a designated rewrite order of the ECU (ID1), the ECU (ID2), and the ECU (ID3) from the earliest rewrite order.

The CGW 13 causes all of the ECU (ID1), ECU (ID2), and ECU (ID3) to transition from the stop state or the sleep state to the active state. The CGW 13 maintains the first rewrite target ECU (ID1) to be in the active state, causes the ECU (ID2) and the ECU (ID3) to transition from the active state to the stop state or the sleep state, and distributes the write data to the ECU (ID1). When the distribution of the write data to the ECU (ID1) has been completed, the CGW 13 causes the ECU (ID1) to transition from the active state to the stop state or the sleep state, causes the second rewrite target ECU (ID2) to transition from the stop state or the sleep state to the active state, maintains the ECU (ID3) to be in the stop state or the sleep state, and distributes the write data to the ECU (ID2).

When the distribution of the write data to the ECU (ID2) has been completed, the CGW 13 maintains the ECU (ID1) to be in the stop state or the sleep state, causes the ECU (ID2) to transition from the active state to the stop state or the sleep state, causes the third rewrite target ECU (ID3) to transition from the stop state or the sleep state to the active state, and distributes the write data to the ECU (ID3). When the distribution of the write data to the ECU (ID3) has been completed, the CGW 13 maintains the ECU (ID1) and the ECU (ID2) to be in the stop state or the sleep state, and causes the ECU (ID3) to transition from the active state to the stop state or the sleep state. As mentioned above, the CGW 13 controls only the ECU 19 that is a current rewrite target among the plurality of the rewrite target ECUs 19 to be in the active state.

Next, a description will be made a case where the CGW 13 collectively causes states of a plurality of rewrite target ECUs 19 to transition with reference to FIG. 85. As illustrated in FIG. 85, for example, a description will be made of a case where the rewrite target ECUs 19 are the ECU (ID1), the ECU (ID2), and the ECU (ID3), and the rewrite target ECUs 19 are sequentially subjected to rewriting during parking in a designated rewrite order of the ECU (ID1), the ECU (ID2), and the ECU (ID3) from the earliest rewrite order.

The CGW 13 causes all of the ECU (ID1), ECU (ID2), and ECU (ID3) to transition from the stop state or the sleep state to the an active state. The CGW 13 maintains all of the ECU (ID1), ECU (ID2), and ECU (ID3) to be in the active state and distributes the write data to the ECU (ID1). When the distribution of the write data to the ECU (ID1) has been completed, the CGW 13 distributes the write data to the ECU (ID2). When the distribution of the write data to the ECU (ID2) has been completed, the CGW 13 distributes the write data to the ECU (ID3). When the distribution of the write data to the ECU (ID3) has been completed, the CGW 13 causes all of the ECU (ID1), ECU (ID2), and ECU (ID3) to transition from the active state to the stop state or the sleep state. As mentioned above, the CGW 13 controls a plurality of all rewrite target ECUs 19 to be in the active state until installation has been completed in all of the rewrite target ECUs. Here, the CGW 13 may simultaneously distribute write data to the ECU (ID1), the ECU (ID2), and the ECU (ID3) in parallel.

In a case where the rewrite target ECU 19 rewrites an application program during parking, a voltage supplied to the rewrite target ECU 19 is not necessarily in a stable environment, and there is concern that exhaustion of the vehicle battery 40 may occur during the rewriting of the application program. Particularly, where there are a plurality of rewrite target ECUs 19, the time required for rewriting the application program increases, and thus there is a high probability that exhaustion of the vehicle battery 40 may occur during rewriting of the application program. In relation to this fact, the non-rewrite target ECU 19 is brought into the stop state or the sleep state as described above, and thus a situation in which a remaining battery charge of the vehicle battery 40 becomes insufficient during rewriting of a program is prevented in advance. The ECU 19 that is not a current rewrite target among the rewrite target ECUs 19 is brought into the stop state or the sleep state, and thus power consumption can be further reduced.

Figure 86:
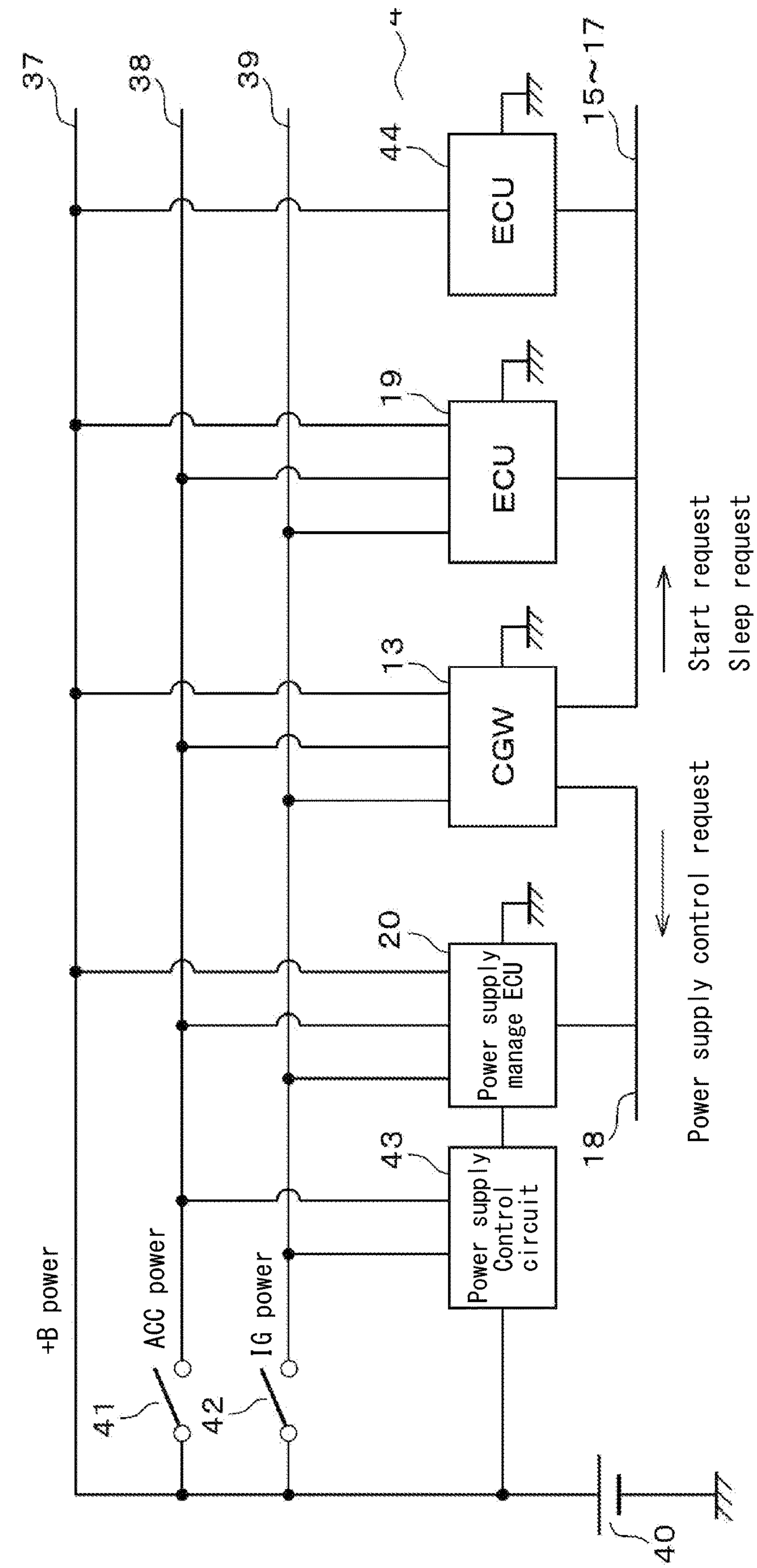
FIG. 86 is a diagram illustrating a connection aspect of power lines.
Figure 87:
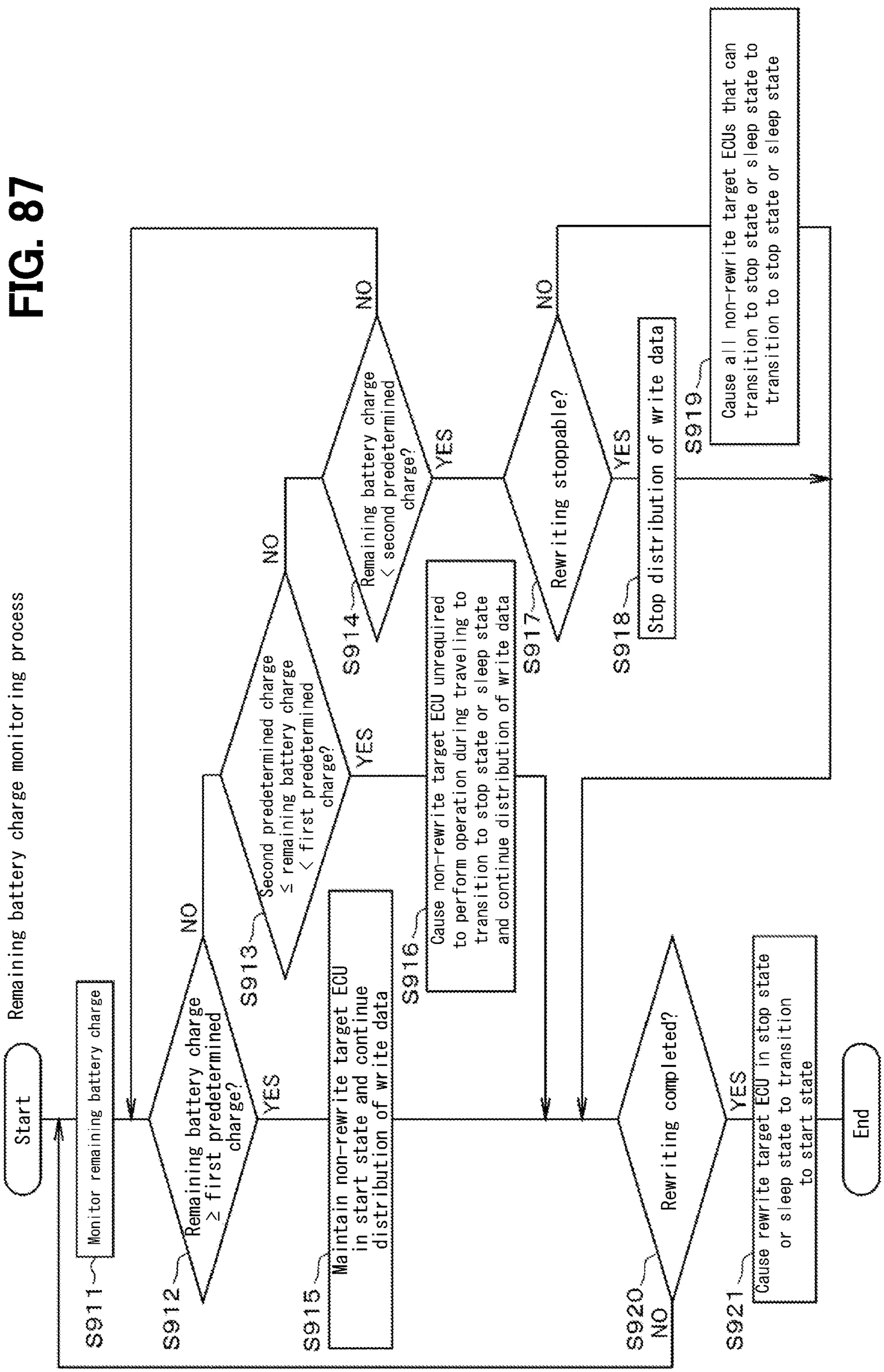
FIG. 87 is a flowchart illustrating a remaining battery charge monitoring process.

The above description relates to a case where an application program of the rewrite target ECU 19 is rewritten during parking, and a description will be made of a case where an application program of the rewrite target ECU 19 is rewritten while the vehicle is traveling. In a case where the rewrite target ECU 19 rewrites the application program while the vehicle is traveling, a voltage supplied to the rewrite target ECU 19 is in a stable environment, and thus there is no concern that exhaustion of the vehicle battery 40 may occur during the rewriting of the application program, but a remaining battery charge of the vehicle battery 40 may be small. In light of such circumstances, it is desirable to cause the ECU 19 that does not need to perform an operation to transition to the stop state or the sleep state while the vehicle is traveling. As illustrated in FIG. 86, although an ECU 44 that does not need to perform an operation is connected to the +B power line 37 while the vehicle is traveling, in a case of a configuration in which the ECU 44 is not connected to the ACC power line 38 and the IG power line 39, the CGW 13 causes ECU 44 that does not need to perform an operation while the vehicle is traveling to transition from the active state to the stop state or the sleep state. The ECU 44 is, for example, an ECU having a function of preventing theft. That is, the CGW 13 causes the ECU44 that does not need to perform an operation and is not a rewrite target among all the ECU 19 in the active state while the vehicle is traveling, to transition to the stop state or the sleep state. Consequently, it is possible to suppress an increase in power consumption due to installation while the vehicle is traveling.

The CGW 13 monitors a remaining battery charge of the vehicle battery 40, and performs the above-described non-rewrite target power supply management process. Here, a remaining battery charge monitoring process will be described with reference to FIG. 87. When the remaining battery charge monitoring process is initiated, the CGW 13 monitors a remaining battery charge while write data is being distributed to the rewrite target ECU 19 (S911), and determines whether the remaining battery charge is equal to or more than a first predetermined capacity, whether the remaining battery charge is less than the first predetermined capacity and equal to or more than a second predetermined capacity, and whether the remaining battery charge is less than the second predetermined capacity (S912 to S914).

When it is determined that the remaining battery charge is equal to or more than the first predetermined capacity (S912: YES), the CGW 13 maintains the non-rewrite target ECU 19 to be in the active state, and continues the distribution of the write data to the rewrite target ECU 19 (S915). When it is determined that the remaining battery charge is less than the first predetermined capacity and is equal to or more than the second predetermined capacity (S913: YES), the CGW 13 causes an ECU that does not need to perform an operation during traveling among the non-rewrite target ECUs 19 to transition to the stop state or the sleep state, and continues the distribution of the write data to the rewrite target ECU 19 (S916). When it is determined that the remaining battery charge is less than the second predetermined capacity (S914: YES), the CGW 13 determines whether or not rewriting can be stopped (S917).

When it is determined that rewriting can be stopped (S917: YES), the CGW 13 stops the distribution of the write data (S918). When it is determined that rewriting cannot be stopped (S917: NO), the CGW 13 causes all ECUs among the non-rewrite target ECUs 19 that can transition to the stop state or the sleep state to transition to the stop state or the sleep state (S919).

When the CGW 13 determines whether or not rewriting has been completed (S920), and determines that rewriting is not completed (S920: NO), the CGW returns to step S911, and repeatedly performs step S911 and the subsequent steps. When it is determined that the rewriting has been completed (S920: YES), the CGW 13 causes the rewrite target ECU 19 in the stop state or the sleep state to transition to the active state (S921), and finishes the remaining battery charge monitoring process. Here, values of the first predetermined capacity and the second predetermined capacity may be stored in advance by the CGW 13, or values designated by rewrite specification data may be used.

In the step S919, the CGW 13 may exclude the ECU 19 having a specific function such as an alarm function from targets that transition to the stop state or the sleep state, and may cause the non-rewrite target ECU 19 to transition from the active state to the stop state or the sleep state except the ECU 19 having the specific function. In a case where the rewrite target ECU 19 can execute application control while an application program is being rewritten, the CGW 13 may bring the non-rewrite target ECU 19 into the stop state or the sleep state except the ECU 19 that can communicate with the rewrite target ECU 19. The CGW 13 may cause the rewrite target ECU 19 to transition from the stop state or the sleep state to the active state in a case where rewrite conditions are established when all the ECUs 19 are in the stop state or the sleep state, for example, when a vehicle position becomes a predetermined position or the present time reaches a predetermined time.

The CGW 13 may group the rewrite target ECUs 19 or the non-rewrite target ECUs 19 on the basis of any of start power (a +B power ECU, an ACC ECU, or an IG ECU), a domain group (a body system, a traveling system, or a multimedia system), and a synchronization timing, and may bring the rewrite target ECU 19 into the active state in the group unit, or may bring the non-rewrite target ECU 19 into the stop state or sleep state in the group unit.

The CGW 13 may be configured to control the power supply in the bus unit. That is, when it is determined that all of the ECUs 19 connected to a specific bus are the non-rewrite target ECUs 19, the CGW 13 may turn off power of the specific bus to cause all of the non-rewrite target ECUs 19 connected to the specific bus to transition to the stop state or the sleep state.

As described above, the CGW 13 performs the non-rewrite target power supply management process, and thus brings at least one non-rewrite target ECU 19 into the stop state, the sleep state, or the power saving operating state when it is determined that installation can be performed in the rewrite target ECU 19. It is possible to prevent a situation in which a remaining battery charge of the vehicle battery 40 becomes insufficient during rewriting of an application program. Since the non-rewrite target ECU 19 is brought into the stop state, the sleep state, or the power saving operating state, it is possible to suppress an increase in communication loads.

(10) File Transfer Control Process

The file transfer control process will be described with reference to FIGS. 88 to 97. The vehicle program rewriting system 1 performs the file transfer control process in the CGW 13. The present embodiment corresponds to a process of transmitting rewrite data stored the DCM 12 (corresponding to a first device) to the rewrite target ECU 19 (corresponding to a third device) via the CGW 13 (corresponding to a second device).

Figure 88:
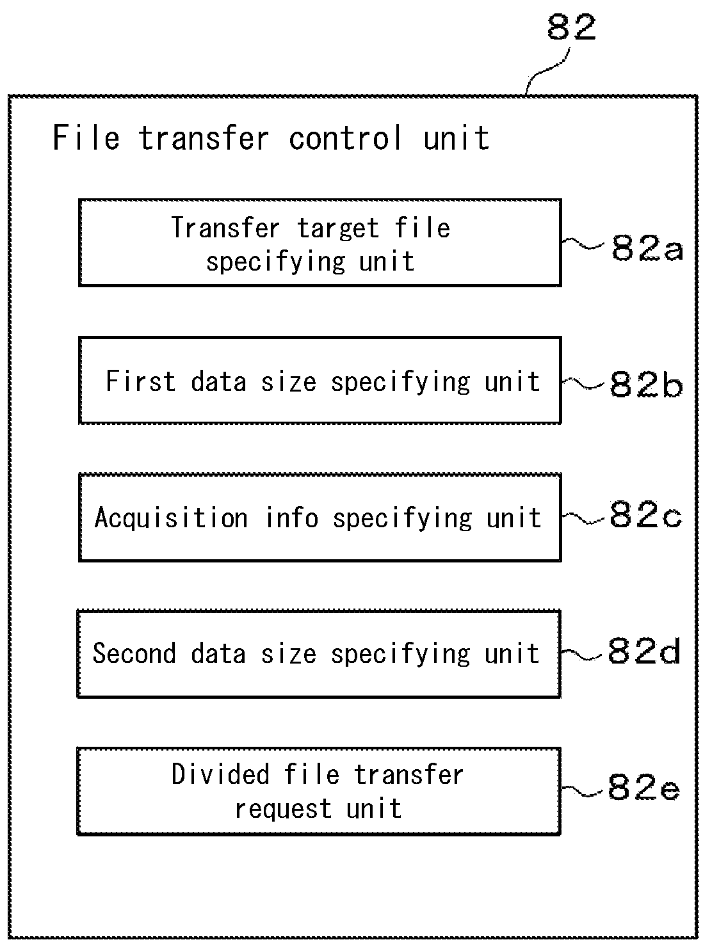
FIG. 88 is a functional block diagram of a file transfer control unit.
Figure 89:
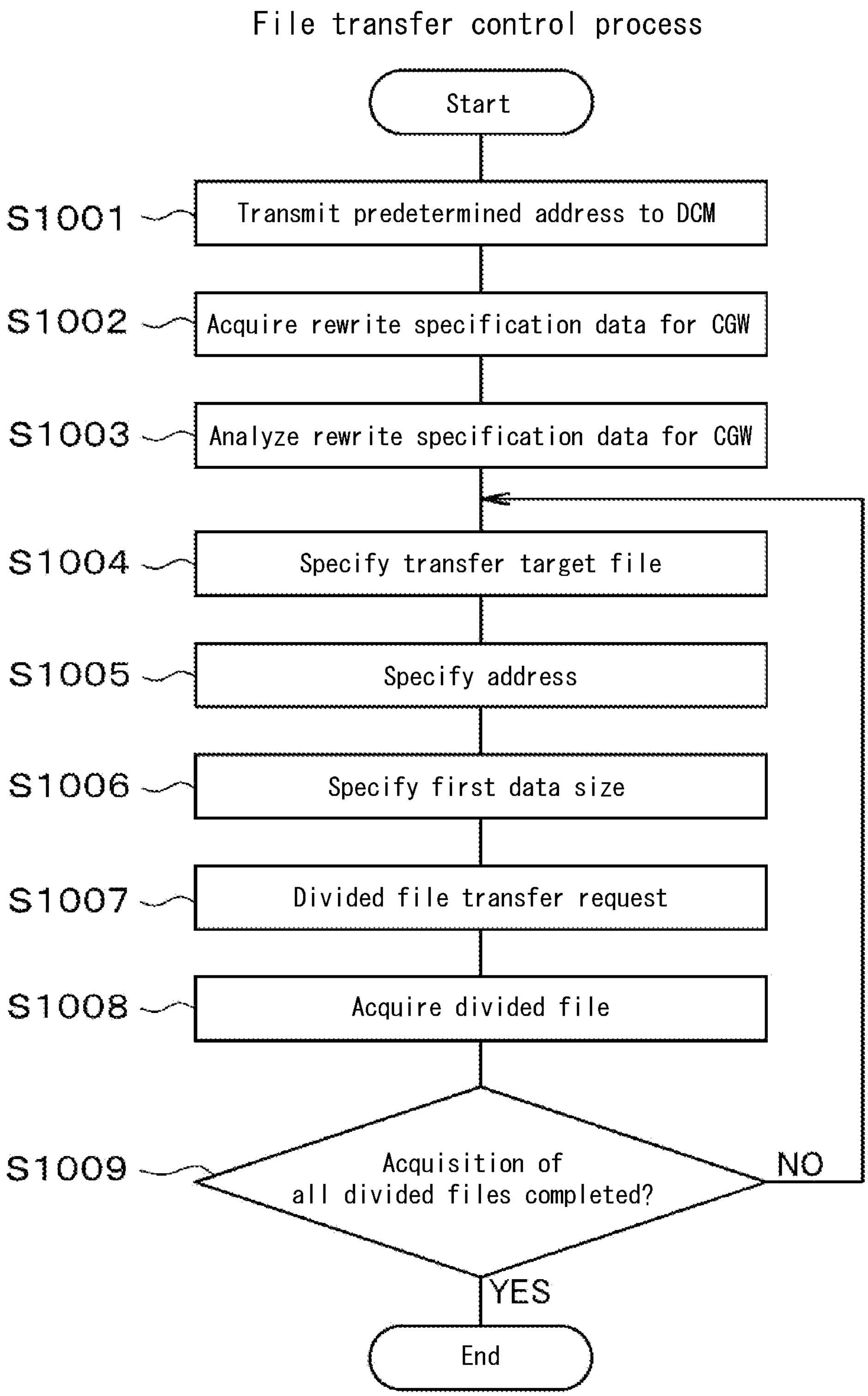
FIG. 89 is a flowchart illustrating a file transfer control process.

As illustrated in FIG. 88, the CGW 13 includes a transfer target file specifying unit 82*a*, a first data size specifying unit 82*b*, an acquisition information specifying unit 82*c*, a second data size specifying unit 82*d*, and a divided file transfer request unit 82*e* in the file transfer control unit 82. The transfer target file specifying unit 82*a* specifies a file including write data to be written to the rewrite target ECU 19 as a transfer target file by using an analysis result of rewrite specification data. For example, in a case where the rewrite target ECUs 19 are the ECU (ID1), the ECU (ID2), and the ECU (ID3), the transfer target file specifying unit 82*a* acquires ECU information of the ECU (ID1), the ECU (ID2), and the ECU (ID3) from the CGW rewrite specification data illustrated in FIG. 8, and specifies the file including the write data from the acquired ECU information as a transfer target file. As the transfer target file, an address or an index for acquiring the file may be specified, or a file name of the file may be specified.

When the transfer target file is specified by the transfer target file specifying unit 82*a*, the first data size specifying unit 82*b* specifies a first data size for acquiring the transfer target file. When the transfer target file is specified by the transfer target file specifying unit 82*a*, the acquisition information specifying unit 82*c* specifies an address as acquisition information for acquiring the transfer target file. In the present embodiment, the address is specified as the acquisition information for acquiring the transfer target file, but, as long as the acquisition information is used for acquiring the transfer target file, not only an address but also a file name or an ECU (ID) may be used. The second data size specifying unit 82*d* specifies a second data size for distributing write data to the rewrite target ECU 19. That is, the first data size is a data transfer size from the DCM 12 to the CGW 13, and the second data size is a data transfer size from the CGW 13 to the rewrite target ECU 19.

When the address is specified by the acquisition information specifying unit 82*c* and the first data size is specified by the first data size specifying unit 82*b*, the divided file transfer request unit 82*e* designates the address and the first data size in the DCM 12, and requests the DCM 12 to transfer a divided file. For example, in a case where a data amount of a write file to be distributed to the ECU (ID1) is 1 M bytes, the divided file transfer request unit 82*e* requests that the write data is transferred from the address of 0x10304000 every 1 k bytes.

Next, an operation of the file transfer control unit 82 in the CGW 13 will be described with reference to FIGS. 89 to 97. The CGW 13 executes a file transfer control program and thus performs the file transfer control process.

When it is determined that an unpackaging completion notification signal is received from the DCM 12, the CGW 13 initiates the file transfer control process. As illustrated in FIG. 10, the unpackaging is a process of dividing a distribution package file into data for each ECU and each piece of rewrite specification data. When the file transfer control process is initiated, the CGW 13 transmits a predetermined address to the DCM 12 (S1001). When the predetermined address is received from the CGW 13, the DCM 12 transfers the CGW rewrite specification data to the CGW 13 with the reception of the predetermined address as a trigger. The CGW 13 acquires the CGW rewrite specification data due to transfer of the CGW rewrite specification data from the DCM 12 (S1002).

When the CGW rewrite specification data is acquired from the DCM 12, the CGW 13 analyzes the acquired CGW rewrite specification data (S1003), and specifies a transfer target file on the basis of an analysis result of the rewrite specification data (S1004; corresponding to a transfer target file specifying procedure). The CGW 13 specifies an address corresponding to the transfer target file (S1005; corresponding to an acquisition information specifying procedure), and specifies the first data size corresponding to the transfer target file (S1006; corresponding to a first data size specifying procedure). The CGW 13 transmits the specified address and data size to the DCM 12 in accordance with the provisions of Service Identifier (SID) 35, designates the address and the data size in a memory area, and requests the DCM 12 to transfer a divided file (S1007).

When the address and the data size are received from the CGW 13, the DCM 12 analyzes the DCM rewrite specification data, and transfers a file corresponding to the address and the data size to the CGW 13 as the divided file. The CGW 13 acquires the divided file due to transfer of the divided file from the DCM 12 (S1008). In this case, the CGW 13 may store the acquired file into a RAM and then store the acquired file into a flash memory.

The CGW 13 determines whether or not acquisition of all divided files to be acquired has been completed (S1009). For example, in a case where a data amount of a write file to be distributed to the ECU (ID1) is 1 M bytes, the CGW 13 acquires a divided file every 1 k bytes and determines whether or not acquisition of the data amount of 1 M byte has been completed by repeating the acquisition of the divided file every 1 k bytes. When it is determined that acquisition of all divided files to be acquired is not completed (S1009: NO), the CGW 13 returns to step S1004 and repeatedly performs step S1004 and the subsequent steps. When it is determined that acquisition of all of the files to be acquired has been completed (S1009: YES), the CGW 13 finishes the file transfer control process. In a case where there are a plurality of rewrite target ECUs 19, the CGW 13 repeatedly performs the file transfer control process on each rewrite target ECU 19.

That is, for example, in a case where the rewrite target ECUs 19 are the ECU (ID1), the ECU (ID2), and the ECU (ID3), the CGW 13 performs the file transfer control process on the ECU (ID2) when distribution of write data to the ECU (ID1) has been completed, and performs the file transfer control process on the ECU (ID3) when distribution of write data to the ECU (ID2) has been completed. The CGW 13 may sequentially perform the transfer control process on a plurality of rewrite target ECUs 19, and may perform the transfer control process in parallel.

Figure 90:
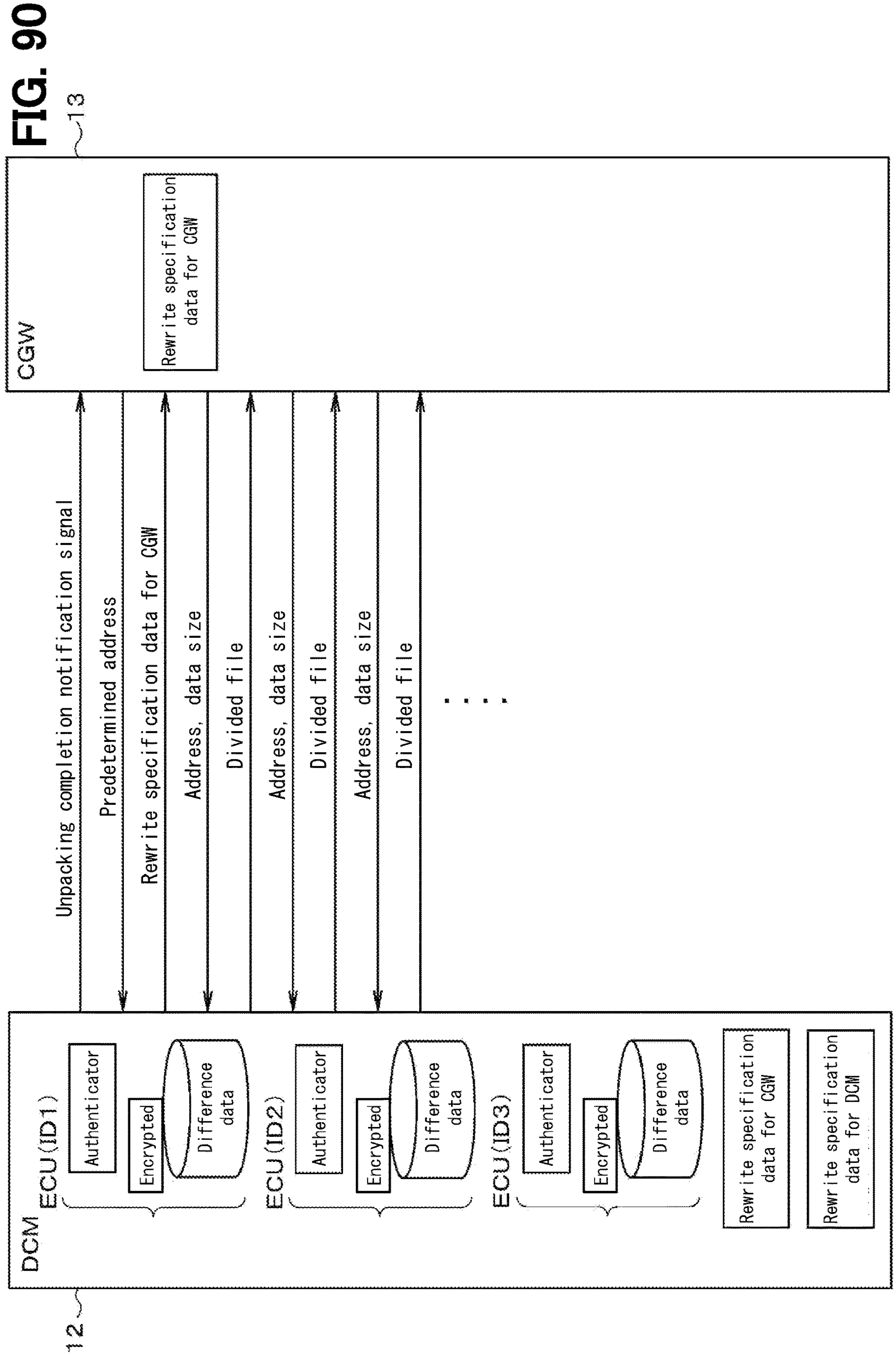
FIG. 90 is a diagram illustrating an aspect of exchanging files.

FIG. 90 illustrates, for example, a case where a write data file of the ECU (ID1) is stored at addresses "1000" to "3999", a write data file of the ECU (ID2) is stored at addresses "4000" to "6999", and a write data file of the ECU (ID3) is stored at addresses "7000" . . . in the memory of the DCM 12.

Figure 91:
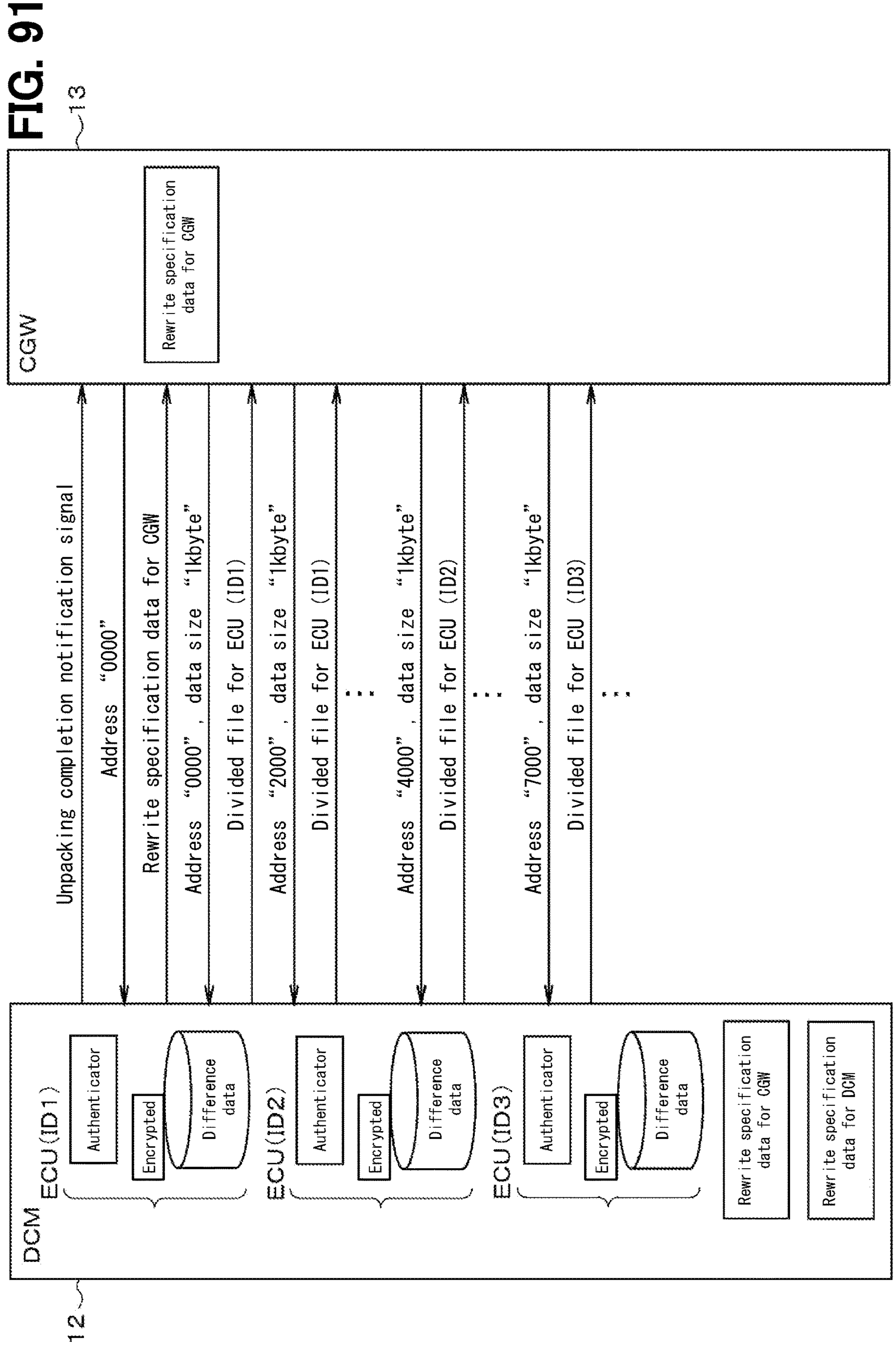
FIG. 91 is a diagram illustrating an aspect of exchanging files.

In this case, as illustrated in FIG. 91, when an unpackaging completion notification signal is received from the DCM 12, the CGW 13 transmits the address "0312" to the DCM 12, and acquires rewrite specification data from the DCM 12. That is, the DCM 12 determines that reception of the address "0312" is a request for acquiring CGW rewrite data, and transmits the CGW rewrite specification data to the CGW 13. The CGW 13 designates the ECU (ID1) as a transfer target of write data, designates the address "1000" and the data size "1 k bytes", and acquires a divided file including write data of the ECU (ID1) stored at the addresses "1000" to "1999" from the DCM 12. When the divided file is acquired from the DCM 12, the CGW 13 distributes the write data included in the divided file to the ECU (ID1).

Subsequently, the CGW 13 similarly designates the ECU (ID1) as a transfer target of write data, designates the address "2000" and the data size "1 k bytes", and acquires a divided file including write data of the ECU (ID1) stored at the addresses "2000" to "2999" from the DCM 12. When the divided file is acquired from the DCM 12, the CGW 13 distributes the write data included in the divided file to the ECU (ID1). The CGW 13 repeatedly acquires the divided file every 1 k bytes from the DCM 12 until writing of all pieces of write data to the ECU (ID1) is completed, and repeatedly distributes the write data included in the divided file to the ECU (ID1). That is, when the write data of 1 k bytes is acquired from the DCM 12, the CGW 13 transmits the write data of 1 k bytes to the rewrite target ECU 19, and acquires the next write data of 1 k bytes from the DCM 12 when transmission to the rewrite target ECU 19 has been completed. The CGW 13 repeatedly performs these processes until writing of all pieces of write data is complete.

When writing of the write data in the ECU (ID1) is normally completed, the CGW 13 designates the ECU (ID2) as a transfer target of write data, designates the address "4000" and the data size "1 k bytes", and acquires a divided file including write data of the ECU (ID2) stored at the addresses "4000" to "4999" from the DCM 12. When the divided file is acquired from the DCM 12, the CGW 13 distributes the write data included in the divided file to the ECU (ID2).

When writing of the write data in the ECU (ID2) is normally completed, the CGW 13 designates the ECU (ID3) as a transfer target of write data, designates the address "7000" and the data size "1 k bytes", and acquires a divided file including write data of the ECU (ID2) stored at the addresses "7000" to "7999" from the DCM 12. When the divided file is acquired from the DCM 12, the CGW 13 distributes the write data included in the divided file to the ECU (ID2).

As described above, the CGW 13 performs the file transfer control process, and thus specifies a transfer target file on the basis of an analysis result of rewrite specification data, and specifies an address and a data size corresponding to the transfer target file. The CGW 13 designates the address and the data size in the DCM 12, requests the DCM 12 to transfer a divided file obtained by dividing the transfer target file, and acquires the divided file from the DCM 12. Consequently, it is possible to distribute write data to the ECU 19 while storing a large volume of write data in the memory of the DCM 12. That is, in the CGW 13, it is not necessary to prepare a memory for storing a large volume of a file and thus to reduce a memory capacity of the CGW 13.

Figure 92:
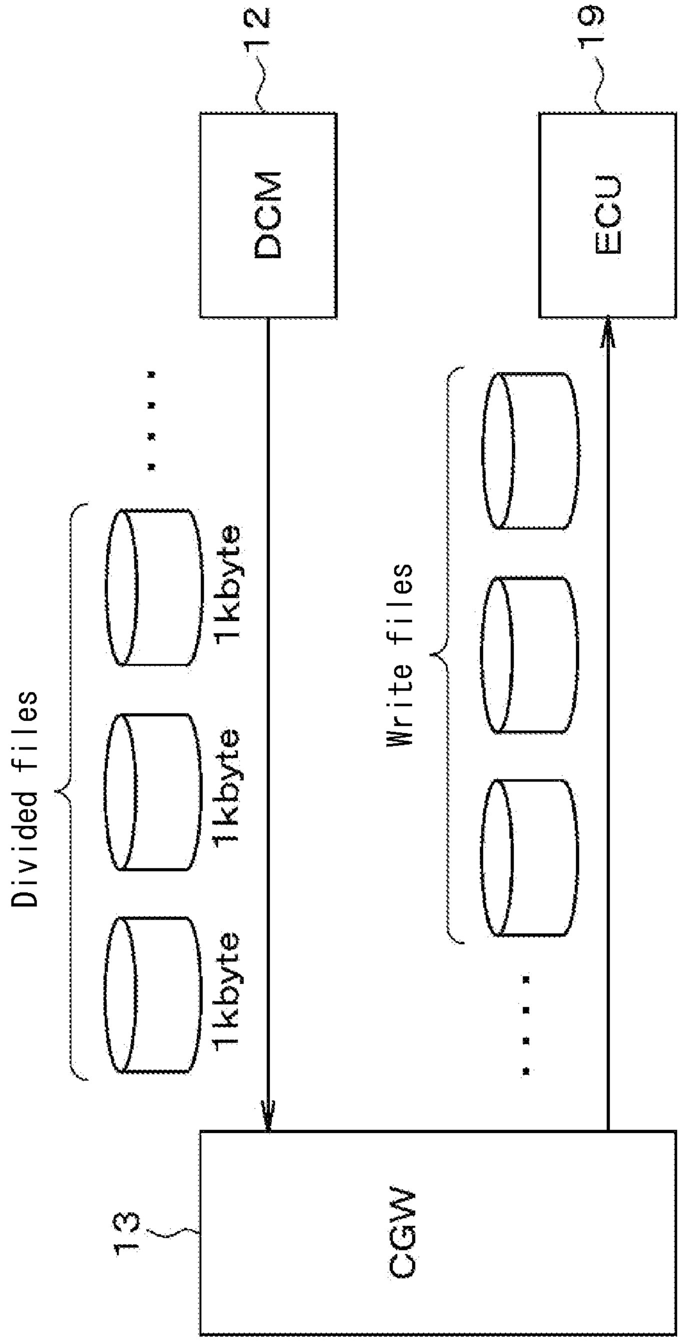
FIG. 92 is a diagram illustrating divided files and write files.

Here, a description will be made of a relationship between a data amount of a divided file transferred from the DCM 12 to the CGW 13 and a data amount of a write file distributed from the CGW 13 to the rewrite target ECU 19. In the above example, as illustrated in FIG. 92, a description has been made of a case where a data amount of a divided file transferred from the DCM 12 to the CGW 13 is 1 k bytes. However, any relationship between a data amount of the divided file transferred from the DCM 12 to the CGW 13 and a data amount of the write file distributed from the CGW 13 to the rewrite target ECU 19 may be employed.

That is, for example, when the rewrite target ECU 19 has a specification of receiving the write data in 4 k bytes for the reason of CAN communication, the CGW 13 distributes a data amount of a write file to the rewrite target ECU 19 in the unit of 4 k bytes. In this case, when a data amount of the divided file transferred from the DCM 12 to the CGW 13 is 1 k bytes, the CGW 13 acquires four divided files from the DCM 12 and then distributes 4 k bytes to the rewrite target ECU 19. That is, a data amount of a divided file transferred from the DCM 12 to the CGW 13 is smaller than a data amount of a write file distributed from the CGW 13 to the rewrite target ECU 19. In such a relationship, in the CGW 13, it is possible to acquire a divided file from the DCM 12 and distribute write data to the rewrite target ECU 19 in parallel while suppressing an increase in a memory capacity.

That is, when a data amount of a divided file transferred from the DCM 12 to the CGW 13 is 4 k bytes, a memory capacity of the CGW 13 is required to be set to 8 k bytes in order to acquire the divided file from the DCM 12 and distribute write data to the rewrite target ECU 19 in parallel. A data amount of the divided file transferred from the DCM 12 to the CGW 13 is set to 1 k bytes, and thus it is possible to acquire the divided file from the DCM 12 and distribute write data to the rewrite target ECU 19 in parallel without changing the memory capacity of the CGW 13 to 8 k bytes. For example, the memory capacity of the CGW 13 is allocated to 5 k bytes, and the CGW 13 acquires the next 1 k bytes from the DCM 12 while distributing 4 k bytes acquired from the DCM 12 to the rewrite target ECU 19. The CGW 13 further acquires the next 1 k bytes from the DCM 12 after the distribution of 4 k byte to the rewrite target ECU 19 is completed.

On the other hand, for example, when the rewrite target ECU 19 has a specification of receiving the write data in 128 bytes for the reason of CAN communication, the CGW 13 distributes the write data to the rewrite target ECU 19 in 128 bytes. In this case, when a data amount of a divided file transferred from the DCM 12 to the CGW 13 is 1 k bytes, the CGW 13 acquires a single divided file from the DCM 12 and then distributes 128 bytes to the rewrite target ECU 19 at a time. That is, a data amount of the divided file transferred from the DCM 12 to the CGW 13 is larger than a data amount of the write file distributed from the CGW 13 to the rewrite target ECU 19. For example, a memory capacity of the CGW 13 is allocated to 2 k bytes, and the CGW 13 acquires the next 1 k bytes from the DCM 12 while distributing 1 k bytes acquired from the DCM 12 to the rewrite target ECU 19 in the unit of 128 bytes. The CGW 13 further acquires the next 1 k bytes from the DCM 12 after eight number of times of distribution of 128 bytes to the rewrite target ECU 19 is completed.

In the above-described way, a data amount of a divided file transferred from the DCM 12 to the CGW 13 may be set to a fixed value (for example, 1 k bytes), and a data amount of a write file distributed from the CGW 13 to the rewrite target ECU 19 may be set to a variable value in accordance with a specification of the rewrite target ECU 19. The CGW 13 may determine an amount of data to be distributed to the rewrite target ECU 19 by using a data transfer size of each ECU specified in the rewrite specification data, for example.

The CGW 13 transmits a transfer request to the DCM 12 and requests the DCM 12 to transfer a divided file, and there are a first request aspect and a second request aspect as aspects of requesting the DCM 12 to transfer the divided file. When reception of write data has been completed, the rewrite target ECU 19 transmits a receipt completion notification indicating that the reception of the write data has been completed to the CGW 13, and, when writing of the write data has been completed, the rewrite target ECU transmits a write completion notification indicating that the writing of the write data has been completed to the CGW 13.

Figure 93:
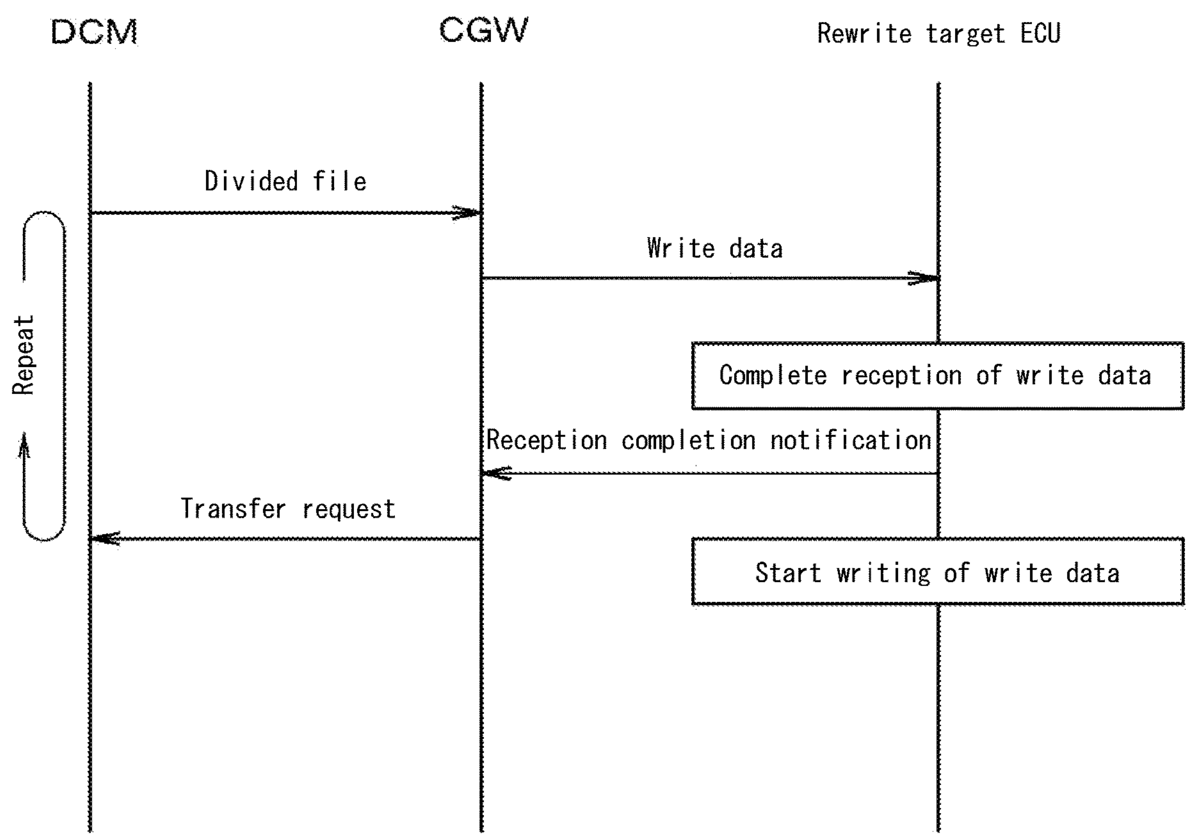
FIG. 93 is a diagram illustrating an aspect in which the CGW transmits a transfer request to the DCM.

The first distribution aspect will be described with reference to FIG. 93. When a divided file is acquired from the DCM 12, the CGW 13 distributes the acquired divided file as write data to the rewrite target ECU 19. When reception of the write data has been completed, the rewrite target ECU 19 transmits a receipt completion notification to the CGW 13 and initiates a write process on the write data. When the receipt completion notification of the write data is received from the rewrite target ECU 19, the CGW 13 transmits a transfer request to the DCM 12 and requests the DCM 12 to transfer the next divided file. When the next divided file is acquired from the DCM 12, the CGW 13 distributes the acquired next divided file as write data to the rewrite target ECU 19.

As described above, in the first distribution aspect, the CGW 13 acquires the next write data from the DCM 12 and distributes the next write data to the rewrite target ECU 19 without waiting for completion of writing of the write data in the rewrite target ECU 19. Thus, in the first distribution aspect, in the CGW 13, in a case where the rewrite target ECU 19 has not completed writing of the write data, there is concern that the next write data may not be received by the rewrite target ECU 19 even though the next divided file is acquired from the DCM 12 and the next write data is distributed to the rewrite target ECU 19. However, in a case where the rewrite target ECU 19 has completed writing of the write data, the next divided file can be quickly acquired from the DCM 12 and the next write data can be quickly distributed to the rewrite target ECU 19.

Figure 94:
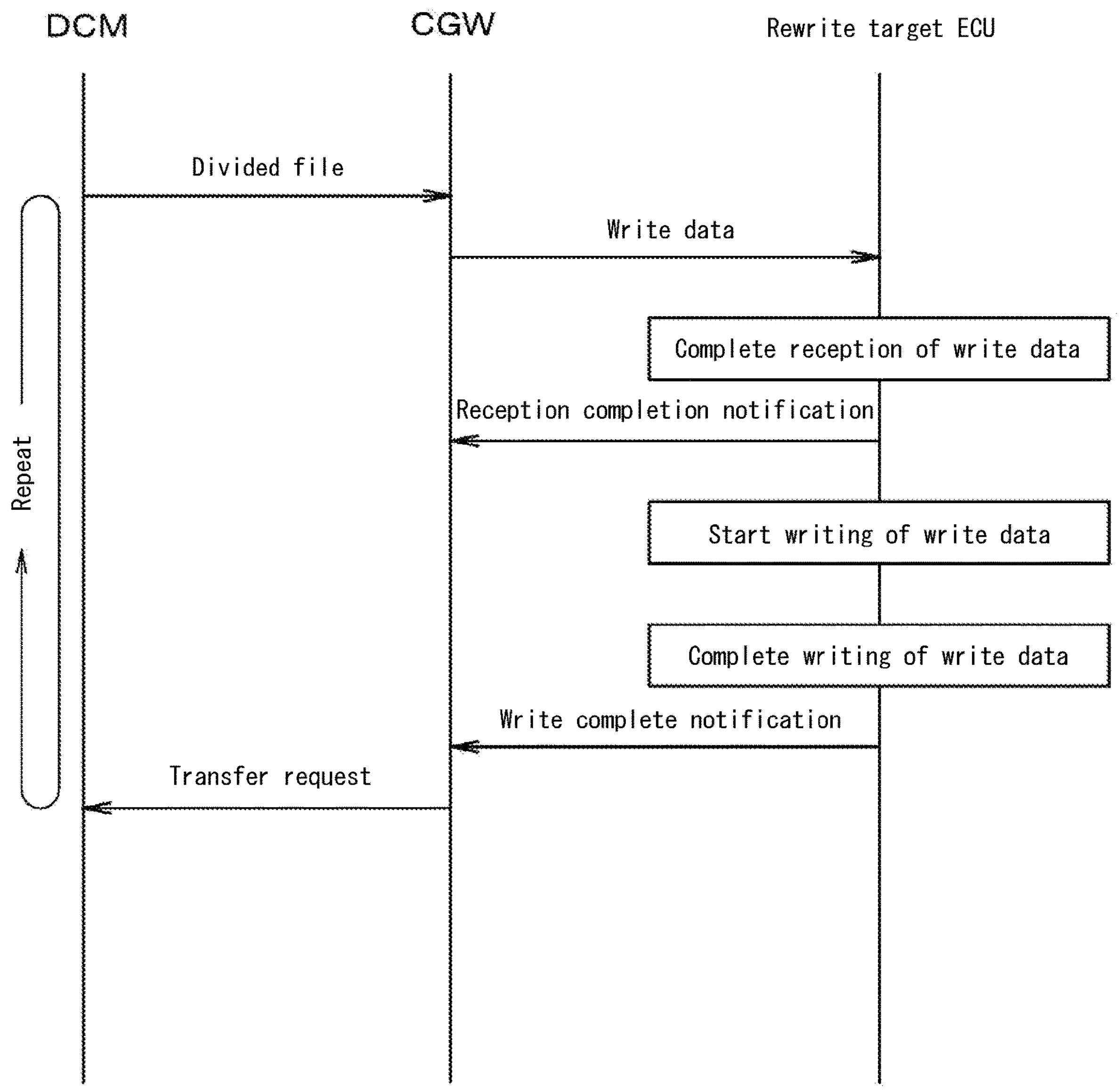
FIG. 94 is a diagram illustrating an aspect in which the CGW transmits a transfer request to the DCM.

The second distribution aspect will be described with reference to FIG. 94. When a divided file is acquired from the DCM 12, the CGW 13 distributes the acquired divided file as write data to the rewrite target ECU 19. When reception of the write data has been completed, the rewrite target ECU 19 transmits a receipt completion notification to the CGW 13 and initiates a write process on the write data. When writing has been completed, the rewrite target ECU 19 transmits a write completion notification to the CGW 13. When the write completion notification is received from the rewrite target ECU 19, the CGW 13 transmits a transfer request to the DCM 12 and requests the DCM 12 to transfer the next divided file. When the next divided file is acquired from the DCM 12, the CGW 13 distributes the acquired next divided file as write data to the rewrite target ECU 19.

As described above, in the second distribution aspect, the CGW 13 waits for completion of writing of the write data in the rewrite target ECU 19, then acquires the next write data from the DCM 12, and distributes the next write data to the rewrite target ECU 19. Thus, in the second distribution aspect, it takes time for the CGW 13 to acquire the next divided file from the DCM 12, but it is possible to request the DCM 12 to transfer a divided file in a state in which the rewrite target ECU 19 has completed writing of write data. Therefore, when the next divided file is acquired from the DCM 12 and the next write data is distributed to the rewrite target ECU 19, the next write data can be reliably distributed to the rewrite target ECU 19.

Figure 95:
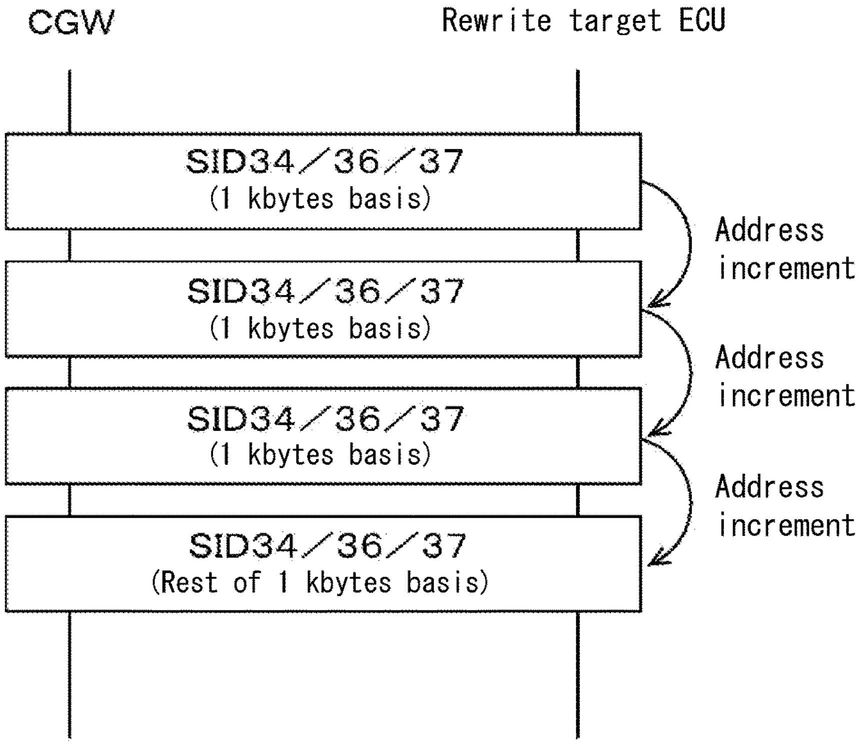
FIG. 95 is a diagram illustrating an aspect in which the CGW distributes write data to a rewrite target ECU.
Figure 96:
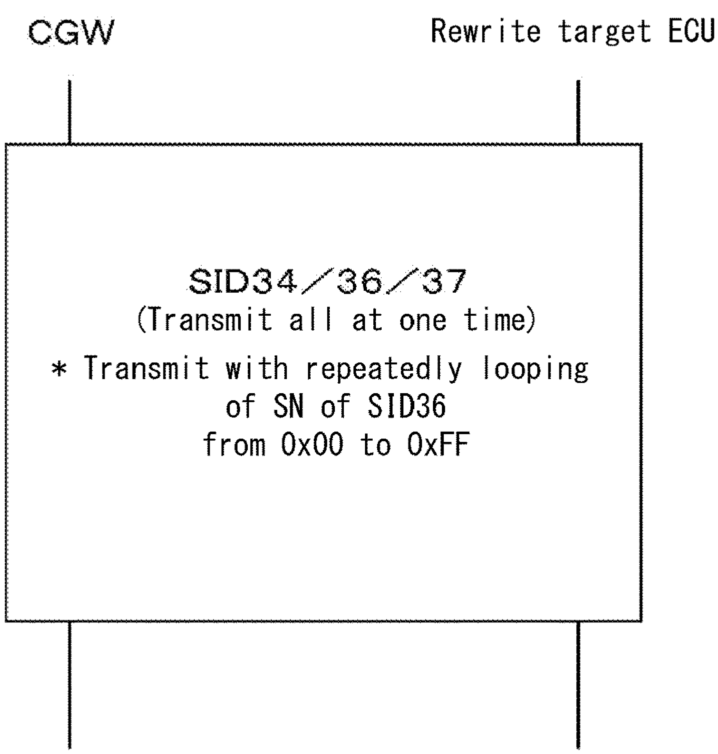
FIG. 96 is a diagram illustrating an aspect in which the CGW distributes the write data to the rewrite target ECU.
Figure 97:
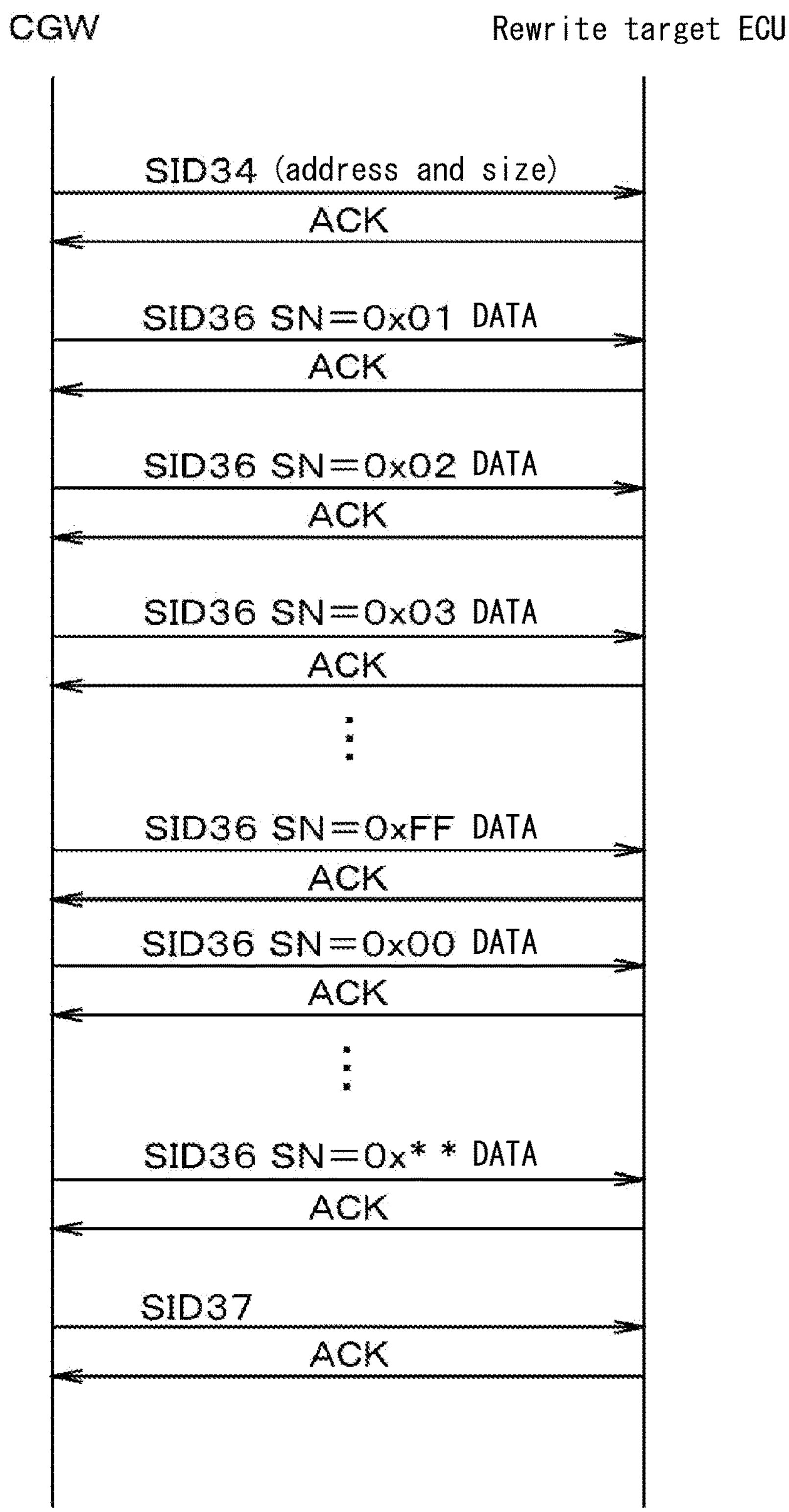
FIG. 97 is a diagram illustrating an aspect in which the CGW distributes the write data to the rewrite target ECU.

The CGW 13 distributes write data to the rewrite target ECU 19 according to SID 34 36, and 37, and there are a first distribution aspect and a second distribution aspect as aspects of distributing the write data to the rewrite target ECU 19. In the first distribution aspect, as illustrated in FIG. 95, the CGW 13 divides write data to be distributed by a predetermined data amount (for example, 1 k bytes), and distributes the divided write data. In the second distribution aspect, as illustrated in FIG. 96, the CGW 13 collectively distributes write data to be distributed without dividing the write data. The CGW 13 selects either the first distribution aspect or the second distribution aspect according to SID 34 to be distributed first to the rewrite target ECU 19. As illustrated in FIG. 97, the CGW 13 specifies reception of write data in the rewrite target ECU 19 by receiving ACK (SID 74) for SID 37 to be finally distributed to the rewrite target ECU 19. ACK for this SID 37 corresponds to the receipt completion notification of the write data described above with reference to FIGS. 93 and 94. That is, in the first distribution aspect, when ACK for SID 37 to be finally distributed to the rewrite target ECU 19 is received, the CGW 13 increments an address of the next write data to distribute the next write data to the rewrite target ECU 19 and also to further acquire the next write data from the DCM 12.

Although an address and a file are correlated with each other in the DCM rewrite specification data, as a method of correlating an address with a file, for example, a folder configuration may be devised, specification data may be stored and managed in a folder 1, a file 1 may be stored and managed in a folder 2, a file 2 may be stored and managed in a folder 3, and the files may be managed in an order of file names. For example, in unpackaging illustrated in FIG. 10, the DCM rewrite specification data and the CGW rewrite specification data are stored and managed in the folder 1, the authenticator and the difference data of the ECU (ID1) are stored and managed in the folder 2, and the authenticator and the difference data of the ECU (ID2) are stored and managed in the folder 3.

For example, in a case where distribution of write data to the rewrite target ECU 19 is stopped for some reason such as communication disruption, the CGW 13 acquires information that can specify an address at which writing of the write data has been completed from the rewrite target ECU 19, and requests the DCM 12 to transfer a divided file including the write data from a time point at which writing thereof is not completed. Alternatively, the CGW 13 may request the DCM 12 to transfer a divided file including write data from the beginning.

As described above, the CGW 13 performs the file transfer control process, thus specifies a file including write data to be written to the rewrite target ECU 19 as a transfer target file, specifies an address for acquiring the transfer target file and the first data size, requests the DCM 12 to transfer a divided file, and distributes the write data to the rewrite target ECU when the divided file is transferred from the DCM 12. Transfer of write data from the DCM 12 to the CGW 13 and distribution of the write data from the CGW 13 to the rewrite target ECU 19 can be efficiently performed.

(11) Write Data Distribution Control Process

The write data distribution control process will be described with reference to FIGS. 98 to 108. The vehicle program rewriting system 1 performs the write data distribution control process in the CGW 13. Since the CGW 13 transmits write data to the ECU 19 via the bus in the vehicle, the write data distribution control process is performed such that a bus load during distribution of the write data does not become unnecessarily high.

Figure 98:
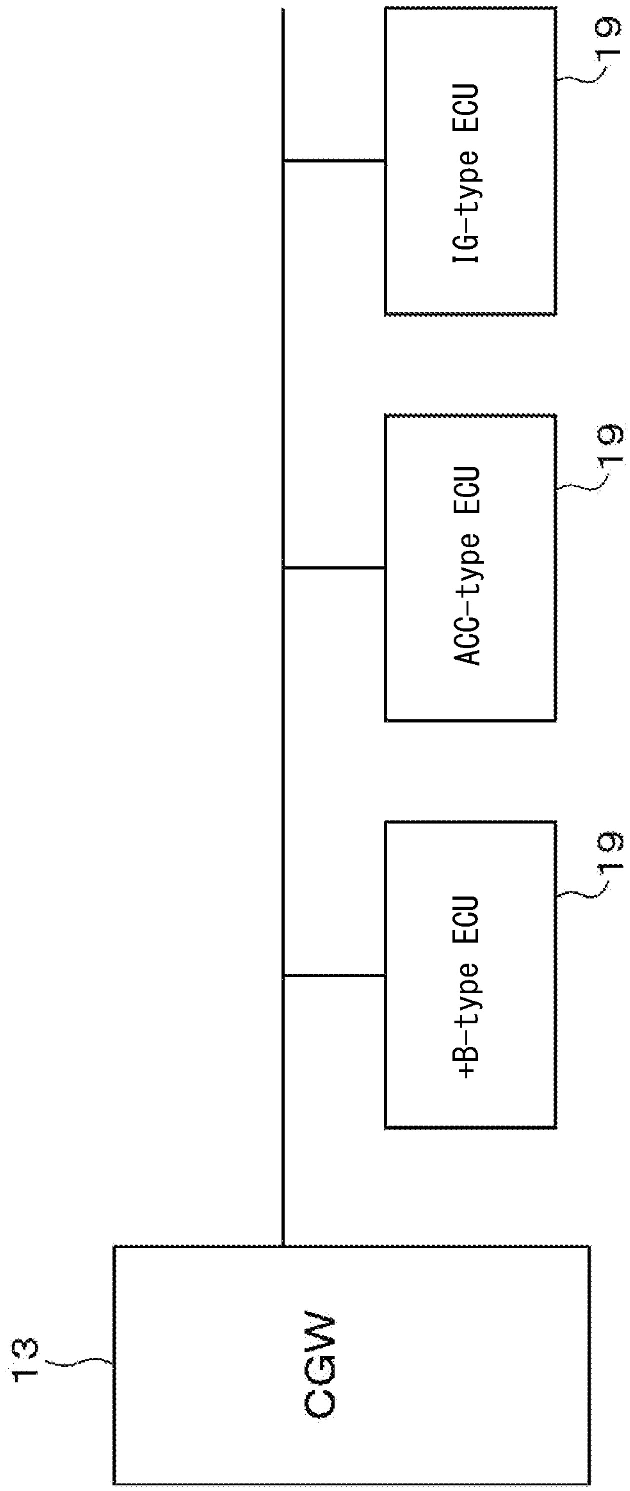
FIG. 98 is a diagram illustrating a connection aspect of the ECU.

As illustrated in FIG. 98, a case is assumed in which the +B power ECU, the ACC ECU, and the IG ECU are connected to the same bus. In this case, in the +B power supply state, since only the +B power ECU is started, and the ACC ECU and the IG ECU are stopped, vehicle control data of only the +B power ECU is transmitted to the bus. In the ACC power supply state, since the +B power ECU and the ACC ECU are started, and the IG ECU is stopped, vehicle control data of the +B power ECU and the ACC ECU is transmitted to the bus. In the IG power supply state, since the +B power ECU, the ACC ECU, and the IG ECU are started, vehicle control data of the +B power ECU, the ACC ECU, and the IG ECU is transmitted to the bus. That is, a transmission amount of the vehicle control data decreases in an order of the IG power supply state, the ACC power supply state, and the +B power supply state.

Figure 99:
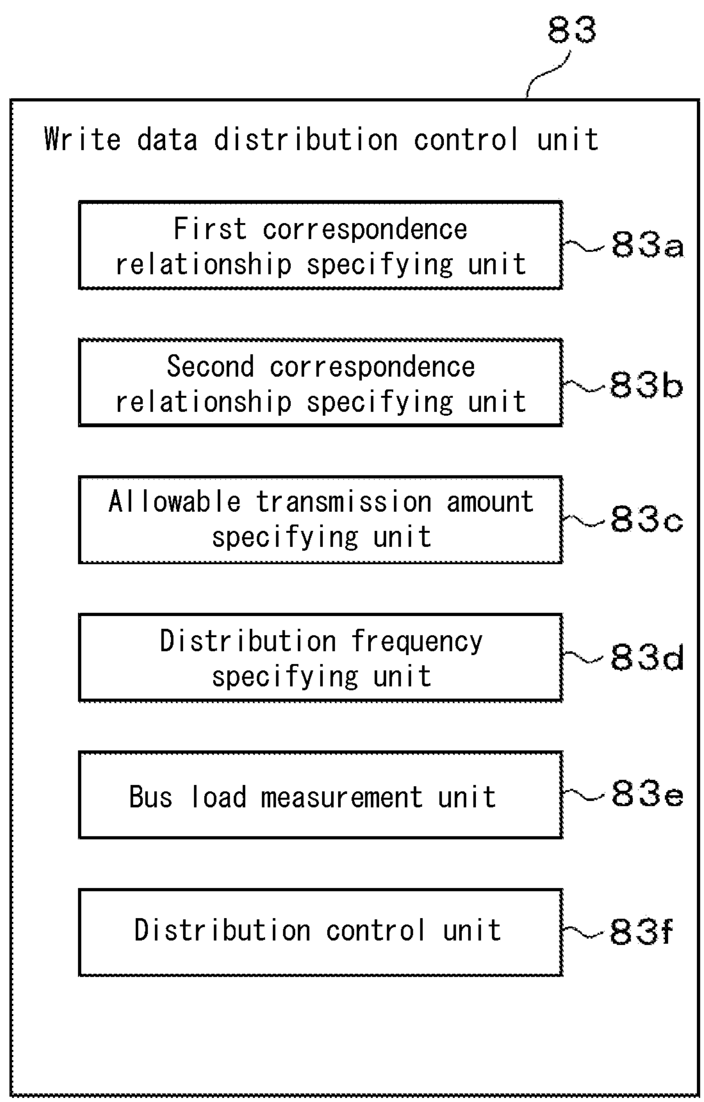
FIG. 99 is a functional block diagram of a write data distribution control unit.
Figure 102:
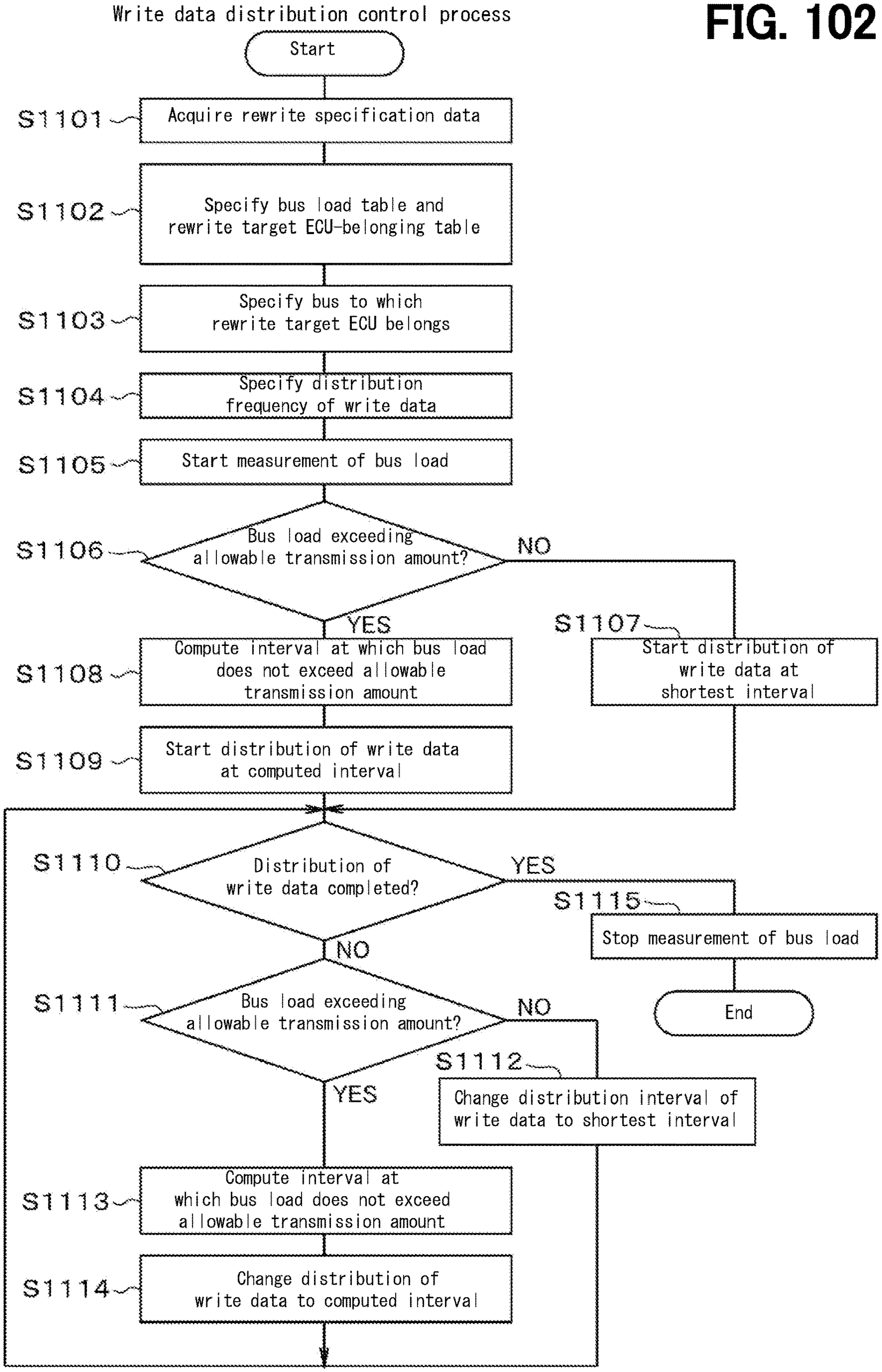
FIG. 102 is a flowchart illustrating a write data distribution control process.

As illustrated in FIG. 99, the CGW 13 includes a first correspondence relationship specifying unit 83*a*, a second correspondence relationship specifying unit 83*b*, an allowable transmission amount specifying unit 83*c*, a distribution frequency specifying unit 83*d*, a bus load measurement unit 83*e*, and a distribution control unit 83*f* in the write data distribution control unit 83.

The first correspondence relationship specifying unit 83*a* specifies a first correspondence relationship indicating a relationship between a power supply state and an allowable transmission amount for a bus on the basis of an analysis result of rewrite specification data, and specifies a bus load table illustrated in FIG. 100. The allowable transmission amount is a value of a transmission amount at which data can be transmitted and received under a situation in which data collision or delay does not occur. The bus load table is a table indicating a correspondence relationship between the power supply state and an allowable transmission amount for a bus, and is defined for each bus. The allowable transmission amount is a sum of a transmission amount of vehicle control data and write data that can be transmitted with respect to the maximum allowable transmission amount.

In the example illustrated in FIG. 100, since an allowable transmission amount is "80%" with respect to the maximum allowable transmission amount for the first bus, in the IG power supply state, the CGW 13 allows "50%" with respect to the maximum allowable transmission amount as an allowable transmission amount of vehicle control data and "30%" with respect to the maximum allowable transmission amount as an allowable transmission amount of write data. For the first bus, in the ACC power supply state, the CGW 13 allows "30%" with respect to the maximum allowable transmission amount as an allowable transmission amount of the vehicle control data and "50%" with respect to the maximum allowable transmission amount as an allowable transmission amount of the write data. For the first bus, in the +B power supply state, the CGW 13 allows "20%" with respect to the maximum allowable transmission amount as an allowable transmission amount of the vehicle control data, and allows "60%" with respect to the maximum allowable transmission amount as an allowable transmission amount of the write data. As illustrated in FIG. 100, the second bus and the third bus are defined in the same manner.

The second correspondence relationship specifying unit 83*b* specifies a second correspondence relationship indicating a relationship between a bus to which the rewrite target ECU 19 belongs and a power supply system on the basis of an analysis result of rewrite specification data, and specifies a rewrite target ECU-belonging table illustrated in FIG. 101. The rewrite target ECU-belonging table is a table indicating a bus to which the rewrite target ECU 19 belongs and a power supply system.

In an example illustrated in FIG. 101, the CGW 13 specifies the first rewrite target ECU 19 as a +B power ECU since the first rewrite target ECU 19 is connected to the first bus and is started in any of the +B power supply state, the ACC power supply state, and the IG power supply state. The CGW 13 specifies the second rewrite target ECU 19 as an ACC ECU since the second rewrite target ECU is connected to the second bus and is stopped in the +B power supply state, but is started in the ACC power supply state and the IG power supply state. The CGW 13 specifies the third rewrite target ECU 19 as an IG ECU since the third rewrite target ECU 19 is connected to the third bus, and is stopped in the +B power supply state and the ACC power supply state, but is started in the IG power supply state.

The CGW 13 uses the data of the "connection bus" and the "connection power supply" in the rewrite specification data illustrated in FIG. 8 to specify a bus to which the rewrite target ECU 19 is connected and a power supply system corresponding thereto. When such information can be specified, the information is not necessarily required to be stored in a table form.

The allowable transmission amount specifying unit 83*c* specifies an allowable transmission amount for a bus to which the rewrite target ECU 19 belongs, the allowable transmission amount corresponding to a power supply states of the vehicle when a program is updated, according to the specifying result of the first correspondence relationship and the specifying result of the second correspondence relationship. Specifically, the allowable transmission amount specifying unit 83*c* specifies a bus to which the rewrite target ECU 19 belongs by using the rewrite target ECU-belonging table that is the second correspondence relationship, and specifies an allowable transmission amount in each power supply state for the specified bus by using the bus load table that is the first correspondence relationship.

The distribution frequency specifying unit 83*d* specifies a distribution frequency of write data corresponding to a power supply state at the time of installation, by using a predefined correspondence relationship between a power supply state and a distribution frequency of write data. Specifically, the distribution frequency specifying unit 83*d* specifies, by using the bus load table, an allowable transmission amount allocated for distributing write data among allowable transmission amounts specified by the allowable transmission amount specifying unit 83*c*, and specifies a distribution frequency of the write data. For example, when it is specified that a bus to which the rewrite target ECU 19 belongs is the first bus, when a power supply state at the time of installation is the IG power supply state, the distribution frequency specifying unit 83*d* specifies an allowable transmission amount as "80%", specifies an allowable transmission amount allocated for distributing the write data as "30%" out of 80%, and thus specifies a distribution frequency of the write data. The allowable transmission amount allocated for distributing the write data corresponds to transmission restriction information.

The bus load measurement unit 83*e* measures a bus load of a bus to which the rewrite target ECU 19 belongs. The bus load measurement unit 83*e* measures the bus load by counting the number of frames or the number of bits received per unit time, for example. The distribution control unit 83*f* controls distribution of the write data depending on the distribution frequency specified by the distribution frequency specifying unit 83*d*.

Next, an operation of the write data distribution control unit 83 in the CGW 13 will be described with reference to FIGS. 102 to 108. The CGW 13 executes a write data distribution control program and thus performs the write data distribution control process.

When an unpackaging completion notification signal is received from the DCM 12, the CGW 13 initiates the write data distribution control process. The CGW 13 acquires the CGW rewrite specification data from the DCM 12 (S1101), and specifies a bus load table and a rewrite target ECU-belonging table by using the CGW rewrite specification data (S1102). The CGW 13 specifies a bus to which the rewrite target ECU 19 belongs by using the rewrite target ECU-belonging table (S1103). The CGW 13 specifies an allowable transmission amount for the bus to which the rewrite target ECU 19 belongs, the allowable transmission amount corresponding to a power supply state of the vehicle when update is performed by using the bus load table. The CGW 13 specifies a distribution frequency of the write data by considering the specified allowable transmission amount (S1104; corresponding to a distribution frequency specifying procedure). The CGW 13 refers to the allowable transmission amount for the first bus in the IG power supply state, for example, in a case where the write data is distributed to the ECU (ID1) as the first rewrite target ECU 19 while the vehicle is traveling. In the example illustrated in FIG. 100, the allowable transmission amount for the first bus in the IG power supply state is "80%", out of which transmission of "50%" is allowed in the vehicle control data and transmission of "30%" is allowed in the write data. The allowable transmission amount is a value for only an example, and a numerical value is set within an allowable range in accordance with the specification of communication to be applied.

Since one frame is about 250 μs in the specification on 500 kbps of CAN, when interruption occurs four times for one second, four frames are generated, and a bus load is 100%. The CGW 13 specifies a distribution frequency of the write data by determining the interruption occurring in the bus. The CGW 13 initiates to measure the number of frames received in the unit time, initiates to measure a bus load (S1105), determines whether or not the measured bus load exceeds the allowable transmission amount (S1106), and sets a distribution interval. The distribution interval is a time interval until the CGW 13 distributes write data to the rewrite target ECU 19, receives a write completion notification (ACK) from the rewrite target ECU 19, and transmits the next write data to the rewrite target ECU 19.

Figure 103:
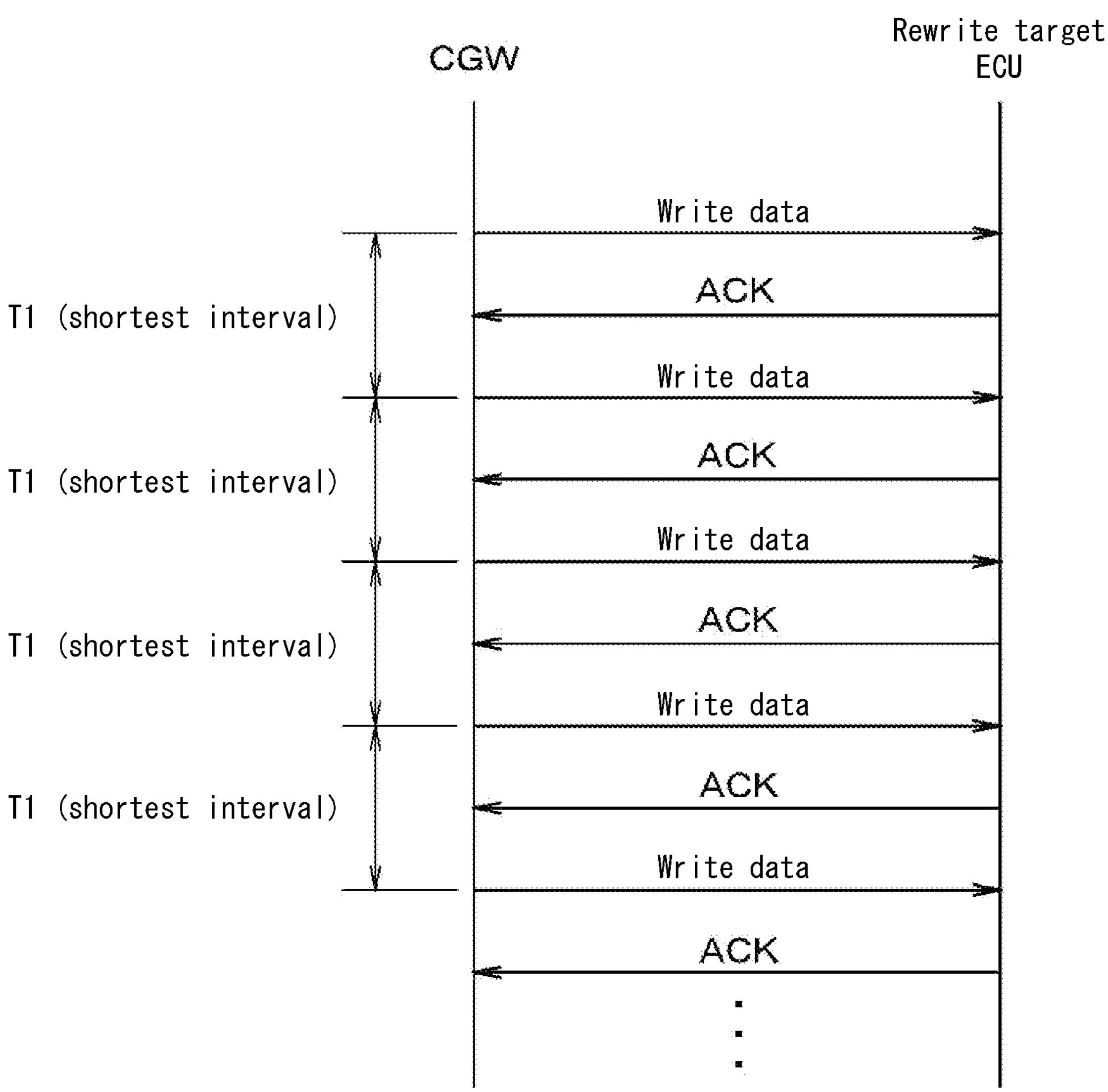
FIG. 103 is a diagram illustrating an aspect of distributing write data.

When it is determined that the measured bus load does not exceed the allowable transmission amount (S1106: NO), the CGW 13 sets the distribution interval of the write data to the shortest interval set in advance, and initiates to distribute the write data to the rewrite target ECU 19 as illustrated in FIG. 103 (S1107; corresponding to a distribution control procedure). That is, the CGW 13 sets the distribution interval of one frame on the CAN to the shortest interval set in advance, and initiates to distribute the write data to the rewrite target ECU 19. One frame on the CAN includes write data having a data amount of 8 bytes. One frame on CAN with Flexible Data-Rate (CAN FD) includes write data having a data amount of 64 bytes.

Figure 104:
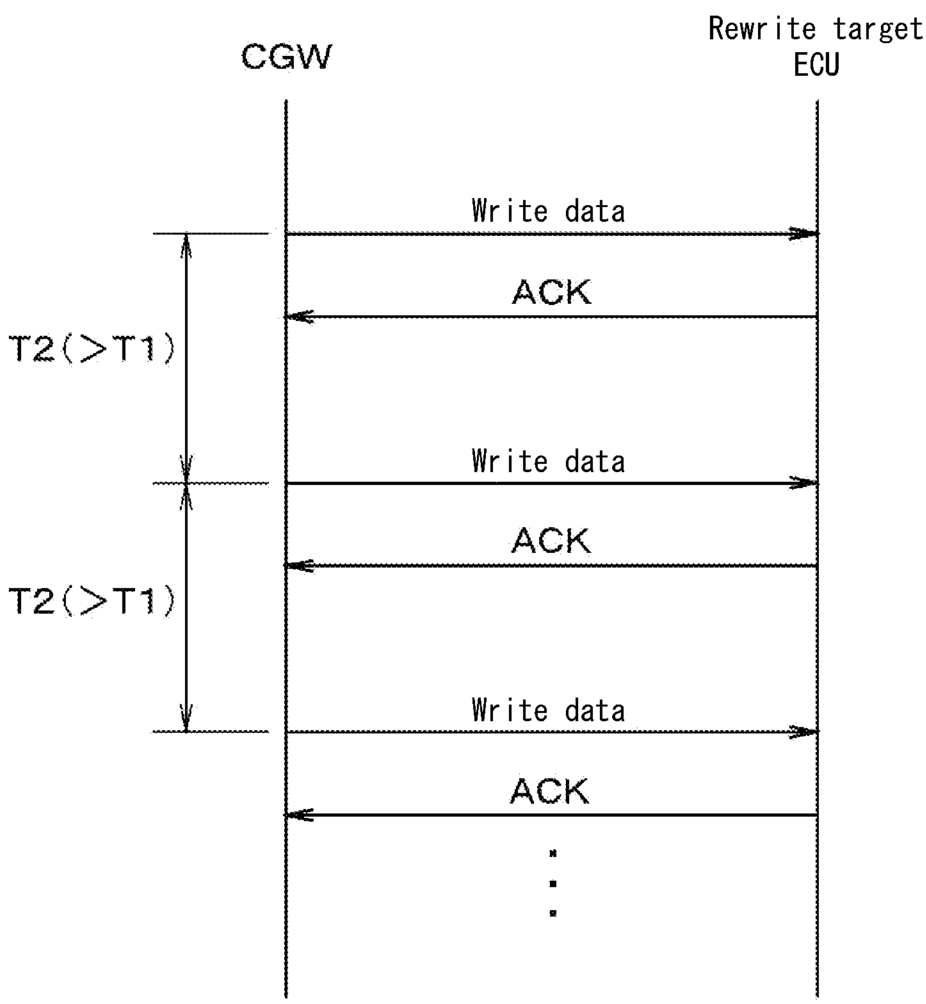
FIG. 104 is a diagram illustrating an aspect of distributing write data.

On the other hand, when it is determined that the measured bus load exceeds the allowable transmission amount (S1106: YES), the CGW 13 computes an interval at which the bus load does not exceed the allowable transmission amount (S1108), sets the distribution interval of the write data to the computed interval, and initiates to distribute the write data to the rewrite target ECU 19 as illustrated in FIG. 104 (S1109; corresponding to a distribution control procedure).

For example, in the IG power supply state, the CGW 13 determines whether or not the bus load exceeds the allowable transmission amount of "80%" for the first bus, and, when it is determined that the bus load does not exceed the allowable transmission amount, sets a distribution interval T1 at which an allowable transmission amount of the write data is "30%". That is, as shown in the bus load table of FIG. 100, the CGW 13 sets the distribution interval T1 by using "30%" that is an allowable transmission amount of write data for the first bus in the IG power supply state. The CGW 13 sets the distribution interval T1 such that the maximum transmission amount is allowed. The CGW 13 may measure a bus load by narrowing a measurement target to a frame of write data, and determine whether or not the bus load depending on the write data exceeds the allowable transmission amount "30%" of the write data. When it is determined that the bus load exceeds the allowable transmission amount, the CGW 13 changes the distribution interval to a distribution interval T2 (>T1) at which the bus load does not exceed the allowable transmission amount, according to the amount by which the bus load exceeds the allowable transmission amount. In above-described way, after write data is acquired from the DCM 12, the CGW 13 waits until the set distribution interval is reached, and distributes the write data to the rewrite target ECU 19.

When distribution of the write data to the rewrite target ECU 19 is initiated, the CGW 13 determines whether or not the distribution of the write data to the rewrite target ECU 19 has been completed, and continuously determines whether or not the measured bus load exceeds the allowable transmission amount (S1110 and S1011). When it is determined that the measured bus load does not exceed the allowable transmission amount (S1111: NO), the CGW 13 sets a distribution interval of the write data to the shortest interval set in advance, and changes the distribution interval of the write data to the rewrite target ECU 19 (S1112). On the other hand, when it is determined that the measured bus load exceeds the allowable transmission amount (S1111: YES), the CGW 13 computes an interval at which the bus load does not exceed the allowable transmission amount (S1113), sets a distribution interval of the write data to the computed interval, and changes the distribution interval of the write data to the rewrite target ECU 19 (S1114).

When it is determined that the distribution of the write data to the rewrite target ECU 19 has been completed (S1110: YES), the CGW 13 stops measuring the number of frames received per unit time, stops measuring the bus load (S1115), and finishes the write data distribution control process. Here, in a case where there are a plurality of the rewrite target ECUs 19, the CGW 13 performs the write data distribution control process on installation in all of the rewrite target ECUs 19.

As described above, the CGW 13 performs the write data distribution control process, thus specifies a distribution frequency of write data to the rewrite target ECU 19 by using a correspondence relationship between a predetermined power supply state and a distribution frequency of write data, and controls distribution of the write data according to the distribution frequency. It is possible to reduce, for example, data collision or delay during installation. Distribution of write data can coexist without hindering distribution of vehicle control data on the same bus.

In the above description, the configuration has been exemplified in which the bus load table is specified on the basis of an analysis result of the rewrite specification data in the CGW 13, but the bus load table may be stored in advance. The configuration has been exemplified in which the rewrite target ECU-belonging table is specified on the basis of an analysis result of the rewrite specification data in the CGW 13, but the rewrite target ECU-belonging table may be stored in advance.

Figure 105:
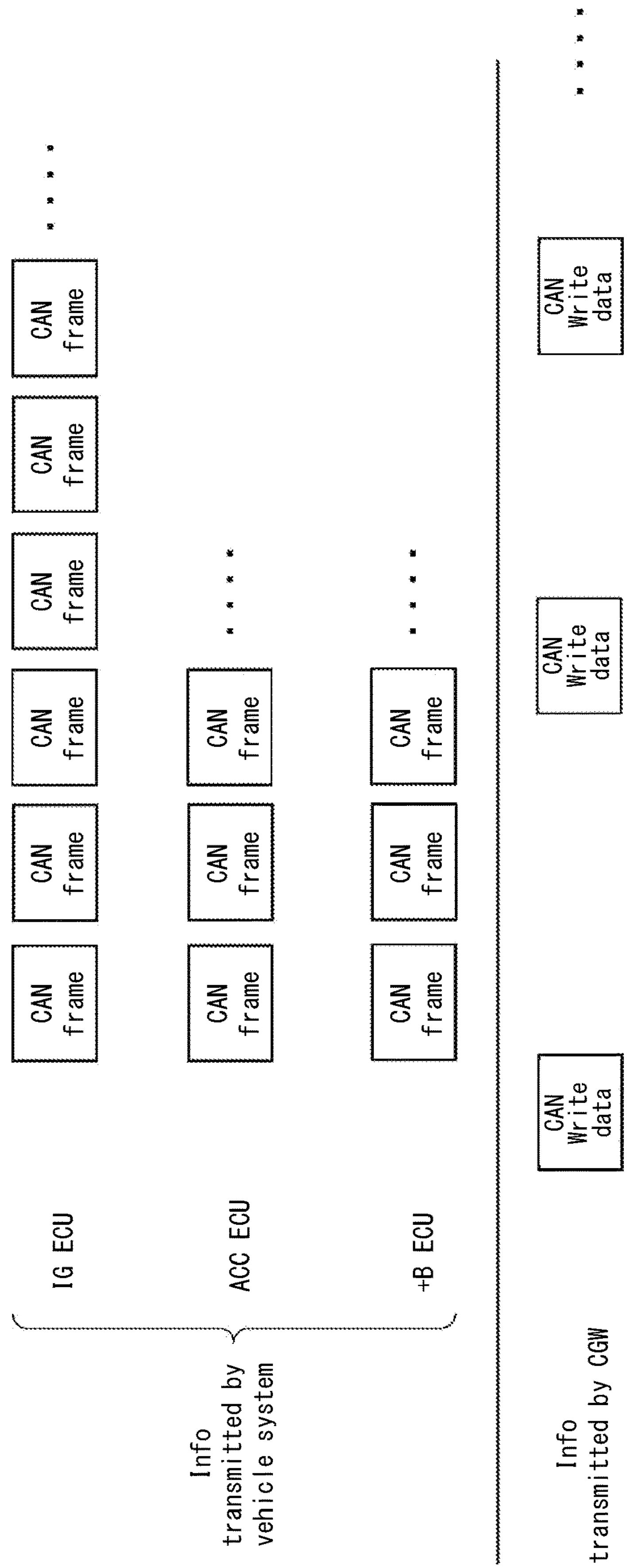
FIG. 105 is a diagram illustrating an aspect of distributing write data while a vehicle is traveling.
Figure 106:
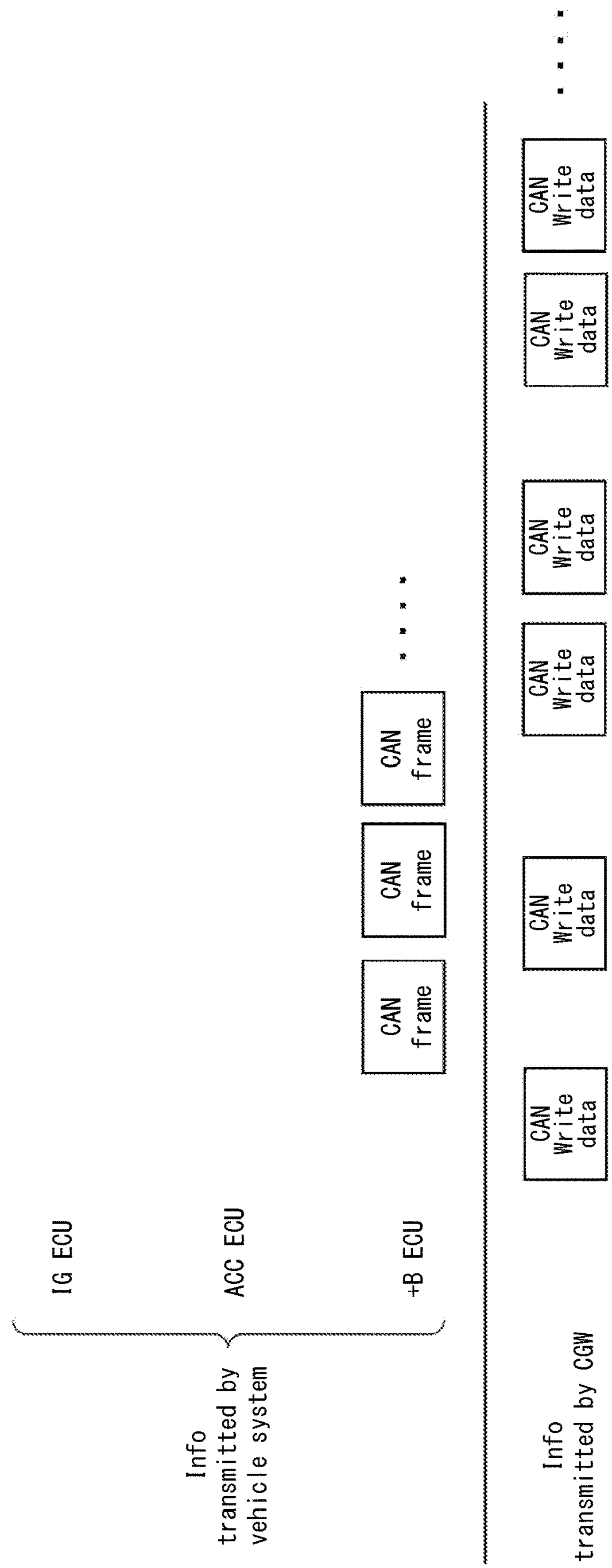
FIG. 106 is a diagram illustrating an aspect of distributing write data during parking.

In a power supply state in which the vehicle is traveling, a distribution amount of write data may be relatively reduced, and, in a power supply state in which the vehicle is parked, the distribution amount of the write data may be relatively increased. That is, in the CGW 13, as illustrated in FIG. 105, when the IG power is in an ON state while the vehicle is traveling, the IG ECU, the ACC ECU, and the +B power ECU transmit a CAN frame, so that a transmission amount of application data such as vehicle control or diagnosis becomes relatively large, and thus a distribution amount of write data is relatively reduced. In the CGW 13, as illustrated in FIG. 106, when the IG power is in an OFF state while the vehicle is parked, only the +B power ECU transmits a CAN frame, so that a transmission amount of application data such as vehicle control or diagnosis becomes relatively small, and thus a distribution amount of write data is relatively increased. That is, the CGW 13 adjusts a distribution amount of write data within a free capacity that does not hinder transmission of application data such as vehicle control or diagnosis.

Figure 107:
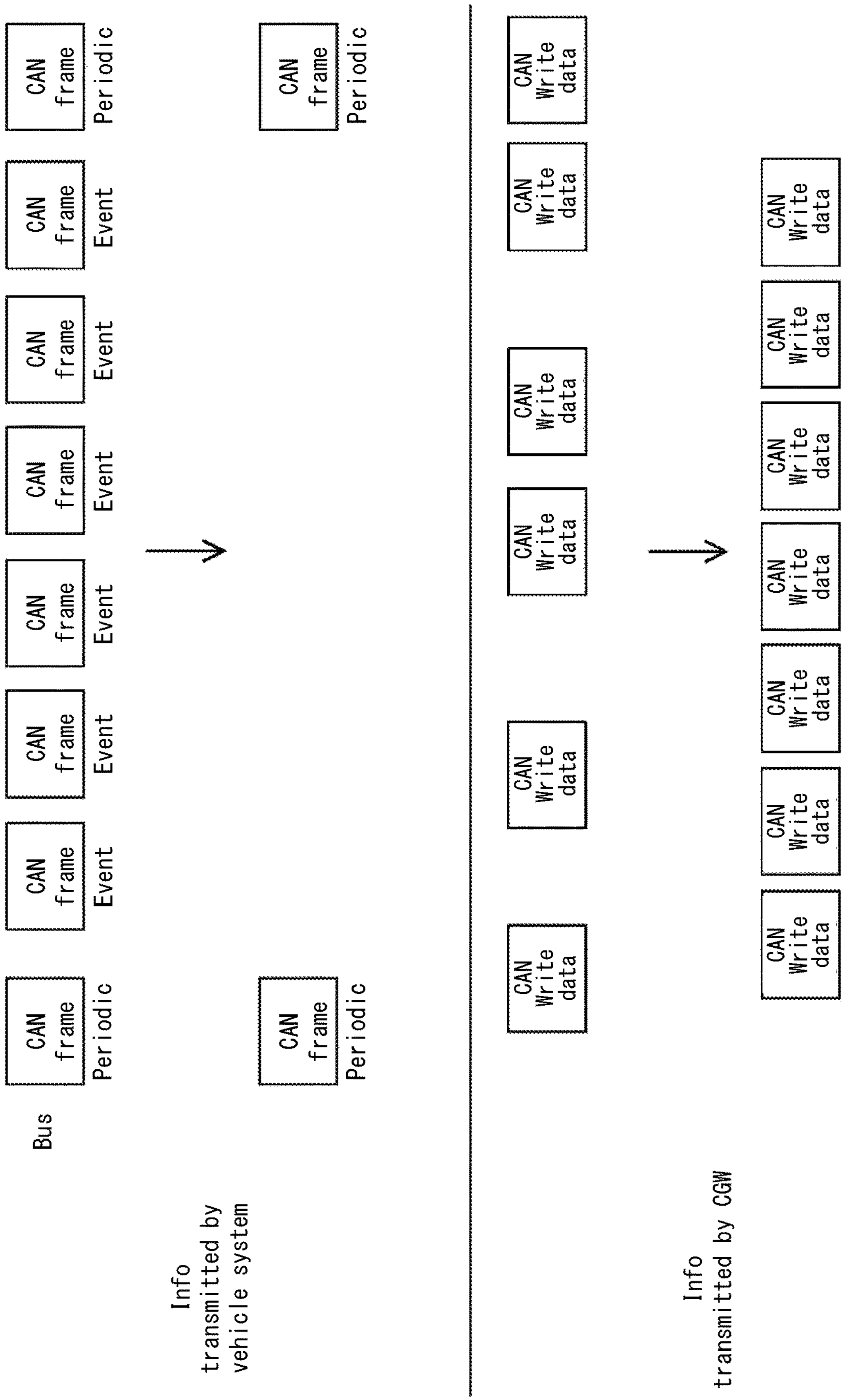
FIG. 107 is a diagram illustrating a distribution amount of write data.

As illustrated in FIG. 107, in the CGW 13, in a case where an event frame is transmitted from the rewrite target ECU 19, since the frequency of interruption increases by receiving the event frame, and thus a bus load increases, a distribution amount of write data may be relatively reduced, and, in a case where the event frame is no longer transmitted from the rewrite target ECU 19, the distribution amount of the write data may be relatively increased.

Figure 108:
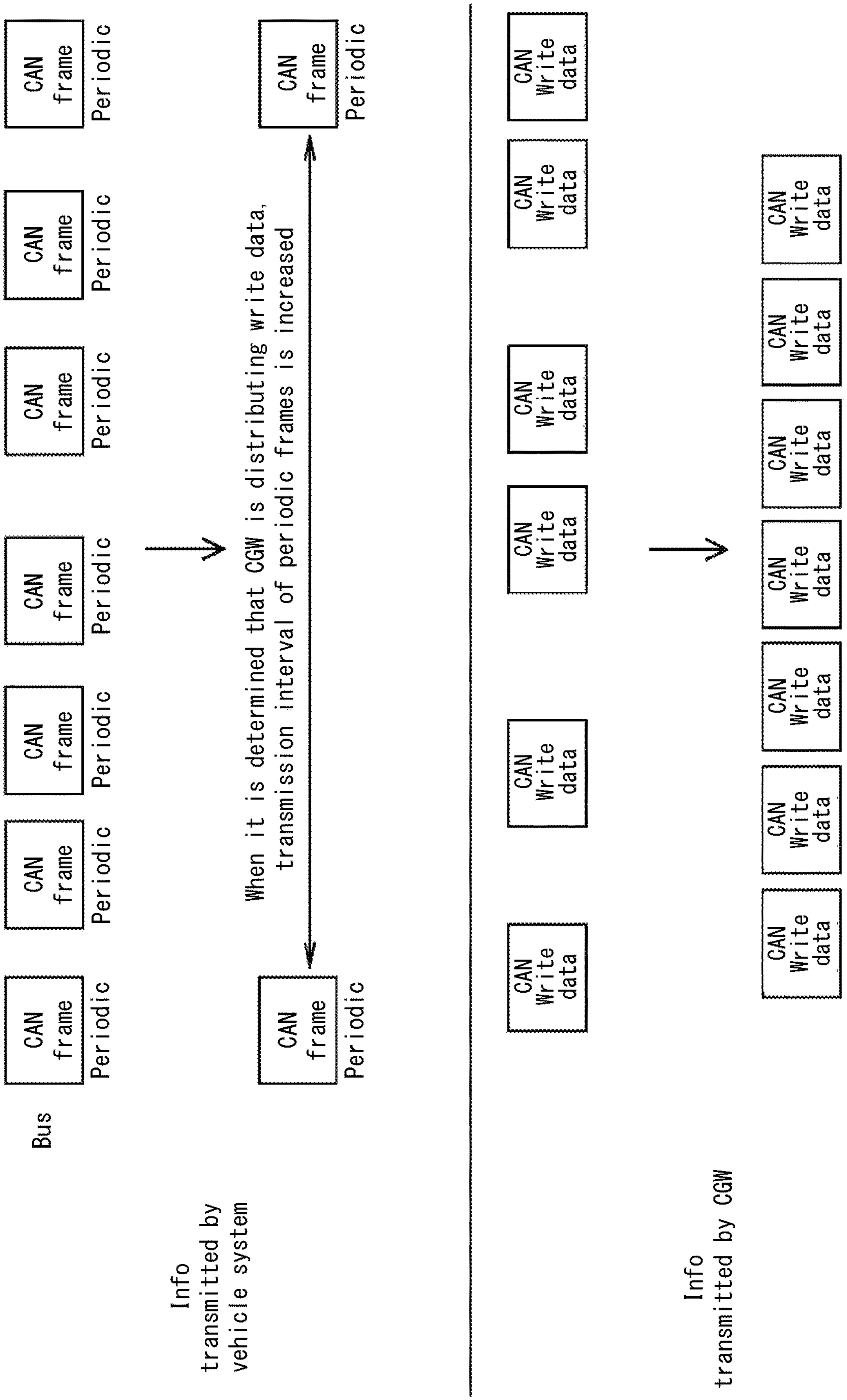
FIG. 108 is a diagram illustrating a distribution amount of write data.

As illustrated in FIG. 108, in the vehicle system, in a case where it is specified that the CGW 13 is distributing write data, a bus load may be reduced by increasing a transmission interval of application data such as vehicle control or diagnosis to the allowable maximum interval. In the CGW 13, since the bus load is reduced by the vehicle system increasing the transmission interval of the application data, a distribution amount of write data may be relatively increased.

The bus load table incorporated in the rewrite specification data is set uniformly and commonly by, for example, a vehicle manufacturer regardless of a vehicle model, grade, or the like. This is because, for example, when equipment of an ECU greatly changes depending on the vehicle model, grade, or the like, a bus load greatly changes, and, when the optimum bus load table is individually set depending on the vehicle model, grade, or the like, complicated labor such as labor to verify the bus load table is required, so that such complicated labor is reduced.

As described above, similarly to the case where installation is performed while the vehicle is traveling, also in a case where installation is performed while the vehicle is parked, the write data distribution control process is performed. When the rewrite target ECU 19 is a +B power ECU, update can be performed in the +B power supply state, and thus an allowable transmission amount in the +B power supply state in the bus load table is referred to. On the other hand, in a case where the rewrite target ECU 19 is an IG ECU, installation is performed in the IG power supply state, and thus an allowable transmission amount in the IG power supply state in the bus load table is referred to. Here, for example, in a case where the rewrite target ECU 19 is an ACC ECU, installation can be performed in the IG power supply state. In this case, an allowable transmission amount in the IG power supply state in the bus load table is referred to. The configuration of storing the bus load table and the rewrite target ECU-belonging table has been described, but any table may be stored as long as a distribution frequency of write data in each power supply state can be specified.

(12) Activation Request Instruction Process

Figure 110:
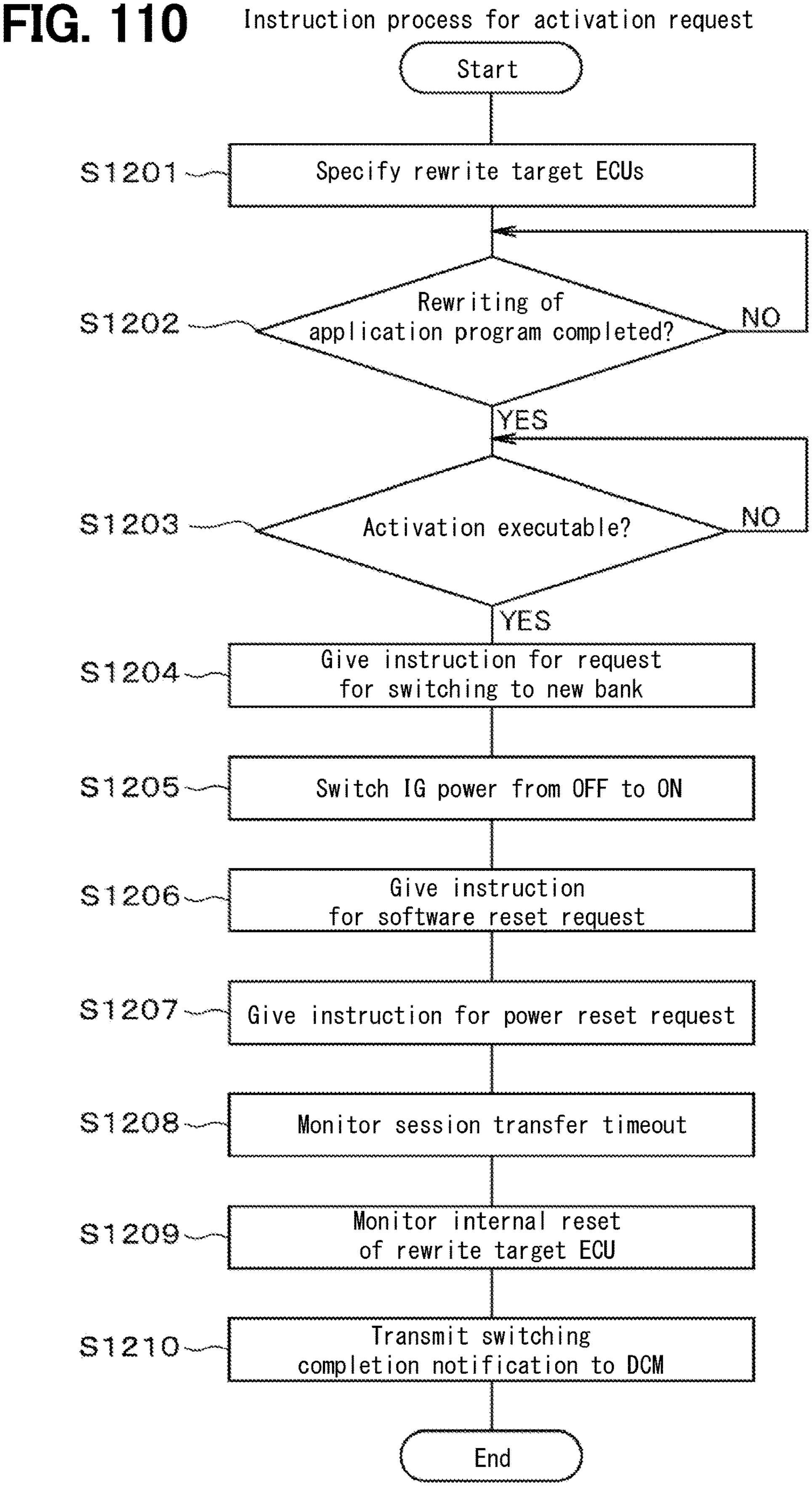
FIG. 110 is a flowchart illustrating an activation request instruction process.
Figure 111:
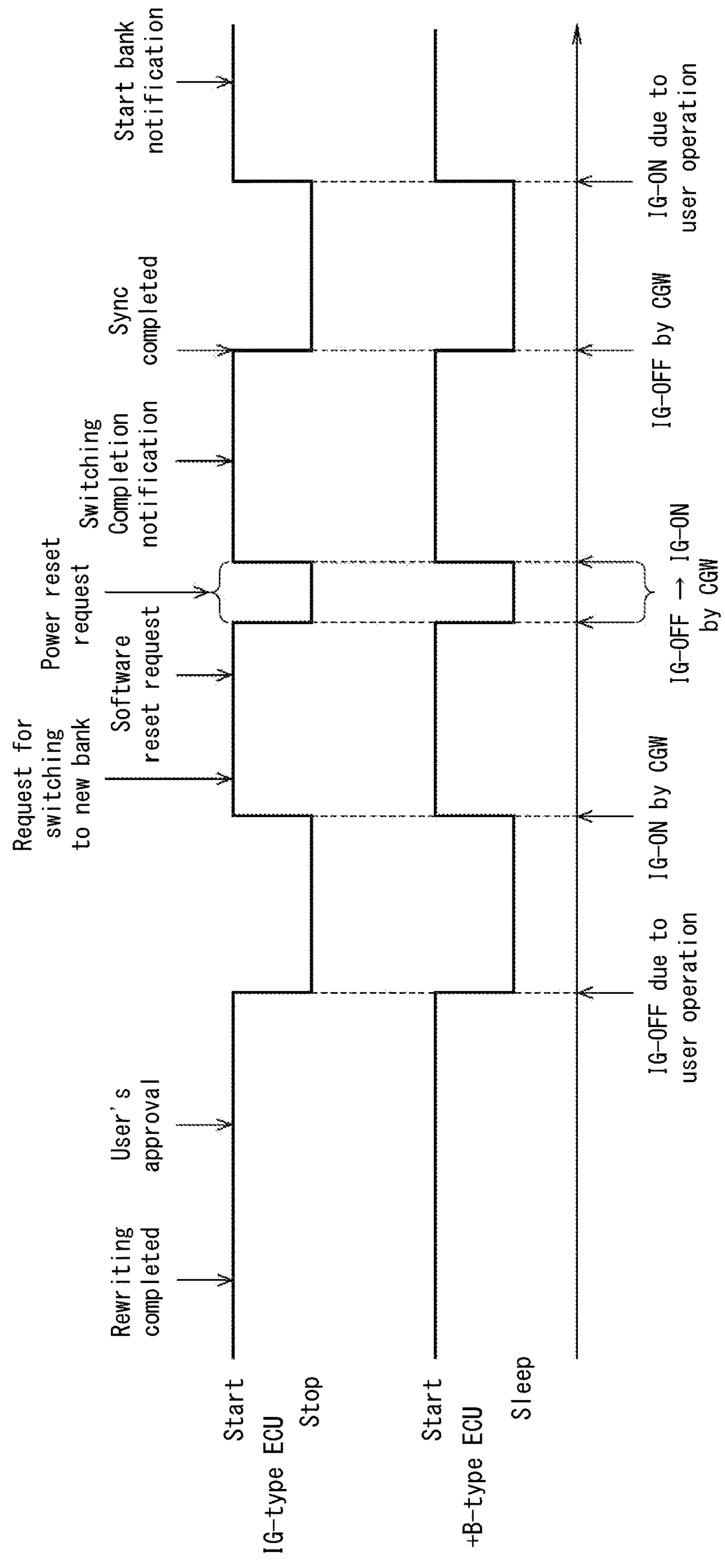
FIG. 111 is a diagram illustrating an aspect of giving an instruction for an activation request.

The activation request instruction process will be described with reference to FIGS. 109 to 111. The vehicle program rewriting system 1 performs an activation request instruction process in the CGW 13. The CGW 13 makes activation requests to a plurality of rewrite target ECUs 19 in which rewriting of an application program has been completed in order to validate the rewritten program. In the present embodiment, a state is assumed in which the CGW 13 analyzes the CGW rewrite specification data to recognize a group of the rewrite target ECUs 19. The CGW 13 makes an activation request only during parking, and does not make an activation request during traveling of the vehicle.

Figure 109:
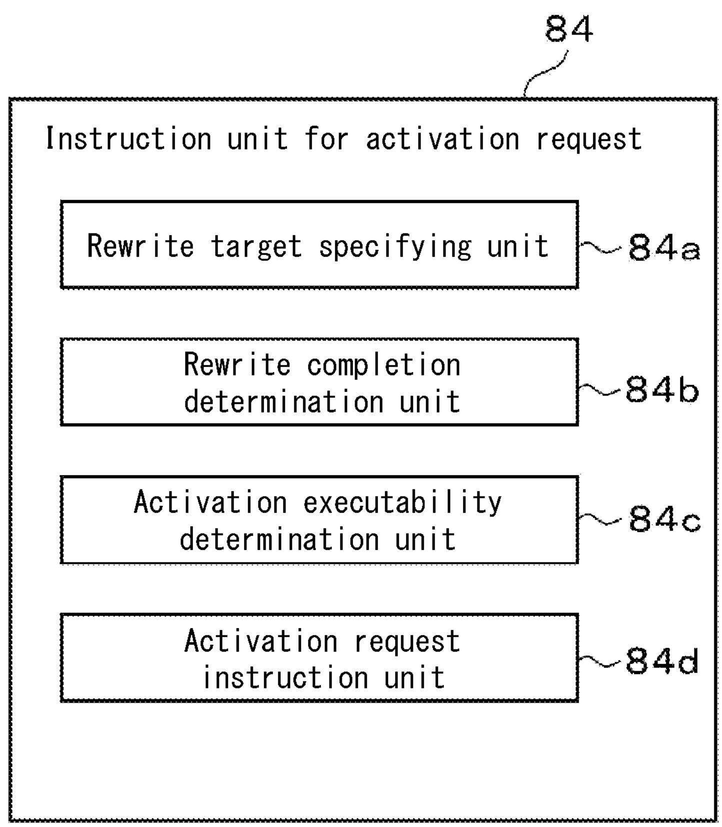
FIG. 109 is a functional block diagram of an activation request instruction unit.

As illustrated in FIG. 109, the CGW 13 includes a rewrite target specifying unit 84*a*, a rewrite completion determination unit 84*b*, an activation executability determination unit 84*c*, and an activation request instruction unit 84*d* in the activation request instruction unit 84. The rewrite target specifying unit 84*a* specifies a plurality of rewrite target ECUs 19 among a plurality of rewrite target ECUs 19 performing cooperative control. When the plurality of rewrite target ECUs 19 are specified by the rewrite target specifying unit 84*a*, the rewrite completion determination unit 84*b* determines whether or not rewriting of programs has been completed in all of the plurality of specified rewrite target ECUs 19.

When it is determined by the rewrite completion determination unit 84*b* that the rewriting of the programs has been completed in all of the plurality of rewrite target ECUs 19, the activation executability determination unit 84*c* determines whether or not activation is executable. The activation executability determination unit 84*c* determines that the activation is executable in a case where the activation is approved by the user and the vehicle is in a parking state.

The activation request instruction unit 84*d* gives an instruction for an activation request in a case where it is determined by the activation executability determination unit 84*c* that the activation is executable. Specifically, the activation request instruction unit 84*d* gives the instruction for the activation request by giving an instruction for a reset request, monitoring session transition timeout, or monitoring the internal reset of the rewrite target ECU 19 after giving an instruction for a request for switching to a new bank. In a double-bank memory ECU or a single-bank suspend memory ECU, an application program is activated by starting the application program on a new bank (inactive bank) in which the application program is written. On the other hand, in a single-bank memory ECU, the application program is activated through restart. The rewrite target ECU 19 may be configured to be reset by itself regardless of an activation request after an instruction for a request for switching to a new bank is received.

Next, with reference to FIGS. 110 and 111, an operation of the activation request instruction unit in the CGW 13 will be described. The CGW 13 executes an activation request instruction program and thus performs the activation request instruction process.

When the activation request instruction process is initiated, the CGW 13 specifies a plurality of rewrite target ECUs 19 (S1201; corresponding to a rewrite target specifying procedure). Specifically, the CGW 13 specifies the rewrite target ECUs 19 by referring to ECUs (IDs) described in the rewrite specification data. The CGW 13 determines whether or not rewriting of application programs has been completed in all of the plurality of specified rewrite target ECUs 19 (S1202; corresponding to a rewrite completion determination procedure). For example, the CGW 13 sequentially performs installation on the rewrite target ECUs 19 according to the order of the ECUs (IDs) described in the rewrite specification data, and determines that writing has been completed in all of the rewrite target ECUs 19 when installation for an ECU (ID) described last has been completed.

When it is determined that rewriting of the application program has been completed in all of the plurality of specified rewrite target ECUs 19 (S1202: YES), the CGW 13 determines whether or not activation is executable (S1203; corresponding to an activation executability determination procedure). Specifically, the CGW 13 determines whether or not the user's approval for the update has been obtained so far, whether or not the vehicle is in a parking state, and the like, and determines that the activation is executable when these conditions are satisfied. The user's approval may be an approval for the entire update process or an approval for the activation. When it is determined that activation is executable (S1203: YES), the CGW 13 subsequently gives instructions for activation requests to the plurality of rewrite target ECUs 19 at the same time (corresponding to an activation request instruction procedure). Here, a description will be made assuming that the ECU (ID1), the ECU (ID2), and the ECU (ID3) are the rewrite target ECUs 19 of the same group.

When it is determined that activation is executable for the ECU (ID1), the ECU (ID2), and the ECU (ID3), the CGW 13 initiates the activation request instruction process. When the activation request instruction process is initiated, the CGW 13 gives an instruction for a request for switching to a new bank to the rewrite target ECU 19 (S1204). The CGW 13 requests the power supply management ECU 20 to switch on the IG power in an OFF state (S1205). The CGW 13 switches on the IG power in an OFF state in order to perform activation although the vehicle is in a parking state and the IG switch 42 is in an OFF state. In a case where the CGW 13 performs installation and subsequently performs activation, since the IG power is in an ON state, S1205 is not performed, and a start request (wake-up request) is made to the rewrite target ECU 19 in the sleep state.

The CGW 13 transmits a software reset request to the rewrite target ECU 19, and gives an instruction for the software reset request to the rewrite target ECU 19 (S1206). In a case where the rewrite target ECU 19 has a specification of coping with the software reset request, when the software reset request is received from the CGW 13, the rewrite target ECU 19 is restarted by resetting the software, and activates an application program. In a case where the rewrite target ECU 19 is a single-bank memory ECU, the rewrite target ECU 19 is restarted by the new application program and thus switches from the old application program to the new application program. In a case where the rewrite target ECU 19 is a single-bank suspend memory ECU or a double-bank memory ECU, the rewrite target ECU 19 updates the active bank information (the bank-A or the bank-B) stored in the flash memory, causes a bank to which the new application program is written to switch to an active bank, and thus switches from the old application program to the new application program.

The CGW 13 requests the power supply management ECU 20 to switch off the IG power in an ON state and to switch on the IG power in an OFF state, gives an instruction for a power reset request to the rewrite target ECU 19, and instructs the rewrite target ECU 19 to be restarted (S1207). Even in a case where the rewrite target ECU 19 does not have a specification of coping with the software reset request, when the IG power switches from an ON state to an OFF state and the IG power switches from an OFF state to an ON state, the rewrite target ECU is reset and restarted to activate the application program. Also in this case, in a case where the rewrite target ECU 19 is a single-bank memory ECU, the rewrite target ECU 19 is restarted by the new application program and thus switches from the old application program to the new application program. In a case where the rewrite target ECU 19 is a single-bank suspend memory ECU or a double-bank memory ECU, the rewrite target ECU 19 updates the active bank information (the bank-A or the bank-B) stored in the flash memory, causes a bank to which the new application program is written to switch to an active bank, and thus switches from the old application program to the new application program. The CGW 13 monitors session transition timeout (S1208) and monitors the internal reset of the rewrite target ECU 19 (S1209).

That is, in a case where the rewrite target ECU 19 does not have the specification of coping with the software reset request, the CGW 13 cannot give an instruction for activation even when the software reset request is transmitted to the rewrite target ECU 19. Therefore, an instruction for the power reset request is given to the rewrite target ECU 19, and thus activation is performed in the rewrite target ECU 19 that does not have the specification of coping with the software reset request. For example, an IG ECU such as an engine ECU is configured to be reset without fail when the power is turned on or off, and, thus, in many cases, a configuration does not cope with the software reset request. From the viewpoint of the rewrite target ECU 19, activation is performed (started by the new program) by any of reception of an instruction for the software reset request from the CGW 13, reception of an instruction for the power reset request from the CGW 13, the session transition timeout, and the internal reset.

When an instruction for the software reset request is received from the CGW 13, the rewrite target ECU 19 coping with the software reset request is forced to be reset to perform activation. The rewrite target ECU 19 that is an ACC ECU or an IG ECU is reset to perform activation when power is supplied next since the power is forced not to be supplied in a case where an instruction for the power reset request is received from the CGW 13. Unlike the rewrite target ECU 19 that is an ACC or IG ECU, the rewrite target ECU 19 that is a +B power ECU is supplied with power at all times, and thus activation is performed by the session transition timeout or the internal reset. An activation method for each rewrite target ECU 19 is specified by the rewrite specification data.

When the CGW 13 is notified that the new application program is normally started from all of the rewrite target ECUs 19, the CGW transmits a switching completion notification to the DCM 12 (S1210). The DCM 12 notifies the center device 3 that activation of the update programs has been completed. The CGW 13 requests the power supply management ECU 20 to switch on the IG power in an OFF state, and finishes an application program activation synchronization instruction process. When the IG power switches from an OFF state to an ON state through the user operation, the CGW 13 transmits a program version, an active bank, and the like of the ECU to the DCM 12. The DCM 12 notifies the center device 3 of the information of each ECU 19 received from the CGW 13. Here, when the DCM 12 notifies the center device 3 of completion of the activation, ECU configuration information including a program version and bank information of each ECU may be transmitted to the center device 3. FIG. 111 illustrates a case where the rewrite target ECU 19 is a double-bank memory ECU or a single-bank suspend memory ECU.

As described above, the CGW 13 performs the activation request instruction process, thus prevents a situation in which a plurality of rewrite target ECUs 19 having completed rewriting of application programs switch from old programs to new programs at their own timings, and appropriately aligns timings of switching from the old programs to the new programs in the plurality of rewrite target ECUs 19. That is, a situation is prevented in which program versions of a plurality of rewrite target ECUs 19 which cooperate with each other do not match each other, and thus a problem occurs in a cooperative process.

(13) Activation Execution Control Process

Figure 113:
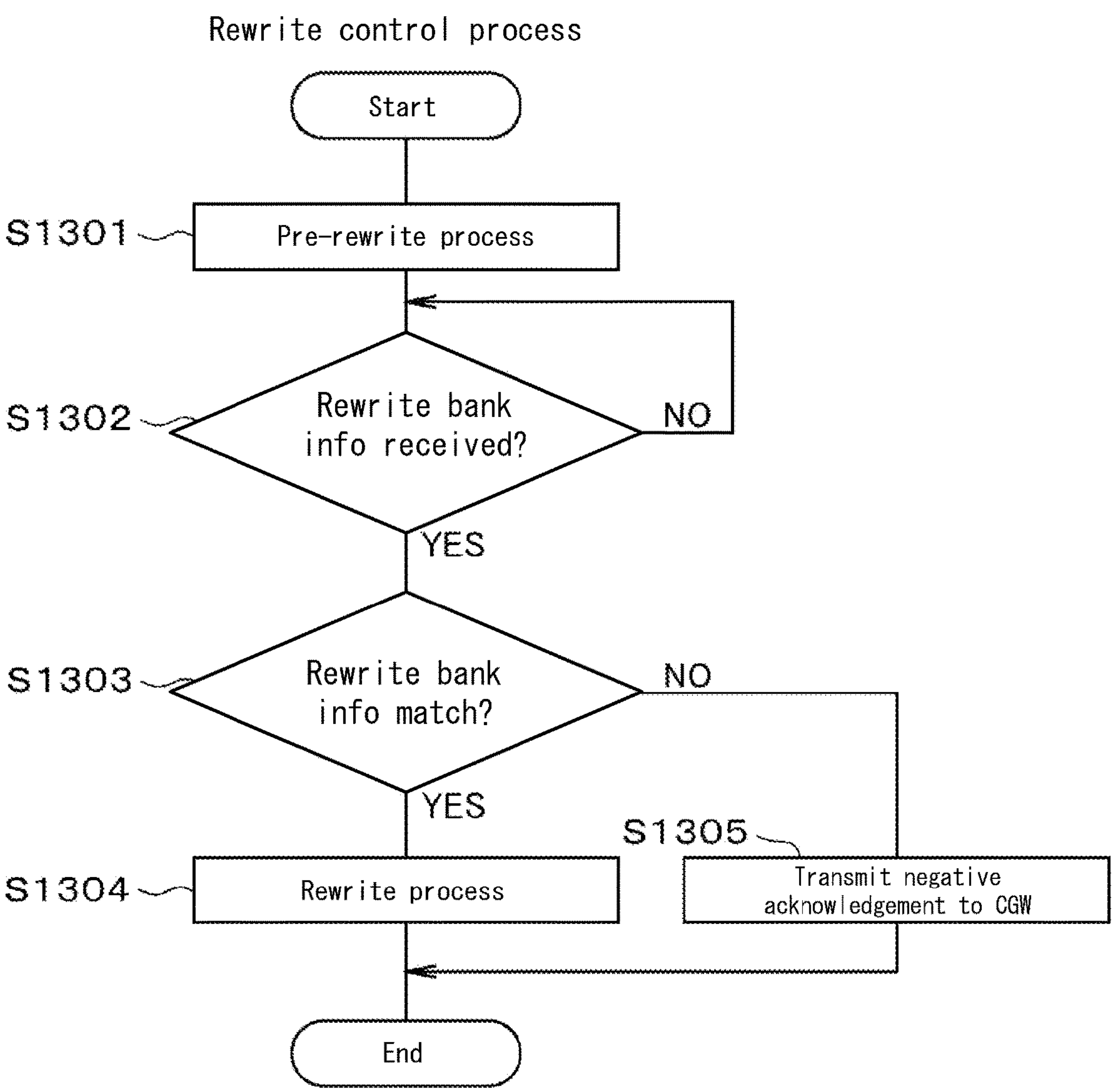
FIG. 113 is a flowchart illustrating a rewrite process.
Figure 114:
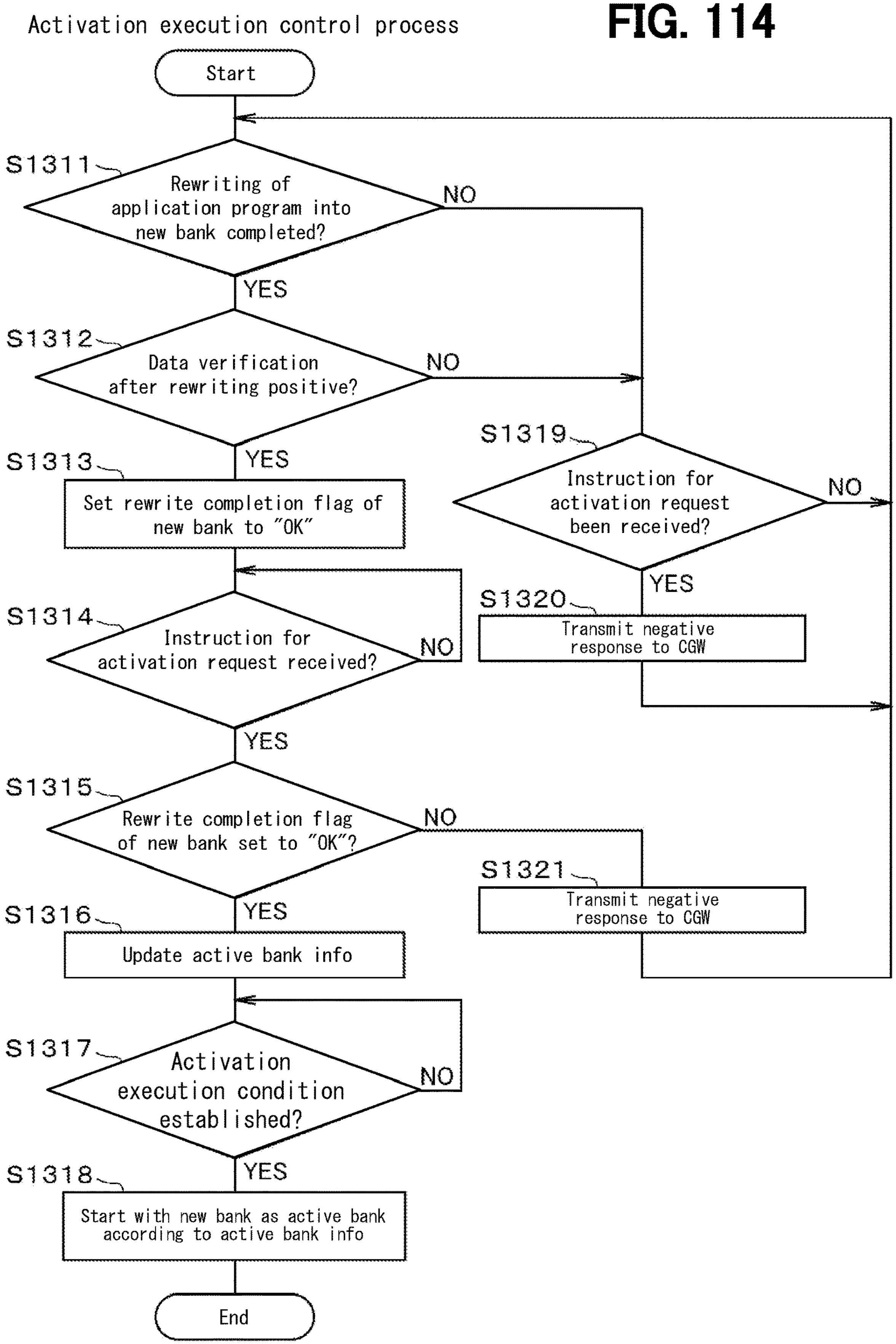
FIG. 114 is a flowchart illustrating an activation execution control process.

The activation execution control process will be described with reference to FIGS. 112 to 114. The activation execution control process is a process performed by the rewrite target ECU 19 to which an instruction for an activation request is given by the CGW 13 due to the CGW 13 performing (12) the activation request instruction process described above. The vehicle program rewriting system 1 performs the activation execution control process in the rewrite target ECU 19. Here, the rewrite target ECU 19 has a plurality of data storage banks, such as a single-bank suspend memory or a double-bank memory. A state is assumed in which the rewrite target ECU 19 has a first data storage bank and a second data storage bank, and installation of rewrite data has been completed in an inactive bank (new bank).

Figure 112:
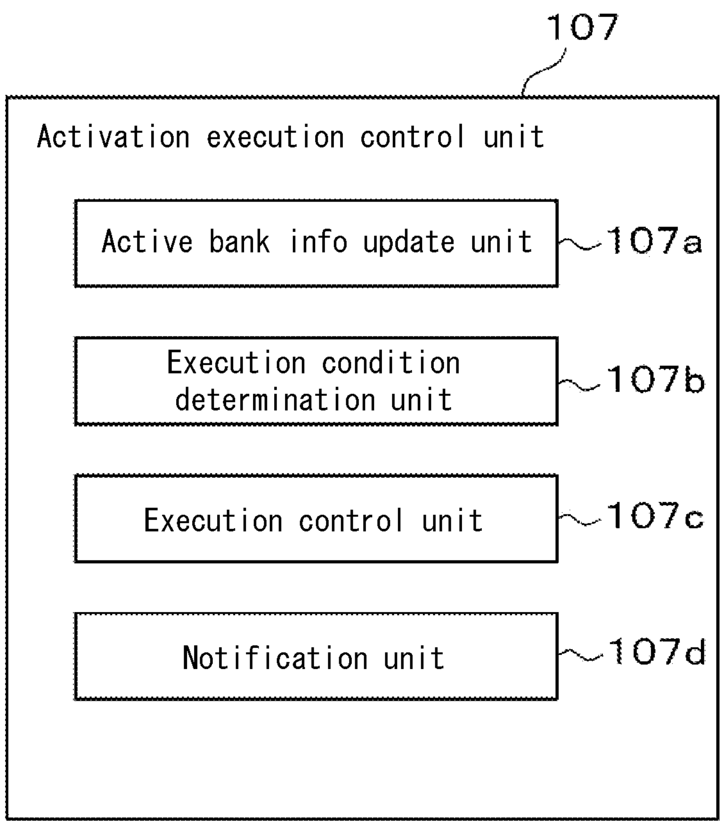
FIG. 112 is a functional block diagram of an activation execution control unit.

As illustrated in FIG. 112, the ECU 19 includes an active bank information update unit 107*a*, an execution condition determination unit 107*b*, an execution control unit 107*c*, and a notification unit 107*d* in the activation execution control unit 107. When an instruction for an activation request is received from the CGW 13, the active bank information update unit 107*a* updates active bank determination information (active bank information) of the flash memory in preparation for the next restart. For example, when the bank-A is currently active and a new program is written in the bank-B, the active bank information update unit 107*a* updates the active bank information from the bank-A to the bank-B.

The execution condition determination unit 107*b* determines whether or not an instruction for a software reset request is received from the CGW 13, whether or not an instruction for a power reset request is given from the CGW 13 to the power supply management ECU 20, and whether or not disruption of communication with the CGW 13 lasts for a predetermined time, as activation execution conditions. When any one of the conditions is satisfied, the execution condition determination unit 107*b* determines that the activation execution conditions are established. Whether or not an instruction for the power reset request is received may be detected by the power detection circuit 36 instead of an instruction from the CGW 13. When it is determined by the execution condition determination unit 107*b* that the activation execution condition is established, the execution control unit 107*c* performs new bank switching (activation) of causing the active bank to switch from the old bank (the bank currently operated) to the new bank (the bank not currently operated) in accordance with the active bank information. The notification unit 107*d* notifies the CGW 13 of notification information such as active bank information and version information.

Next, an operation of the activation execution control unit 107 in the rewrite target ECU 19 will be described with reference to FIGS. 113 and 114. The rewrite target ECU 19 executes an activation execution control program and thus performs the activation execution control process.

(13-1) Rewrite Process

When the rewrite process is initiated, the rewrite target ECU 19 performs processes up to immediately before memory erasure, such as part number reading or authenticating as a pre-rewrite process (S1301). The rewrite target ECU 19 determines whether or not rewrite bank information has been received from the center device 3 (S1302). The rewrite target ECU 19 determines whether or not the rewrite bank information has been received on the basis of, for example, whether or not the rewrite bank information described in rewrite specification data included in a distribution package has been acquired from the CGW 13. When it is determined that the rewrite bank information has been received from the center device 3 (S1302: YES), the rewrite target ECU 19 collates the rewrite bank information with rewrite bank information (active bank information) managed thereby, and thus determines whether or not the two pieces of information match each other (S1303). Here, the rewrite bank information is described in the rewrite specification data transmitted from, for example, the center device 3. For example, in a case where the rewrite bank information managed by the rewrite target ECU indicates that an active bank is the bank-A and an inactive bank is the bank-B, when the rewrite bank information described in the rewrite specification data indicates the inactive bank (bank-B), it is determined that both of the pieces of information match each other, and, when the rewrite bank information described in the specification data indicates the active bank (bank-A), it is determined that both of the pieces of information do not match each other.

When it is determined that both of the pieces of information match each other (S1303: YES), the rewrite target ECU 19 performs, as the rewrite process, memory erasure, writing of write data, and verification (S1304), and finishes the rewrite process. The verification is, for example, to verify the integrity of data written in the flash memory. When it is determined that both of the pieces of information do not match each other (S1303: NO), the rewrite target ECU 19 transmits a negative acknowledgement to the CGW 13 (S1305), and finishes the rewrite process.

(13-2) Activation Execution Control Process

When the activation execution control process is initiated, the rewrite target ECU 19 sets an inactive bank as a rewrite bank, and determines whether or not rewriting of an application program into the rewrite bank has been completed (S1311). When it is determined that rewriting of the application program into the rewrite bank has been completed (S1311: YES), the rewrite target ECU 19 verifies the integrity of the application program written in the flash memory, and determines whether or not data verification after the rewriting is positive (S1312). When it is determined that the data verification after the rewriting is positive (S1312: YES), the rewrite target ECU 19 sets a rewrite completion flag of the new bank to "OK" and stores the rewrite completion flag (S1313).

Thereafter, the rewrite target ECU 19 determines whether or not an instruction for an activation request has been received from the CGW 13 (S1314). When it is determined that the instruction for the activation request has been received (S1314: YES), the rewrite target ECU 19 determines whether or not the rewrite completion flag of the new bank is "OK" (S1315), and updates the active bank information when it is determined that the rewrite completion flag of the new bank is "OK" (S1315: YES) (S1316; corresponding to an active bank information update step). That is, for example, in a case where an active bank is the bank-A and an inactive bank is the bank-B, when rewriting of the application program into the rewrite bank has been completed by using the bank-B as the rewrite bank, the rewrite target ECU 19 updates the active bank information currently indicating that an active bank is the bank-A and an inactive bank is the bank-B as indicating that an active bank is the bank-B and an inactive bank is the bank-A.

When the active bank information is updated, the rewrite target ECU 19 determines whether or not a software reset request has been received from the CGW 13, whether or not an instruction for a power reset request has been given from the CGW 13 to the power supply management ECU 20, and whether or not disruption of communication with the CGW 13 lasts for a predetermined time after the instruction for the software reset request is received, and thus determines whether or not the activation execution condition is established (S1317; corresponding to an execution condition determination step). Here, the rewrite target ECU 19 is restarted when any of the activation execution conditions is established, and restart conditions are defined for each ECU.

The rewrite target ECU 19 determines whether an instruction for the software reset request has been received from the CGW 13, the instruction for the power reset request has been given from the CGW 13 to the power supply management ECU 20, or the predetermined time has elapsed after the instruction for the software reset request is received, and executes restart (reset) when it is determined that the activation execution condition is established (S1317: YES). The rewrite target ECU 19 executes the restart and is started with the new bank (bank-B) as an active bank (S1318; corresponding to an activation control step) according to the updated active bank information, and finishes the activation execution control process. That is, after the rewrite target ECU 19 is restarted, the rewrite target ECU is started with the bank-B in which the application program is installed.

When it is determined that rewriting of the application program to the new bank is not completed (S1311: NO), or it is determined that the data verification after the rewriting is negative (S1312: NO), the rewrite target ECU 19 determines whether or not an instruction for an activation request has been received (S1319), transmits a negative response to the CGW 13 (S1320) when it is determined that the instruction for the activation request has been received (S1319: YES), and returns to step S1311. When it is determined that the data verification after the rewriting is negative, the rewrite target ECU 19 may finish the activation execution control process and perform a process such as rollback. When it is determined that the rewrite completion flag of the new bank is not "OK" (S1315: NO), the rewrite target ECU 19 transmits a negative response to the CGW 13 (S1321) and returns to step S1311.

As described above, the rewrite target ECU 19 performs the activation execution control process, thus updates the active bank information in preparation for the next restart when an instruction for an activation request is received from the CGW 13, and performs new bank switching for causing an active bank to switch from the old bank to the new bank according to the active bank information after restarting when the activation execution condition is established. That is, the rewrite target ECU 19 is not started with an update program unless the CGW 13 gives an instruction for activation thereto even though installation of the update program has been completed. For example, even when the rewrite target ECU 19 is restarted by the user turning on the IG switch 42 in an OFF state, unless an instruction for activation is received from the CGW 13, the rewrite target ECU is started with the same active bank. The CGW 13 simultaneously gives instructions for activation to a plurality of rewrite target ECUs 19, and then update programs of the plurality of the rewrite target ECUs 19 can be simultaneously validated when being restarted by software reset, power reset, or session timeout. In the above description, the case where data storage banks are double banks has been described, but the same applies to a case where data storage banks are three or more banks.

In the activation request instruction process (12) in the CGW 13, the CGW 13 performs the activation request instruction process on a plurality of rewrite target ECUs 19 having completed rewriting of application programs, and thus it is possible to prevent a situation in which the plurality of rewrite target ECUs 19 having completed rewriting of the application programs switch from old programs to new programs at their own timings, and to appropriately align timings of switching from the old programs to the new programs in the plurality of rewrite target ECUs 19.

(14) Rewrite Target Group Management Process

The rewrite target group management process will be described with reference to FIGS. 115 to 118. The vehicle program rewriting system 1 performs the rewrite target group management process in the CGW 13. The CGW 13 simultaneously instructs one or more rewrite target ECUs 19 belonging to the same group to activate application programs. The CGW 13 performs control from installation to activation in the group unit. Here, a description will be made assuming that the ECU (ID1) and the ECU (ID2) are the rewrite target ECUs 19 of a first group, and an ECU (ID11), an ECU (ID12), and an ECU (ID13) are the rewrite target ECUs 19 of a second group.

Figure 115:
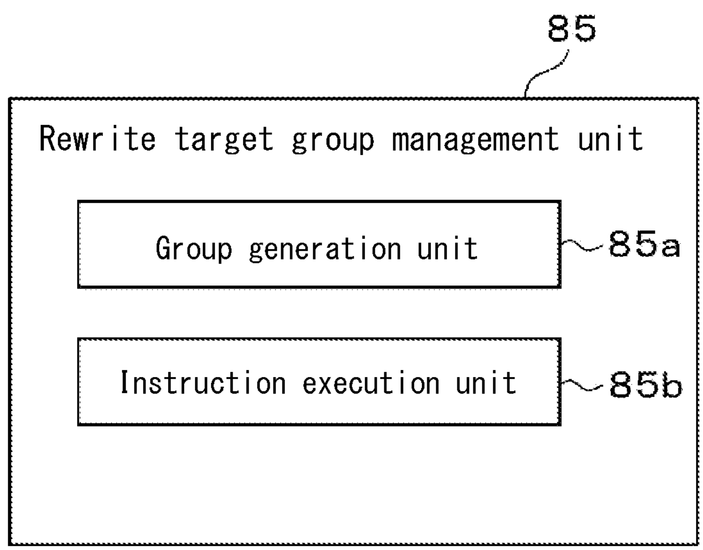
FIG. 115 is a functional block diagram of a rewrite target grouping unit.

As illustrated in FIG. 115, the CGW 13 includes a group generation unit 85*a* and an instruction execution unit 85*b* in the rewrite target group management unit 85. The group generation unit 85*a* groups the rewrite target ECUs 19 to be upgraded together according to an analysis result of the CGW rewrite specification data, and thus generates a group. In a case where the group is generated by the group generation unit 85*a*, the instruction execution unit 85*b* gives an instruction for installation in a predetermined order in the unit of the group, and gives an instruction for activation in the unit of group when the installation has been completed.

Figure 116:
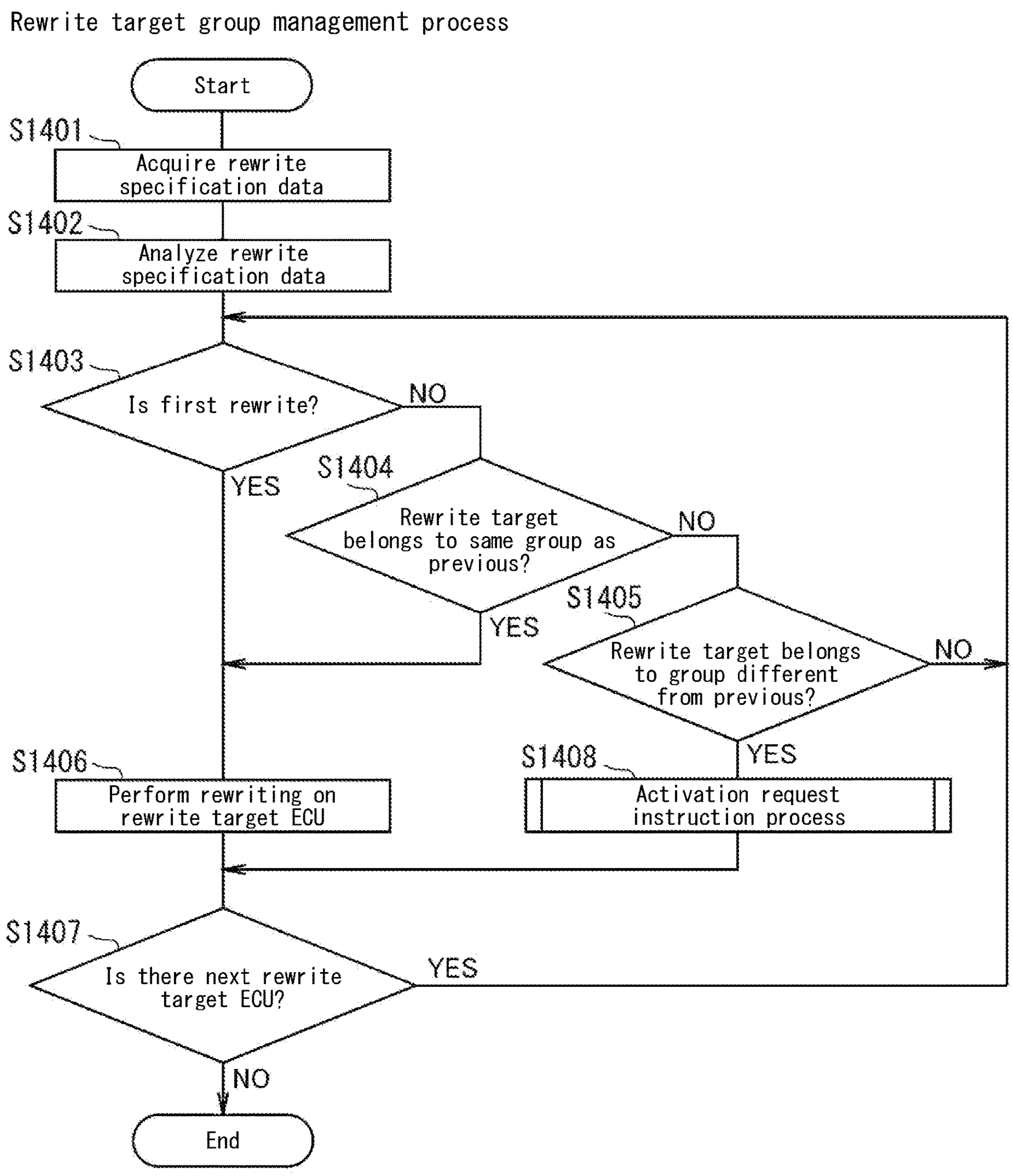
FIG. 116 is a flowchart illustrating a rewrite target group management process.
Figure 117:
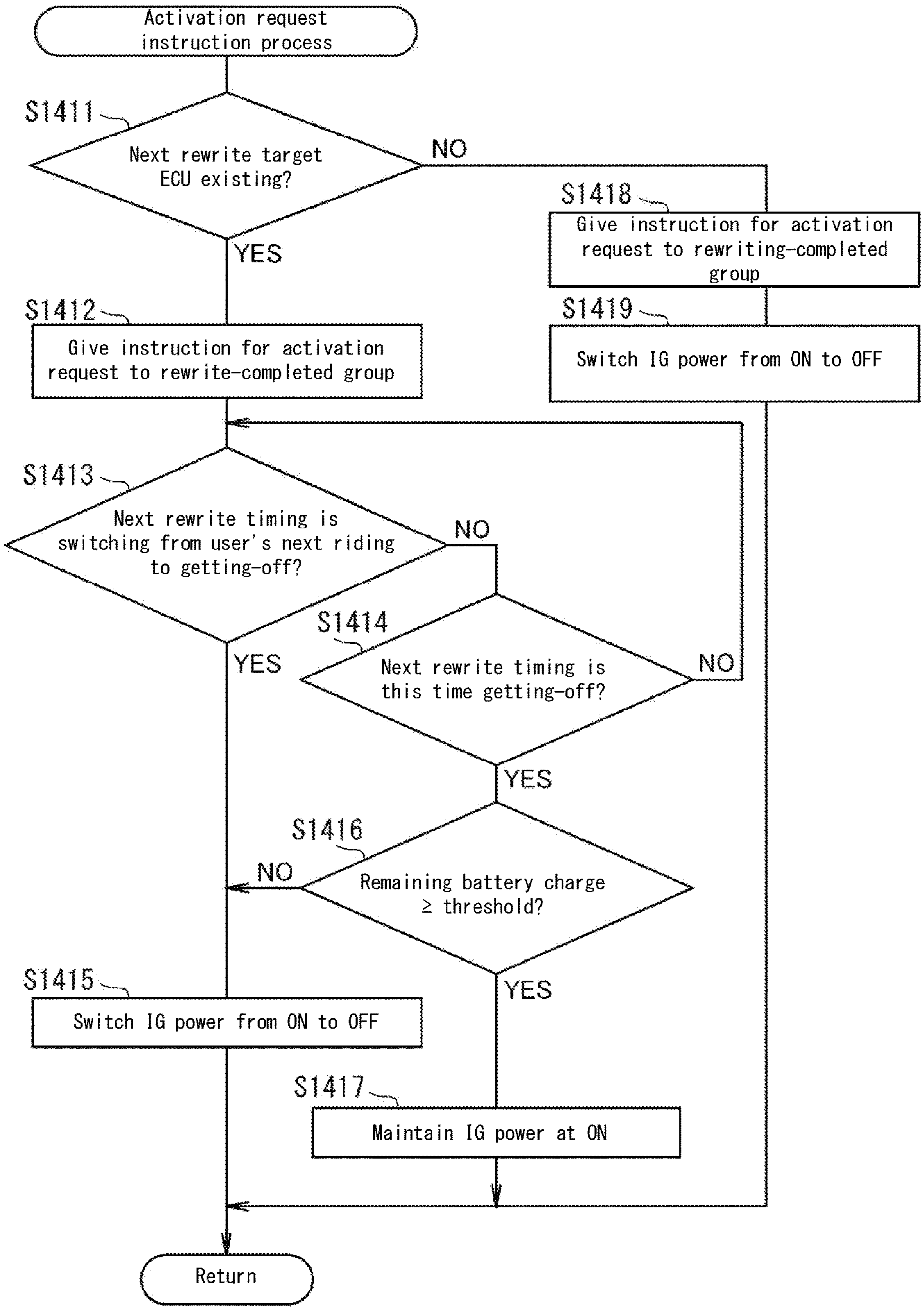
FIG. 117 is a flowchart illustrating the rewrite target group management process, FIG. 118 a diagram illustrating an aspect of grouping rewrite targets.

Next, with reference to FIGS. 116 to 118, an operation of the rewrite target group management unit 85 in the CGW 13 will be described. The CGW 13 executes a rewrite target grouping program and thus performs the rewrite target group management process. When the rewrite target group management process is initiated, the CGW 13 acquires the CGW rewrite specification data from the DCM 12 (S1401; corresponding to a rewrite specification data acquisition procedure), analyzes the acquired rewrite specification data (S1402; corresponding to a rewrite specification data analysis procedure), and determines a group to which the present rewrite target ECU 19 belongs. For example, the CGW 13 may specify to which group the rewrite target ECU belongs by referring to information regarding the ECU of the rewrite specification data, and may specify to which group the ECU belongs by referring to information regarding the group of the rewrite specification data. The CGW 13 determines whether or not the rewrite target ECU 19 is initially subjected to rewriting for a certain group (S1403), determines whether or not the rewrite target ECU 19 belonging to the same group as that of the previous rewrite target ECU 19 is subjected to rewriting (S1404), and determines whether or not the rewrite target ECU 19 belonging to a group different from that of the previous rewrite target ECU 19 is subjected to rewriting (S1405; corresponding to a group generation procedure).

When it is determined that the rewrite target ECU 19 is initially subjected to rewriting (S1403: YES) or it is determined that the rewrite target ECU 19 belonging to the same group as that of the previous rewrite target ECU 19 is subjected to rewriting (S1404: YES), the CGW 13 instructs the rewrite target ECU 19 to rewrite an application program such that the application program of the rewrite target ECU 19 is rewritten (S1406). The CGW 13 determines whether or not there is the next rewrite target ECU 19 (S1407). When it is determined that there is the next rewrite target ECU 19 in the same group (S1407: YES), the CGW 13 returns to the above steps S1403 to S1405, and repeatedly performs S1403 to S1405.

When it is determined that the rewrite target ECU 19 belonging to a group different from that of the previous rewrite target ECU 19 is subjected to rewriting (S1405: YES), the CGW 13 proceeds to an activation request instruction process (S1408; corresponding to an instruction execution procedure).

When the activation request instruction process is initiated, the CGW 13 determines whether or not there is the next rewrite target ECU 19 (S1411). That is, the CGW 13 determines whether or not there is a group in which installation is not completed. When it is determined that there is the next the rewrite target ECU 19 (S1411: YES), the CGW 13 gives an instruction for an activation request to the rewrite target ECU 19 belonging to the group in which the rewriting has been completed (S1412). That is, in a case where installation has not yet been performed on the rewrite target ECU 19 belonging to the second group, the CGW 13 gives an instruction for activation to the rewrite target ECU (ID1) and the rewrite target ECU (ID2) of the first group in which rewriting is already completed.

The CGW 13 gives an instruction for a software reset request to the rewrite target ECU 19, and instructs the rewrite target ECU 19 to be restarted by switching on the power in an OFF state and switching off the power in an ON state via the power supply management ECU 20, and thus the application programs of the rewrite target ECU (ID1) and the rewrite target ECU (ID2) are started together.

The CGW 13 determines a rewrite timing for the next rewrite target ECU 19 (S1413 and S1314). That is, the CGW 13 determines rewrite timings for the rewrite target ECUs 19 belonging to the second group. When it is determined that the rewrite timing for the next rewrite target ECU 19 is a timing of the user's switching from the next riding to getting-off (S1413: YES), the CGW 13 switches off the IG power in an ON state (S1415), finishes the activation request instruction process, and the returns to the rewrite target group management process. For example, when a time period in which rewriting of an application program is allowed to be updated is set by the user in advance, and it is predicted that installation in the rewrite target ECU 19 belonging to the second group is not completed during the time period, the CGW 13 performs installation in the next parking state. In this case, the CGW 13 instructs the power supply management ECU 20 to turn off the IG power in order to return to the original parking state.

When it is determined that the rewrite timing for the next rewrite target ECU 19 is the present getting-off (parking state) (S1414: YES), the CGW 13 determines whether or not a remaining battery charge of the vehicle battery 40 is equal to or more than a threshold value (S1417). Here, the threshold value may be a value set in advance or a value acquired from CGW rewrite specification data. When it is determined that the remaining battery charge of the vehicle battery 40 is not equal to or more than the threshold value (S1416: NO), the CGW 13 instructs the power supply management ECU 20 to switch off the IG power in an ON state (S1415), finishes the activation request instruction process, and returns to the rewrite target group management process. When it is determined that the remaining battery charge of the vehicle battery 40 is equal to or more than the threshold value (S1416: YES), the CGW 13 maintains the IG power to be in an ON state (S1417), finishes the activation request instruction process, and returns to the rewrite target group management process. As illustrated in FIG. 116, the CGW 13 rewrites the application program of the rewrite target ECU 19 belonging to the second group.

When it is determined that there is no next rewrite target ECU 19 (S1411: NO), the CGW 13 gives an instruction for an activation request to the rewrite target ECU 19 belonging to the group in which rewriting has been completed (S1418), switches off the IG power in an ON state (S1419), finishes the instruction process of the activation request, and returns to the group management process of the rewrite target. For example, when rewriting in the rewrite targets ECU (ID11), ECU (ID12), and ECU (ID13) belonging to the second group has been completed, the next rewrite target ECU 19, that is, the next group is not present. In this case, the CGW 13 instructs the ECU (ID11), the ECU (ID12), and the ECU (ID12) to activate the update programs, and instructs the power supply management ECU 20 to turn off the IG power after the activation has been completed.

Figure 118:
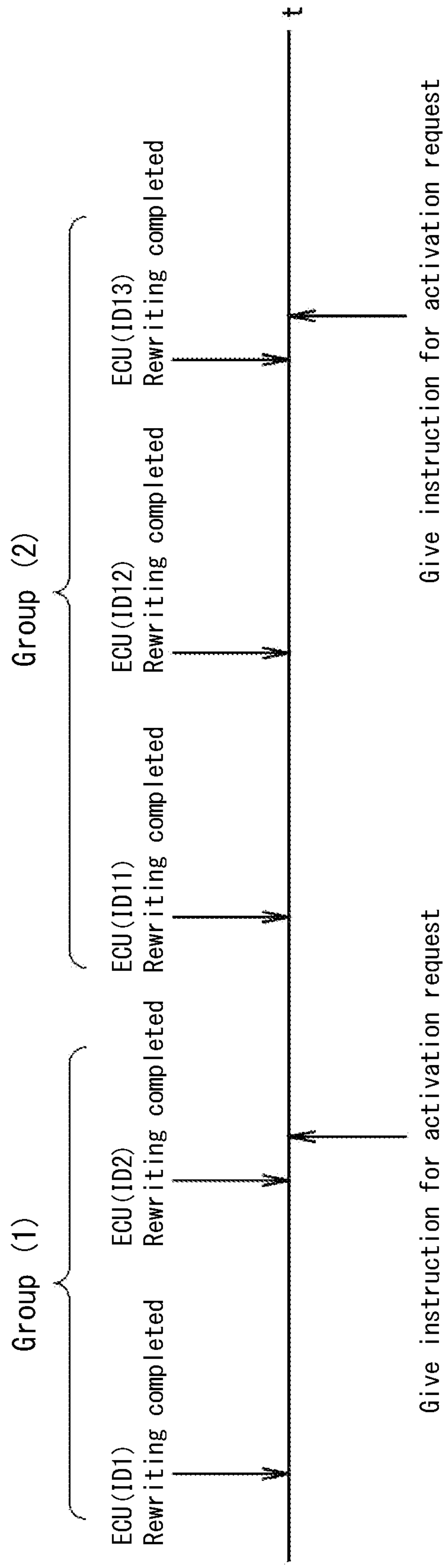

As illustrated in FIG. 118, in a case where the application programs of the ECU (ID1) and the ECU (ID2) and the ECU (ID11) to the ECU (ID13) are rewritten, when the ECU (ID1) and ECU (ID2) have a cooperative control relationship, and the ECU (ID11), the ECU (ID12), and the ECU (ID13) have a cooperative control relationship, in a distribution package, the ECU (ID1) and the ECU (ID2) belong to the first group as the rewrite target ECUs 19, and the ECU (ID11), the ECU (ID12), and the ECU (ID13) belong to the second group as the rewrite target ECUs 19. When rewriting of the application programs has been completed in the ECU (ID1) and the ECU (ID2) belonging to the first group, the CGW 13 simultaneously gives an instruction for an activation request to the ECU (ID1) and the ECU (ID2). Thereafter, the CGW 13 executes rewriting of the application programs in the ECU (ID11), the ECU (ID12), and the ECU (ID13) belonging to the second group, and gives an instruction for an activation request to the ECU (ID11), the ECU (ID12), and the ECU (ID13) when the rewriting has been completed in all of the ECUs. The rewrite target ECU 19 that is a single-bank memory is instructed to be restarted, and is thus instructed to perform activation.

As described above, the CGW 13 performs the group management process on the rewrite target ECUs 19 to which an activation request is made, and thus gives an instruction for an activation request thereto in the unit of the group. A plurality of ECUs having a cooperative control relationship can be simultaneously upgraded. That is, it is possible to prevent the occurrence of a problem in a cooperative control process due to mismatching among versions of application programs of the plurality of rewrite target ECUs 19 having a cooperative control relationship. The CGW 13 performs installation in a predetermined order in the unit of the group. That is, the CGW 13 performs control such that processes from installation to activation are performed in the group unit.

The present embodiment relates to a configuration in which, after installation in the rewrite target ECU 19 belonging to the first group has been completed, activation in the rewrite target ECU 19 belonging to the first group is performed, and, subsequently, after installation in the rewrite target ECU 19 belonging to the second group has been completed, activation in the rewrite target ECU 19 belonging to the second group is performed. However, activation in the rewrite target ECU 19 belonging to the first group and activation in the rewrite target ECU 19 belonging to the second group may be performed successively. That is, installation in the rewrite target ECU 19 belonging to the first group may be completed, installation in the rewrite target ECU 19 belonging to the second group may be completed, and then activation in rewrite target ECU 19 belonging to the first group may be performed, and activation in the rewrite target ECU 19 belonging to the second group may be performed. In this case, activation in the rewrite target ECUs 19 belonging to the first group and the second group may be performed simultaneously.

In a case where the rewrite target ECU 19 includes a single-bank memory ECU, an instruction for installation in the single-bank memory ECU may be given last in a group. In a case where an instruction for installation is given to the rewrite target ECUs 19 having a cooperative operation relationship, the instruction for installation may be first given to the rewrite target ECU 19 that operates as a data transmission side, and the instruction for installation may be later given to the rewrite target ECU that operates as a data reception side.

The CGW 13 refers to the memory type in rewrite specification data and determines the installation order according to the memory type of the rewrite target ECU 19. For example, installation is performed in an order of a double-bank memory, a single-bank suspend memory, and a single-bank memory. The CGW 13 stores in advance which of a data transmission side and a data reception side the ECU is as information regarding the ECUs 19 having a cooperative operation relationship, and determines an installation order of the rewrite target ECUs 19 on the basis of the information.

In a case where there are a plurality of groups, an installation order may be determined on the basis of, for example, the degree of urgency, the degree of safety, a function, or a time. The degree of urgency is an index indicating whether or not it is necessary to perform immediate installation. The degree of urgency is high in a case where there is a high probability that man-made disasters or accidents may occur if the ECU is left without installation. The degree of urgency is low in a case where there is a low probability that man-made disasters or accidents may occur even if the ECU is left without installation. Installation is preferentially performed on a group having a high degree of urgency. The degree of safety is an index of the restriction due to the type of microcomputer at the time of installation, and installation is performed in an ascending order of restriction, that is, in an order of a double-bank memory, a single-bank suspend memory, and a single-bank memory. The function is an index of user's convenience, and installation is preferentially performed on a group that is more convenient to a user. The time is an index of the time required for installation, and installation is preferentially performed on a group requiring a short installation time.

In a case where the CGW 13 instructs the first rewrite target ECU 19 and the second rewrite target ECU 19 belonging to the same group to perform installation, when the first rewrite target ECU 19 succeeds in installation, and the second rewrite target ECU 19 fails in installation, the CGW 13 instructs the second rewrite target ECU 19 to perform rollback and instructs the first rewrite target ECU 19 to perform rollback.

In a case where the CGW 13 instructs the rewrite target ECU 19 belonging to the first group and the rewrite target ECU 19 belonging to the second group to perform installation, when the rewrite target ECU 19 belonging to the first group fails in installation, the CGW 13 instructs the rewrite target ECU 19 belonging to the second group to perform installation. For example, in FIG. 116, in a case where rewriting is performed in the second group (S1405: YES) in a state in which the rewrite target ECU 19 belonging to the first group fails in installation, the CGW 13 skips the activation request instruction process (S1408) for the first group and proceeds to step S1407. The CGW 13 returns to step S1403 and initiates to perform installation on the second group, and performs the activation request instruction process on the second group in a case where the installation has been completed (S1408). That is, even though the first group fails in update, the CGW 13 performs update on the second group.

In a case where there are two groups in a single campaign (within a single distribution package), the user's approval operation for the campaign and the user's approval operation for download are performed once, and the user's approval operation for installation and the user's approval operation for activation are performed twice for each group. That is, in a case where a function changed due to update differs for each group, it is desirable to perform the user's approval operation for installation and the user's approval operation for activation for each function. Since some users feel complicated about the user's approval operation for installation and the user's approval operation for activation for each group, the user's approval operation for installation and the user's approval operation for activation may be performed once for all groups.

Although the configuration in which a group to which the rewrite target ECU 19 belongs is determined by using the rewrite specification data has been exemplified, there may be a configuration in which a group to which the rewrite target ECU 19 belongs is stored in the CGW 13.

(15) Rollback Execution Control Process

The rollback execution control process will be described with reference to FIGS. 119 to 130. The vehicle program rewriting system 1 executes the rollback execution control process in the CGW 13. The rollback indicates writing for returning the memory of the rewrite target ECU 19 to a predetermined state, such as returning an application program to an original version, in a case where rewriting of the application program is stopped, and is to return a state of the rewrite target ECU 19 to a state before writing of write data is initiated from the viewpoint of the user.

Figure 119:
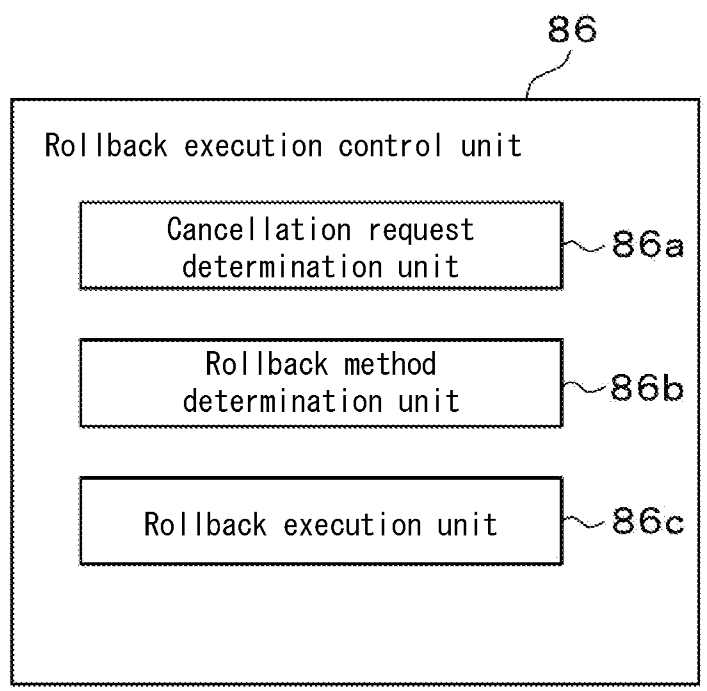
FIG. 119 is a functional block diagram of a rollback execution control unit.
Figure 120:
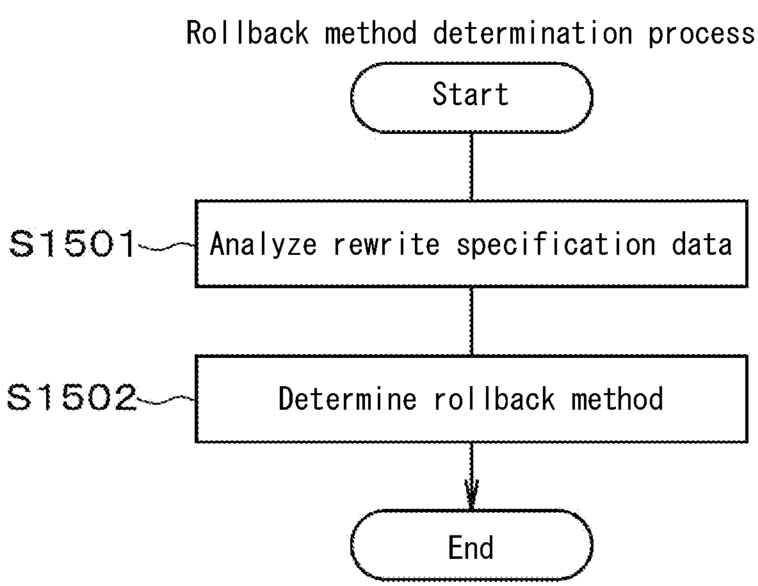
FIG. 120 is a flowchart illustrating a rollback method specifying process.
Figure 121:
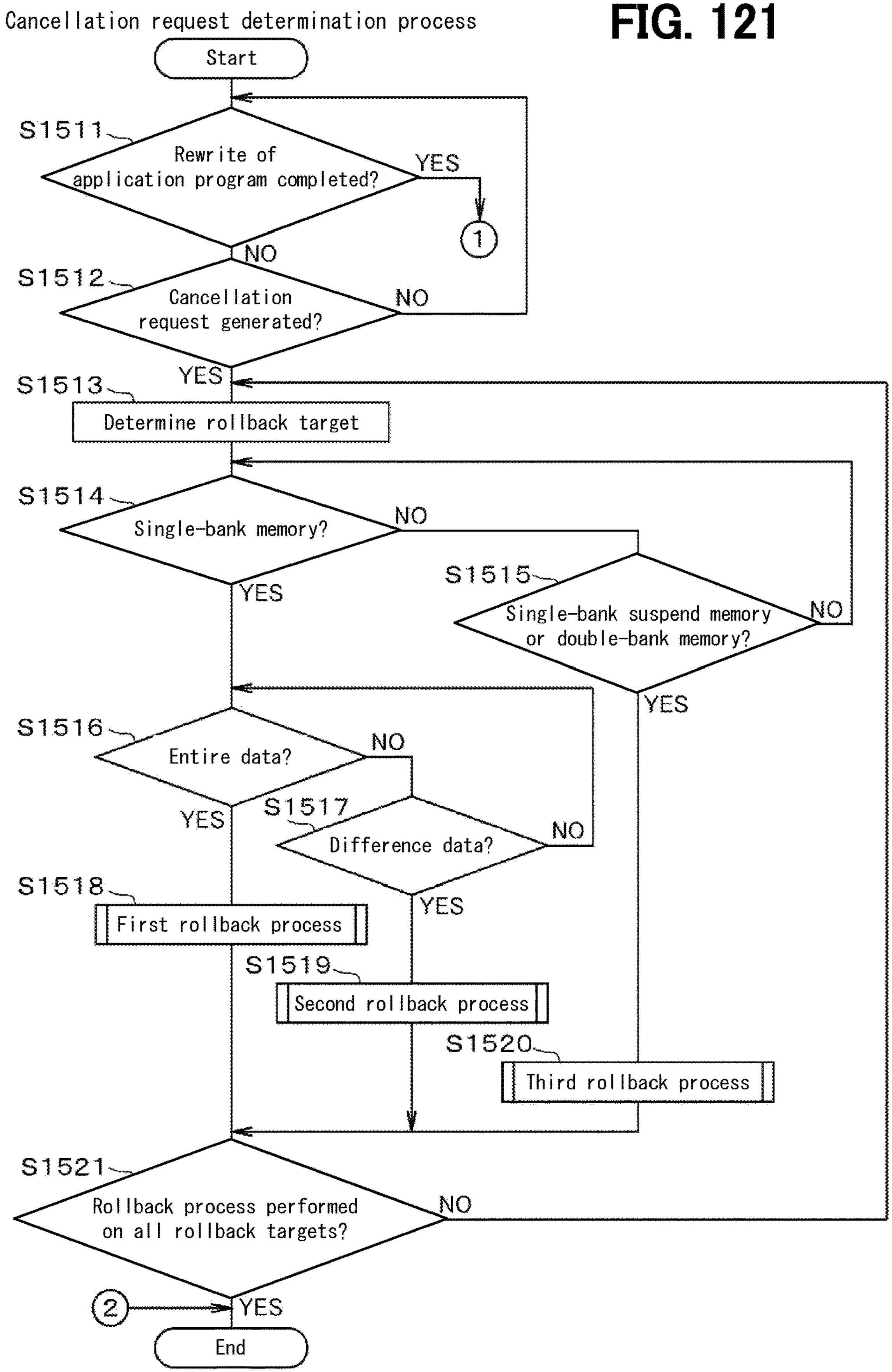
FIG. 121 is a flowchart illustrating a cancellation request determination process.
Figure 122:
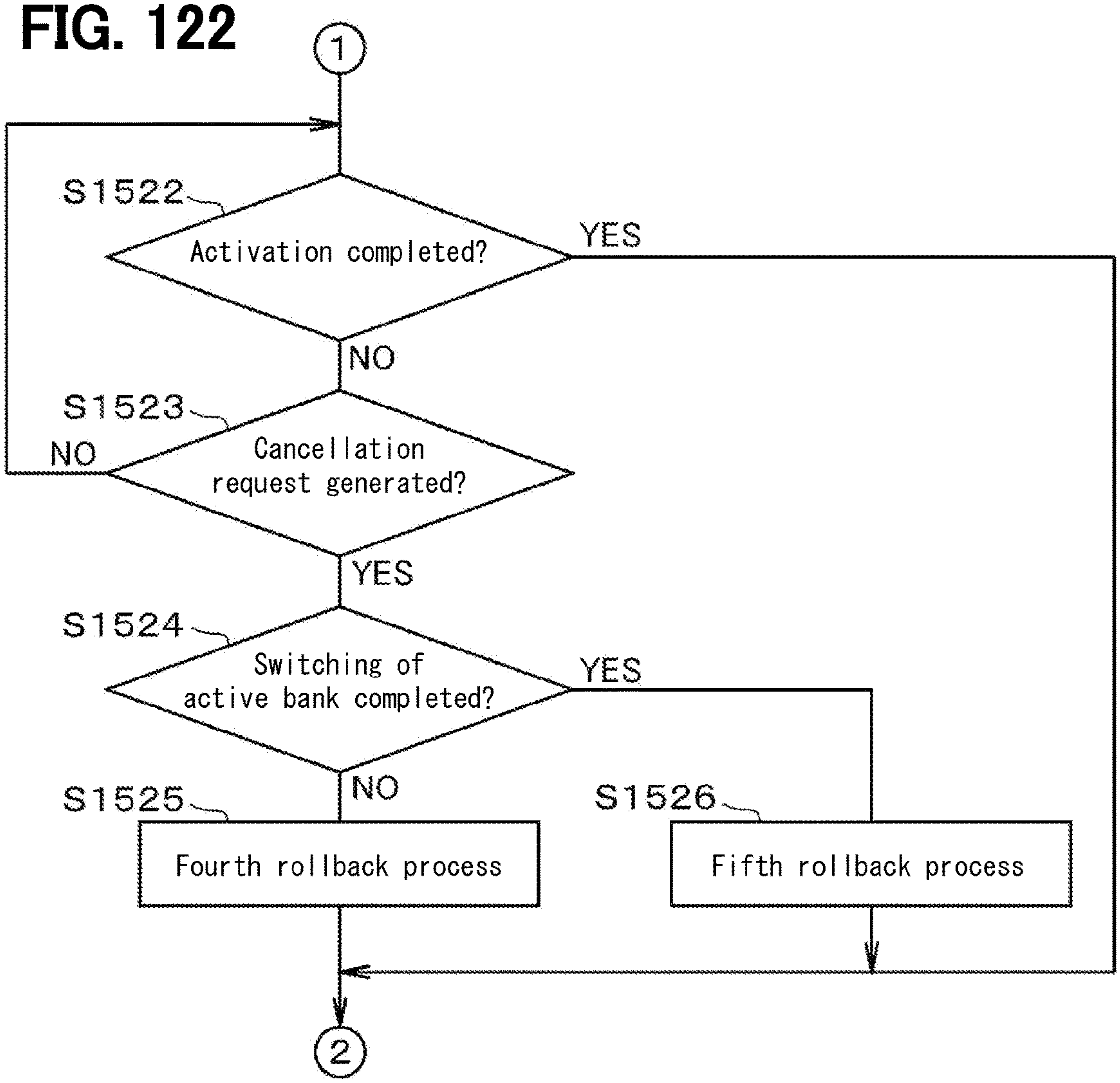
FIG. 122 is a flowchart illustrating the cancellation request determination process.
Figure 123:
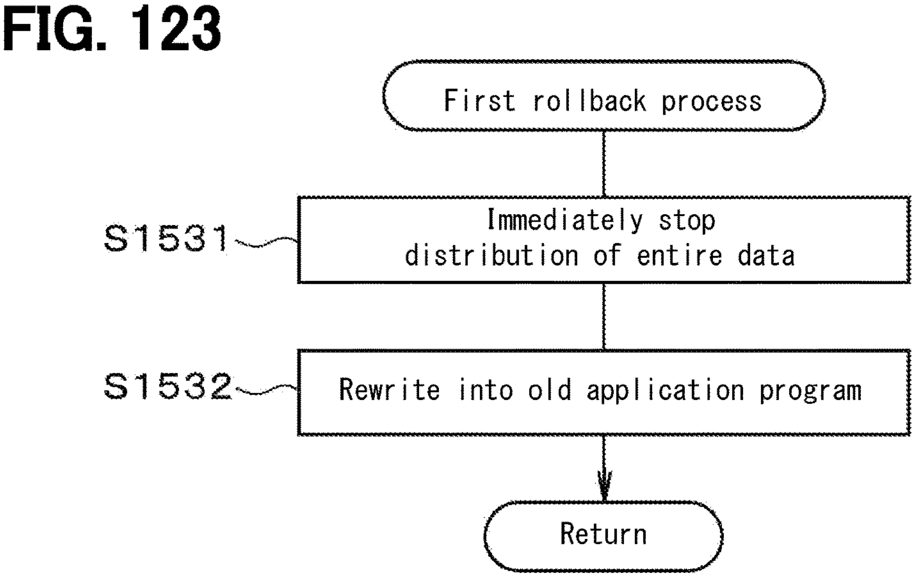
FIG. 123 is a flowchart illustrating the cancellation request determination process.
Figure 124:
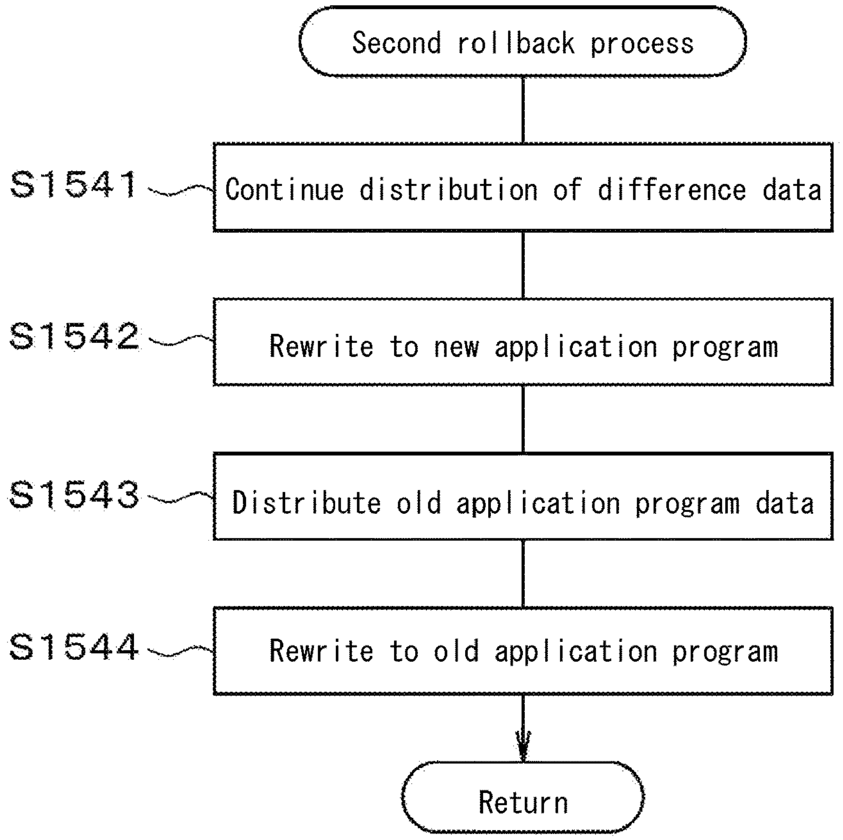
FIG. 124 is a flowchart illustrating the cancellation request determination process.
Figure 125:
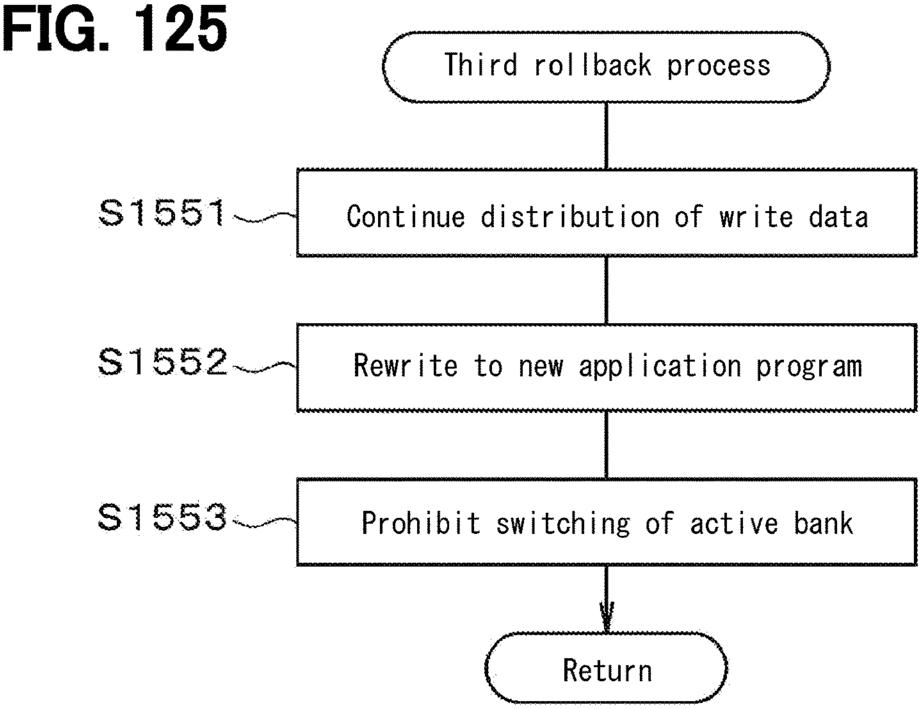
FIG. 125 is a flowchart illustrating the cancellation request determination process.

As illustrated in FIG. 119, the CGW 13 includes a cancellation request determination unit 86*a*, a rollback method specifying unit 86*b*, and a rollback execution unit 86*c* in the rollback execution control unit 86. The cancellation request determination unit 86*a* determines whether or not a rewrite cancellation request is generated during rewriting of an application program. For example, when the user operates the mobile terminal 6 and selects cancellation of program rewriting, the center device 3 that acquires information regarding the cancellation notifies the CGW 13 of a program rewrite cancellation request via the DCM 12.

In a case where an abnormality occurs in the system, when the center device 3 is notified of the abnormality in the system, the center device 3 notifies the CGW 13 of the program rewrite cancellation request via the DCM 12. The abnormality in the system is, for example, a case where a certain rewrite target ECU 19 succeeds in writing, but another rewrite target ECU 19 performing cooperative control with the certain rewrite target ECU 19 fails in writing. As mentioned above, when at least one of a plurality of rewrite target ECUs 19 performing cooperative control fails in writing, it is determined that the system is abnormal, and the center device 3 notifies the CGW 13 of the program rewrite cancellation request via the DCM 12 with respect to the rewrite target ECU 19 that has succeeds in writing. That is, causes of generation of the cancellation request include an operation performed by the user and the occurrence of an abnormality in the system.

The rollback method specifying unit 86*b* specifies a rollback method for returning a state of the rewrite target ECU 19 to a state before writing of write data is initiated according to the memory type of the flash memory mounted on the rewrite target ECU 19 and the data type of write data of a new program or an old program. That is, the rollback method specifying unit 86*b* specifies whether the flash memory is a single-bank memory, a single-bank suspend memory, or a double-bank memory as the memory type of the rewrite target ECU 19, and specifies whether the write data is the entire data or difference data as the data type of the write data.

The rollback method specifying unit 86*b* specifies a first rollback process, a second rollback process, or a third rollback process according to the memory type and the data type. When the rollback method is specified by the rollback method specifying unit 86*b*, the rollback execution unit 86*c* instructs the rewrite target ECU 19 to perform rollback in accordance with the rollback method, and operates the rewrite target ECU 19 with the old program. That is, the rollback execution unit 86*c* performs rollback for returning an operation state of the rewrite target ECU 19 to a state before rewriting of the application program is initiated.

Next, an operation of the rollback execution control unit 86 in the CGW 13 will be described with reference to FIGS. 120 to 130. The CGW 13 executes a rollback execution control program and thus performs the rollback execution control process. The CGW 13 performs a rollback method specifying process and a cancellation request determination process as the rollback execution control process. Each process will be described below.

(15-1) Rollback Method Specifying Process

When the rollback method specifying process is initiated, the CGW 13 analyzes the CGW rewrite specification data acquired from the DCM 12 (S1501), specifies a rollback method on the basis of an analysis result thereof (S1502), and finishes the rollback method specifying process. The CGW 13 acquires the memory type and the data type of a rollback program from the rewrite specification data illustrated in FIG. 8, and specifies a rollback method. The rollback method may be specified by using the data type of the new program when the data type is the same as that of the old program (rollback program).

That is, in a case where the flash memory of the rewrite target ECU 19 is a single-bank memory and the write data is the entire data, as a rollback method when a cancellation request is generated, the CGW 13 immediately stops distribution of the entire data, and specifies a method (first rollback process) in which data of the old application program is written into a rewrite area in the rewrite target ECU 19 to be rewritten into the old application program. The old application program (rollback rewrite data) for a single-bank memory is included in a distribution package along with an update program, and the CGW 13 distributes the old application program to the rewrite target ECU 19 in the same manner as in the new application program.

When the flash memory of the rewrite target ECU 19 is a single-bank memory and write data is difference data, as a rollback method when a cancellation request is generated, the CGW 13 continues distribution of the difference data, and specifies a method (second rollback process) in which the difference data is written into a rewrite area in the rewrite target ECU 19 to be rewritten into the new application program, then the difference data of the old application program is distributed, and the old data is written into the rewrite area in the rewrite target ECU 19 to be rewritten into the old application program.

In a case where write data is difference data, the rewrite target ECU 19 restores the new application program by using the current application program written in the flash memory and the difference data acquired from the CGW 13, and writes the new application program. In a state in which a different application program is written in the flash memory, the write target ECU 19 cannot restore the new application program by using the difference data. Thus, in a single-bank memory, it is necessary to perform a process of rewriting data into the new application program. Here, for example, when a version of the current application program is 1.0 and a version of the new application program is 2.0, a rewrite program (rewrite data) is difference data for updating the version 1.0 to the version 2.0, and rollback rewrite data is difference data for updating the version 2.0 to the version 1.0.

When the flash memory of the rewrite target ECU 19 is a single-bank suspend memory or a double-bank memory, the CGW 13 continues distribution of write data, and specifies a method (third rollback process) in which, when an active bank is the bank-A and an inactive bank is the bank-B in the rewrite target ECU 19, the write data is written into the bank-B that is the inactive bank such that the new application program is installed, but switching of the active bank from bank-A to bank-B is suppressed.

(15-2) Cancellation Request Determination Process

When it is specified that rewriting of an application program is initiated in the rewrite target ECU 19, the CGW 13 initiates the cancellation request determination process, determines whether or not the rewriting of the application program has been completed (S1511), and determines whether or not a cancellation request has been generated (S1512). That is, as described above, the CGW 13 determines whether or not the cancellation request has been generated due to an operation performed by the user, the occurrence of abnormality in the system, or the like.

When it determines that the cancellation request is generated before the rewriting of the application program has been completed, that is, the cancellation request is generated during installation (S1512: YES), the CGW 13 specifies the rewrite target ECU 19 that is a rollback target (S1513). It is assumed that the rewrite target ECUs 19 belonging to the same group are the ECU (ID1), the ECU (ID2), and the ECU (ID3), the ECU (ID1) is a single-bank memory, the ECU (ID2) and the ECU (ID3) are double-bank memories, installation in the ECU (ID1) has been completed, and a cancellation request is generated during installation in the ECU (ID2). In this case, the CGW 13 determines whether or not rollback is required for all of the rewrite target ECUs 19 belonging to the first group in S1413.

The CGW 13 specifies the ECU (ID1) in which the entire application program is rewritten and the ECU (ID2) in which a part of the application program is rewritten as rollback targets. The CGW 13 determines the memory type of the flash memories of the rewrite target ECUs 19 that are the specified rollback targets, and determines whether each flash memory is a single-bank memory, a single-bank suspend memory, or a double-bank memory (S1514 and S1515). When it is determined that the flash memory is a single-bank memory (S1514: YES), the CGW 13 determines the data type of the rollback program, and determines whether the rollback write data is the entire data or difference data (S1516 and S1517).

When it is determined that the rollback write data is the entire data (S1516: YES), the CGW 13 proceeds to the first rollback process (S1518; corresponding to a rollback execution procedure). When the first rollback process is initiated, the CGW 13 immediately stops distribution of the write data that is the new program (S1531). The CGW 13 acquires the rollback write data (old program) that is the entire data from the DCM 12 and distributes the rollback write data to the rewrite target ECU 19. The rewrite target ECU 19 writes the data of the old application program acquired from the CGW 13 into the flash memory such that the data is rewritten into the old application program (S1532), finishes the first rollback process, and returns to the cancellation request determination process.

When it is determined that the rollback write data is difference data (S1517: YES), the CGW 13 proceeds to the second rollback process (S1519; corresponding to a rollback execution procedure). When the second rollback process is initiated, the CGW 13 continues distribution of write data that is a new program (S1541), restores the difference data in the rewrite target ECU 19, and writes the difference data into the flash memory such that the difference data is rewritten into the new application program (S1542). The CGW 13 distributes the write data of the old application program acquired from the DCM 12 to the rewrite target ECU 19 after rewriting into the new application program has been completed (S1543). The difference data that is the write data of the old application program is restored in the rewrite target ECU 19, and is written into the flash memory to be rewritten into the old application program (S1544), and the CGW 13 finishes the second rollback process and returns to the cancellation request determination process.

When it is determined that the rewrite target ECU 19 is a single-bank suspend memory ECU or a double-bank memory ECU (S1515: YES), the CGW 13 proceeds to the third rollback process (S1520; corresponding to a rollback execution procedure). In this case, the CGW 13 proceeds to the third rollback process regardless of the rewrite data type.

Figure 126:
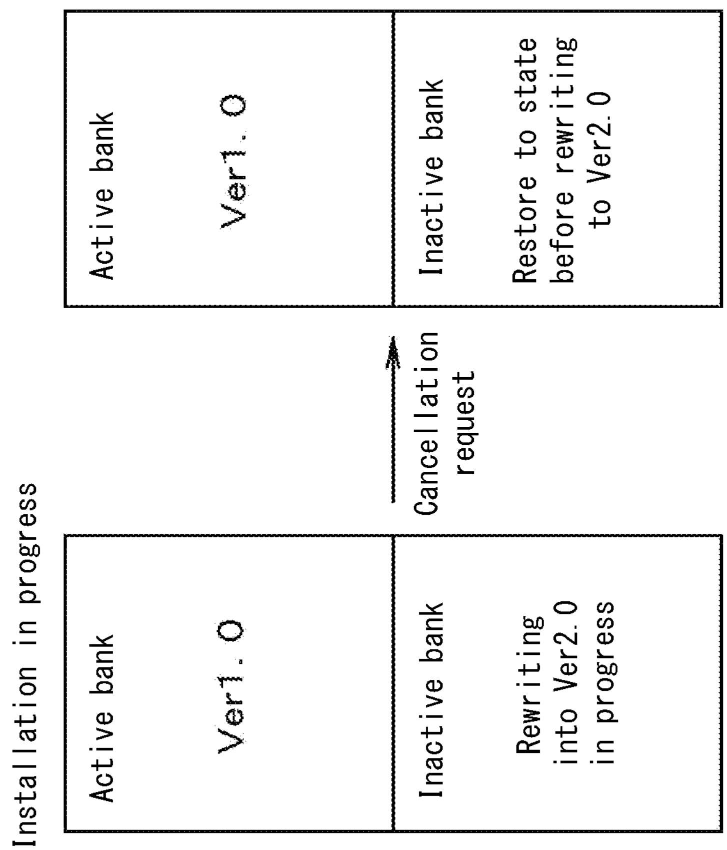
FIG. 126 is a diagram illustrating an aspect of executing rollback.

When the third rollback process is initiated, the CGW 13 continues distribution of write data (S1551), writes the write data into an inactive bank (bank-B) in the rewrite target ECU 19 such that the write data is rewritten into the new application program (S1552). The CGW 13 suppresses switching of an active bank from the old bank (active bank: bank-A) to the new bank (inactive bank: bank-B) (S1553), finishes the third rollback process, and returns to the cancellation request determination process. In addition to suppressing the switching of the active bank, the CGW 13 may roll back the inactive bank in which the version 2.0 is written to a state (for example, the version 1.0) before rewriting into the new application program, as illustrated in FIG. 126.

When the CGW 13 returns to the cancellation request determination process, the CGW 13 determines whether or not the rollback process has been performed on all the rewrite target ECUs 19 that are the rollback targets (S1521). For example, in the exemplified case where the rewrite target ECUs 19 are the ECU (ID1), the ECU (ID2), and the ECU (ID3), first, the CGW 13 performs the first rollback process or the second rollback process on the single-bank memory ECU (ID1) in which installation was being performed, according to the rollback data type. Thereafter, the CGW 13 performs the third rollback process on the double-bank memory ECU (ID2) in which installation has been completed.

The CGW 13 performs the first rollback process or the second rollback process on the single-bank memory ECU (ID1) according to the rewrite data type. When it is determined that the rollback process has not been performed on all the rewrite target ECUs 19 that are the rollback targets (S1521: NO), the CGW 13 returns to step S1513 and repeatedly performs step S1513 and the subsequent steps. When it is determined that the rollback process has been performed on all the rewrite target ECUs 19 that are rollback targets (S1521: YES), the CGW 13 finishes the cancellation request determination process. The CGW 13 simultaneously instructs the ECU (ID1), the ECU (ID2), and the ECU (ID3) belonging to the first group on which the rollback process has been performed, to activate the old application programs. The ECU (ID1) having a single-bank memory switches to the old application program through restart. The ECU (ID2) and the ECU (ID3) having double-bank memories are started in the same active bank (bank-A) as before instead of the inactive bank (bank-B) in which the update program is written. When the user's intention changes and the program update is executed again, the new application program is written in the ECU (ID1) and the ECU (ID3). However, since the new application program has already been installed in the inactive bank of the ECU (ID2), writing is omitted.

When it is determined that rewriting of the application program has been completed without the cancellation request being generated (S1511: YES), the CGW 13 determines whether activation has been completed (S1522), and determines whether the cancellation request has been generated (S1523).

When it is determined that the cancellation request has been generated before completion of the activation, that is, the cancellation request has been generated during the activation (S1523: YES), the CGW 13 determines whether or not an activation instruction has reached the rewrite target ECU 19, and determines whether or not switching of the active bank has been completed (S1524).

Figure 127:
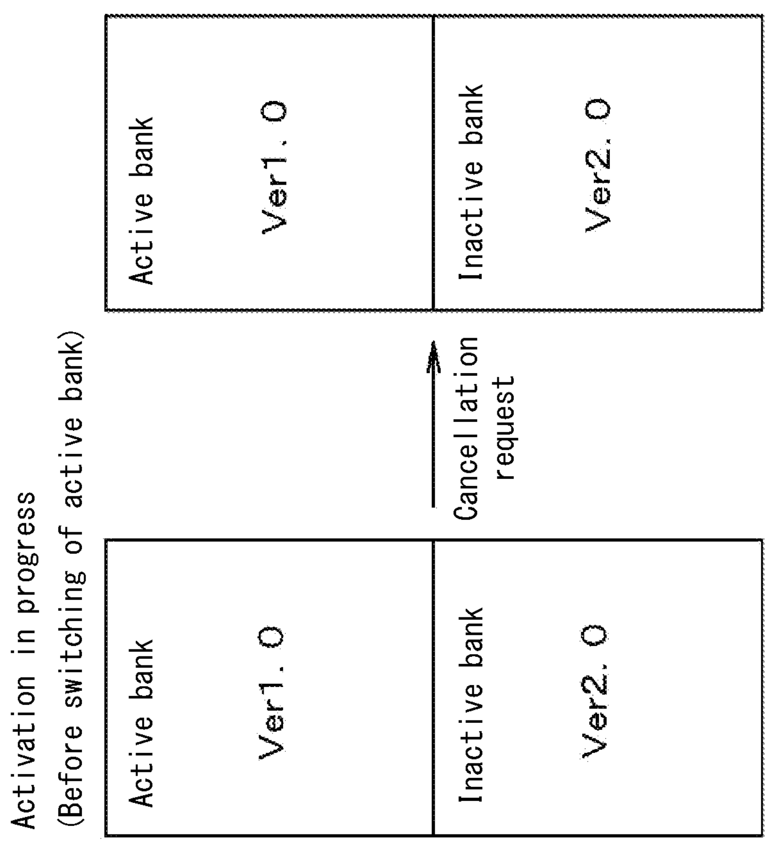
FIG. 127 is a diagram illustrating an aspect of executing the rollback.
Figure 128:
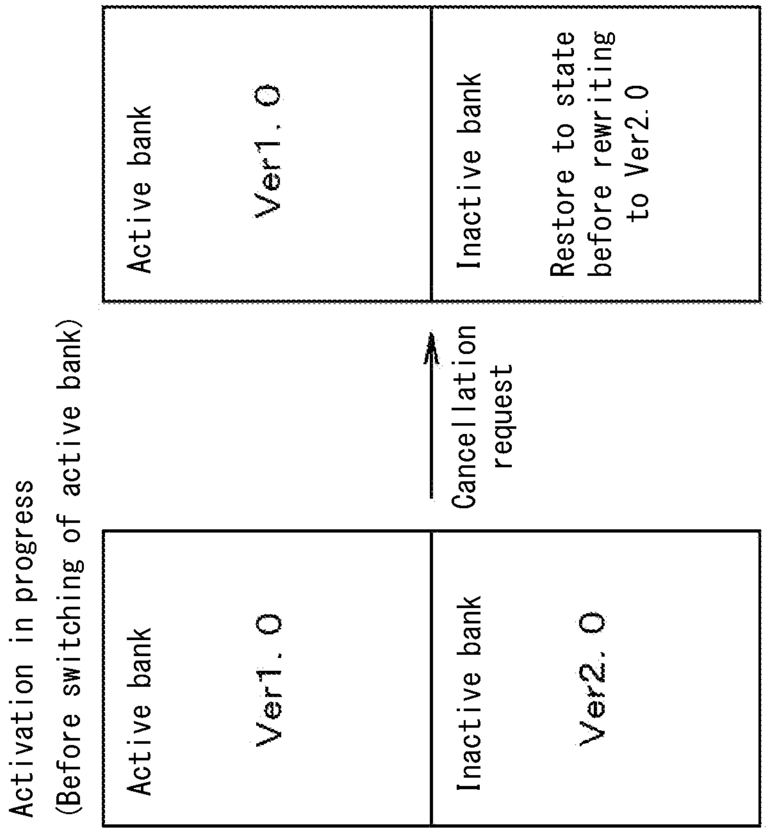
FIG. 128 is a diagram illustrating an aspect of executing the rollback.

When it is determined that the activation instruction has not reached the rewrite target ECU 19 and that the switching of the active bank is not completed (S1524: NO), the CGW 13 performs a fourth rollback process (S1525). It is assumed that the CGW 13 does not switch the active bank as the fourth rollback process. Alternatively, the CGW 13 may return the inactive bank to a state before rewriting into the new application program without switching the active bank. When the active bank is not switched, the CGW 13 uses a bank in which the version 1.0 is written as the active bank, and uses a bank in which the version 2.0 is written as the inactive bank, as illustrated in FIG. 127. When the inactive bank is returned to the state before rewriting into the new application program without switching the active bank, the CGW 13 uses the bank in which the version 1.0 is written as the active bank, and rolls back the inactive bank that is a bank in which the version 2.0 is written, to a state (version 1.0) before rewriting into the new application program, as illustrated in FIG. 128.

Figure 129:
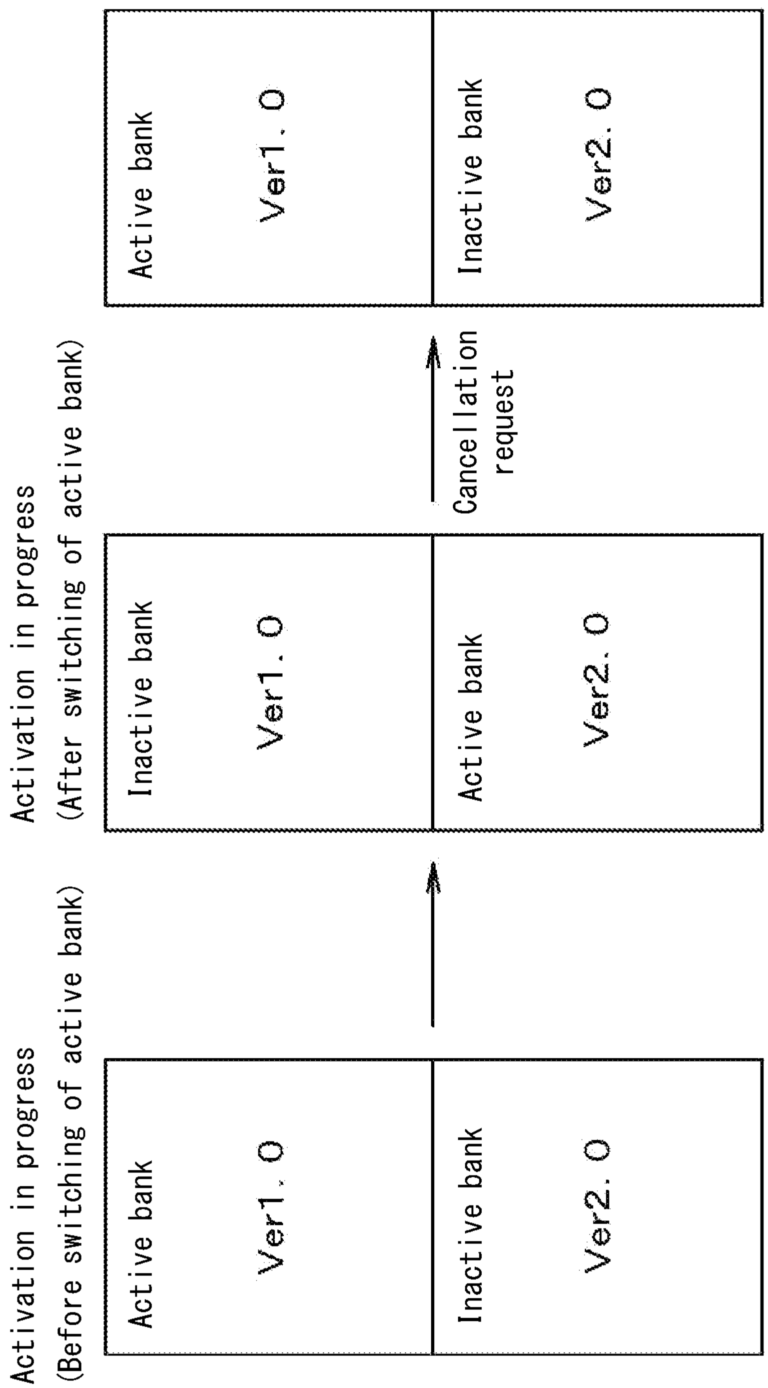
FIG. 129 is a diagram illustrating an aspect of executing the rollback.
Figure 130:
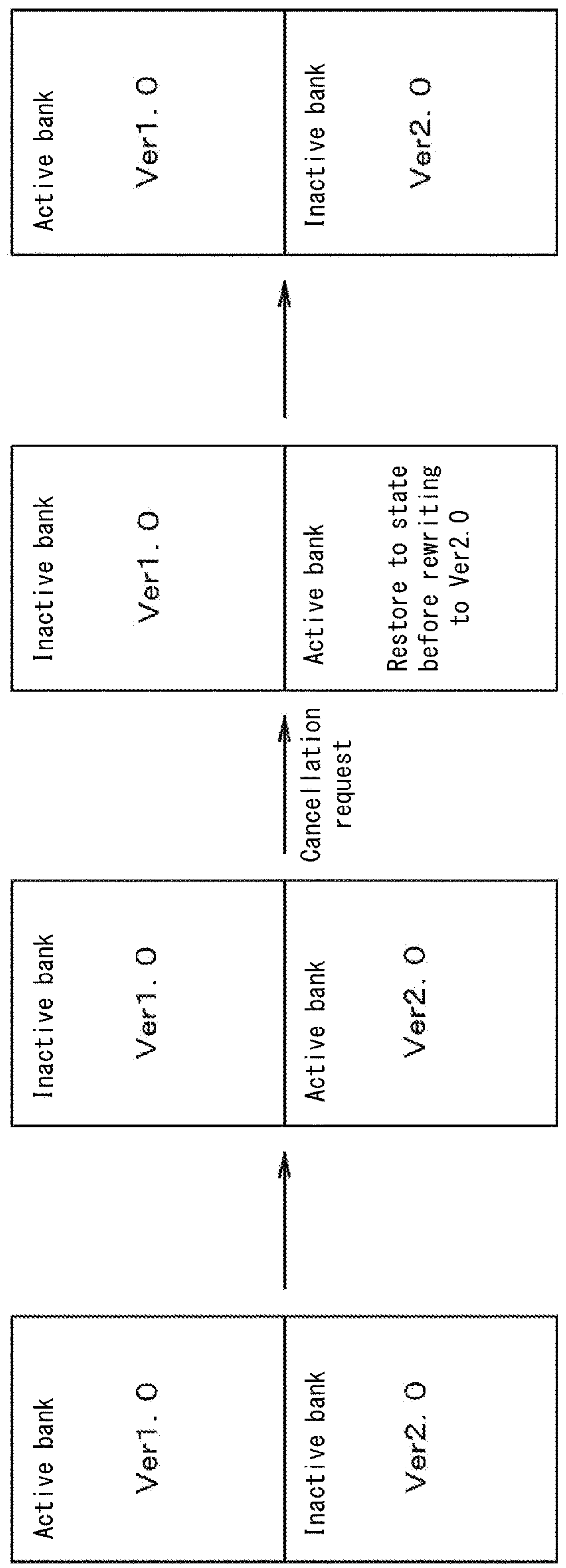
FIG. 130 is a diagram illustrating an aspect of executing the rollback.

When it is determined that the activation instruction has reached the rewrite target ECU 19 and switching of the active bank has been completed (S1524: YES), the CGW 13 performs a fifth rollback process. The completion of switching of the active bank indicates a state in which a bank in which the version 2.0 is written switches from the inactive bank to the active bank, and a bank of the version 1.0 switches from the active bank to the inactive bank, as illustrated in FIG. 129. As the fifth rollback process, the CGW 13 switches the active bank, or switches the active bank after returning the inactive bank to the state before rewriting into the new application program. In a case where switching the active bank, the CGW 13 switches the bank in which the version 2.0 is written from the active bank to the inactive bank, and switches the bank in which the version 1.0 is written from the inactive bank to the active bank, as illustrated in FIG. 129. In a case of switching the active bank after returning the inactive bank to the state before rewriting into the new application program, as illustrated in FIG. 130, the CGW 13 rolls back the active bank that is the bank in which the version 2.0 is written, to the state (for example, the version 1.0) before rewriting into the new application program, switches the bank that is returned to the state before rewriting into the new application program from the active bank to the inactive bank, and switches the bank in which the version 1.0 is written from the inactive bank to the active bank.

As described above, the CGW 13 performs the rollback execution control process, and, thus, when a rewrite cancellation request is generated during rewriting of an application program, the CGW 13 returns an operation state of the rewrite target ECU 19 to a state before rewriting of the application program is initiated from the viewpoint of the user. Thus, all the rewrite target ECUs 19 belonging to the same group can be returned to original program versions together. Even in a case where difference data is used in the next program update, write data can be correctly restored.

(16) Rewrite Progress Situation Display Control Process

The rewrite progress situation display control process will be described with reference to FIGS. 131 to 143. The vehicle program rewriting system 1 performs the rewrite progress situation display control process in the CGW 13. In order to inform the user of an application program rewrite progress situation, the mobile terminal 6 and the in-vehicle display 7 as the display terminal 5 display a progress situation. The progress situation to be displayed includes not only a case where a program is updated but also a case where the program is rolled back due to, for example, a cancellation operation performed by the user or an update failure.

Figure 131:
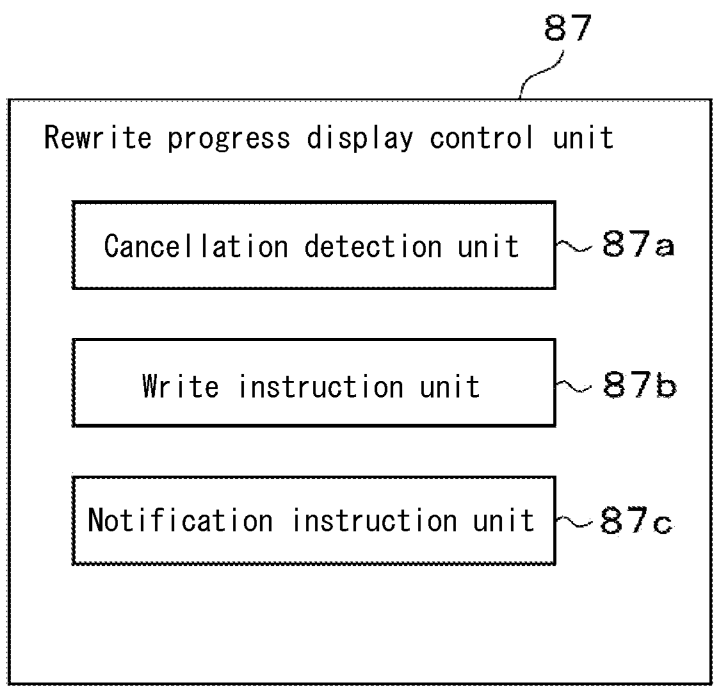
FIG. 131 is a functional block diagram of a rewrite progress situation display control unit.
Figure 132:
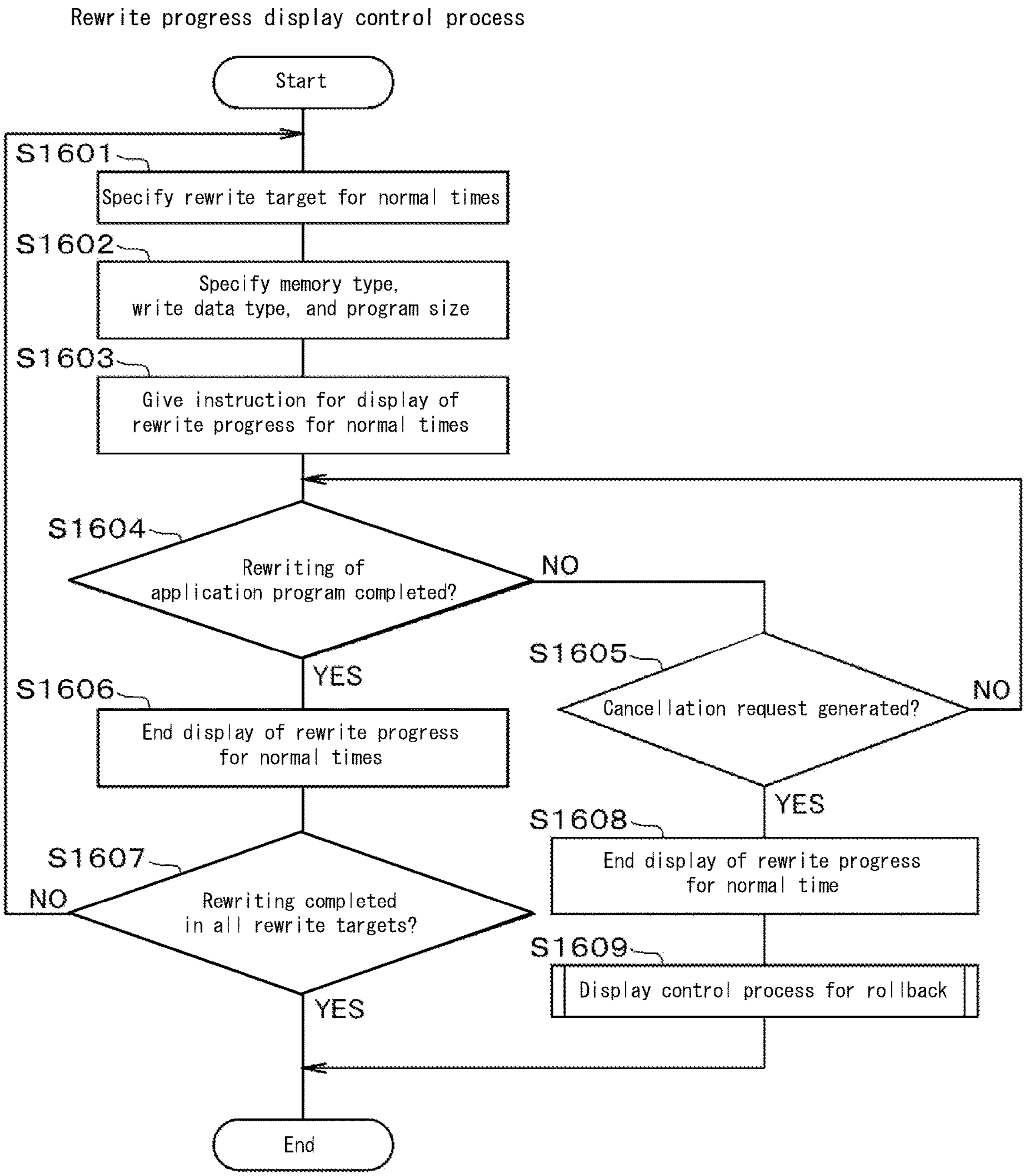
FIG. 132 is a flowchart illustrating a rewrite progress situation display control process.
Figure 133:
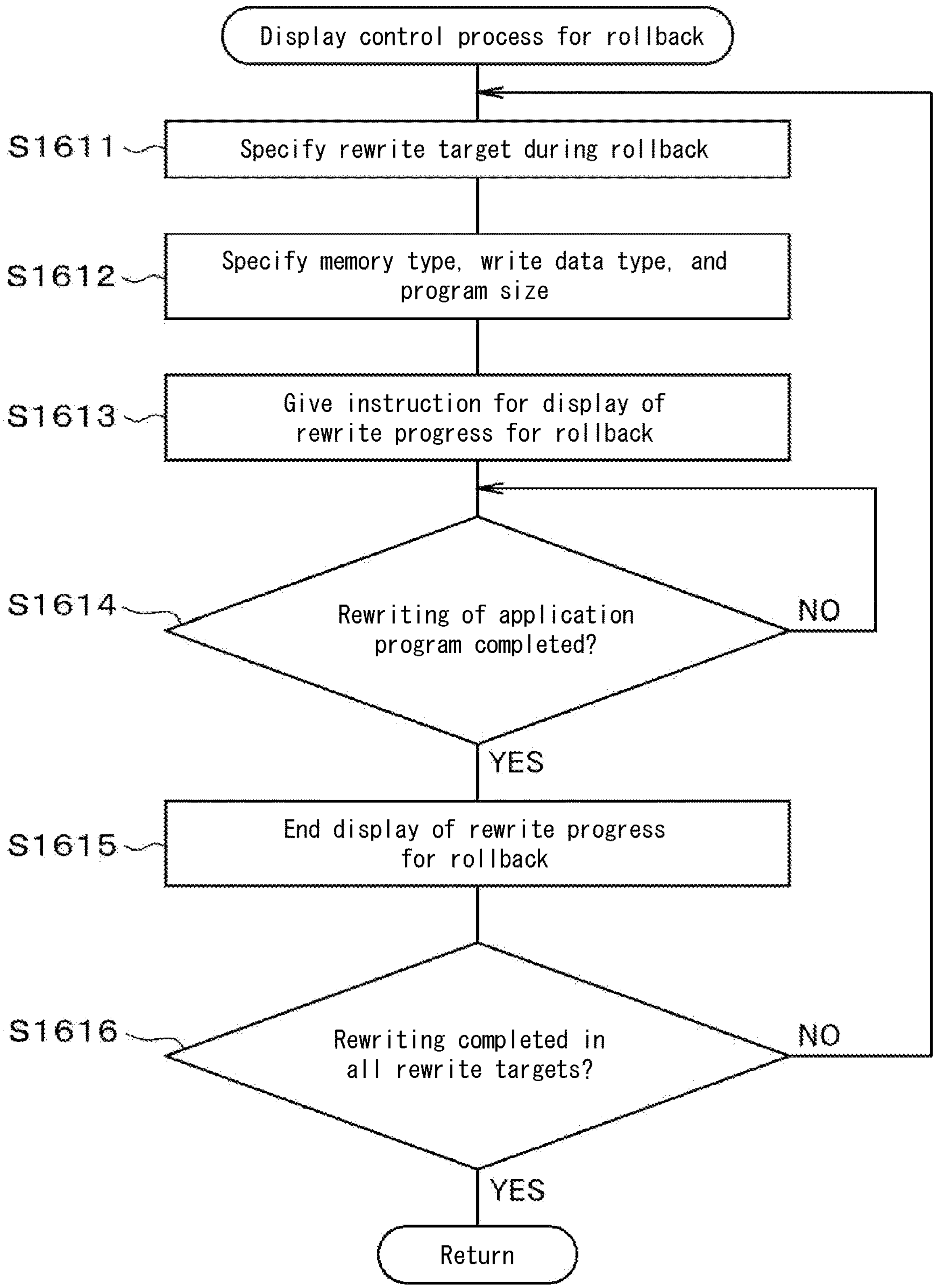
FIG. 133 is a flowchart illustrating the rewrite progress situation display control process.

As illustrated in FIG. 131, the CGW 13 includes a cancellation detection unit 87*a*, a write instruction unit 87*b*, and a notification instruction unit 87*c* in the rewrite progress situation display control unit 87. The cancellation detection unit 87*a* detects cancellation regarding rewriting of a program for rewriting first write data stored in the rewrite target ECU 19 with second write data acquired from the center device 3. The cancellation detection unit 87*a* detects a cancellation operation performed by the user or an error such as a failure in writing into the rewrite target ECU 19. The cancellation detection unit 87*a* performs a rollback process even in a case where a predetermined abnormality is detected, such as a case where write data is incompatible with the rewrite target ECU 19, a case where falsification of the write data is detected, or a case where an error of writing into the rewrite target ECU 19 occurs, and thus detection of these abnormalities is also treated as detection of cancellation.

The write instruction unit 87*b* distributes the second write data to the rewrite target ECU 19 and instructs the rewrite target ECU 19 to write the second write data. The notification instruction unit 87*c* gives an instruction for a notification of a progress situation related to rewriting of an application program. The notification instruction unit 87*c* gives an instruction for a notification of the progress situation related to rewriting of the application program in a first aspect while the second write data is being distributed by the write instruction unit 87*b*, and gives an instruction for a notification of the progress situation related to the rewriting of the application program in a second aspect when the cancellation detection unit 87*a* detects cancellation. When cancellation is detected by the cancellation detection unit 87*a* while the second write data is being distributed, the write instruction unit 87*b* continues distribution of the second write data.

The CGW 13 specifies rewriting of the application programs in the rewrite target ECU 19 by specifying an internal state of the rewrite target ECU 19, specifying an instruction from the center device 3, or specifying the user operation. When the rewriting of the application program is specified, the CGW 13 determines whether the rewriting is rewriting (installation) during the normal time or rewriting (uninstallation) during rollback. When it is determined whether the rewriting is rewriting during the normal time or rewriting is performed during rollback by specifying the internal state of the rewrite target ECU 19, specifying the instruction from the center device 3, and specifying the user operation, the CGW 13 calculates a progress situation of rewriting during the normal time or during rollback on the basis of the determination result, and instructs the display terminal 5 to display the calculated progress situation.

The CGW 13 instructs the display terminal 5 to display the progress situation during the normal time or the progress situation during rollback in accordance with the rewrite determination result indicating whether the rewriting is rewriting during the normal time or rewriting during rollback. The CGW 13 gives an instruction such that progress display indicating the progress situation of the rewriting during the normal time is displayed to be differentiated from progress display indicating the progress situation of the rewriting during rollback. That is, the CGW 13 displays the progress situation in the first aspect in a case of the rewriting during the normal time, and displays the progress situation in the second aspect different from the first aspect in a case of the rewriting during rollback. The CGW 13 differentiates the progress display during the normal time from the progress display during rollback by differentiating characters, items, colors, numerical values, flashing, and the like on a display screen between the normal time and the rollback time, as an aspect related to display when a progress situation is displayed. The CGW 13 differentiates progress display during the normal time from progress display during rollback by differentiating sounds, vibrations, and the like between the normal time and the rollback time, as an aspect other than the display at the time of displaying the progress display.

Next, an operation of the CGW 13 will be described with reference to FIGS. 132 to 143. The CGW 13 executes a rewrite progress situation display control program and thus performs the rewrite progress situation display control process.

When a rewrite initiation signal indicating that rewriting of a program has been initiated in the rewrite target ECU 19 is received (when installation of the program is initiated in the rewrite target ECU 19), the CGW 13 initiates the rewrite progress situation display control process. When rewrite progress situation display control process is initiated, the CGW 13 analyzes the CGW rewrite specification data, specifies the memory type and the write data type of the flash memory of the rewrite target ECU 19, and specifies the rewrite target ECU 19 during the normal time (S1601). When the memory type and the write data type of the flash memory of the rewrite target ECU 19, and a size of an update program are specified (S1602), the CGW 13 calculates a rewrite progress situation during the normal time according to the specified result, and gives an instruction for display of the rewrite progress situation during the normal time (S1603). The display terminal 5 displays rewrite progress situation in a rewrite display aspect during the normal time in response to the instruction from the CGW 13.

The CGW 13 determines whether or not rewriting of the application program has been completed (S1604), and determines whether or not a cancellation request has been generated (S1605; corresponding to a cancellation detection procedure). The CGW 13 repeatedly performs S1604 and S1605, and updates and displays a progress situation at any time, for example, during installation in the rewrite target ECU (ID1).

When a rewrite completion signal indicating that the rewriting of the application program has been completed in the rewrite target ECU 19 is received, and it is determined that the rewriting of the application program has been completed without a cancellation request being generated (S1604: YES), the CGW 13 finishes the display of the rewrite progress situation during the normal state (S1606), and determines whether or not rewriting has been completed in all the rewrite target ECUs 19 (S1607). For example, when installation has been completed in the rewrite target ECU (ID1), the CGW 13 displays the progress situation of the ECU (ID1) as 100%. When it is determined that rewriting is not completed yet in all the rewrite target ECUs 19 (S1607: NO), the CGW 13 returns to step S1601 and repeatedly performs step S1601 and the subsequent steps. The CGW 13 performs progress display related to the rewrite target ECU (ID2) subjected to next installation, for example, after S1601.

When it is determined that the cancellation request has been generated before completion of rewriting of the application program (S1605: YES), the CGW 13 finishes the display of the rewrite progress situation during the normal time (S1608), and proceeds to a display control process during rollback (S1609; corresponding to a notification instruction procedure). Here, the cancellation request includes a cancellation request made by the user, and a cancellation request made by the system based on a failure in writing into the rewrite target ECU 19 or the like.

When the display control process during rollback is initiated, the CGW 13 specifies the rewrite target ECU 19 during rollback (S1611), and specifies the memory type of the flash memory of the rewrite target ECU 19 during rollback, and the data type and a size of a rollback program (S1612). The CGW 13 performs a process, for example, assuming that the rewrite target ECUs 19 belonging to the same group are the ECU (ID1), the ECU (ID2), and the ECU (ID3), installation has been completed in the ECU (ID1) and the ECU (ID2), and a cancellation request has been generated during installation in the ECU (ID3). In this case, the CGW 13 specifies whether or not rollback is required and a rollback method according to the memory type and the write data type of each rewrite target ECU 19.

The CGW 13 specifies the memory type and the write data type of the flash memory of the rewrite target ECU 19 that is a rollback target, and specifies whether or not rollback is required and a rollback method (the first rollback process in S1518, the second rollback process in S1519, and the third rollback process in S1520). The CGW 13 calculates a progress situation according to the specified result, displays the progress situation, and gives an instruction for display of a rewrite progress situation during rollback (S1613). An amount of write data in the CGW 13 differs depending on the first to third rollback processes. Thus, the CGW 13 determines a total amount of write data according to the first to third rollback processes, and calculates the progress (how much of the data has been written) on the basis of a ratio of an amount of written data. The CGW 13 determines whether or not rewriting as the rollback process of the application program has been completed (S1614).

The CGW 13 distributes the write data to the rewrite target ECU 19 until the rewriting as the rollback process has been completed, and repeatedly performs the above-described progress calculation and display instruction. In S1613, the CGW 13 displays the calculated progress situation in a display aspect during rollback. In S1614, the CGW 13 determines whether or not the rollback for the ECU (ID3) in which rewriting was being performed is normally completed.

When it is determined that the rollback for the rewrite target ECU 19 that is a rollback target has been completed (S1614: YES), the CGW 13 finishes displaying the rewrite progress situation during rollback (S1615). For example, the CGW 13 continues to display that rollback has been completed by 100% for the ECU (ID3).

The CGW 13 determines whether or not rewriting during rollback has been completed in all rollback target ECUs 19 (S1616). When it is determined that rewriting during rollback is not completed for all the rollback target ECUs 19 (S1616: NO), the CGW 13 returns to step S1611 and repeatedly performs step S1611 and the subsequent steps.

For example, in a case where the ECU (ID1) in which installation has been completed is a single-bank memory, the CGW 13 displays the rewrite progress situation during rollback (S1613). On the other hand, for example, in a case where the ECU (ID2) in which installation has been completed is a double-bank memory and does not require rollback, the ECU (ID2) is excluded from a rewrite target during rollback. When the rollback for the ECU (ID3) and the ECU (ID1) has been completed, rewriting in the rewrite target ECUs 19 that are all rollback targets has been completed (S1616: YES), and the CGW 13 finishes the display control process during rollback.

In the above description, the CGW 13 performs the display control process during rollback, but the in-vehicle display ECU 7 or the center device 3 may be configured to perform the display control process during rollback while acquiring necessary information from the CGW 13. There may be a configuration in which the CGW 13 performs rewriting during rollback, progress calculation, and the like, and the in-vehicle display ECU 7 or the center device 3 performs display control during rollback. That is, there is no limitation to the configuration in which only the CGW 13 has the function of the display control device, and the function of the display control device may be distributed between the CGW 13 and the in-vehicle display ECU 7, or the function of the display control device may be distributed between the CGW 13 and the center device 3.

Figure 134:
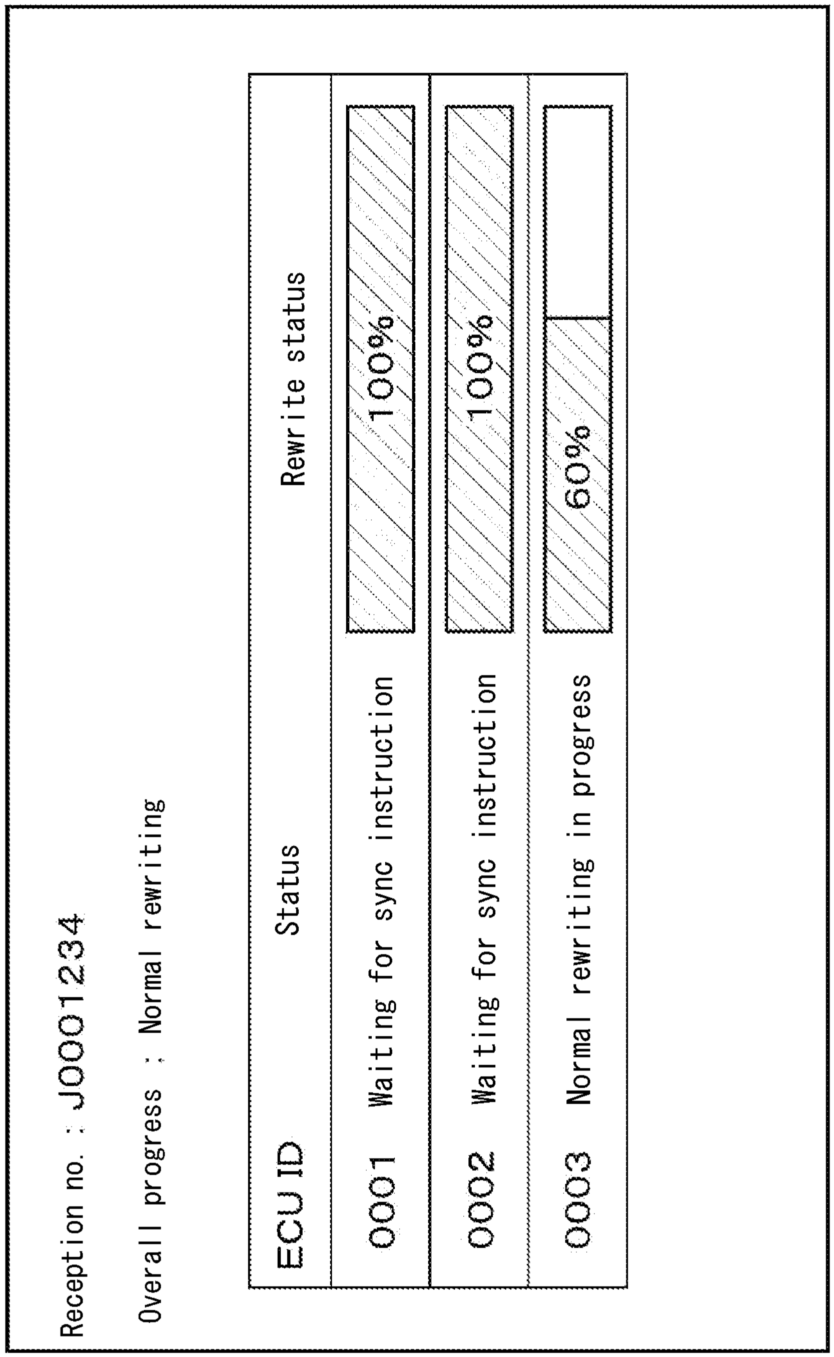
FIG. 134 is a diagram illustrating a rewrite progress situation screen.

Hereinafter, display of a rewrite progress situation will be described with reference to FIGS. 134 to 142. As illustrated in FIG. 134, the display terminal 5 displays the overall progress situation as "normal rewriting" in display of the rewrite progress situation during the normal time, and thus allows the user to recognize that the display is display of the rewrite progress situation during the normal time. The "normal rewriting" may be displayed as "installation". As a first aspect, the display terminal 5 displays the rewrite progress situation during the normal time.

The display terminal 5 displays the progress state as "waiting for synchronization instruction" for the rewrite target ECU 19 that completes rewriting of an application program and is waiting for a synchronization instruction for activating the update program, and displays the progress state as "normal rewriting" for the rewrite target ECU 19 that is rewriting an application program. The "waiting for synchronization instruction" may be displayed as "waiting for activation". The "normal rewriting in progress" may be displayed as "installation in progress". FIG. 134 exemplifies a case where the ECU (ID0001) and the ECU (ID0002) have completed rewriting of application programs and are waiting for a synchronization instruction, and the ECU (ID0003) is in a normal-rewriting-in-progress state.

Figure 135:
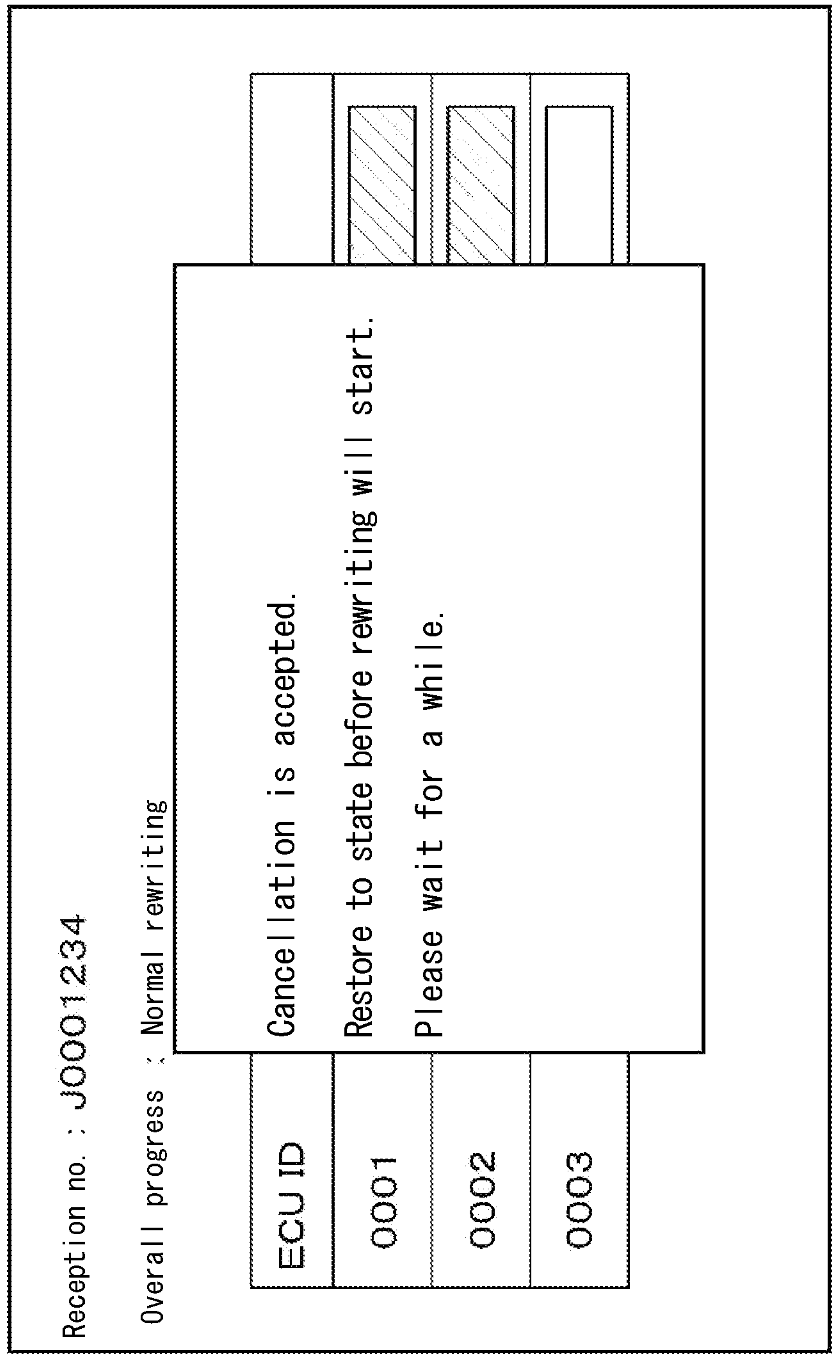
FIG. 135 is a diagram illustrating the rewrite progress situation screen.

When a cancellation request is generated in this state, for example, as illustrated in FIG. 135, the display terminal 5 displays a pop-up message "cancellation has been received; the state before rewriting is restored; and please wait for a while", and thus allows the user to recognize that the cancellation has been received. As a second aspect, the display terminal 5 performs display indicating that cancellation has been received.

Figure 136:
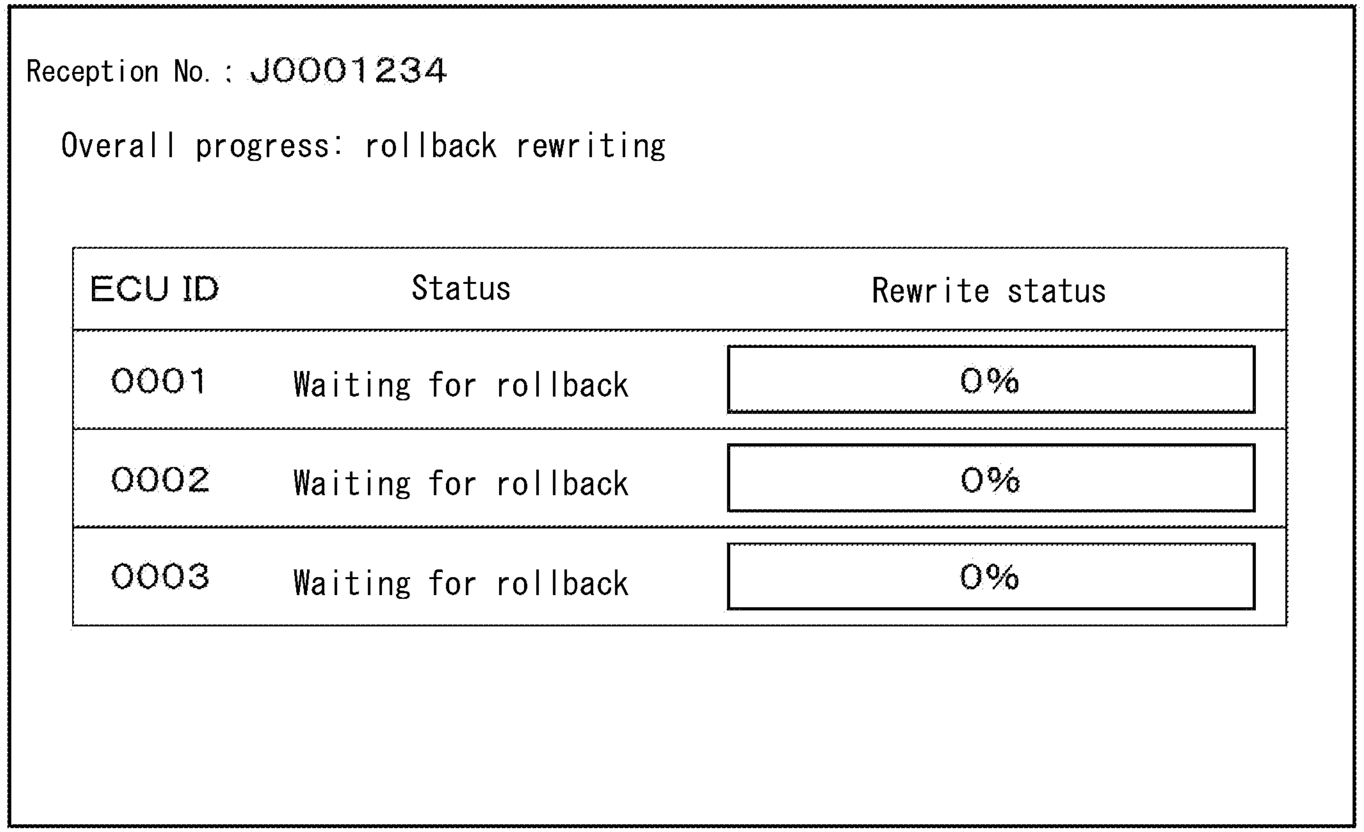
FIG. 136 is a diagram illustrating the rewrite progress situation screen.

When the CGW 13 prepares for rewriting during rollback, the display terminal 5 displays the entire progress situation as "rollback rewrite" as illustrated in FIG. 136, and allows the user to recognize that the display is a display of the rewrite progress situation during rollback. The "rollback rewrite" may be displayed as "uninstallation". The display terminal 5 displays the progress situation of all the rewrite target ECUs 19 as "waiting for rollback", and displays a numerical value of a progress graph indicating the rewrite progress situation as "0%". The "waiting for rollback" may be displayed as "waiting for uninstallation". Here, the ECU (ID0001) and the ECU (ID0002) are examples of single-bank memory ECUs and the ECU (ID0003) is an example of a double-bank memory ECU, and rollback is required for the ECU (ID0001) and the ECU (ID0002) in which installation has been completed in addition to the ECU (ID0003) in which rewriting was being performed. FIG. 136 illustrates an aspect in which one overall progress situation is displayed, and the progress situation of each rewrite target ECU 19 is displayed.

Figure 138:
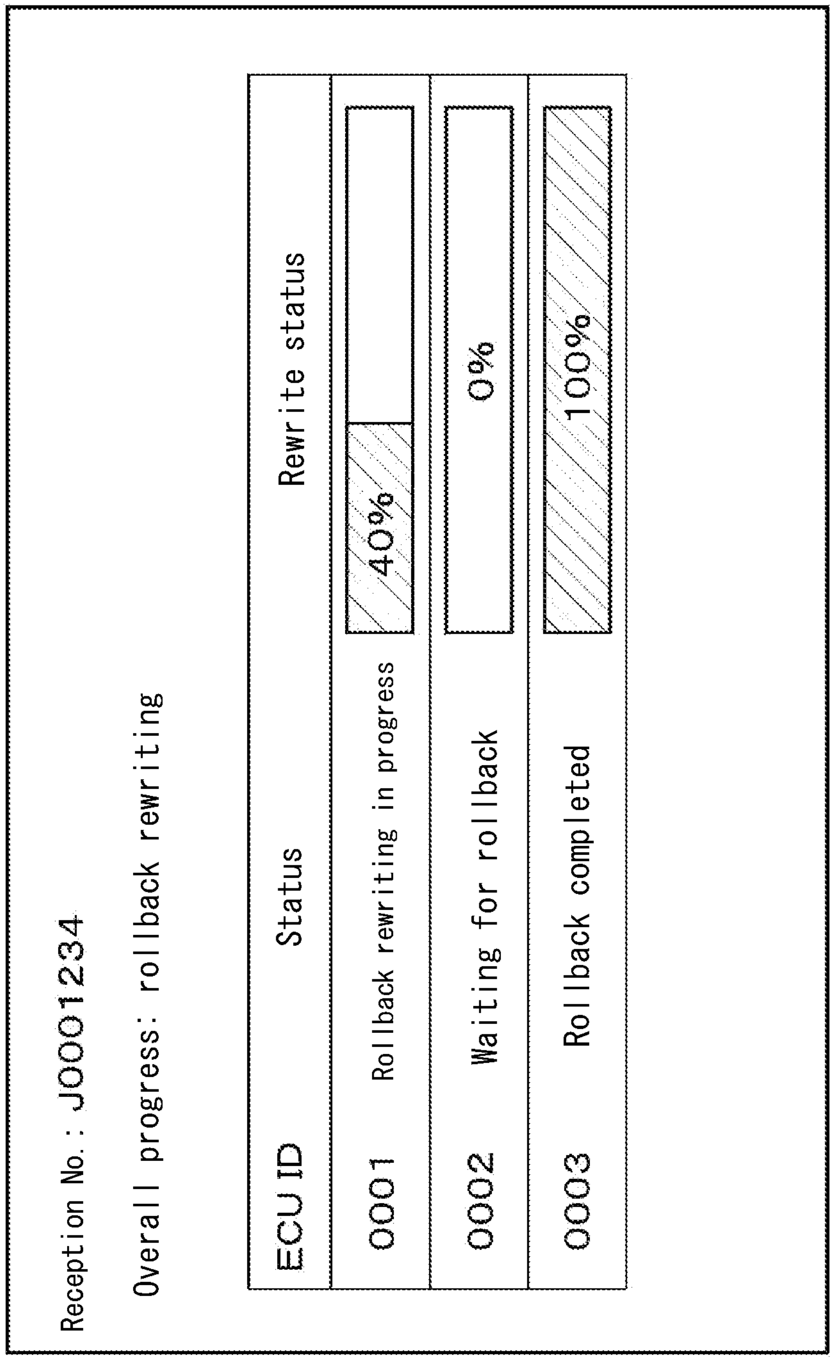
FIG. 138 is a diagram illustrating the rewrite progress situation screen.
Figure 139:
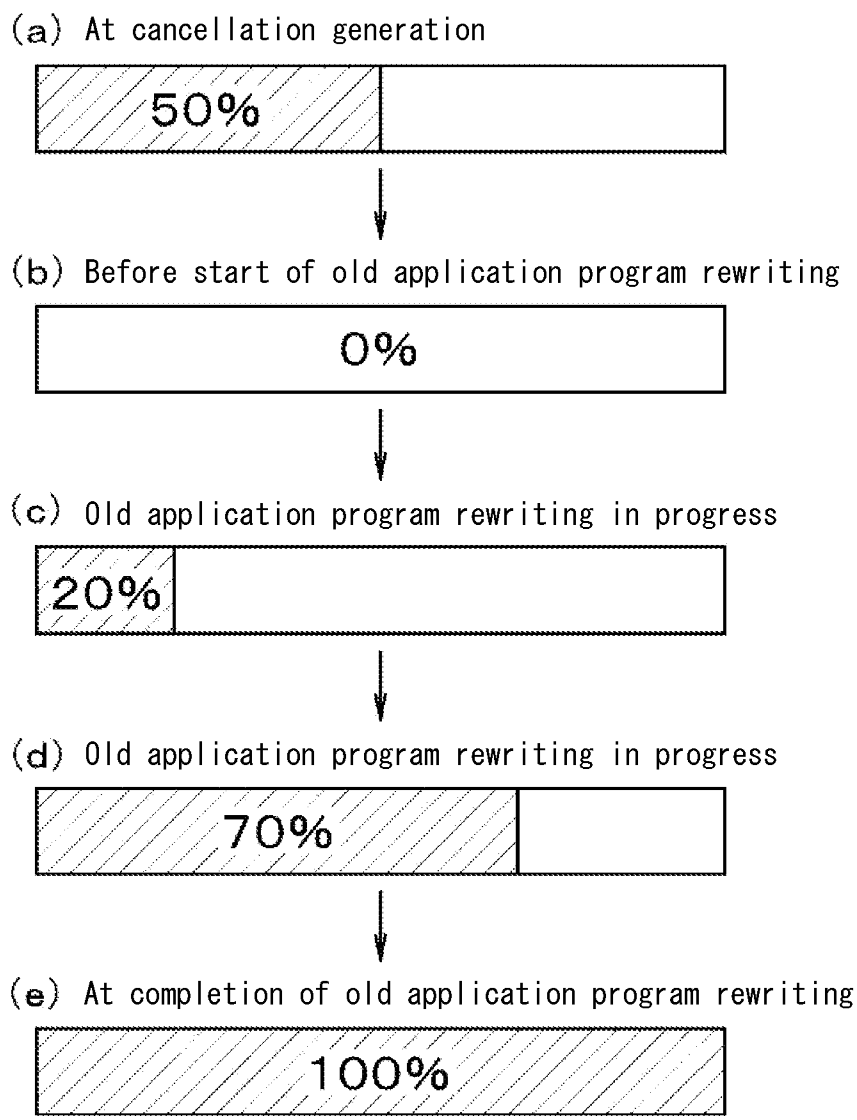
FIG. 139 is a diagram illustrating transition of progress graph display.

When rewrite during rollback is initiated, the CGW 13 displays the progress state of the rewrite target ECU 19 in a rewriting state as "rollback rewrite in progress (or uninstallation in progress)" as illustrated in FIG. 137. As a third aspect, the display terminal 5 displays the rewrite progress situation during rollback. FIG. 137 exemplifies a case where the ECU (ID0003) is in a rollback-rewrite-in-progress state. When the rollback for the rewrite target ECU 19 has been completed, the display terminal 5 displays the progress state as "rollback completed" and displays the progress situation as 100% for the rewrite target ECU 19 that has completed the rewrite as illustrated in FIG. 138. In a case where the rollback target ECU 19 is a single-bank memory ECU and the entire data is to be rewritten, the display terminal 5 causes the display of the progress graph to transition as illustrated in FIG. 139. That is, in a case where the rollback target ECU 19 is a single-bank memory ECU and the entire data is to be rewritten, distribution of the entire data is immediately stopped, and data of the old application program is written into the flash memory in the rewrite target ECU 19 to be rewritten into the old application program (first rollback process).

For example, when a cancellation request is generated in a stage in which normal rewriting has been completed up to "50%" (FIG. 139(*a*)), the display terminal 5 displays the numerical value of the progress graph as "0%" (FIG. 139(*b*)), increases a numerical value of the progress graph in accordance with the progress of writing the data of the old application program, and rewrites the data into the old application program (FIGS. 139(*c*), 139(*d*), and 139(*e*)). When the rewriting into the old application program has been completed by 100%, the display terminal 5 displays that the rewrite target ECU 19 "has completed rollback". FIG. 139 and FIGS. 140 to 142 described later illustrate progress display of the individual ECUs.

Figure 140:
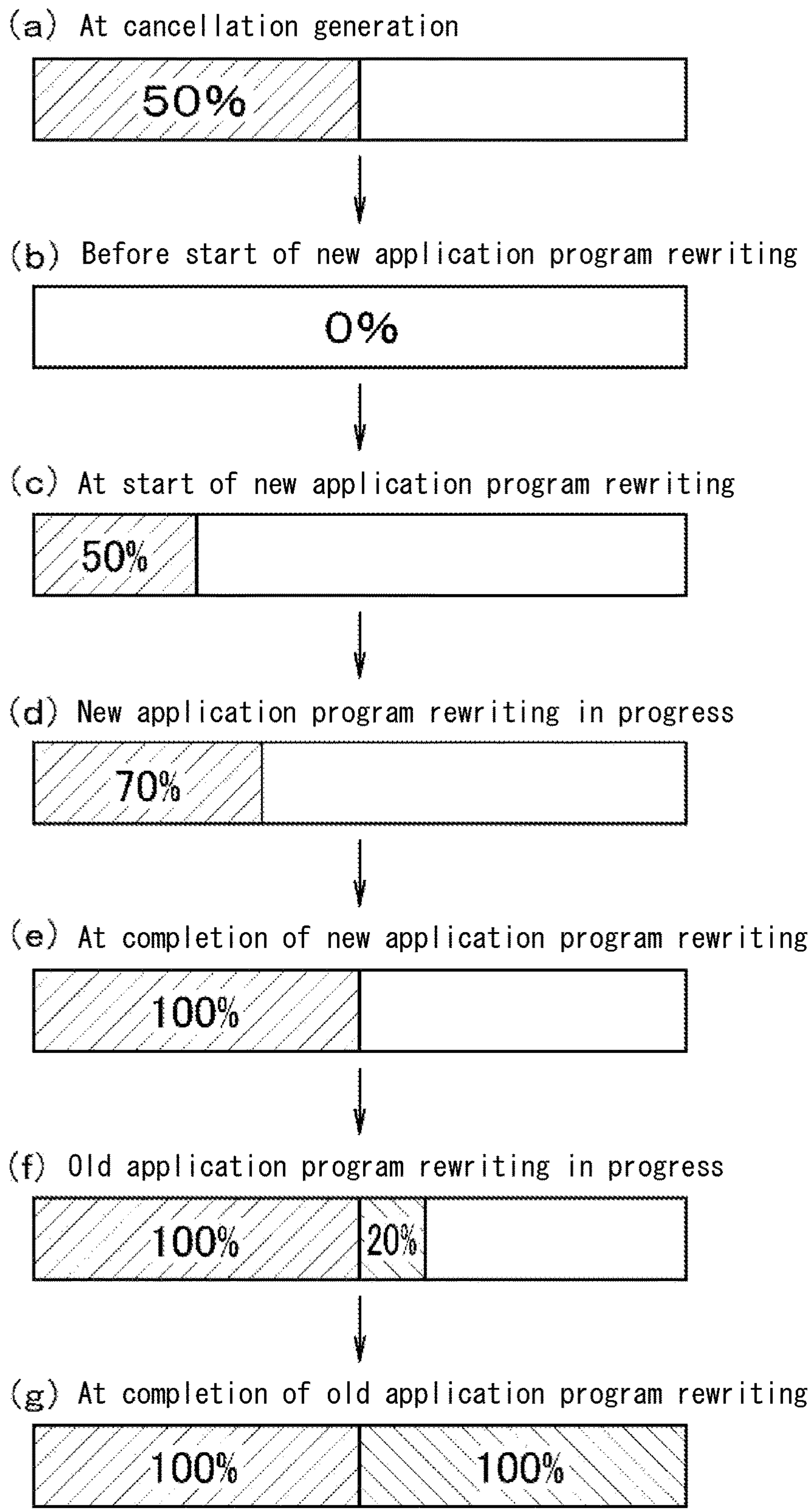
FIG. 140 is a diagram illustrating the transition of the progress graph display.
Figure 141:
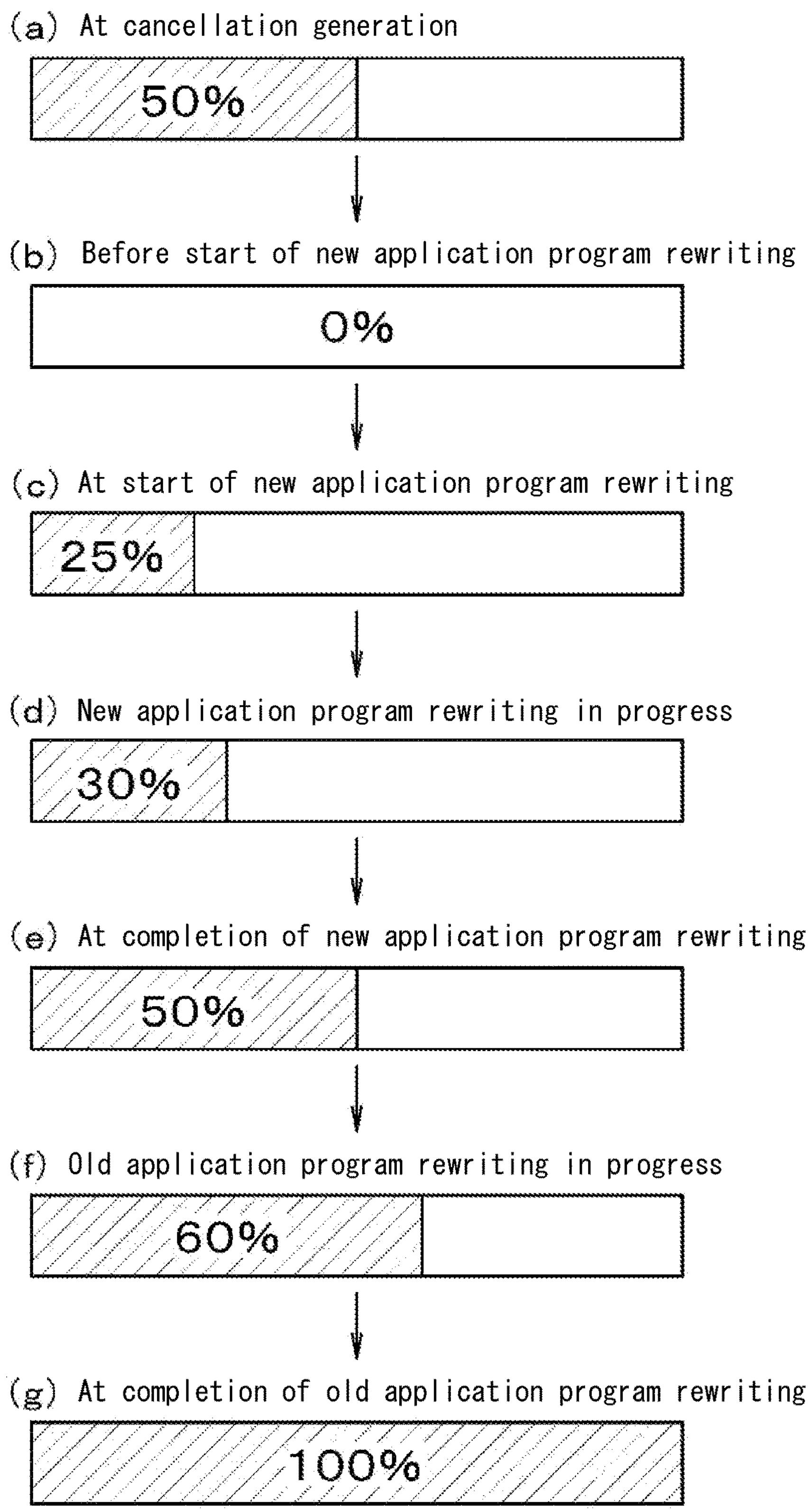
FIG. 141 is a diagram illustrating the transition of the progress graph display.

When the rollback target ECU 19 is a single-bank memory ECU and difference data is to be rewritten, the display terminal 5 causes the display of the progress graph to transition as illustrated in FIG. 140 or 141. That is, when the rollback target ECU 19 is a single-bank memory and the difference data is to be rewritten, the CGW 13 continues to distribute the difference data, writes the difference data into the flash memory in the rewrite target ECU 19 and thus rewrites the difference data into the new application program. The CGW 13 distributes the data of the old application program to the rewrite target ECU 19, writes the old data into the flash memory in the rewrite target ECU 19, and thus rewrites the old data into the old application program (second rollback process).

For example, when a cancellation request is generated in a stage in which normal rewriting (installation) has been completed up to "50%" (FIG. 140(*a*) and FIG. 141(*a*)), the display terminal 5 displays a numerical value of the progress graph as "0%" (FIG. 140(*b*) and FIG. 141(*b*)). The rewrite target ECU 19 validates the difference data that has been written so far, and continues to write the difference data that is distributed from the CGW 13. That is, the progress display indicating that installation has been completed switches from display of "0%" to a ratio corresponding to the validated "50%" (FIG. 140(*c*) and FIG. 141(*c*)). The display terminal 5 increases the numerical value of the progress graph in accordance with the progress in which the rewrite target ECU 19 writes the difference data of the new program distributed from the CGW 13 (FIGS. 140(*d*), 140(*e*), 141(*d*), and 141(*e*)). After the rewrite target ECU 19 completes rewriting of the new application program, the display terminal 5 subsequently increases the numerical value of the progress graph in accordance with the progress in which the rewrite target ECU 19 writes the difference data of the old application program distributed from the CGW 13 (FIGS.

140(*f*), 140(*g*), 141(*f*), and 141(*g*)). That is, the display terminal 5 displays the progress situation of writing of the new program and the progress situation of writing of the old program in accordance with the occurrence of continuous installation of the new program and installation of the old program as the rollback process.

In this case, as illustrated in FIG. 140, the display terminal 5 may display a rewrite portion of the new application program as "100%" in the progress graph on the left and display a rewrite portion of the old application program as "100%" in the progress graph on the right, so that the entire width of the progress graph may be "200%". In this case, the display terminal 5 calculates a progress percentage of the new application program on the basis of a file size of the new application program and a cumulative data size of the written new application program, calculates a progress percentage of the old application program on the basis of a file size of the old application program and a cumulative data size of the written old application program, and thus displays the progress situation.

Further, as illustrated in FIG. 141, the display terminal 5 may set the entire width of the progress graph to "100%" by setting a rewrite portion of the new application program to "50%" and setting a rewrite portion of the old application program to "50%". In this case, the display terminal 5 calculates and displays a progress percentage on the basis of a sum value of the file size of the written new application program and the file size of the old application program and a sum value of the cumulative data size of the new application program and the cumulative data size of the old application program.

Figure 142:
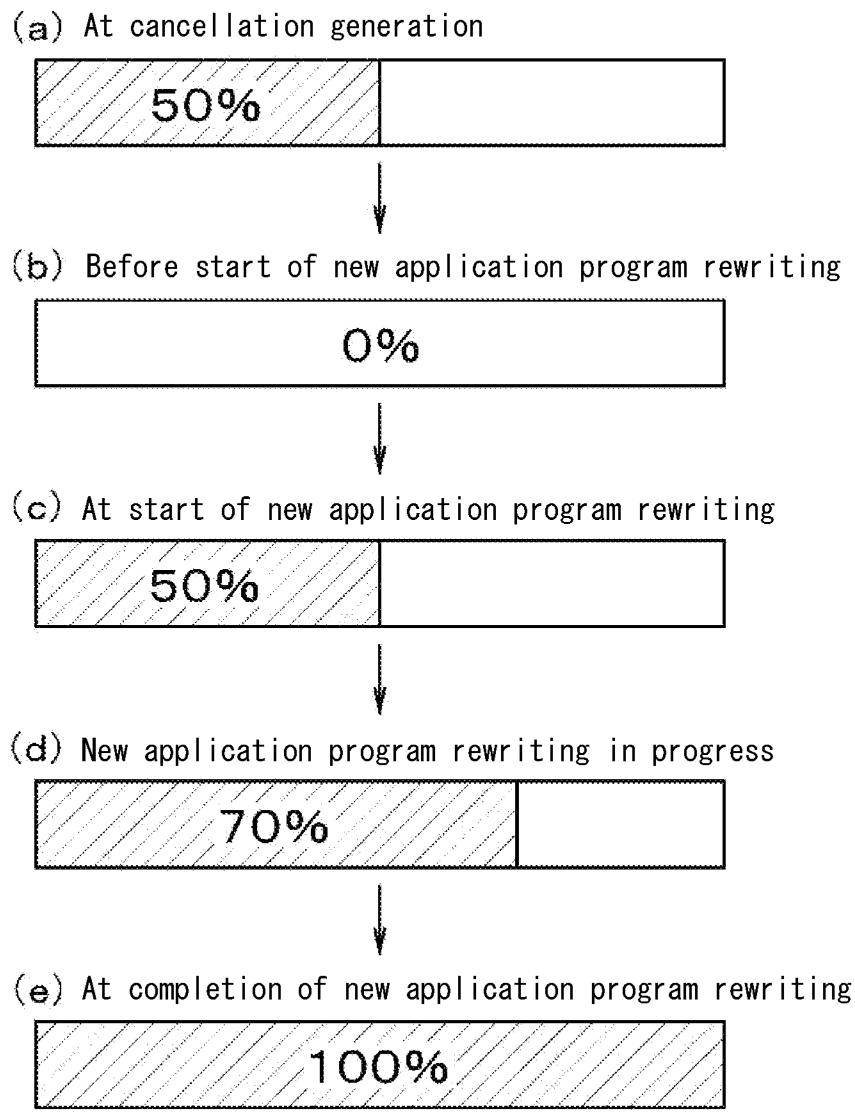
FIG. 142 is a diagram illustrating the transition of the progress graph display.

In a case where the rollback target ECU 19 is subjected to rewriting into a single-bank suspend memory ECU or a double-bank memory ECU, as illustrated in FIG. 142, the display terminal 5 causes the display of the progress graph to transition. That is, in a case of rewriting when the rollback target ECU 19 is a single-bank suspend memory ECU or a double-bank memory ECU, the CGW 13 continues to distribute write data to the rewrite target ECU 19, writes the write data into the inactive bank in the rewrite target ECU 19, and rewrites the write data into the new application program (third rollback process).

For example, when a cancellation request is generated in a stage in which normal rewriting (installation) has been completed up to "50%" (FIG. 142(*a*)), the display terminal 5 displays the numerical value of the progress graph as "0%" (FIG. 142(*b*)). The rewrite target ECU 19 validates the difference data that has been written so far, and continues to write the difference data that is distributed from the CGW 13. That is, the progress display indicating that installation has been completed switches from display of "0%" to a ratio corresponding to the validated "50%" (FIG. 142(*c*)). The display terminal 5 increases the numerical value of the progress graph in accordance with the progress in which the rewrite target ECU 19 writes the write data distributed from the CGW 13 (FIGS. 142(*d*) and 142(*e*)). In the present embodiment, a description has been made of a case where the CGW 13 performs the rewrite progress situation display control process, but the display terminal 5 may perform the rewrite progress situation display control process.

As described above, since the rewrite progress situation display control process is performed, the display terminal 5 displays a progress situation in a display aspect of differentiating rewriting of an application program between rewriting (installation) during the normal time and rewriting (uninstallation) during rollback on the basis of the rollback process. The user can recognize that rollback is in progress by receiving cancellation of an update program. Although the configuration of displaying a progress situation for each rewrite target ECU 19 has been described above, as illustrated in FIG. 143, a configuration of collectively displaying a progress situation for the rewrite target ECUs 19 may be used. In this case, the display terminal 5 displays a single progress state instead of individually displaying progress states for the three rewrite target ECUs 19. The CGW 13 calculates the progress on the basis of a ratio of an amount of written data to a total amount of write data generated in the three rewrite target ECUs 19 as the rollback process.

(17) Difference Data Consistency Determination Process

The difference data consistency determination process will be described with reference to FIGS. 144 to 147. The vehicle program rewriting system 1 performs the difference data consistency determination process before installation is initiated in the rewrite target ECU 19.

Figure 144:
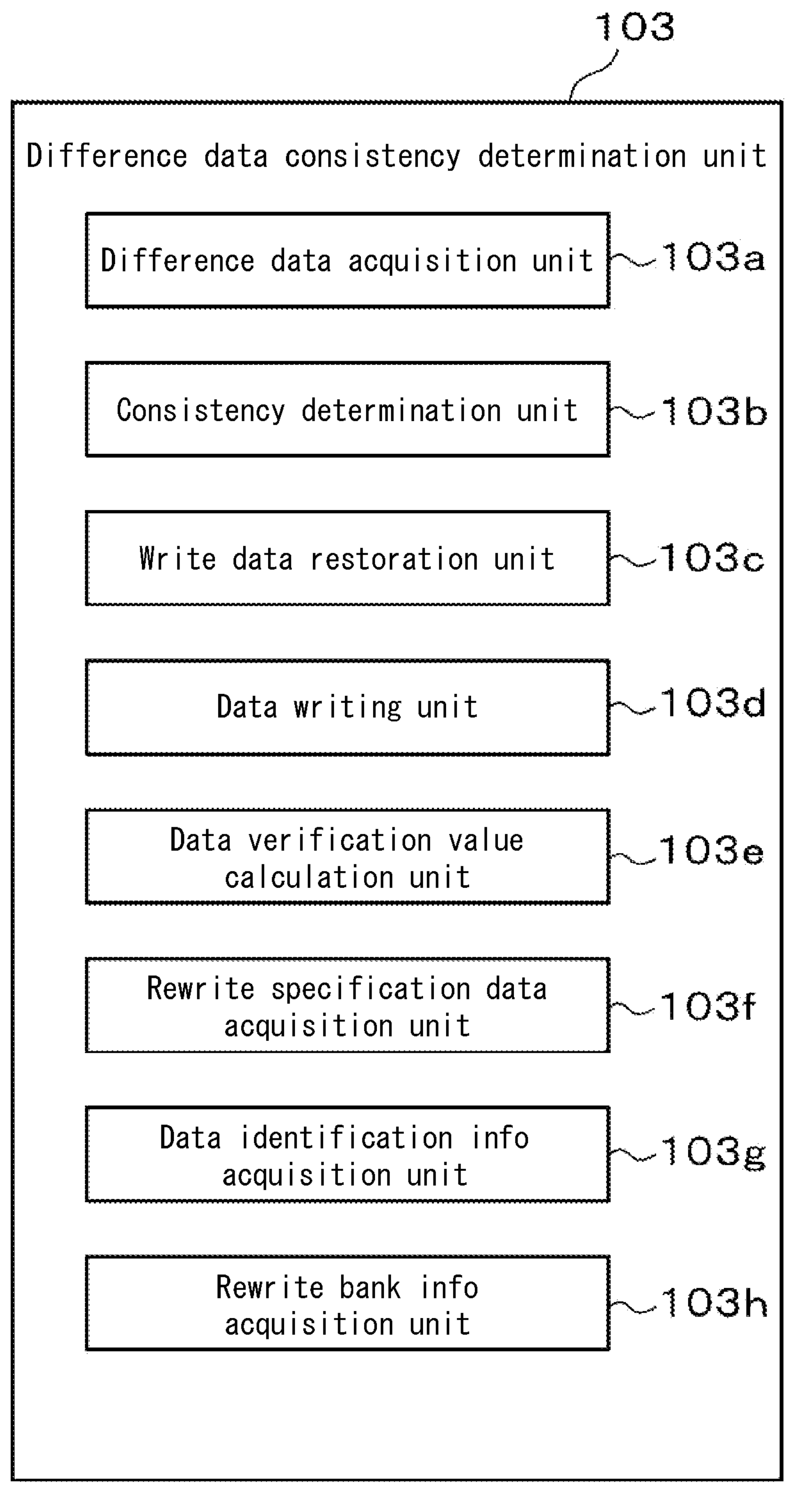
FIG. 144 is a functional block diagram of a difference data consistency determination unit.

As illustrated in FIG. 144, the ECU 19 includes, in the difference data consistency determination unit 103, a difference data acquisition unit 103*a*, a consistency determination unit 103*b*, a write data restoration unit 103*c*, a data writing unit 103*d*, a data verification value calculation unit 103*e*, a rewrite specification data acquisition unit 103*f*, a data identification information acquisition unit 103*g*, and a rewrite bank information acquisition unit 103*h*.

The difference data acquisition unit 103*a* acquires difference data that is used to rewrite a data storage area of an electronic control unit which is the rewrite target ECU 19 and that indicates a difference between old data and new data. The consistency determination unit 103*b* determines whether or not the difference data is consistent with a data storage area or stored data on the basis of first determination information related to the stored data that is stored in the data storage area of the flash memory and second determination information acquired in a manner linked to the difference data. For example, the first determination information is a data verification value for the stored data, and the second determination information is a data verification value for old data or a data verification value for new data. The write data restoration unit 103*c* restores write data by using the difference data and the stored data when it is determined by the consistency determination unit 103*b* that the consistency of the difference data is positive, and does not restore the write data when it is determined by the consistency determination unit 103*b* that the consistency of the difference data is negative. When the write data is restored by the write data restoration unit 103*c*, the data writing unit 103*d* stores the restored write data into the data storage area. The data verification value calculation unit 103*e* calculates a data verification value for each of blocks obtained by dividing the stored data into one or more blocks. The data verification value calculation unit 103*e* acquires the data verification value for each block received along with the difference data.

The rewrite specification data acquisition unit 103*f* acquires rewrite specification data corresponding thereof in the CGW rewrite specification data from the CGW 13. The data identification information acquisition unit 103*g* acquires data identification information stored in the difference data and data identification information of an old application program that is the old data. The data identification information is information for identifying whether or not the difference data is data for the ECU, and is, for example, data calculated by applying a predetermined algorithm to the old data.

The rewrite bank information acquisition unit 103*h* acquires rewrite bank information stored in the rewrite specification data acquired from the CGW 13 and rewrite bank information of the old application program that is old data. The rewrite bank information is information indicating which bank of the flash memory is to be written with the difference data that is the write data. In a case where the rewrite target ECU 19 is a double-bank memory or a single-bank suspend memory, the bank-A or the bank-B is designated. In a case where the rewrite target ECU 19 is a single-bank memory, the rewrite bank information is not used. When the difference data distributed from the CGW 13 is received by the write data receiving unit 101, the consistency determination unit 103*b* determines the consistency of the difference data by using at least one of the data identification information, the data verification value, and the rewrite bank information.

Figure 145:
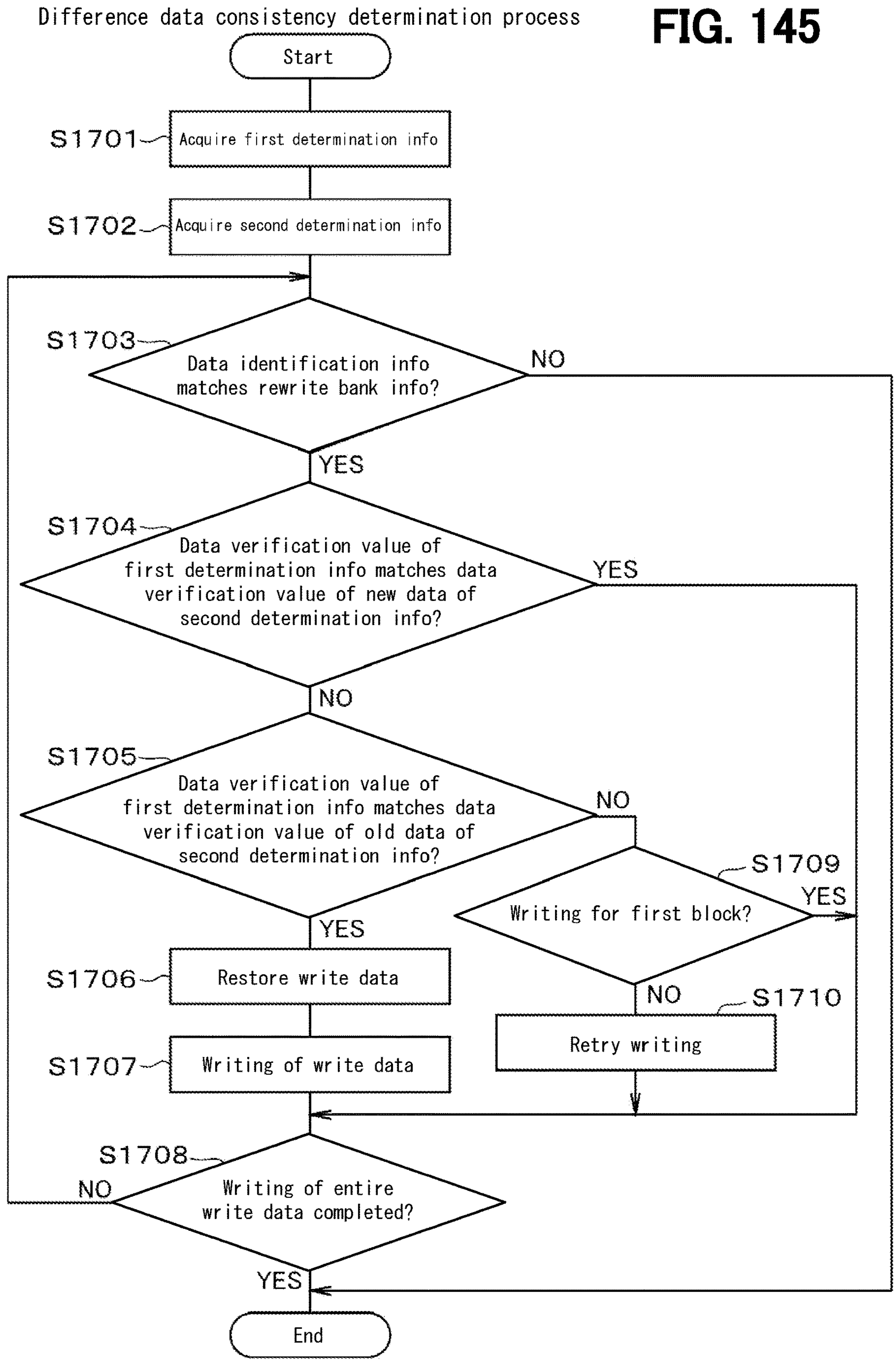
FIG. 145 is a flowchart illustrating a difference data consistency determination process.
Figure 146:
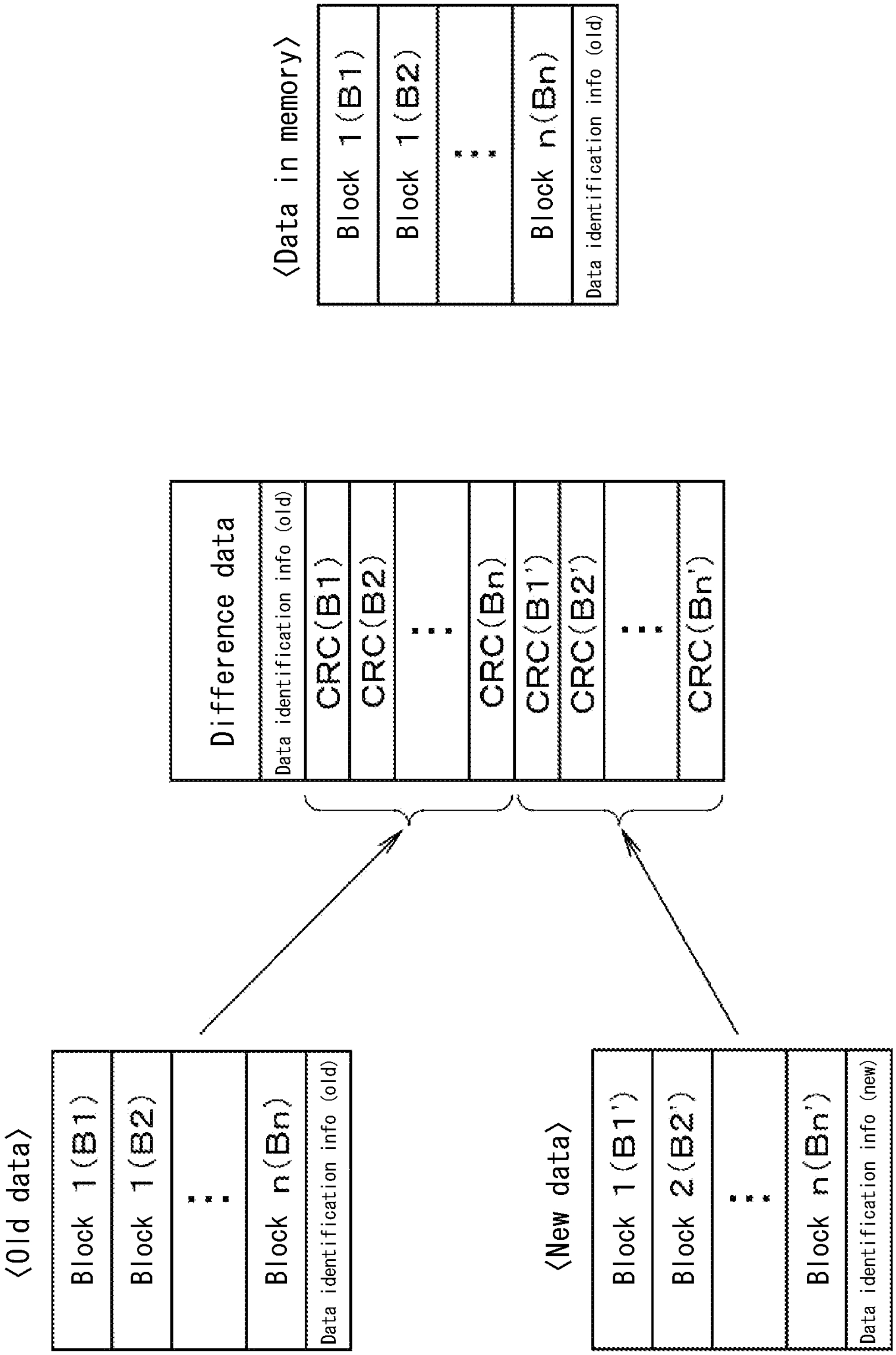
FIG. 146 is a diagram illustrating an aspect of determining the consistency of difference data.
Figure 147:
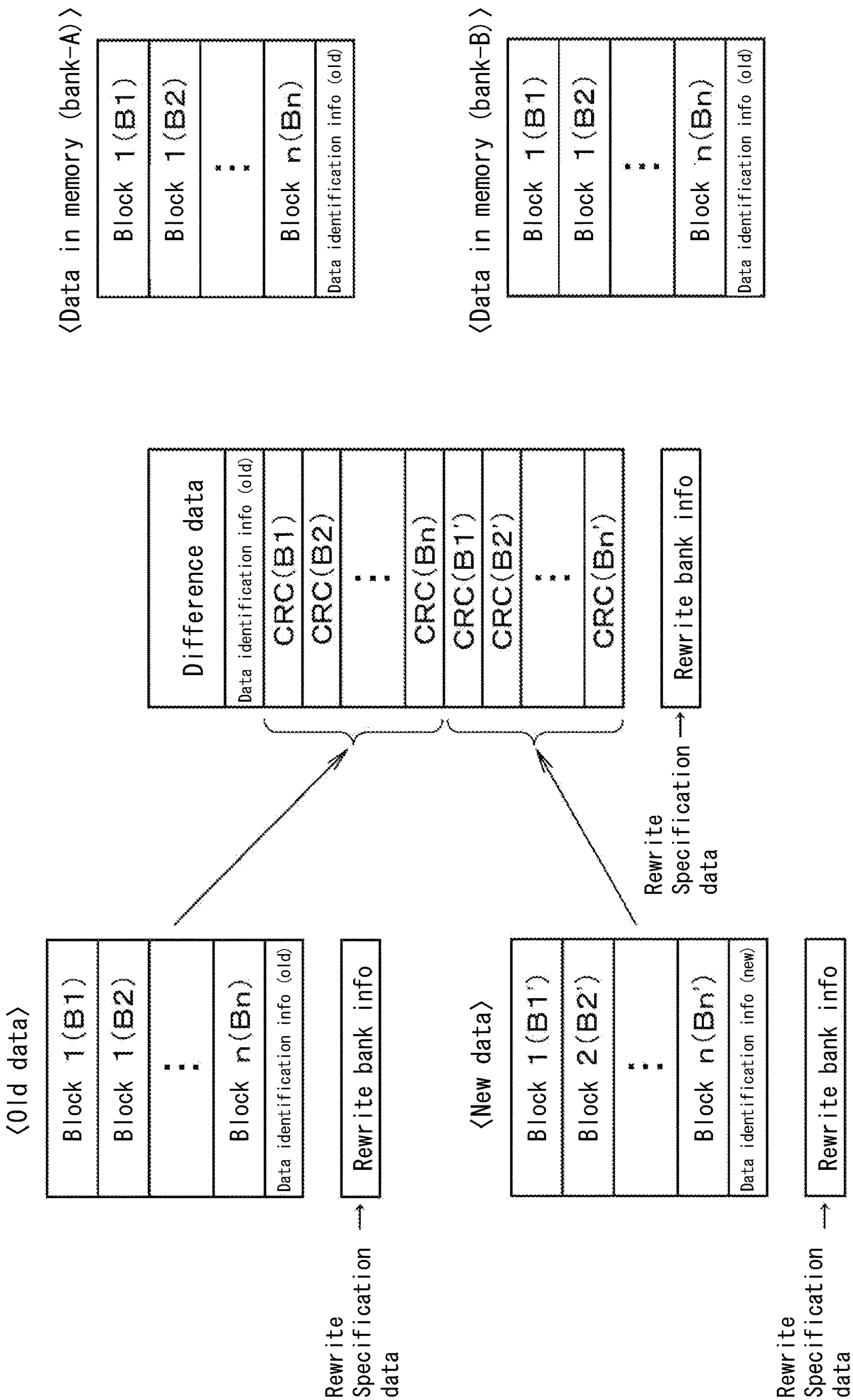
FIG. 147 is a diagram illustrating an aspect of determining the consistency of difference data.

Next, an operation of the difference data consistency determination unit 103 in the rewrite target ECU 19 will be described with reference to FIGS. 145 to 147. The rewrite target ECU 19 executes a difference data consistency determination program and thus performs the difference data consistency determination process. When the difference data consistency determination process is initiated, the rewrite target ECU 19 acquires data identification information, a data verification value, and rewrite bank information related to difference data as first determination information for determining the consistency of the difference data (S1701). The rewrite target ECU 19 acquires data identification information, data verification value of old data, a data verification value of new data, and rewrite bank information as second determination information (S1702).

The rewrite target ECU 19 determines whether or not the data identification information of the first determination information matches the data identification information of the second determination information, and whether or not the rewrite bank information of the first determination information matches the rewrite bank information of the second determination information (S1703). When it is determined that the data identification information of the first determination information does not match the data identification information of the second determination information, or the rewrite bank information of the first determination information does not match the rewrite bank information of the second determination information (S1703: NO), the rewrite target ECU 19 determines that the write data is improper, notifies the CGW 13 of error information, and finishes the difference data consistency determination process.

When it is determined that the data identification information of the first determination information matches the data identification information of the second determination information and that the rewrite bank information of the first determination information matches the rewrite bank information of the second determination information (S1703: YES), the rewrite target ECU 19 collates the data verification value of the first determination information with the data verification value of the new data of the second determination information, and determines whether or not both of the data verification values match each other (S1704; corresponding to a consistency determination procedure). When it is determined that both of the data verification values do not match each other (S1704: NO), the rewrite target ECU 19 collates the data verification value of the first determination information with the data verification value of the old data of the second determination information, and determines whether both of the data verification values match each other (S1705; corresponding to a consistency determination procedure).

When it is determined that both of the data verification values match each other (S1705: YES), the rewrite target ECU 19 restores write data (S1706; corresponding to a write data restoration procedure), writes the restored write data into the flash memory (S1707; corresponding to a data write procedure), and determines whether or not writing of the entire write data has been completed (S1708). When it is determined that writing of the entire write data has not been completed (S1708: NO), the rewrite target ECU 19 returns to step S1703 and repeatedly performs step S1703 and the subsequent steps. When it is determined that all writing of the entire write data has been completed (S1708: YES), the rewrite target ECU 19 finishes the difference data consistency determination process.

When it is determined that the data verification value of the first determination information does not match the data verification value of the new data of the second determination information (S1704: NO), and it is determined that the data verification value of the first determination information does not match the data verification value of the old data of the second determination information (S1705: NO), the rewrite target ECU 19 determines whether or not writing for a first block is performed (S1709).

When it is determined that writing for the first block is performed (S1709: YES), the rewrite target ECU 19 determines whether or not writing of the entire write data has been completed because writing for the first block has not been completed (S1708). When it is determined that writing for the first block is not performed, that is, writing for a second block and the subsequent blocks is performed (S1709: NO), the rewrite target ECU 19 retries the writing (S1710), and determines whether or not writing of entire write data has been completed (S1708).

A description will be made of a case where the rewrite target ECU 19 is a single-bank memory ECU with reference to FIG. 146. Data identification information (old) and a CRC value (data verification value) computed for each block of old data are attached to difference data distributed from the CGW 13. The data identification information (old) is data calculated by applying a predetermined algorithm to the old data (old application program). When the data identification information is used as determination information, the rewrite target ECU 19 collates the data identification information (old) attached to the difference data with the data identification information (old) of the program (old data) stored in the flash memory, and determines the consistency of the difference data. The data identification information (old) stored in the flash memory is information stored together when the program is written into the flash memory of the rewrite target ECU 19. Alternatively, a predetermined number of bits from a leading address of the program written in the flash memory may be regarded as data identification information (old).

When the data verification value is used as determination information, the rewrite target ECU 19 computes a CRC value for each block of the program stored in the flash memory, collates a CRC value (CRC (B1 to Bn)) for the old data attached to the received difference data and a CRC value (CRC (B1' to Bn')) for the new data with the computed CRC value, and determines the consistency of the difference data. When no new program is written in the flash memory, the received CRC value in all blocks matches the computed CRC value. In a case where writing is stopped in a state in which the new program is written up to m (<n) blocks of the flash memory, and the writing is resumed, the computed CRC value matches the CRC value (CRC (B1' to Bn') of the new data in the blocks 1 to m, and thus the rewrite target ECU 19 skips a write process (S1706 and S1707). The rewrite target ECU 19 performs the write process (S1706 and S1707) from the block m+1 by checking match with the CRC value (CRC (B1 to Bn)) for the old data.

Data identification information (new) of a new program (new data) and a CRC value (CRC (B1' to Bn')) for each block may be attached to the difference data. The rewrite target ECU 19 writes the difference data into the flash memory, stores the data identification information (new) together when the new program is installed, and uses the difference data to determine the consistency in the next program update. When installation of the new program is completed, the rewrite target ECU 19 reads the new program written in the flash memory for each block, computes a CRC value, compares the CRC value with the CRC value attached to the difference data, and verifies whether or not the new program has been correctly written.

A description will be made of a case where the rewrite target ECU 19 is a double-bank memory ECU with reference to FIG. 147. Also in this case, when the data verification value is used as determination information, the rewrite target ECU 19 computes a CRC value for each block of the program stored in the flash memory, collates the CRC value (CRC (B1 to Bn)) for the old data attached to the received difference data and the CRC value (CRC (B1' to Bn') for the new data with the computed CRC value, and determines the consistency of the difference data. When no new program is written in the flash memory, the received CRC value in all blocks matches the computed CRC value. In a case where writing is stopped in a state in which the new program is written up to m (<n) blocks of the flash memory, and the writing is resumed, the computed CRC value matches the CRC value (CRC (B1' to Bn') of the new data in the blocks 1 to m, and thus the rewrite target ECU 19 skips a write process (S1706 and S1707). The rewrite target ECU 19 performs the write process (S1706 and S1707) from the block m+1 by checking match with the CRC value (CRC (B1 to Bn)) for the old data.

It is assumed that the bank-A of the flash memory is an active bank and has the version 2.0, the bank-B thereof is an inactive bank and has the version 1.0, and the difference data is difference data (difference data between the version 1.0 and the version 3.0) for updating the bank-B to the version 3.0. The difference data distributed from the CGW 13 is attached with data identification information (information indicating old (version 1.0)), a CRC value calculated for each block of the old data (old program (version 1.0)), and a CRC value computed for each block of the new data (new program (version 3.0)).

The rewrite specification data includes rewrite bank information indicating into which bank of the flash memory the difference data for the rewrite target ECU 19 is to be written. In a case where the rewrite bank information is used as determination information, the rewrite target ECU 19 collates the rewrite bank information acquired from the rewrite specification data with inactive bank information (bank-B) of the rewrite target ECU 19, and determines the consistency of the difference data. In a case where the data identification information is used as determination information, the rewrite target ECU 19 collates the data identification information (old (version 1.0)) attached to the difference data with the data identification information (old) of the old program (version 1.0) stored in the inactive bank (bank-B) of the flash memory, and determines the consistency of the difference data. In a case where the data verification value is used as determination information, the rewrite target ECU 19 computes a CRC value for each block of the old program (version 1.0) stored in the inactive bank (bank-B) of the flash memory, collates the CRC value (CRC (B1 to Bn)) attached to the difference data with the computed CRC value, and determines the consistency of the difference data.

Figure 143:
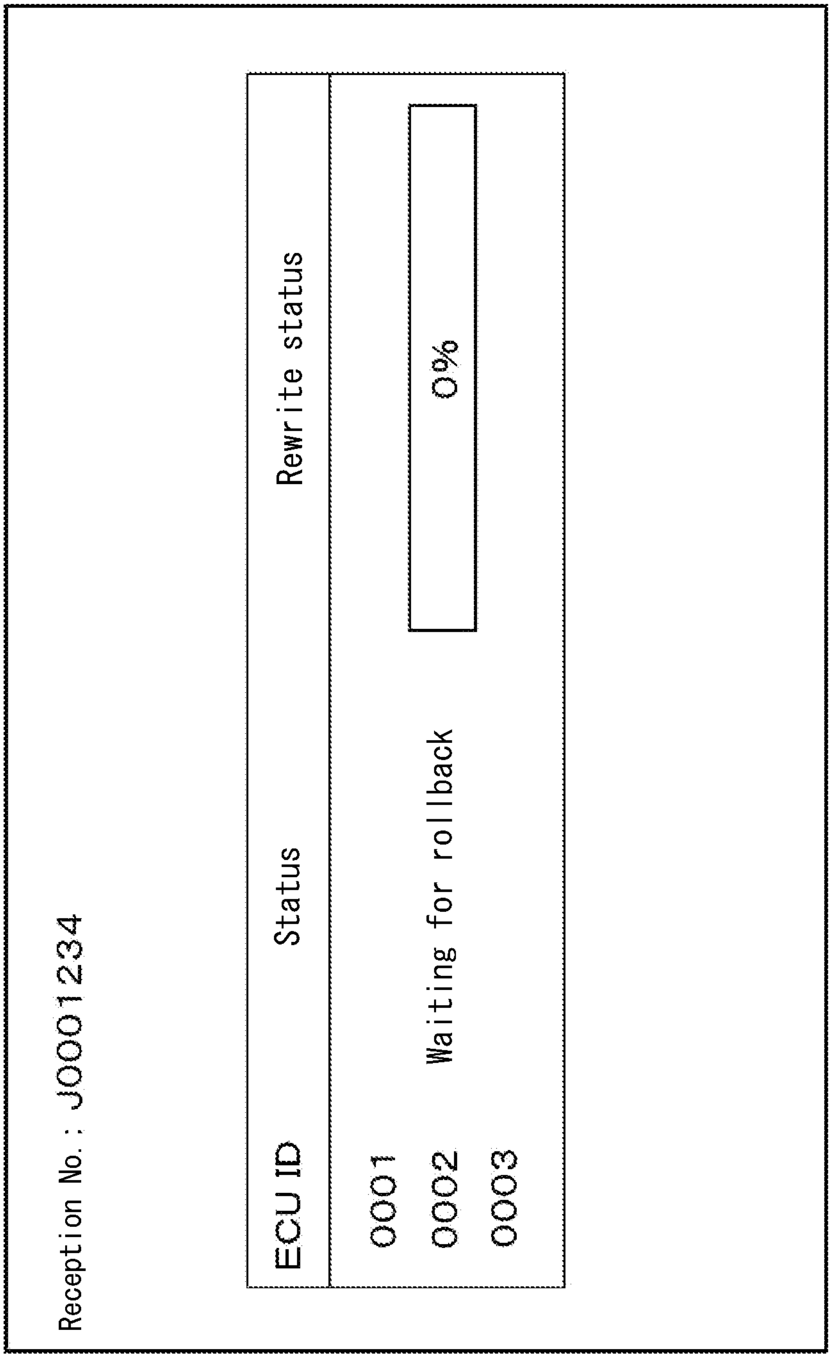
FIG. 143 is a diagram illustrating a rewrite progress situation screen.

In the examples illustrated in FIGS. 143 and 144 described above, it has been described that the data identification information and the data verification value are attached to the difference data and are distributed from the CGW 13 along with the difference data. However, the data identification information and the data verification value may be attached as header information of the difference data, and the header information may be distributed to the rewrite target ECU 19 before the CGW 13 distributes the difference data to the rewrite target ECU 19. When the header information is received from the CGW 13, the rewrite target ECU 19 determines the consistency of the difference data by using the data identification information and the data verification value.

In FIGS. 143 and 144, the case where rewrite data is the difference data has been described as an example, but the same applies to a case where rewrite data is the entire data. In a case where the rewrite target ECU 19 has a single-bank memory, the same consistency determination is performed when the rollback difference data is used to return the memory to an original version.

As described above, the rewrite target ECU 19 performs the difference data consistency determination process, thus writes write data generated on the basis of the difference data only in a case where the consistency of the difference data is positive, and prevents a situation in which write data generated on the basis of the difference data is written in a case where the consistency of the difference data is negative. For example, in a case where difference data to be written into the bank-A is included in a distribution package for the rewrite target ECU 19 in which the bank-B of the flash memory is not an inactive bank, inconsistency can be detected before the difference data is written into the flash memory. In a case where difference data for other ECUs or difference data of which version is inconsistent is included in a distribution package as difference data for the rewrite target ECU, inconsistency can be detected before the difference data is written into the flash memory.

In a case where the rewrite target ECU 19 stops and then resumes writing of the write data, the rewrite target ECU 19 determines the consistency of the difference data on the basis of the data verification value for the stored data in the flash memory, and the data verification value of the old data and the data verification value of the new data associated with the received difference data. The rewrite target ECU 19 may determine the consistency of the difference data on the basis of the data verification value for the stored data and the verification value of the received new data, and may determine the consistency of the difference data on the basis of the data verification value for the stored data and the data verification value of the received old data from the final block for which a determination result is negative.

The rewrite target ECU 19 skips writing of the write data at least up to the preceding block of the final block for which the consistency of the difference data is determined as being negative, and resumes writing of the write data from the final block or the subsequent block of the final block. In a case where a block size is same as a data size of a write area for the write data, since writing of the write data has been completed up to the final block, it is sufficient to skip writing to the final block and resume writing from the final block. On the other hand, in a case where the block size is not the same as the data size of the write area for the write data, writing of the write data may be stopped in the final block, and thus it is necessary to resume writing from the final block.

(18) Rewrite Execution Control Process

The rewrite execution control process will be described with reference to FIGS. 148 to 155. The vehicle program rewriting system 1 executes the rewrite execution control process in the ECU 19.

Figure 148:
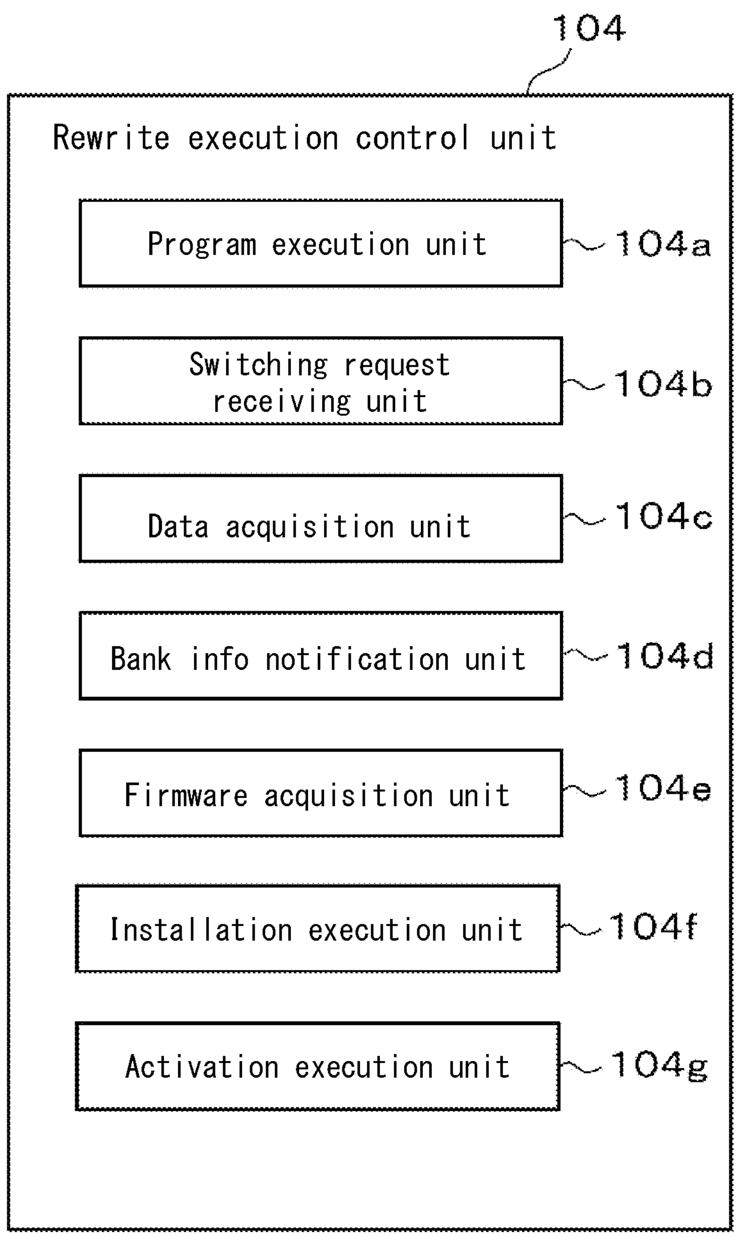
FIG. 148 is a functional block diagram of a rewrite execution control unit.
Figure 149:
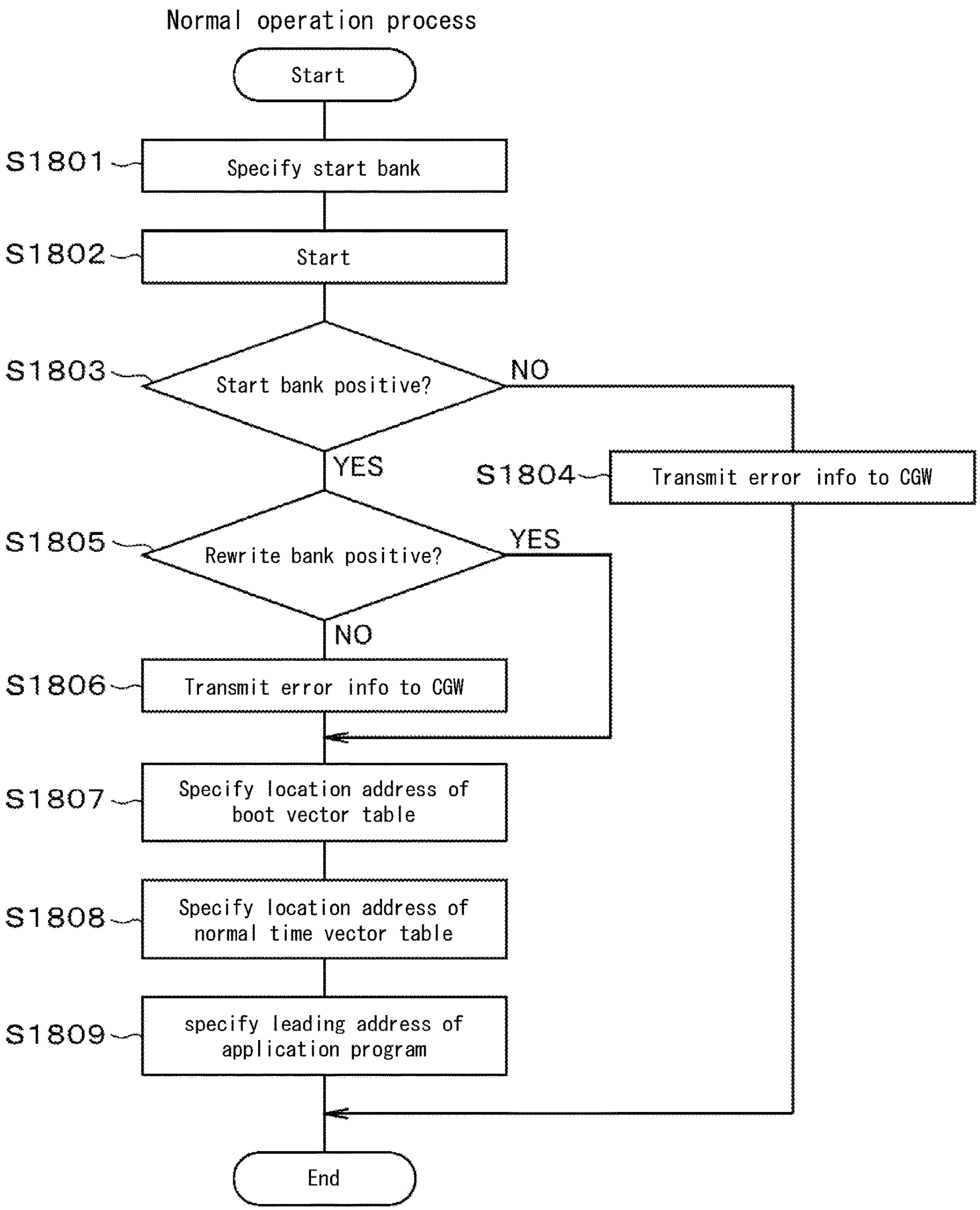
FIG. 149 is a flowchart illustrating a normal operation process.

As illustrated in FIG. 148, the ECU 19 includes a program execution unit 104*a*, a switching request receiving unit 104*b*, a data acquisition unit 104*c*, a bank information notification unit 104*d*, a firmware acquisition unit 104*e*, an installation execution unit 104*f*, and an activation execution unit 104*g* in the rewrite execution control unit 104. The program execution unit 104*a* rewrites an inactive bank by executing a rewrite program in an active bank while executing an application program and parameter data in the active bank. The switching request receiving unit 104*b* receives an activation request from the CGW 13. The data acquisition unit 104*c* acquires write data for an area of the inactive bank that needs to be rewritten from the outside. The bank information notification unit 104*d* notifies the outside of double-bank rewrite information (hereinafter, referred to as bank information). The firmware acquisition unit 104*e* acquires firmware of a rewrite program from the outside. When an instruction for installation is given by the CGW 13, the installation execution unit 104*f* writes write data into the flash memory and executes the installation. When an instruction for activation is given by the CGW 13, the activation execution unit 104*g* executes the activation for switching the active bank in preparation for restart.

Next, an operation of the rewrite execution control unit 104 in the ECU 19 will be described with reference to FIGS. 149 to 155. The rewrite target ECU 19 executes a rewrite execution control program and thus performs the rewrite execution control process. The rewrite target ECU 19 performs a normal operation process, a rewrite operation process, an information notification process, and an application program verification process as the rewrite execution control process. Each process will be described below. In the present embodiment, a description will be made of a case where the rewrite target ECU 19 is a double-bank memory ECU or a single-bank suspend memory ECU.

(18-1) Normal Operation Process

The rewrite target ECU 19 initiates the normal operation process when the rewrite target ECU 19 transitions from the stop state or the sleep state to the active state due to turning-on of the IG power or the like. When the normal operation process is initiated, the rewrite target ECU 19 specifies an active bank on the basis of active bank determination information regarding the bank-A and the bank-B (S1801), and is started with the active bank (S1802). The rewrite target ECU 19 verifies the integrity of a program stored in the start bank (active bank), and determines whether the active bank is positive (S1803).

When it is determined that a verification result of the integrity of the active bank is negative, and it is determined that the active bank is negative (S1803: NO), the rewrite target ECU 19 transmits error information indicating that the verification result of the integrity of the active bank is negative to the CGW 13 (S1804), and finishes the normal operation process. When the error information is received from the rewrite target ECU 19, the CGW 13 transmits the error information to the DCM 12. When the error information is received from the CGW 13, the DCM 12 uploads the received error information to the center device 3. That is, when it is determined that the verification result of the integrity of the active bank is negative in the rewrite target ECU 19, the CGW 13, the DCM 12, and the center device 3 are notified of this fact.

When it is determined that the verification result of the integrity of the active bank is positive, and it is determined that the active bank is positive (S1803: YES), the rewrite target ECU 19 verifies the integrity of the program stored in the rewrite bank (inactive bank), and determines whether or not the rewrite bank is positive (S1805).

When it is determined that a verification result of the integrity of the rewrite bank is negative, and it is determined that a verification result of the rewrite bank is negative (S1805: NO), the rewrite target ECU 19 transmits error information indicating that the verification result of the integrity of the rewrite bank is negative to the CGW 13 (S1806). When the error information is received from the rewrite target ECU 19, the CGW 13 transmits the error information to the DCM 12. When the error information is received from the CGW 13, the DCM 12 uploads the received error information to the center device 3. That is, when it is determined that the verification result of the integrity of the rewrite bank is negative in the rewrite target ECU 19, the CGW 13, the DCM 12, and the center device 3 are notified of this fact.

The integrity verification process described above is executed by a boot program before an application program is executed. When the integrity verification is finished, the rewrite target ECU 19 specifies a location address of the boot vector table (S1807), specifies a location address of the normal time vector table (S1808), specifies a leading address of the application program (S1809), executes the application program, and finishes the normal operation process.

(18-2) Rewrite Operation Process

When a rewrite request is received from the CGW 13, the rewrite target ECU 19 initiates the rewrite operation process. When the rewrite operation process is initiated, the rewrite target ECU 19 performs authentication with the CGW 13 by using a security access key (S1811). When it is determined that an authentication result is positive (S1812: YES), the rewrite target ECU 19 waits for write data to be received (S1813). When it is determined that the write data has been received from the CGW 13 (S1813: YES), the rewrite target ECU 19 rewrites an application program located in a rewrite bank (inactive bank) while executing an application program located in a start bank (active bank) (S1814).

It is determined whether or not rewriting of the application program has been completed (S1815), and, when it is determined that rewriting of the application program has been completed (S1815: YES), the rewrite target ECU 19 determines whether or not verification is positive (S1816). When it is determined that the verification is positive (S1816: YES), the rewrite target ECU 19 sets a rewrite completion flag to "OK" (S1817). The verification is verification of the integrity of the application program written in the inactive bank.

The rewrite target ECU 19 determines whether or not an activation request has been received from the CGW 13 (S1818). When it is determined that the activation request has been received from the CGW 13 (S1818: YES), the rewrite target ECU 19 increments, for example, a numerical value of active bank information regarding the rewrite bank, and thus updates the active bank information regarding the rewrite bank (S1819). That is, update to information indicating that the rewrite target ECU will be started in the rewrite bank thereafter is performed. It is determined whether or not a version read signal has been received from the CGW 13 (S1820), and, when it is determined that the version read signal has been received (S1820: YES), the rewrite target ECU 19 transmits, to the CGW 13, version information regarding the active bank, version information regarding the inactive bank, and identification information for specifying which bank is the active bank (S1821), and finishes the rewrite operation process. Here, the rewrite target ECU 19 may execute all of the processes from S1811 to S1821 according to the application program in the active bank (old bank) before switching. The rewrite target ECU 19 may execute the processes from S1811 to S1819 according to the application program in the active bank (old bank) before switching, and may be restarted after performing S1819, to execute the processes from S1820 to S1821 according to the application program in the active bank (new bank) after switching.

(18-3) Information Notification Process

The rewrite target ECU 19 initiates the information notification process when the rewrite target ECU 19 transitions from the stop state or the sleep state to the active state, or when, for example, the IG power is turned on or a notification request is received from the CGW 13. When the information notification process is initiated, the rewrite target ECU 19 notifies the CGW 13 of identification information for uniquely specifying an application program and parameter data related to an active bank or an inactive bank and identification information for uniquely specifying a place where the active bank or the inactive bank is located on the memory. That is, the rewrite target ECU 19 acquires active bank information regarding an active bank (S1831), and transmits the active bank information to the CGW 13 (S1832). The rewrite target ECU 19 transmits, to the CGW 13, information indicating which of the bank-A and the bank-B is the active bank, version information of the active bank, and the like as the active bank information.

When the transmission of the active bank information to the CGW 13 has been completed, the rewrite target ECU 19 acquires rewrite bank information (hereinafter, also referred to as bank information) regarding the rewrite bank (S1833), and transmits the acquired rewrite bank information to the CGW 13 (S1834). The rewrite target ECU 19 transmits, to the CGW 13, information indicating which bank of the bank-A and the bank-B is the rewrite bank, version information of the rewrite bank, and the like as the rewrite bank information. When transmission of the rewrite bank information to the CGW 13 has been completed, the rewrite target ECU 19 transmits identification information for specifying location addresses of the active bank and the rewrite bank on the memory to the CGW 13 (S1835), and finishes the information notification process. The rewrite target ECU 19 transmits, to the CGW 13, for example, an initiation address and an end address of the bank-A and an initiation address and an end address of the bank-B in the flash memory as the identification information for specifying addresses.

(18-4) Rewrite Program Verification Process

When the rewrite program verification process is initiated, the rewrite target ECU 19 determines whether or not identification information for specifying an address for executing a rewrite program has been acquired (S1841). When it is determined that the identification information for specifying the address for executing the rewrite program has been acquired (S1841: YES), the rewrite target ECU 19 determines whether or not the identification information matches the active bank information of the rewrite target ECU 19 (S1842). Specifically, the rewrite target ECU 19 determines whether or not the bank information indicating the active bank in the active bank information matches the identification information.

When it is determined that the identification information matches the active bank information of the rewrite target ECU 19 (S1842: YES), the rewrite target ECU 19 acquires the rewrite program (S1843), and determines whether or not identification information for specifying an address for rewriting the application program has been acquired (S1844). Here, in a case of an embedded type configuration in which the rewrite program is embedded in the flash memory in advance, in S1843, the rewrite target ECU 19 acquires a write program in the active bank from the flash memory and executes the write program on the RAM. In a case of a download type configuration in which the rewrite program is not embedded in the flash memory in advance but is downloaded from the outside, in S1843, the rewrite target ECU 19 downloads the rewrite program to the RAM and executes the rewrite program.

When it is determined that the identification information for specifying the address for rewriting the application program has been acquired (S1844: YES), the rewrite target ECU 19 determines whether or not the identification information matches the active bank information of the rewrite target ECU 19 (S1845). Specifically, the rewrite target ECU 19 determines whether or not bank information indicating the non-active bank in the active bank information matches the identification information. When it is determined that the identification information matches the active bank information of the ECU 19 (S1845: YES), the rewrite target ECU 19 rewrites the application program (S1846), and finishes the rewrite program verification process.

When it is determined that the identification information does not match the active bank information of the ECU 19 do (S1842: NO), or it is determined that the identification information does not match the active bank information of the rewrite target ECU 19 (S1845: NO), the rewrite target ECU 19 determines that the application program or the parameter data is not executable in the active bank or the inactive bank, and transmits a negative acknowledgement to the CGW 13 (S1847), and finishes the rewrite program verification process. For example, in the case of a double-bank memory ECU in which the bank-A of the flash memory is an active bank and the bank-B is an inactive bank, an address for executing a rewrite program is an address of the bank-A that is the active bank, and an address for rewriting an application program is an address of the bank-B that is the inactive bank.

Figure 150:
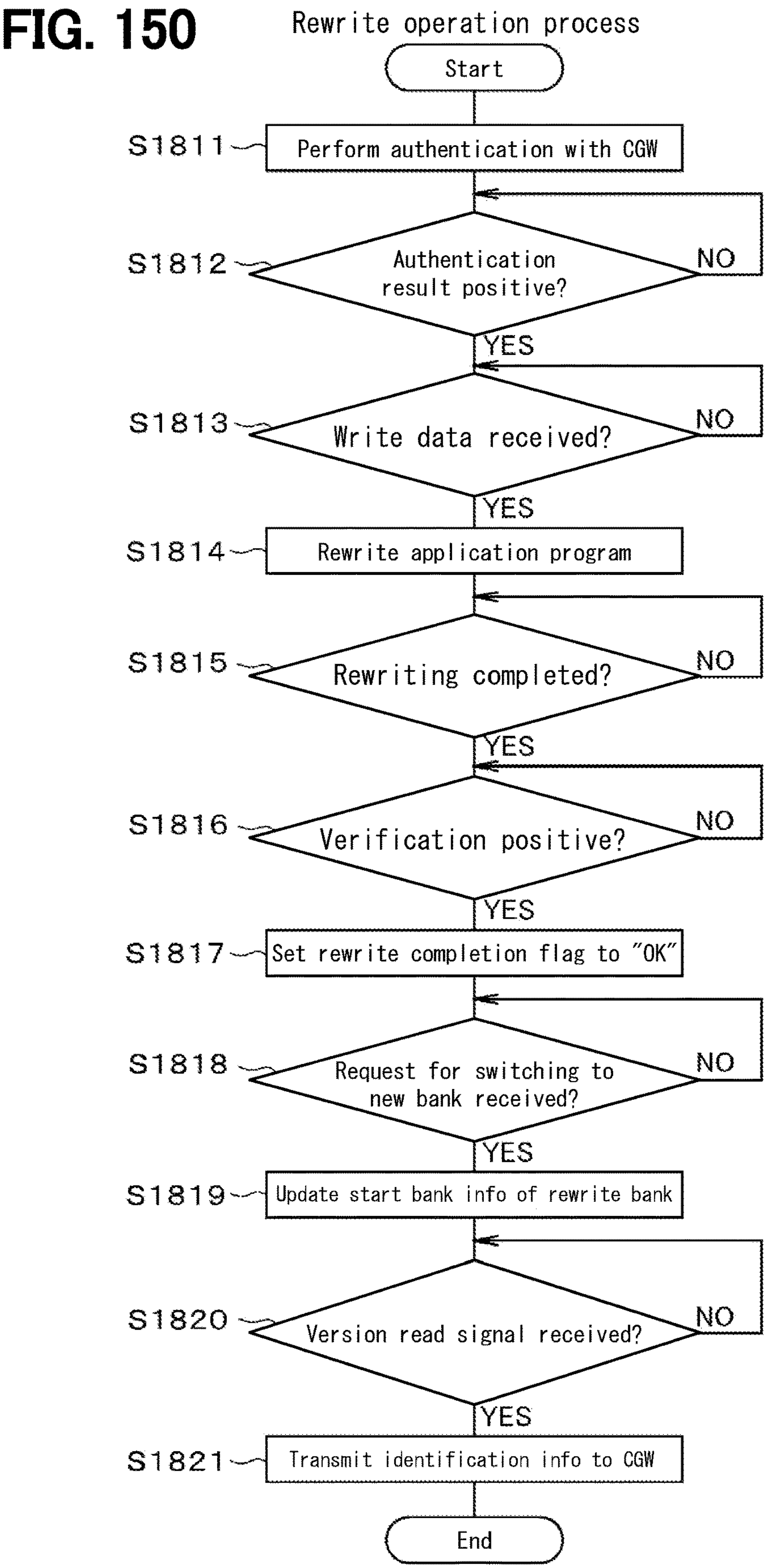
FIG. 150 is a flowchart illustrating a rewrite operation process.
Figure 151:
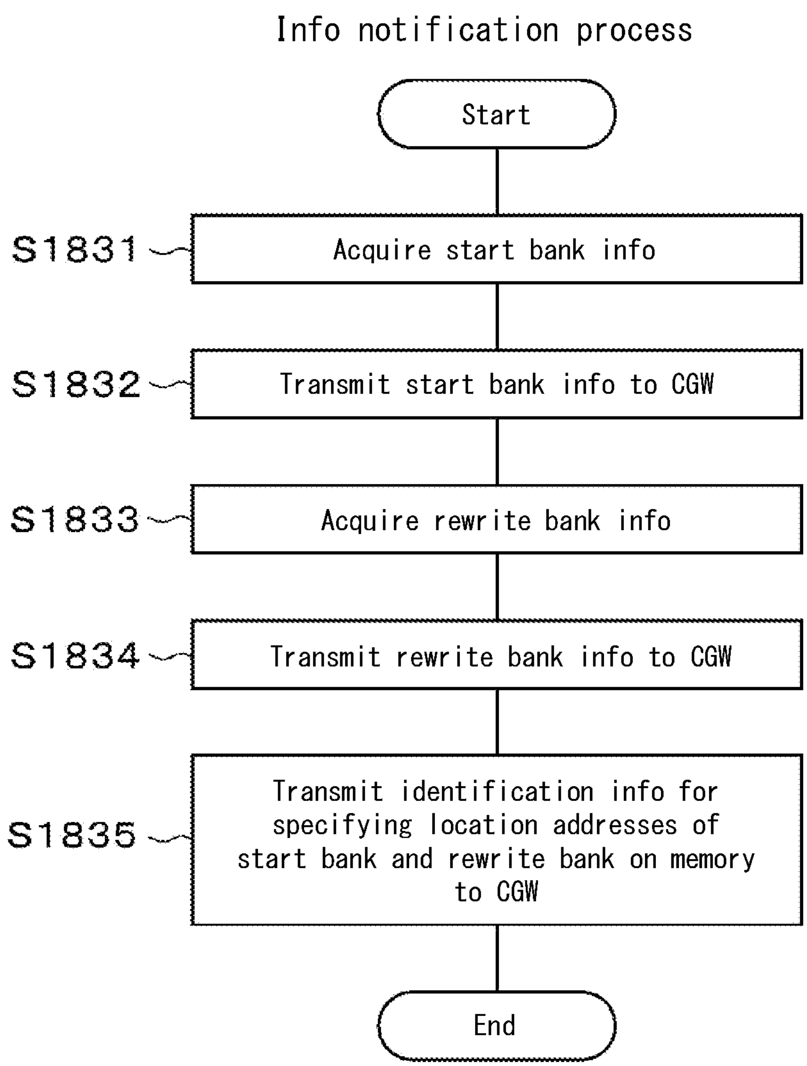
FIG. 151 is a flowchart illustrating an information notification process.
Figure 152:
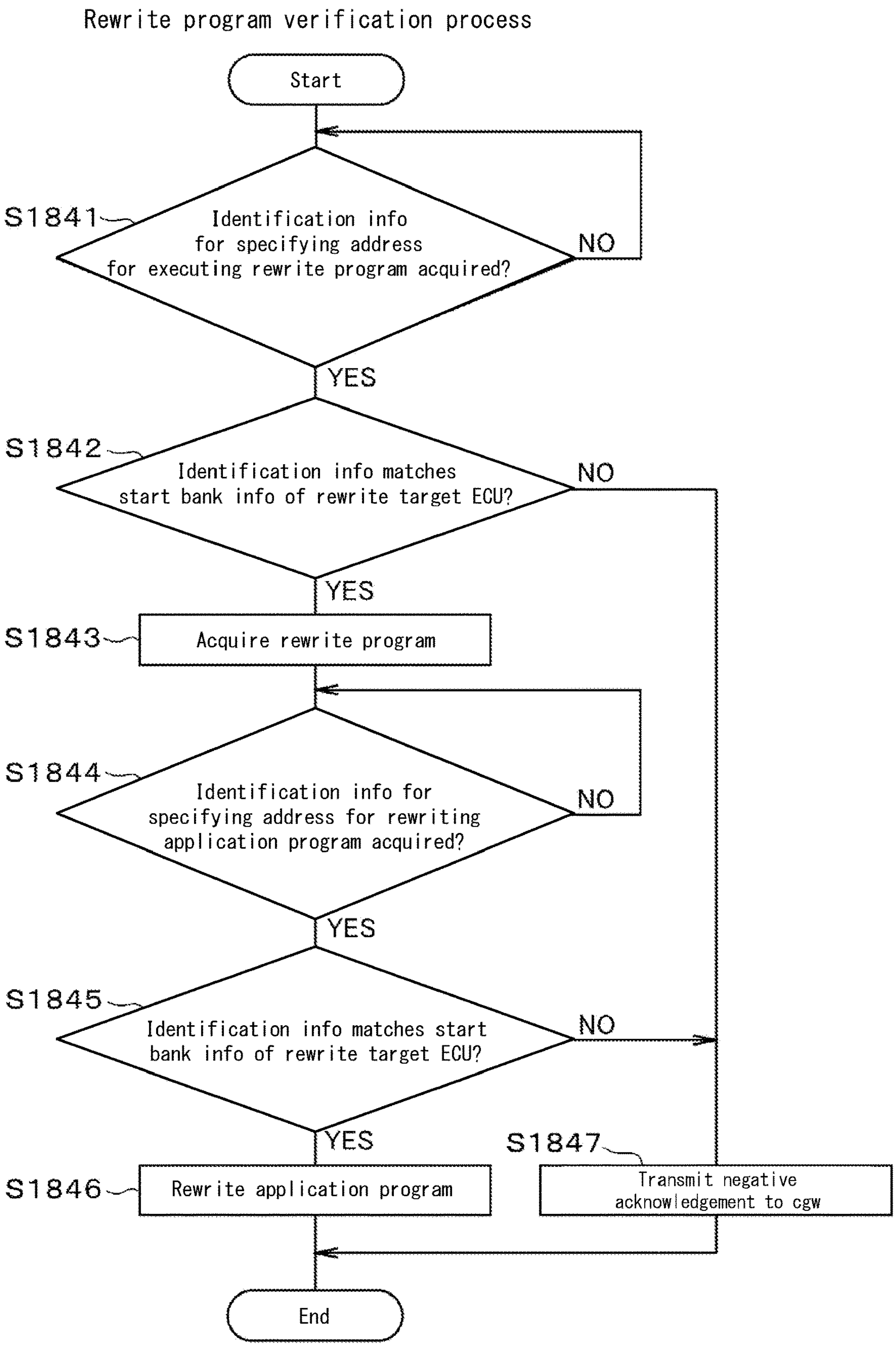
FIG. 152 is a flowchart illustrating a rewrite program verification process.
Figure 153:
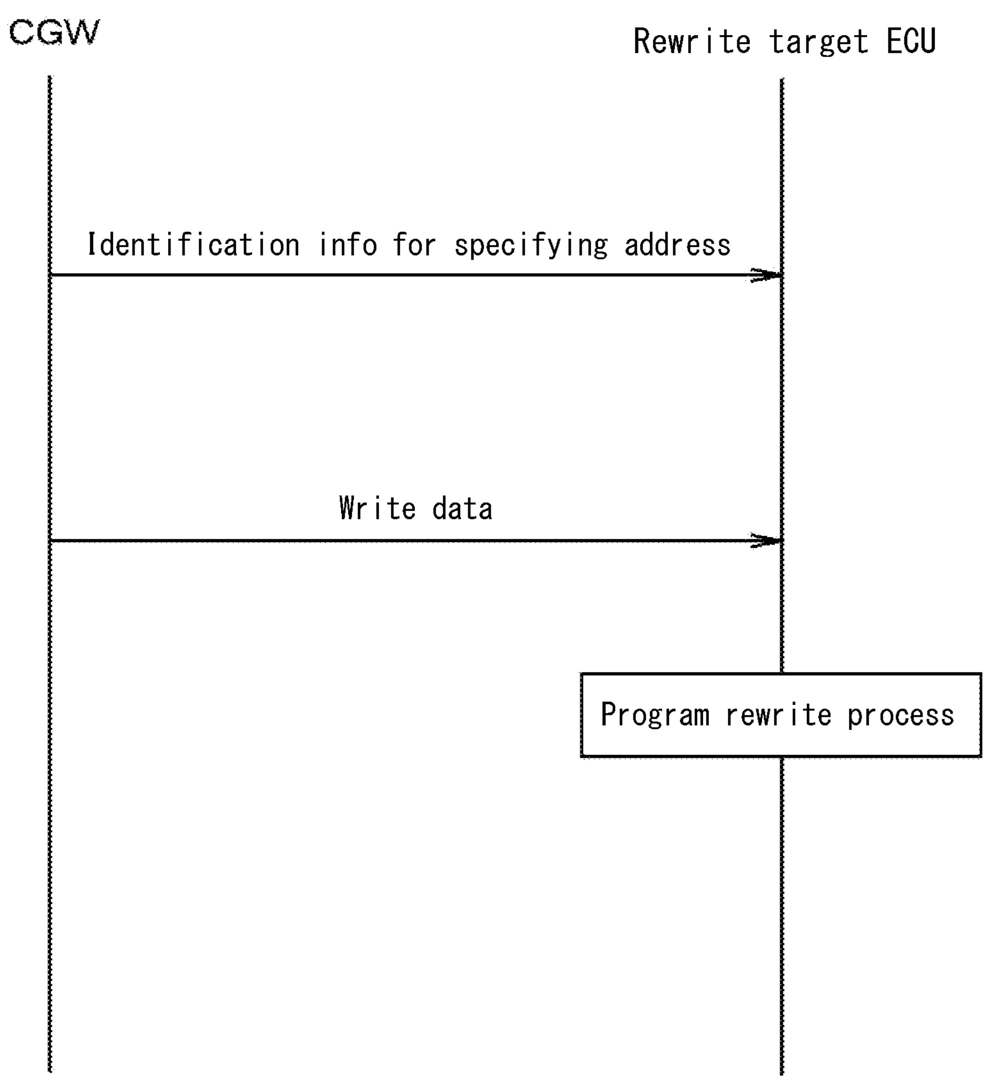
FIG. 153 is a diagram illustrating an aspect of transmitting identification information and write data.
Figure 154:
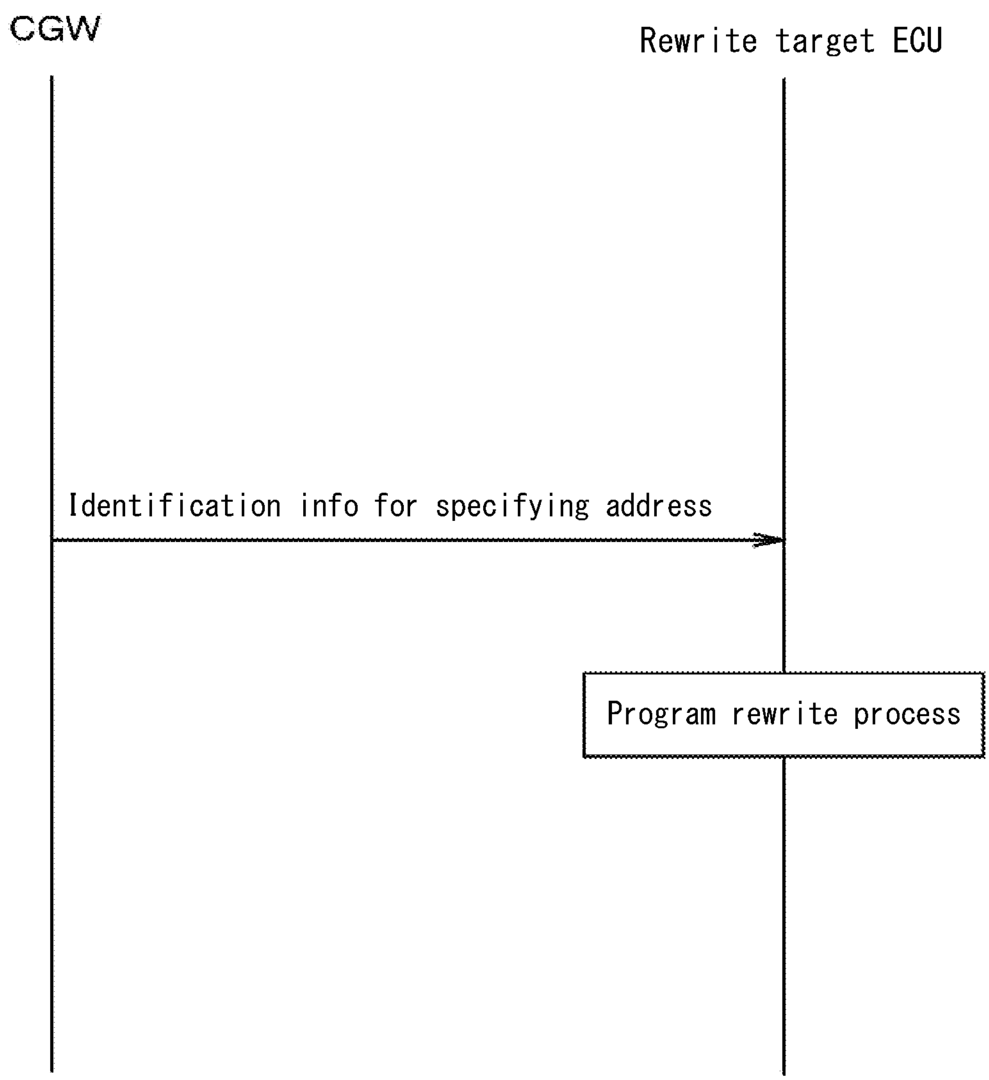
FIG. 154 is a diagram illustrating an aspect of transmitting the identification information and the write data.

As illustrated in FIG. 150, the rewrite target ECU 19 may acquire identification information for specifying an address from the CGW 13 before write data is acquired from the CGW 13. As illustrated in FIG. 151, the rewrite target ECU 19 may acquire identification information for specifying an address when write data is acquired from the CGW 13. The rewrite target ECU 19 receives rewrite specification data from the CGW 13, for example, before write data is acquired, and acquires rewrite bank information. Since the rewrite bank information includes identification data for identifying which bank is an active bank and which bank is a rewrite bank, the identification data is used as identification information for specifying an address.

The rewrite target ECU 19 performs (18-2) the rewrite operation process described above in response to the CGW 13 performing an installation instruction process. Here, the installation instruction process performed by the CGW 13 will be described.

When the installation instruction process is initiated, the CGW 13 identifies the rewrite specification data (S1851), and determines whether installation during is designated for all of the rewrite target ECUs 19, installation during vehicle traveling is designated for all of the rewrite target ECUs 19, or installation is designated for each memory type of the rewrite target ECU 19 (S1852 to S1854).

When it is determined that the installation during parking is designated for all of the rewrite target ECUs 19 (S1852: YES), the CGW 13 instructs the rewrite target ECU 19 to perform the installation on the condition that an approval for the installation has been obtained and the vehicle is parked (S1855). When it is determined that the installation during vehicle traveling is designated for all of the rewrite target ECUs 19 (S1853: YES), the CGW 13 instructs the rewrite target ECU 19 to perform the installation on condition that an approval for the installation has been obtained and the vehicle is traveling (S1856).

When it is determined that the installation is designated for each memory type of the rewrite target ECU 19 (S1854: YES), the CGW 13 determines whether the memory type is a double-bank memory, or a single-bank suspend memory or a single-bank memory on the basis of the rewrite specification data (S1857 and S1858).

When it is determined that the memory type of the rewrite target ECU 19 is the double-bank memory and satisfies a first predetermined condition (S1857: YES), the CGW 13 instructs the rewrite target ECU 19 to perform the installation on the condition that an approval for the installation has been obtained and the vehicle is traveling (S1859). When it is determined that the memory type of the rewrite target ECU 19 is the single-bank suspend memory or the single-bank memory and satisfies a second predetermined condition (S1858: YES), the CGW 13 instructs the rewrite target ECU 19 to perform the installation on the condition that an approval for the installation has been obtained and the vehicle is parked (S1860).

It is determined whether or not the installation has been completed in all of the rewrite target ECUs 19 (S1861), and, when it is determined that the installation has not been completed in all of the rewrite target ECUs 19 (S1861: NO), the CGW 13 returns to step S1851 and repeatedly performs step S1851 and the subsequent steps.

That is, when the rewrite target ECU 19 is a double-bank memory ECU, the CGW 13 gives an instruction for the installation while the vehicle is ready to travel. The double-bank memory ECU is instructed to perform the installation from the CGW 13 while the vehicle is ready to travel, and thus performs the installation while the vehicle is ready to travel (corresponding to an installation execution procedure). When the rewrite target ECU 19 is a single-bank suspend memory ECU or a single-bank memory ECU, the CGW 13 gives an instruction for the installation during parking. The single-bank suspend memory ECU or the single-bank memory ECU is instructed to perform the installation during parking from the CGW 13 and thus performs the installation during parking (corresponding to an installation execution procedure).

When it is determined that the installation has been completed in all of the rewrite target ECUs 19 (S1861: YES), it is determined whether or not the vehicle is parked (S1862), and, when, it is determined that the vehicle is parked (S1862: YES), the CGW 13 instructs the rewrite target ECU 19 to perform activation while the vehicle is parked (S1863), and finishes the installation instruction process. The rewrite target ECU 19 is instructed to perform the activation from the CGW 13 while the vehicle is parked, and thus performs the activation (corresponding to an activation execution procedure).

As described above, the rewrite target ECU 19 performs the rewrite execution control process, and thus executes a rewrite program in an active bank and rewrites an inactive bank while an application program in the active bank is being executed in a configuration having a plurality of data storage banks. A period in which an application program is rewritable is not limited to a parking state, and the application program can be rewritten during vehicle traveling. When the rewrite target ECU 19 is a double-bank memory ECU, the rewrite target ECU 19 is instructed to perform installation from the CGW 13 while the vehicle is ready to travel, and can thus perform the installation while the vehicle is ready to travel. When the rewrite target ECU 19 is a single-bank suspend memory ECU or a single-bank memory ECU, the rewrite target ECU 19 is instructed to perform installation during parking from the CGW 13, and can thus perform the installation during parking.

(19) Session Establishment Process

The session establishment process will be described with reference to FIGS. 156 to 169. The vehicle program rewriting system 1 performs the session establishment process in the rewrite target ECU 19.

Figure 156:
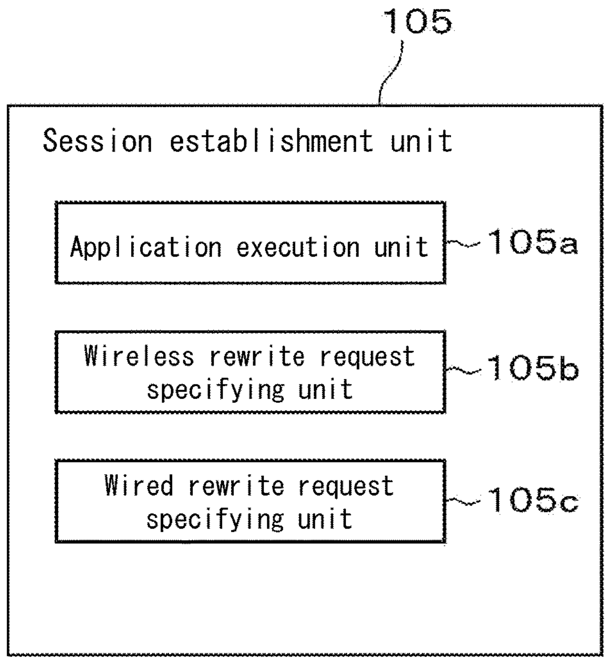
FIG. 156 is a functional block diagram of a session establishment unit, FIG. 157 a diagram illustrating a configuration of a program.

As illustrated in FIG. 156, the ECU 19 includes an application execution unit 105*a*, a wireless rewrite request specifying unit 105*b*, and a wired rewrite request specifying unit 105*c* in the session establishment unit 105. The application execution unit 105*a* has a function of arbitrating execution of each program. The wireless rewrite request specifying unit 105*b* has a function of specifying a program rewrite request in a wireless manner. The wired rewrite request specifying unit 105*c* has a function of specifying a program rewrite request in a wired manner.

Figure 157:
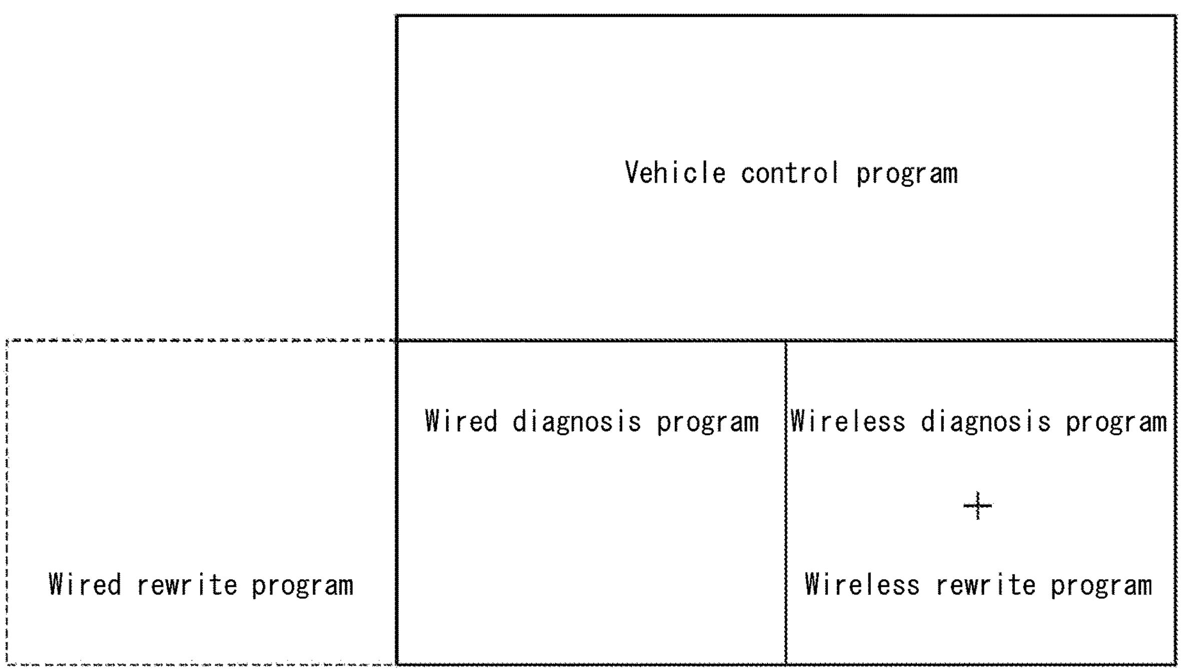

FIG. 157 illustrates a configuration of each program stored in the flash memory. A vehicle control program is a program for realizing a vehicle control function (for example, a steering control function) installed in the ECU 19. A wired diagnosis program is a program for diagnosing the ECU 19 from the outside of the vehicle in a wired manner. A wireless diagnosis program is a program for diagnosing the ECU 19 from the outside of the vehicle in a wireless manner. A wireless rewrite program is a program for rewriting a program that is acquired from the outside of the vehicle in a wireless manner. A wired rewrite program is a program for rewriting a program that is acquired from the outside of the vehicle in a wired manner. The vehicle control program is located in the application area as a first program. The wired diagnosis program and the wired rewrite program are located in the application area as a second program. The wireless diagnosis program and the wireless rewrite program are located in the application area as a third program. In other words, the second program is a program for performing wired special processes except vehicle control, and the third program is a program for performing wireless special processes except the vehicle control. The wired rewrite program may not be located in the application area but may be located in the boot area as a fourth program.

The application execution unit 105*a* controls the first program, the second program, and the third program to be executable simultaneously (performs non-exclusive control). The application execution unit 105*a* makes, for example, the vehicle control program, the wired diagnosis program, and the wireless diagnosis program executable simultaneously. That is, the application execution unit 105*a* can simultaneously execute vehicle control, wired diagnosis of the ECU 19, and wireless diagnosis of the ECU 19. Similarly, the application execution unit 105*a* performs control such that the vehicle control program, the wired diagnosis program, and the wireless rewrite program can be executed simultaneously, the vehicle control program, the wired rewrite program, and the wireless diagnosis program can be executed simultaneously, and the vehicle control program, the wired rewrite program, and the wireless rewrite program can be executed simultaneously.

On the other hand, the application execution unit 105*a* performs exclusive control such that the respective programs in the second program cannot be executed simultaneously. Similarly, the application execution unit 105*a* performs exclusive control such that the respective programs in the third program cannot be executed simultaneously. The application execution unit 105*a* subjects, for example, the wired diagnosis program and the wired rewrite program to exclusive control, and subjects the wireless diagnosis program and the wireless rewrite program to exclusive control. That is, the application execution unit 105*a* executes only one program in the wired special processes. Similarly, the application execution unit 105*a* executes only one program in the wireless special processes.

In other words, it may be said that the wireless rewrite program is located inside the wireless diagnosis program and is embedded as a part of the wireless diagnosis program. That is, with the configuration in which the wireless rewrite program is located in the wireless diagnosis program, he application execution unit 105*a* performs control such that the wireless rewrite program is executed while continuing execution of the vehicle control program and the wired diagnosis program when a state transition is made from a default session or a wireless diagnosis session to a wireless rewrite session as will be described later while executing the vehicle control program and the wired diagnosis program. The application execution unit 105*a* initiates to execute the wireless rewrite program while continuing execution of the vehicle control program and the wired diagnosis program, and thus makes the vehicle control program, the wired diagnosis program, and the wireless rewrite program executable simultaneously. That is, the application execution unit 105*a* performs control such that vehicle control, wired diagnosis of the ECU 19, and wireless rewriting of an application program can be executed simultaneously.

Here, a situation occurs in which wired diagnosis, wireless diagnosis, wired rewriting, and wireless rewriting cannot be executed simultaneously depending on specific contents of a diagnosis process and a rewrite process. For example, in a case where wired rewriting and wireless rewriting are rewriting of the same area, both of the processes collide with each other. Thus, the application execution unit 105*a* performs exclusive control on the wired diagnosis program and the wireless diagnosis program according to specific contents of a process or a request, and performs exclusive control on the wired rewrite program and the wireless rewrite program. Normal vehicle control may not be continued depending on contents of the diagnosis process. For example, in a case of the diagnosis process in which the ECU is operated and an operation result is read, the diagnosis process cannot be executed simultaneously with the normal vehicle control. In this case, the application execution unit 105*a* performs arbitration control of causing the vehicle control program to wait and executing the wired or wireless diagnosis program.

On the other hand, in a case where the wired rewrite program is not located in the application area but is located in the boot area as the fourth program, the application execution unit 105*a* performs arbitration control which is partially different from the above-described arbitration control. The wired rewrite program is located as the fourth program outside the wired diagnosis program as indicated by a dashed line in FIG. 157, and is not embedded as a part of the wired diagnosis program. In this case, when the fourth program is executed, the application execution unit 105*a* performs exclusive control so as to finish the first to third programs. That is, the application execution unit 105*a* switches from a mode of executing the first to third programs to a dedicated mode of executing the fourth program. In other words, regarding the wired rewrite program, with the configuration in which the wired rewrite program is located outside the wired diagnosis program, control is performed such that, when a state transition is made from the wired diagnosis session to the wired rewrite session as will be described later while the vehicle control program and the wireless diagnosis program are being executed, execution of the vehicle control program and the wireless diagnosis program is stopped, and execution of the wired rewrite program is initiated. The application execution unit 105*a* stops execution of the vehicle control program and the wireless diagnosis program and initiates execution of the wired rewrite program, and thus the vehicle control program, the wireless diagnosis program, and the wired rewrite program cannot be executed simultaneously, and only the wired rewrite program can be executed. That is, the application execution unit 105*a* performs control such that the vehicle control, the wireless diagnosis of the ECU 19, and the wired rewriting of an application program cannot be executed simultaneously, and only wired rewriting of the application program can be executed.

Figure 158:
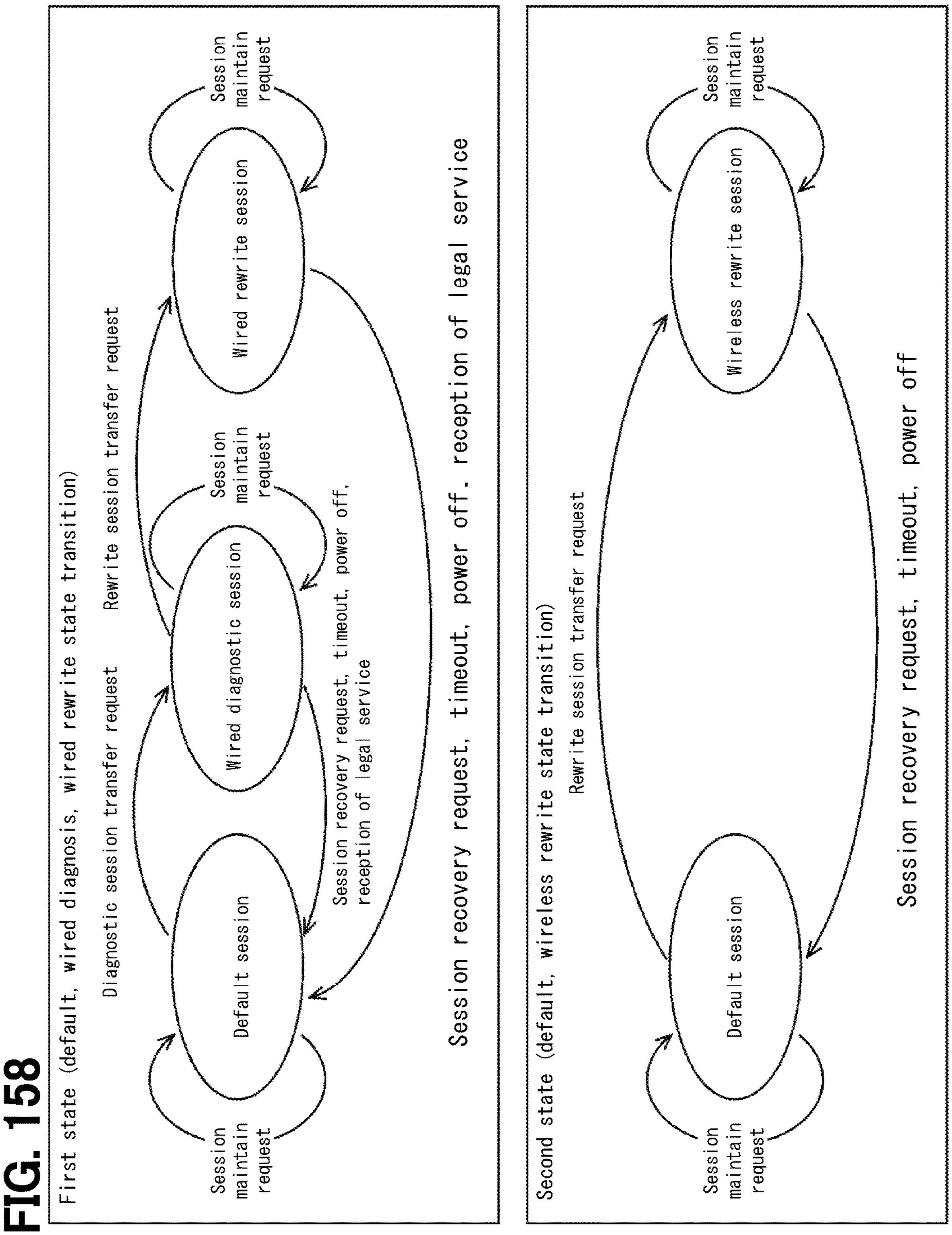
FIG. 158 is a diagram illustrating state transition.

As illustrated in FIG. 158, the application execution unit 105*a* manages a default state (default session), a wired diagnosis state (wired diagnosis session), and a wired rewrite state (wired rewrite session) as a first state related to the wired special processes. As a second state related to the wireless special processes, a default state (default session) and a wireless rewrite state (wireless rewrite session) are managed, and an internal operation state is managed.

As a state transition of the first state, the application execution unit 105*a* performs exclusive state transition among the default session in which vehicle control is possible in accordance with the diagnosis communication standard, the wired diagnosis session in which wired diagnosis of the ECU 19 is possible from the outside of the vehicle, and the wired rewrite session in which rewriting of an application program acquired from the outside of the vehicle in a wired manner is possible. The exclusive state transition of the session indicates that the sessions cannot be established simultaneously, and the non-exclusive state transition of the session indicates that the sessions can be established simultaneously.

The default session in the first state is a mode indicating a state in which the wired special process is not performed, and is a state in which vehicle control can be executed. It may also be said that the default session is a mode in which a process that does not influence the vehicle control at all, for example, a diagnosis program that is not related to the vehicle control, may be executed. The diagnosis program not related to the vehicle control is a program for reading information such as a trouble code. The wired diagnosis session is a mode of executing a diagnosis program related to diagnosis of the ECU 19. In a case of the occurrence of a state in which at least the vehicle control may be influenced by executing the diagnosis program, the default session transitions to the wired diagnosis session. The diagnosis program related to diagnosis of the ECU 19 is a program for performing communication stoppage, diagnosis masking, actuator driving, and the like. The wired rewrite session is a mode of rewriting an application program acquired from the outside of the vehicle in a wired manner.

The application execution unit 105*a* performs the session state transition in the first state as follows. When a wired diagnosis request is generated in a state of a first default session, the application execution unit 105*a* makes a transition from the first default session to the wired diagnosis session in response to a diagnosis session transition request, and executes a wired diagnosis process. The application execution unit 105*a* makes a transition from the wired diagnosis session to the first default session when a session return request is generated, a timeout is generated, the power is turned off, or a legal service is received in a state of the wired diagnosis session. When a wired rewrite request is generated in a state of the first default session, the application execution unit 105*a* makes a transition from the first default session to the wired diagnosis session in response to a diagnosis session transition request, then makes a transition from the wired diagnosis session to the wired rewrite session in response to a rewrite session transition request, and executes a wired rewrite process. The application execution unit 105*a* makes a transition from the wired rewrite session to the first default session when a session restoration request is generated, a timeout is generated, the power is turned off, or a legal service is received in a state of the wired rewrite session. The application execution unit 105*a* maintains the current session without making a transition in response to a session maintenance request.

As a state transition of the second state, the application execution unit 105*a* makes an exclusive state transition between a default session in which the vehicle control is possible in accordance with the diagnosis communication standard and a wireless rewrite session related to rewriting of an application program acquired from the outside of the vehicle in a wireless manner. The wireless rewrite session is a mode of rewriting an application program acquired from the outside of the vehicle in a wireless manner.

The application execution unit 105*a* performs the session state transition in the second state as follows. When a wireless rewrite request is generated in a state of a second default session, the application execution unit 105*a* makes a transition from the second default session to the wireless rewrite session in response to a rewrite session transition request, and executes a wireless rewrite process. The application execution unit 105*a* makes a transition from the wireless rewrite session to the second default session when a session return request is generated, a timeout occurs, or the power is turned off in a state of the wireless rewrite session. The application execution unit 105*a* maintains the current session without making a transition in response to a session maintenance request.

The application execution unit 105*a* manages the first state related to the wired special process and the second state related to the wireless special process while executing the vehicle control program as the first program. For example, when a wired diagnosis request is generated in the default session in both of the first state and the second state, the application execution unit 105*a* causes the first state to transition to the wired diagnosis session while continuing the vehicle control program, and initiates execution of the wired diagnosis program. In this state, when a wireless rewrite request is generated, the application execution unit 105*a* causes the second state to transition to the wireless rewrite session while continuing execution of the vehicle control program and the wired diagnosis program, and initiates execution of the wireless rewrite program. In this state, when a wired rewrite request is generated, the application execution unit 105*a* finishes, for example, the execution of the wireless rewrite program, causes the second state to transition to the default session, finishes the execution of the wired diagnosis program, causes the first state to transition to the wired rewrite session, and initiates execution of the wired rewrite program. The application execution unit 105*a* performs an exclusive state transition such that the wired rewrite session in the first state and the wireless rewrite session in the second state are not established simultaneously, in order to prevent write processes in the same memory area from colliding with each other (exclusive control).

The wireless rewrite request specifying unit 105*b* determines identification information regarding a rewrite request received from the outside, and specifies a wireless rewrite request. That is, when reprogramming data is downloaded from the center device 3 to the DCM 12, and the CGW 13 distributes the reprogramming data transferred from the DCM 12 to the rewrite target ECU 19, the wireless rewrite request specifying unit 105*b* specifies the wireless rewrite request by receiving the identification information indicating the wireless rewrite request from the CGW 13 along with the reprogramming data.

The wired rewrite request specifying unit 105*c* determines identification information regarding a rewrite request received from the outside, and specifies a wired rewrite request. That is, when the tool 23 is connected to the DLC connector 22, and the CGW 13 distributes reprogramming data transferred from the tool 23 to the rewrite target ECU 19, the wired rewrite request specifying unit 105*c* specifies the wired rewrite request by receiving the identification information indicating the wired rewrite request along with the reprogramming data from the CGW 13.

The identification information may be, for example, information corresponding to different identification IDs in the wired rewrite request and the wireless rewrite request, and may be information corresponding to the same identification ID but different data in the wired rewrite request and the wireless rewrite request. That is, any information may be used as long as the wired rewrite request and the wireless rewrite request can be differentiated from each other.

Figure 159:
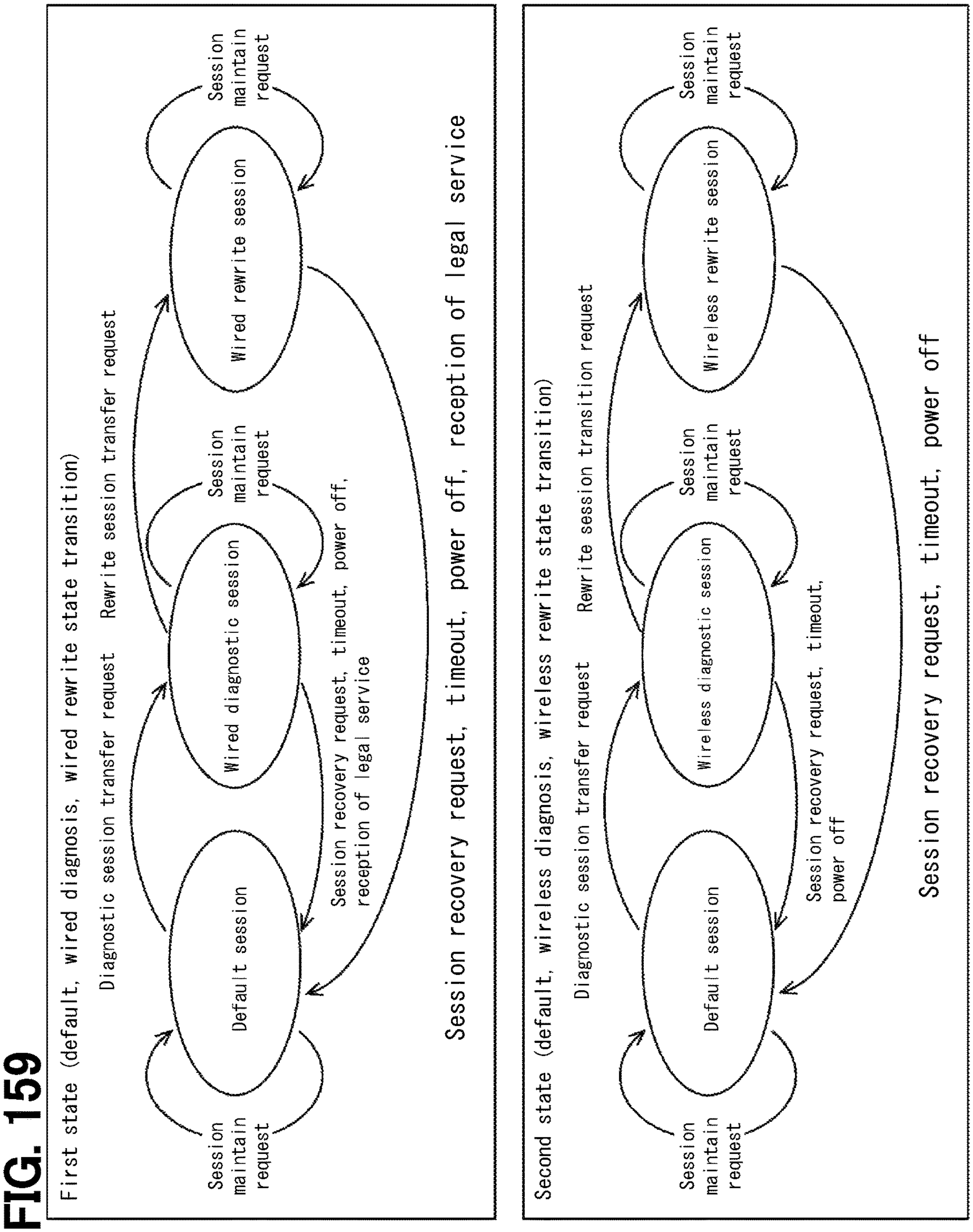
FIG. 159 is a diagram illustrating the state transition.
Figure 160:
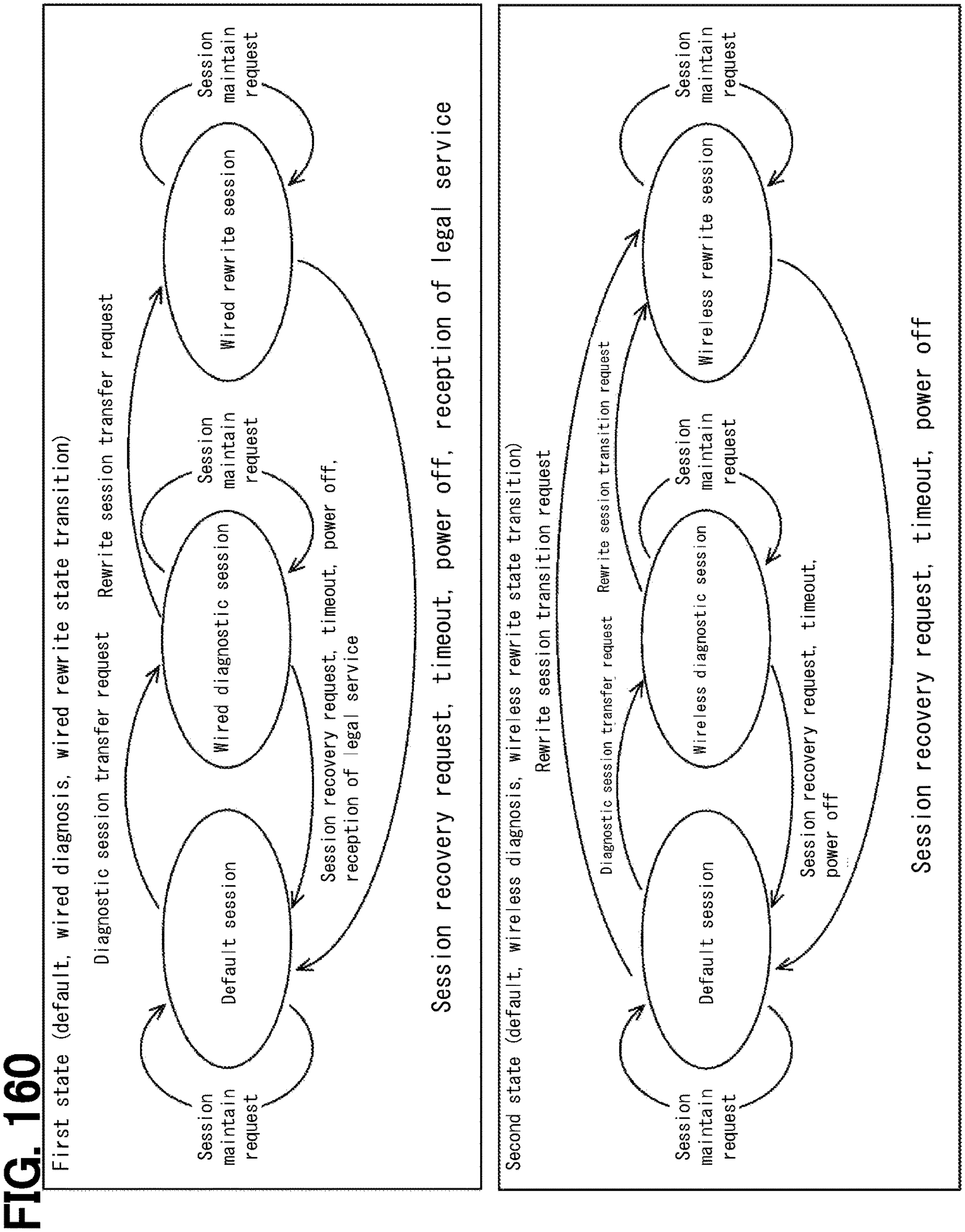
FIG. 160 is a diagram illustrating the state transition.
Figure 163:
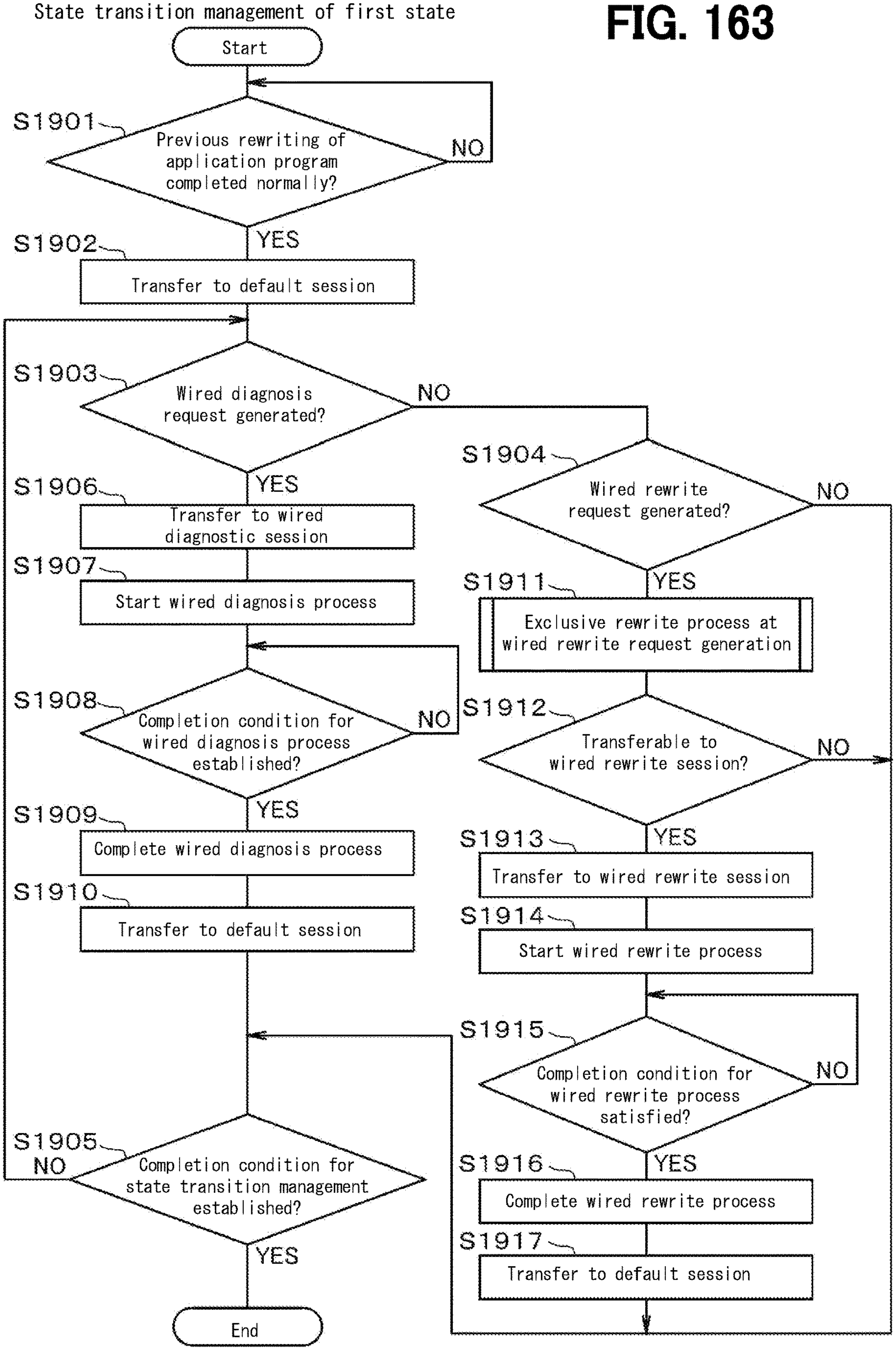
FIG. 163 is a flowchart illustrating a state transition management process of a first state.
Figure 164:
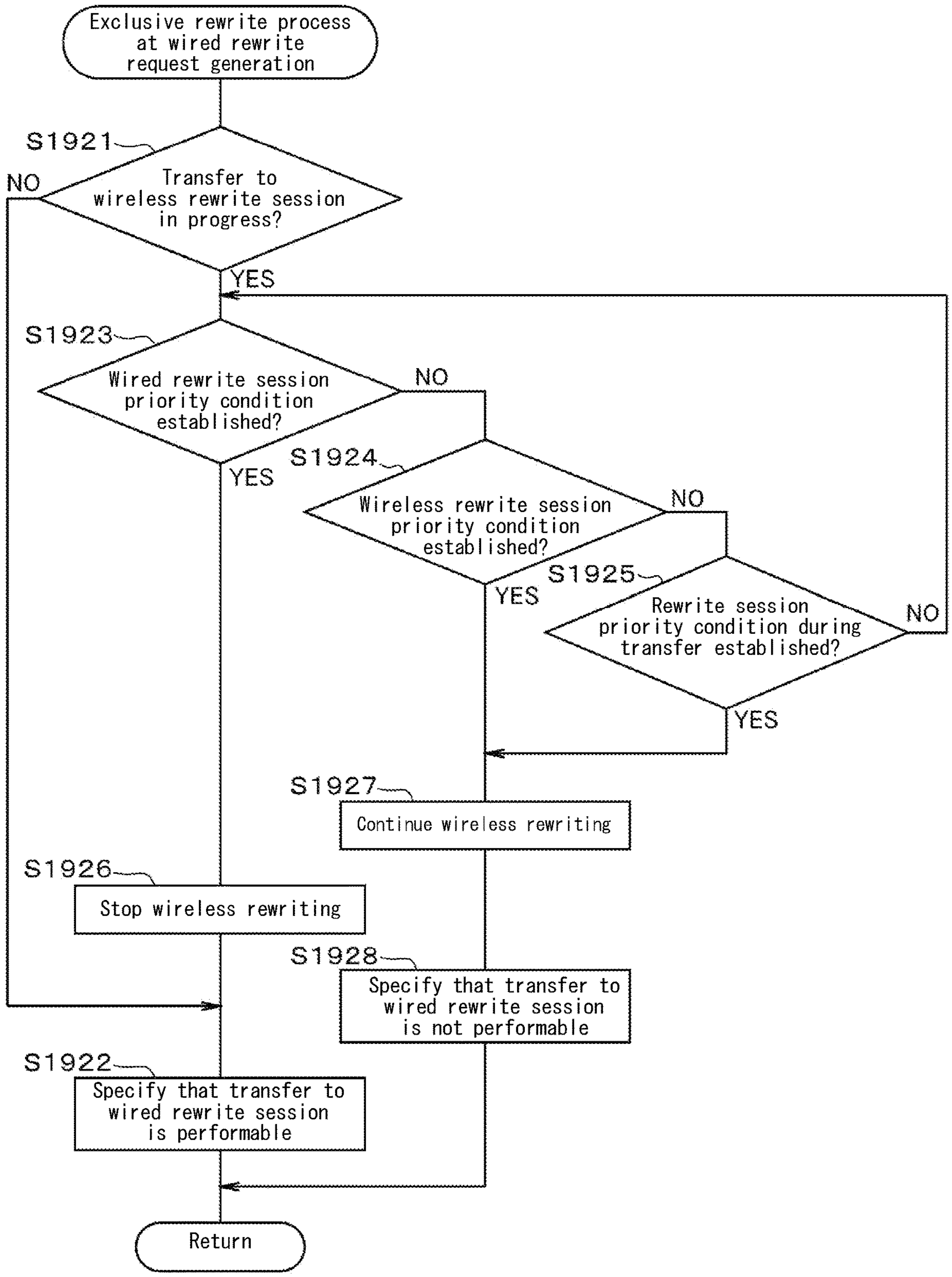
FIG. 164 is a flowchart illustrating the state transition management process of the first state.

In the application execution unit 105*a*, in FIG. 158, the configuration of managing the two states of the default session and the wireless rewrite session as the second state related to the wireless special process has been described, but, as illustrated in FIGS. 159 and 160, there may be a configuration of managing three states of the default session, the wireless diagnosis session, and the wireless rewrite session as the second state. The wireless diagnosis session is a mode of executing a wireless diagnosis program for diagnosing the ECU 19 from the outside of the vehicle in a wireless manner. In a case of executing a wireless diagnosis program that can influence at least the vehicle control, a transition is made to the wireless diagnosis session.

In a case of the configuration illustrated in FIG. 159, the application execution unit 105*a* performs a state transition of the second state as follows. When a wireless diagnosis request is generated in a state of the second default session, the application execution unit 105*a* makes a transition from the second default session to the wireless diagnosis session in response to a diagnosis session transition request, and executes a wireless diagnosis process. The application execution unit 105*a* makes a transition from the wireless diagnosis session to the second default session when a session return request is generated a timeout is generated, or the power is turned off in a state of the wireless diagnosis session. When a wireless rewrite request is generated in a state of the second default session, the application execution unit 105*a* makes a transition from the second default session to the wireless diagnosis session in response to a diagnosis session transition request, then makes a transition from the wireless diagnosis session to the wireless rewrite session in response to a rewrite session transition request, and executes a wireless rewrite process. The application execution unit 105*a* makes a transition from the wireless rewrite session to the second default session when a session return request is generated, a timeout is generated, or the power is turned off in a state of the wireless rewrite session.

In a case of the configuration illustrated in FIG. 160, the application execution unit 105*a* performs a state transition of the second state as follows. When a wireless diagnosis request is generated in a state of the second default session, the application execution unit 105*a* makes a transition from the second default session to the wireless diagnosis session in response to a diagnosis session transition request, and executes a wireless diagnosis process. The application execution unit 105*a* makes a transition from the wireless diagnosis session to the second default session when a session return request is generated a timeout is generated, or the power is turned off in a state of the wireless diagnosis session. When a wireless rewrite request is generated in a state of the second default session, the application execution unit 105*a* makes a transition from the second default session to the wireless diagnosis session in response to a diagnosis session transition request, then makes a transition from the wireless diagnosis session to the wireless rewrite session in response to a rewrite session transition request, or makes a transition from the second default session to the wireless rewrite session in response to the rewrite session transition request, and executes the wireless rewrite process. The application execution unit 105*a* makes a transition from the wireless rewrite session to the second default session when a session return request is generated, a timeout is generated, or the power is turned off in a state of the wireless rewrite session.

In the wired diagnosis session in the first state and the wireless diagnosis session in the second state, the same diagnosis program may be executed or different diagnosis programs may be executed. In the wired rewrite session in the first state and the wireless rewrite session in the second state, the same rewrite program may be executed or different rewrite programs may be executed. For example, a common rewrite program such as erasure or writing for a memory may be executed.

Arbitration of each session in the first state and each session in the second state in the configurations illustrated in FIGS. 159 and 160 will be described. As described in FIG. 157, a description will be made of a case where the wired diagnosis program is located in the application area as the second program, the wireless diagnosis program and the wireless rewrite program are located in the application area as the third program, and the wired diagnosis program is located in the boot area as the fourth program. In other words, a description will be made of a configuration in which the wireless rewrite program is embedded as a part of the wireless diagnosis program, but the wired rewrite program is not embedded as a part of the wired diagnosis program. In this case, arbitration of program execution in each session in the first state and the second state is as illustrated in FIG. 161.

In a case where the second state is the wireless rewrite session and the first state is the default session, the application execution unit 105*a* executes the wireless rewrite program while executing the vehicle control program. In a case where the second state is the wireless rewrite session and the first state is the wired diagnosis session, the application execution unit 105*a* simultaneously executes the wireless rewrite program and the wired diagnosis program while executing the vehicle control program.

On the other hand, in a case where the first state is the wired rewrite session and the second state is the default session, the application execution unit 105*a* finishes the vehicle control program and executes only the wired rewrite program. In a case where the first state is the wired rewrite session and the second state is the wireless diagnosis session, the application execution unit 105*a* finishes the wireless diagnosis program and the vehicle control program, and executes only the wired rewrite program. That is, the application execution unit 105*a* exclusively controls the first to third programs as a dedicated mode of executing only the wired rewrite program that is the fourth program.

In a configuration in which the wired diagnosis program and the wired rewrite program are located in the application area as the second program, the arbitration of each program is partially different from that in FIG. 161. That is, in a configuration in which the wireless rewrite program is embedded as a part of the wireless diagnosis program and the wired rewrite program is embedded as a part of the wired diagnosis program, arbitration of program execution in each session in the first state and the second state is as illustrated in FIG. 162. In this case, when the first state is the wired rewrite session and the second state is the default session, the application execution unit 105*a* executes the wired rewrite program while executing the vehicle control program. In a case where the first state is the wired rewrite session and the second state is the wireless diagnosis session, the application execution unit 105*a* simultaneously executes the wired rewrite program and the wireless diagnosis program while executing the vehicle control program.

Next, an operation of the above-described configuration will be described with reference to FIGS. 163 to 167. In the ECU 19, the microcomputer 33 executes a session establishment program and thus performs the session establishment process.

When the microcomputer 33 is started by detecting the supply of power, the microcomputer 33 executes the session establishment program to perform a state transition management process, and performs a state transition management process of managing a state transition of the first state and a state transition management process of managing a state transition of the second state. Each state transition management process will be described below. Here, a description will be made of a case where the application execution unit 105*a* manages the second state by using the configuration illustrated in FIG. 158, that is, the configuration having no wireless diagnosis session.

(19-1) State Transition Management Process of First State

When the microcomputer 33 is started by detecting the supply of power, and initiates the state transition management process of the first state, the microcomputer 33 determines a rewrite completion flag, and determines whether or not rewriting of the previous application program has been completed normally (S1901). When it is determined that the rewrite completion flag is positive, and it is determined that rewriting of the previous application program has been completed normally (S1901: YES), the microcomputer 33 causes the first state to transition to the default session (S1902). That is, the microcomputer 33 causes the first state to transition to the default session, and thus initiates the vehicle control process.

When the vehicle control process is initiated by executing the vehicle control program, while executing the vehicle control process, the microcomputer 33 determines whether or not a wired diagnosis request has been generated (S1903), determines whether or not a wired rewrite request has been generated (S1904), and determines whether a completion condition for the state transition management is established (S1905). When it is determined that a wired diagnosis request has been generated (S1903: YES) while executing the vehicle control process, the microcomputer 33 causes the first state to transition from the default session to the wired diagnosis session (S1906), and executes the wired diagnosis program to initiate the wired diagnosis process (S1907). It is determined whether the completion condition for the wired diagnosis process is established (S1908), and, when it is determined that the completion condition for the wired diagnosis process is established (S1908: YES), the microcomputer 33 finishes the wired diagnosis program to finish the wired diagnosis process (S1909), and causes the first state to transition from the wired diagnosis session to the default session (S1910).

When it is determined that a wired rewrite request has been generated (S1904: YES) while executing the vehicle control process, the microcomputer 33 initiates an exclusive rewrite process at the time of generation of a wired rewrite request (S1911). That is, the process is a process for performing exclusive control such that the wired rewrite process and the wireless rewrite process do not collide with each other. When the exclusive rewrite process at the time of generation of the wired rewrite request is initiated, the microcomputer 33 determines whether or not a transition to the wireless rewrite session is in progress in the second state, that is, whether or not the second state is the wireless rewrite session (S1921). When it is determined that the transition to the wireless rewrite session is not in progress in the second state (S1921: NO), the microcomputer 33 specifies that the first state can transition to the wired rewrite session (S1922). The microcomputer 33 finishes the exclusive rewrite process at the time of generation of the wired rewrite request, and returns to the state transition management process of the first state.

When it is determined that the transition to the wireless rewrite session is in progress in the second state (S1921: YES), the microcomputer 33 determines whether or not to perform exclusive control by giving priority to either the wired rewrite session or the wireless rewrite session. Specifically, the microcomputer 33 determines whether or not any of a wired rewrite session priority condition, a wireless rewrite session priority condition, and a rewrite session priority condition during transition is established (S1923 to S1925). The wired rewrite session priority condition is a condition that the wired rewrite session is prioritized to the wireless rewrite session. The wireless rewrite session priority condition is a condition that the wireless rewrite session is prioritized to the wired rewrite session. The rewrite session priority condition during transition is a condition that a rewrite session during transition is prioritized, that is, a session of which a transition is performed earlier is prioritized. Which of these priority conditions is employed is set in advance, and, for example, a priority condition flag may be set for the vehicle, and the priority condition flag may be set for each rewrite ECU.

When it is determined that the wired rewrite session priority condition is established (S1923: YES), the microcomputer 33 causes the second state to transition from the wireless rewrite session to the default session in response to a session return request, stops the wireless rewriting (S1926), and specifies that the first state can transition to the wired rewrite session (S1922). The microcomputer 33 finishes the wireless rewrite program in accordance with the transition to the default session. The microcomputer 33 finishes the exclusive rewrite process at the time of generation of the wired rewrite request, and returns to the state transition management process of the first state.

When it is determined that the wireless rewrite session priority condition is established (S1924: YES), the microcomputer 33 discards the wired rewrite request and continues the wireless rewriting (S1927). That is, the microcomputer 33 maintains the second state in the wireless rewrite session, continues to execute the wireless rewrite program, and specifies that the first state cannot transition to the wired rewrite session (S1928). The microcomputer 33 finishes the exclusive rewrite process at the time of generation of the wired rewrite request, and returns to the state transition management process of the first state.

When it is determined that the rewrite session priority condition during transition is established (S1925: YES), also in this case, the microcomputer 33 discards the wired rewrite request and continues the wireless rewriting (S1927). That is, the microcomputer 33 maintains the second state in the wireless rewrite session, continues to execute the wireless rewrite program, and specifies that the first state cannot transition to the wired rewrite session (S1928). The microcomputer 33 finishes the exclusive rewrite process at the time of generation of the wired rewrite request, and returns to the state transition management process of the first state. The microcomputer 33 executes the exclusive rewrite process at the time of generation of the wired rewrite request as mentioned above, and thus the wired rewrite session and the wireless rewrite session are exclusively controlled not to be established simultaneously.

When the microcomputer 33 returns to the state transition management process of the first state, the microcomputer 33 determines whether or not the first state can transition to the wired rewrite session as a result of the exclusive rewrite process at the time of generation of the wired rewrite request (S1912). When it is specified and thus determined that the first state can transition to the wired rewrite session through the exclusive rewrite process at the time of generation of the wired rewrite request (S1912: YES), the microcomputer 33 causes the first state to transition from the default session to the wired rewrite session via the wired diagnosis session (S1913), stops the vehicle control process, and initiates the wired rewrite process (S1914). The microcomputer 33 finishes the vehicle control program in accordance with the transition to the wired rewrite session.

It is determined whether the completion condition for the wired rewrite process is established (S1915), and, when it is determined that a completion condition for the wired rewrite process is established (S1915: YES), the microcomputer 33 finishes the wired rewrite process (S1916), and causes the first state to transition from the wired rewrite session to the default session (S1917). Here, the completion condition for the wired rewrite process is, for example, a case where writing of the entire application program has been completed and integrity verification is executed.

When it is specified and thus determined that the first state cannot transition to the wired rewrite session through the exclusive rewrite process at the time of generation of the wired rewrite request (S1912: NO), the microcomputer 33 does not cause the first state to transition from the default session to the wired rewrite session via the wired diagnosis session. That is, the microcomputer 33 maintains the first state in the default session. When it is determined that a completion condition for the state transition management is established (S1905: YES), the microcomputer 33 completes the state transition management process of the first state.

In the above description, a description has been made of a case where, when it is determined that a transition to the wireless rewrite session is in progress in the second state in the exclusive rewrite process at the time of generation of the wired rewrite request, and it is determined that the wired rewrite session priority condition is established, the microcomputer 33 stops the wireless rewriting in the second state, but the microcomputer 33 may determine whether or not to stop the wireless rewrite session according to a non-rewritten remaining amount in the wireless rewriting.

When it is determined that the transition to the wireless rewrite session is in progress in the second state (S1921: YES), and it is determined that the wired rewrite session priority condition is established (S1923: YES), the microcomputer 33 determines whether or not a non-rewritten remaining amount in the wireless rewriting is equal to or larger than a predetermined amount (for example, 20% or more) in the wireless rewrite session during the transition (S1931). When it is determined that the non-rewritten remaining amount in the wireless rewriting is equal to or larger than the predetermined amount (S1931: YES), the microcomputer 33 causes the second state to transition from the wireless rewrite session to the default session, and stops the wireless rewriting (S1926). The microcomputer 33 finishes the wireless rewrite program in accordance with the transition to the default session. When it is determined that the non-rewritten remaining amount of the wireless rewriting is not equal to or larger than the predetermined amount (S1931: NO), the microcomputer 33 discards the wired rewrite request and continues the wireless rewriting (S1927). That is, the microcomputer 33 stops the wireless rewrite session when the remaining time until completion of the wireless rewriting is relatively long, but does not stop and continues the wireless rewrite session when the remaining time until completion of the wireless rewriting is relatively short.

(19-2) State Transition Management Process of Second State

When the microcomputer 33 is started by detecting the supply of power, and initiates the state transition management process of the second state, the microcomputer 33 determines a rewrite completion flag, and determines whether or not rewriting of the previous application program has been completed normally (S1941). When it is determined that the rewrite completion flag is positive, and it is determined that rewriting of the previous application program has been completed normally (S1941: YES), the microcomputer 33 causes the second state to transition to the default session (S1942). That is, the microcomputer 33 causes the second state to transition to the default session, and thus executes the vehicle control program to initiate the vehicle control process.

When the vehicle control process is initiated, the microcomputer 33 determines whether or not a wireless rewrite request has been generated (S1943), and determines whether a completion condition for the state transition management is established (S1944). When it is determined that a wireless diagnosis request has been generated (S1943: YES) while executing the vehicle control process, the microcomputer 33 initiates an exclusive rewrite process at the time of generation of a wireless rewrite request (S1944). When the exclusive rewrite process at the time of generation of the wireless rewrite request is initiated, the microcomputer 33 determines whether or not a transition to the wired rewrite session is in progress in the first state, that is, whether or not the first state is the wired rewrite session (S1961). When it is determined that the transition to the wired rewrite session is not in progress in the first state (S1961: NO), the microcomputer 33 specifies that transition to the wireless rewrite session can occur (S1962). The microcomputer 33 finishes the exclusive rewrite process at the time of generation of the wireless rewrite request, and returns to the state transition management process of the second state.

When it is determined that the transition to the wired rewrite session is in progress in the first state (S1961: YES), the microcomputer 33 determines whether or not to perform exclusive control by giving priority to either the wired rewrite session or the wireless rewrite session. Specifically, the microcomputer 33 determines whether or not any of a wireless rewrite session priority condition, a wired rewrite session priority condition, and a rewrite session priority condition during transition is established (S1963 to S1965).

When it is determined that the wireless rewrite session priority condition is established (S1963: YES), the microcomputer 33 causes the first state to transition from the wired rewrite session to the default session in response to a session return request, stops the wired rewriting (S1966), and specifies that the second state can transition to the wireless rewrite session (S1962). The microcomputer 33 finishes the wired rewrite program in accordance with the transition to the default session. The microcomputer 33 finishes the exclusive rewrite process at the time of generation of the wireless rewrite request, and returns to the state transition management process of the second state.

When it is determined that the priority condition for the wired rewrite session is established (S1964: YES), the microcomputer 33 discards the wireless rewrite request and continues the wired rewriting (S1967). That is, the microcomputer 33 maintains the first state in the wired rewrite session, continues execution of the wired rewrite program, and specifies that the second state cannot transition to the wireless rewrite session (S1968). The microcomputer 33 finishes the exclusive rewrite process at the time of generation of the wireless rewrite request, and returns to the state transition management process of the second state.

When it is determined that the rewrite session priority condition during transition is established (S1965: YES), also in this case, the microcomputer 33 discards the wireless rewrite request and continues the wired rewriting (S1967). That is, the microcomputer 33 maintains the first state in the wired rewrite session, continues execution of the wired rewrite program, and specifies that the second state cannot transition to the wireless rewrite session (S1968). The microcomputer 33 finishes the exclusive rewrite process at the time of generation of the wireless rewrite request, and returns to the state transition management process of the second state. The microcomputer 33 executes the exclusive rewrite process at the time of generation of the wireless rewrite request as mentioned above, and thus the wired rewrite session and the wireless rewrite session are exclusively controlled not to be established simultaneously.

When the microcomputer 33 returns to the state transition management process of the second state, the microcomputer 33 determines whether or not the second state can transition to the wireless rewrite session as a result of the exclusive rewrite process at the time of generation of the wireless rewrite request (S1945). When it is specified and thus determined that the second state can transition to the wireless rewrite session through the exclusive rewrite process at the time of generation of the wireless rewrite request (S1945: YES), the microcomputer 33 causes the second state to transition from the default session to the wireless rewrite session (S1946), and executes the wireless rewrite program to initiate the wireless rewrite process (S1847). It is determined whether the completion condition for the wireless rewrite process is established (S1948), and, when it is determined that a completion condition for the wireless rewrite process is established (S1948: YES), the microcomputer 33 finishes the wireless rewrite process (S1949), and causes the second state to transition from the wireless rewrite session to the default session (S1950). The microcomputer 33 finishes the wireless rewrite program in accordance with the transition to the default session. Here, the completion condition for the wireless rewrite process is, for example, a case where writing of the entire application program has been completed and the integrity verification is executed.

When it is specified and thus determined that the second state cannot transition to the wireless rewrite session through the exclusive rewrite process at the time of generation of the wireless rewrite request (S1945: NO), the microcomputer 33 does not cause the second state to transition from the default session to the wireless rewrite session. That is, the microcomputer 33 maintains the second state in the default session. When it is determined that a completion condition for the state transition management is established (S1951: YES), the microcomputer 33 finishes the state transition management process of the second state.

Figure 165:
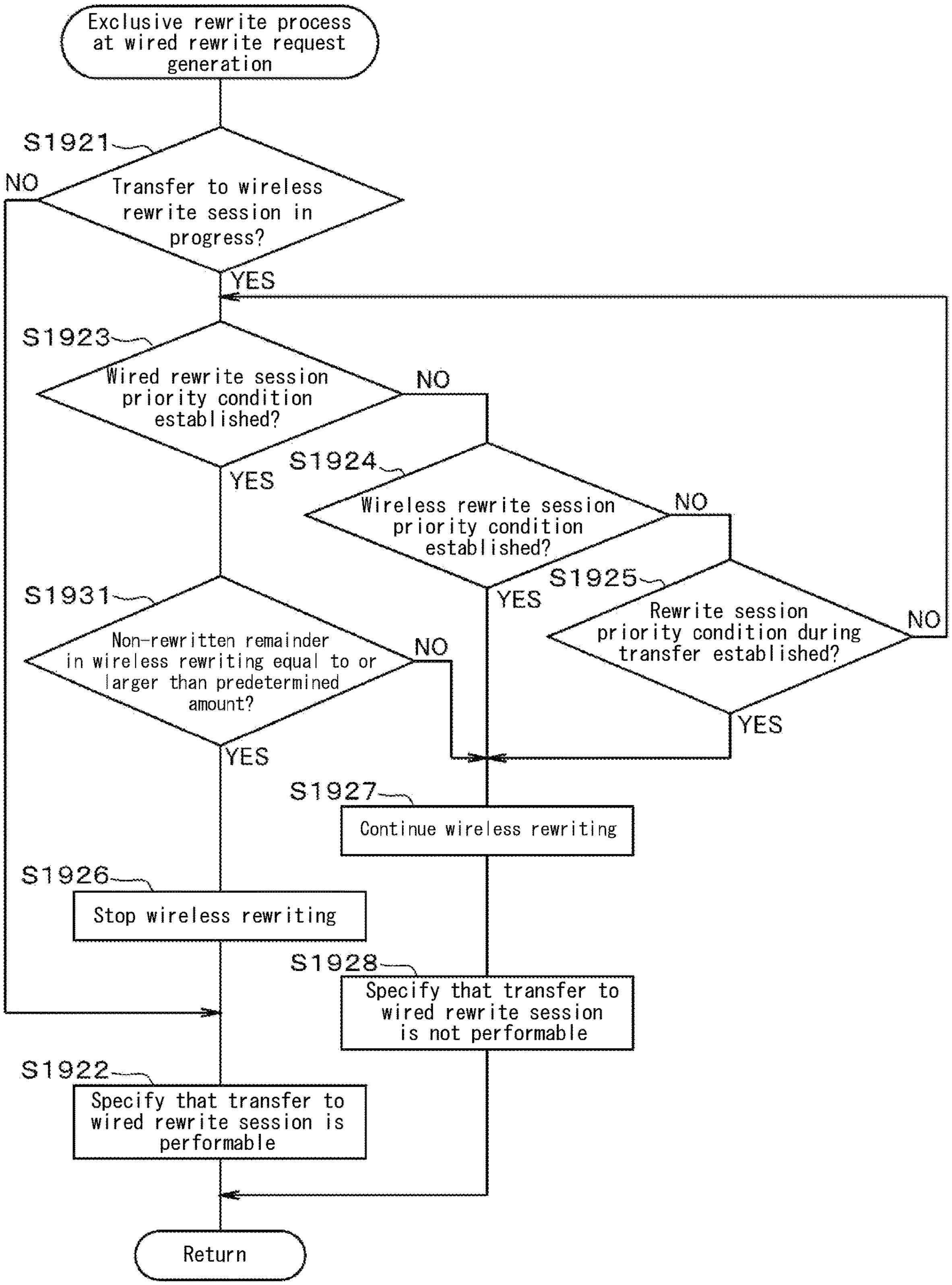
FIG. 165 is a flowchart illustrating the state transition management process of the first state.

In the above description, a description has been made of a case where the application execution unit 105*a* can execute the program related to the wired special process and the program related to the wireless special process independently (simultaneously), but there may be a configuration in which the wired diagnosis program and the wireless diagnosis program are shared as illustrated in FIG. 165. In the configuration, the vehicle control program is located in the application area as the first program, and the diagnosis program (the wired diagnosis program and the wireless diagnosis program) and the wireless rewrite program are located in the application area as the second program. The wired rewrite program may be located in the application area as the second program, or may be located in the boot area as the third program. The application execution unit 105*a* simultaneously executes the first program and the second program. That is, the application execution unit 105*a* performs control such that the vehicle control program and the common diagnosis program can be executed simultaneously. On the other hand, the application execution unit 105*a* exclusively controls execution of each program forming the second program. That is, only one of the wired diagnosis program, the wireless diagnosis program, the wireless rewrite program, and the wired rewrite program is controlled to be operated.

Figure 166:
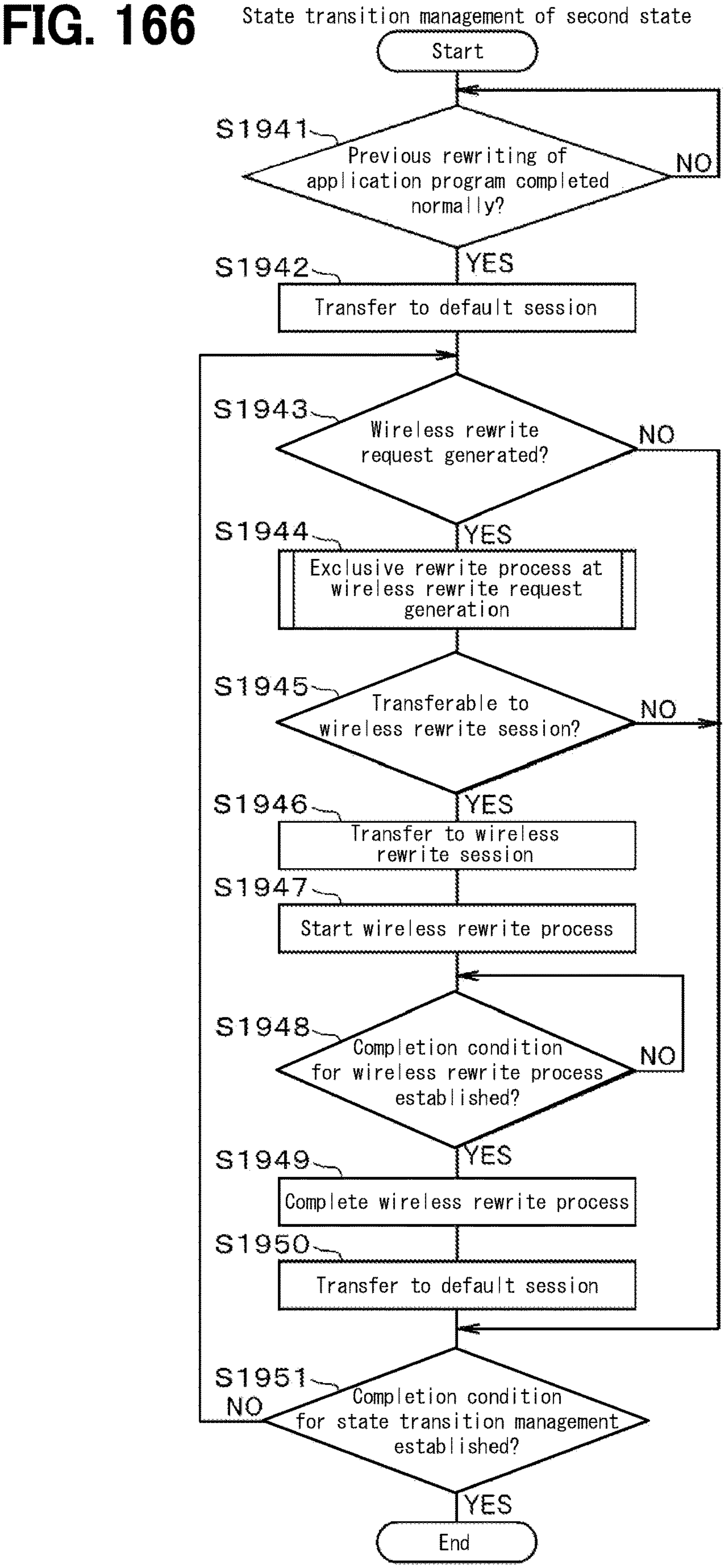
FIG. 166 is a flowchart illustrating a state transition management process of a second state.
Figure 167:
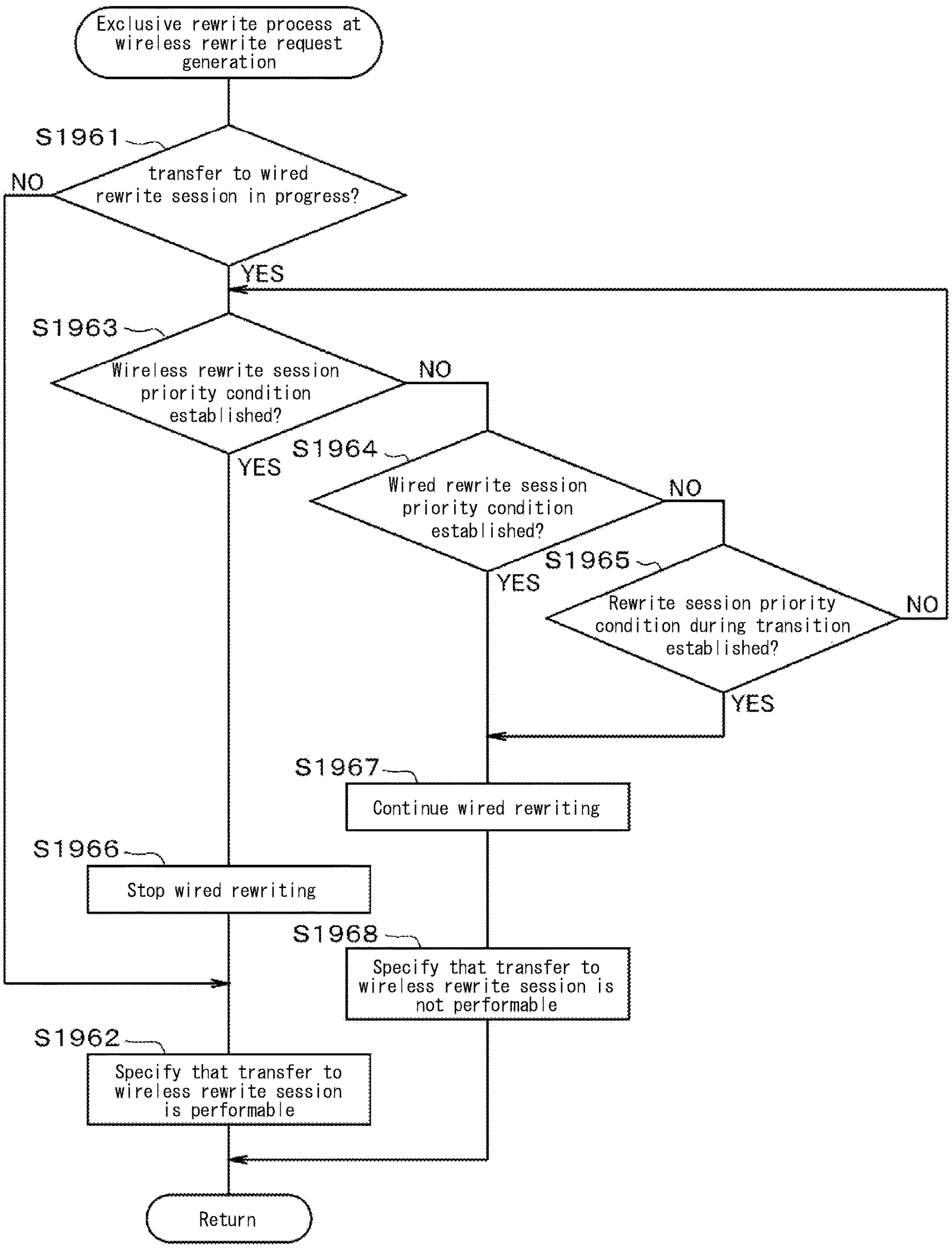
FIG. 167 is a flowchart illustrating the state transition management process of the second state, FIG. 168 a diagram illustrating a configuration of a program.
Figure 168:
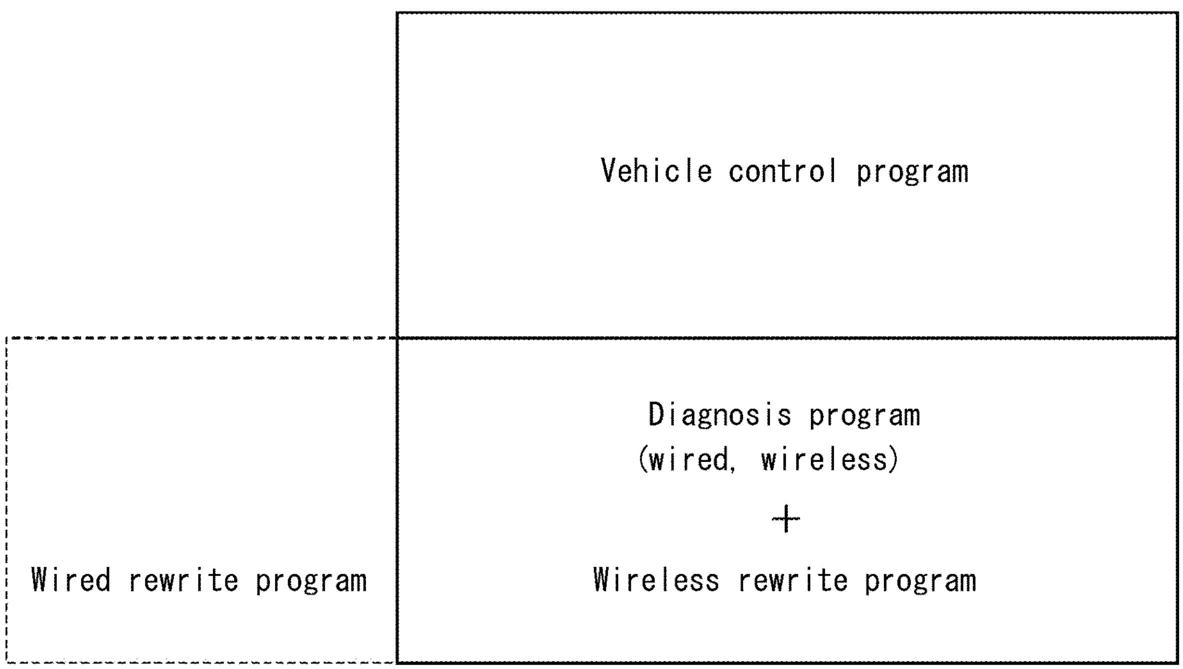
Figure 169:
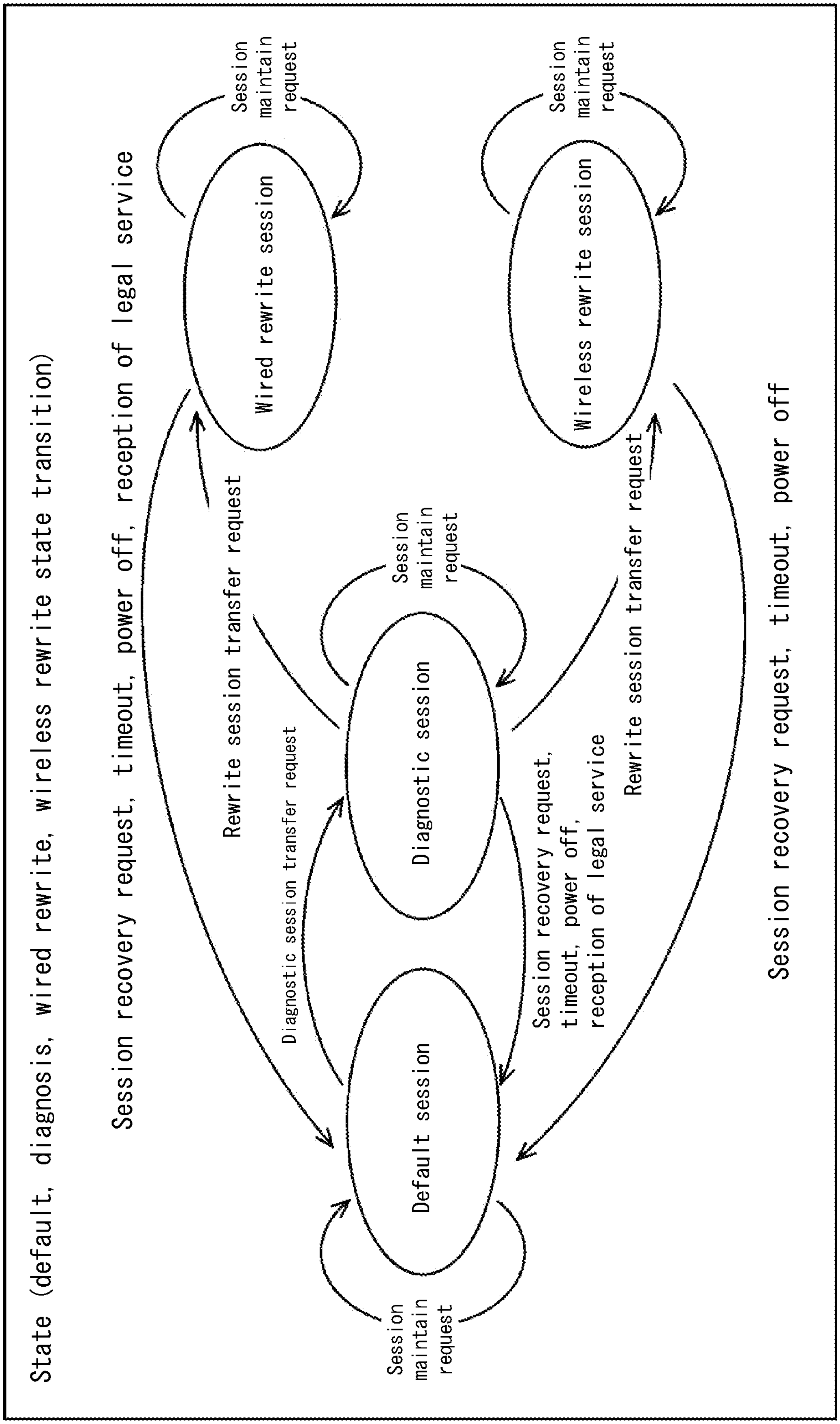
FIG. 169 is a diagram illustrating state transition.

As illustrated in FIG. 166, the application execution unit 105*a* manages the default state (default session), the diagnosis state (diagnosis session), the wired rewrite state (wired rewrite session), and the wireless rewrite state (wireless rewrite session) as the states, and manages an internal operation state. The states managed here are not managed independently in a wired and wireless manner, but are managed as one state in a mixed manner.

Also in this configuration, the application execution unit 105*a* initiates execution of the diagnosis program while executing the vehicle control program. The application execution unit 105*a* initiates execution of the wireless rewrite program or the wired rewrite program while executing the vehicle control program. On the other hand, the application execution unit 105*a* exclusively controls execution of the wireless diagnosis program and the wired diagnosis program. The application execution unit 105*a* also exclusively controls execution of the wired diagnosis program and the wireless diagnosis program, and the wired rewrite program and the wireless rewrite program. That is, the application execution unit 105*a* exclusively controls execution of each program forming the second program.

Here, in a case where the wired rewrite program is located in the boot area as the third program, the application execution unit 105*a* exclusively controls execution of the third program, and the first and second programs. That is, in a case where the wired rewrite program is executed, the first program and the second program are finished and are operated in a dedicated mode.

As illustrated in FIG. 166, when a diagnosis request is generated, the application execution unit 105*a* makes a transition to the diagnosis session while continuing execution of the vehicle control program, and initiates execution of the diagnosis program. In this state, when a wireless rewrite request is generated, the application execution unit 105*a* finishes the diagnosis program, makes a transition to the wireless rewrite session, and initiates execution of the wireless rewrite program. Execution of the vehicle control program is continued. On the other hand, in a case where a wired rewrite request is generated, the application execution unit 105*a* finishes the diagnosis program and the vehicle control program, makes a transition to the wired rewrite session, and initiates execution of the wired rewrite program.

Even when the wireless rewrite program is located inside the diagnosis program, the application execution unit 105*a* stops execution of the vehicle control program and the diagnosis program and then initiates execution of the wireless rewrite program when a state transition is made from the diagnosis session to the wireless rewrite session during execution of the vehicle control program and the diagnosis program. In a case where there is no session, the process can be continued.

When the wired rewrite program is located outside the diagnosis program, the application execution unit 105*a* stops execution of the vehicle control program and the wireless diagnosis program and initiates execution of the wired rewrite program when a state transition is made from the diagnosis session to the wired rewrite session during execution of the vehicle control program and the diagnosis program. That is, the application execution unit 105*a* performs control such that the vehicle control, the wired or wireless diagnosis of the ECU 19, and the wired rewriting of an application program cannot be executed simultaneously, and only the wired rewriting of the application program can be executed.

As described above, the ECU 19 performs the session establishment process, thus executes the state transition management process of the first state and the state transition management process of the second state, manages a state transition of each session of the first state and the second state, and non-exclusively establishes the default session or the wired diagnosis session of the first state and the wireless rewrite session of the second state. The vehicle control program or the diagnosis program for the ECU 19 and the wireless rewrite program are controlled to be executed non-exclusively in response to requests for the vehicle control or the diagnosis of the ECU 19 and the wireless rewriting of a program, and thus it is possible to appropriately arbitrate various requests from the outside.

In the ECU 19, the wired rewrite session and the wireless rewrite session are exclusively established. The wired rewrite program and the wireless rewrite program are controlled to be executed exclusively, and wired rewriting of the program and wireless rewriting of the program can be appropriately arbitrated.

In the ECU 19, when the wired rewrite session priority condition is established, the wired rewrite session is prioritized to the wireless rewrite session. The wired rewrite session priority condition is set, and thus wired rewriting of the program can be executed prior to wireless rewriting of the program. For example, wired rewriting of a program for which an instruction is given by a maintenance person in a dealer or the like can be executed prior to wireless rewriting of the program for which an instruction is given by a user of a vehicle.

In the ECU 19, the wireless rewrite session is prioritized to the wired rewrite session when the wireless rewrite session priority condition is established. The wireless rewrite session priority condition is set, and thus wireless rewriting of a program can be executed prior to wired rewriting of the program. For example, wireless rewriting of a program for which an instruction is given by a user of a vehicle can be executed prior to wired rewriting of the program for which an instruction is given by a maintenance person in a dealer or the like.

In the ECU 19, when the rewrite session priority condition during transition is established, a rewrite session during transition is prioritized. The rewrite session priority condition during transition is set, and thus rewriting during transition can be preferentially executed. That is, one of wired rewriting and wireless rewriting, which has been initiated earlier, can be continued without stoppage.

In a configuration having double-bank application areas, the vehicle control program, the diagnosis program, and the wireless rewrite program are located in each application area, and the vehicle control program or the diagnosis program and the wireless rewrite program are executed in parallel (simultaneously). A memory configuration of the flash memory 30*d* is devised, and thus the vehicle control program or the diagnosis program and the wireless rewrite program can be executed in parallel.

When a wireless rewrite request is specified during execution of the vehicle control program or the wired diagnosis program, execution of the vehicle control program or the wired diagnosis program is continued, and the wireless rewrite program is executed. When a wireless rewrite request is generated during execution of the vehicle control program or the wired diagnosis program, the vehicle control program or the wired diagnosis program and the wireless rewrite program can be executed in parallel (simultaneously).

When a vehicle control request or a wired diagnosis request is specified during execution of the wireless rewrite program, execution of the wireless rewrite program is continued, and the vehicle control program or the wired diagnosis program is executed. When a vehicle control request or a wired diagnosis request is generated during execution of the wireless rewrite program, the wireless rewrite program and the vehicle control program or the wired diagnosis program can be executed in parallel (simultaneously).

When a wired rewrite request is specified during execution of while the vehicle control program or the wireless diagnosis program, execution of the vehicle control program or the wireless diagnosis program is stopped, and the wired rewrite program is executed. When a wired rewrite request is generated during execution of the vehicle control program or the wireless diagnosis program, only the wired rewrite program can be executed exclusively.

In a case of the reprogramming firmware embedded type in which reprogramming firmware is embedded, the rewrite program is executed by using the firmware located in the application area. It is possible to execute a rewrite process on an application program in an inactive bank without downloading the reprogramming firmware from the outside.

In a case of the reprogramming firmware download type in which reprogramming firmware is downloaded from the outside, the rewrite program is executed by using the firmware downloaded from the outside. It is possible to execute a rewrite process on an application program in an inactive bank after reducing a capacity of a rewrite program in the application area.

Although the double-bank memory having two tangible application areas has been described, the present embodiment is also applicable to a single-bank suspend memory or an external memory having two pseudo-application areas.

Although a description has been made of a case of difference rewriting in which new data is generated from old data and difference reprogramming data, the present embodiment is also applicable to a case of rewriting in which the entire new data is written by deleting old data.

Although a description has been made of a case where an application program of the ECU 19 is rewritten, the present embodiment is also applicable to a case of rewriting an application program of the CGW 13. That is, the flash memory 26*d* of the CGW 13 may have a double-bank configuration equivalent to that of the flash memory 30*d* of the ECU 19, and the microcomputer 26 may have a function equivalent to that of the microcomputer 33 of the ECU 19.

(20) Retry Point Specifying Process

The retry point specifying process will be described with reference to FIGS. 170 to 174. The vehicle program rewriting system 1 performs the retry point specifying process in the rewrite target ECU 19. The retry point is information indicating a portion corresponding to a completed process in order to resume stopped writing of write data halfway when writing of the write data is stopped in a case where the write data is written a plurality of times. As a case where writing of write data is stopped, for example, there is a case where cancellation occurs due to the user operation, a case where an abnormality such as communication disruption occurs, and a case where ignition switches from an OFF state to an ON state in a parking state.

In the ECU 19, the program rewriting unit 102 shares a series of processes related to rewriting of an application program among a plurality of rewrite programs. The program rewriting unit 102 includes a first rewrite program for performing a first process and a second rewrite program for performing a second process, and sequentially executes the respective rewrite programs. The first process performed by the first rewrite program is, for example, a memory erasure process of erasing data in the flash memory and a data write process for writing write data. The second process performed by the second rewrite program is, for example, a verification process and a falsification check process.

Figure 170:
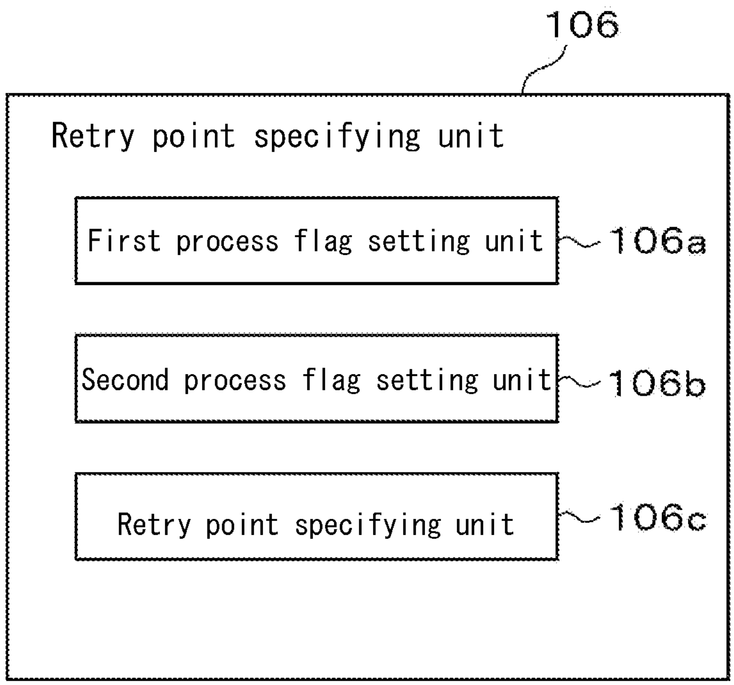
FIG. 170 is a functional block diagram of a retry point specifying unit.

As illustrated in FIG. 170, the ECU 19 includes a first process flag setting unit 106*a*, a second process flag setting unit 106*b*, and a retry point specifying unit 106*c* in the retry point specifying unit 106. When the program rewriting unit 102 executes the first rewrite program, the first process flag setting unit 106*a* determines whether or not the program rewriting unit 102 has completed the first process by using the first rewrite program, and sets a first process flag indicating the determination result. When it is determined that the program rewriting unit 102 has completed the first process, the first process flag setting unit 106*a* sets the first process flag to "OK".

When the program rewriting unit 102 executes the second rewrite program, the second process flag setting unit 106*b* determines whether or not the program rewriting unit 102 has completed the second process by using the second rewrite program, and sets a second process flag indicating the determination result. When it is determined that the program rewriting unit 102 has completed the second process, the second process flag setting unit 106*b* sets the second process flag to "OK".

Figure 171:
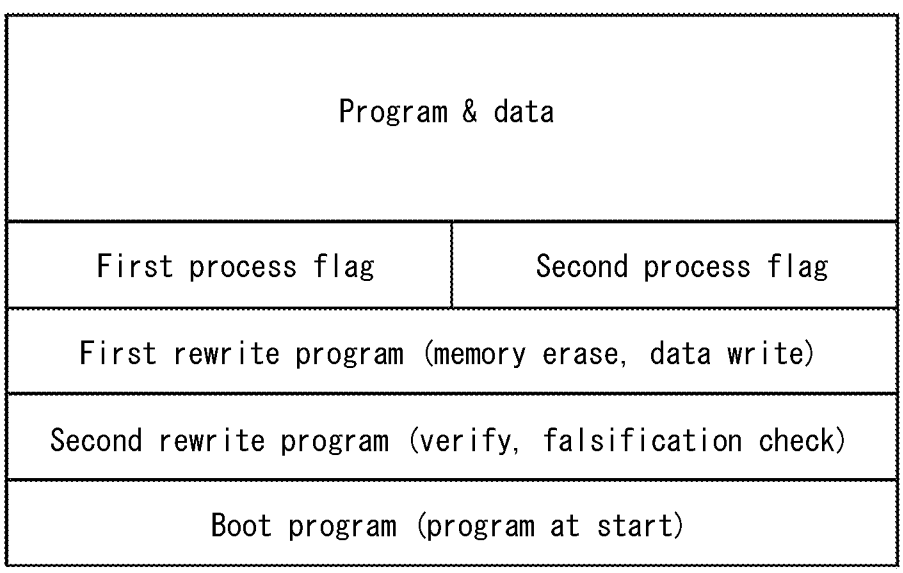
FIG. 171 is a diagram illustrating a configuration of a flash memory.

The retry point specifying unit 106*c* specifies a retry point when the program rewriting unit 102 retries rewriting of an application program according to the first process flag and the second process flag in a case where a part of the process related to the rewriting of the program is stopped. The retry point specifying unit 106*c* stores a write amount of update data until the stoppage, and requests the CGW 13 to transmit the update data on the basis of the stored write amount of the update data in a case where the process related to rewriting of the program is resumed. As illustrated in FIG. 171, the first process flag and the second process flag are stored in the same block of the flash memory of the rewrite target ECU 19.

Figure 172:
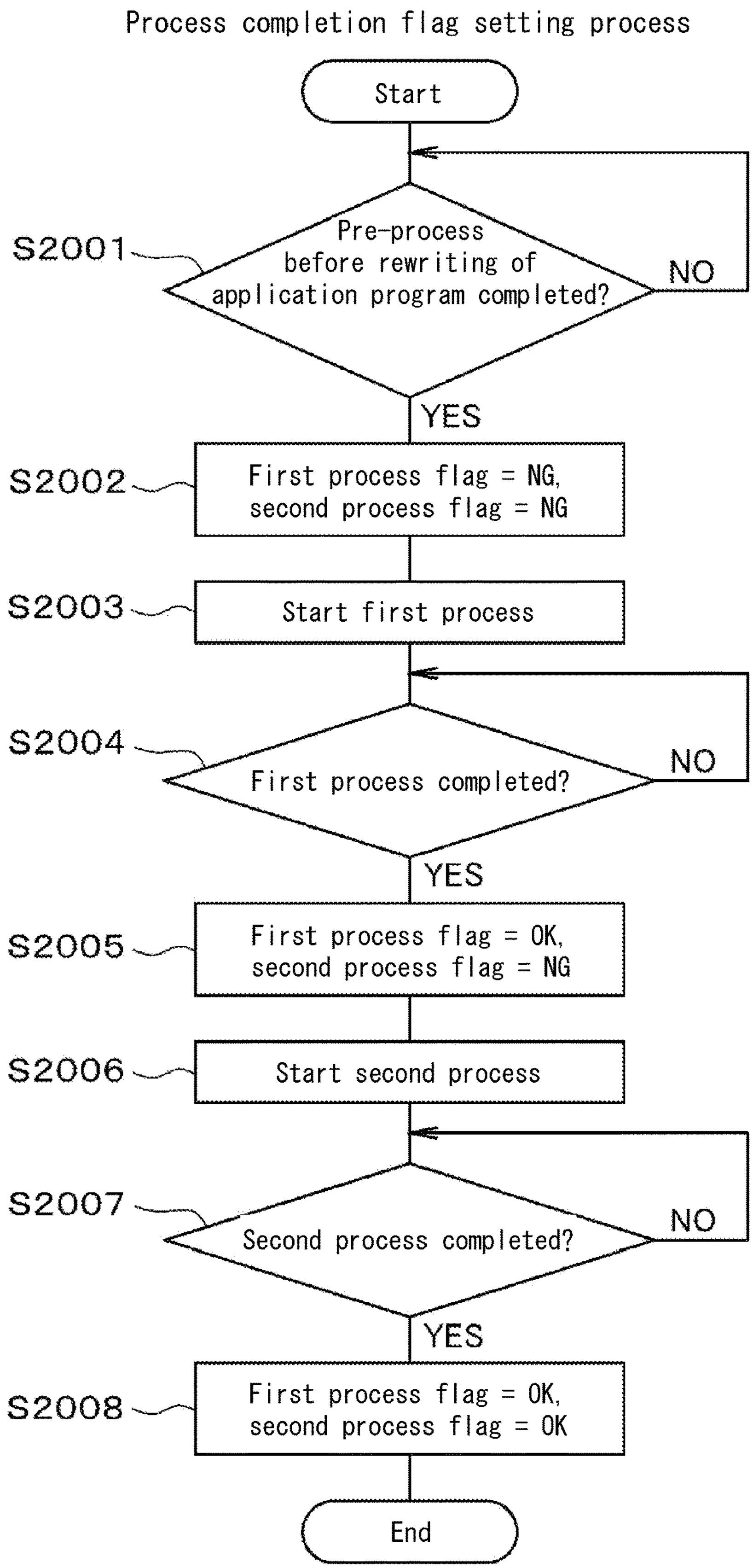
FIG. 172 is a flowchart illustrating a process flag setting process.
Figure 173:
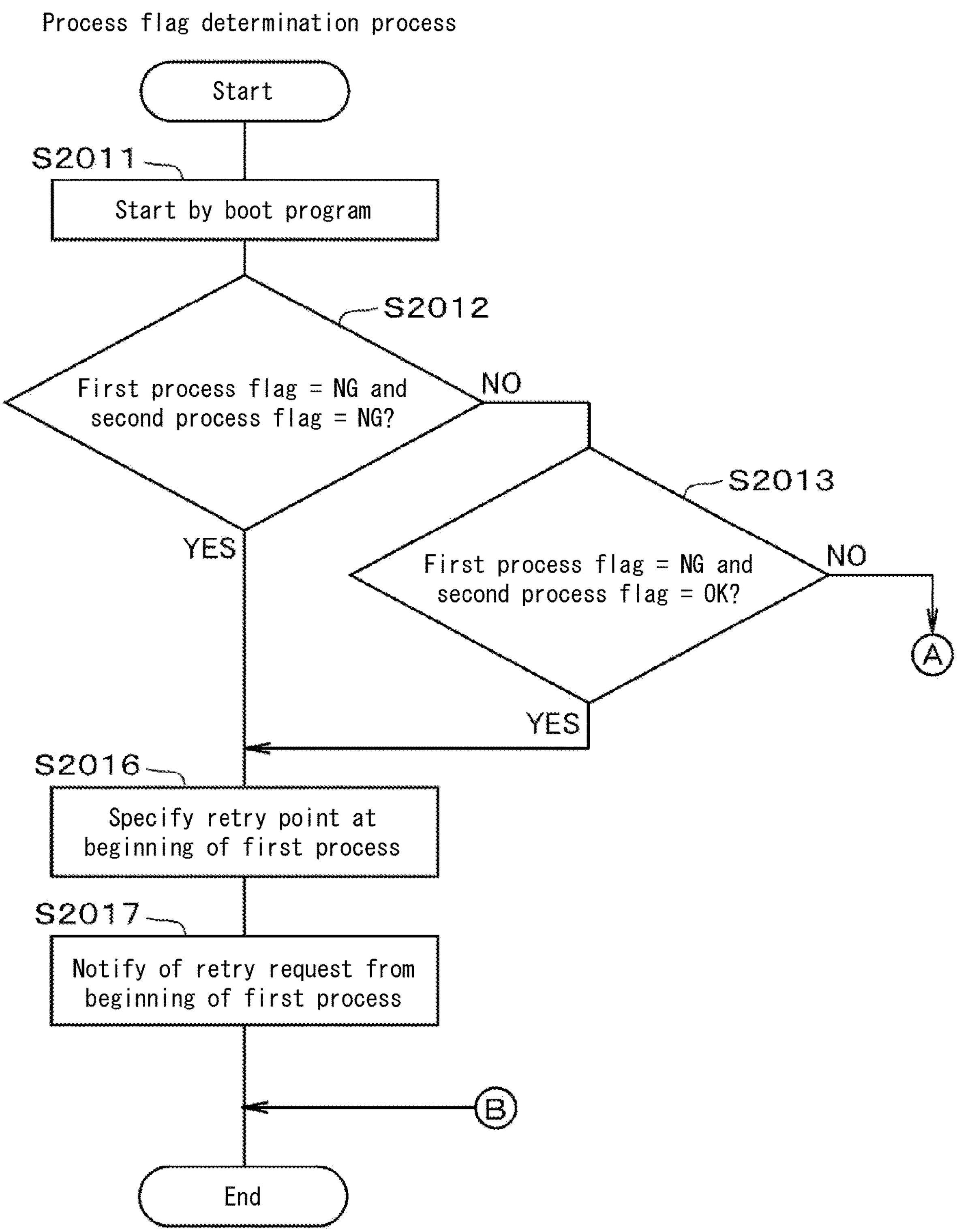
FIG. 173 is a flowchart illustrating a process flag determination process.
Figure 174:
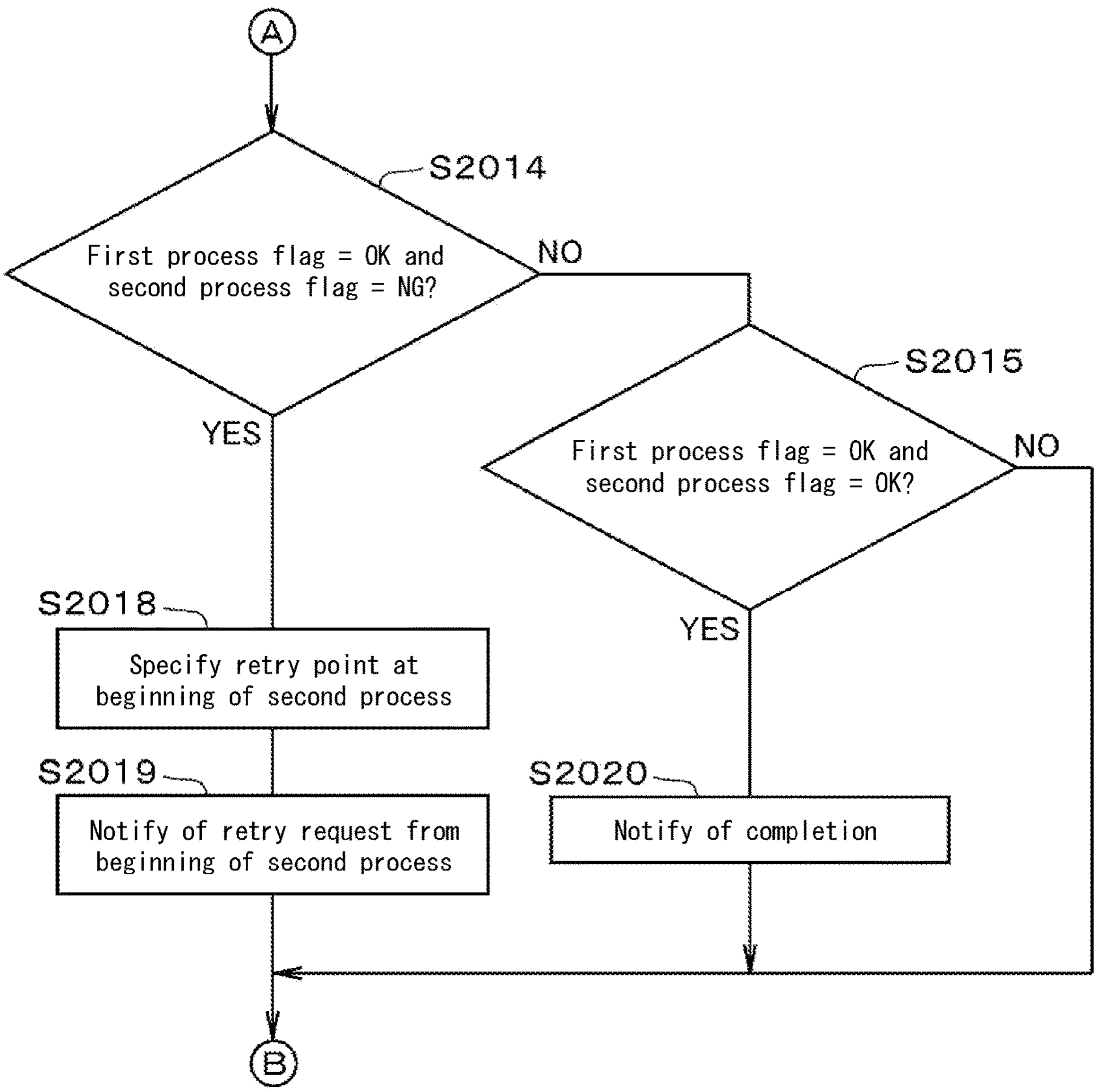
FIG. 174 is a flowchart illustrating the process flag determination process.

Next, an operation of the retry point specifying unit 106 in the rewrite target ECU 19 will be described with reference to FIGS. 172 to 174. The rewrite target ECU 19 executes a retry point specifying program and thus performs the retry point specifying process. The rewrite target ECU 19 performs a process flag setting process and a process flag determination process as the retry point specifying process. Each process will be described below.

(20-1) Process Flag Setting Process

When the process flag setting process is initiated, the rewrite target ECU 19 determines whether or not a pre-process before rewriting of an application program has been completed (S2001). When it is determined that the pre-process before rewriting of the application program has been completed (S2001: YES), the rewrite target ECU 19 sets the first process flag to "NG", sets the second process flag to "NG", and stores the set process flags (S2002; corresponding to a first process flag setting procedure and a second process flag setting procedure).

When write data is received from the CGW 13, the rewrite target ECU 19 initiates the first process (S2003) and determines whether or not the first process has been completed (S2004). When it is determined that the first process has been completed (S2004: YES), the rewrite target ECU 19 sets the first process flag to "OK" in a state in which the second process flag is still set to "NG", and stores the set first process flag (S2005; corresponding to a first process flag setting procedure and a second process flag setting procedure). The rewrite target ECU 19 stores a write completion address indicating a portion where writing has been completed in the flash memory.

The rewrite target ECU 19 initiates the second process such as sending a write completion notification to the CGW 13 (S2006), and determines whether or not the second process has been completed (S2007). When it is determined that the second process has been completed (S2007: YES), the rewrite target ECU 19 sets the second process flag to "OK" and stores the set second process flag in a state in which the first process flag is still set to "OK" (S2008; corresponding to a first process flag setting procedure and a second process flag setting procedure), and finishes the process flag setting process finishes.

(20-2) Process Flag Determination Process

When the rewrite target ECU 19 is started from the sleep state or the stop state, and the process flag determination process is initiated, the rewrite target ECU 19 is started by the boot program (S2011), and reads the first process flag and the second process flag from the flash memory and determines the flags (S2012 to S2015).

When it is determined that the first process flag is set to "NG" and the second process flag is set to "NG" (S2012: YES), the rewrite target ECU 19 specifies a retry point at the beginning of the first process, notifies the CGW 13 of a retry request from the beginning of the first process (S2016; corresponding to a retry point specifying procedure), and finishes the retry point specifying process. That is, the rewrite target ECU 19 requests the CGW 13 to distribute the write data. In this case, the rewrite target ECU 19 also notifies the CGW 13 of the write completion address read from the flash memory, and thus the CGW 13 specifies which of the write data to be divided and distributed will be distributed. When it is determined that the first process flag is set to "NG" and the second process flag is set to "OK" (S2013: YES), also in this case, the rewrite target ECU 19 specifies a retry point at the beginning of the first process (S2016; corresponding to a retry point specifying procedure), notifies the CGW 13 of a retry request from the beginning of the first process (S2017), and finishes the process flag determination process.

When it is determined that the first process flag is set to "OK" and the second process flag is set to "NG" (S2014: YES), the rewrite target ECU 19 specifies a retry point at the beginning of the second process (S2018; corresponding to a retry point specifying procedure), notifies the CGW 13 of a retry request from the beginning of the second process (S2019), and finishes the process flag determination process. The ECU 19 notifies the CGW 13 of, for example, up to which address the writing has been completed as the second process.

When it is determined that the first process flag is set to "OK" and the second process flag is set to "OK" (S2015: YES), the rewrite target ECU 19 notifies the CGW 13 of the completion of the process related to rewriting of the application program (S2020), and finishes the process flag determination process. When the CGW 13 distributes divided write data, the rewrite target ECU 19 sets the above-described retry point in the unit of the divided write data.

As described above, the rewrite target ECU 19 performs the retry point specifying process, thus sets the first process flag indicating whether or not the first process has been completed, sets the second process flag indicating whether or not the second process has been completed, and specifies a retry point according to the first process flag and the second process flag. For example, in a case where the first process has been completed, and the rewrite target ECU 19 is restarted in a state in which the second process is not completed, the same write data can be prevented from being written again.

The rewrite target ECU 19 stores a data amount of the write data of which writing has been completed, that is, how many bytes of the write data have been written, and requests the CGW 13 to transmit the write data from the bytes in a case where writing of the write data is resumed. In a case where the rewrite target ECU 19 stores how many bytes of the write data have been written and resumes the writing, the rewrite target ECU 19 requests the CGW 13 to transmit the write data from the bytes. Therefore, at the time of resuming the writing, the CGW 13 can avoid waste of retransmitting the transmitted write data, and the rewrite target ECU 19 can write the write data from the next write area of a write area in which the write data has been written. The rewrite target ECU 19 that does not have the function of storing how many bytes of write data have been written requests the CGW 13 to transmit the write data from the leading write data in a case where writing of the write data is resumed.

(21) Progress State Synchronization Control Process

The progress state synchronization control process will be described with reference to FIGS. 175 to 180. The vehicle program rewriting system 1 performs a progress state synchronization control process in the CGW 13 and the center device 3. The vehicle program rewriting system 1 includes the mobile terminal 6 and the in-vehicle display 7 as the display terminal 5 that allows a user to perform an input operation. The in-vehicle display 7 displays a progress screen indicating the progress of rewriting in cooperation with the CGW 13. The mobile terminal 6 is connected to the center device 3, and thus displays a progress screen indicating the progress of rewriting provided by the center device 3. The CGW 13 and the center device 3 perform the progress state synchronization control process such that information displayed on the mobile terminal 6 and information displayed on the in-vehicle display 7 are synchronized with each other.

As illustrated in FIG. 30 described above, for example, when the rewrite target ECU 19 is the ECU 19 equipped with a double-bank memory, procedures related to rewriting of an application program are performed in accordance with the campaign notification phase in which a user is notified of rewriting of the application program, and the user's approval is obtained, the download phase in which write data is downloaded from the center device 3 to the DCM 12, the installation phase in which the write data is distributed from the CGW 13 to the rewrite target ECU 19, and the activation phase in which an active bank at the next start switches from an old bank to a new bank. That is, the user operates the mobile terminal 6 or the in-vehicle display 7, and thus causes a series of procedures related to rewriting of the application program to progress, for example, by approving execution of each phase.

Figure 175:
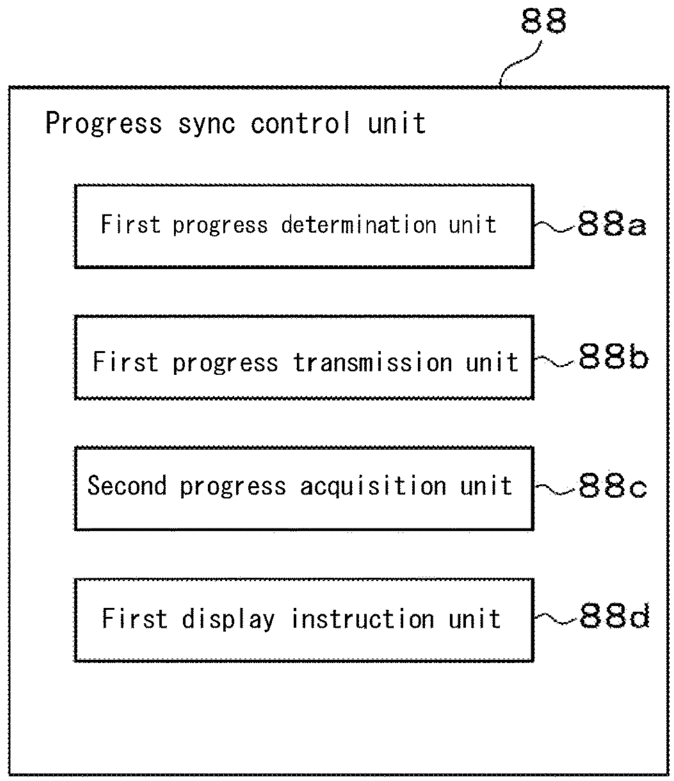
FIG. 175 is a functional block diagram of a progress state synchronization control unit.

As illustrated in FIG. 175, the CGW 13 includes a first progress state determination unit 88*a*, a first progress state transmission unit 88*b*, a second progress state acquisition unit 88*c*, and a first display instruction unit 88*d* in the progress state synchronization control unit 88. The first progress state determination unit 88*a* determines a first progress state related to rewriting of a program, and determines progress states, for example, the campaign notification phase, the download phase, the installation phase, and the activation phase. The campaign notification phase is a phase in which a campaign is received, the screens illustrated in FIGS. 32 and 33 are displayed, and the user's approval is obtained. The download phase is a phase in which the screens illustrated in FIGS. 34 to 37 are displayed, the user's approval is obtained, and download is executed. The installation phase is a phase in which the download has been completed, the screens illustrated in FIGS. 38 to 42 are displayed, and installation is performed by obtaining the user's approval. The activation phase is a phase in which the screen illustrated in FIG. 43 is displayed, the user's approval is obtained, and activation is executed.

The first progress state determination unit 88*a* specifies an operation performed by the user on the in-vehicle display 7 and determines a first progress state by transmitting a user operation signal from the in-vehicle display 7 to the CGW 13 when the user is riding on the vehicle and the user selects "approve execution of program update" on the in-vehicle display 7 and performs an operation for progress to the next phase. In this case, selecting "approve execution of program update" corresponds to operating any one of the "download initiation" button 503*a* illustrated in FIG. 34, the "immediate update" button 506*a* illustrated in FIG. 39, the "update reservation" button 506*b*, and the "OK" button 508*b* illustrated in FIG. 43. When the first progress state is determined, the first progress state determination unit 88*a* manages the determined first progress state as the current progress state.

When the first progress state is determined by the first progress state determination unit 88*a*, the first progress state transmission unit 88*b* transmits the determined first progress state to the center device 3, and also transmits the determined first progress state to each in-vehicle display device such as the in-vehicle display 7. The second progress state acquisition unit 88*c* acquires a second progress state related to the rewriting of the program from the center device 3. When the first progress state is determined by the first progress state determination unit 88*a* and the second progress state is acquired by the second progress state acquisition unit, the first display instruction unit 88*d* gives an instruction for creation of contents displayable on the in-vehicle display 7 on the basis of the determined first progress state and the acquired second progress state.

Here, in a case where the second progress state acquisition unit 88*c* acquires the second progress state from the center device 3, the first progress state determination unit 88*a* manages the second progress state as the current progress state when the second progress state is a phase earlier than the current progress state. That is, the first progress state is updated to a value of the second progress state. The first progress state transmission unit 88*b* transmits the first progress state that is the current progress state to the center device 3. For example, in a case where the first progress state is a "download waiting phase" and a user approval operation is performed on the mobile terminal 6, the second progress state acquisition unit 88*c* acquires a "download-in-progress phase" as the second progress state from the center device 3. Since the "download-in-progress phase" acquired from the center device 3 is a phase earlier than the current progress state, the first progress state determination unit 88*a* updates the first progress state that is the current progress state to a value of the second progress state, transmits the updated first progress state to the center device 3, and also transmits the updated first progress state to various in-vehicle display devices such as the in-vehicle display 7. In addition to the "download-in-progress phase" as the first progress state, a "download completion X %" indicating the degree of progress of the download may be transmitted.

In a case where a user operation signal is generated in the in-vehicle display 7, the first display instruction unit 88*d* gives an instruction for creation of contents on the basis of the first progress state determined by the first progress state determination unit 88*a*. In a case where a user operation signal is generated in the mobile terminal 6, the first display instruction unit 88*d* gives an instruction for creation of contents on the basis of the second progress state acquired by the second progress state acquisition unit 88*c*. In a configuration in which the first progress state determined by the first progress state determination unit 88*a* is managed to be the current progress state at all times, that is, the master device 11 manages the current progress state, the first display instruction unit 88*d* may give an instruction for creation of contents on the basis of the first progress state.

Figure 176:
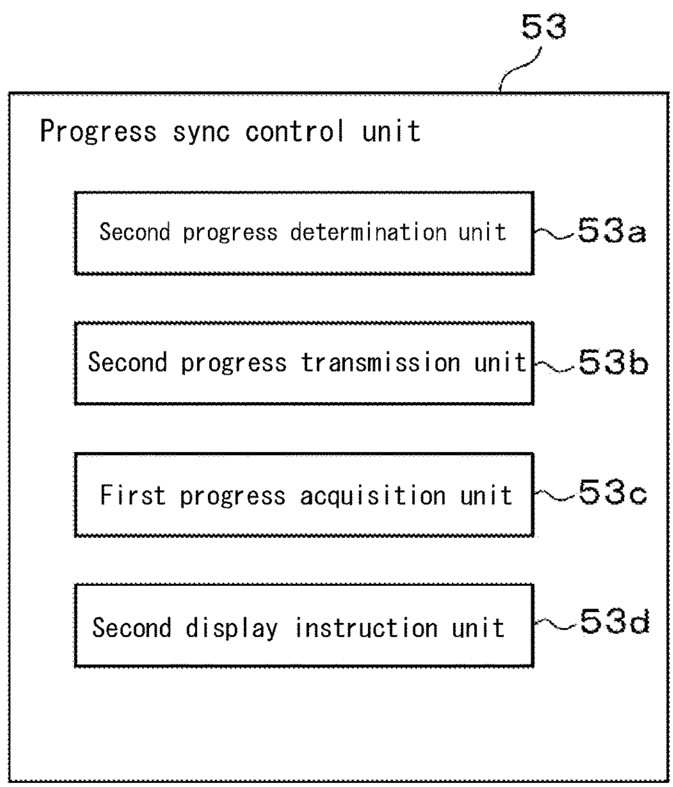
FIG. 176 is a functional block diagram of the progress state synchronization control unit.

As illustrated in FIG. 176, the center device 3 includes a second progress state determination unit 53*a*, a second progress state transmission unit 53*b*, a first progress state acquisition unit 53*c*, and a second display instruction unit 53*d* in the progress state synchronization control unit 53. The second progress state determination unit 53*a* determines the second progress state related to rewriting of a program, and determines the progress states, for example, the campaign notification phase, the download phase, the installation phase, and the activation phase. When the user is getting off (parking), selects "approve execution of program update" on the mobile terminal 6, and performs an operation or progress to the next phase, the second progress state determination unit 53*a* receives a user operation signal transmitted from the mobile terminal 6 in an environment in which the mobile terminal 6 and the center device 3 can perform data communication with each other.

The second progress state determination unit 53*a* determines the second progress state on the basis of the current progress state that is the first progress state previously received from the master device 11 by the first progress state acquisition unit 53*c*, and the user operation signal. For example, when the current progress state is an "installation waiting phase" and the user operation signal indicating "approval" is received, the second progress state determination unit 53*a* determines that the second progress state is an "installation-in-progress phase". The second progress state determination unit 53*a* may determine "with user's approval in the installation waiting phase." The user operation signal in the mobile terminal 6 is transmitted from the center device 3 to the DCM 12 in an environment in which the DCM 12 and the center device 3 can perform data communication with each other. The user operation signals is transferred from the DCM 12 to the CGW 13, and thus the CGW 13 can determine the operation performed by the user on the mobile terminal 6 to determine the progress state.

When the second progress state is determined by the second progress state determination unit 53*a*, the second progress state transmission unit 53*b* transmits the determined second progress state to the master device 11. The first progress state acquisition unit 53*c* acquires the first progress state related to rewrite of the program from the master device 11, and manages the first progress state as the current progress state. As the current progress state, the second progress state may be updated to a value of the first progress state. When the second progress state is determined by the second progress state determination unit 53*a* and the first progress state is acquired by the first progress state acquisition unit 53*d*, the second display instruction unit 53*d* gives an instruction for creation of contents displayable on the mobile terminal 6 on the basis of the determined second progress state and the acquired first progress state.

For example, in a case where there is only a user operation signal in the mobile terminal 6, the second progress state determined by the second progress state determination unit 53*a* and the first progress state acquired by the first progress state acquisition unit 53*d* indicate the same progress state. Therefore, the second display instruction unit 53*d* may give an instruction for creation of the contents on the basis of the second progress state. Thereafter, when the user operation signal is generated in the in-vehicle display 7, the second display instruction unit 53*d* gives an instruction for creation of the contents on the basis of the acquired first progress state.

When an SMS is received as a progress state signal from the center device 3, for example, the mobile terminal 6 is connected to the center device 3 when the user selects a URL described in the SMS, and displays a screen of a predetermined phase provided by the center device 3.

Next, with reference to FIGS. 177 to 180, a description will be made of operations performed by the progress state synchronization control unit 88 in the CGW 13 and the progress state synchronization control unit 53 in the center device 3.

Figure 177:
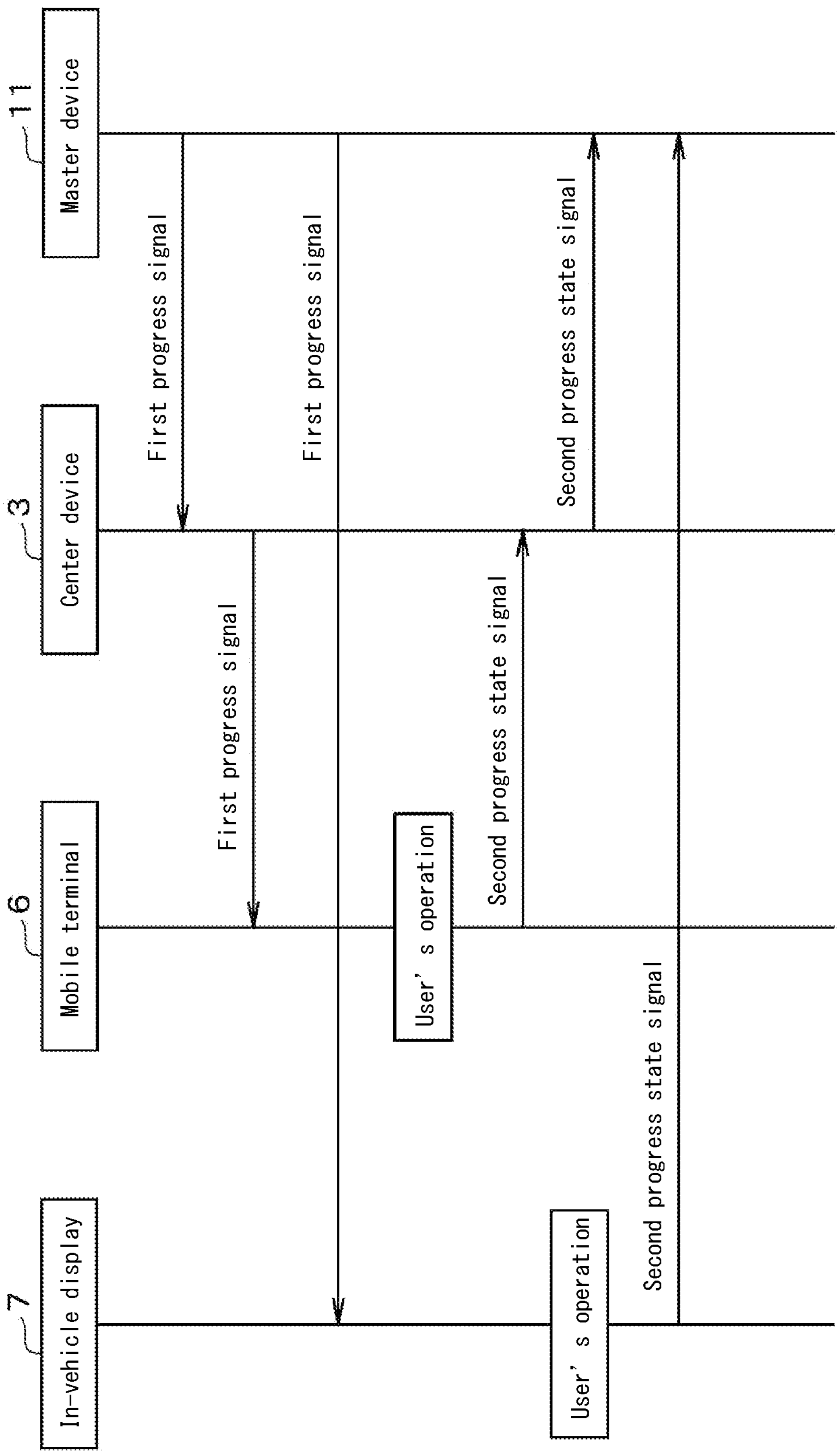
FIG. 177 is a diagram illustrating an aspect of transmitting and receiving a progress state signal.
Figure 178:
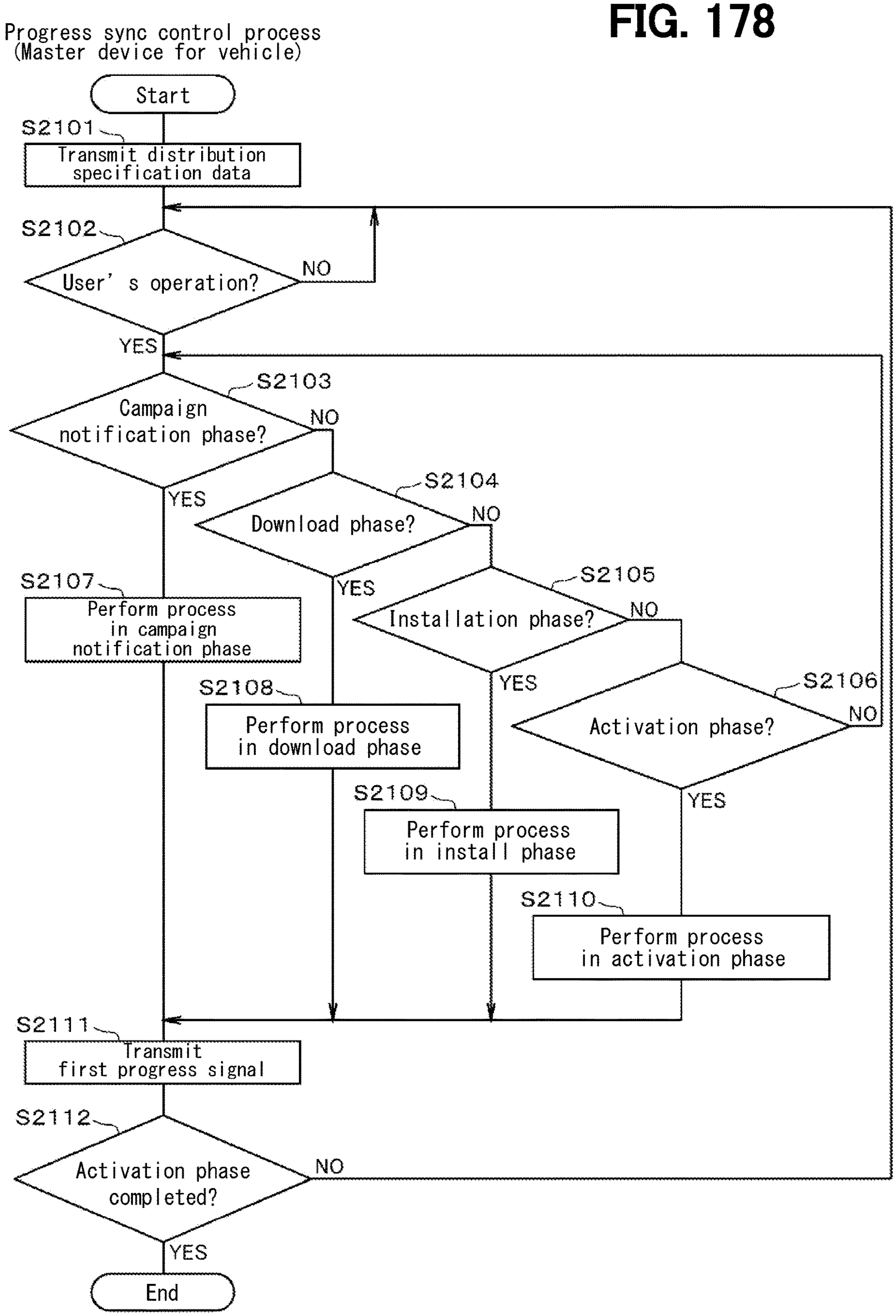
FIG. 178 is a flowchart illustrating a progress state synchronization control process.
Figure 179:
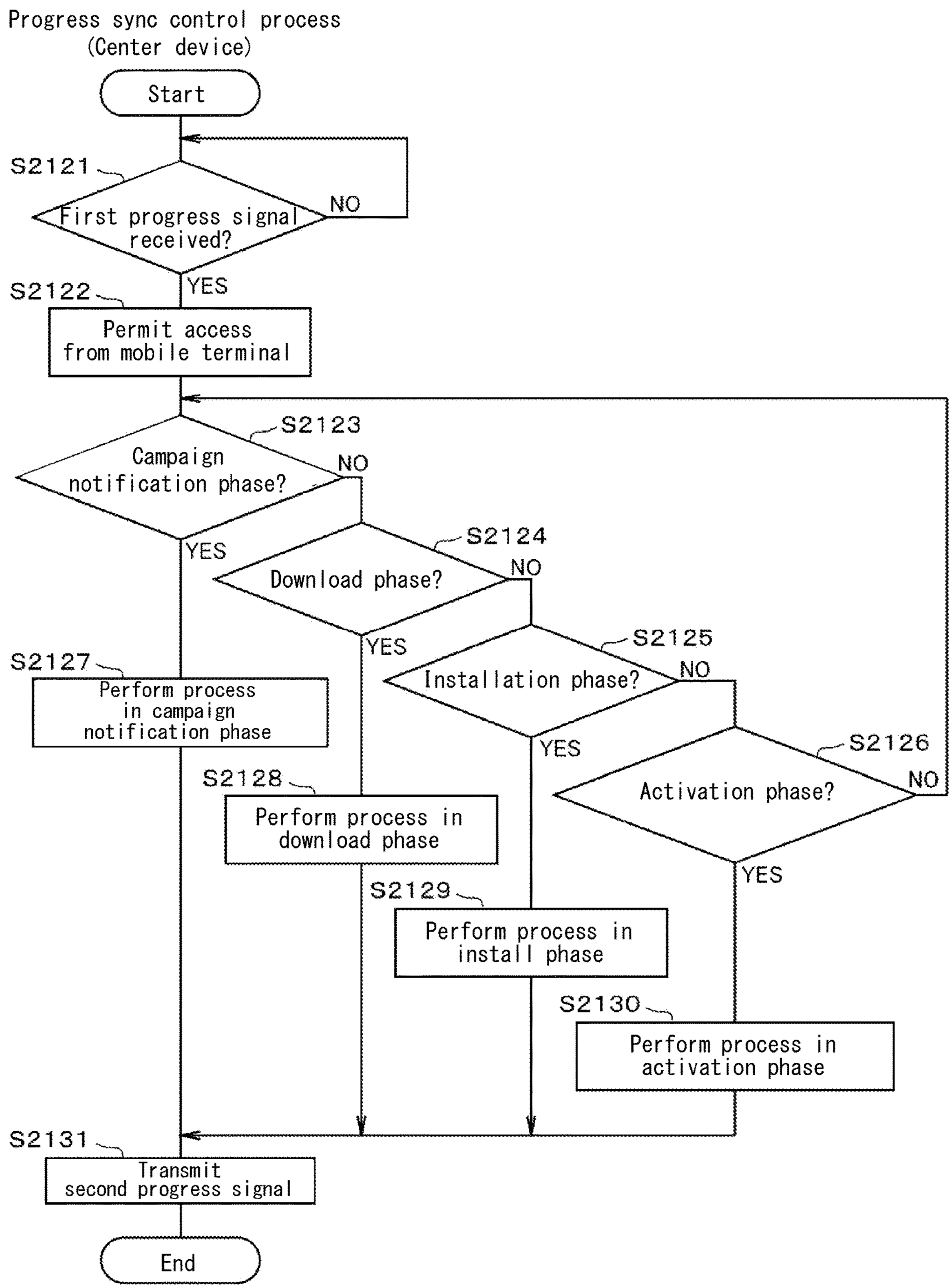
FIG. 179 is a flowchart illustrating the progress state synchronization control process.
Figure 180:
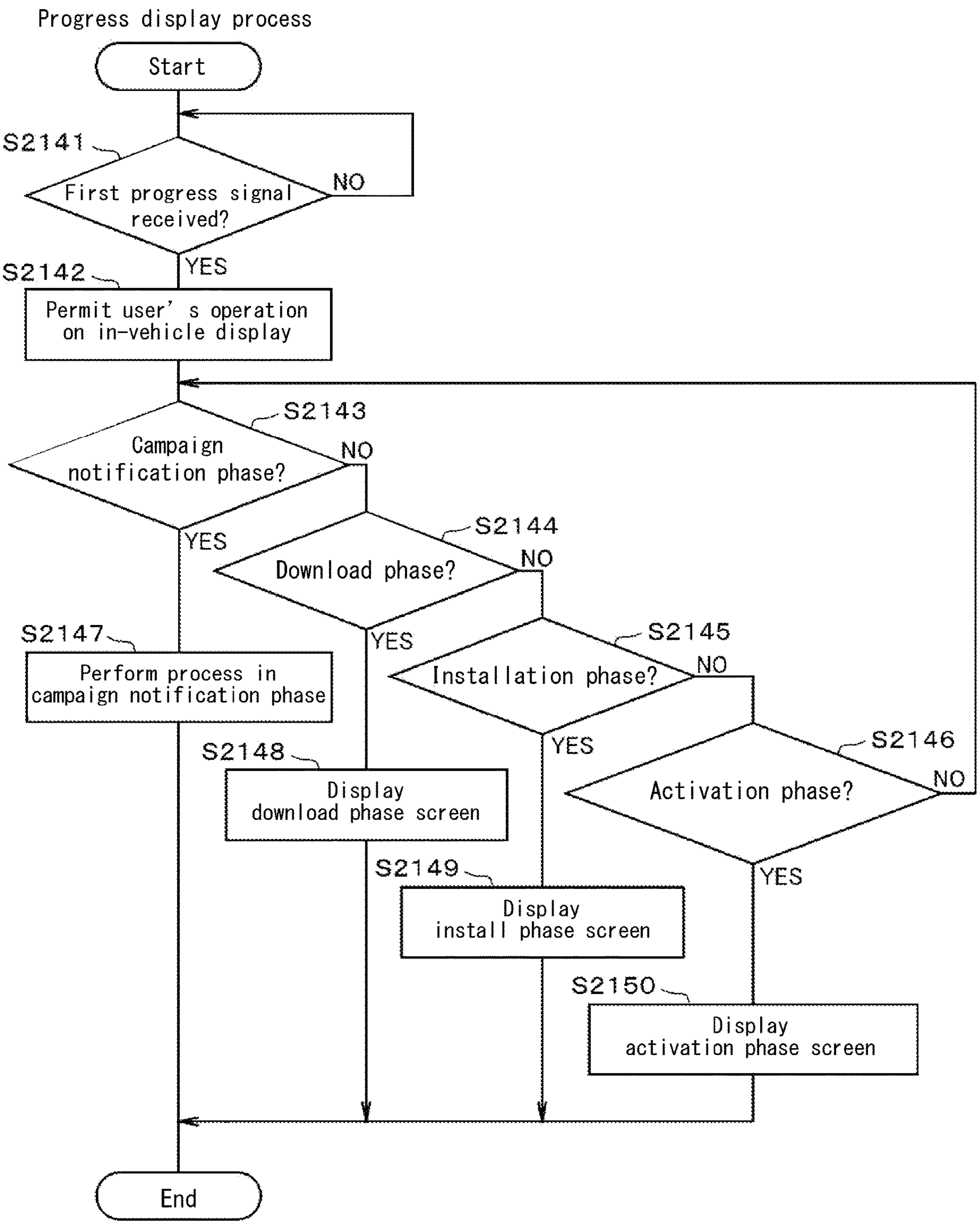
FIG. 180 is a flowchart illustrating a progress state display process.

As illustrated in FIG. 177, the master device 11 and the center device 3 transmit and receive a first progress state signal and a second progress state signal to cause synchronization in display of a progress state of a phase in the mobile terminal 6 and the in-vehicle display 7. That is, when the first progress state that is the current progress state is updated, the master device 11 transmits the first progress state signal to the center device 3, and also transmits the first progress state signal to various in-vehicle display devices such as the in-vehicle display 7. The center device 3 transmits the first progress state signal as the current progress state to the mobile terminal 6. Consequently, when the mobile terminal 6 can access the center device 3, display of a progress state of a phase in the mobile terminal 6 and the in-vehicle display 7 is in synchronization. The center device 3 transmits the second progress state signal to the master device 11 on the basis of a user approval operation on the mobile terminal 6, and thus causes synchronization in the display of the progress state of the phase in the mobile terminal 6 and the in-vehicle display 7 when the mobile terminal 6 can access the center device 3.

The master device 11 which has acquired the second progress state signal may update the first progress state that is the current progress state, and then may transmit the first progress state to the center device 3 and each in-vehicle display device such as the in-vehicle display 7. That is, the master device 11 transmits the current progress state to the center device 3 and each in-vehicle display device such as the in-vehicle display 7, and thus functions as a phase management device. Here, the second progress state signal transmitted from the mobile terminal 6, the in-vehicle display 7, and the center device 3 may be a notification indicating any phase, or may be a notification indicating that a user approval operation has been performed or a notification indicating the meaning of an operated button.

When the progress state synchronization control process is initiated, the CGW 13 transmits distribution specification data to the in-vehicle display 7 (S2101). The distribution specification data includes text or contents to be displayed to the user by the in-vehicle display 7. The CGW 13 determines whether or not the user has performed an operation on the in-vehicle display 7 or the mobile terminal 6 on the basis of a notification from the in-vehicle display 7 or the center device 3 (S2102). When it is determined that the user has performed the operation on the in-vehicle display 7 or the mobile terminal 6 (S2102: YES), the CGW 13 determines a phase corresponding to the operation on the basis of the first progress state (S2103 to S2106; corresponding to a first progress state determination procedure).

When the campaign notification phase is determined (S2103: YES), the CGW 13 performs a process in the campaign notification phase (S2107), and transmits a first progress state signal indicating a progress state of the process in the campaign notification phase to the in-vehicle display 7 and the center device 3 (S2111). The process in the campaign notification phase is, for example, a process of acquiring the user's input operation on the in-vehicle display 7 or the mobile terminal 6.

The CGW 13 acquires, from the in-vehicle display 7 or the mobile terminal 6 via the center device 3, for example, conditions such as a date and a place where a program is permitted to be executed, in addition to an approval or disapproval for update of the program. When information indicating that there is the user's input operation for an approval on the mobile terminal 6 is acquired from the center device 3 via the DCM 12, the CGW 13 notifies the in-vehicle display 7 of the progress such as completion of the approval. On the other hand, when information indicating that there is the user's input operation for an approval on the in-vehicle display 7 is acquired from the in-vehicle display 7, the CGW 13 notifies the center device 3 of the progress such as completion of the approval.

When the download phase is determined (S2104: YES), the CGW 13 performs a process in the download phase (S2108), and transmits a first progress state signal indicating a progress state of the process in the download phase to the in-vehicle display 7 and the center device (S2111). The process in the download phase is, for example, a process of calculating a percentage of completed download of a distribution package. The CGW 13 determines the percentage of the completed download on the basis of a notification from the center device 3. The CGW 13 notifies the in-vehicle display 7 and the center device 3 of the progress indicating the percentage of the completed download. The CGW 13 repeatedly performs the process until download of the distribution package is completed. When the download has been completed, the CGW 13 notifies the in-vehicle display 7 and the center device 3 of the progress indicating completion of the download phase.

When the installation phase is determined (S2104: YES), the CGW 13 performs a process in the installation phase (S2108), and transmits a progress state signal indicating a progress state of the process in the installation phase to the in-vehicle display 7 and the DCM 12 (S2111). The process in the installation phase is, for example, a process of calculating a percentage of completed installation in the rewrite target ECU 19.

The CGW 13 determines the percentage of the completed installation on the basis of a notification from the rewrite target ECU 19. The CGW 13 notifies the in-vehicle display 7 and the center device 3 of the progress indicating the percentage of the completed installation. The CGW 13 repeatedly performs the process until installation is completed in all of the rewrite target ECUs 19. When the installation in all of the rewrite target ECUs 19 has been completed, the CGW 13 notifies the in-vehicle display 7 and the center device 3 of the progress indicating completion of the installation phase.

When the activation phase is determined (S2104: YES), the CGW 13 performs a process in the activation phase (S2108), and transmits a progress state signal indicating a progress state of the process in the activation phase to the in-vehicle display 7 and the DCM 12 (S2111; corresponding to a first progress state transmission procedure). The process in the activation phase is, for example, a process of calculating a percentage of completed activation in one or more rewrite target ECUs 19 belonging to the same group. The CGW 13 determines the percentage of the completed activation on the basis of a notification from the rewrite target ECU 19. The CGW 13 notifies the in-vehicle display 7 and the center device of the progress indicating the percentage of the completed activation.

It is determined whether or not the activation phase has been completed (S2112), and, when it is determined that the activation phase has been completed (S2112: YES), the CGW 13 finishes the progress state synchronization control process. When it is determined that the activation phase has not been completed (S2112: NO), the CGW 13 returns to S2102. The CGW 13 causes the process in each phase to progress and calculates a percentage of a completed process (S2107 to S2110). The CGW 13 periodically transmits the phase and information indicating that X % of a completed phase as the first progress state to the center device 3 (S2111).

When the distribution specification data is transmitted and the progress state synchronization control process is initiated, the center device 3 monitors reception of the first progress state signal transmitted from the DCM 12 (S2121). When it is determined that the first progress state signal has been received from the DCM 12 (S2121: YES), the center device 3 permits access from the mobile terminal 6 (S2122), determines a phase specified by the first progress state signal (S2123 to S2126).

When the campaign notification phase is determined (S2123: YES), the center device 3 performs the process in the campaign notification phase (S2127). That is, the center device 3 creates a campaign notification phase screen, transmits a display instruction signal for giving an instruction for display of the campaign notification phase screen to the mobile terminal 6, and causes the mobile terminal 6 to display the campaign notification phase screen through connection to the center device 3.

When the download phase is determined (S2124: YES), the center device 3 performs a process in the download phase (S2128). That is, the center device 3 creates a download phase screen, transmits a display instruction signal for giving an instruction for display of the download phase screen to the mobile terminal 6, and causes the mobile terminal 6 to display the download phase screen through connection to the center device 3. When the center device 3 is notified of the progress indicating the percentage of the completed download from the DCM 12, the center device 3 updates the download phase screen.

When the installation phase is determined (S2125: YES), the center device 3 performs a process in the installation phase (S2129). That is, the center device 3 creates an installation phase screen, transmits a display instruction signal for giving an instruction for display of the installation phase screen to the mobile terminal 6, and causes the mobile terminal 6 to display the installation phase screen through connection to the center device 3. When the center device 3 is notified of the progress indicating the percentage of the completed installation from the DCM 12, the center device 3 updates the installation phase screen.

When the activation phase is determined (S2126: YES), the center device 3 performs a process in the activation phase (S2130). That is, the center device 3 creates an activation phase screen, transmits a display instruction signal for giving an instruction for display of the activation phase screen to the mobile terminal 6, and causes the mobile terminal 6 to display the activation phase screen through connection to the center device 3. When the center device 3 is notified of the progress indicating the percentage of the completed activation from the DCM 12, the center device 3 updates the activation phase screen. When an operation such the user's approval is performed on the screens displayed in S2127 to S2130, the center device 3 transmits a second progress state signal to the master device 11 (S2131), and finishes the progress state synchronization control process.

When the distribution specification data is received from the CGW 13, the in-vehicle display 7 initiates the progress display process, and monitors reception of the progress state signal transmitted from the CGW 13 (S2141). When it is determined that the progress state signal has been received from the CGW 13 (S2141: YES), the in-vehicle display 7 permits the user operation on the in-vehicle display 7 (S2142), determines a phase specified by the progress state signal (S2143 to S2146).

When the campaign notification phase is determined (S2143: YES), the in-vehicle display 7 displays a campaign notification phase screen by using text, contents, and the like included in the distribution specification data (S2147). When the download phase is determined (S2144: YES), the in-vehicle display 7 displays a download phase screen (S2148). The in-vehicle display 7 updates the download phase screen when notified of the progress indicating the percentage of completion of the download from the CGW 13.

When it is determined that the in-vehicle display 7 is in the installation phase (S2145: YES), the installation phase screen is displayed (S2149). When the in-vehicle display 7 is notified of the progress indicating the percentage of the completed installation from the CGW 13, the in-vehicle display 7 updates the installation phase screen. When the activation phase is determined (S2146: YES), the in-vehicle display 7 displays an activation phase screen (S2150). When the in-vehicle display 7 is notified of the progress indicating the percentage of the completed activation from the CGW 13, the in-vehicle display 7 updates the activation phase screen.

As described above, the first progress state and the second progress state are transmitted and received between the master device 11 and the center device 3. For example, even in a configuration in which the mobile terminal 6 is accessible to the center device 3 and the in-vehicle display 7 is inaccessible to the center device 3, the first progress state and the second progress state are transmitted and received between the master device 11 and the center device 3, and thus progress states or the like of rewriting of an application program can be appropriately synchronized among a plurality of display terminals.

(22) Display Control Information Transmission Control Process and (23) Display Control Information Reception Control Process The display control information transmission control process in the center device 3 will be described with reference to FIGS. 181 and 182, and the display control information reception control process in the master device 11 will be described with reference to FIGS. 183 to 185.

Figure 181:
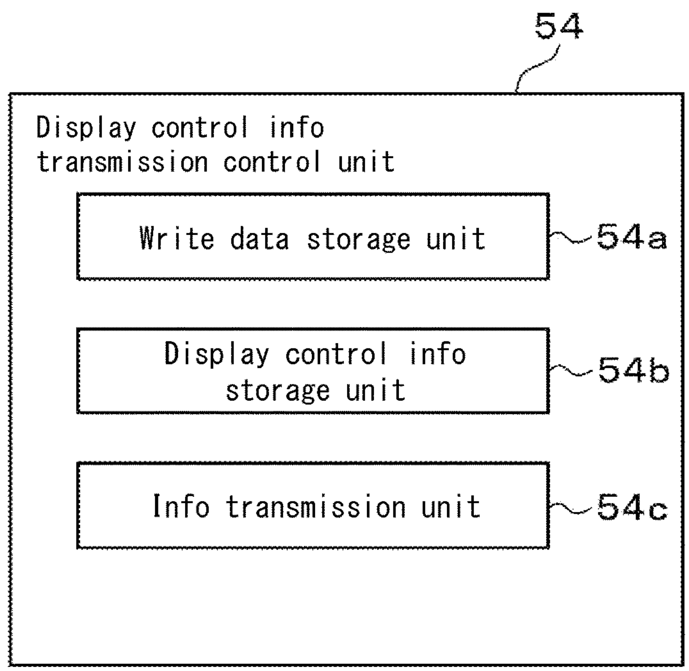
FIG. 181 is a functional block diagram of a display control information transmission control unit.
Figure 182:
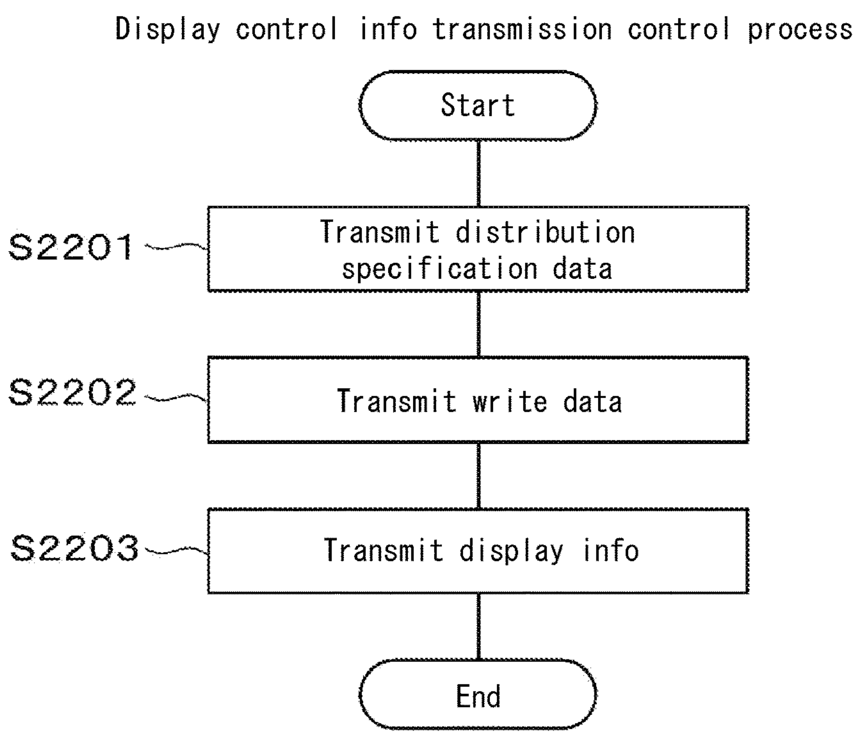
FIG. 182 is a flowchart illustrating a display control information transmission control process.

As illustrated in FIG. 181, the center device 3 includes a write data storage unit 54*a* (corresponding to an update data storage unit), a display control information storage unit 54*b*, and an information transmission unit 54*c* in the display control information transmission control unit 54. The write data storage unit 54*a* stores write data for a plurality of rewrite target ECUs 19 with rewriting of application programs in the plurality of rewrite target ECUs 19 as a single campaign. The display control information storage unit 54*b* stores distribution specification data including display control information. The display control information is information required for display information related to rewriting of an application program in the rewrite target ECU 19 to be displayed on the in-vehicle display 7, and is a display control program or property information.

The display information is data configuring various screens (a campaign notification screen, an installation screen, and the like) related to rewriting of the application program. The display control program is a program for realizing a function equivalent to that of a web browser. The property information is information defining display characters, display positions, colors, and the like. The information transmission unit 54*c* transmits the write data stored in the write data storage unit 54*a* and the display control information stored in the display control information storage unit 54*b* to the master device 11. The information transmission unit 54*c* transmits the write data for the plurality of rewrite target ECUs 19 to the master device 11 as a single package. Here, the display control information may include phase identification information indicating a phase in which information is displayed. For example, the phase identification information indicates a phase in which information is displayed among the campaign notification phase, the download phase, the installation phase, and the activation phase.

Next, a description will be made of an operation performed by the display control information transmission control unit 54 in the center device 3 with reference to FIG. 182. The center device 3 executes a display control information transmission control program and thus performs the display control information transmission control process.

When the display control information transmission control process is initiated, the center device 3 transmits the distribution specification data to the CGW 13 via the DCM 12 (S2201; corresponding to a control information transmission procedure), and transmits the write data to the CGW 13 via the DCM 12 (S2202). The center device 3 transmits the display information to the CGW 13 via the DCM 12 (S2203; corresponding to a display information transmission procedure), and finishes the display control information transmission control process. In a case where the display control information corresponding to each of the campaign notification phase, the download phase, the installation phase, and the activation phase is transmitted, the center device 3 may transmit the display control information corresponding to each phase to the in-vehicle display 7 in a single file, or may transmit the display control information corresponding to the next phase to the in-vehicle display 7 each time the phase is finished. Here, the timing at which the center device 3 transmits the distribution specification data may be configured to be transmitted in response to a request from the master device 11.

Figure 183:
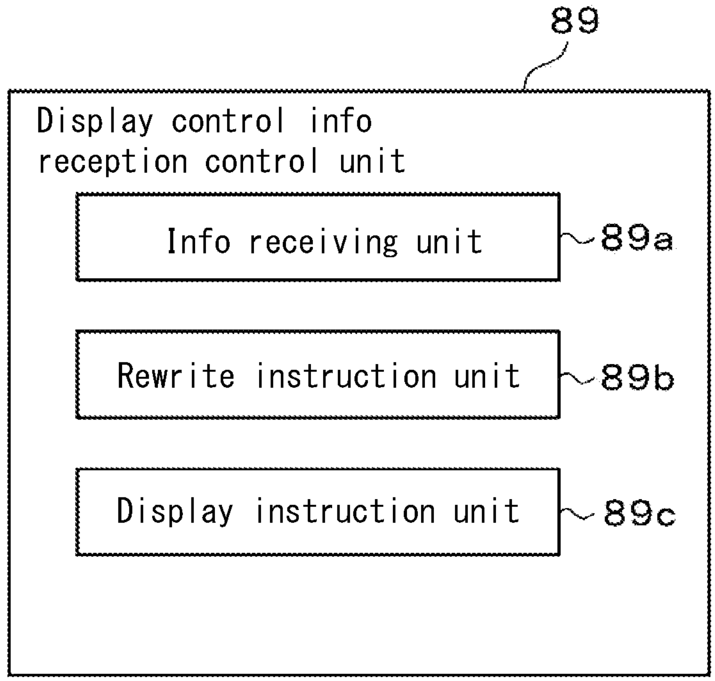
FIG. 183 is a functional block diagram of a display control information reception control unit.
Figure 184:
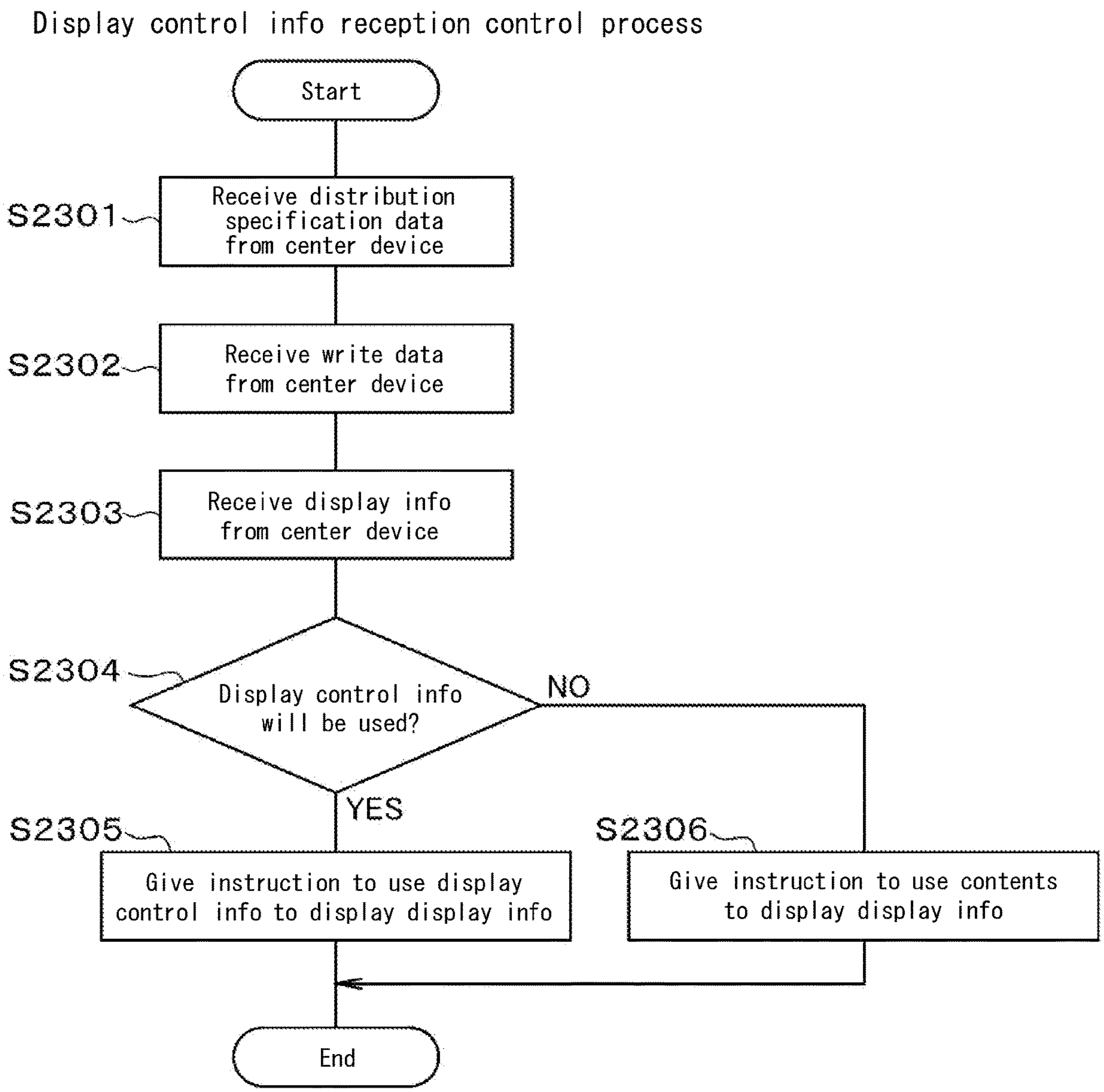
FIG. 184 is a flowchart illustrating a display control information reception control process.

As illustrated in FIG. 183, the CGW 13 includes an information receiving unit 89*a*, a rewrite instruction unit 89*b*, and a display instruction unit 89*c* in the display control information reception control unit 89. The information receiving unit 89*a* receives the write data and the display control information from the center device 3. When the write data is received from the center device 3 by the information receiving unit 89*a*, the rewrite instruction unit 89*b* instructs the rewrite target ECU 19 to write the received write data. The display instruction unit 89*c* instructs the in-vehicle display 7 to display information regarding a campaign by using the display control information before the rewrite instruction unit 89*b* instructs the rewrite target ECU 19 to write the write data. The display instruction unit 89*c* may give an instruction for displaying the information regarding the campaign as history information after the entire write data is written.

Next, a description will be made of an operation performed by the display control information reception control unit 89 in the CGW 13 with reference to FIG. 184. The CGW 13 executes ae display control information reception control program and thus performs the display control information reception control process. consequently, in a case where the mobile terminal 6 and the in-vehicle display 7 are provided as display terminals, these display aspects can be brought close to each other, and thus the user's convenience can be improved.

When the display control information reception control process is initiated, the CGW 13 receives the distribution specification data from the center device 3 via the DCM 12 (S2301; corresponding to a control information reception procedure). The write data is received from the center device 3 via the DCM 12 (S2302). The CGW 13 receives the display information from the center device 3 via the DCM 12 (S2303; corresponding to a display information reception procedure). The CGW 13 determines whether or not to use the display control information included in the distribution specification data from the center device 3 (S2304). When it is determined that the display control information is to be used (S2304: YES), the CGW 13 instructs the in-vehicle display 7 to display the display information by using the display control information (S2305). That is, the CGW 13 instructs the in-vehicle display 7 to display screens related to rewriting of an application programs by using the display control information. The in-vehicle display 7 displays the display information by using the display control information in response to the instruction from the CGW 13.

When it is determined that the display control information is not to be used (S2304: NO), the CGW 13 instructs the in-vehicle display 7 to display the display information by using contents stored in advance (S2306). That is, the CGW 13 instructs the in-vehicle display 7 to display screens related to rewriting of the application program by using the contents stored in advance. The in-vehicle display 7 displays the display information by using the contents stored in advance in response to the instruction from the CGW 13. In a case where the display information corresponding to each of the campaign notification phase, the download phase, the installation phase, and the activation phase is displayed, the in-vehicle display 7 may collectively receive the display control information corresponding to each phase from the center device 3, or may receive the display control information corresponding to the next phase from the center device 3 each time the phase is finished.

Figure 185:
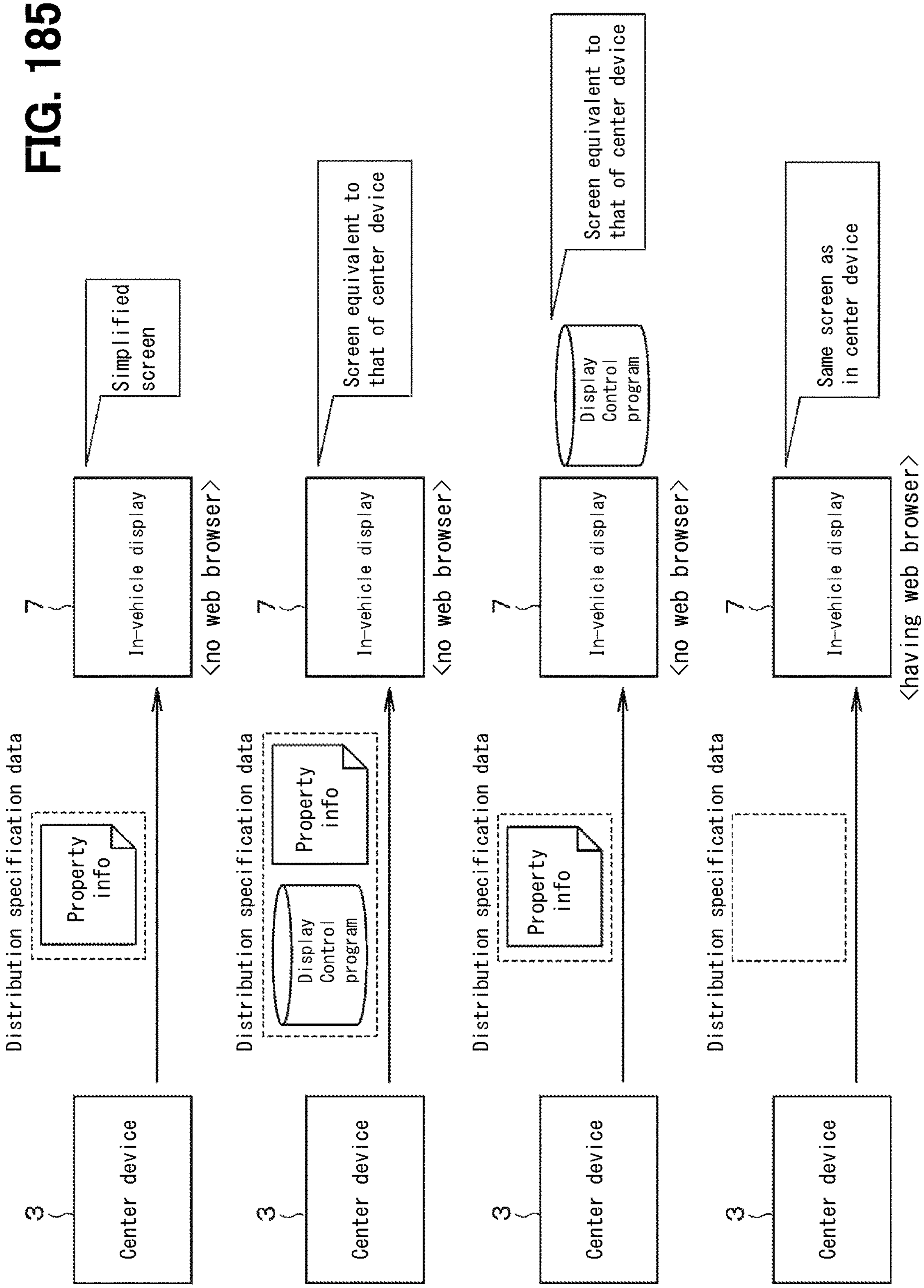
FIG. 185 is a diagram illustrating information included in distribution specification data.

As illustrated in FIG. 185, when the in-vehicle display 7 does not have the function of a web browser, and the distribution specification data transmitted from the center device 3 to the in-vehicle display 7 via the DCM 12 and the CGW 13 includes property information but does not include a display control program, the in-vehicle display 7 displays the display information on a simple screen by using contents and frames stored in advance. The property information includes data such as text, its display position, its size, and the like, and is the same as the property information used in the screen created by the center device 3. That is, although the screen image displayed on the in-vehicle display 7 differs from the screen image created by the center device 3 in terms of background, bit map, and the like, a display content is equivalent to that of the center device 3.

When the in-vehicle display 7 does not have the function of a web browser, and the distribution specification data transmitted from the center device 3 to the in-vehicle display 7 via the DCM 12 and the CGW 13 includes the display control program and the property information, the in-vehicle display 7 displays the display information on a screen equivalent to that of the center device 3. Here, the display control program and the property information included in the distribution specification data are the same as those used in the screen created by the center device 3.

When the in-vehicle display 7 does not have the function of a web browser but stores the display control program, and the property information is included in the distribution specification data transmitted from the center device 3 to the in-vehicle display 7, the in-vehicle display 7 displays the display information on a screen equivalent to that of the center device 3. Here, the display control program stored in the in-vehicle display 7 is different in version from the display control program used in the screen created by the center device 3, for example.

When the in-vehicle display 7 has the function of a web browser, the in-vehicle display 7 displays the display information on the same screen as that of the center device 3 through connection to the center device.

As described above, the center device 3 performs the display control information transmission control process, thus transmits the display control information to the in-vehicle display 7, and displays the display information on the in-vehicle display 7 according to the display control information. Consequently, in a case where the mobile terminal 6 and the in-vehicle display 7 are provided as display terminals, these display aspects can be brought close to each other, and thus the user's convenience can be improved. The CGW 13 performs the display control information reception control process, thus receives the display control information from the center device 3, receives the display information from the center device 3, and displays the display information according to the display control information.

(24) Screen Display Control Process for Progress Display

The progress display screen display control process will be described with reference to FIGS. 186 to 210. The vehicle program rewriting system 1 performs the progress display screen display control process in the CGW 13.

Figures 186, 187:
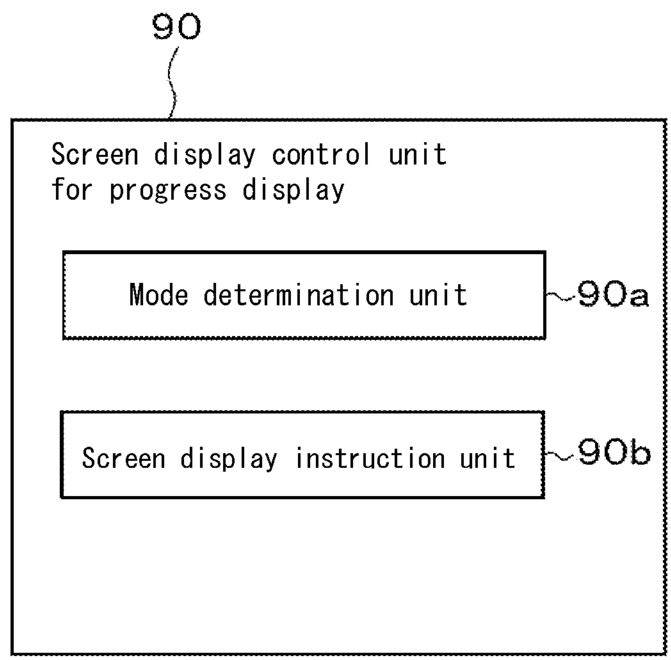
FIG. 186 is a functional block diagram of a progress display screen display control unit.
FIG. 187 is a diagram illustrating rewrite specification data.

As illustrated in FIG. 186, the CGW 13 includes a mode determination unit 90*a* and a screen display instruction unit 90*b* in the progress display screen display control unit 90.

The mode determination unit 90*a* determines whether or not a customization mode is set by the user's customization operation. The mode determination unit 90*a* determines whether or not an external mode from the outside is set on the basis of scene information included in the rewrite specification data. That is, the mode determination unit 90*a* refers to the scene information included in the rewrite specification data illustrated in FIG. 8. As illustrated in FIGS. 8 and 187, scene information, expiration date information, and position information are stored in the rewrite specification data. The scene information indicates a scene (for example, the type or a view) of the main update, and also designates screen display of the main update. Specifically, there are a recall flag, a dealer flag, a factory flag, a function update notification flag, and a forced execution flag.

The recall flag is a flag for designating screen display in a case where an application program is rewritten in response to a recall. The recall indicates implementation of measures such as repair, replacement, or recovery without charge due to the provisions of the regulations or at the discretion of a manufacturer or seller in a case where a defect in a product is found due to a design or manufacturing error, or the like.

The dealer flag is a flag for designating screen display in a case where an application program is rewritten in a dealer. The factory flag is a flag for designating screen display in a case where the application program is rewritten in a factory. The function update notification flag is a flag for designating screen display in a case where the application program is rewritten in response to a function update notification. The function update notification is performed to update a specific function. For example, the function update notification flag is a flag for designating screen display in the program update for adding a new function for a fee (or for free).

The forced execution flag is a flag for designating screen display in a case where the application program is rewritten in response to forced execution. The forced execution indicates that the application program is forced to be rewritten because campaign notifications are performed a predetermined number of times but the application program is not rewritten. For example, the forced execution flag is a flag for designating screen display in a case where a program is forced to be updated.

The flags indicating the scene information are all set to 0 (flag is not established) in a case where there is no relevant item, and any thereof is set to 1 (flag is established) in a case where there is a relevant item. For example, the mode determination unit 90*a* determines that a recall mode is set when the dealer flag is established, determines that a dealer mode is set when the recall flag is established, determines that a factory mode is set when the factory flag is established, determines that a function update mode is set when the function update notification flag is established, and determines that a forced execution mode is set when the forced execution flag is established.

The expiration date information is information indicating the expiration date, and is information serving as a criterion for determining whether or not rewrite of the application program is to be executed. The CGW 13 executes rewriting of the application program when the current time is within the expiration date indicated by the expiration date information, and does not execute rewriting of the application program when the current time exceeds the expiration date indicated by the expiration date information. That is, after a distribution package is downloaded, the CGW 13 refers to the expiration date information when installing the program, and does not execute installation of the program and discards the distribution package when the current time exceeds the expiration date.

The position information is information indicating a position, is information serving as a criterion for determining whether or not rewriting of the application program is to be executed, and includes a permitted area and a prohibited area. In a case where the permitted area is designated as the position information, the CGW 13 executes rewriting of the application program when the current position of the vehicle is inside the permitted area indicated by the position information, and does not execute rewriting of the application program when the current position of the vehicle is outside the permitted area indicated by the position information. In a case where the prohibited area is designated as the position information, the CGW 13 executes rewriting of the application program when the current position of the vehicle is outside the prohibited area indicated by the position information, and does not execute rewriting of the application program when the current position of the vehicle is inside the prohibited area indicated by the position information. That is, after the distribution package is downloaded, the CGW 13 refers to the position information when installing a program, and does not execute installation of the program when the current position is outside the permitted area, and delays the installation until the vehicle enters the permitted area.

The screen display instruction unit 90*b* instructs the display terminal 5 to display a screen corresponding to rewriting of the application program. The screen display instruction unit 90*b* instructs the display terminal 5 to display the screen by giving an instruction for whether or not the screen corresponding to a rewriting phase of the application program is displayed, giving an instruction for whether or not items of the screen are displayed, and giving an instruction for changing display contents of the items of the screen.

Figure 188:
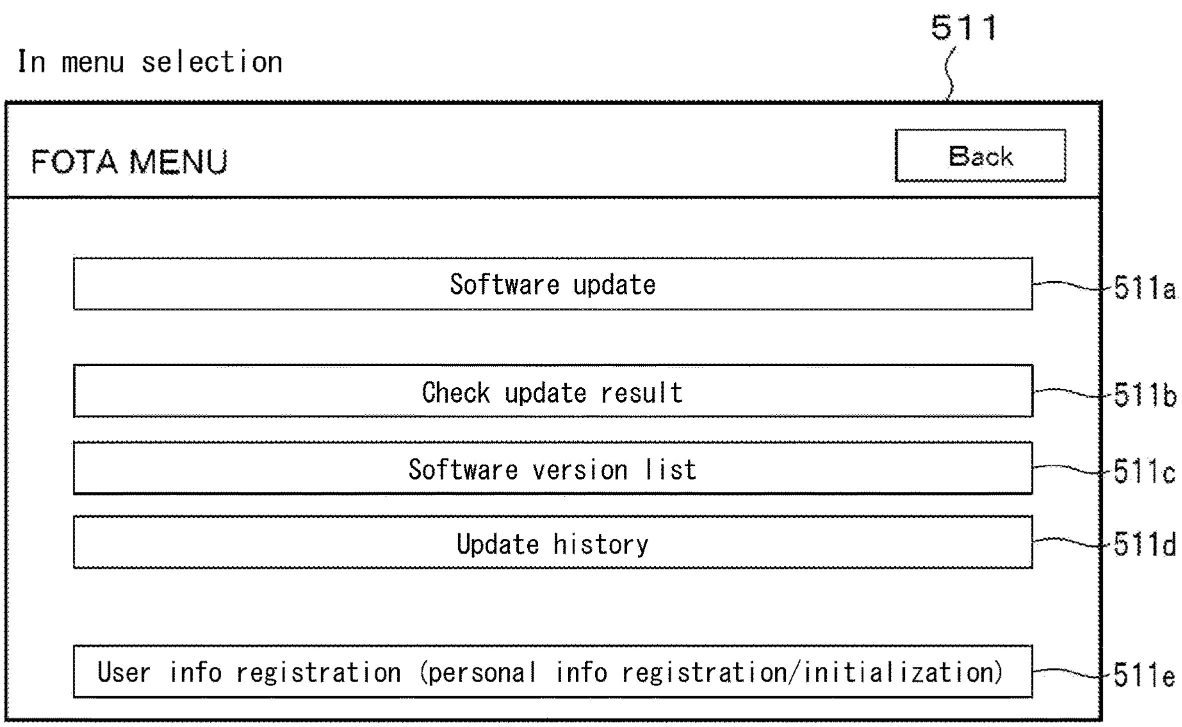
FIG. 188 is a diagram illustrating a screen during menu selection.

A description will be made of the user's customization operation. Here, a screen displayed on the in-vehicle display 7 will be described, but the same applies to a screen displayed on the mobile terminal 6. In a screen described later, a layout of the number, disposition, and the like of buttons may be other than the exemplified layout. When the user performs an operation of displaying a menu screen on the in-vehicle display 7, the CGW 13 displays a menu selection screen 511 on the in-vehicle display 7 as illustrated in FIG. 188. In the menu selection screen 511, the CGW 13 displays a "software update" button 511*a*, an "update result check" button 511*b*, a "software version list" button 511*c*, an "update history" button 511*d*, a "user information registration" button 511*e*, and waits for the user operation.

Figure 189:
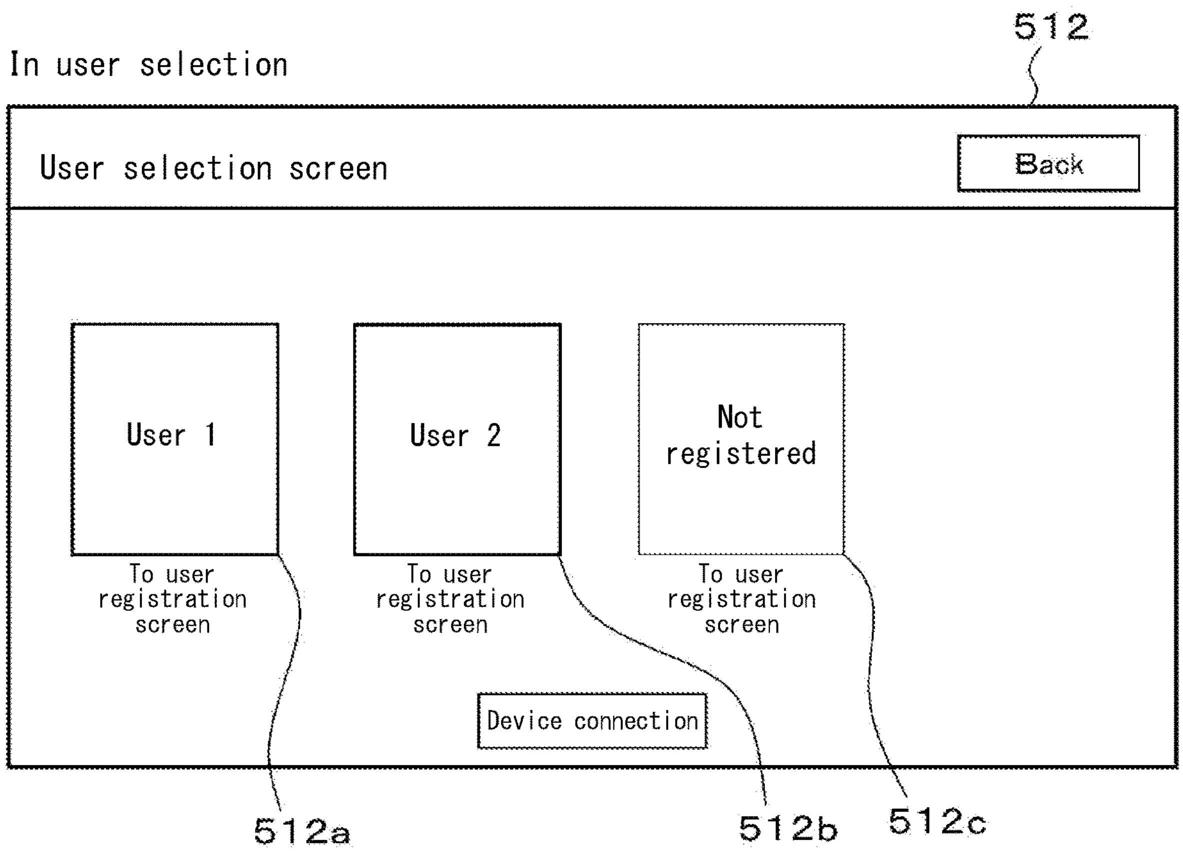
FIG. 189 is a diagram illustrating a screen during user selection.

When the user operates the "user information registration" button 511*e* in this state, the CGW 13 displays a user selection screen 512 on the in-vehicle display 7 as illustrated in FIG. 189. In the user selection screen 512, the CGW 13 displays "user" buttons 512*a* to 512*c* and waits for the user operation.

Figure 190:
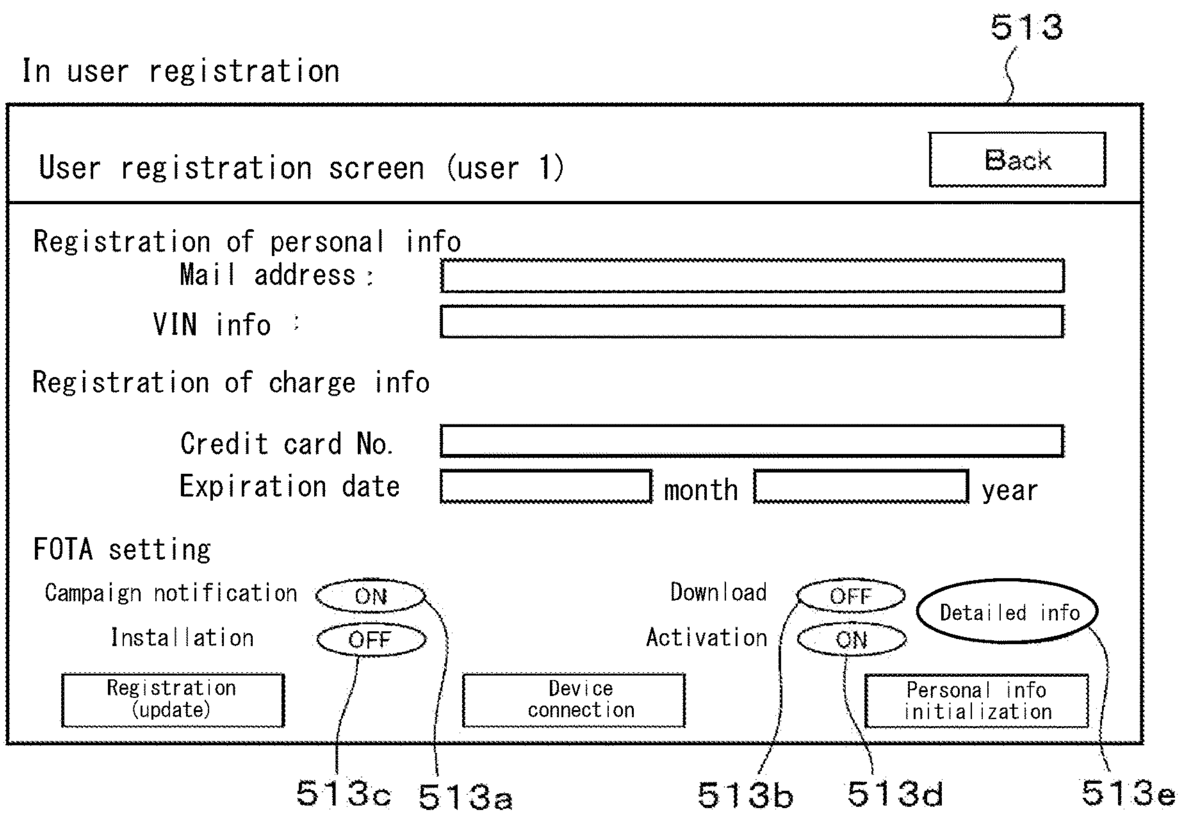
FIG. 190 is a diagram illustrating a screen during user registration.
Figure 191:
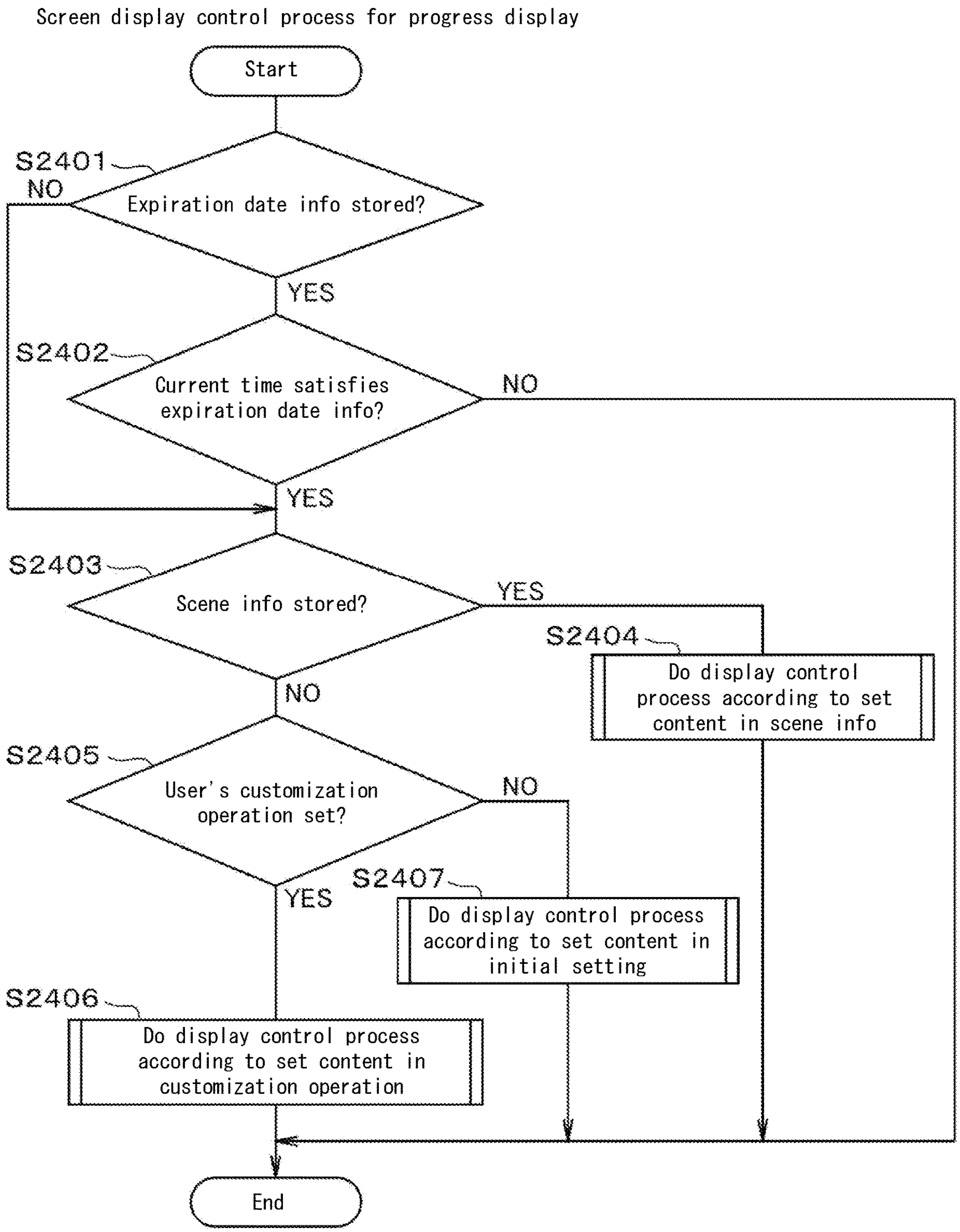
FIG. 191 is a flowchart illustrating a progress display screen display control process.

When the user operates the "user" button 512*a* in this state, the CGW 13 displays a user registration screen 513 on the in-vehicle display 7, as illustrated in FIG. 190. In the user registration screen 513, the CGW 13 displays input fields of an mail address and VIN information (individual vehicle identification information) for registration of personal information, displays input fields of a credit card number and the expiration date for registration of accounting information, displays the "ON/OFF" buttons 513*a* to 513*d* for campaign notification, download, installation, and activation in relation to settings of rewriting of an application program, displays a "detailed information" button 513*e*, and waits for the user operation.

The "ON/OFF" buttons 513*a* to 513*d* for a campaign notification, download, installation, and activation are buttons for selecting whether or not to display screens for a campaign notification, download, installation, and activation. Specifically, when a campaign notification is received, download is initiated, installation is initiated, and activation is initiated, the buttons are buttons that allow the user to select in advance whether or not to display the contents for requesting the user's approval. The "detailed information" button 513*e* is a button for registering the above-described expiration date information and position information. The information set by the user is transmitted to the center device 3 via the DCM 12. In a case where the user sets the pieces of information on the mobile terminal 6, the CGW 13 acquires the pieces of information from the center device 3 via the DCM 12.

The user may set the corresponding "ON/OFF" buttons 513*a* to 513*d* to OFF in a case where the user feels the screens bothersome about a campaign notification, download, installation, and activation. The buttons are set to OFF, and display of the contents for requesting the user's approval is omitted. For example, in a case where the user does not feel bothersome about screen display of a campaign notification or activation, but feels bothersome about screen display of download or installation, the user may set the campaign notification to ON with the "ON/OFF" button 513*a*, set the download to OFF with the "ON/OFF" button 513*b*, set the installation to OFF with the "ON/OFF" button 513*c*, and set the activation to ON with the "ON/OFF" button 513*d*.

In this case, for example, when the campaign notification is set to ON, the download is set to OFF, the installation is set to OFF, and the activation is set to ON, the display terminal 5 displays a campaign notification screen, does not display a download approval screen and a download-in-progress screen, does not display an installation approval screen and the installation-in-progress screen, and displays an activation screen according to a rewriting phase of the application program. That is, in the campaign notification, download, installation, and activation phases, when a corresponding phase is set to ON, the user performs screen display of the phase set to ON, and, when a corresponding phase is set to OFF, the user does not perform screen display of the phase set to OFF. Therefore, screen display can be customized. The ON/OFF setting of the screen display may be set individually for each phase, or all phases may be collectively set at a time.

In a case where the user wants to register the expiration date, the permitted area, and the prohibited area, the user may set the expiration date, the permitted area, and the prohibited area by operating the "detailed information" button 513*e*. The user can customize the expiration date for permitting rewriting of the application program as the expiration date information, and can customize the permitted area for permitting rewriting of the application program as the location information or the prohibited area for prohibiting the rewriting.

Next, an operation of the above-described configuration will be described with reference to FIGS. 191 to 214. The CGW 13 executes a progress display screen display control program and thus performs the progress display screen display control process.

When the progress display screen display control process is initiated, the CGW 13 determines whether or not the expiration date information is stored in the rewrite specification data and whether or not the expiration date information is set in the customization information (S2401). When it is determined that the expiration date information is stored in the rewrite specification data (S2401: YES), the CGW 13 determines whether the current time satisfies the expiration date information (S2402). In a case where the expiration date information stored in the rewrite specification data and the expiration date information set as the customization information are present, the CGW 13 determines whether both are satisfied. When it is determined that the current time exceeds the expiration date indicated by the expiration date information and the current time does not satisfy the expiration date information (S2402: NO), the CGW 13 finishes the progress display screen display control process.

When it is determined that the current time is within the expiration date indicated by the expiration date information and the current time satisfies the expiration date information (S2402: YES), the CGW 13 determines whether or not the scene information is stored in the rewrite specification data (S2403). When it is determined that the scene information is stored in the rewrite specification data (S2403: YES), the CGW 13 determines that the external mode is set, proceeds to the display instruction process according to the set content in the scene information (S2404), and instructs the in-vehicle display 7 to perform screen display corresponding to rewriting of the application program according to a mode of an established flag. For example, when the recall flag is established, the CGW 13 instructs the in-vehicle display 7 to perform screen display according to the recall mode during rewriting of the application program. For example, when the dealer flag is established, the CGW 13 instructs the in-vehicle display 7 to perform screen display according to the dealer mode during rewrite of the application program.

When it is determined that the scene information is not stored in the rewrite specification data (S2403: NO), the CGW 13 determines whether or not the customization mode is set through the user's customization operation (S2405; corresponding to a customization mode determination procedure). When it is determined that the customization mode is set (S2405: YES), the CGW 13 proceeds to a display instruction process according to the set content in the customization operation (S2406; corresponding to a screen display instruction procedure), and instructs the in-vehicle display 7 to perform screen display corresponding to rewriting of the application program according to the customization mode.

When it is determined that the customization mode is not set (S2405: NO), the CGW 13 proceeds to a display instruction process according to a set content in the initial setting (S2407; corresponding to a screen display instruction procedure), and instructs the in-vehicle display 7 to perform screen display corresponding to rewriting of the application program according to the customization mode. That is, the CGW 13 preferentially applies the scene information stored in the rewrite specification data, and applies the customization mode when the scene information is not stored. When neither the scene information nor the customization mode is present, the initial setting is applied. Here, the initial setting is a preset value, and the initial setting is a setting of turning on all settings of, for example, a campaign notification, download, installation, and activation.

Figure 192:
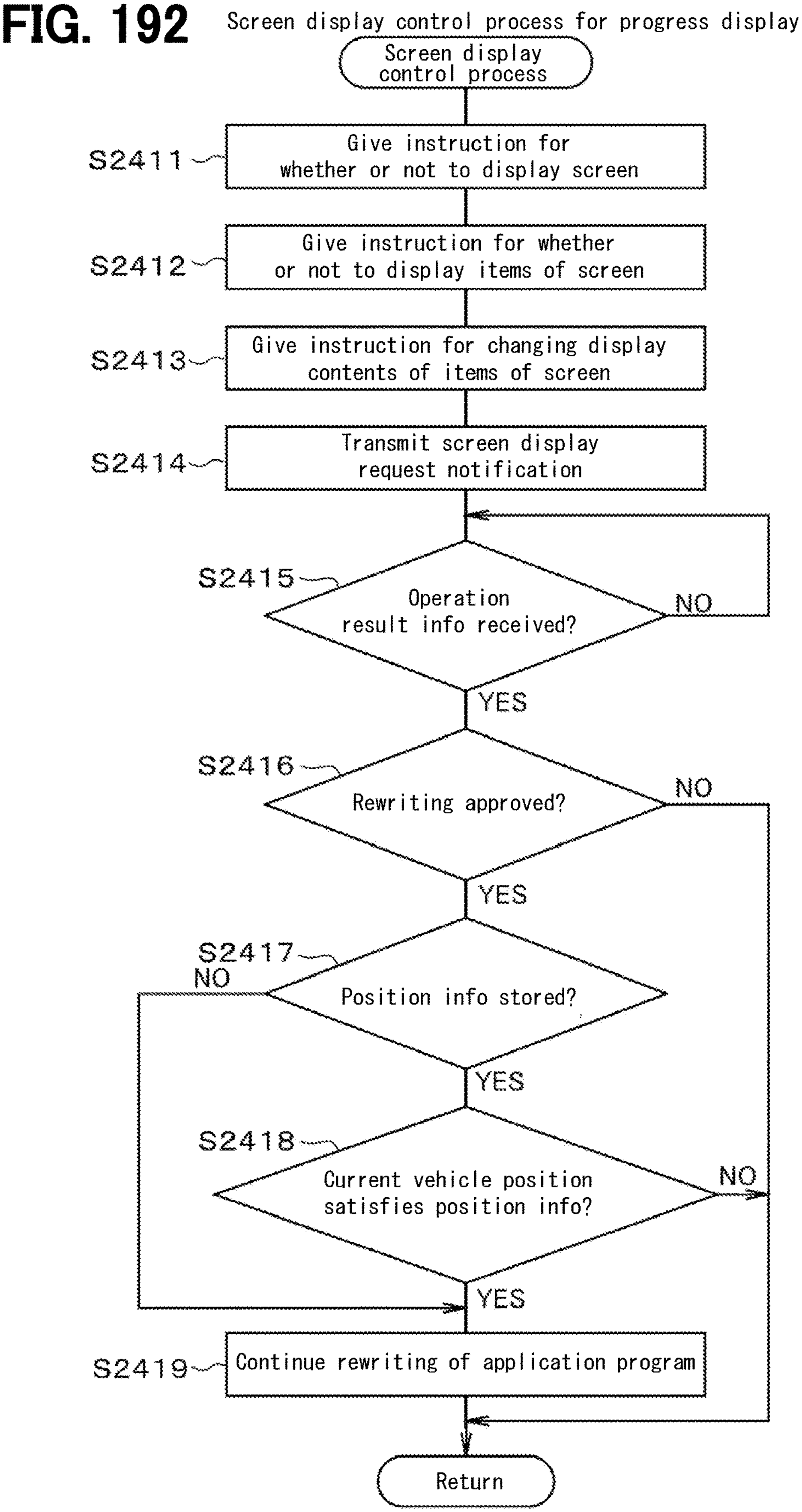
FIG. 192 is a flowchart illustrating the progress display screen display control process.

Next, the screen display instruction processes in S2404, S2406, and S2407 will be described with reference to FIG. 192. Here, the screen display instruction process in the installation phase is exemplified, but the same applies to the other phases. When the CGW 13 proceeds to the display instruction process, the CGW 13 sets whether or not to display the screen (S2411), sets whether or not to display items of a screen (S2412), and gives an instruction for changing display contents of the items of the screen (S2413). The CGW 13 transmits a screen display request notification to the DCM 12, causes the DCM 12 to transmit a screen display request to the in-vehicle display 7 (S2414), and waits for reception of an operation result information from the DCM 12 (S2415). The operation result information is information indicating a button operated by the user. The CGW 13 may directly transmit the screen display request notification to the in-vehicle display 7 and receive the operation result information.

When it is determined that the operation result information is received from the DCM 12 by transmitting an operation result from the in-vehicle display 7 to the DCM 12 (S2415: YES), the CGW 13 checks an approval on the basis of the operation result information, and determines whether or not the user has approved rewriting of the application program (S2416).

When it is determined that the user has approved rewriting of the application program (S2416: YES), the CGW 13 determines whether or not the rewrite specification data stores the position information (S2417). When it is determined that the position information is stored in the rewrite specification data (S2417: YES), the CGW 13 determines whether or not the current position of the vehicle satisfies the position information (S2418). S2417 and S2418 may be omitted in phases other than the installation phase. In a case where the position information is the permitted area, when the current position of the vehicle is inside the permitted area, the CGW 13 determines that the current position of the vehicle satisfies the position information (S2418: YES), and continues the rewriting of the application program (S2419).

On the other hand, when the current position of the vehicle is outside the permitted area, the CGW 13 determines that the current position of the vehicle does not satisfy the position information, does not continue and stops the rewriting of the application program, and finishes the screen display instruction process. In a case where the position information is the prohibited area, when the current position of the vehicle is outside the prohibited area, the CGW 13 determines that the current position of the vehicle satisfies the position information (S2418: YES), continues the rewriting of the application program (S2419), and finishes the screen display instruction process. When the current position of the vehicle is inside the prohibited area, the CGW 13 determines that the current position of the vehicle does not satisfy the position information, does not continue and stops the rewriting of the application program, and finishes the display instruction process.

Figure 193:
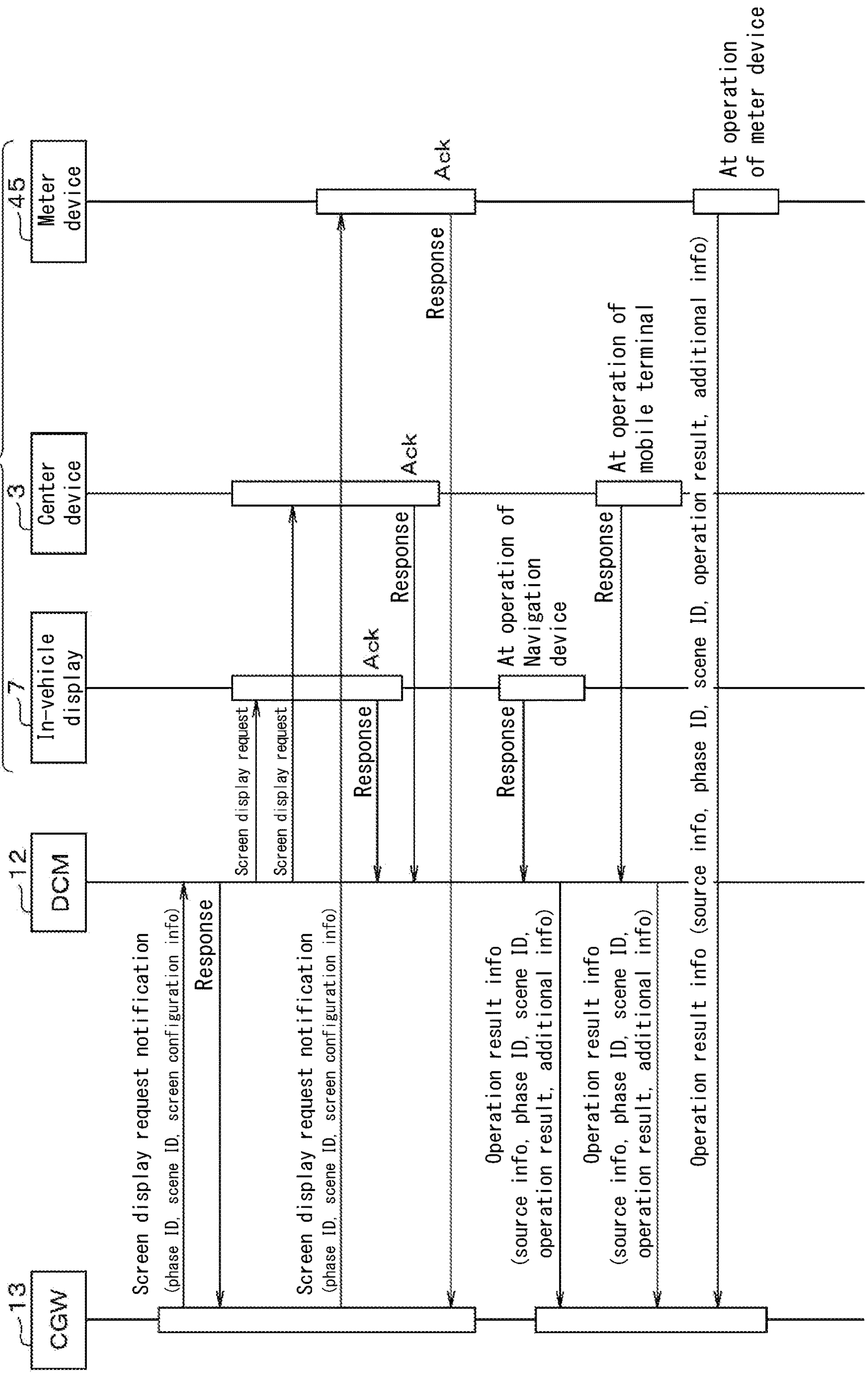
FIG. 193 is a diagram illustrating a message frame.

A description will be made of the screen display request notification transmitted from the CGW 13 to the DCM 12 and the operation result information transmitted from the DCM 12 to the CGW 13. As illustrated in FIG. 193, the screen display request notification transmitted from the CGW 13 to the DCM 12 includes a phase ID, a scene ID, and screen configuration information. The Phase ID is an ID for identifying each phase such as a campaign notification, download, installation, and activation. The scene ID is an ID for identifying the scene information illustrated in FIG. 187. The operation result information transmitted from the DCM 12 to the CGW 13 includes transmission source information, a phase ID, a scene ID, an operation result, and additional information. The CGW 13 collates the phase ID and scene ID stored in the screen display request notification with the phase ID and scene ID stored in the operation result information, and checks deviation or arbitration.

That is, when the phase ID and the scene ID stored in the screen display request notification transmitted to the DCM 12 matches the phase ID and the scene ID stored in the operation result information received from the DCM 12, the CGW 13 determines that the screen display request notification and the operation result information are consistent with each other, the screen display request notification and the operation result information are not deviated from each other, and thus arbitration is not required to be performed. On the other hand, when the phase ID and the scene ID stored in the screen display request notification transmitted to the DCM 12 do not match the phase ID and the scene ID stored in the operation result information received from the DCM 12, the CGW 13 determines that the screen display request notification and the operation result information are inconsistent with each other, the screen display request notification and the operation result information are deviated from each other, and thus arbitration is required to be performed. The CGW 13 arbitrates whether or not to perform a process according to the operation result information received from the DCM 12.

Figures 194, 195:
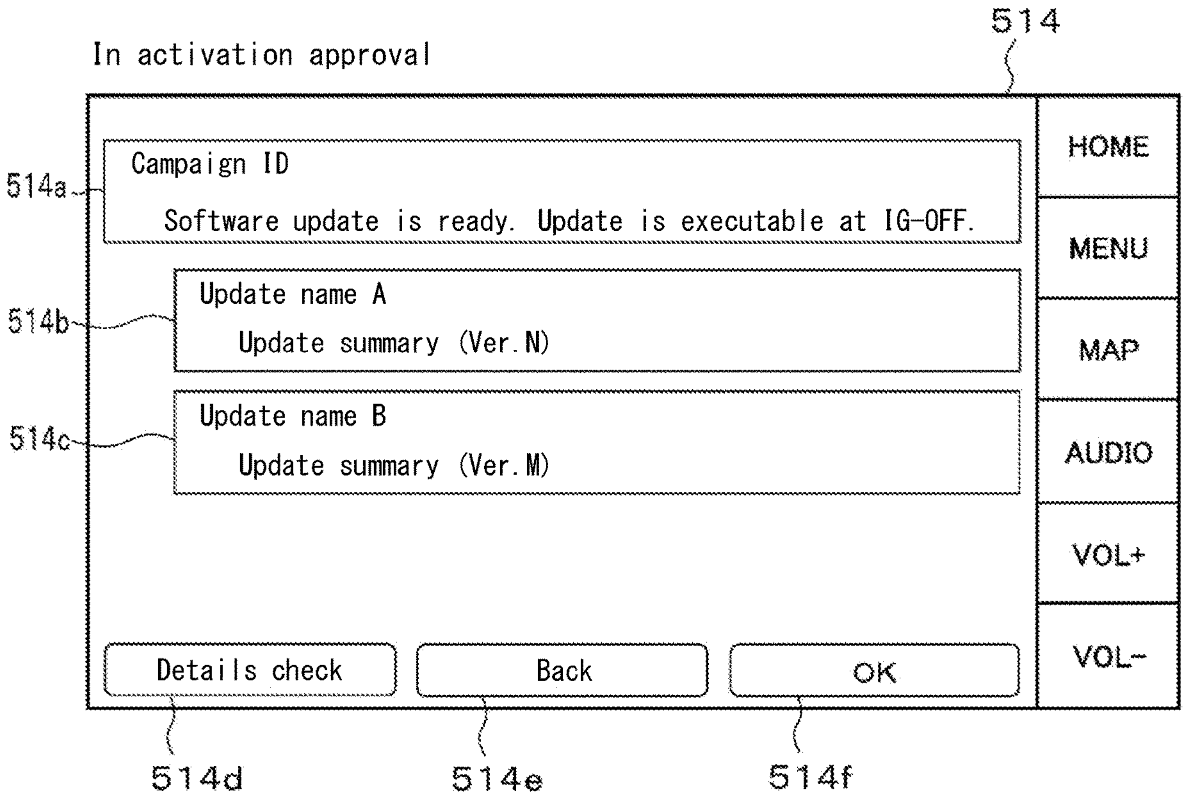
FIG. 194 is a diagram illustrating a screen when the activation is approved.
FIG. 195 is a diagram illustrating setting of item display availability.

The screen configuration information is information indicating configuration elements of a screen, and, as illustrated in FIG. 194, for example, in the activation approval screen 514, there are six items such as a "campaign ID . . . " button 514*a*, an "update name A . . . " button 514*b*, an "update name B . . . " button 514*c*, a "details check" button 514*d*, a "back" button 514*e*, and an "OK" button 514*f*. In this case, as illustrated in FIG. 195, when all of the six items of the screen configuration information are set to "display", as illustrated in FIG. 194, all of the six items are displayed on the activation approval screen 514. That is, the user can operate any of the "campaign ID . . . " button 514*a*, the "update name A . . . " button 514*b*, the "update name B . . . " button 514*c*, the "details check" button 514*d*, the "back" button 514*e*, and the "OK" button 514*f*.

Figures 196, 197:
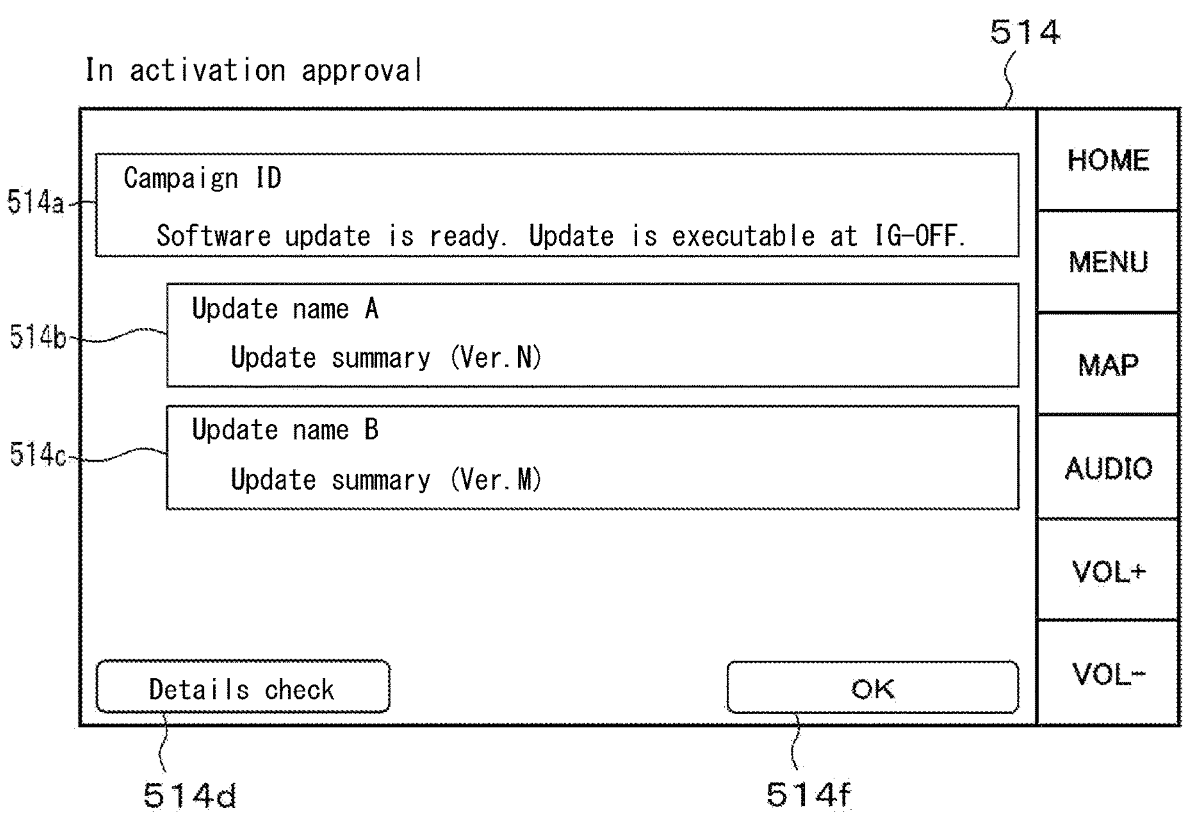
FIG. 196 is a diagram illustrating the setting of item display availability.
FIG. 197 is a diagram illustrating a screen when activation is approved.

On the other hand, as illustrated in FIG. 196, when the "campaign ID . . . " button 514*a*, the "update name A . . . " button 514*b*, the "update name B . . . " button 514*c*, the "detailed information" button 514*d*, and the "OK" button 514*f* are set to "display", and the "back" button 514*e* is set to "non-display" among the six items of screen configuration information, the "campaign ID . . . " button 514*a*, the "update name A . . . " button 514*b*, the "update name B . . . " button 514*c*, the "detailed information" button 514*d*, and the "OK" button 514*f* are displayed and the "back" button 514*e* is not displayed on the activation approval screen 514, as illustrated in FIG. 197. That is, the user can operate any of the "campaign ID . . . " button 514*a*, the "update name A . . . " button 514*b*, the "update name B . . . " button 514*c*, the "details check" button 514*d*, the "OK" button 514*f*, but the "back" button 514*e* is not displayed, and thus the "back" button 514*e* is not operable. For example, with respect to rewriting of an application program having a relatively high degree of importance or urgency due to a recall or the like, since it is not desirable to reject activation, setting can be made not to reject the activation by making the "back" button 514*e* inoperable as described above. In this case, the user approves the activation by operating the "OK" button 514*f*.

Figure 198:
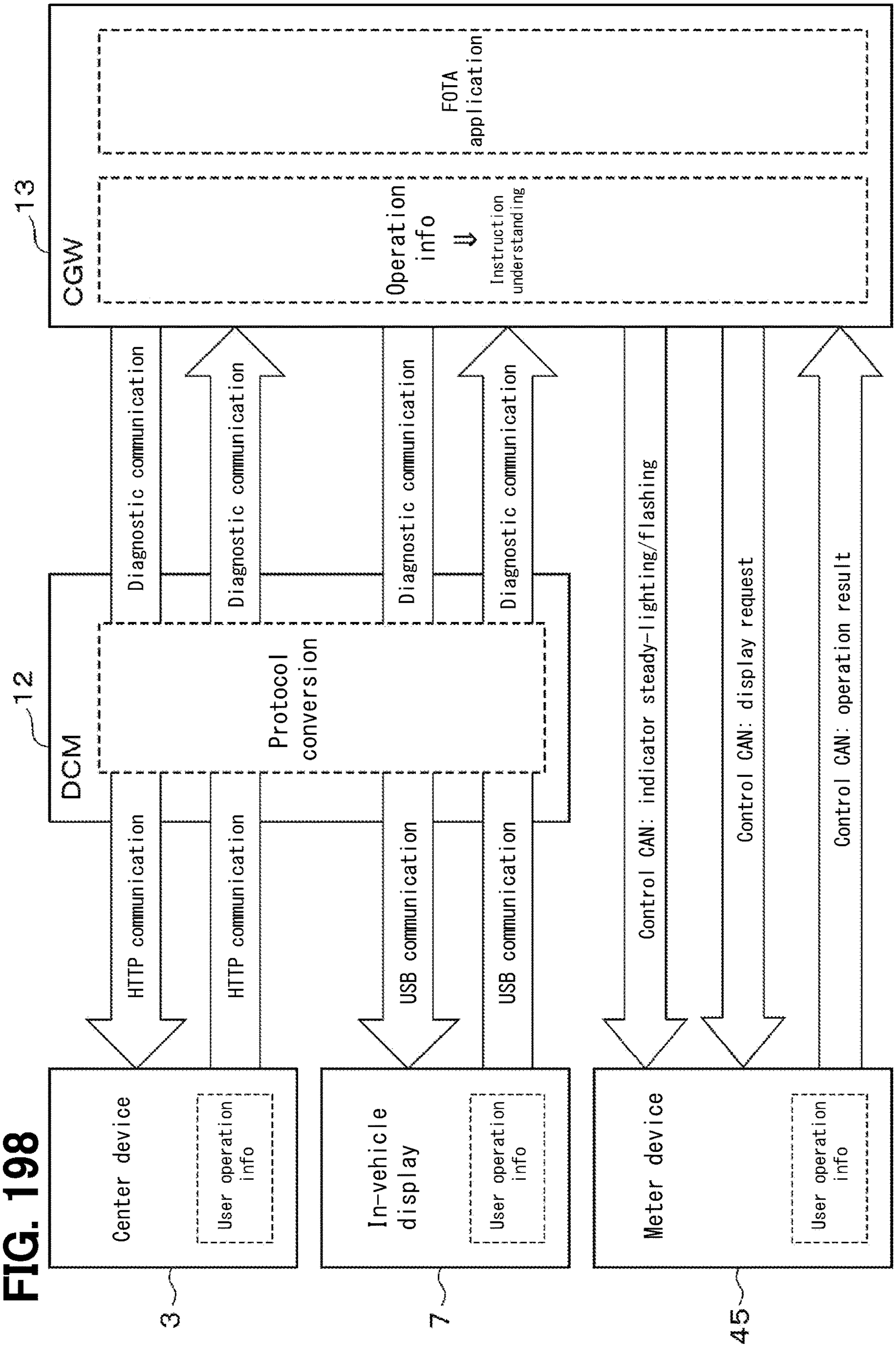
FIG. 198 is a diagram illustrating an aspect of data communication.

A description will be made of a message framework regarding screen display and a user operation transmitted and received among the CGW 13, the DCM 12, the in-vehicle display 7, the center device 3, and a meter device 45. As illustrated in FIG. 198, the CGW 13 and the DCM 12 are connected to each other via CAN or Ethernet, and the DCM 12 and the in-vehicle display 7 are connected to each other via the USB.

The CGW 13 performs data communication with the center device 3 via the DCM 12. Data transmitted from the CGW 13 through diagnosis communication is subjected to protocol conversion by the DCM 12 and is received from the DCM 12 by the center device 3 through HTTP communication. For example, the CGW 13 transmits data indicating the current progress state such as the current phase or a progress ratio, to the center device 3 via the DCM 12. The data transmitted from the center device 3 through HTTP communication is subjected to protocol conversion by the DCM 12 and is received from the DCM 12 by the CGW 13 through diagnosis communication.

The CGW 13 performs data communication with the in-vehicle display 7 via the DCM 12. The data transmitted from the CGW 13 through the diagnosis communication is subjected to protocol conversion by the DCM 12 and is received from the DCM 12 by the in-vehicle display 7 through USB communication. The data transmitted from the in-vehicle display 7 through the USB communication is subjected to protocol conversion by the DCM 12 and is received from the DCM 12 by the CGW 13 through the diagnosis communication. For example, the CGW 13 acquires information regarding the user operation on the in-vehicle display 7 via the DCM 12. As described above, in the vehicle program rewriting system 1, the DCM 12 is provided with the protocol conversion function, and the mobile terminal 6 and the in-vehicle display 7 are configured to be equally handled by the CGW 13. Information regarding the user operation is aggregated into the CGW 13, and thus the CGW 13 arbitrates user operation results from a plurality of operation terminals so as to manage the current progress state.

A description will be made of a sequence of a message frame transmitted and received among the CGW 13, the DCM 12, and the in-vehicle display 7. As illustrated in FIGS. 199 to 206, in the screen display request notification transmitted from the CGW 13 to the DCM 12 and the operation result information transmitted from the CGW 13 to the DCM 12, the phase ID is set to "03" in the campaign notification, the phase ID is set to "04" in the download, the phase ID is set to "05" in the installation, and the phase ID is set to "06" in the activation. In each phase of the campaign notification, the download, the installation, and the activation, the order of transmission and reception of message frames is the same, and the phase IDs are different from each other such that the phases are differentiated from each other.

Figure 199:
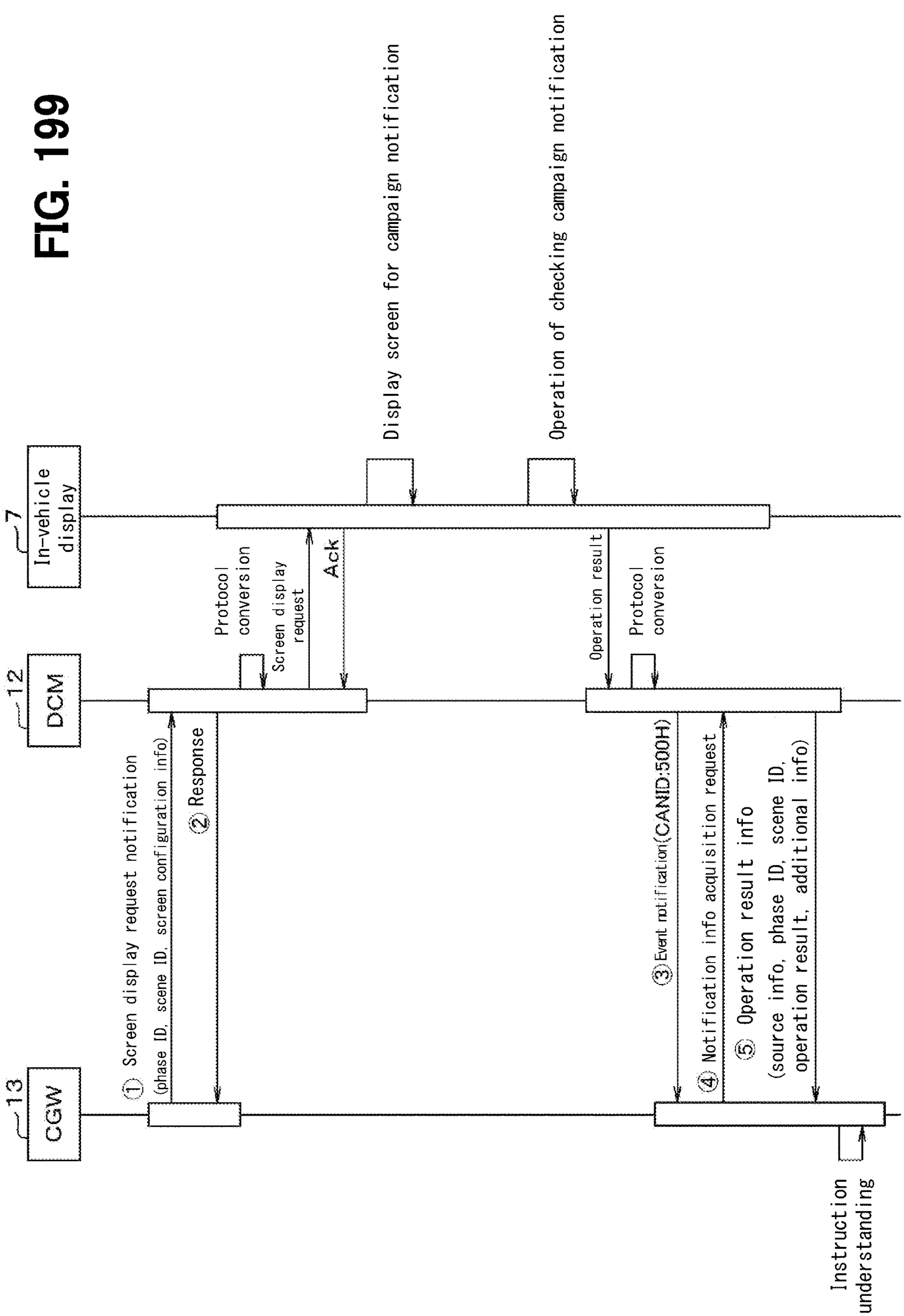
FIG. 199 is a diagram illustrating a message frame during a campaign notification.

FIG. 199 exemplifies the campaign notification phase. The CGW 13 manages the current progress state, specifies the phase ID, the scene ID, and the screen configuration information, and transmits the screen display request notification to the DCM 12. When the screen display request notification is received from the CGW 13, the DCM 12 transmits a screen display request to the in-vehicle display 7. When the screen display request is received from the DCM 12, the in-vehicle display 7 displays a campaign notification screen, and, when the user performs an operation of checking the campaign notification, transmits the operation result to the DCM 12. When the operation result is received from the in-vehicle display 7, the DCM 12 transmits operation result information to the CGW 13. The operation result information received by the CGW 13 includes transmission source information, a phase ID, a scene ID, the operation result, and additional information. The CGW 13 updates the current progress state on the basis of the operation result information received from the DCM 12. Here, the CGW 13 updates the current progress state to the download phase when approval operations are performed in the campaign notification phase.

Figure 200:
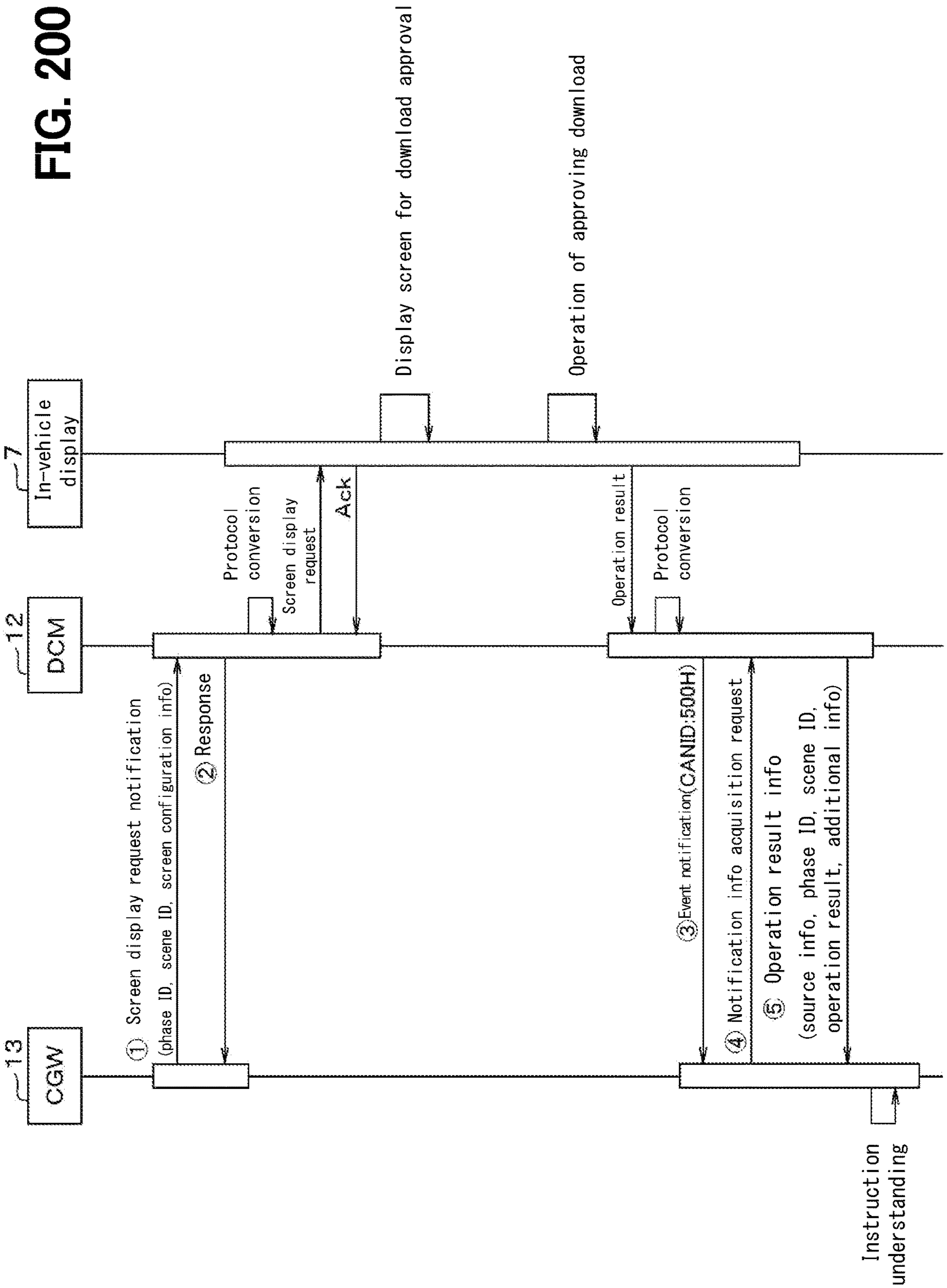
FIG. 200 is a diagram illustrating a message frame when download is approved.

FIG. 200 exemplifies the download phase. The CGW 13 manages the current progress state, specifies the phase ID, the scene ID, and the screen configuration information, and transmits the screen display request notification to the DCM 12. When the screen display request notification is received from the CGW 13, the DCM 12 transmits a screen display request to the in-vehicle display 7. When a screen display request is received from the DCM 12, the in-vehicle display 7 displays a download approval screen, and, when the user performs a download approval operation, transmits the operation result to the DCM 12. When the operation result is received from the in-vehicle display 7, the DCM 12 transmits operation result information to the CGW 13. The operation result information received by the CGW 13 includes transmission source information, a phase ID, a scene ID, the operation result, and additional information. The CGW 13 updates the current progress state on the basis of the operation result information received from the DCM 12. Here, the CGW 13 updates the current progress state to the installation phase when there is an approval operation during the download phase.

Figure 201:
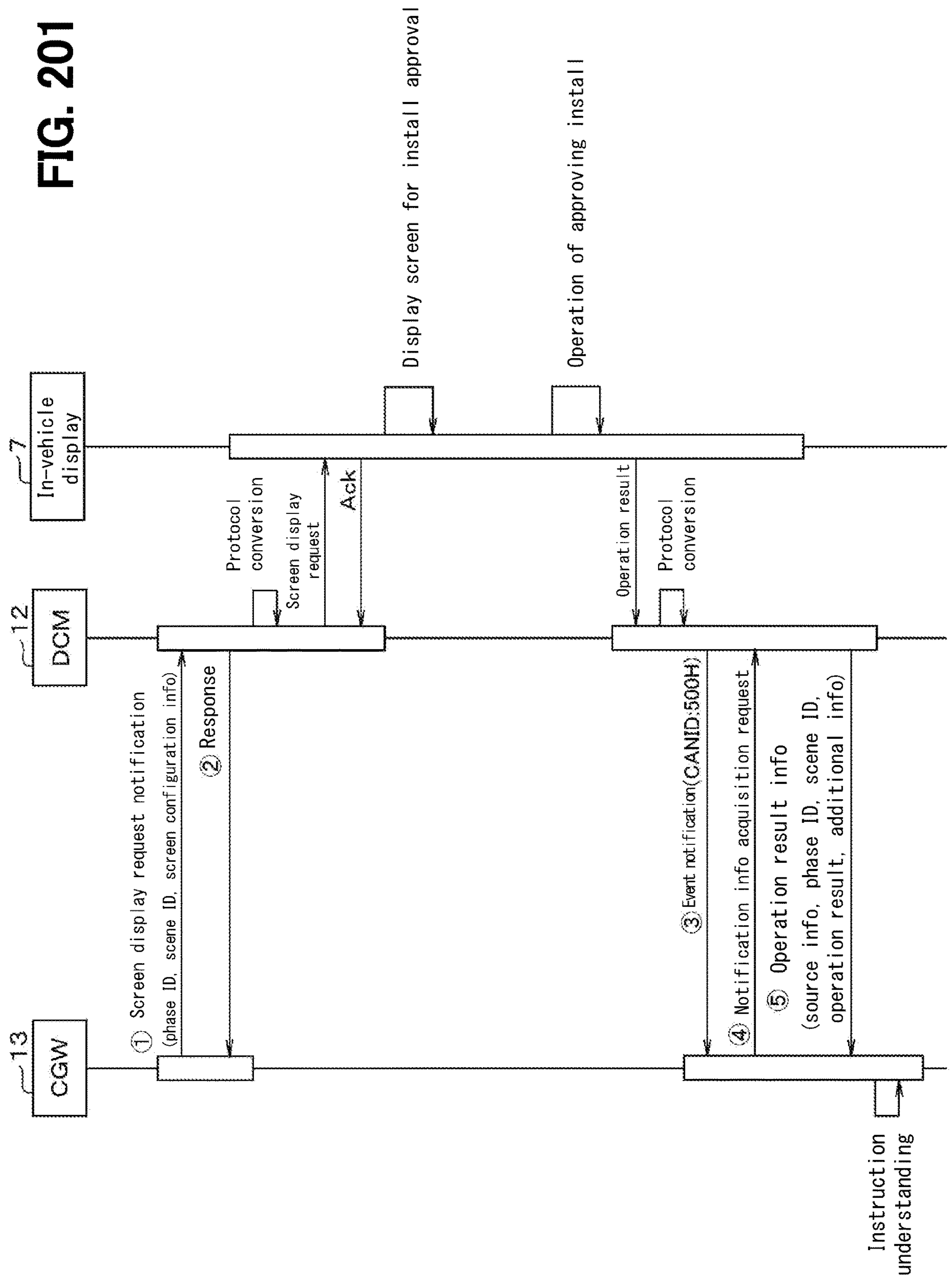
FIG. 201 is a diagram illustrating a message frame when installation is approved.

FIG. 201 exemplifies the installation phase. The CGW 13 manages the current progress state, specifies the phase ID, the scene ID, and the screen configuration information, and transmits the screen display request notification to the DCM 12. When the screen display request notification is received from the CGW 13, the DCM 12 transmits a screen display request to the in-vehicle display 7. When the screen display request is received from the DCM 12, the in-vehicle display 7 displays an installation approval screen, and, when the user performs an installation approval operation, transmits the operation result to the DCM 12. When the operation result is received from the in-vehicle display 7, the DCM 12 transmits operation result information to the CGW 13. The operation result information received by the CGW 13 includes transmission source information, a phase ID, a scene ID, the operation result, and additional information. The CGW 13 updates the current progress state on the basis of the operation result information received from the DCM 12. Here, the CGW 13 updates the current progress state to the activation phase when there is an approval operation during the installation phase.

Figure 202:
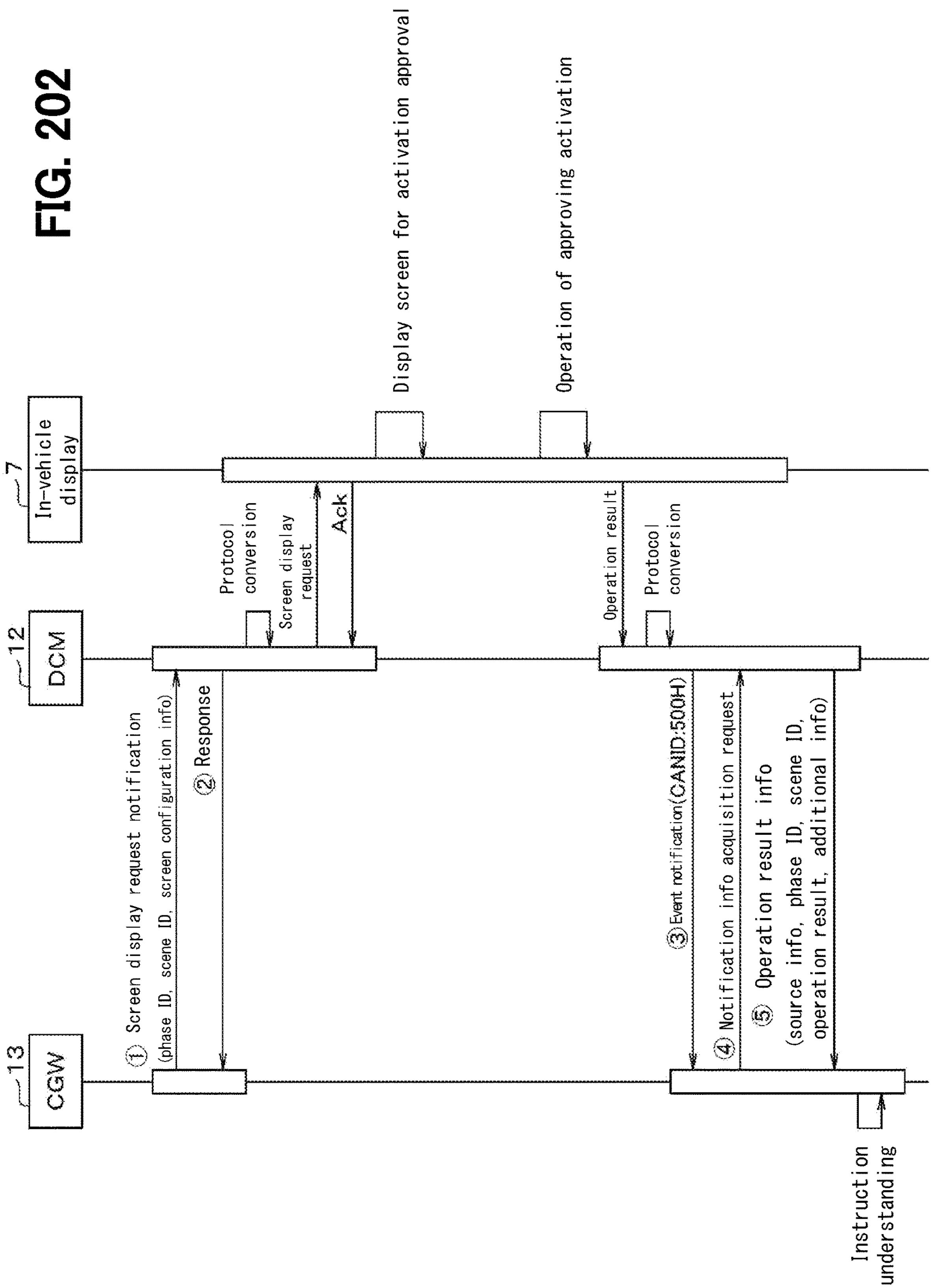
FIG. 202 is a diagram illustrating the message frame when activation is approved.

FIG. 202 exemplifies the activation phase. The CGW 13 manages the current progress state, specifies the phase ID, the scene ID, and the screen configuration information, and transmits the screen display request notification to the DCM 12. When the screen display request notification is received from the CGW 13, the DCM 12 transmits a screen display request to the in-vehicle display 7. When the screen display request is received from the DCM 12, the in-vehicle display 7 displays an activation approval screen, and, when the user performs an activation approval operation, transmits the operation result to the DCM 12. When the operation result is received from the in-vehicle display 7, the DCM 12 transmits operation result information to the CGW 13. The operation result information received by the CGW 13 includes transmission source information, a phase ID, a scene ID, the operation result, and additional information. The CGW 13 updates the current progress state on the basis of the operation result information received from the DCM 12.

The screen display will be described with reference to FIGS. 203 to 210. In a case where the customization mode is not set and no flag is set in the scene information of the rewrite specification data, the CGW 13 instructs the display terminal 5 to perform screen display corresponding to rewriting of the application program according to a content of the initial setting (S2407). When the initial setting is a setting of turning on all of the campaign notification, the download, the installation, and the activations, the CGW 13 gives a screen display instruction to the display terminal 5 in order to sequentially display the navigation screen 501, the campaign notification screen 502, the download approval screen 503, the download-in-progress screen 504, the download completion notification screen 505, the installation approval screen 506, the installation-in-progress screen 507, the activation approval screen 508, the activation completion notification screen 509, and the check operation screen 510, as illustrated in FIGS. 31 to 46. In this case, the contents for obtaining the user's approval (OK) is displayed on the campaign notification screen 502, the download approval screen 503, the installation approval screen 506, the activation approval screen 508, and the check operation screen 510.

In a case where the user's customization mode is set, the CGW 13 instructs the display terminal 5 to perform screen display corresponding to the rewriting of the application program according to a content of the customization mode (S2406). However, this is limited to a case where scene information is not designated. For example, when the campaign notification is set to ON, the download is set to OFF, the installation is set to OFF, and the activation is set to ON in the customization mode, the CGW 13 gives a screen display instruction to the display terminal 5 in order not to display the download approval screen 503, the download-in-progress screen 504, the download completion notification screen 505, the installation approval screen 506, and the installation-in-progress screen 507 and to display the activation approval screen 508 after the campaign notification screen 502 is displayed.

Figure 204:
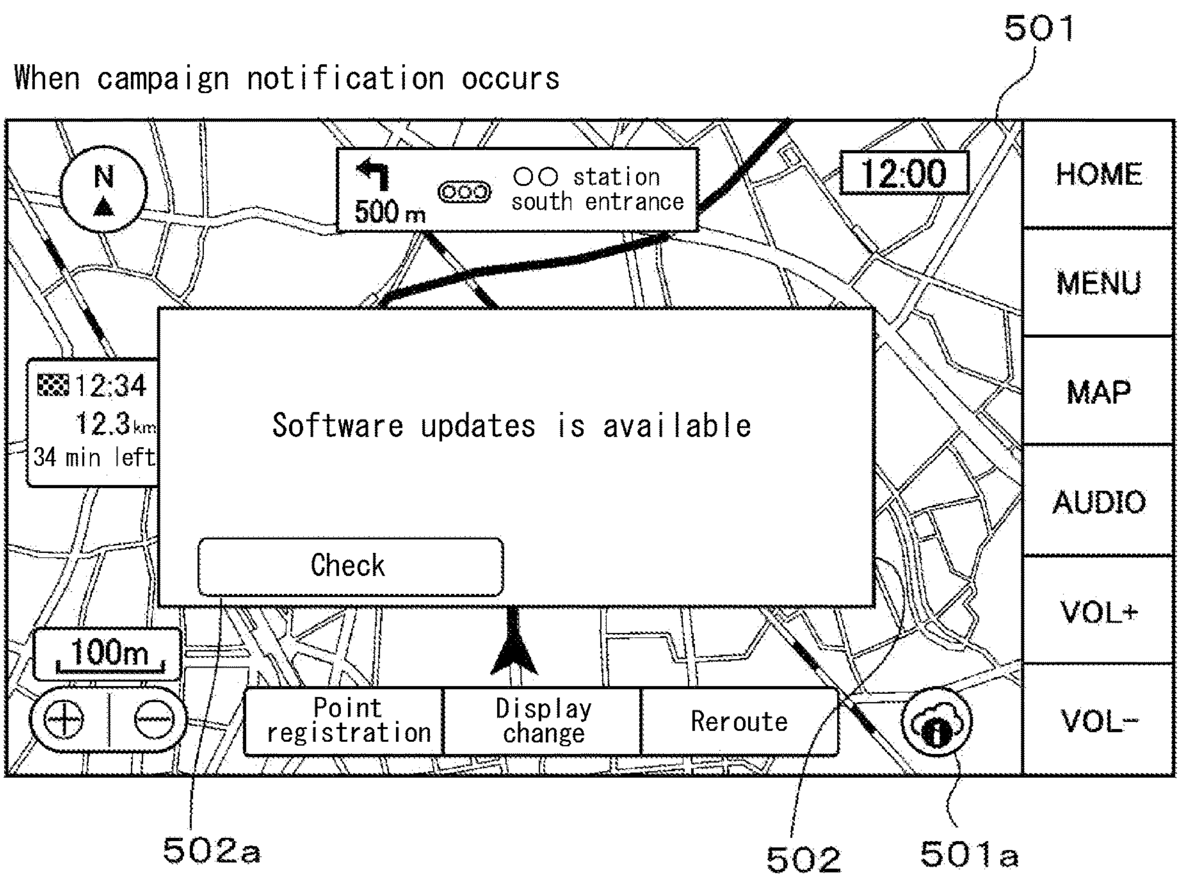
Figure 205:
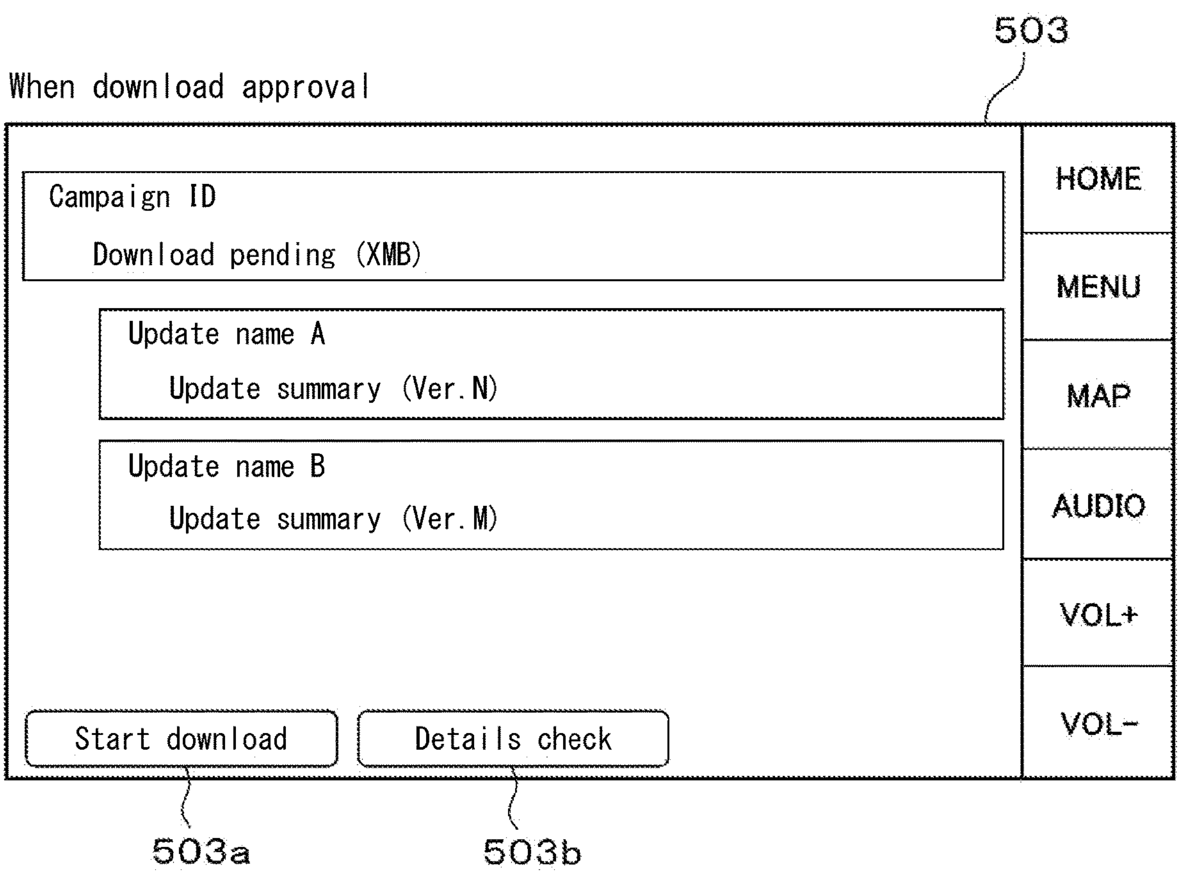
FIG. 205 is a diagram illustrating a screen when download is approved.
Figure 206:
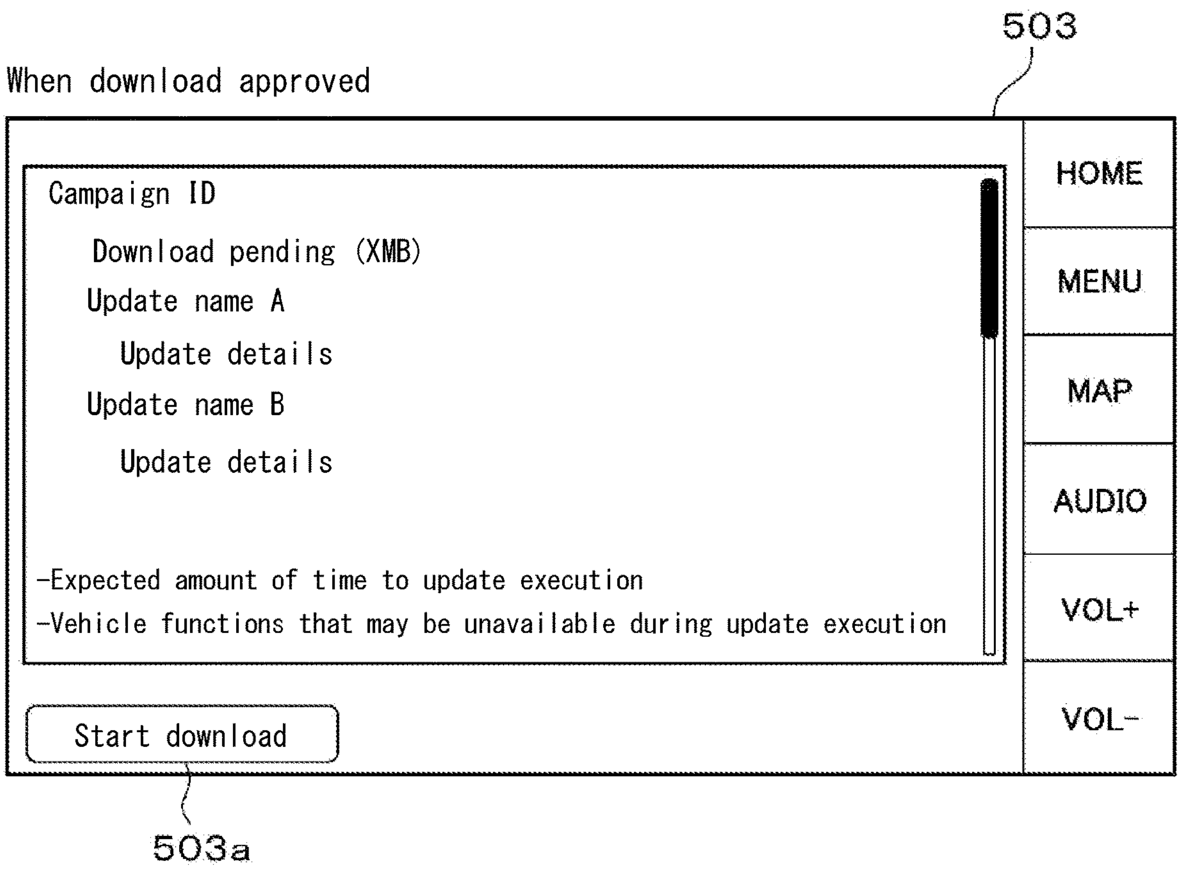
FIG. 206 is a diagram illustrating a screen when the download is approved.
Figure 207:
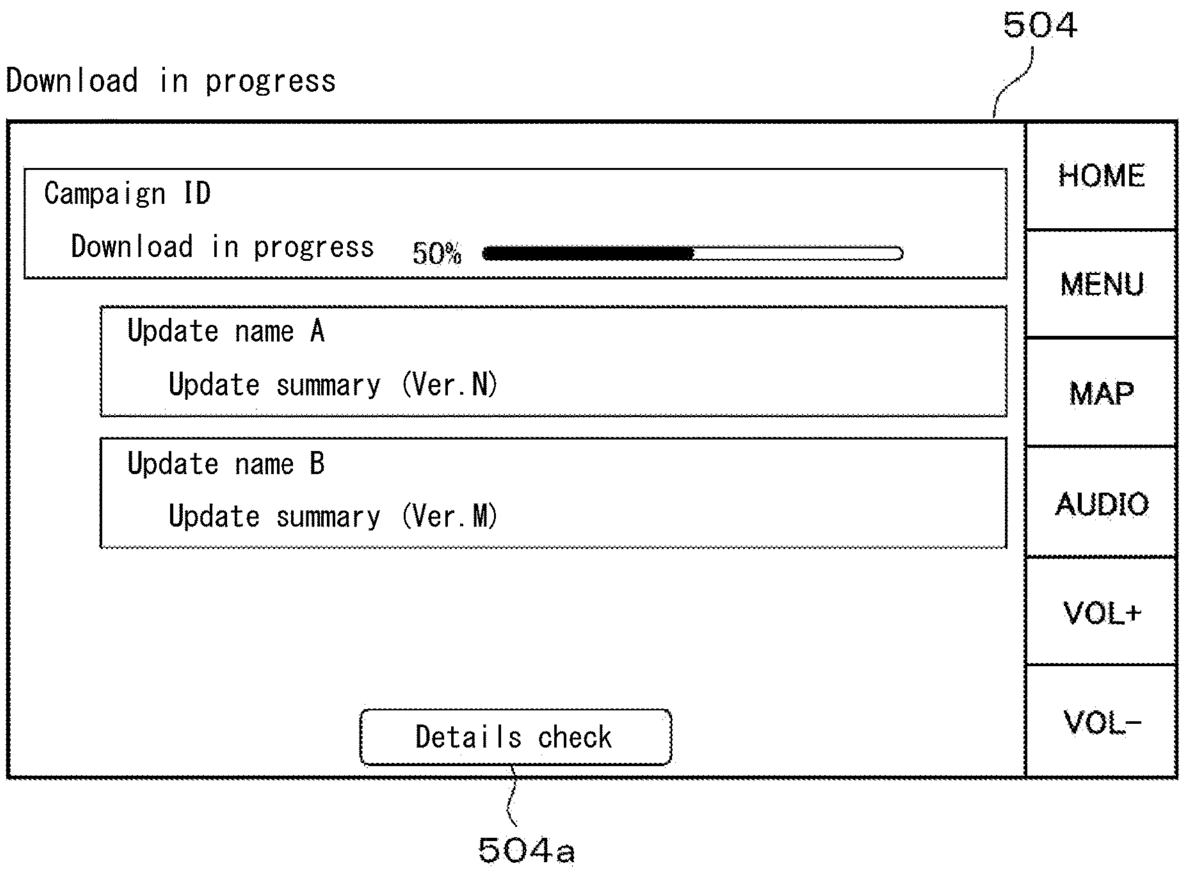
FIG. 207 is a diagram illustrating a screen during execution of download.
Figure 208:
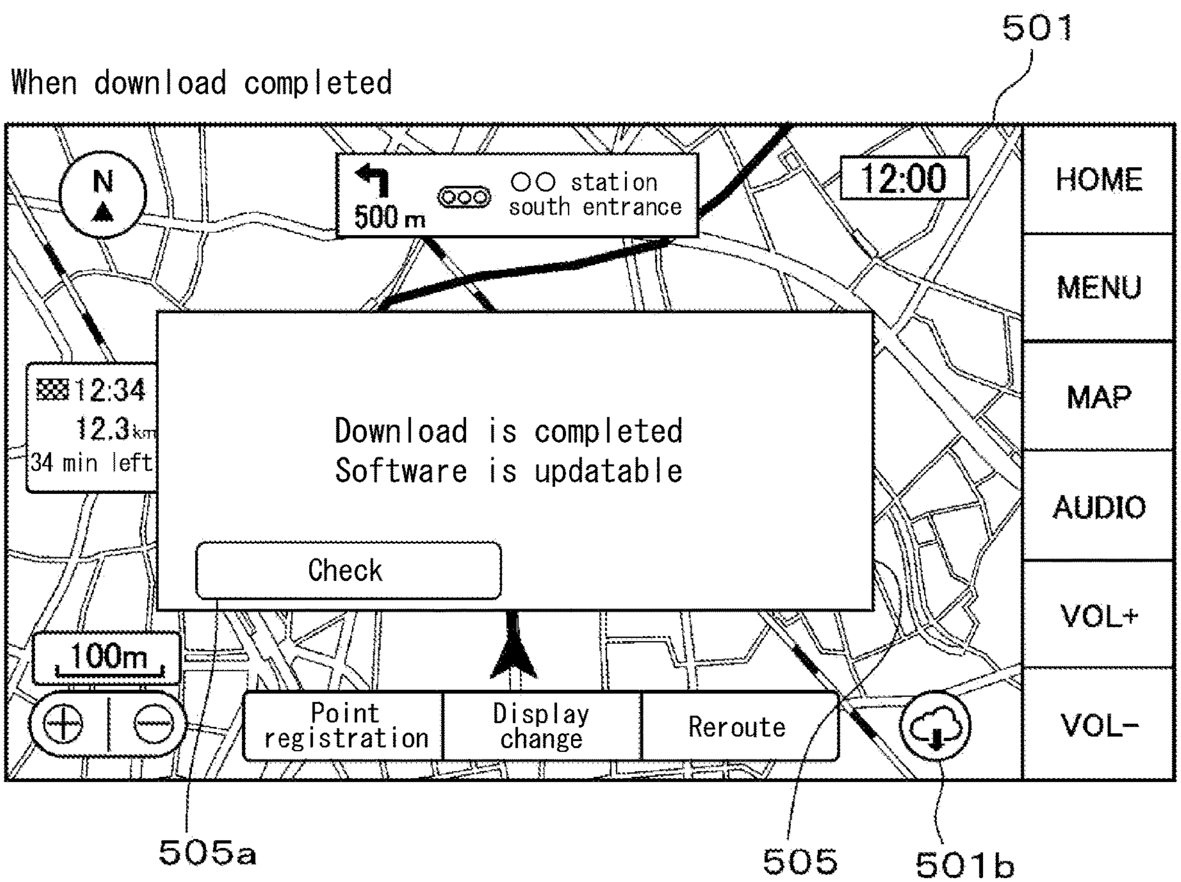
FIG. 208 is a diagram illustrating a screen when download is completed.
Figure 209:
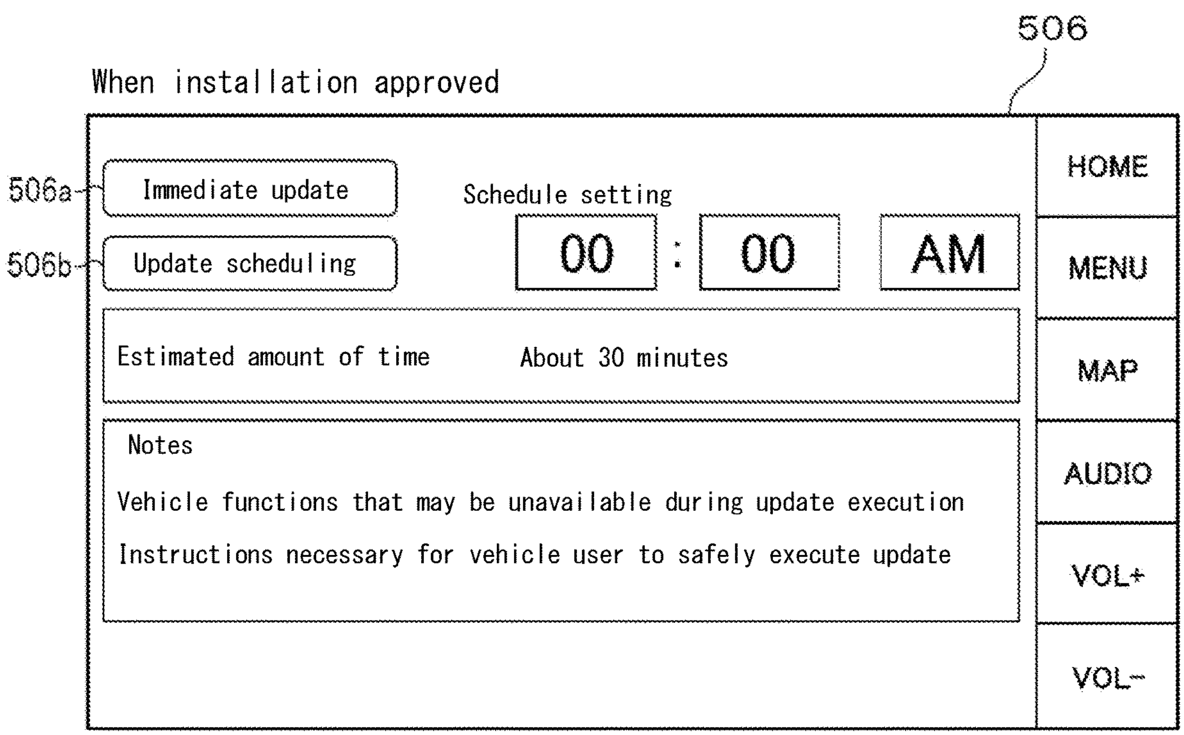
FIG. 209 is a diagram illustrating a screen when installation is approved.
Figure 210:
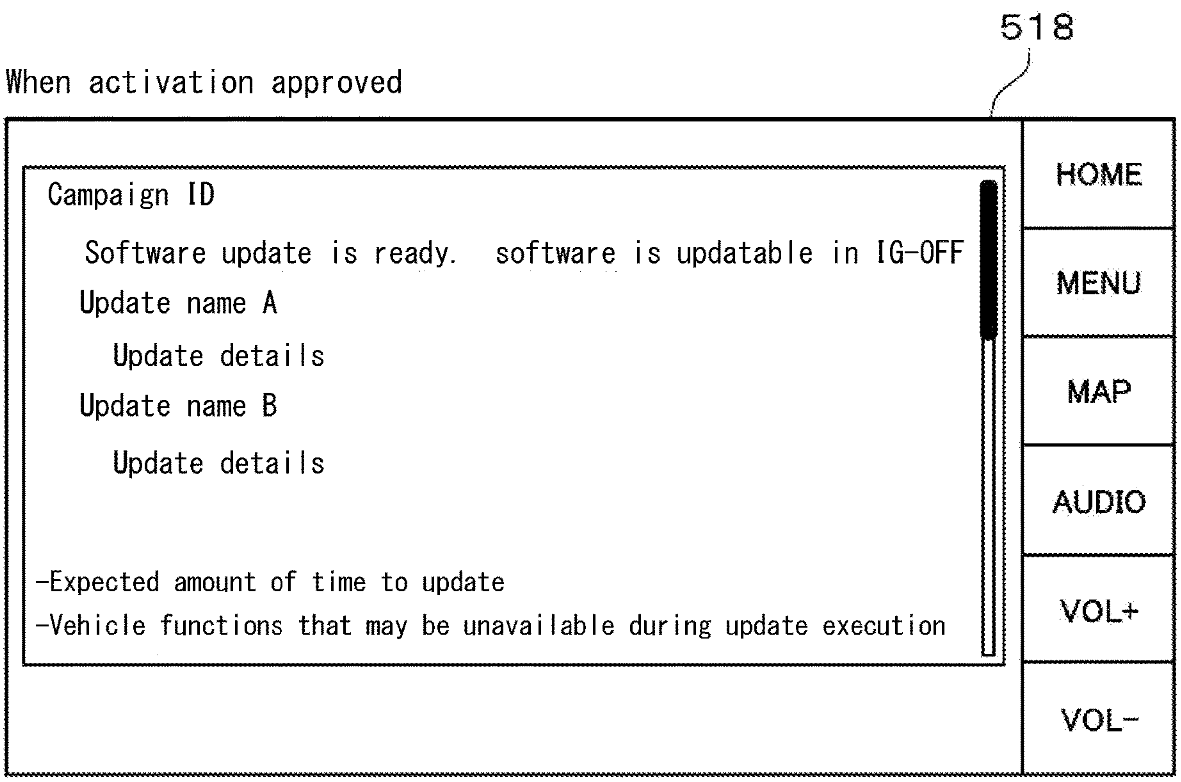
FIG. 210 is a diagram illustrating a screen when activation is approved.

In a case where the recall flag is set in the scene information of the rewrite specification data, the CGW 13 instructs the display terminal 5 to perform screen display corresponding to the rewriting of the application program according to a content of the recall mode (S2404). In this case, as illustrated in FIG. 204, the CGW 13 does not display the "later" button 502*a* on the campaign notification screen 502. As illustrated in FIGS. 205 and 206, the CGW 13 does not display the "back" button 503*c* on the download approval screen 503. As illustrated in FIG. 207, the CGW 13 does not display the "back" button 504*b* on the download-in-progress screen 504. As illustrated in FIGS. 208 and 209, the CGW 13 does not display the "back" button 505*b* on the installation approval screen 505. Also, as illustrated in FIG. 210, the CGW 13 does not display the "back" button on the activation approval screen 518.

That is, in a case where the recall flag is set in the scene information of the rewrite specification data, as described above, the "later" button or the "back" button may be set to non-display such that the "later" button or the "back" button is not displayed. Alternatively, after the campaign notification screen 502 may be displayed and the user's approval is obtained on the download approval screen 503, display of the installation approval screen 505 and the activation approval screen 518 may be omitted. Although a case where the recall flag is set in the scene information of the rewrite specification data has been described above, the same applies to a case where the dealer flag, the factory flag, the function update notification flag, and the forced execution flag are set in the scene information of the rewrite specification data, and an instruction may be given for availability of display of a screen corresponding to a phase, availability of display of an item of the screen, or changing of a display content of the item of the screen depending on a situation in which the application program is rewritten.

Specifically, in a case where the dealer flag is set in the scene information of the rewrite specification data, since it is necessary to display a dedicated screen in the repair process in the dealer environment, a dedicated screen for a dealer may be displayed instead of a screen for a user. That is, since a user does not perform an operation related to rewriting of an application program, but a dealer's operator performs the operation related to the rewriting of the application program, the "later" button or the "back" button may be set to be displayed for the dealer's work, so that the "later" button or the "back" button is displayed. For example, a guidance such as "please rewrite in dealer" may be displayed to prompt the user to take the vehicle to the dealer.

In a case where the factory flag is set in the scene information of the rewrite specification data, screen display is not required in the manufacturing process in the factory environment, and thus a screen may not be displayed.

In a case where the function update notification flag is set in the scene information of the rewrite specification data, even when the user has customized the display unnecessary setting, a screen display for reliably notifying the user of the change content is required, so a screen for the user may be displayed regardless of the customized setting. That is, even in a case where the user determines that the approval is unnecessary, since it is desirable that the approval is forced to be obtained and an approval screen is forced to be displayed, as described above, the "later" button or the "back" button is set to display such that the "later" button or the "back" button is displayed.

In a case where the forced execution flag is set in the scene information of the rewrite specification data, even when the user sets display to be required through customization, and thus the user does not give an approval, forced execution for reliably updating software of the vehicle is required. Therefore, a dedicated screen for the user may be displayed regardless of the customization setting. That is, since the user determines that the approval is necessary, but the application program is rewritten even when the approval is not given, the "later" button or the "back" button may be set to non-display as described above such that the "later" button or the "back" button is not displayed. Since the function is based on an approval being obtained, rewriting may be performed by obtaining the approval without displaying the screen itself.

As described above, the CGW 13 performs the progress display screen display control process, and thus instructs the display terminal 5 to perform screen display corresponding to a setting content of a customization mode in a case where the customization mode is set. The user can customize screen display corresponding to the progress of rewriting.

(25) Program Update Notification Control Process

The program update notification control process will be described with reference to FIGS. 211 to 217. The vehicle program rewriting system 1 performs the program update notification control process in the CGW 13.

Figure 211:
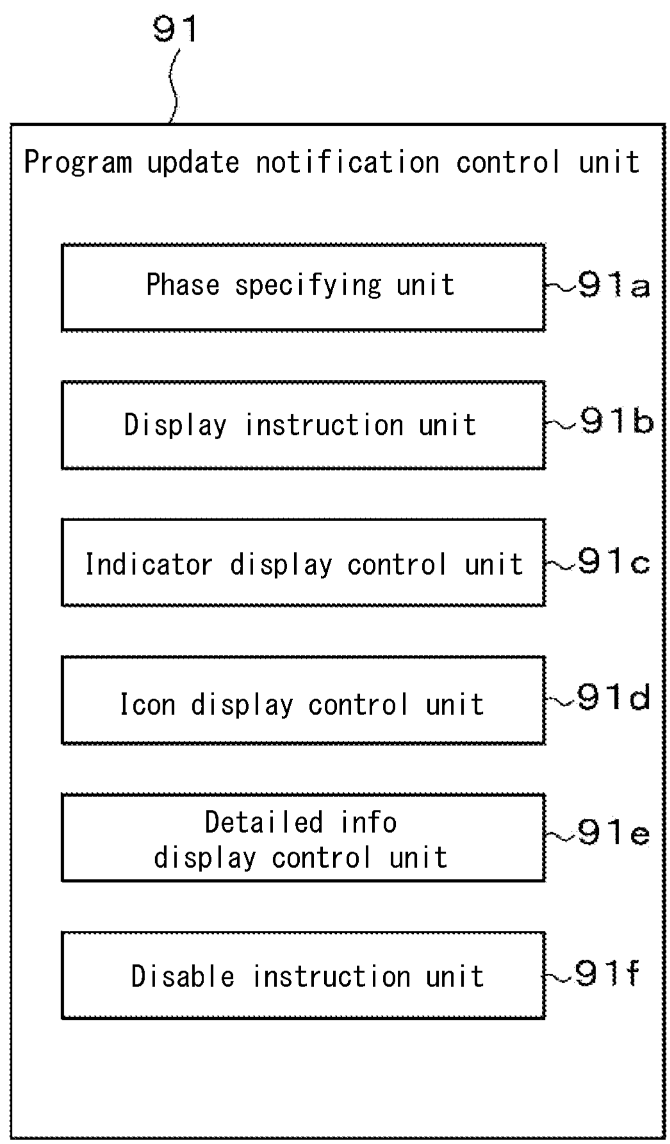
FIG. 211 is a functional block diagram of a program update notification control unit.
Figure 212:
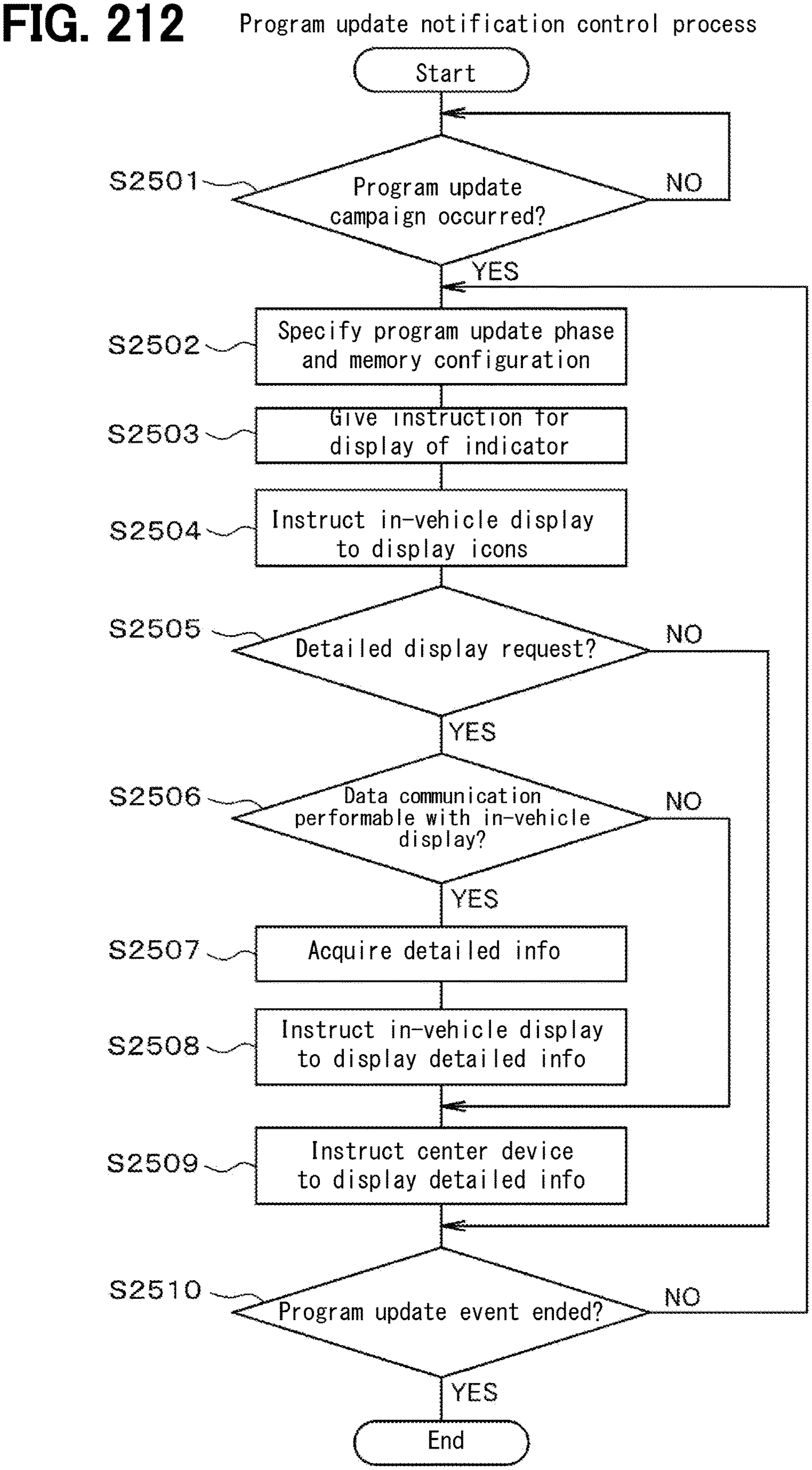
FIG. 212 is a flowchart illustrating a program update notification control process.

As illustrated in FIG. 211, the CGW 13 includes a phase specifying unit 91*a*, a display instruction unit 91*b*, an indicator display control unit 91*c*, an icon display control unit 91*d*, a detailed information display control unit 91*e*, and an cancellation instruction unit 91*f* in the program update notification control unit 91. The phase specifying unit 91*a* specifies a phase as a progress situation of program update. The phase specifying unit 91*a* specifies campaign notification, download approval, download in progress, installation approval, installation in progress, activation approval, activation in progress, and update completion as phases of program update.

When the phase of the program update is specified by the phase specifying unit 91*a*, the display instruction unit 91*b* gives an instruction for displaying an indicator in an aspect corresponding to the phase of the specified program update. When the instruction for displaying the indicator is given from the display instruction unit 91, the indicator display control unit 91*c* controls display of the indicator in response to the instruction. Specifically, the indicator display control unit 91*c* controls lighting of an indicator 46 in the meter device 45.

The icon display control unit 91*d* controls display of an icon on the in-vehicle display 7 following the indicator display control unit 91*c* controlling display of the indicator. The detailed information display control unit 91*e* controls display of an icon and detailed information related to the program update on the in-vehicle display 7 or the mobile terminal 6 following the indicator display control unit 91*c* controlling display of the indicator. The icon is the campaign notification icon 501*a* illustrated in FIG. 32, and the detailed information is, for example, the campaign notification screen 502 displayed in a pop-up form illustrated in FIG. 33, or the download approval screen illustrated in FIGS. 34 and 35. The detailed information display control unit 91*e* gives an instruction for displaying the icon in the aspect corresponding to the phase of the program update specified by the phase specifying unit 91*a*, or gives an instruction for displaying the detailed information screen corresponding to the phase and the user operation.

The cancellation instruction unit 91*f* instructs the power supply management ECU 20 and the respective ECUs 19 related to the user operation to cancel reception of the user operation even in a case where the power supply management ECU 20 performs the power supply control by updating the programs during parking. For example, by instructing the engine ECU 47 (refer to FIG. 217) to cancel reception of the user operation, in a case where a memory configuration of the rewrite target ECU 19 is a single-bank memory and the installation is performed during parking, the reception is cancelled and the engine is suppressed not to be started even when the user performs an operation of starting the engine. By instructing the power supply management ECU 20 to cancel the user operation, in a case where a memory configuration of the rewrite target ECU 19 is a single-bank memory, the IG power is turned on, installation is performed during parking, the reception is canceled and the IG power is suppressed not to be turned off even when the user performs an operation of turning off the IG power. In this case, the cancellation instruction unit 91*f* may instruct the in-vehicle display 7 to perform a notification that the reception of the user operation is invalidated.

Next, an operation of the above-described configuration will be described with reference to FIGS. 212 to 217. The CGW 13 executes a program update notification control program and thus performs the program update notification control process.

When the program update notification control process is initiated, the CGW 13 determines whether or not a campaign of program update has occurred (S2501). When it is determined that the campaign of the program update has occurred (S2501: YES), the CGW 13 specifies a phase of the program update and a memory configuration (S2502; corresponding to a phase specifying procedure). The CGW 13 instructs the meter device 45 to display the indicator 46 in an aspect corresponding to the specified phase of the program update (S2503; corresponding to a display instruction procedure). The in-vehicle display 7 is instructed to display an icon corresponding to the specified phase of the program update (S2504).

It is determined whether or not a detailed display request is available (S2505), and, when it is determined that the detailed display request is available (S2505: YES), the CGW 13 determines whether or not data communication with the in-vehicle display 7 is possible (S2506). For example, when the user presses the campaign notification icon 501*a* illustrated in FIG. 32, the "check" button 502*a* illustrated in FIG. 33, or the "details check" button 503*b* illustrated in FIG. 34, the CGW 13 determines that the detailed display request is available. When it is determined that data communication with the in-vehicle display 7 is possible (S2506: YES), the CGW 13 acquires detailed information (S2507), instructs the in-vehicle display 7 to display the detailed information (S2508), and instructs the center device 3 to display the detailed information (S2509).

The CGW 13 acquires a notification content received along with the campaign notification and a notification content of the distribution specification data, and notifies the in-vehicle display 7 of the notification contents to be instructed to display the detailed information. The CGW 13 notifies the center device 3 of the phase and a content of the user operation as an instruction for displaying the detailed information such that the same content as that in the in-vehicle display 7 is also displayed on the mobile terminal 6.

The CGW 13 determines whether or not an event of the program updating event is finished (S2510).

For example, when the user confirms that the activation has been completed and the program has been updated, the CGW 13 determines that the event is finished. When it is determined that the event of the program update is not finished (S2510: NO), the CGW 13 returns to step S2502 and repeatedly performs step S2502 and the subsequent steps. The CGW 13 repeatedly performs S2502 and the subsequent steps in each phase of the campaign notification, the download approval, the download in progress, the installation approval, the installation in progress, the activation approval, the activation in progress, and the update completion.

When it is determined that the event of the program update is finished (S2510: YES), the CGW 13 finishes the program update notification control process.

In the meter device 45, the indicator 46 is disposed at a predetermined position which can be recognized by the user, and, when a notification request notification is received from the CGW 13, the indicator 46 is lighted or flashed as a notification during rewriting of the application program. Here, instead of the flashing, there may be the use of lighting display which is emphasized more than normal lighting display such as changing a color or increasing luminance of the indicator 46. That is, any display may be used as long as the display is emphasized more than normal display. The indicator 46 related to program update is a single indicator and is formed of a single design.

As illustrated in FIG. 213, the meter device 45 changes notification aspects of the indicator in each phase in a case where an application program rewrite target is a double-bank memory, in a case where the application program rewrite target is a single-bank suspend memory, and in a case where the application program rewrite target is a single-bank memory. Specifically, the meter device 45 specifies a notification aspect of the indicator 46 according to a phase and a memory configuration designated from the CGW 13, and performs a notification according to the specified notification aspect. Instead of the meter device 45, the indicator display control unit 91*c* may control a notification aspect of the indicator 46. The indicator display control unit 91*c* may specify a notification aspect of the indicator 46, and instruct the meter device 45 to control lighting of the indicator 46 in the notification aspect.

As illustrated in FIG. 213, the indicator display control unit 91*c* flashes indicator 46 green, for example, in a phase where a restriction may occur in traveling of the vehicle, such as the installation or the activation. In a case where the rewrite target ECU 19 is a double-bank memory, the indicator display control unit 91*c* performs display in a flashing manner only in a phase in which activation is in progress. In a case where the rewrite target ECU 19 has a single-bank suspend memory, the indicator display control unit 91*c* displays the indicator in a flashing manner in the installation-in-progress phase during IG-off, the activation approval phase, and the activation-in-progress phase. In a case where the rewrite target ECU 19 has a single-bank memory, the indicator display control unit 91*c* displays the indicator in a flashing manner in the installation-in-progress phase, the activation approval phase, and the activation-in-progress phase. That is, the display of the indicator 46 in the campaign notification phase, the download phase, and the phase after the completion of activation (at IG-off, IG-on, and a check operation) is common regardless of memory configuration, but the display of the indicator 46 in the installation phase and the activation phase is performed in different aspects depending on a memory configuration. Here, the IG-off time illustrated in FIG. 213 is a display aspect when the activation is executed during parking and the IG power is turned off due to completion of the activation, and the indicator 46 is lighted off when the IG power is turned off. Thereafter, when the IG power is turned on through the user operation, the indicator 46 is lighted. This is so that the user is notified of that the overall program update has been completed. When the user presses the "OK" button 510*b* on the check operation screen 510 illustrated in FIG. 45, it is determined that a check operation has been performed, and the indicator 46 is lighted off.

Figure 214:
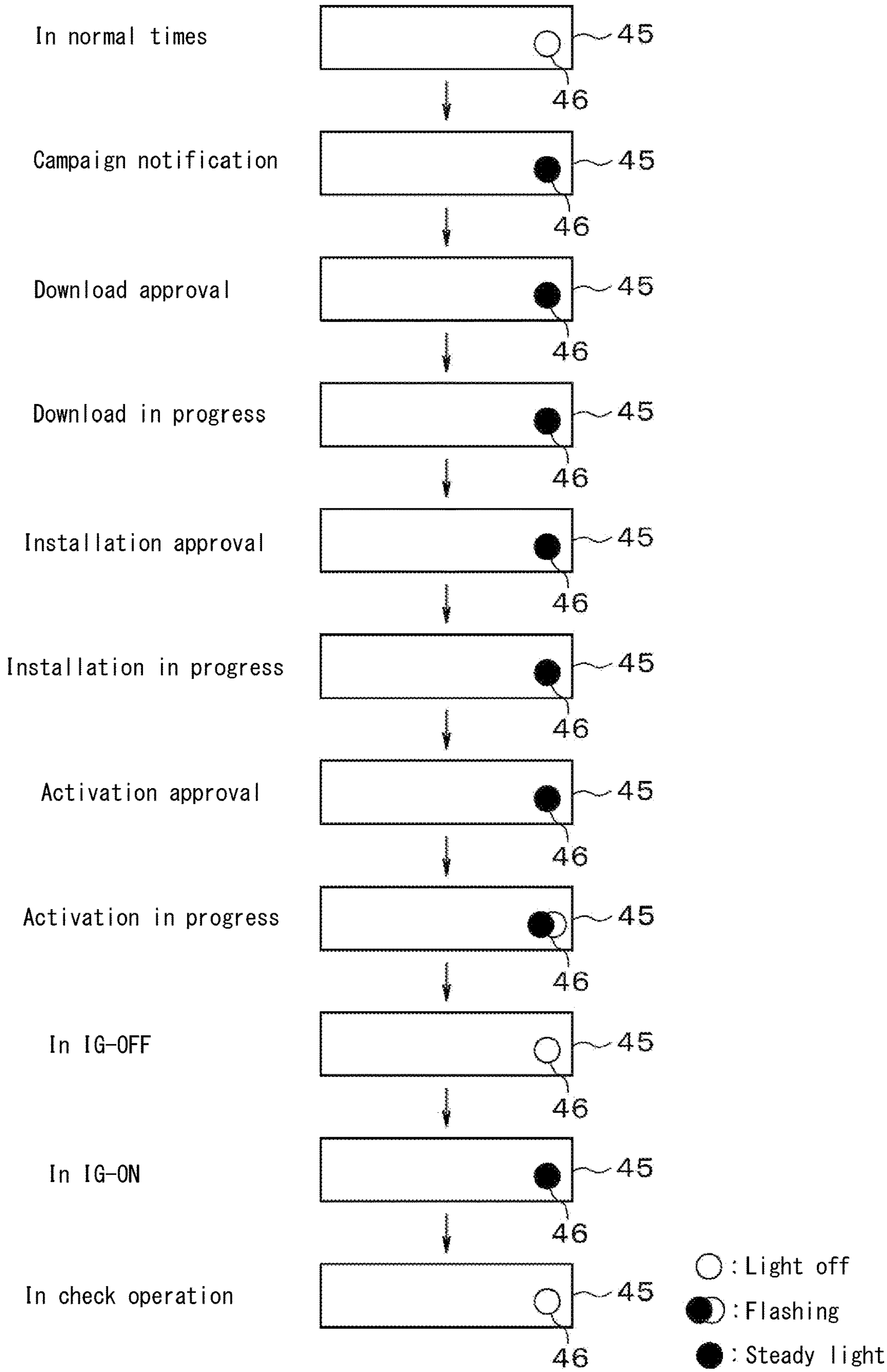
FIG. 214 is a diagram illustrating transition of a notification aspect in a case where a rewrite target is a double-bank memory.

Hereinafter, a case where the meter device 45 controls a notification aspect of the indicator 46 will be described below, but the indicator display control unit 91*c* may control a notification aspect of the indicator 46 as described above. FIG. 214 illustrates a notification aspect of the indicator in a case where the memory type of the rewrite target ECU 19 is a double-bank memory. The meter device 45 lights the indicator 46 in the phases from the campaign notification to the activation approval, and flashes the indicator 46 in the activation-in-progress phase, on the basis of instructions from the CGW 13. Thereafter, the meter device 45 lights off the indicator 46 at IG-off, lights the indicator 46 at IG-on, and lights off the indicator 46 when the user performs a check operation for completion of the update. That is, in a case of the double-bank memory, there is a probability that the traveling of the vehicle may be restricted only during execution of activation. Only the execution of the activation is performed during a period in which the vehicle cannot travel because the vehicle is in a parking state. Thus, the meter device 45 flashes the indicator 46 in the activation-in-progress phase. Here, the indicator is a predetermined design, and is displayed green in a case of normal progress.

Figure 215:
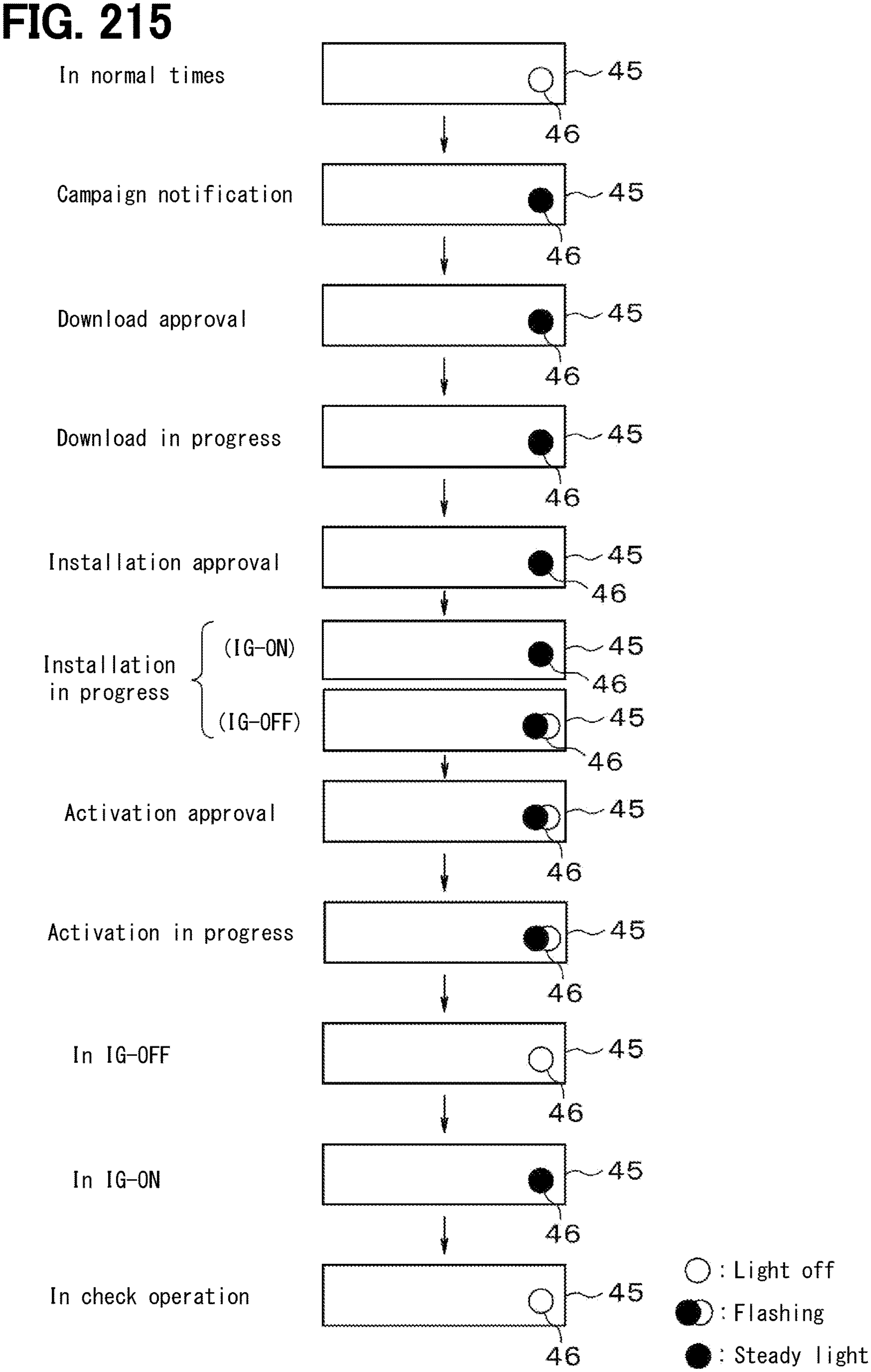
FIG. 215 is a diagram illustrating transition of a notification aspect in a case where a rewrite target is a single-bank suspend memory.

FIG. 215 illustrates a notification aspect of the indicator in a case where the memory type of the rewrite target ECU 19 is a single-bank suspend memory. In a case where an application program rewrite target is a single-bank suspend memory, the meter device 45 lights the indicator 46 in the phases from the campaign notification to the installation approval, lights the indicator 46 at IG-on during execution of the installation, and flashes the indicator 46 at IG-off, on the basis of instructions from the CGW 13. That is, the meter device 45 lights the indicator 46 because writing into the flash memory of the single-bank suspend memory ECU is not executed in an IG ON state, but flashes the indicator 46 because writing into the flash memory is executed in an IG OFF state. The meter device 45 flashes the indicator 46 in the phases from the activation approval to the activation in progress. Thereafter, the indicator 46 is lighted off at IG-off, the indicator 46 is lighted in IG-on, and the indicator 46 is lighted off when the user performs a check operation for completion of the update. That is, in a case of the single-bank suspend memory, there is a probability that the traveling of the vehicle may be restricted from the installation in progress in an IG ON state to the activation in progress. Thus, the meter device 45 flashes the indicator 46 in these phases. Here, in a case of the single-bank suspend memory, even during the execution of the installation in an inactive bank, it is possible to start an active bank and control traveling of the vehicle by stopping the installation. Thus, as in a case of the double-bank memory, flashing display may be performed only during execution of the activation in which the vehicle cannot travel.

Figure 216:
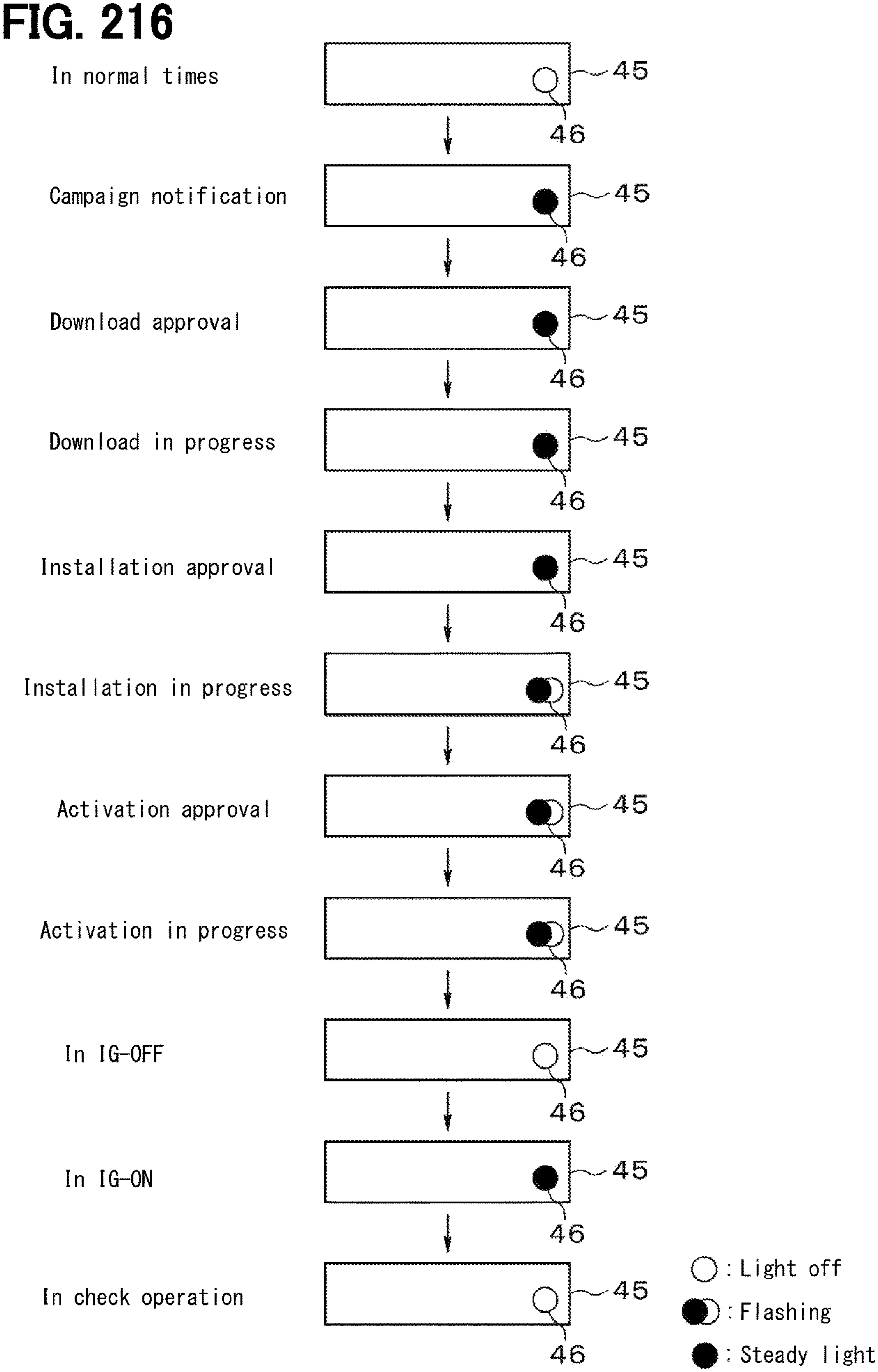
FIG. 216 is a diagram illustrating transition of a notification aspect in a case where a rewrite target is a single-bank memory.

FIG. 216 illustrates a notification aspect of the indicator when the memory type of the rewrite target ECU 19 is a single-bank memory. In a case where an application program rewrite target is a single-bank memory, the meter device 45 lights the indicator 46 in the phases from the campaign notification to the installation approval, and flashes the indicator 46 in the phases from the installation in progress to the activation in progress, on the basis of instructions from the CGW 13. Thereafter, the indicator 46 is lighted off at IG-off, the indicator 46 is lighted in IG-on, and the indicator 46 is lighted off when the user performs a check operation for completion of the update. That is, in a case of the single-bank memory, there is a probability that the traveling of the vehicle may be restricted from the installation in progress to the activation in progress. Thus, the meter device 45 flashes the indicator 46 in these phases.

In a case where the ECUs 19 having a double-bank memory, a single-bank suspend memory, and a single-bank memory are included as the program rewrite target ECUs 19 in one campaign notification, the meter device 45 performs rewriting of application programs on the ECUs 19 in an order of the double-bank memory, the single-bank suspend memory, and the single-bank memory. After the campaign notification, the CGW 13 performs the download approval to the installation in progress on the double-bank memory ECU 19, and the meter device 45 lights the indicator 46 during this period. When the installation-in-progress phase on the double-bank memory ECU 19 is completed, the CGW 13 performs the download approval to the installation in progress on the single-bank suspend memory ECU 19, and the meter device 45 lights the indicator 46 during this period. When the installation-in-progress phase on the single-bank suspend memory ECU 19 is completed, the CGW 13 performs the download approval to the installation approval on the single-bank memory ECU 19, and the meter device 45 lights the indicator 46 during this period.

The meter device 45 flashes the indicators 46 from the installation in progress in the single-bank memory to the activation in progress in three types of the ECUs 19 of which the memory types are different from each other. The meter device 45 lights off the indicator 46 at subsequent IG-off, lights the indicator 46 at IG-on, and lights off the indicator 46 when the user performs a check operation for completion of the update.

The meter device 45 may perform the following control in a case where the ECUs 19 having a double-bank memory, a single-bank suspend memory, and a single-bank memory are included as the program rewrite target ECUs 19 in one campaign notification. The meter device 45 performs rewriting of application programs on the ECUs 19 in an order of the double-bank memory, the single-bank suspend memory, and the single-bank memory. After the campaign notification, the CGW 13 gives an instruction for lighting a predetermined green design as the indicator 46 in the download approval for download of a distribution package including update data of rewrite target ECUs 19 and the download in progress. Thereafter, the CGW 13 gives an instruction for lighting a predetermined green design as the installation approval indicator 46. The installation approval here also serves as the activation approval for the convenience of including the single-bank memory ECU 19. When the user's approval for the installation is obtained, the CGW 13 first performs installation on the double-bank memory ECU 19. While the installation is performed in the double-bank memory ECU 19, the meter device 45 lights the indicators 46. When the CGW 13 completes the installation-in-progress phase for the double-bank memory ECU 19, the CGW 13 performs installation on the single-bank suspend memory ECU 19. While the installation is performed in the single-bank suspend memory ECU 19, the meter device 45 lights the indicator 46. When the CGW 13 completes the installation-in-progress phase for the single-bank suspend memory ECU 19, the CGW 13 performs installation on the single-bank memory ECU 19. While the installation is performed in the single-bank suspend memory ECU 19, the meter device 45 flashes the indicator 46. When the installation is completed in all of the rewrite target ECUs 19, the CGW 13 performs activation in a state in which the indicator 46 is flashed. The CGW 13 instructs the meter device 45 to light off the indicator 46 at subsequent IG-off, instructs the meter device 45 to light the indicator 46 at IG-on, and instructs the meter device 46 to light off the indicator 46 when the user performs a check operation for completion of the update.

In the respective phases illustrated in FIGS. 214 to 216, the CGW 13 also instructs the in-vehicle display 7 to display icons. The CGW 13 gives an instruction for displaying the campaign notification icon 501*a* illustrated in FIG. 32 in the campaign notification phase. The CGW 13 continues to display the campaign notification icons 501*a* even in the download approval phase. The CGW 13 gives an instruction for displaying the download-in-progress icon 501*b* illustrated in FIG. 36 in the download-in-progress phase. In the installation approval phase, the CGW 13 may continue to display the download-in-progress icon 501*b* or may give an instruction for displaying the campaign notification icon 501*a* again. The CGW 13 gives an instruction for displaying the installation-in-progress icon 501*c* illustrated in FIG. 41 in the installation-in-progress phase. In the activation approval phase, the CGW 13 may continue to display the installation-in-progress icon 501*c* or may give an instruction for displaying the campaign notification icon 501*a* again. The CGW 13 does not display the icons in the activation-in-progress phase and at subsequent IG-off. At IG-on, the CGW 13 may give an instruction for displaying the campaign notification icon 501*a* again, or may display the activation completion notification screen 509 in a pop-up form as illustrated in FIG. 44. The CGW 13 does not display the icons when the user performs a check operation for completion of the update. There is only one icon display related to the program update, and the icon display is formed of a design corresponding to each phase.

As described above, in a case where the CGW 13 gives an instruction for a notification that the application program is being rewritten by using the indicator 46, when an abnormality occurs during rewriting of the application program, a notification aspect differs from that during the normal time. The CGW 13 gives an instruction for green lighting display or green flashing display, for example, when the rewriting of the application program is being performed normally, and gives an instruction for yellow or red lighting display or yellow or red flashing display, for example, when an abnormality occurs. The CGW 13 may change colors according to the degree of abnormality, give an instruction for red lighting display or red flashing display, for example, when the degree of abnormality is relatively high, and give an instruction for yellow lighting display or yellow flashing display when the degree of abnormality is relatively low. Here, the abnormality mentioned here includes a state in which a distribution package cannot be downloaded, a state in which write data cannot be installed, a state in which write data cannot be written in the rewrite target ECU 19, a state in which write data is incorrect, and the like.

The in-vehicle display 7 sequentially displays the campaign notification screen 502, the download approval screen 503, the download-in-progress screen 504, the download completion notification screen 505, the installation approval 506, the installation-in-progress screen 507, the activation approval screen 508, the IG-on screen 509, and the update completion check operation screen 510 as detailed display on the basis of the user operation. The same detailed display as in the in-vehicle display 7 may be performed in the mobile terminal 6 that is communicatively connected to the center device 3. For example, in a vehicle in which the in-vehicle display 7 is not mounted, in a case where the user requests the detailed display by operating a steering wheel switch or the like, the CGW 13 requests the detailed display to the center device 3 via the DCM 12. The center device 3 creates content of the detailed display, and the mobile terminal 6 displays the content such that the user can check the detailed information on the mobile terminal 6.

Figure 217:
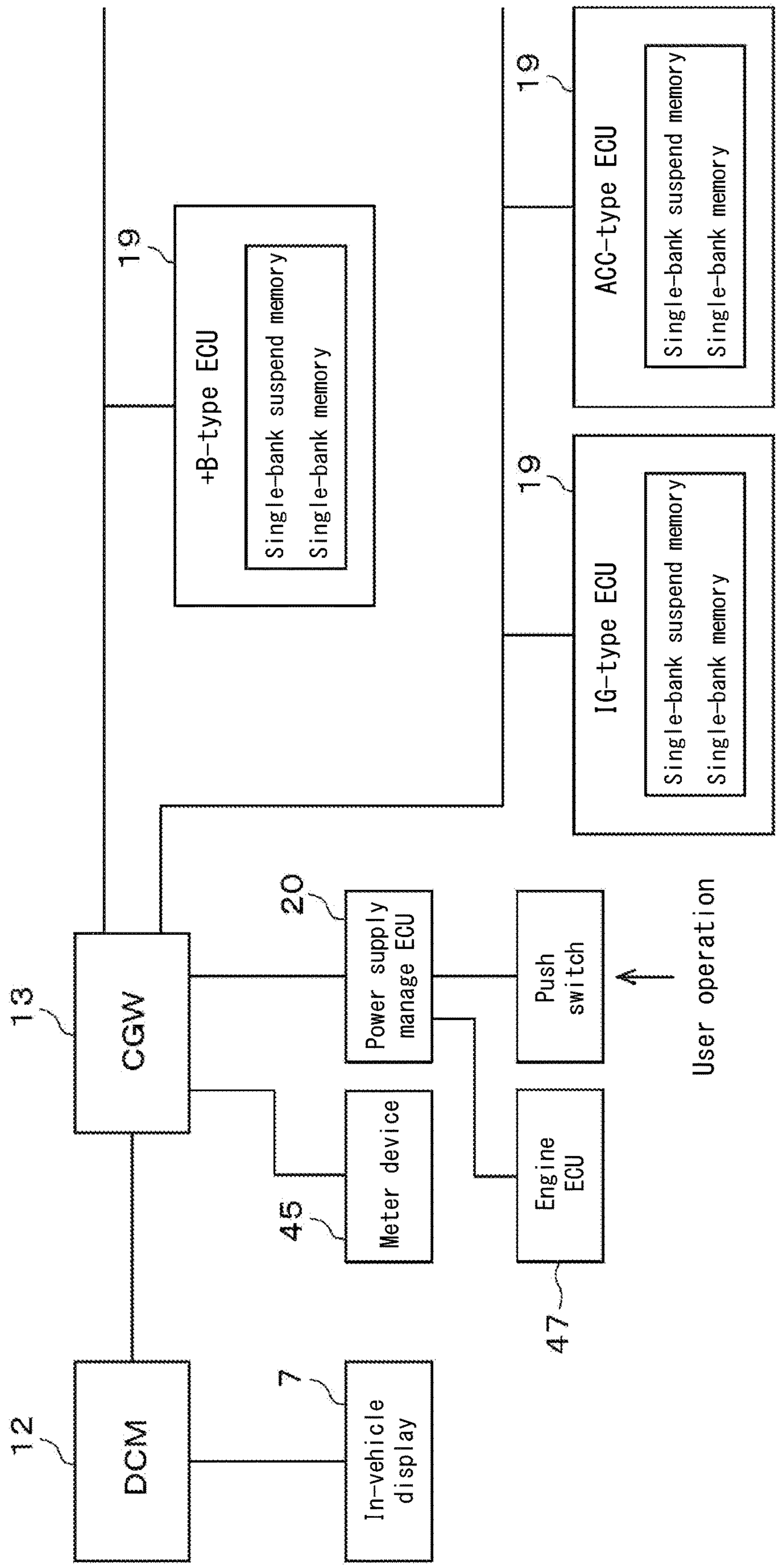
FIG. 217 is a diagram illustrating a connection aspect.

As illustrated in FIG. 217, in a case where an application program of a single-bank suspend memory or a single-bank memory of an IG ECU or an ACC ECU is rewritten during parking, the CGW 13 forcibly starts the power supply management ECU 20 to turn on the power of the vehicle. In this case, when the power supply management ECU 20 is forced to be started, the meter device 45 or the in-vehicle display 7 is started due to an operation of the power supply management ECU 20. Thus, the CGW 13 instructs the meter device 45 or the in-vehicle display 7 to suppress a notification related to the program update. When the meter device 45 is instructed to suppress the notification of the update of the program from the CGW 13, the meter device 45 does not light or flash the indicator 46. When the in-vehicle display 7 is instructed to suppress the notification of the program update from the CGW 13, the in-vehicle display 7 does not perform the above-described detailed display. That is, in a case of a situation in which the user is not riding in the installation or the activation performed during parking, since the notification related to the program update is unnecessary, the control is performed such that the notification is not performed.

When the power supply management ECU 20 is forced to be started to turn on the vehicle power, engine control is possible by receiving an operation on a push switch from the user, but the CGW 13 instructs the power supply management ECU 20 to invalidate reception of the user operation, and instructs the meter device 45, the in-vehicle display 7, and the ECU 19 related to the user operation to perform a notification of the cancellation of the reception of the user operation. In a case where the meter device 45 is instructed to invalidate the reception of the user operation from the CGW 13, the meter device 45 invalidates the reception of the operation even when the user performs the operation on the meter device 45. Similarly, in a case where the in-vehicle display 7 is instructed to invalidate the reception of the user operation from the CGW 13, the in-vehicle display 7 invalidates the reception of the operation even when the user performs the operation on the in-vehicle display 7. In a case where the engine ECU 47 is instructed to invalidate the reception of the user operation from the CGW 13, the engine ECU 47 invalidates the reception of the operation to prevent the engine from being started even when the user performs the operation of starting the engine with the push switch.

As described above, the CGW 13 instructs the meter device 45 to perform a notification that an application program is being rewritten by performing the program update notification control process. Even in a situation where the user cannot be notified that an application program is being rewritten by using the mobile terminal 6 or the in-vehicle display 7, the user can be appropriately notified that an application program is being rewritten by notifying the user that an application program is being rewritten by using the meter device 45. The CGW 13 may change a notification aspect in accordance with a progress situation of rewriting of an application program.

(26) Self-Retention Power Execution Control Process

The self-retention power execution control process will be described with reference to FIGS. 218 to 222. The vehicle program rewriting system 1 performs self-retention power execution control process in the CGW 13, the ECU 19, the in-vehicle display 7, and the power supply management ECU 20. In this case, the CGW 13 gives an instruction for self-retention power to the ECU 19, the in-vehicle display 7, and the power supply management ECU 20. That is, the CGW 13 corresponds to a vehicle master device, and the ECU 19, the in-vehicle display 7, and the power supply management ECU 20 correspond to vehicle slave devices. The CGW 13 has a second self-retention power circuit, the vehicle slave device has a first self-retention power circuit.

Figure 218:
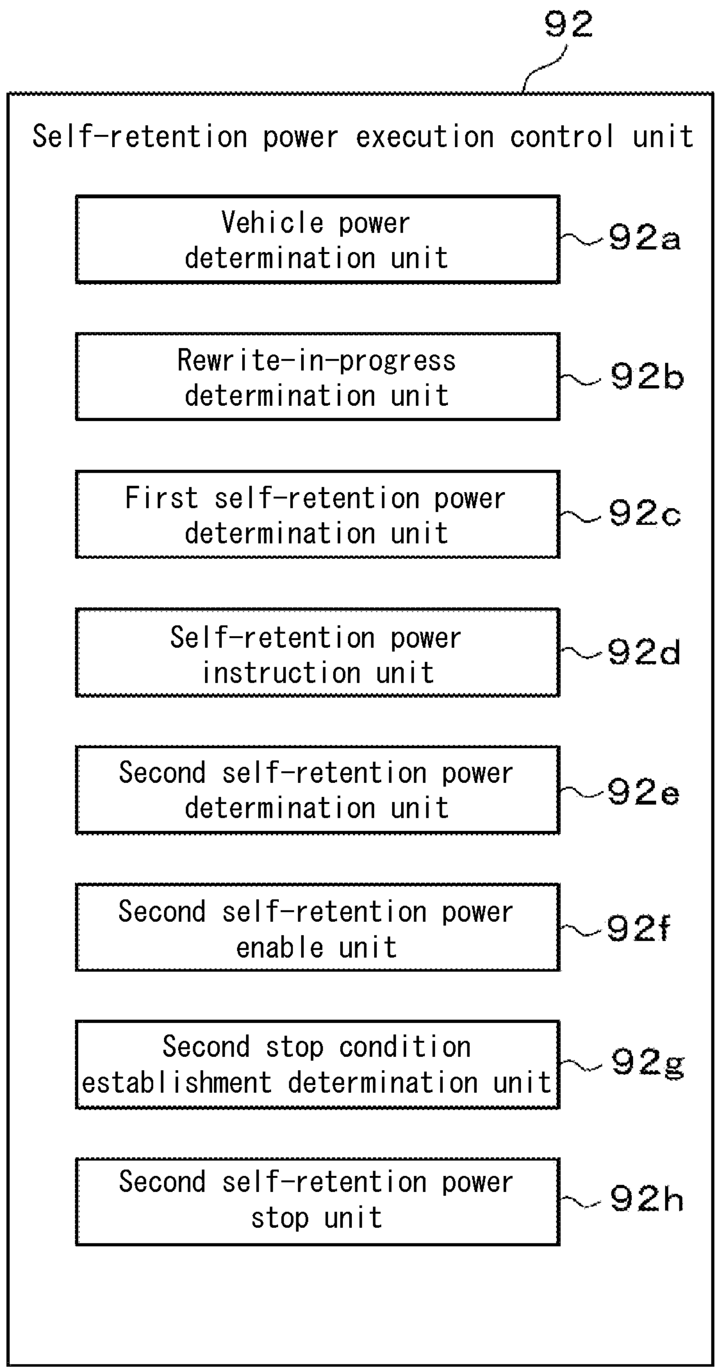
FIG. 218 is a functional block of a self-retention power execution control unit in the CGW.

As illustrated in FIG. 218, the CGW 13 includes, in the self-retention power execution control unit 92, a vehicle power determination unit 92*a*, a rewrite-in-progress determination unit 92*b*, a first self-retention power determination unit 92*c*, a self-retention power instruction unit 92*d*, a second self-retention power determination unit 92*e*, a second self-retention power enable unit 92*f*, a second stop condition establishment determination unit 92*g*, and a second self-retention power stop unit 92*h*.

The vehicle power determination unit 92*a* determines turning-on and turning-off of the vehicle power. The rewrite-in-progress determination unit 92*b* determines whether or not an application program is being rewritten. The rewrite-in-progress determination unit 95*b* also determines the rewrite target ECU 19 in which the application program is being rewritten. The first self-retention power enable unit 92*c* determines the necessity of self-retaining the power in the vehicle slave devices when it is determined by the vehicle power determination unit 92*a* that the vehicle power is turned off and it is determined by the rewrite-in-progress determination unit 92*b* that the program is being rewritten. That is, the first self-retention power enable unit 92*c* refers to the rewrite specification data illustrated in FIG. 8, and determines that the power needs to be self-retained when a rewrite method in the ECU information of the rewrite target ECU 19 is designated as the self-retention power method, and determines that the power does not need to be self-retained when the rewrite method is specified as the power supply control method.

When it is determined by the first self-retention power determination unit 92*c* that the power needs to be self-retained in the vehicle slave device, the self-retention power instruction unit 92*d* instructs the vehicle slave device to enable the first self-retention power circuit. As an aspect in which the self-retention power instruction unit 92*d* gives an instruction for enabling the first self-retention power circuit, there is an aspect of designating a completion time of the self-retention power, an aspect of giving an instruction for an extension time of the self-retention power, and an aspect of continuing to periodically output a self-retention request to the vehicle slave device. The self-retention power instruction unit 92*d* refers to the rewrite specification data illustrated in FIG. 8, and instructs the vehicle slave device to enable the first self-retention power circuit according to a time designated in the self-retention power time of the ECU information of the rewrite target ECU 19.

That is, in the aspect of designating the completion time of the self-retention power, the self-retention power instruction unit 92*d* designates, as the completion time, the time obtained by adding the time designated in the rewrite specification data from the current time. In the case of designating the extension time of the self-retention power, the self-retention power instruction unit 92*d* designates the time specified in the rewrite specification data as the extension time. In the aspect of continuing to periodically output the self-retention request to the vehicle slave device, the self-retention power instruction unit 92*d* continues to periodically output the self-retention request to the vehicle slave device until the time specified in the rewrite specification data elapses.

The second self-retention power determination unit 92*e* determines the necessity of self-retaining the power therein when it is determined by the vehicle power determination unit 92*a* that the vehicle power is turned off and it is determined by the rewrite-in-progress determination unit 92*b* that the program is being rewritten. That is, the necessity of self-retaining the power is determined in consideration of a configuration in which the CGW 13 is an IG power system or an ACC power system. When it is determined by the second self-retention power determination unit 92*e* that it is necessary to self-retain the power supply therein, the second self-retention power enable unit 92*f* enables the second self-retention power circuit.

In this case, when the second self-retention power circuit is currently off, the second self-retention power enable unit 92*f* turns on the second self-retention power circuit and thus enables the second self-retention power circuit. In a case where the second self-retention power circuit is currently on, the second self-retention power enable unit 92*f* extends an operation period of the second self-retention power circuit, and thus enables the self-retention power circuit.

The second stop condition establishment determination unit 92*g* determines whether or not a stop condition for the self-retention power of the second self-retention power circuit is established. Specifically, the second stop condition establishment determination unit 92*g* monitors a remaining battery charge of the vehicle battery 40, the occurrence of a timeout, and completion of rewriting in the rewrite target ECU 19, and determines that the stop condition for the self-retention power of the second self-retention power circuit is estimated when it is determined that the remaining battery charge of the vehicle battery 40 is less than a predetermined capacity, the timeout occurs, or the rewriting in the rewrite target ECU 19 is completed. When it is determined by the second stop condition establishment determination unit 92*g* that the stop condition for the self-retention power of the second self-retention power circuit is established, the second self-retention power stop unit 92*h* turns off the second self-retention power circuit.

Figure 219:
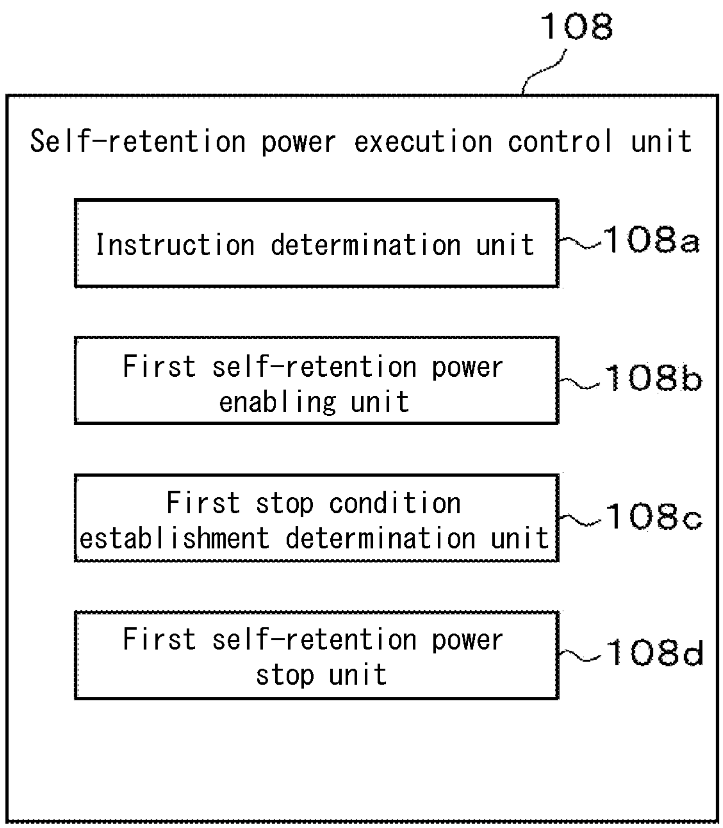
FIG. 219 is a functional block of a self-retention power execution control unit in the ECU.

As illustrated in FIG. 219, the ECU 19 includes an instruction determination unit 108*a*, a first self-retention power enable unit 108*b*, a first stop condition establishment determination unit 108*c*, and a first self-retention power stop unit 108*d* in the self-retention power execution control unit 108. The instruction determination unit 108*a* determines whether or not an instruction for enabling the first self-retention power circuit has been given from the CGW 13.

The first self-retention power enable unit 108*b* enables the first self-retention power circuit when it is determined by the instruction determination unit 108*a* that the instruction for enabling the first self-retention power circuit has been given. In a case where a completion time of the self-retention power is designated, the first self-retention power enable unit 108*b* enables the first self-retention power circuit until the designated completion time. In a case where an extension time of the self-retention power is designated, the first self-retention power enable unit 108*b* enables the first self-retention power circuit until the designated extension time elapses from the current time. In a case where a self-retention request is input from the CGW 13, the first self-retention power enable unit 108*b* enables the first self-retention power circuit as long as the self-retention request is continuously input.

In this case, when the first self-retention power circuit is currently off, the first self-retention power enable unit 108*b* turns on the first self-retention power circuit and thus enables the first self-retention power circuit. In a case where the first self-retention power circuit is currently on, the first self-retention power enable unit 108*b* extends an operation period of the first self-retention power circuit, and thus enables the first self-retention power circuit. The first self-retention power enable unit 108*b* stores a default self-retention power time, and enables the first self-retention power circuit for the default self-retention power time even when an instruction for enabling the first self-retention power circuit is not given. That is, when the instruction for enabling the first self-retention power circuit is given, the first self-retention power enable unit 108*b* enables the first self-retention power circuit with priority to the longer time of the default self-retention power time and the self-retention power time based on the instruction from the CGW 13.

The first stop condition establishment determination unit 108*c* determines whether or not a stop condition for the self-retention power of the first self-retention power circuit is established. Specifically, when a self-retention power target is the rewrite target ECU 19, the first stop condition establishment determination unit 108*c* monitors the occurrence of a timeout and a stop instruction from the CGW 13, and determines that the stop condition for the self-retention power of the first self-retention power circuit is established when it is determined that the timeout has occurred or the stop instruction from the CGW 13 has been received. When a self-retention power target is the in-vehicle display 7, the first stop condition establishment determination unit 108*c* monitors the occurrence of a timeout, the user's getting-off, and a stop instruction from the CGW 13, and determines that the stop condition for the self-retention power of the first self-retention power circuit is established when it is determined that the timeout has occurred, the user has gotten off, or the stop instruction has been received from the CGW 13. When a self-retention power target is the power supply management ECU 20, the first stop condition establishment determination unit 108*c* monitors a stop instruction from the CGW 13, and determines that the stop condition for the self-retention power of the first self-retention power circuit is established when it is determined that the stop instruction from the CGW 13 has been received. The first self-retention power stop unit 108*d* turns off the first self-retention power circuit when it is determined by the second stop condition establishment determination unit 108*c* that the stop condition for the self-retention power of the first self-retention power circuit is established.

Figure 220:
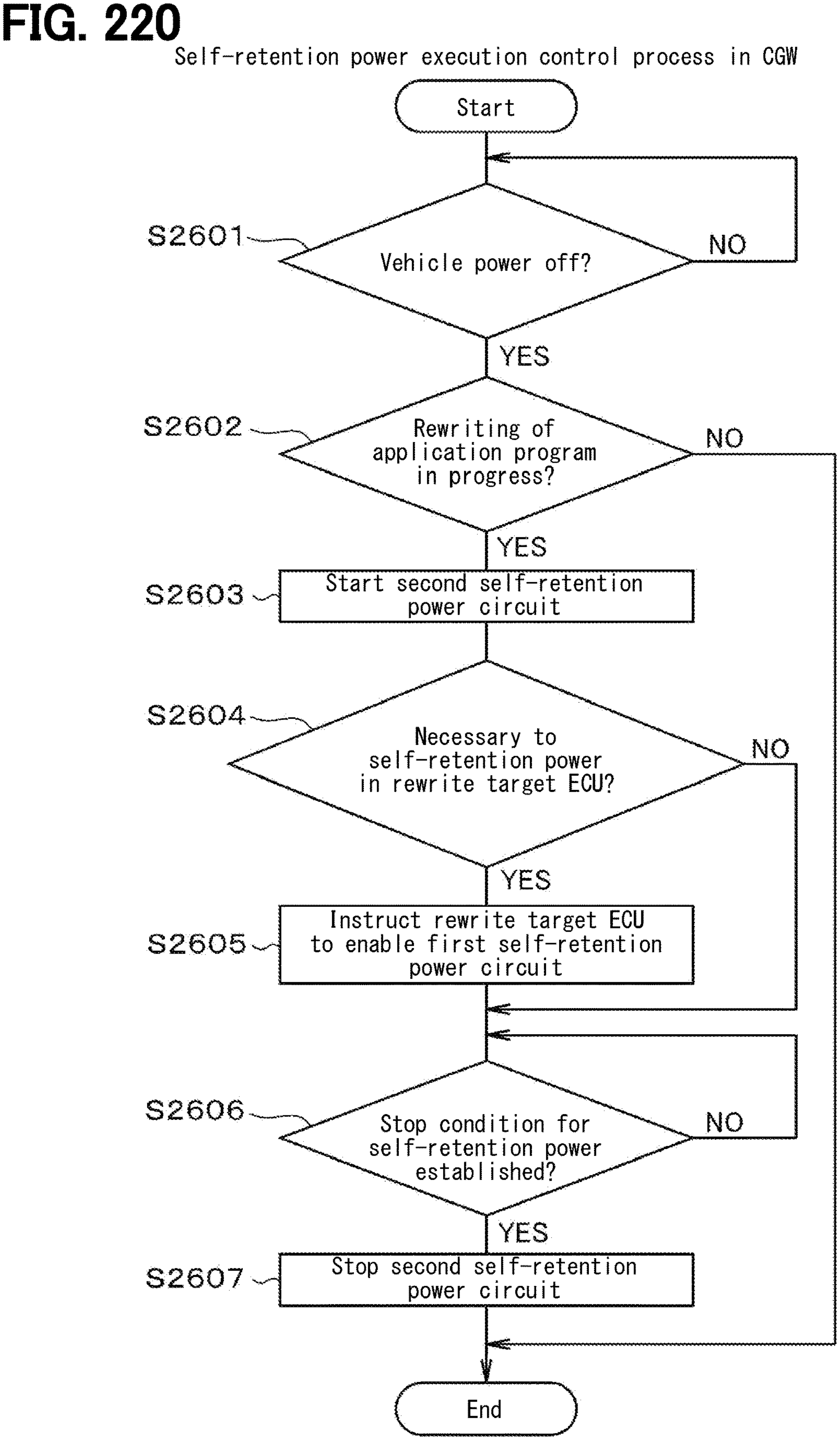
FIG. 220 is a flowchart illustrating an execution control process for self-retention power in the CGW.
Figure 221:
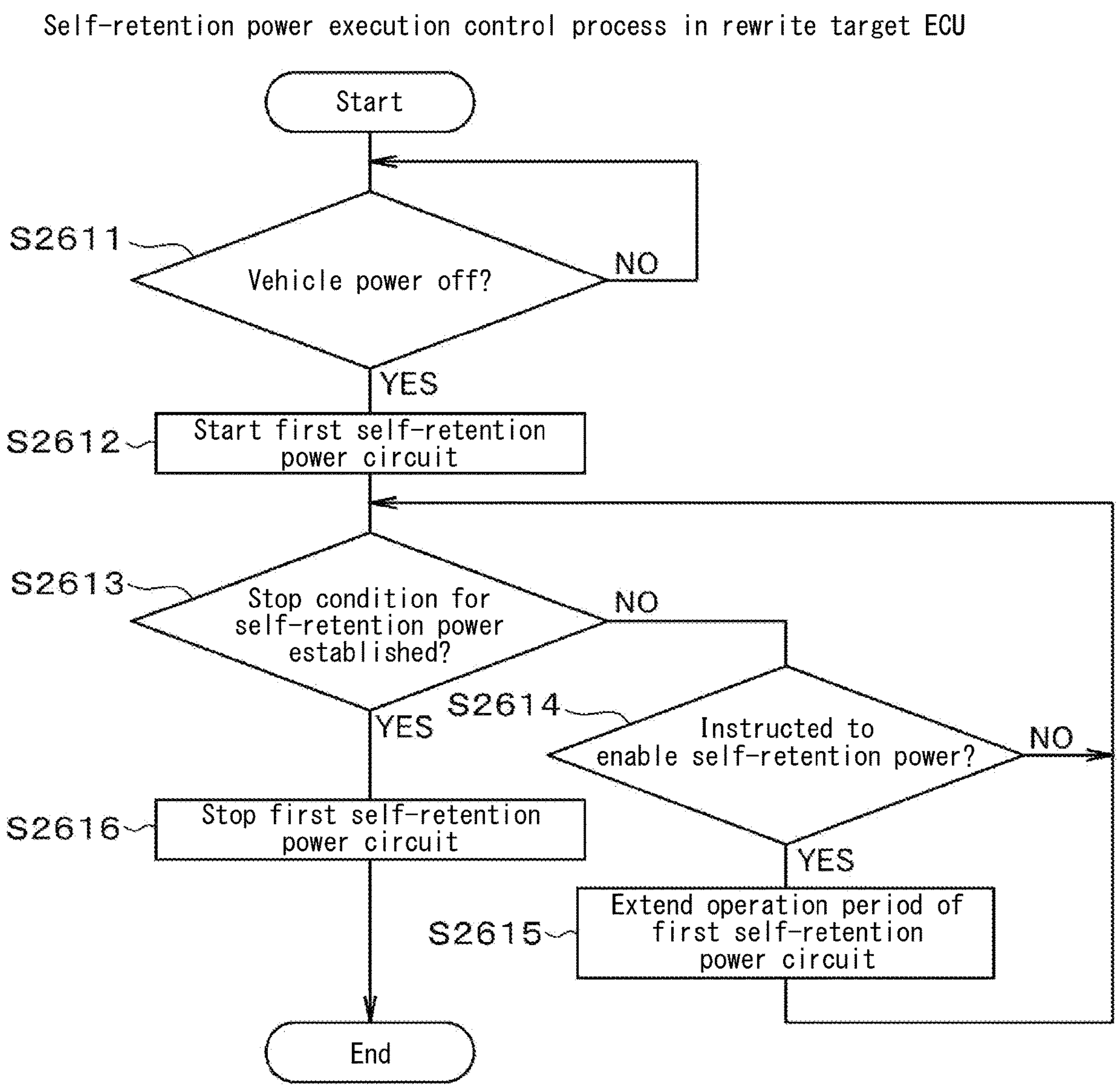
FIG. 221 is a flowchart illustrating an execution control process for self-retention power in the ECU.
Figure 222:
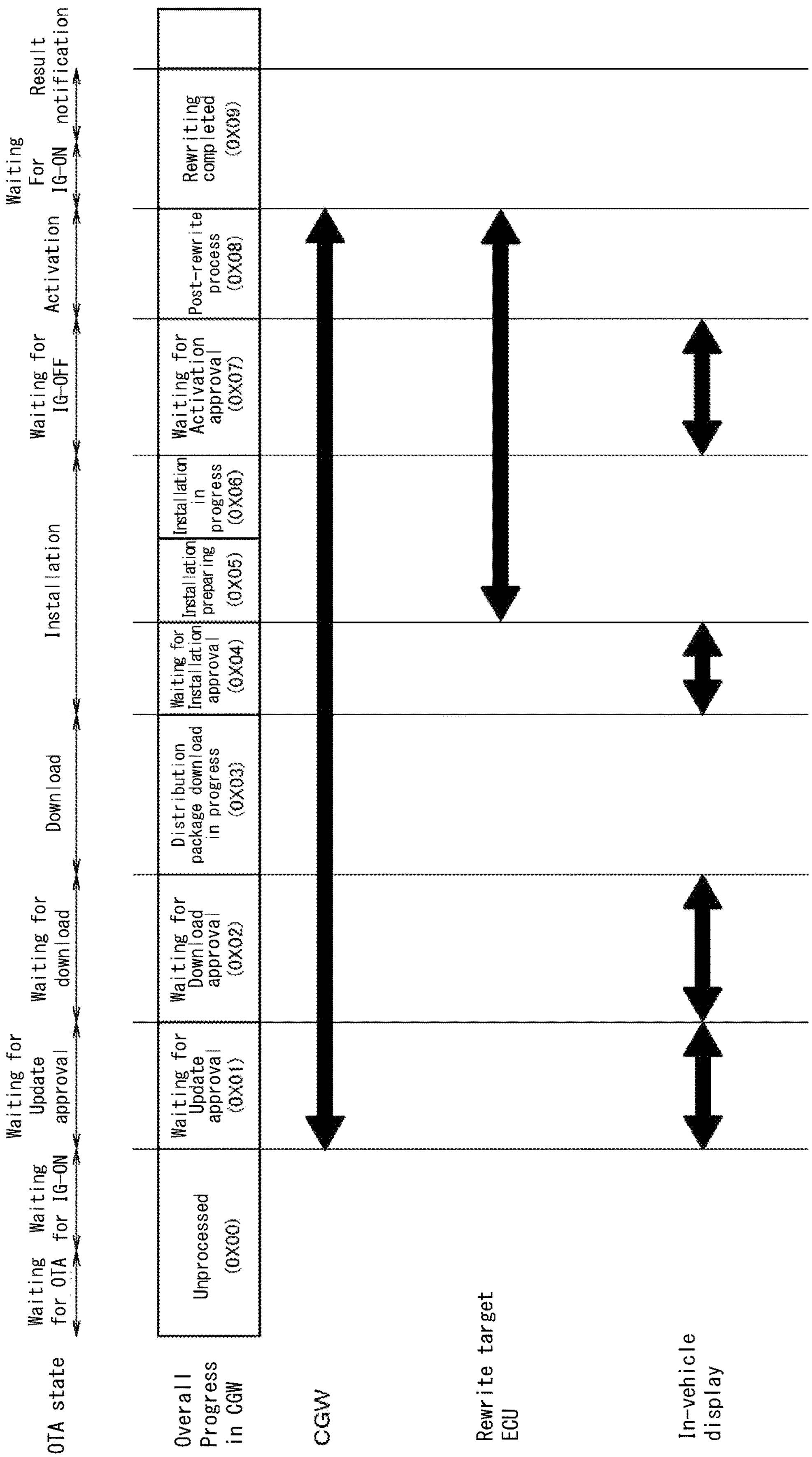
FIG. 222 is a diagram illustrating a period in which self-retention power is required.
Figure 223:
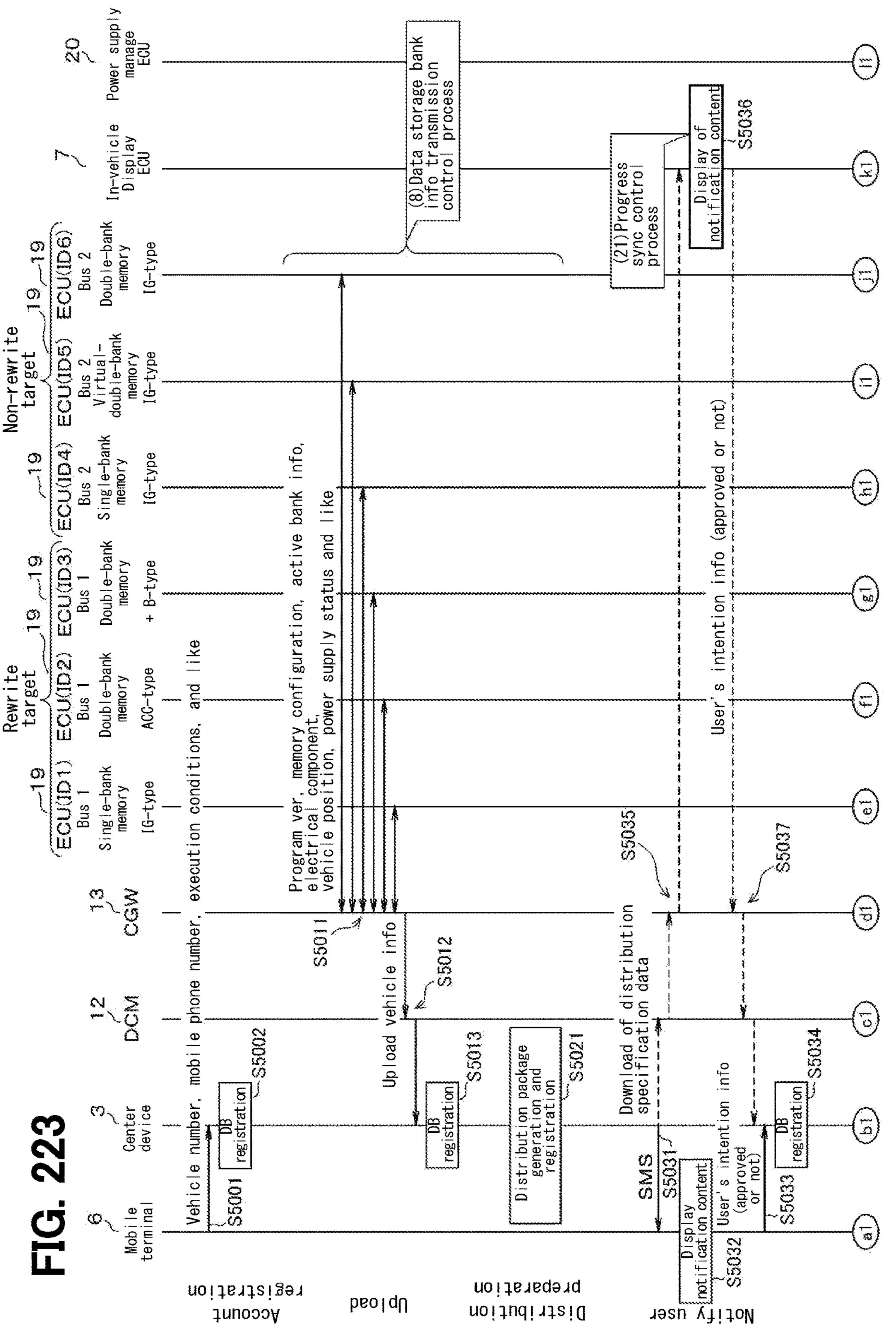
FIG. 223 is an overall sequence diagram illustrating an aspect of rewriting the application program.
Figure 224:
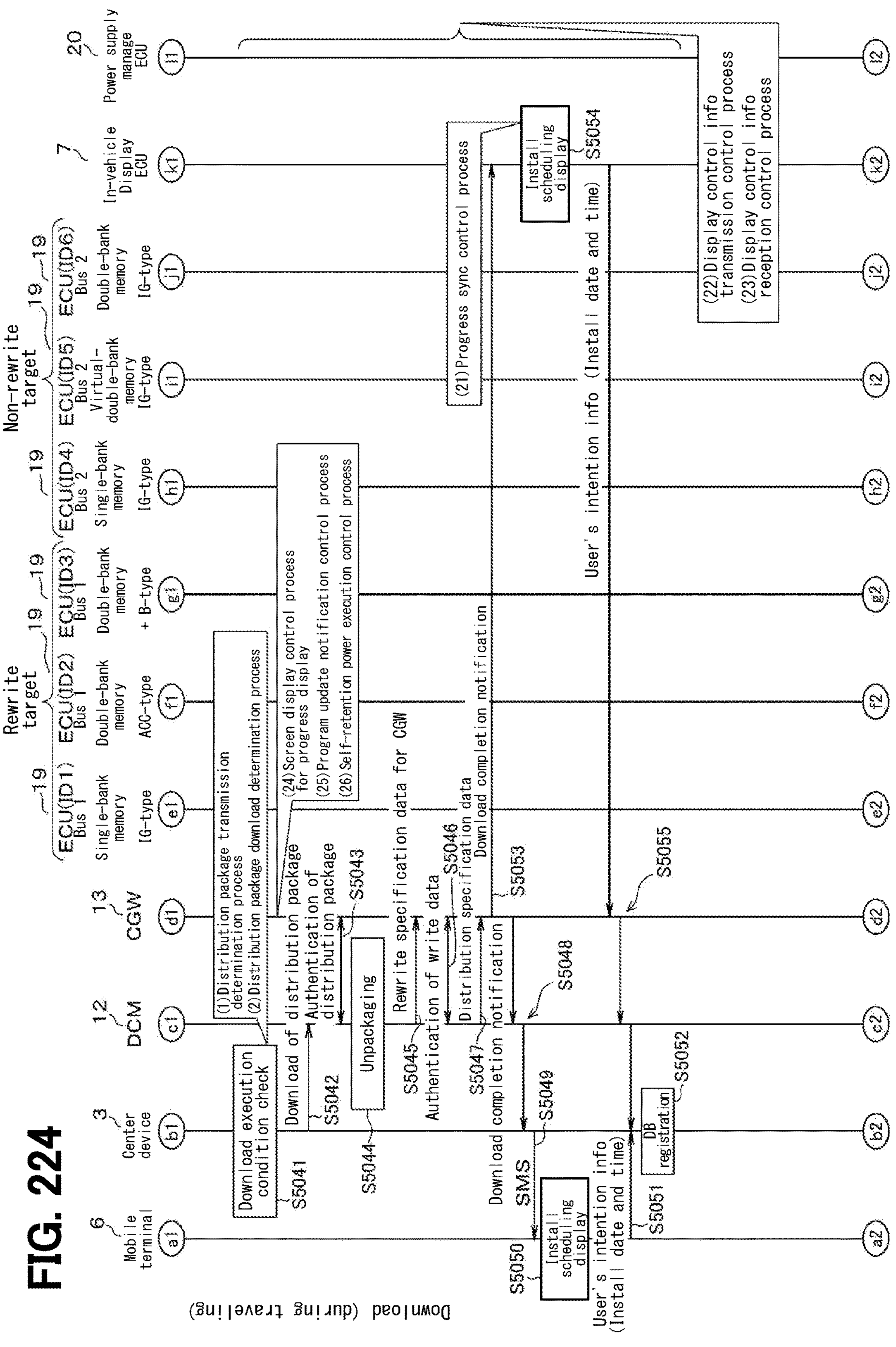
FIG. 224 is an overall sequence diagram illustrating an aspect of rewriting the application program.
Figure 225:
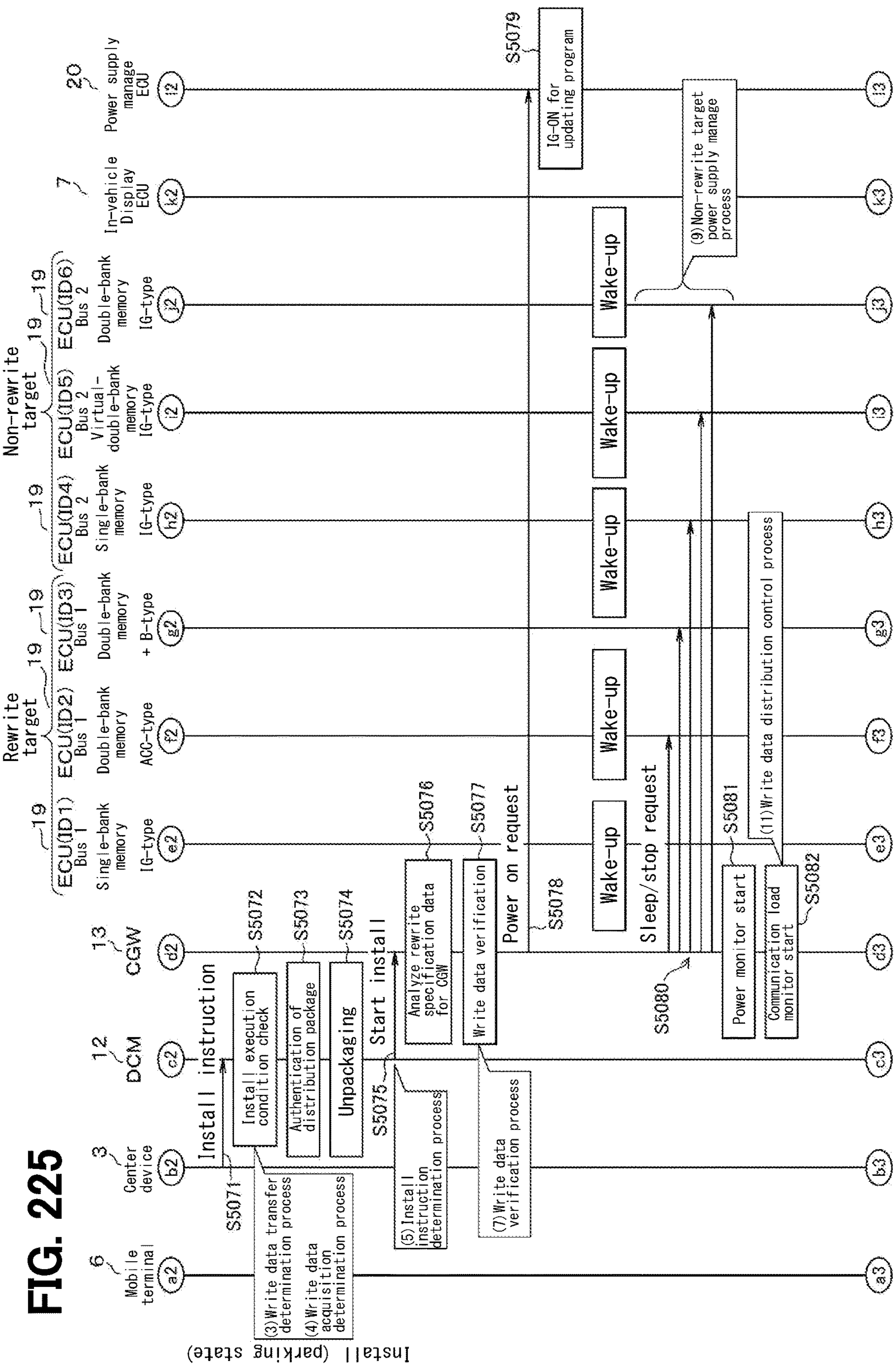
FIG. 225 is an overall sequence diagram illustrating an aspect of rewriting the application program.
Figure 226:
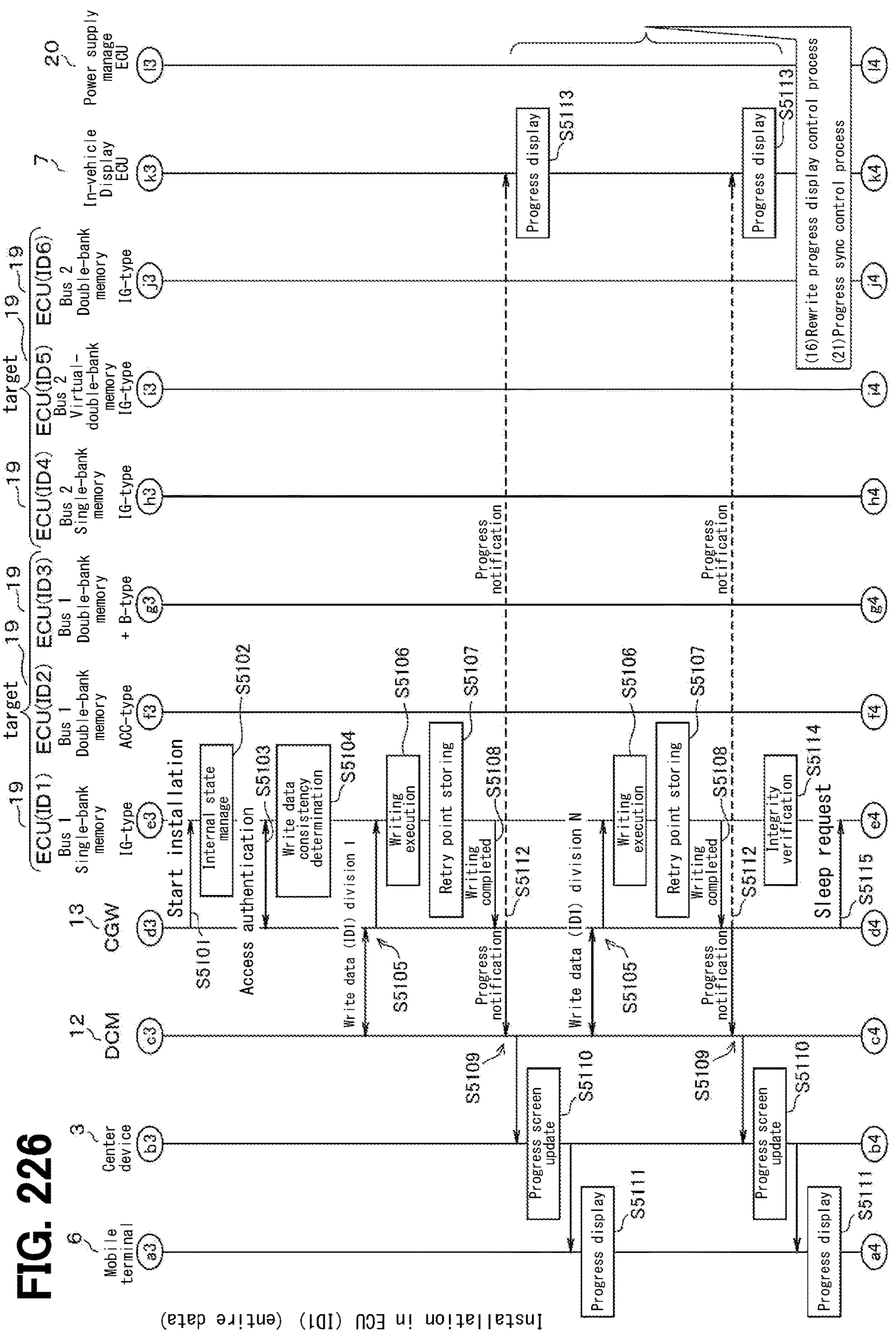
FIG. 226 is an overall sequence diagram illustrating an aspect of rewriting the application program.
Figure 227:
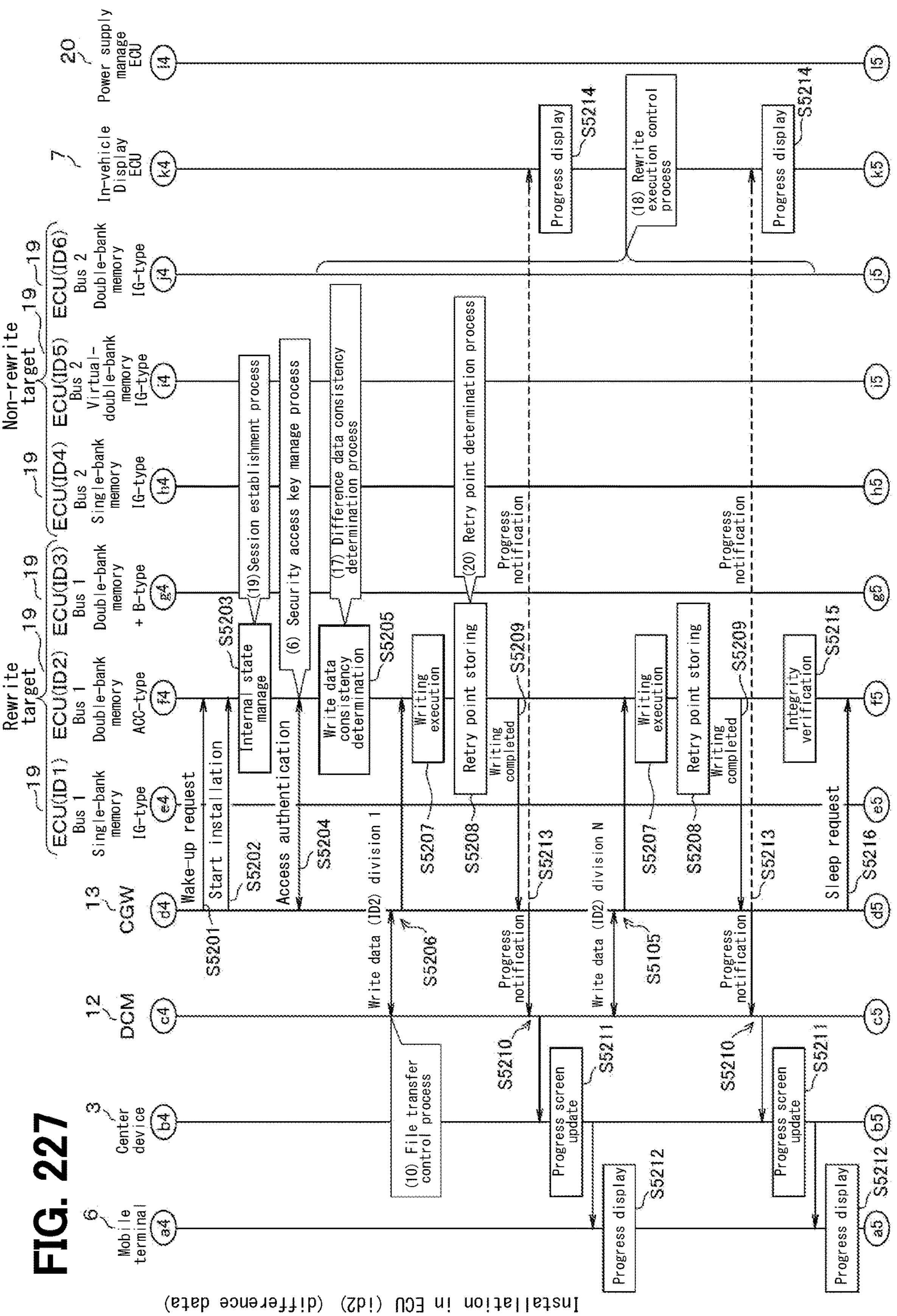
FIG. 227 is an overall sequence diagram illustrating an aspect of rewriting the application program.
Figure 228:
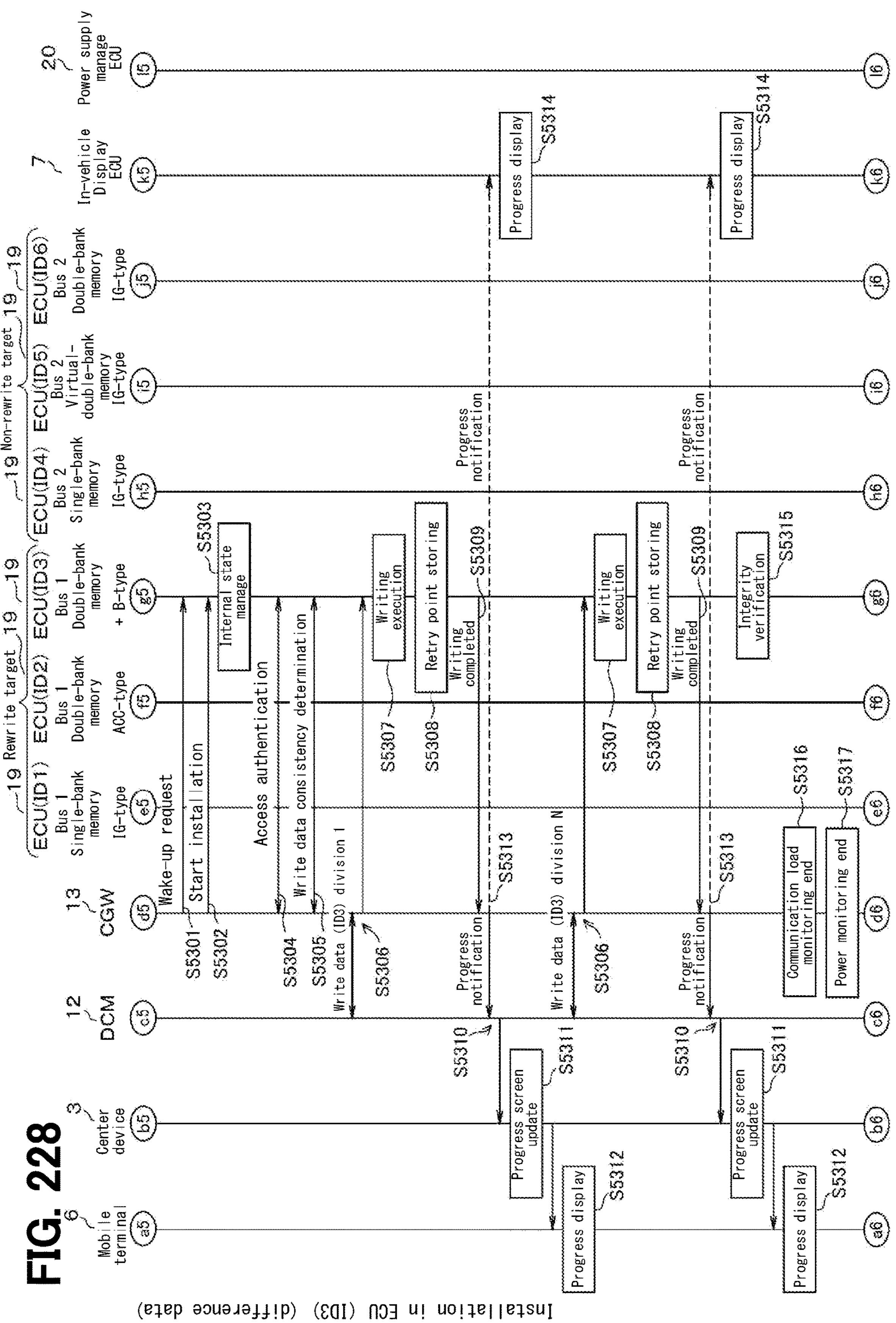
FIG. 228 is an overall sequence diagram illustrating an aspect of rewriting the application program.
Figure 229:
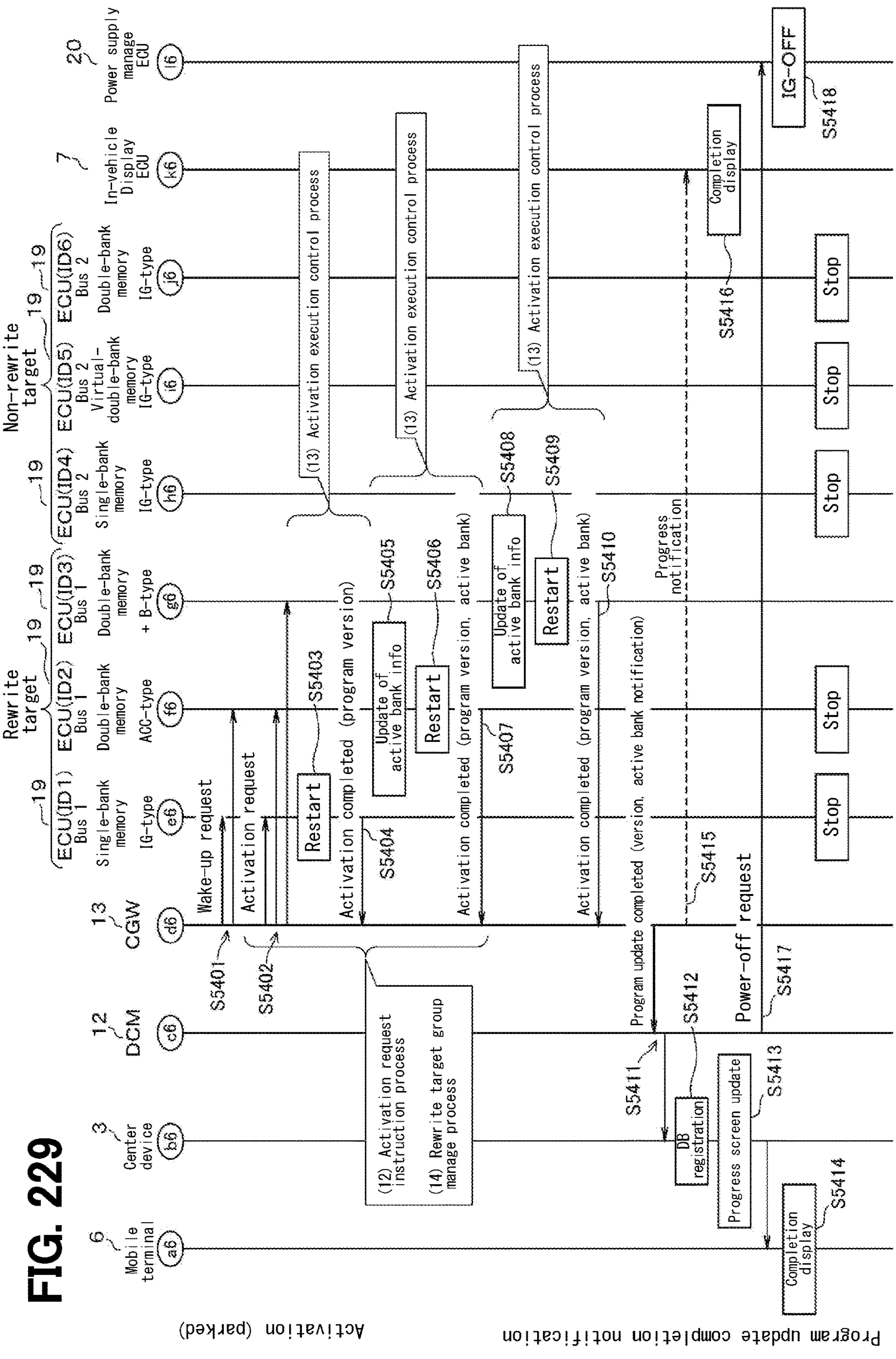
FIG. 229 is an overall sequence diagram illustrating an aspect of rewriting the application program.
Figure 230:
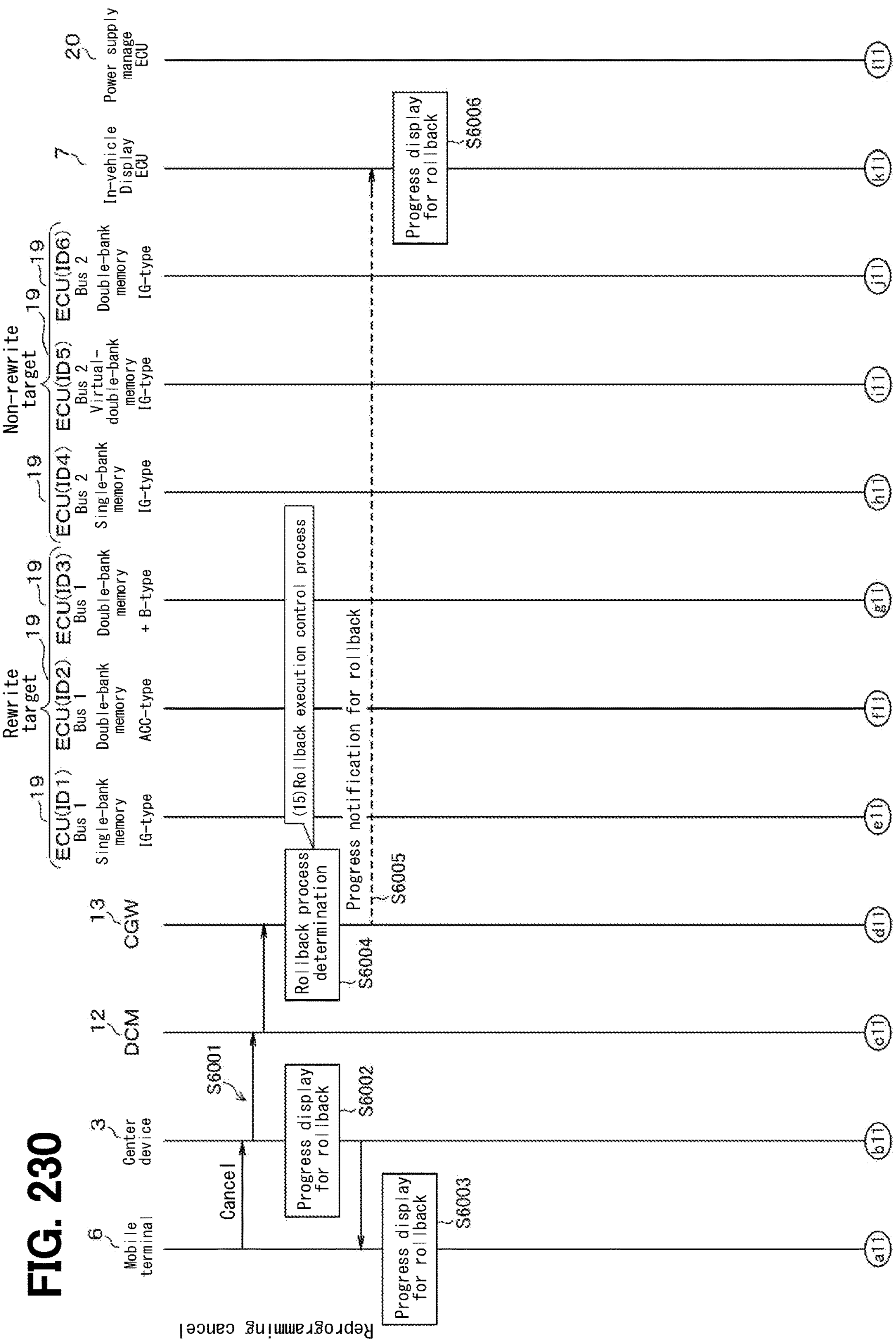
FIG. 230 is an overall sequence diagram illustrating an aspect of rewriting the application program.
Figure 231:
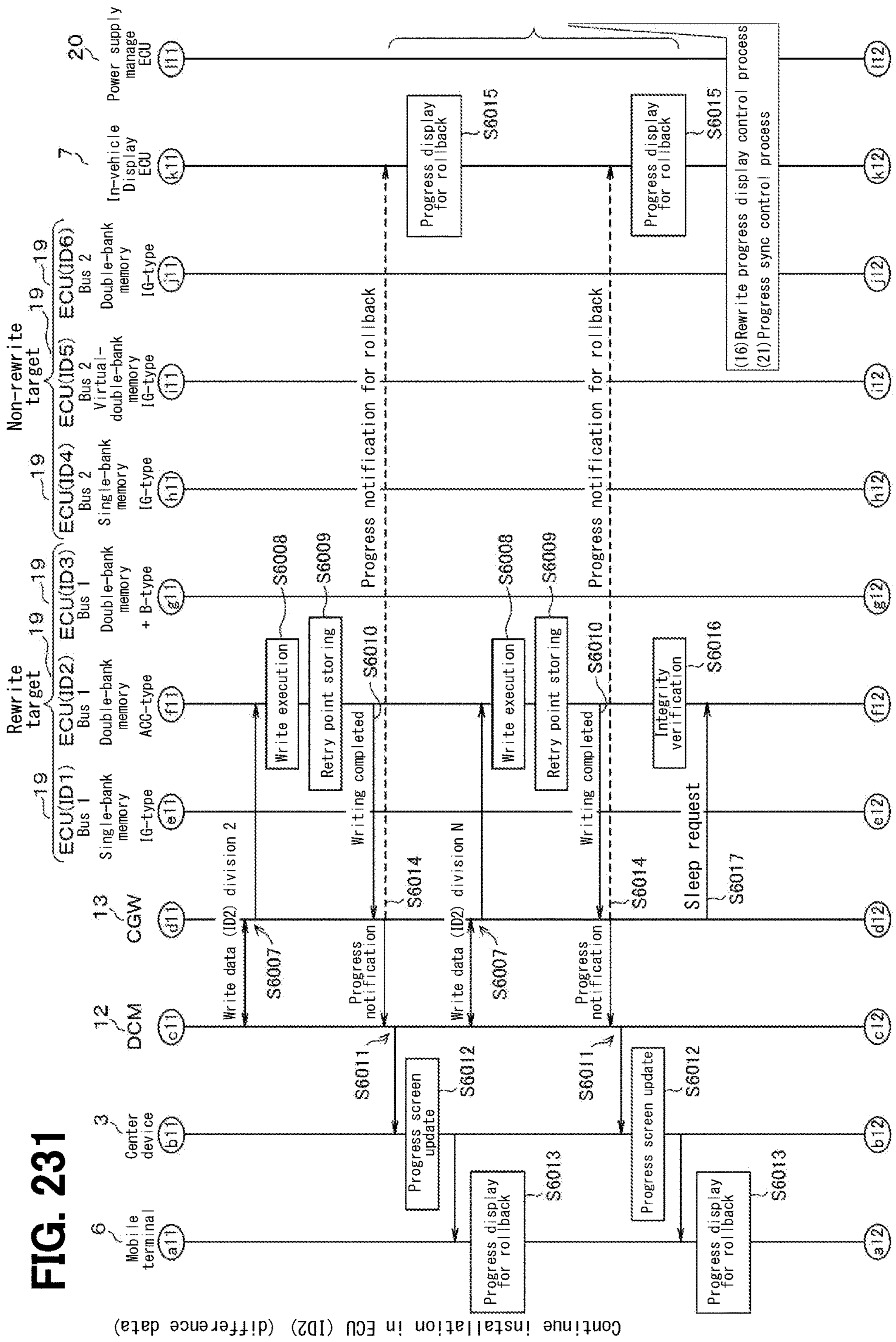
FIG. 231 is an overall sequence diagram illustrating an aspect of rewriting the application program.
Figure 232:
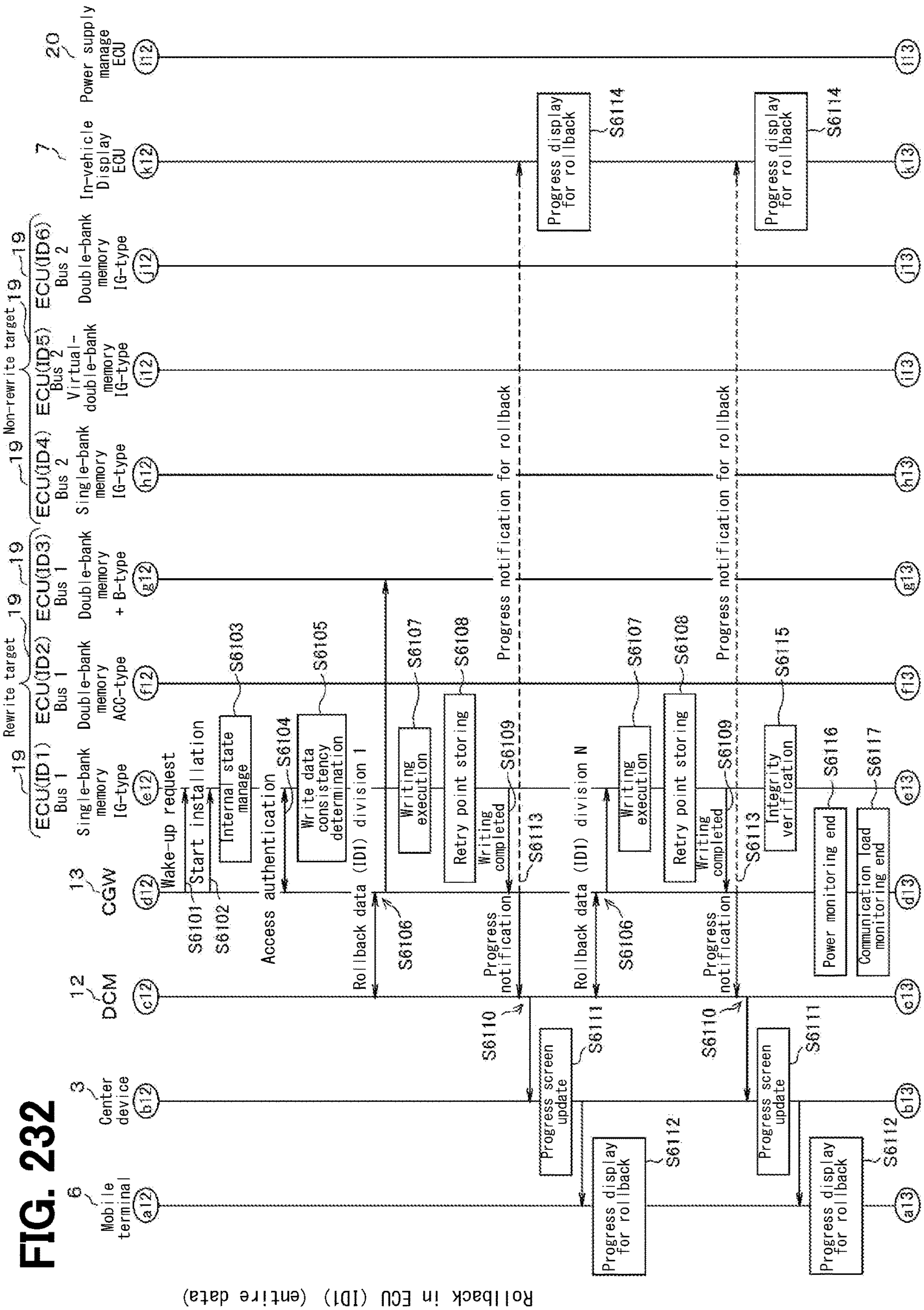
FIG. 232 is an overall sequence diagram illustrating an aspect of rewriting the application program.

Next, an operation of the above-described configuration will be described with reference to FIGS. 220 to 222. Here, a description will be made of a case where the vehicle slave device is the rewrite target ECU 19. Each of the CGW 13 and the rewrite target ECU 19 executes a self-retention power execution control program and thus performs the self-retention power execution control process.

When the self-retention power execution control process is initiated, the CGW 13 determines whether or not the vehicle power is turned off (S2601; corresponding to a vehicle power determination step). When it is determined that the vehicle power is turned off (S2601: YES), the CGW 13 determines whether or not the application program is being rewritten (S2602; corresponding to a rewrite-in-progress determination step). When it is determined that the application program is being rewritten (S2602: YES), the CGW 13 turns on the second self-retention power circuit (S2603; corresponding to a second self-retention power enable step), and determines the necessity of self-retaining the power in the rewrite target ECU 19 (S2604; corresponding to a self-retention power determination step).

When it is determined that it is necessary to self-retain the power in the rewrite target ECU 19 (S2604: YES), the CGW 13 instructs the rewrite target ECU 19 to enable the first self-retention power circuit (S2605; corresponding to a self-retention power instruction step). It is determined whether or not a stop condition for the self-retention power is established (S2606), and, when it is determined that the stop condition for the self-retention power is established (S2606: YES), the CGW 13 turns off the second self-retention power circuit (S2607), and finishes the self-retention power execution control process.

Although the CGW 13 is configured to turn on the self-retention power circuit when it is determined that an application program is being rewritten, the CGW 13 may be configured to turn on the self-retention power circuit when it is determined that the vehicle power is turned off, and to extend an operation period of the self-retention power circuit that is currently on when it is determined that the application program is being rewritten.

When the self-retention power execution control process is initiated, the rewrite target ECU 19 determines whether or not the vehicle power is turned off (S2611). When it is determined that the vehicle power is turned off (S2611: YES), the rewrite target ECU 19 turns on the self-retaining circuit (S2612), determines whether or not a stop condition for the self-retention power is established (S2613), and determines whether or not an instruction for enabling the self-retention power circuit has been given from the CGW 13 (S2614). When it is determined that the instruction for enabling the self-retention power circuit has been given from the CGW 13 (S2614: YES), the rewrite target ECU 19 extends an operation period of the self-retention power circuit that is currently operating (S2615). When it is determined that the stop condition for the self-retention power is established (S2613: YES), the rewrite target ECU 19 turns off the self-retention power circuit (S2616), and finishes the self-retention power execution control process.

Although the rewrite target ECU 19 is configured to turn on the self-retention power circuit in a case where it is determined that the vehicle power is turned off, the rewrite target ECU 19 may be configured not to turn on the self-retention power circuit and to determine that the vehicle power is turned off in a case where it is determined that the vehicle power is turned off, and to turn on the self-retention power circuit that is currently off when it is determined that an instruction for enabling the self-retention power circuit is given from the CGW 13.

The above description relates to a case where a vehicle slave device is the rewrite target ECU 19, but the same applies to a case where a vehicle slave device is the in-vehicle display 7 or the power supply management ECU 20. As illustrated in FIG. 222, in the rewrite target ECU 19, the operation of the self-retention power circuit is required in a period from the preparation for installation to the post-rewrite process, and, in the in-vehicle display 7, the operation of the self-retention power circuit is required in periods of waiting for update approval, waiting for download approval, waiting for installation approval, and waiting for activation approval.

As described above, by performing the self-retention power execution control process, when it is determined that the vehicle power is turned off and an application program is being rewritten, the CGW 13 determines the necessity of self-retaining the power in the rewrite target ECU 19, and, when it is determined that it is necessary to self-retain the power, the CGW 13 instructs the rewrite target ECU 19 to enable the self-retention power circuit. When it is determined that an instruction for enabling the self-retention power circuit has been given from the CGW 13, the rewrite target ECU 19 enables the self-retention power circuit. The self-retention power circuit is enabled such that operation power for rewriting the application program can be secured, and rewriting of the application program can be appropriately completed.

The overall sequence of program update including the above-described characteristic processes (1) to (26) will now be described with reference to FIGS. 223 to 233. Here, a description will be made of an example in which application programs of the ECU (ID1), the ECU (ID2), and the ECU (ID3) connected to the first bus are rewritten, and application programs of the ECU (ID4), the ECU (ID5), and the ECU (ID6) connected to the second bus are not rewritten. The ECU (ID1) and the ECU (ID4) have single-bank memories, the ECU (ID5) has a single-bank suspend memory, and the ECU (ID2), the ECU (ID3), and the ECU (ID6) have double-bank memories. The ECU (ID1), the ECU (ID4), the ECU (ID5), and the ECU (ID6) are IG power ECUs, the ECU (ID2) is an ACC power ECU, and the ECU (ID3) is a +B power ECU.

First, as a preliminary preparation, the user operates the mobile terminal 6 or the like, inputs personal information such as a vehicle number (an identification number of a vehicle) or a mobile telephone number, and registers an account in the center device 3 (S5001). Further, the user operates the mobile terminal 6 or the like, inputs execution conditions, and designates a vehicle position, a time period, or the like as conditions for permitting execution of program update. The center device 3 stores personal information or the like received via the mobile terminal 6 into a database (S5002).

In the vehicle-side system 4, the CGW 13 collects information regarding the vehicle (S5011), and uploads the information to the center device 3 via the DCM 12 (S5012). Specifically, the information includes a program version, a memory configuration of each ECU 19, active bank information, electrical components mounted on the vehicle, a vehicle position, a vehicle power state, and the like. The center device 3 stores the information received from the vehicle-side system 4 into the database (S5013).

When program update is necessary, the center device 3 generates the rewrite specification data illustrated in FIGS. 7 and 8 including write data provided from a supplier that is a provider of an application program and the information stored in the database. The center device 3 generates reprogramming data including the write data, an authenticator thereof, and the rewrite specification data. The center device 3 packages the generated reprogramming data, the separately generated distribution specification data (FIG. 9), and a package authenticator into one file, and generates and registers a distribution package (S5021).

After the distribution package is prepared, the center device 3 notifies the user of program update. The center device 3 refers to the personal information stored in the database, and transmits a short message service (SMS) to the mobile terminal 6 (S5031). The mobile terminal 6 is connected to a uniform resource locator (URL) described in the SMS through the user operation, and displays a notification content (S5032). The mobile terminal 6 notifies the center device 3 of an approval or disapproval for the program update through the user operation (S5033). The center device 3 registers the user's intention information (approval or disapproval) in the database (S5034). Here, instead of the mobile terminal 6, the user may be notified by using the in-vehicle display 7.

The CGW 13 receives the distribution specification data transmitted from the center device 3 via the DCM 12, and transfers the distribution specification data to the in-vehicle display 7 (S5035). The in-vehicle display 7 analyzes the distribution specification data and displays a display wording or the like that is the notification content (S5036). The in-vehicle display 7 displays image data such as icons and receives input as to whether or not the user approves the program update. The CGW 13 receives the user's intention information from the in-vehicle display 7 and notifies the center device 3 of the user's intention information via the DCM 12 (S5037).

In a case where the approval for the program update is obtained from the user, the vehicle-side system 4 downloads the distribution package from the center device 3. First, the center device 3 checks whether the execution conditions designated in advance for the user are satisfied (S5041). In a case where at least one of the execution conditions is not satisfied, the center device 3 does not transmit the distribution package to the DCM 12. In a case where all the execution conditions are satisfied, the center device 3 transmits the distribution packages to the DCM 12 (S5042). When the distribution package is downloaded from the center device 3, the DCM 12 stores the downloaded distribution package into the flash memory. The DCM 12 extracts the distribution package authenticator from the distribution package, and verifies the integrity of the reprogramming data and the distribution specification data (S5043).

The DCM 12 calculates authenticators of the reprogramming data and the distribution specification data by using, for example, key information stored in the CGW 13. The DCM 12 compares the calculated authenticators with the distribution package authenticator extracted from the distribution package, and determines that the verification is successful when the authenticators match each other, and determines that the verification fails when the authenticators do not match each other. When it is determined that the verification fails, the DCM 12 deletes the distribution package, and also notifies the CGW 13 and the center device 3 of the verification failure.

In a case where it is determined that the verification of the distribution package is successful, the DCM 12 unpackages the reprogramming data included in the distribution package as illustrated in FIG. 10, and divides the unpackaged reprogramming data into write data and rewrite specification data for each rewrite target ECU 19 (S5044). The rewrite specification data is divided into DCM rewrite specification data and CGW rewrite specification data.

The DCM 12 transmits the CGW rewrite specification data to the CGW 13 (S5045). The CGW 13 analyzes the CGW rewrite specification data received from the DCM 12, extracts necessary information, and then authenticates the write data for each ECU 19 with the DCM 12 (S5046). For example, the CGW 13 calculates an authenticator of the write data (difference data) of the ECU (ID1) by using the key information of the ECU (ID1) stored therein. The CGW 13 compares the calculated authenticator with the authenticator extracted from the reprogramming data, and determines that the verification is successful in a case where the authenticators match each other, and determines that the verification fails in a case where the authenticators do not match each other. When it is determined that the verification fails, the CGW 13 deletes the distribution package, and notifies the DCM 12 and the center device 3 of the verification failure. Here, in a case where it is determined that verification of any one of the pieces of write data fails, the CGW 13 does not perform program update on all the ECUs 19.

When it is determined that all of the pieces of write data are successfully verified, the CGW 13 receives the distribution specification data from the DCM 12, and transfers the received distribution specification data to the in-vehicle display 7 (S5047). The in-vehicle display 7 stores the distribution specification data transferred from the CGW 13. When the download process described above is completed, the CGW 13 notifies the center device 3 of download completion via the DCM 12 (S5048).

When the center device 3 is notified of the download completion from the vehicle-side system 4, the center device 3 transmits an SMS to the mobile terminal 6 (S5049). The mobile terminal 6 is connected to a URL described in the SMS through the user operation, and displays an installation reservation screen (S5050). The mobile terminal 6 notifies the center device 3 of the installation date and time entered through the user operation (S5051). The center device 3 stores the installation date and time into the database in linking with the personal information (S5052). Here, the user may be caused to reserve the installation date and time by using the in-vehicle display 7 instead of the mobile terminal 6. When the in-vehicle display 7 is notified of the download completion from the CGW 13 (S5053), the in-vehicle display 7 displays the installation reservation screen (S5054). The CGW 13 notifies the center device 3 of the install date and time received from the in-vehicle display 7, via the DCM 12 (S5055).

In a case where the current date and time reaches the installation date and time registered in the database, the center device 3 instructs the vehicle-side system 4 to initiate installation (S5071). When an instruction for the installation is given from the center device 3, the DCM 12 checks installation execution conditions (S5072). The DCM 12 checks, for example, a vehicle position or a status of communication with the center device 3. In a case where all of the execution conditions are satisfied, the DCM 12 uses the package authenticator to authenticate the distribution package (S5073). When the authentication is successful, the DCM 12 unpackages the distribution package (S5074), extracts the DCM rewrite specification data and the CGW rewrite specification data, divides the rewrite specification data into pieces of write data for the respective ECUs 19, and notifies the CGW 13 of installation initiation (S5075).

When the CGW 13 is notified of the installation initiation from the DCM 12, the CGW 13 analyzes the CGW rewrite specification data acquired from the DCM 12, and determines an order of performing rewriting on the ECUs 19 (S5076). Here, it is assumed that the ECU (ID1) is subjected to rewriting first, the ECU (ID2) is subjected to rewriting second, and the ECU (ID3) is subjected to rewriting third. The CGW 13 verifies all the pieces of write data for the respective rewrite target ECUs 19 stored in the DCM 12 by using the respective authenticators (S5077). Here, it is better to verify not only write data for version upgrade but also write data for rollback.

When the verification of the write data is successful, the CGW 13 requests the power supply management ECU 20 to turn on the IG power (S5078). When installation is performed during parking (the IG switch 42 is turned off and the ACC switch 41 is turned off), in a case where the rewrite target ECU 19 is an IG ECU or an ACC ECU, power is required to be supplied to start the rewrite target ECU 19. The power supply management ECU 20 requests the power supply control circuit 43 to provide the same power as in an ON state of the IG power (S5079). When the power is supplied to the IG power line 39 by the power supply control circuit 43, the IG ECU and the ACC ECU are started (wake-up).

Thereafter, the CGW 13 requests the ECU (ID5), the ECU (ID5), and the ECU (ID6), which are the non-rewrite target ECUs 19, and the ECU (ID2) and the ECU (ID3), which are subjected to rewriting second and the subsequent order, to sleep (S5080). Here, the second rewrite target ECU 19 is subjected to rewriting after the first rewrite target ECU 19 is subjected to rewriting, but a plurality of rewrite target ECUs 19 may be subjected to rewriting simultaneously and in parallel. In this case, only the non-rewrite target ECU 19 is requested to sleep.

The CGW 13 monitors a remaining battery charge (S5081) and monitors communication loads of the buses (S5082) in parallel with installation in each rewrite target ECU 19. The CGW 13 refers to a value of a battery load and a value of a bus load (bus load table) extracted from the CGW rewrite specification data, and controls installation within a range that does not exceed an allowable value. For example, when the battery load reaches the allowable value in a parking state, the CGW 13 stops the installation at that time.

For example, when the bus load of the first bus to which the rewrite target ECU (ID1) is connected reaches the allowable value, the CGW 14 reduces the frequency of transmitting the write data to the ECU (ID1). The monitoring is finished when installation in all of the rewrite target ECUs 19 is completed. In a case of a single-bank memory, since the installation cannot be finished in the middle of the installation, it is necessary to check that there is a sufficient remaining battery charge before initiation of the installation.

The CGW 13 notifies the ECU (ID1) subjected to rewriting first to initiate installation (S5101). When the ECU (ID1) is notified of initiation of installation from the CGW 13, the ECU (ID1) causes a state to transition to a wireless program update mode (S5102). Since the ECU (ID1) is a single-bank memory ECU, the ECU (ID1) cannot execute an application program or perform a diagnosis process using a tool in parallel, and enters a wireless program update only mode.

When the CGW 13 performs installation on the ECU (ID1) subjected to rewriting first, the CGW 13 authenticates access by using a security access key (S5103). When authentication of access to the ECU (ID1) is successful, the CGW 13 transmits information of the entire data that is the write data to the ECU (ID1). The ECU (ID1) uses the information of the received entire data to determine whether or not the write data is consistent with the ECU (S5104). In a case where it is determined that the write data is consistent, the ECU (ID1) performs a write process.

The CGW 13 acquires a divided file of a predetermined size (for example, 1 k bytes) of the write data that is transmitted from the DCM 12 to the ECU (ID1) and distributes the divided file to the ECU (ID1) (S5105). The ECU (ID1) writes the divided file received from the CGW 13 into the flash memory 33*d* (S5106). When writing is completed, the ECU (ID1) stores a retry point indicating a flash memory address at which the divided file is written such that writing can be resumed from the middle (S5107). As the retry point, a flag indicating a process that has been executed among erasure, writing, and the subsequent processes on the flash memory may be stored. When the retry point is stored, the ECU (ID1) notifies the CGW 13 of write completion (S5108).

When the write completion notification is received from the ECU (ID1), the CGW 13 notifies the center device 3 of rewrite status progress information via the DCM 12 (S5109). The progress information includes data such as the installation phase and the write data that has been written in terms of cumulative bytes in the ECU (ID1). The center device 3 updates a web screen that can be connected from the mobile terminal 6 on the basis of the progress information transmitted from the DCM 12 (S5110). The mobile terminal 6 is connected to the center device 3 and displays, for example, a percentage of currently completed installation as the updated progress situation (S5111). Consequently, even in a case where the vehicle is in the parking state and the user is outside the vehicle, the mobile terminal 6 can recognize a progress situation of the installation. Here, the progress may be displayed on the in-vehicle display 7 instead of the mobile terminal 6. When a rewrite completion notification is received from the ECU (ID1), the CGW 13 notifies the in-vehicle display 7 of rewrite status progress information (S5112). The in-vehicle display 7 updates and displays a progress situation screen (S5113). In a case of a double-bank memory configuration such as the ECU (ID2) and the ECU (ID3), installation is possible even when the vehicle is in a traveling state. Thus, for example, when the vehicle is in an IG switch-on state, the in-vehicle display 7 may display the progress situation.

When the write completion notification is received from the ECU (ID1), the CGW 13 acquires a second divided file as the next write data and distributes the divided file to the ECU (ID1). Thereafter, the processes in S5105 to S5113 are repeatedly performed up to an N-th divided file as the last write data. When writing up to the N-th divided file is completed, the ECU (ID1) verifies the integrity of the update program of the flash memory and checks whether or not the update program has been written correctly (S5114). When the CGW 13 is notified from the ECU (ID1) that all of the divided files have been written and the integrity verification has been successful, the CGW 13 requests the ECU (ID1) to sleep (S5115). The ECU (ID1) temporarily sleeps without being started by the installed update program.

The CGW 13 requests the second rewrite ECU (ID2) to wake up (S5201). The CGW 13 notifies the ECU (ID2) that a program is to be updated wirelessly and installation is initiated (S5202). The ECU (ID2) causes a state to transition to a wireless program update mode as an internal state (S5203). The ECU (ID2) having a double-bank memory can execute an application program and diagnosis using tools during the wireless program update mode. The CGW 13 authenticates access to the ECU (ID2) (S5204). The ECU (ID2) determines whether or not difference data that is the write data is consistent with the ECU (S5205). Since the ECU (ID2) has a double-bank memory, the ECU (ID2) also determines whether or not the write data is consistent with an inactive bank of the flash memory. For example, assuming that the bank-A of the ECU (ID2) is an active bank and the bank-B is an inactive bank, in a case where the write data is an address that is not consistent with the bank-B, the CGW 13 notifies the center device 3 via the DCM 12 that the write data is erroneous without proceeding to the subsequent process. The CGW 13 performs a rollback process described later. In a case where it is determined that the write data is consistent with the ECU, a write process is performed on the ECU (ID2). Thereafter, processes in S5206 to S5216 related to the ECU (ID2) are the same as those in S5105 to S5115. In S5207, when the difference data is written into the ECU (ID2) having a double-bank memory, as illustrated in FIG. 18, a difference is restored by using old data and the difference data to generate new data, and the new data is written into the flash memory 33*d*.

The CGW 13 requests the third rewrite ECU (ID3) to wake up when the entire installation is completed in the ECU (ID2) and the ECU (ID2) sleeps (S5301). The CGW 13 notifies the ECU (ID3) that the program is to be updated wirelessly and installation is initiated (S5302). The ECU (ID3) causes a state to transition to a wireless program update mode as an internal state (S5303). The CGW 13 authenticates access to the ECU (ID3) (S5304). The ECU (ID3) determines whether or not difference data that is the write data is consistent with the ECU (S5305). In a case where it is determined that the write data is consistent with the ECU, a write process is performed on the ECU (ID3). Thereafter, processes in S5306 to S5315 related to the ECU (ID3) are the same as those in S5105 to S5114.

When the entire installation in the ECUs (ID3) is completed, the CGW 13 finishes monitoring of the remaining battery charge and monitoring of the communication loads of the buses (S5316 and S5317). The CGW 13 requests the ECU (ID1) and the ECU (ID2) to wake up (S5401).

The CGW 13 requests each ECU to activate the updated program in order to start the ECU (ID1), the ECU (ID2), and the ECU (ID3) simultaneously with the updated programs (S5402). In a case of an ECU that does not cope with an activation request, it is preferable to notify the ECU of power-off and power-on instead of the activation request and thus to cause the ECU to be restarted.

When an activation request is received from the CGW 13, the ECU (ID1) restarts itself (S5403). Since the ECU (ID1) has a single-bank memory, the ECU (ID1) is started by the updated program when being restarted. When restarting after installation is completed, the ECU (ID1) notifies the CGW 13 of an updated program version along with activation completion (S5404).

When an activation request is received from the CGW 13, the ECU (ID2) updates the stored active bank information from the bank-A to the bank-B (S5405), and restarts itself (S5406). When the ECU (ID2) is started normally in the bank-B, the ECU (ID2) notifies the CGW 13 of activation completion along with an updated program version and the active bank information (S5407).

When an activation request is received from the CGW 13, the ECU (ID3) updates the stored active bank information from the bank-A to the bank-B (S5408), and restarts itself (S5409). When the ECU (ID3) is started normally in the bank-B, the ECU (ID3) notifies the CGW 13 of activation completion along with an updated program version and the active bank information (S5410).

When the activation completion notifications are received from the ECU (ID1), the ECU (ID2), and the ECU (ID3), the CGW 13 notifies the center device 3 of the program update completion along with the updated program versions and the active bank information related to the rewrite targets ECU (ID1), ECU (ID2), and ECU (ID3) via the DCM 12 (S5411). The center device 3 registers the information of which the notification is sent from the DCM 12 into the database (S5412), and also updates the web screen to display indicating completion as a progress situation (S5413). The mobile terminal 6 is connected to the center device 3, and displays a web screen indicating that the program update is completed (S5414). When the activation completion notifications are received from the ECU (ID1), the ECU (ID2), and the ECU (ID3), the CGW 13 notifies the in-vehicle display 7 of program update completion as a progress situation (S5415). The in-vehicle display 7 displays information indicating that the program update has been completed (S5416). In a case where progress display is not necessary, such as when the vehicle is in a parking state, the CGW 13 does not notify the in-vehicle display 7 of the progress.

Finally, the CGW 13 requests the power supply management ECU 20 to turn off the IG power (S5418). The power supply management ECU 20 requests the power supply control circuit 43 to cut off the supply of power in order to return to a power supply state of IG switch-off before initiation of the installation. When the supply of power to the IG power line 39 and the ACC power line 38 is cut off by the power supply control circuit 43, the ECU (ID1), the ECU (ID2), the ECU (ID4), the ECU (ID5), and the ECU (ID6) are brought into a stop state.

In the above examples, a description has been made of a case where the ECU (ID1) having a single-bank memory is also subjected to program update, and thus when the processes from installation to activation are continuously performed when the vehicle is in a parking state. However, for example, in a case where all the rewrite target ECUs 19 have double-bank memories, installation can be performed on the background while the vehicle is traveling. There may be a configuration in which the mobile terminal 6 obtains an approval for activation from the user at the time at which installation in the rewrite target ECU 19 is completed, Next, a description will be made of a rollback sequence when cancellation of program update is selected by the user during installation of an application program with reference to FIGS. 230 to 233. Specifically, a description will be made of a case where installation is completed in the ECU (ID1), and cancellation is selected by the user during installation in the ECU (ID2).

When the center device 3 is notified of cancellation of program update from the mobile terminal 6, the center device 3 instructs the vehicle-side system 4 to cancel the program update (S6001). The center device 3 changes a web screen to a display aspect during rollback as a progress situation (S6002). Mobile terminal 6 displays a web screen indicating the progress situation during rollback (S6003).

When the CGW 13 is instructed to cancel the program update from the center device 3 via the DCM 12, the CGW 13 determines an ECU requiring a rollback process and a necessary rollback process on the basis of memory configurations and installation statuses of the rewrite targets ECU (ID1), ECU (ID2), and ECU (ID3) (S6004). In this example, it is determined that a rollback process of completing installation in the ECU (ID2) and returning the ECU (ID1) to an original version is necessary.

The CGW 13 notifies the in-vehicle display 7 of rollback progress (S6005). When the in-vehicle display 7 is notified of the rollback progress from the CGW 13, the in-vehicle display 7 changes a display aspect to a rollback display aspect, and displays the progress (S6006). The in-vehicle display 7 displays, for example, "during rollback", and also displays the progress of the ECU (ID1) requiring rollback as 0% and the progress of the ECU (ID2) as 0%.

The CGW 13 continues to install the write data as a rollback process for the ECU (ID2). Since the ECU (ID2) has a double-bank memory, the ECU (ID2) can stop the installation in the bank-B that is an inactive bank halfway, and can be continuously operated with the bank-A as an active bank. However, in a case where the write data is installed halfway in the bank-B which is thus in an incomplete state, a difference cannot be restored correctly at the next installation using difference data. Therefore, the installation is continuously performed in the ECU (ID2) to the end.

Specifically, the CGW 13 acquires a divided file (for example, 1 k bytes) of the write data that is transmitted to the ECU (ID2) from the DCM 12, and distributes the divided file to the ECU (ID2) (S6007). The ECU (ID2) writes the divided file received from the CGW 13 into the flash memory 33*d* (S6008). When writing is completed, the ECU (ID2) stores a retry point (S6009) such that writing can be resumed from the middle, and notifies the CGW 13 of write completion (S6010).

When the write completion notification is received from the ECU (ID2), the CGW 13 notifies the center device 3 of rollback status progress information via the DCM 12 (S6011). The rollback status progress information is, for example, data such as a data amount required to be written as rollback for the ECU (ID2), and a cumulative amount of written data of the required data amount. The center device 3 updates a web screen that can be connected from the mobile terminal 6 on the basis of the progress information transmitted from the DCM 12 (S6012). The mobile terminal 6 displays, for example, a web screen related to a percentage of currently completed rollback or the like as the updated progress situation (S6013). Here, the progress may be displayed on the in-vehicle display 7 instead of the mobile terminal 6. When a rewrite completion notification is received from the ECU (ID2), the CGW 13 notifies the in-vehicle display 7 of rollback status progress information (S6014). The in-vehicle display 7 updates and displays a progress situation screen (S6015). Thereafter, the processes in S6007 to S6015 are repeatedly performed up to an N-th divided file as the last write data.

When the N-th divided file is written, the ECU (ID2) verifies the integrity of the update program of the flash memory 33*d* (S6016). When an installation completion notification is received from the ECU (ID2), the CGW 13 requests the ECU (ID2) to sleep (S6017). The ECU (ID2) sleeps without being started by the update program installed in the bank-B that is an inactive bank.

Subsequently, the CGW 13 requests the ECU (ID1) to wake up so as to perform a rollback process on the ECU (ID1) (S6101). The CGW 13 notifies the ECU (ID1) that installation for rollback is to be initiated (S6102). When the ECU (ID1) is notified of the installation initiation from the CGW 13, the ECU (ID1) causes a state to transition to a wireless program update mode (S6103). The CGW 13 authenticates access to ECU (ID1) (S6104). When access authentication is successful, the ECU (ID1) determines whether or not rollback write data is consistent with the ECU (S6105). In a case where it is determined that the rollback write data is consistent with the ECU, a write process is performed on the ECU (ID1).

The CGW 13 acquires a divided file of a predetermined size (for example, 1 k bytes) of the rollback write data that is transmitted from the DCM 12 to the ECU (ID1), and distributes the divided file to the ECU (ID1) (S6016). The ECU (ID1) writes the divided file received from the CGW 13 into the flash memory 33*d* (S6107). When writing is completed, the ECU (ID1) stores a retry point indicating a flash memory address at which the divided file is written such that writing can be resumed from the middle (S6108). When the retry point is stored, the ECU (ID1) notifies the CGW 13 of write completion (S6109).

When the write completion notification is received from the ECU (ID1), the CGW 13 notifies the center device 3 of rewrite status progress information via the DCM 12 (S6110). The center device 3 updates a web screen that can be connected from the mobile terminal 6 on the basis of the progress information transmitted from the DCM 12 (S6111).

The mobile terminal 6 is connected to the center device 3 and displays, for example, a percentage of currently completed rollback as the updated progress situation (S6112). Here, the progress may be displayed on the in-vehicle display 7 instead of the mobile terminal 6. When a write completion notification is received from the ECU (ID1), the CGW 13 notifies the in-vehicle display 7 of rewrite status progress information (S6113). The in-vehicle display 7 updates and displays a rollback progress situation screen (S6114). When the write completion notification is received from the ECU (ID1), the CGW 13 acquires a second divided file as the next write data and distributes the divided file to the ECU (ID1). Thereafter, he processes in S6106 to S6114 are repeatedly performed up to an N-th divided file as the last write data.

When writing up to the N-th divided file is completed, the ECU (ID1) verifies the integrity of the rollback program of the flash memory and checks whether or not the rollback program has been written correctly (S6115). When the CGW 13 is notified from the ECU (ID1) that all of the divided files have been written and the integrity verification has been successful, the CGW 13 finishes monitoring of the remaining battery charge and monitoring of the communication loads of the buses (S6116 and S6117).

Subsequently, the CGW 13 requests the ECU (ID2) and the ECU (ID3) to wake up (S6201). The CGW 13 requests rollback activation tot the ECU (ID1), the ECU (ID2), and the ECU (ID3) to be started in an old version before the installation (S6202). The ECU (ID1) having a single-bank memory starts the old version program through restarting as in rewriting during the normal time. Unlike rewriting during the normal time, the ECU (ID2) and ECU (ID3) having double-bank memories start the programs in the bank-A that is the current active bank without changing the active bank.

When the rollback activation request is received from the CGW 13, the ECU (ID1) restarts itself (S6203). When the restart is completed, the ECU (ID1) notifies the CGW 13 of a program version along with rollback activation completion (S6204).

When the rollback activation request is received from the CGW 13, the ECU (ID2) restarts itself without updating the stored active bank information (S6205). When the ECU (ID2) is started normally in the bank-A that is still an active bank, the ECU (ID2) notifies the CGW 13 of a program version and active bank information along with rollback activation completion (S6206).

When the rollback activation request is received from the CGW 13, the ECU (ID3) restarts itself without updating the stored active bank information (S6207). When the ECU (ID3) is started normally in the bank-A that is still an active bank, the ECU (ID3) notifies the CGW 13 of a program version and active bank information along with rollback activation completion (S6208).

When the rollback activation completion notifications are received from the ECU (ID1), the ECU (ID2), and the ECU (ID3), the CGW 13 notifies the center device 3 of the rollback completion via the DCM 12 (S6209). Here, the CGW 13 also sends a notification of the program version and the active bank information related to the ECU (ID1), the ECU (ID2), and the ECU (ID3). The center device 3 registers the information sent from the DCM 12 into the database (S6210) and also updates the web screen to display indicating cancellation completion as a progress situation (S6211). The mobile terminal 6 is connected to the center device 3, and displays a web screen indicating that cancellation is completed (S6212).

When the rollback activation completion notifications are received from the ECU (ID1), the ECU (ID2), and the ECU (ID3), the CGW 13 notifies the in-vehicle display 7 of rollback completion as a progress situation (S6213). The in-vehicle display 7 displays the fact that the rollback is completed (S6214).

Finally, the CGW 13 requests the power supply management ECU 20 to turn off the IG power (S6215). The power supply management ECU 20 requests the power supply control circuit 43 to cut off the supply of power in order to return to a state of IG switch-off before initiation of the installation. When the supply of power to the IG power line 39 and the ACC power line 38 is cut off by the power supply control circuit 43, the ECU (ID1), the ECU (ID2), the ECU (ID4), the ECU (ID5), and the ECU (ID6) are brought into a stop state.

As described above, it is possible to perform program update on a plurality of the rewrite target ECUs 19 by using the CGW 13 as a reprogramming master. In the present embodiment, a description has been made of a case where an application program is rewritten with the ECU (ID1), the ECU (ID2), and the ECU (ID3) as one group, but the same applies to a case where the application program is rewritten in the ECU (ID4), the ECU (ID5), and the ECU (ID6) as a second group. In this case, installation and activation are performed on the ECUs 19 of the first group, and then installation and activation are performed on the ECUs 19 of the second group.

Application programs in the DCM 12, the CGW 13, the in-vehicle display device 7, the power supply management ECU 20, alternatively can be rewritten in the same manner. However, since the application programs are required to be able to be operated during program update, these ECUs are configured to have double-bank memories.

Next, a configuration of the center device 3 will be described with reference to FIGS. 234 to 270. First to fifth embodiments will be described.

First Embodiment

Figure 234:
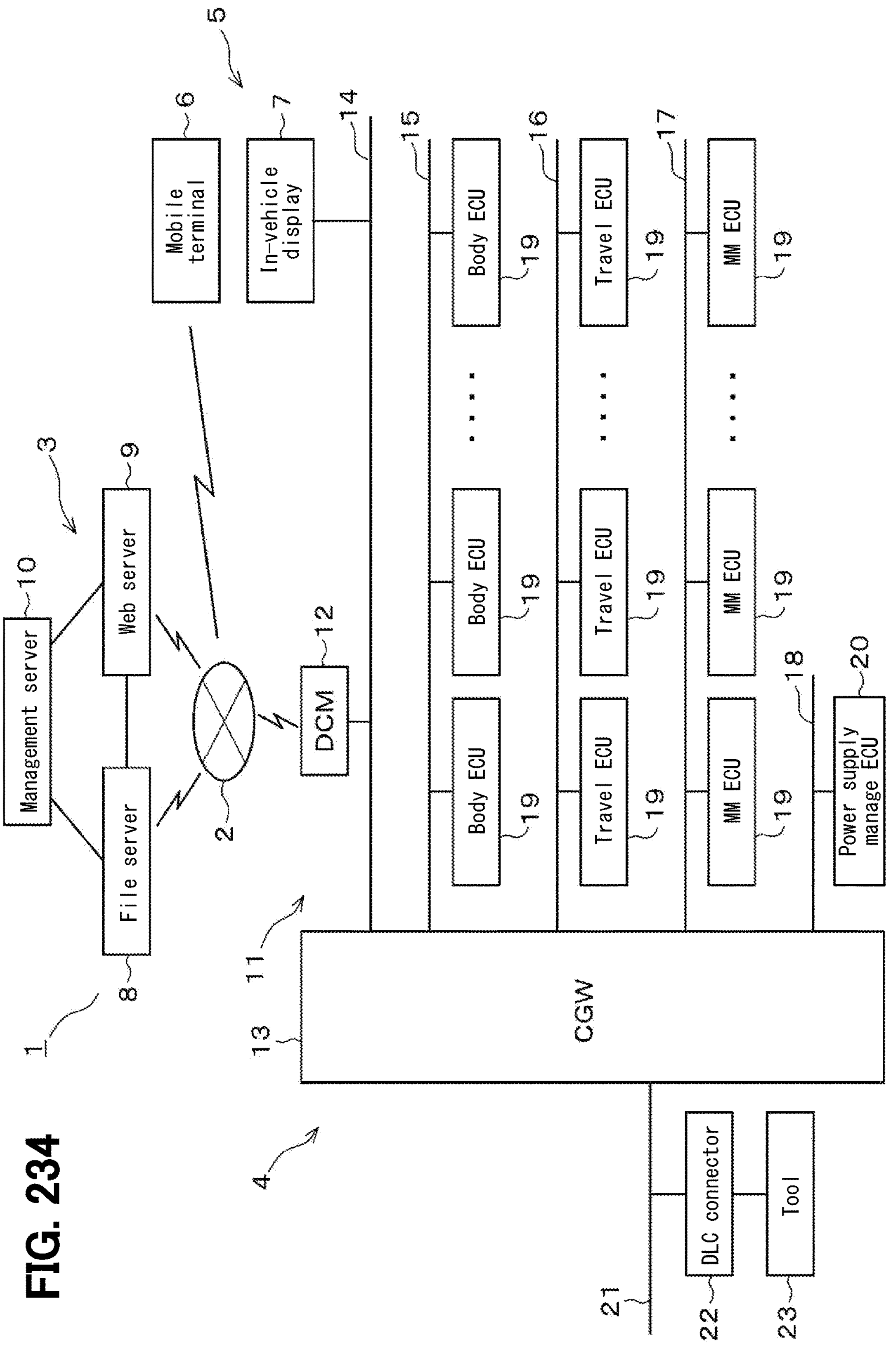
FIG. 234 is a diagram illustrating the overall configuration of a vehicle information communication system in a first embodiment.

Hereinafter, the first embodiment will be described with reference to FIGS. 234 to 253. A vehicle program rewriting system is a system capable of rewriting an application program such as vehicle control and diagnosis of an ECU mounted on a vehicle through OTA. As illustrated in FIG. 234, a vehicle program rewriting system 1 includes a center device 3 on a communication network 2 side, a vehicle-side system 4 on a vehicle side, and a display terminal 5. The communication network 2 is configured to include, for example, a mobile communication network such as a 4G line, the Internet, and Wireless Fidelity (Wi-Fi (registered trademark)).

The display terminal 5 is a terminal having a function of receiving operation input from a user and a function of displaying various screens, and is, for example, a mobile terminal 6 such as a smartphone or a tablet computer that can be carried by a user, and an in-vehicle display 7 such as a display or a meter display that is also used as a navigation function disposed in a vehicle compartment. The mobile terminal 6 can be connected to the communication network 2 as long as the mobile terminal 6 is within a communication range of a mobile communication network. The in-vehicle display 7 is connected to the vehicle-side system 4.

As long as a user is located outside the vehicle compartment and is within the communication range of the mobile communication network, the user can perform operation input while checking various screens related to rewriting of an application program with the mobile terminal 6, and can perform a procedure related to the rewriting of the application program. In the vehicle compartment, the user can perform operation input while checking various screens related to rewriting of the application program with the in-vehicle display 7, and can perform a procedure related to rewriting of the application program. That is, the user can use the mobile terminal 6 and the in-vehicle display 7 separately outside the vehicle compartment and in the vehicle compartment, and can perform a procedure related to rewriting of the application program.

The center device 3 controls an OTA function of the communication network 2 side in the vehicle program rewriting system 1, and functions as an OTA center. The center device 3 includes a file server 8, a web server 9, and a management server 10, and each of the servers 8 to 10 is configured to be able to perform data communication with each other.

The file server 8 has a function of managing an application program transmitted from the center device 3 to the vehicle-side system 4, and is a server that manages an ECU program provided from a supplier or the like that is a provider of the application program, information associated with the ECU program, distribution specification data provided from an original equipment manufacturer (OEM), vehicle conditions acquired from the vehicle-side system 4, and the like. The file server 8 can perform data communication with the vehicle-side system 4 via the communication network 2, and transmits a distribution package in which the reprogramming data and the distribution specification data are packaged to the vehicle-side system 4 when a download request for the distribution package is generated. The web server 9 is a server that manages web information, and provides various screens related to rewriting an application program to the mobile terminal 6. The management server 10 manages personal information of a user registered in a service of rewriting an application program, a rewrite history of an application program for each vehicle, and the like.

The vehicle-side system 4 has a master device 11. The master device 11 has a DCM 12 and a CGW 13, and the DCM 12 and the CGW 13 are connected to each other via a first bus 14 to be able to perform data communication. The DCM 12 is an in-vehicle communication device that performs data communication with the center device 3 via the communication network 2, and, when a distribution package is downloaded from the file server 8, extracts write data from the distribution package, and transfers the write data to the CGW 13.

The CGW 13 is a vehicle gateway device having a data relay function, and, when the write data is acquired from the DCM 12, distributes the write data to a rewrite target ECU in which an application program is rewritten. The master device 11 controls the OTA function of the vehicle side in the vehicle program rewriting system 1, and functions as an OTA master. In FIG. 234, although the DCM 12 and the in-vehicle display 7 are configured to be connected to the same first bus 14 as an example, the DCM 12 and the in-vehicle display 7 may be configured to be connected to separate buses.

In addition to the first bus 14, a second bus 15, a third bus 16, a fourth bus 17, and a fifth bus 18 are connected to the CGW 13 as buses inside the vehicle, and various ECUs 19 are connected via the buses 15 to 17, and a power supply management ECU 20 is connected via the bus 18.

The second bus 15 is, for example, a body system network bus. The ECUs 19 connected to the second bus 15 are ECUs controlling the body system including, for example, a door ECU controlling locking/unlocking of a door, a meter ECU controlling display on the meter display, an air conditioner ECU controlling driving of an air conditioner, and a window ECU controlling opening and closing of a window. The third bus 16 is, for example, a traveling system network bus. The ECUs 19 connected to the third bus 16 are ECUs controlling the traveling system including, for example, an engine ECU controlling driving of an engine, a brake ECU controlling driving of a brake, an ECT (Electronic Toll Collection System (ETC) (registered trademark)) ECU controlling driving of an automatic transmission, and a power steering ECU controlling a driving of a power steering.

The fourth bus 17 is, for example, a multimedia system network bus. The ECUs 19 connected to the fourth bus 17 are ECUs controlling the multimedia system including, for example, a navigation ECU controlling a navigation system, and an ETC ECU controlling an electronic toll collection system, that is, an ECT system. The buses 15 to 17 may be system buses other than the body system network bus, the traveling system network bus, and the multimedia system network bus. The number of buses and the number of the ECUs 19 are not limited to the exemplified configuration.

The power supply management ECU 20 is an ECU having a function of managing power to be supplied to the DCM 12, the CGW 13, the various ECUs 19, and the like.

A sixth bus 21 is connected to the CGW 13 as a bus outside the vehicle. A data link coupler (DLC) connector 22 to which a tool 23 is detachably connected is connected to the sixth bus 21. The buses 14 to 18 inside the vehicle and the bus 21 outside the vehicle are configured with, for example, Controller Area Network (CAN) (registered trademark) buses, and the CGW 13 performs data communication with the DCM 12, the various ECUs 19, and the tool 23 in accordance with the CAN data communication standard and the diagnosis communication standard (UDS: ISO14229). The DCM 12 and the CGW 13 may be connected to each other via Ethernet, and the DLC connector 22 and the CGW 13 may be connected to each other via Ethernet.

When write data is received from the CGW 13, the rewrite target ECU 19 writes the write data into a flash memory to rewrite an application program. In the above configuration, when a request for acquiring write data is received from the rewrite target ECU 19, the CGW 13 functions as a reprogramming master that distributes the write data to the rewrite target ECU 19. When the write data is received from the CGW 13, the rewrite target ECU 19 functions as a reprogramming slave that writes the write data into the flash memory to rewrite the application program.

As an aspect of rewriting the application program, there are a wired rewrite aspect and a wireless rewrite aspect. In the aspect in which the application program is rewritten in a wired manner, when the tool 23 is connected to the DLC connector 22, the tool 23 transfers the write data to the CGW 13. The CGW 13 relays or distributes the write data transferred from the tool 23 to the rewrite target ECU 19. In the aspect of rewriting the application program in a wireless manner, as described above, when the distribution package is downloaded from the file server 8, the DCM 12 extracts the write data from the distribution package, and transfers the write data to the CGW 13.

Figure 235:
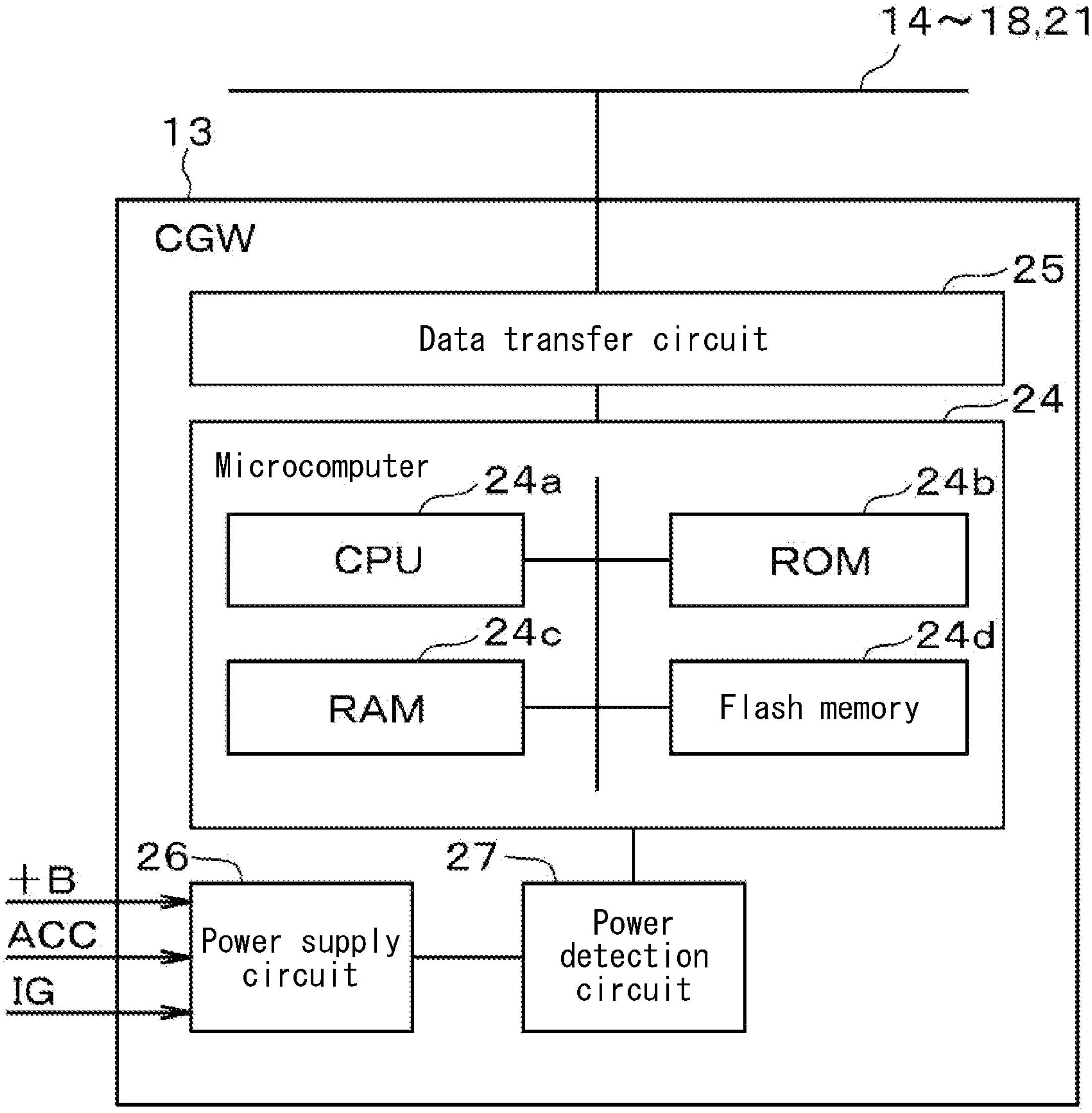
FIG. 235 is a diagram illustrating an electrical configuration of a CGW.

As illustrated in FIG. 235, the CGW 13 includes a microcomputer 24, a data transfer circuit 25, a power supply circuit 26, and a power detection circuit 27 as electrical functional blocks. The microcomputer 24 includes a central processing unit (CPU) 24_a_, a read only memory (ROM) 24_b_, a random access memory (RAM) 24_c_, and a flash memory 24_d_. The microcomputer 24 performs various processes by executing various control programs stored in a non-transitory tangible storage medium, and controls an operation of the CGW 13.

The data transfer circuit 25 controls data communication with the buses 14 to 18 and 21 in accordance with the CAN data communication standard and the diagnosis communication standard. The power supply circuit 26 receives battery power (hereinafter, referred to as +B power), accessory power (hereinafter, referred to as ACC power), and ignition power (hereinafter, referred to as IG power). The power detection circuit 27 detects a voltage value of the +B power, a voltage value of the ACC power, and a voltage value of the IG power received by the power supply circuit 26, compares the detected voltage values with predetermined voltage threshold values, and outputs comparison results to the microcomputer 24. The microcomputer 24 determines whether the +B power, the ACC power, and the IG power supplied to the CGW 13 from the outside are normal or abnormal on the basis of the comparison results that are input from the power detection circuit 27.

Figure 236:
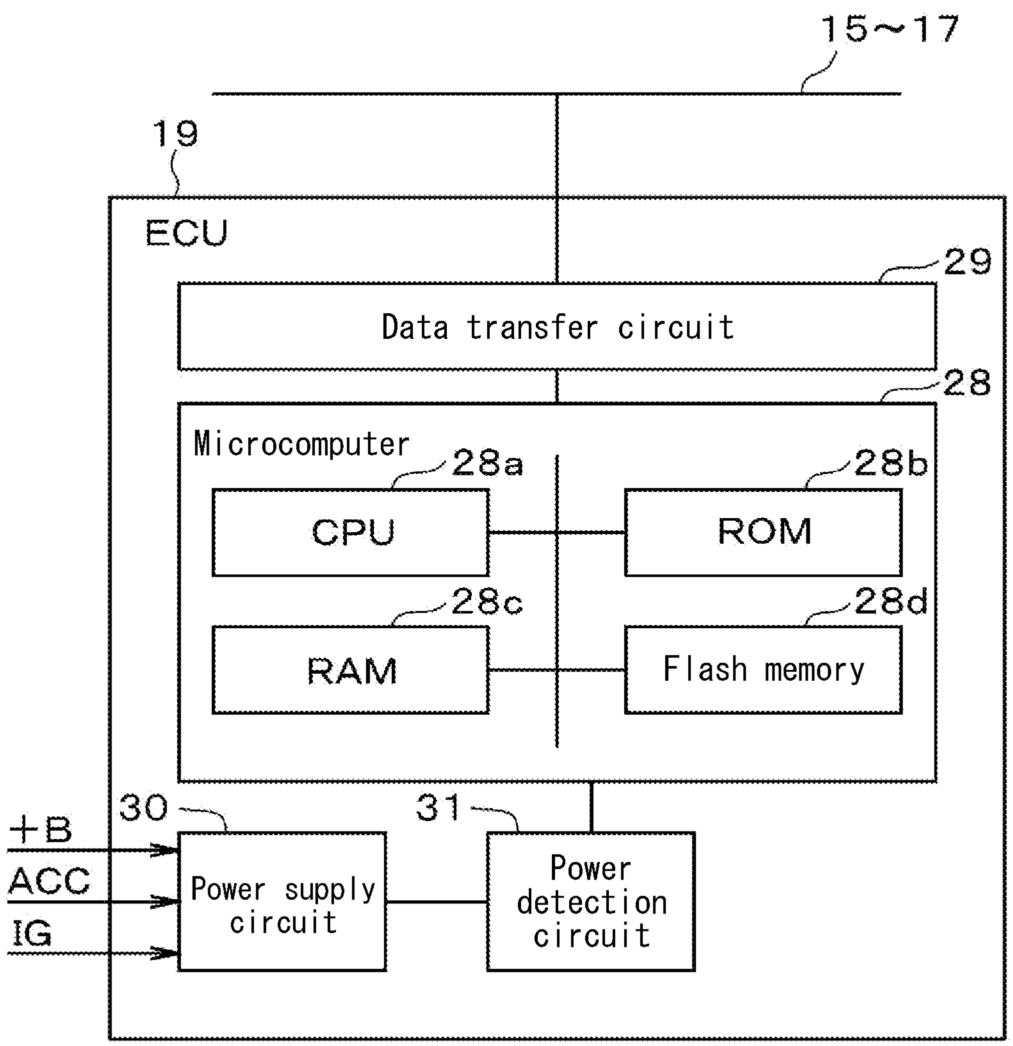
FIG. 236 is a diagram illustrating an electrical configuration of an ECU.

As illustrated in FIG. 236, the ECU 19 includes a microcomputer 28, a data transfer circuit 29, a power supply circuit 30, and a power detection circuit 31 as electrical functional blocks. The microcomputer 28 includes a CPU 28*a*, a ROM 28*b*, a RAM 28*c*, and a flash memory 28*d*. The microcomputer 28 performs various processes by executing various control programs stored in a non-transitory tangible storage medium, and controls an operation of the ECU 19.

The data transfer circuit 29 controls data communication with the buses 15 to 17 in accordance with the CAN data communication standard. The power supply circuit 30 receives +B power, ACC power, and IG power. The power detection circuit 31 detects a voltage value of the +B power, a voltage value of the ACC power, and a voltage value of the IG power received by the power supply circuit 30, compares the detected voltage values with predetermined voltage threshold values, and outputs comparison results to the microcomputer 28. The microcomputer 28 determines whether the +B power, the ACC power, and the IG power supplied to the ECU 19 from the outside are normal or abnormal on the basis of the comparison results that are input from the power detection circuit 27. The ECUs 19 fundamentally have the same configuration except that loads such as sensors or actuators connected thereto are different from each other. A fundamental configuration of each of the DCM 12, the in-vehicle display 7, and the power supply management ECUs is the same as that of the ECU 19 illustrated in FIG. 236.

Figure 237:
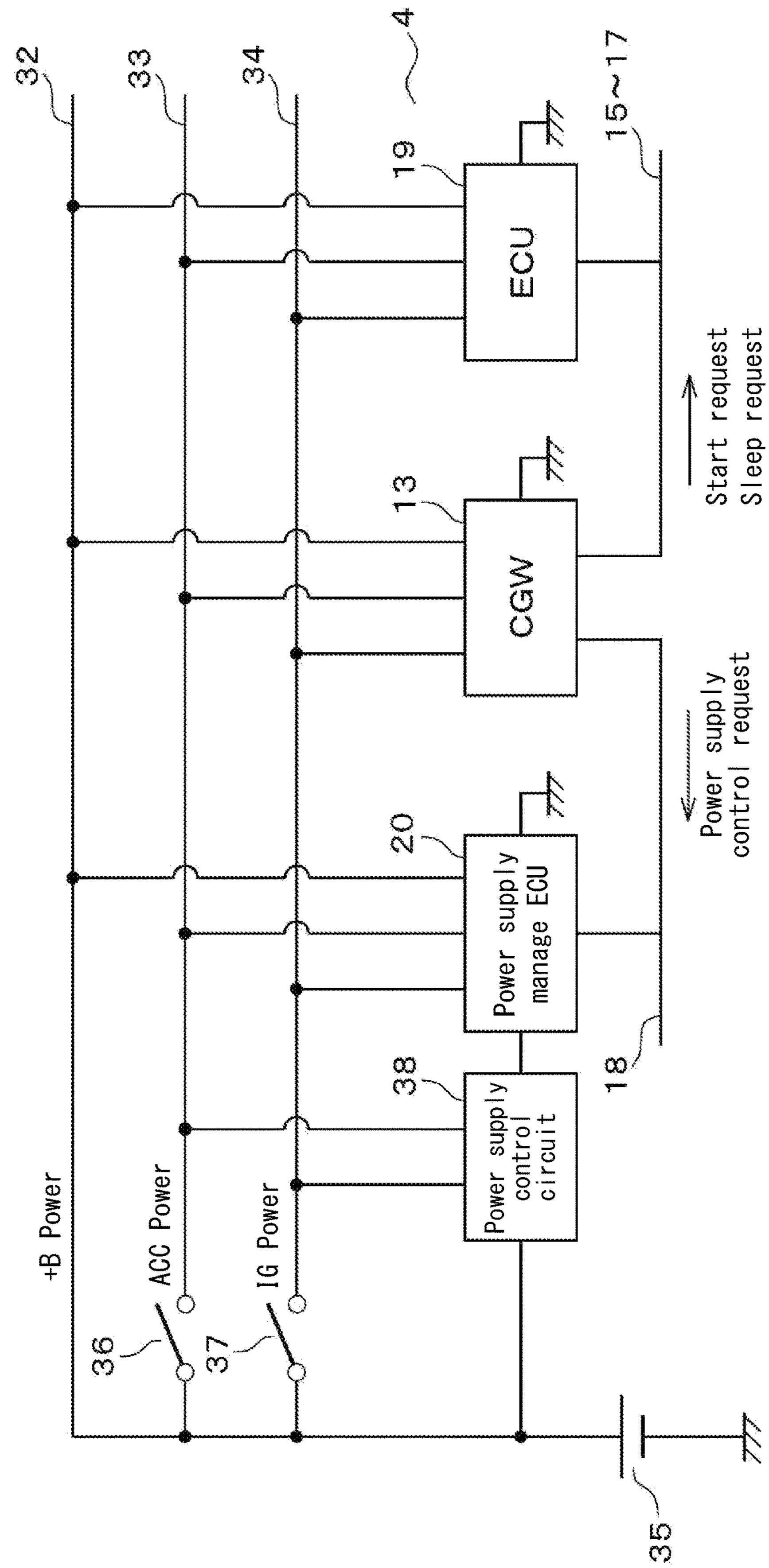
FIG. 237 is a diagram illustrating a connection aspect of power lines.

As illustrated in FIG. 237, the power supply management ECU 20, the CGW 13, and the ECU 19 are connected to a +B power line 32, an ACC power line 33, and an IG power line 34. The +B power line 32 is connected to a positive electrode of a vehicle battery 35. The ACC power line 33 is connected to the positive electrode of the vehicle battery 35 via an ACC switch 36. When the user performs an ACC operation, the ACC switch 36 switches from an OFF state to an ON state, and an output voltage of the vehicle battery 35 is applied to the ACC power line 33. For example, in a case of a vehicle of the type to insert a key into an insertion port, the ACC operation is an operation of rotating the key from an "OFF" position to an "ACC" position by inserting the key into the insertion port, and, in a case of a vehicle of the type to press a start button, the ACC operation is an operation of pressing the start button once.

The IG power line 34 is connected to the positive electrode of the vehicle battery 35 via an IG switch 37. When the user performs an IG operation, the IG switch 37 switches from an OFF state to an ON state, and an output voltage of the vehicle battery 35 is applied to the IG power line 34. For example, in a case of a vehicle of the type to insert a key into an insertion port, the IG operation is an operation of rotating the key from an "OFF" position to an "ON" position by inserting the key into the insertion port, and, in a case of a vehicle of the type to press a start button, the IG operation is an operation of pressing the start button twice. A negative electrode of the vehicle battery 35 is grounded.

When both of the ACC switch 36 and the IG switch 37 are in an OFF state, only the +B power is supplied to the vehicle-side system 4. The state in which only the +B power is supplied to the vehicle-side system 4 will be referred to as a +B power supply state. When the ACC switch 36 is in an ON state and the IG switch 37 is in an OFF state, the ACC power and the +B power are supplied to the vehicle-side system 4. The state in which the ACC power and the +B power are supplied to the vehicle-side system 4 will be referred to as an ACC power supply state. When of both the ACC switch 36 and the IG switch 37 are in an ON state, the +B power, the ACC power, and the IG power are supplied to the vehicle-side system 4. The state in which the +B power, the ACC power, and the IG power are supplied to the vehicle-side system 4 will be referred to as an IG power supply state.

The ECUs 19 have different start conditions depending on power supply states, and are classified as a +B ECU that is started in the +B power supply state, an ACC ECU that is started in the ACC power supply state, and an IG ECU that is started in the IG power supply state. For example, the ECU 19 driven in an application such as vehicle theft is the +B ECU. For example, the ECU 19 driven in a non-traveling system application such as an audio is the ACC ECUs. For example, the ECU 19 driven in a traveling system application such as engine control is the IG ECU.

The CGW 13 transmits a start request to the ECU 19 that is in a sleep state, and thus causes the ECU 19 that is a transmission destination of the start request to transition from the sleep state to an active state. The CGW 13 also transmits a sleep request to the ECU 19 that is in an active, and thus causes the ECU 19 that is a transmission destination of the sleep request to transition from the active state to a sleep state. The CGW 13 selects the ECU 19 that is a transmission destination of the start request or the sleep request from among the plurality of ECUs, for example, by making waveforms of the transmission signals to be transmitted to the buses 15 to 17 different from each other.

The power supply control circuit 38 is connected in parallel to the ACC switch 36 and the IG switch 37. The CGW 13 transmits a power supply control request to the power supply management ECU 20 and causes the power supply management ECU 20 to control the power supply control circuit 38. That is, the CGW 13 transmits a power supply start request as the power supply control request to the power supply management ECU 20, to connect the ACC power line 33 or the IG power line 34 to the positive electrode of the vehicle battery 35 in the power supply control circuit 38. In this state, the ACC power or IG power is supplied to the vehicle-side system 4 even when the ACC switch 36 and the IG switch 37 is turned off. The CGW 13 transmits a power supply stop request as the power supply control request to the power supply management ECU 20, to disconnect the ACC power line 33 or IG power line 34 from the positive electrode of the vehicle battery 35 in the power supply control circuit 38.

The DCM 12, the CGW 13, and the ECU 19 have a self-retention power function. That is, when vehicle power switches from the ACC power or the IG power to the +B power in the active state, the DCM 12, the CGW 13, and the ECU 19 do not transition from the active state to the stop state or the sleep state immediately after the switching, but continue the active state for a predetermined time even immediately after the switching, and thus self-retain drive power. The DCM 12, the CGW 13, and the ECU 19 transition from the active state to the stop state or the sleep state when a predetermined time (for example, several seconds) has elapsed immediately after the vehicle power switches from the ACC power or IG power to the +B power.

Figure 238:
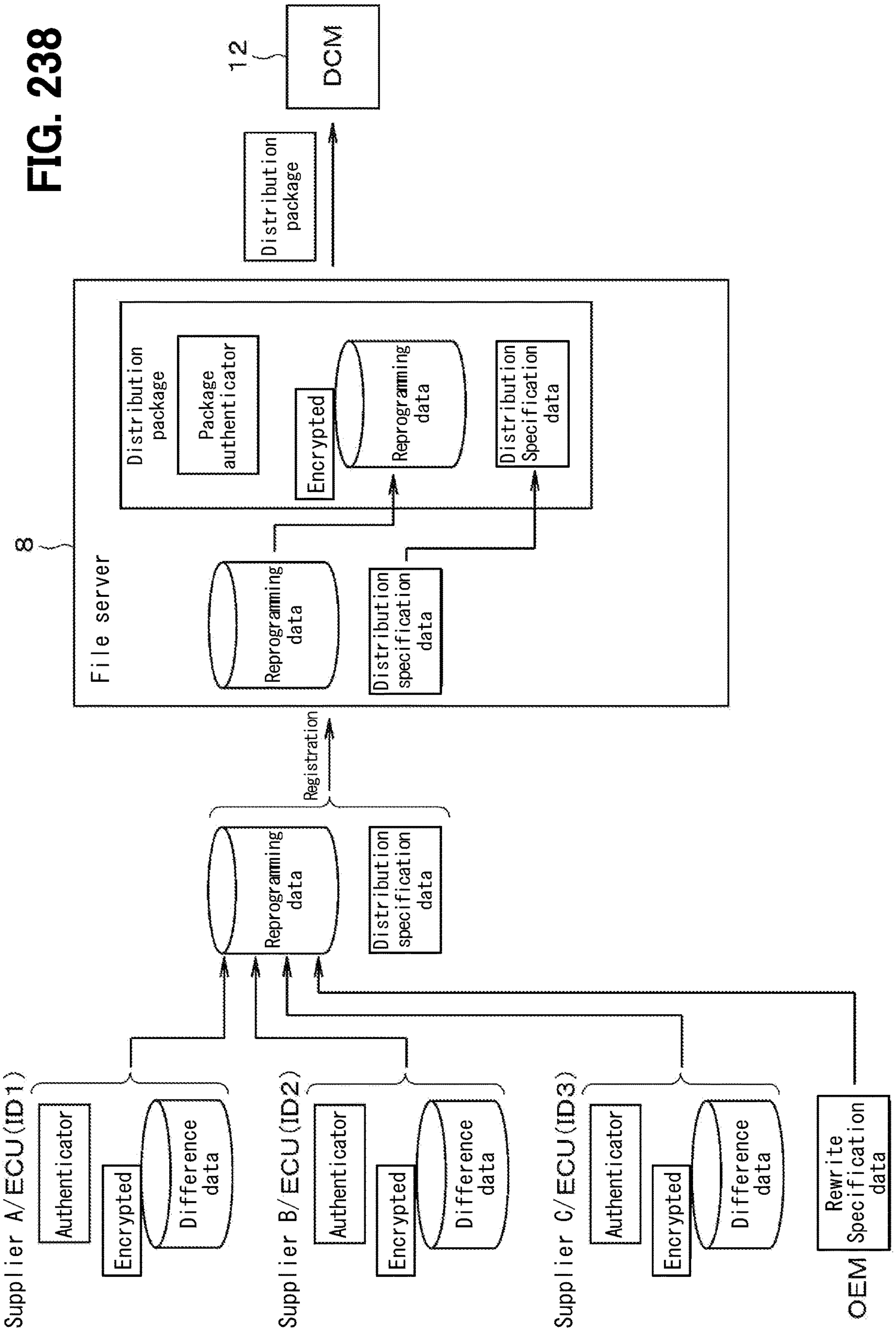
FIG. 238 is a diagram illustrating an aspect of packaging reprogramming data and distribution specification data.
Figure 239:
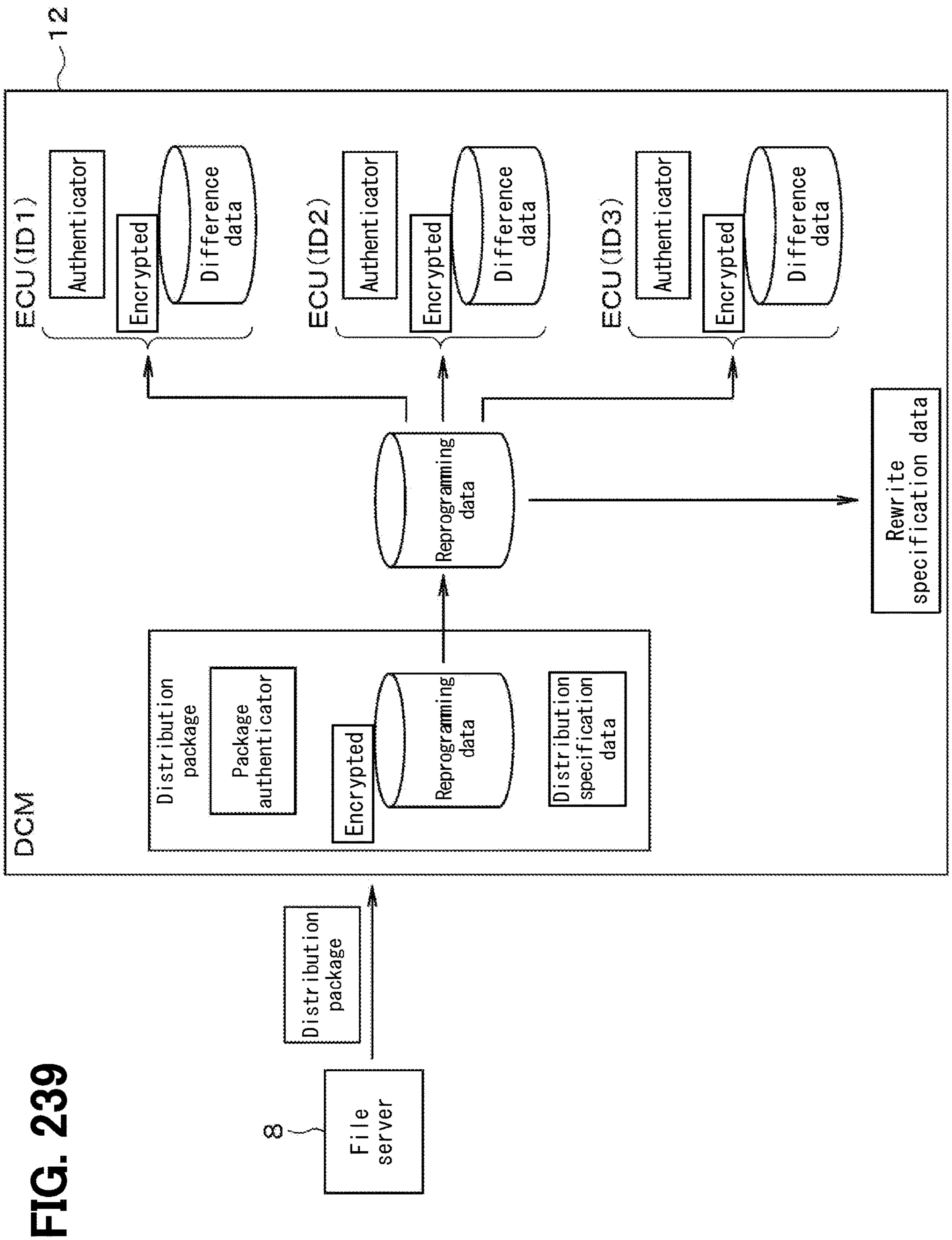
FIG. 239 is a diagram illustrating an aspect of unpackaging a distribution package.

Next, a distribution package distributed from the center device 3 to the master device 11 will be described with reference to FIGS. 238 and 239. In the vehicle program rewriting system 1, reprogramming data including write data provided from a supplier as a provider of an application program and rewrite specification data provided from an OEM is generated. The write data provided from the supplier includes difference data corresponding to a difference between an old application program and a new application program, and the entire data corresponding to the whole of the new application program. The difference data or the entire data may be compressed by using a well-known data compression technique. FIG. 238 exemplifies a case where difference data is provided as write data from suppliers A to C, and reprogramming data is generated from encrypted difference data and an authenticator of the ECU (ID1) provided from the supplier A, encrypted difference data and an authenticator of the ECU (ID2) provided from the supplier B, and encrypted difference data and an authenticator of the ECU (ID3) provided from the supplier C, and rewrite specification data provided from the OEM. The authenticator is added to each piece of write data.

Although FIG. 238 illustrates the difference data used to update the old application program to the new application program, rollback difference data used to roll back the new application program to the old application program may also be included in the reprogramming data. For example, in a case where the rewrite target ECU 19 has a single-bank memory, the rollback difference data is included in the reprogramming data.

The rewrite specification data provided from the OEM includes, as information related to rewriting of the application program, information for specifying the rewrite target ECU 19, information for specifying a rewrite order when there are a plurality of rewrite target ECUs 19, information for specifying a rollback method described later, and the like, and is data defining an operation related to rewriting in the DCM 12, the CGW 13, or rewrite target ECU 19. The rewrite specification data is classified into DCM rewrite specification data used by the DCM 12 and CGW rewrite specification data used by the CGW 13. Information required to read files corresponding to the rewrite target ECU 19 is described in the DCM rewrite specification data. As described above, information required to control rewriting in the rewrite target ECU 19 is described in the CGW rewrite specification data.

When the DCM rewrite specification data is acquired, the DCM 12 analyzes the DCM rewrite specification data, and controls operations related to rewriting such as transferring write data to the CGW 13 according to the analysis result. When the CGW rewrite specification data is acquired, the CGW 13 analyzes the CGW rewrite specification data, and controls operations related to rewriting such as acquiring write data from the DCM 12 and distributing the write data to the rewrite target ECU 19 according to the analysis result.

In the file server 8, the above-described reprogramming data is registered, and the distribution specification data provided from the OEM is registered. The distribution specification data provided from the OEM is data defining an operation related to display of various screens in the display terminal 5.

When the reprogramming data and the distribution specification data are registered, the file server 8 encrypts the registered reprogramming data, and generates a distribution package in which a package authenticator for authenticating the package, the encrypted reprogramming data, and the distribution specification data are packaged into a single file. When a download request for the distribution package is received from the outside, the file server 8 transmits the distribution package to the DCM 12. In FIG. 238, a case is exemplified in which the file server 8 generates the distribution package storing the reprogramming data and the distribution specification data and transmits the reprogramming data and the distribution specification data to the DCM 12 together, but the reprogramming data and the distribution specification data may be separately transmitted to the DCM 12. That is, the file server 8 may transmit the distribution specification data to the DCM 12 first, and may transmit the reprogramming data to the DCM 12 later. The file server 8 may transmit the distribution package and the package authenticator to the DCM 12 by generating the reprogramming data and the distribution specification data as a distribution package that is a single file.

When the distribution package is downloaded from the file server 8, the DCM 12 verifies the package authenticator stored in the distribution package and the encrypted reprogramming data, and decrypts the encrypted reprogramming data when the verification result is positive. When the encrypted reprogramming data is decrypted, the DCM 12 unpackages the decrypted reprogramming data, and generates encrypted difference data, an authenticator, DCM rewrite specification data, and CGW rewrite specification data for each of the ECUs. FIG. 239 illustrates a case where the encrypted difference data and the authenticator of the ECU (ID1), the encrypted difference data and the authenticator of the ECU (ID2), the encrypted difference data and the authenticator of the ECU (ID3), and the rewrite specification data are generated.

Figure 240:
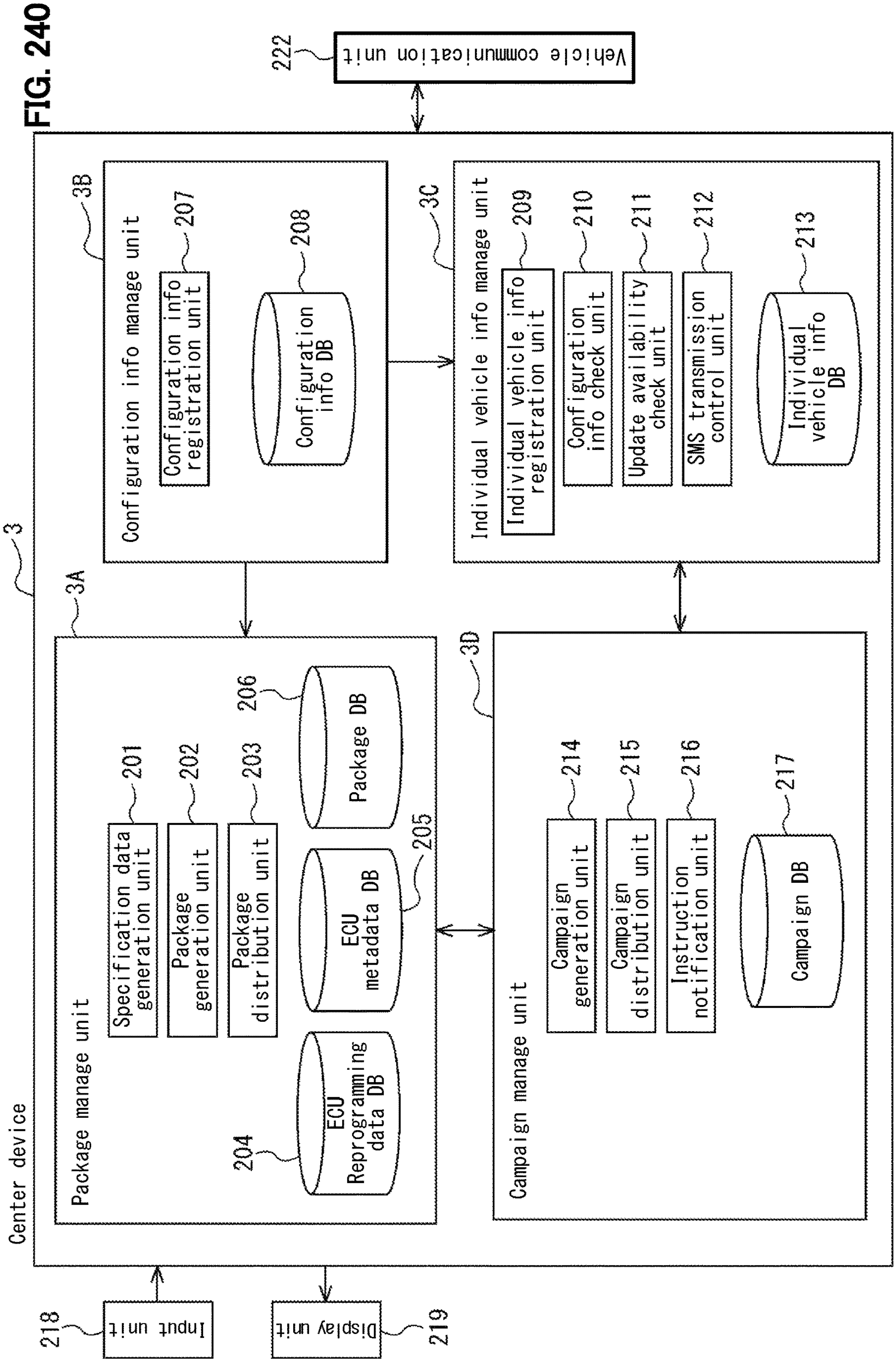
FIG. 240 is a block diagram illustrating portions of a center device related to respective main functions of a server.
Figure 241:
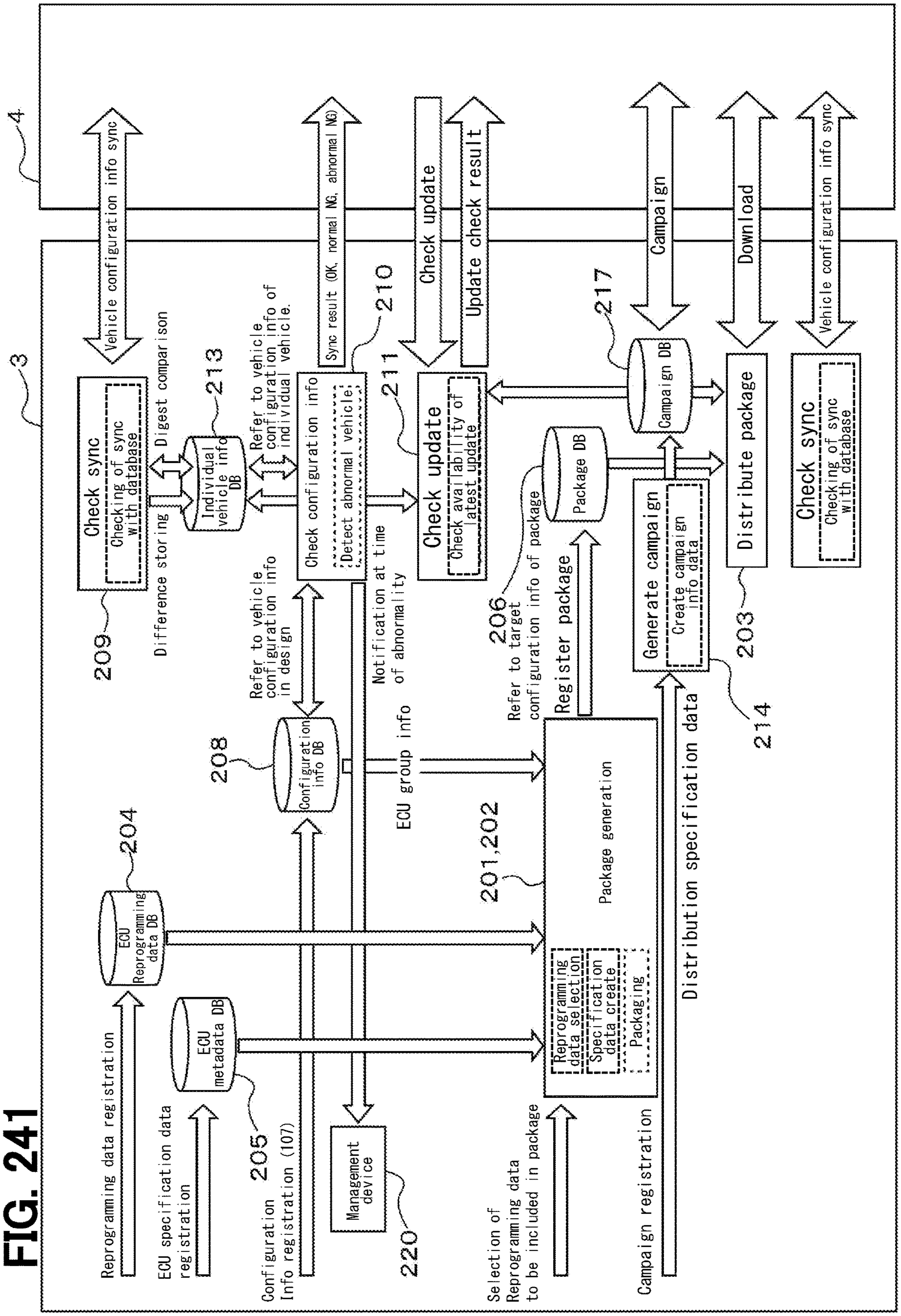
FIG. 241 is an image diagram illustrating a flow of a process in the center device.

FIG. 240 is a block diagram mainly illustrating portions related to functions of the servers 8 to 10 in the center device 3. FIG. 241 illustrates an outline of processes performed by the center device 3 with respect to program update in the ECU. In the following description, a "database" will be referred to as a "DB" in some cases. As illustrated in FIG. 240, the center device 3 includes a package management unit 3A, a configuration information management unit 3B, an individual vehicle information management unit 3C, and a campaign management unit 3D. The package management unit 3A includes a specification data generation unit 201, a package generation unit 202, a package distribution unit 203, an ECU reprogramming data DB 204, an ECU metadata DB 205, and a package DB 206. The configuration information management unit 3B includes a configuration information registration unit 207 and a configuration information DB 208.

The supplier registers ECU individual data by using an input unit 218 and a display unit 219 that are user interface (UI) functions of the management server 10. The ECU individual data includes a program file such as a new program or difference data, verification data or a size of the program file, program file related information such as encryption methods, and ECU attribute information such as a memory configuration of the ECU 19. The program file is stored in the ECU reprogramming data DB 204. The ECU attribute information is stored in the ECU metadata DB 205. The program file related information may be stored in the ECU reprogramming data DB 204 or may be stored in the ECU metadata DB 205. The ECU reprogramming data DB 204 is an example of an update data storage unit. The ECU metadata DB 205 is an example of a device related information storage unit.

The OEM registers approved configuration information in the configuration information DB 208 for each vehicle type via the configuration information registration unit 207. The approved configuration information is configuration information of a vehicle approved by a public organization. The configuration information is identification information regarding hardware and software of the ECU 19 mounted on a vehicle, and is an example of vehicle related information. The configuration information includes identification information of a system configuration formed of a plurality of ECUs 19 and identification information of a vehicle configuration formed of a plurality of systems. As the configuration information, vehicle restriction information related to program update may be registered. For example, group information of the ECU described in the rewrite specification data, a bus load table, and information regarding a battery load may be registered. The ECU metadata DB 205 is an example of a device related information storage unit. The configuration information DB 208 is an example of a vehicle information storage unit.

The specification data generation unit 201 refers to each DB and generates rewrite specification data. The package generation unit 202 generates a distribution package including rewrite specification data and reprogramming data, and registers the distribution package in the package DB 206. The package generation unit 202 may generate a distribution package including the distribution specification data. The package distribution unit 203 distributes the registered distribution package to the vehicle-side system 4. The distribution package corresponds to a file.

The individual vehicle information management unit 3C includes an individual vehicle information registration unit 209, a configuration information check unit 210, an update availability check unit 211, an SMS transmission control unit 212, and an individual vehicle information DB 213. The individual vehicle information registration unit 209 registers individual vehicle information uploaded from individual vehicles in the individual vehicle information DB 213. The individual vehicle information registration unit 209 may register, as initial values, individual vehicle information at the time of vehicle production or sales in the individual vehicle information DB 213. When the uploaded individual vehicle information is registered, the configuration information check unit 210 collates the individual vehicle information with the configuration information of the same type vehicle registered in the configuration information DB 208. The update availability check unit 211 checks the availability of update using a new program, that is, the availability of a campaign with respect to the individual vehicle information. In a case where the individual vehicle information is updated, the SMS transmission control unit 212 transmits a message related to the update to a corresponding vehicle by a short message service (SMS).

The campaign management unit 3D includes a campaign generation unit 214, a campaign distribution unit 215, an instruction notification unit 216, and a campaign DB 217. The OEM causes the campaign generation unit 214 to generate campaign information that is information related to the program update, and registers the campaign information in the campaign DB 217. The campaign information here corresponds to the "distribution specification data" described above, and is mainly information regarding an update content displayed on the vehicle-side system 4. The campaign distribution unit 215 distributes the campaign information to the vehicle. The instruction notification unit 216 notifies the vehicle of a necessary instruction related to the program update. In the vehicle-side system 4, for example, the user determines whether or not to download the update program on the basis of the campaign information transmitted from the center device 3, and downloads the update program if necessary. The portions of each of the management units 3A to 3D except the databases are functions realized by computer hardware and software. The vehicle communication unit 222 is a functional block for performing data communication between the center device 3 and the vehicle-side system 4 in a wireless manner.

Figure 242:
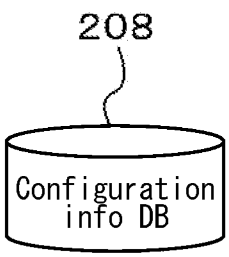
FIG. 242 is a diagram illustrating an example of vehicle configuration information registered in a configuration information DB.

Hereinafter, the above process will be described in more detail, and, first, a content of data registered in each database will be described. As illustrated in FIG. 242, as an example, the following data is registered in the configuration information DB 208. A "vehicle type" indicates the type of a vehicle. A "Vehicle SW ID" is a software ID for the entire vehicle, and corresponds to a vehicle software ID. Only one "Vehicle SW ID" is granted to each vehicle, and is updated as versions of application programs of any one or more of the ECUs are updated. A "Sys ID" is an ID of a system when a group of a plurality of ECUs 19 mounted on each vehicle is referred to as a "system".

For example, in FIG. 234, a group of body system ECUs 19 is a body system, and a group of traveling system ECUs 19 is a traveling system. The "Sys ID" is updated as versions of application programs of any one or more ECUs forming a system are updated. An "ECU ID" is an ID for identifying a device, indicating the type of ECU. An "ECU SW ID" is a software ID for each ECU and corresponds to an ECU software ID. For the sake of convenience, the "ECU ID" is illustrated to be added with a version of software. The "ECU SW ID" is updated as a version of an application program of a corresponding ECU is updated. Even if the same program version is used in the same "ECU ID", different "ECU SW IDs" are used when hardware configurations are different from each other. That is, the "ECU SW ID" is also information indicating a product number of the ECU.

FIG. 242 illustrates configuration information regarding a vehicle of "vehicle type"="aaa". Among the ECUs 19 mounted on a vehicle, an autonomous driving ECU (ADS), an engine ECU (ENG), a brake ECU (BRK), and an electric power steering ECU (EPS) are exemplified. For example, "ECU SW IDs" of "Vehicle SW ID"="0001" are "ads_001", "eng_010", "brk_001", and "eps_010", whereas "ECU SW IDs" of "Vehicle SW ID"="0002" is "ads_002", "eng_010", "brk_005", and "eps_011", and three software versions are updated. As a result, "Sys ID"="SA01" is updated to "SA02", and "Sys ID"="SA02" is updated to "SA03". As mentioned above, the initial value is registered in the configuration information DB 208 at the time of production or sales of the vehicle, and is then is updated as versions of application programs of any one or more ECUs is updated. That is, the configuration information DB 208 indicates approved configuration information that is present in the market for each vehicle type.

As illustrated in FIG. 243, as an example, the following programs and data are registered in the ECU reprogramming data DB 204. In FIG. 243, among the ECUs 19 to be mounted on a certain vehicle type, as ECUs 19 in which application programs are updated, an autonomous driving ECU (ADS), a brake ECU (BRK), and an electric power steering ECU (EPS) are exemplified. With respect to the latest "ECU SW ID" of the update target ECU 19, old program and new program files of the ECU, the integrity verification data of the new program, an update data file that is difference data between the new program and the old program, integrity verification data of the update data, a rollback data file that is the difference data, and integrity verification data of the rollback data are registered. The integrity verification data is a hash value obtained by applying a hash function to a data value. When the entire data of the new program is used as the update data instead of the difference data, the integrity verification data of the update data is same as the entire data of the new program.

Although a data structure of the latest "ECU SW ID" is illustrated in FIG. 243, in a case where data of the old "ECU SW ID" is stored, a new program file with the previous "ECU SW ID" may be referred to with respect to the old program file. Each piece of the integrity verification data may have a format in which a value calculated by the supplier is registered, or may have a format in which a value calculated by the center device 3 is registered.

Figure 244:
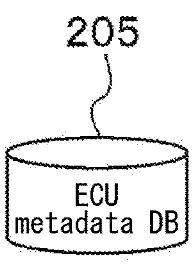
FIG. 244 is a diagram illustrating an example of specification data registered in an ECU metadata DB.

As illustrated in FIG. 244, the following ECU individual specification data is registered in the ECU metadata DB 205. For the latest "ECU SW ID", a size of an update data file, a size of a rollback data file, bank information indicating a bank related to a program among a bank-A, a bank-B, a bank-C, and the like in a case where the flash memory 28*d* included in the ECU 19 has two or more banks, a transfer size, a read address of a program file, and the like are registered. These are examples of update data related information.

Attribute information indicating an attribute of the ECU 19 is also registered in the ECU metadata DB 205. The attribute information is information indicating a hardware attribute and a software attribute regarding the ECU. The "transfer size" is a transfer size when rewrite data is divided and transferred from the CGW 13 to the ECU 19, and the "key" is a key used when the CGW 13 securely accesses the ECU 19. These are examples of software attribute information. The "vehicle type" and "ECU ID" also include a memory configuration of the flash memory 28*d* of the ECU 19, the type of bus to which the ECU 19 is connected, the type of power supply connected to the ECU 19, and the like. These are examples of hardware attribute information.

Here, as the memory configuration, a "single-bank" is a single-bank memory having a single flash bank, a "double-bank" is a double-bank memory having double flash banks, and "suspend" is a single-bank suspend memory having a pseudo-double flash banks. The hardware attribute information and the software attribute information are information used for rewrite control of each ECU 19 in the vehicle-side system 4. Although the hardware attribute information may be stored in advance in the CGW 13, in the present embodiment, the hardware attribute information is managed by the center device 3 in order to reduce the management load on the vehicle-side system 4. The software attribute information is data that directly designates a rewrite operation of each ECU 19. The software attribute information is managed by the center device 3 such that flexible control in the vehicle-side system 4 can be realized.

Figure 245:
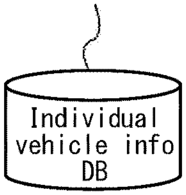
FIG. 245 is a diagram illustrating an example of vehicle configuration information registered in an individual vehicle information DB.

As illustrated in FIG. 245, the following data for each individual vehicle is registered in the individual vehicle information DB 213. Generally, configuration information for each individual vehicle or status information of an individual vehicle with respect to program update is registered. Specifically, for "VIN" that is an ID of each vehicle, the "Vehicle SW ID", the "Sys ID", the "ECU ID", the "ECU SW ID" and the like that are configuration information are registered. A "Digest" value that is a hash value for the configuration information is also calculated and stored in the center device 3. An "active bank" is a bank where a program currently operated by the ECU 19 is written in a case where a memory configuration is a double-bank, and an uploaded value is registered along with the configuration information.

An "access log" is the date and time when the vehicle uploaded the individual vehicle information to the center device 3. A "reprogramming status" indicates a status of reprogramming in the vehicle, and includes, for example, "campaign issued", "activation completed", and "download completed". That is, it can be seen from this progress status to which phase the reprogramming in the vehicle advances and in which phase the reprogramming is delayed. When the configuration information or the like is uploaded from the vehicle-side system 4 to the center device 3, the "VIN" of each vehicle is added to the information or the like.

Figure 246:
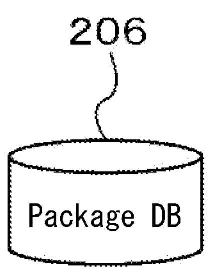
FIG. 246 is a diagram illustrating an example of distribution package data registered in a package DB, FIG. 247 a diagram illustrating an example of campaign data registered in a campaign DB.
Figure 247:
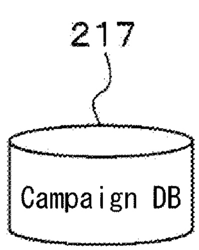

As illustrated in FIG. 246, an ID of a distribution package, a distribution package file, and data for verifying the integrity of the distribution package, are registered in the package DB 206. As illustrated in FIG. 247, the following data is registered in the campaign DB 217. The data is an ID of campaign information, a distribution package ID, message information such as text statements indicating a specific update content as a campaign content, a list of "VINs" which are IDs of campaign target vehicles, a list of "Vehicle SW IDs" before and after the update, a list of "ECU SW IDs" before and after the update, and the like. A "target VIN" list may be registered by collating the individual vehicle information DB 213 with the campaign DB 217. The campaign information may also be registered in the package DB 206.

Figure 248:
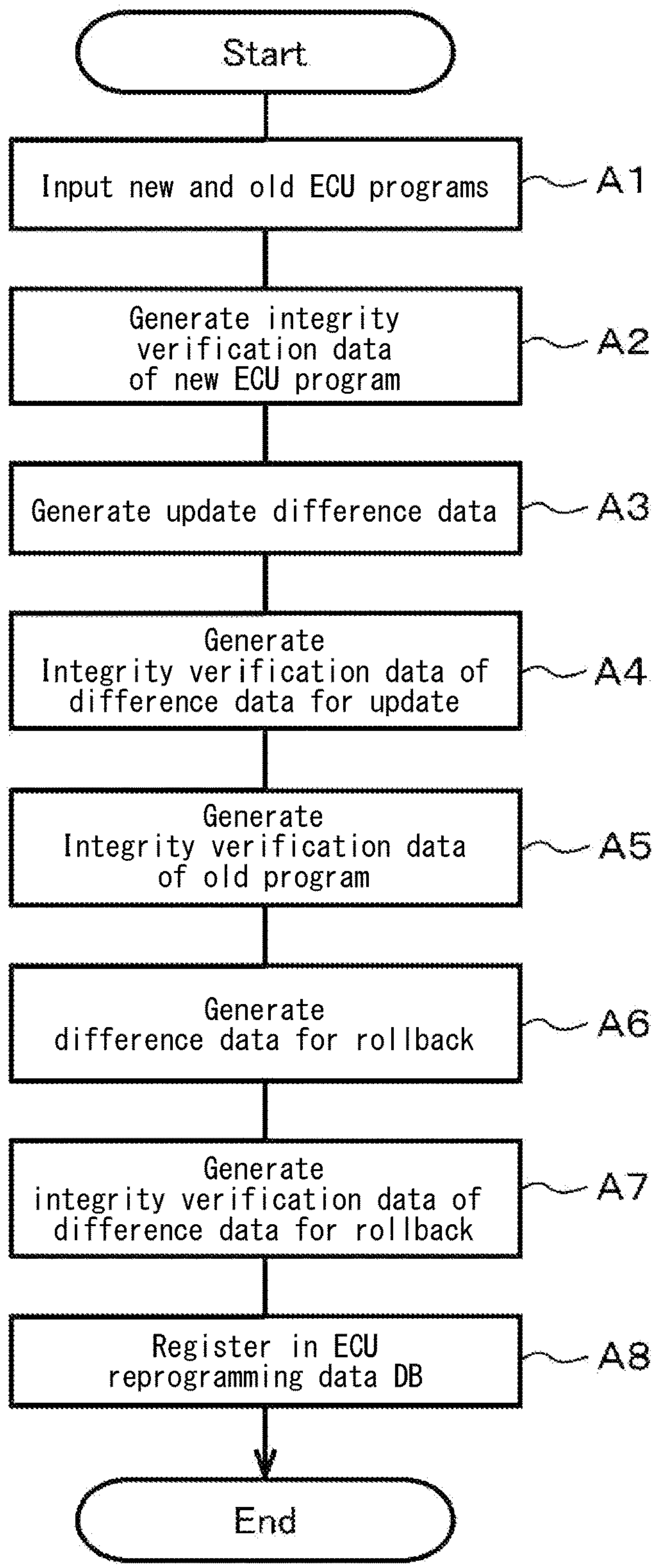
FIG. 248 is a flowchart illustrating a process of generating a program or data registered in the ECU reprogramming data DB.

Next, an operation of the present embodiment will be described. In FIG. 248, a description will be made of a process of registering data in the ECU reprogramming data DB 204 of the package management unit 3A. As illustrated in FIG. 248, the display unit 219 and the input unit 218 start a screen of registering the reprogramming data of the management server 10, and receive input of new and old program files of the ECU 19 from an operator of the supplier (A1). For example, a UI or the like may be used to register a file in which configuration information is written in a CSV format or the like as a file. Subsequently, the package management unit 3A generates integrity verification data of the new program (A2), and generates a difference data file as update difference data for update to the new program on the basis of the old program, and integrity verification data of the update difference data (A3 and A4).

Next, a difference data file as rollback difference data for update to the old program on the basis of the new program and integrity verification data of the data are generated (A5 and A6). The program files and the verification data are registered in the ECU reprogramming data DB 204, and a new "ECU SW ID" is generated and registered on the basis of the previous "ECU SW ID" (A7). Here, when the entire data is distributed instead of the difference, the step related to the difference data may be omitted.

The integrity verification data is a hash value generated, for example, by applying a hash function. For example, in a case where Secure Hash Algorithm 256-bit (SHA-256) is used as the hash function, data values are separated into message blocks every 64 bytes. Then, when data values of the first message block are applied to an initial hash value and thus a hash value with 32-byte length is obtained, a hash value with 32-byte length is sequentially and repeatedly obtained by applying data values of the next message block to the hash value.

Figure 249:
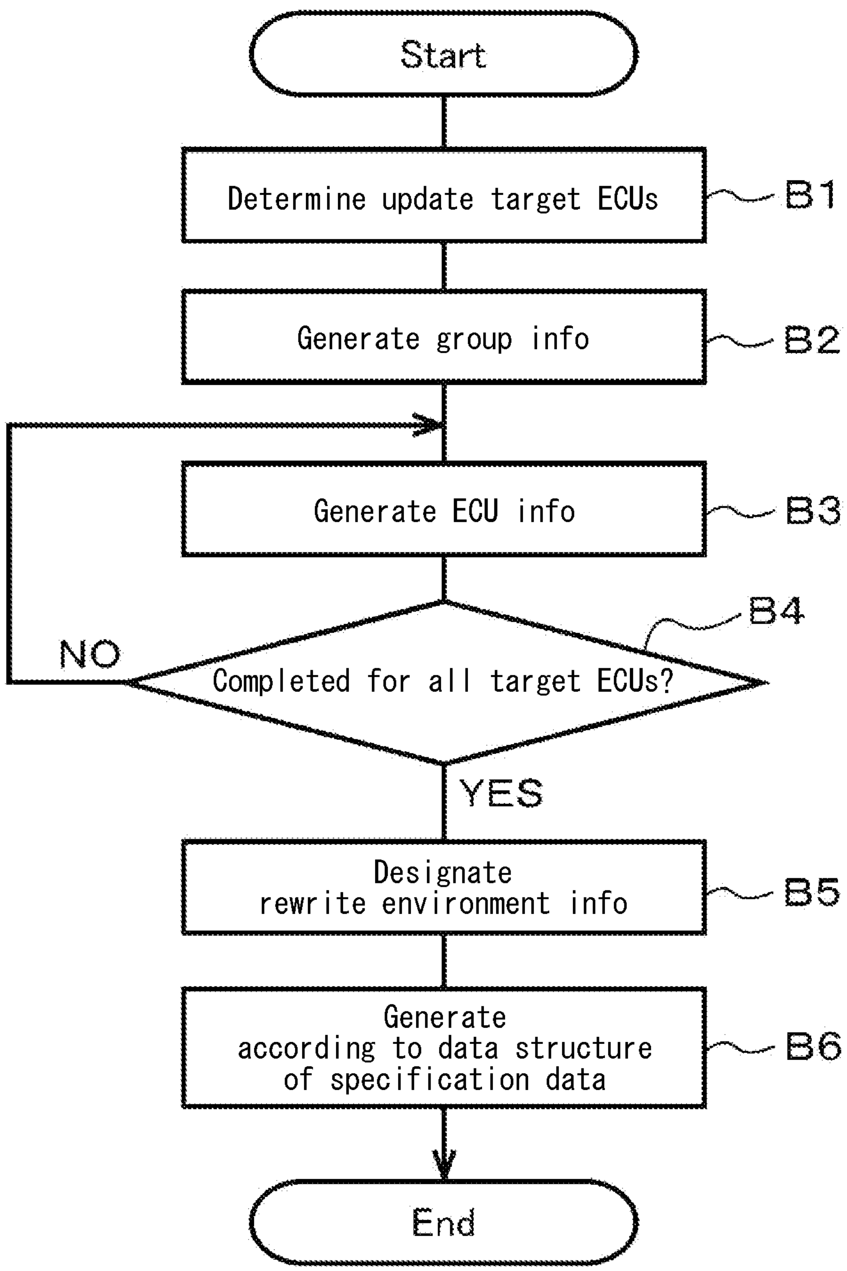
FIG. 249 is a flowchart illustrating a process of generating an example of specification data registered in the ECU metadata DB.

In FIG. 249, a description will be made of a rewrite specification data generation process in the specification data generation unit 201. Here, the rewrite specification data generation process of for the vehicle of "vehicle type"="aaa" will be described, but the same applies to other vehicles.

The center device 3 starts a specification data generation program of the specification data generation unit 201, and receives input from an operator of the OEM via the display unit 219 and the input unit 218. First, the specification data generation unit 201 determines the update target ECU 19. As illustrated in FIG. 249, the specification data generation unit 201 accesses the ECU reprogramming data DB 204 and outputs a display screen on which an update target can be selected from among the registered "ECU SW IDs" to the display unit 219. The specification data generation unit 201 stores one or more "ECU SW IDs" selected by the operator of the OEM via the input unit 218 in a specific ECU order (B1). Here, the ECU order indicates a rewrite order of the ECUs 19 in the vehicle-side system 4. The specification data generation unit 201 sets the order designated by the operator of the OEM as the specific ECU order.

The specification data generation unit 201 may access the configuration information DB 208 to determine the update target ECU 19 without receiving input from the operator of the OEM. The specification data generation unit 201 refers to an "ECU SW ID" for the latest "Vehicle SW ID" and an "ECU SW ID" for the previous "Vehicle SW ID", and extracts the ECU 19 subjected to update. For example, in FIG. 242, the "ADS", the "BRK", and the "EPS" are the update target ECUs 19. The specification data generation unit 201 sets the order of the ECUs registered in the configuration information DB 208 as the specific ECU order.

The specification data generation unit 201 generates group information for ECUs having a plurality of update target "ECU SW IDs" (B2). Here, with reference to the configuration information DB 208, by using the "Sys ID", for example, a group 1 includes "ECU IDs" in which the "Sys ID" is "SA01_02", and a group 2 includes "ECU IDs" in which the "Sys ID" is "SA02_02". For example, in FIG. 242, the group 1 is set to the "ADS", the group 2 is set to the "BRK" first, and the group 2 is set to the "EPS" second. As described above, the specification data generation unit 201 determines an update target ECU, a group to which the ECU belongs, and an ECU order in the group.

Next, the specification data generation unit 201 accesses the ECU metadata DB 205, and acquires the update data related information, the hardware attribute information, and the software attribute information as the specification data regarding the update target ECU 19 (B3). For example, as illustrated in FIG. 250, the update data related information includes an "update program version", an "update program acquisition address", an "update program size", a "rollback program version", a "rollback program acquisition address", a "rollback program size", a "write data type", and a "write bank". The hardware attribute information includes a "connection bus", a "connection power supply", and a "memory type". The software attribute information includes "rewrite bank information", "security access key information", a "rewrite method", and a "transfer size". The "rewrite method" is data indicating whether rewriting is performed by enabling the self-retention power circuit when switching occurs from IG-on to IG-off (self-retention power), or the rewriting is performed according to IG-on and IG-off (power supply control). Information other than a key may be included as the "security access key information".

Hereinafter, each piece of information will be described.

The "Write data type" is a type indicating whether a program is difference data or the entire data. The write data type for an update program and the write data type for a rollback program may be described separately.

The "write bank" is information indicating a bank in which a program is written for the double-bank memory ECU 19.

The "connection bus" is information for identifying a bus to which the ECU 19 is connected.

The "connection power supply" is information indicating a state of a power supply to which the ECU 19 is connected, in which a value indicating any of the battery power (+B power), the accessory power (ACC power), and the ignition power (IG power) is described.

The "memory type" is information for identifying a memory configuration of the ECU 19, in which values indicating a double-bank memory, a single-bank suspend memory (pseudo-double-bank memory), a single-bank memory, and the like are described.

The "rewrite bank information" is information indicating which bank of the ECU 19 is a start bank (active bank) and which bank is a rewrite bank (inactive bank).

The "security access key information" is information for authenticating access to the ECU 19 by using a key, and includes information such as a key derivation key, a key pattern, and a decryption operation pattern.

The "transfer size" is a data size when a program is divided and transferred to the ECU 19.

For example, as illustrated in FIG. 250, the "ECU ID" is used as a key to store these pieces of information in the specific ECU order described above. When information regarding all the ECUs is acquired (B4; YES), the specification data generation unit 201 designates "rewrite environment information" for an update target vehicle (B5). The "rewrite environment information" is information used for rewrite control in the vehicle-side system 4 for the group of ECUs or the entire vehicle, and is data directly designating a rewrite operation. For example, the rewrite environment information for the entire vehicle includes a "vehicle condition" indicating whether program update in the vehicle-side system 4 is performed while the vehicle is traveling (while the IG switch is turned on) or while the vehicle is parked (while the IG switch is turned off), a "battery load (a remaining battery charge)" indicating a restriction on the remaining battery charge capable of executing the program update in the vehicle-side system 4, bus load table information indicating a restriction on a bus load capable of transferring write data in the vehicle-side system 4, and the like.

The rewrite environment information for the group includes the ECUs 19 belonging to the group, the order of ECUs in the group, and the like. In the vehicle-side system 4, program update is controlled to be synchronized in the group unit, and writing into the ECU 19 is executed in the designated ECU order. The specification data generation unit 201 starts a screen for registering rewrite environment information, and receives input from the operator of the OEM. Alternatively, Excel (registered trademark) in which rewrite environment information is input may be imported. Alternatively, the restriction information registered in the configuration information DB 208 may be extracted. The specification data generation unit 201 uses the generation result in the above step B2 as the rewrite environment information for the group.

Figures 251, 252:
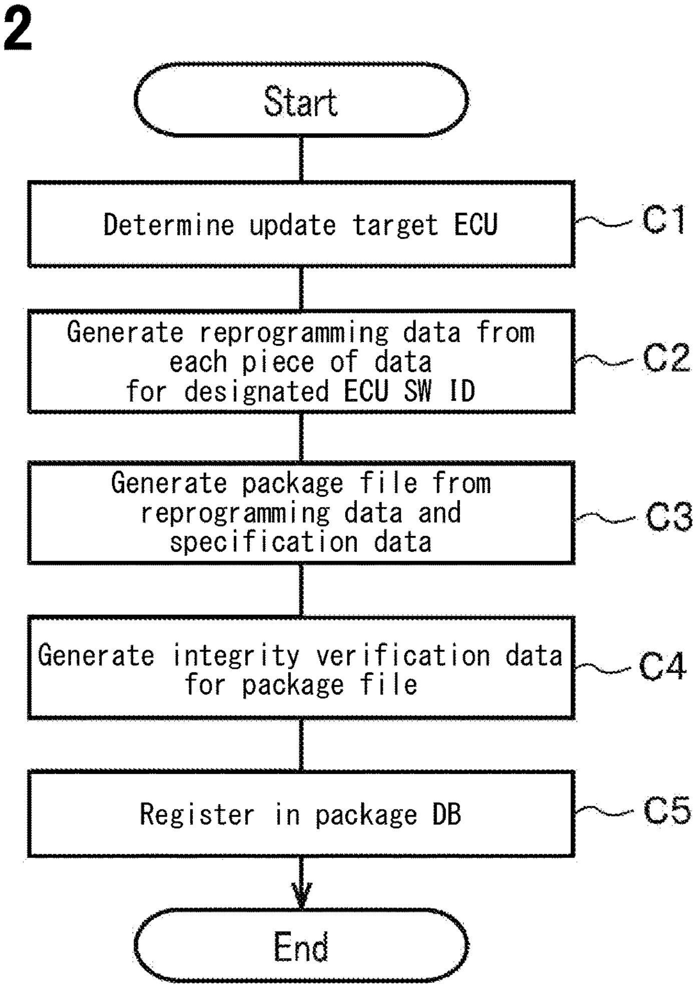
FIG. 251 is a diagram illustrating an example of a bus load table.
FIG. 252 is a flowchart illustrating a process of generating a distribution package registered in the package DB.

The bus load table is a table illustrating a correspondence relationship between a power supply state and an allowable transmission amount for a bus. As illustrated in FIG. 251, the allowable transmission amount is a sum of a transmission amount of vehicle control data and write data that can be transmitted with respect to the maximum allowable transmission amount. In this example, since an allowable transmission amount is "80%" with respect to the maximum allowable transmission amount for the first bus, in the IG power supply state, the CGW 13 allows "50%" with respect to the maximum allowable transmission amount as an allowable transmission amount of vehicle control data and "30%" with respect to the maximum allowable transmission amount as an allowable transmission amount of write data. In the ACC power supply state, the CGW 13 allows "30%" with respect to the maximum allowable transmission amount as an allowable transmission amount of the vehicle control data and "50%" with respect to the maximum allowable transmission amount as an allowable transmission amount of the write data. In the +B power supply state, the CGW 13 allows "20%" with respect to the maximum allowable transmission amount as an allowable transmission amount of the vehicle control data, and allows "60%" with respect to the maximum allowable transmission amount as an allowable transmission amount of the write data. The same applies to the second bus and the third bus.

Finally, the specification data generation unit 201 locates each piece of the generated or acquired data in accordance with a predetermined data structure, and thus generates rewrite specification data as illustrated in FIG. 250 (B6). That is, the specification data generation unit 201 generates the rewrite specification data in a data structure that can be analyzed by the vehicle-side system 4. Each piece of ECU information may be described in the rewrite specification data in the order of younger group and in accordance with the order of ECUs in the group. For example, in FIG. 242, in a case where the group 1 is set to the "ADS" and the group 2 is set to the "BRK" first and is set to the "EPS" second, ECU information of the "ADS" is arranged first, ECU information of the "BRK" is arranged next, and ECU information of the "EPS" is arranged last in the ECU information field of the specification data.

In the specification data illustrated in FIG. 250, the "ECU ID" to the "transfer size" of the ECU information are examples of the target unit related information including the type of target ECU 19, and correspond to the above-described hardware attribute information and software attribute information. The "update program version" to the "write bank" are examples of update data related information. The "rewrite environment" for the group of ECUs or the entire vehicle is an example of update process information for designating an update process in a vehicle.

In FIG. 252, the package generation process in the package generation unit 202 will be described. As described above, here, a description will be made of the package generation process for the vehicle of "vehicle type"="aaa". As illustrated in FIG. 252, the center device 3 starts the package generation unit 202 of the package management unit 3A with an instruction from the operator as a trigger. The package generation unit 202 determines an update target "ECU SW ID" in the same manner as in step B1 (C1). The package generation unit 202 acquires each piece of data corresponding to the update target "ECU SW ID" from the ECU reprogramming data DB 204 and generates one piece of reprogramming data (C2). For example, in FIG. 243, the package generation unit 201 acquires the integrity verification data of the new program, the update data that is difference data, the integrity verification data of the update data, the integrity verification data of the old program, the rollback data that is difference data, and the integrity verification data of the rollback data, and generates the reprogramming data. The generated reprogramming data and the corresponding rewrite specification data described in steps B1 to B6 are integrated to generate a single distribution package file (C3). Next, integrity verification data for the generated package file is generated (C4), and the integrity verification data is registered in the package DB 206 along with the package file (C5).

Figure 253:
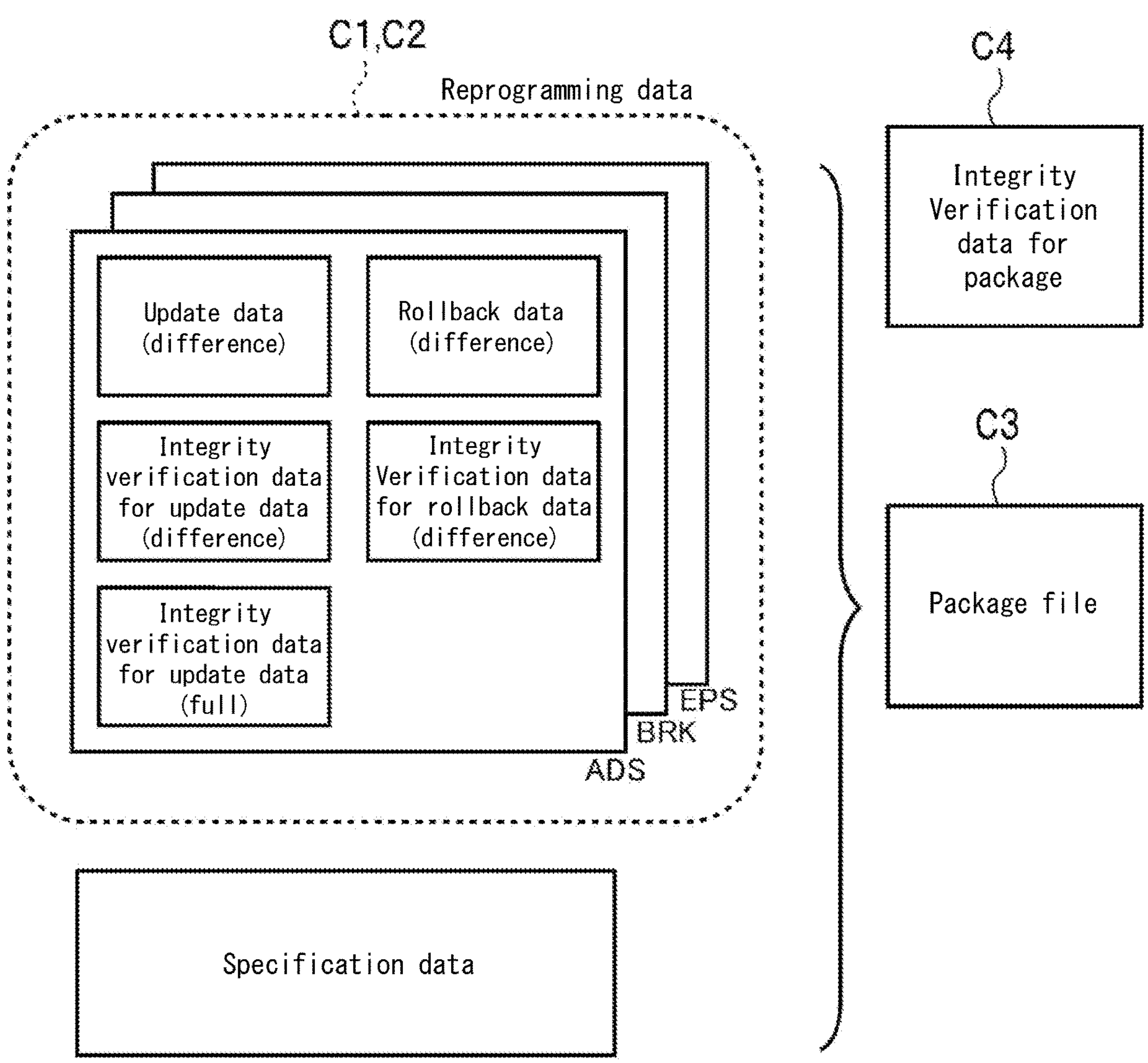
FIG. 253 is an image diagram illustrating a content of a package file.

FIG. 253 is an image diagram illustrating contents of the package file generated as described above. The image illustrates a case where update data or integrity verification data corresponding to the "ADS", the "BRK", and the "EPS" that are update targets are integrated into one piece of reprogramming data according to the ECU order, and a single distribution package file is generated by integrating the reprogramming data with rewrite specification data. Here, the rollback data may be included in the reprogramming data only in a case where a memory configuration of the update target ECU 19 is the single-bank. When the memory configuration is the double-bank or the suspend, the rollback data that is an old program may be omitted because rewriting is not performed on an active bank.

As described above, according to the present embodiment, data of an update program of the application program update target ECU 19 among a plurality of ECUs 19 mounted on the vehicle is stored in the ECU reprogramming data DB 204 of the center device 3. The vehicle related information such as an "ECU ID" for each of a plurality of the ECUs 19 mounted on the vehicle and an "ECU SW ID" of an application program stored in the ECU 19 is stored in the configuration information DB 208 along with the type of vehicle. The attribute of the rewrite target ECU 19 and the update data related information related to update data are stored in the ECU metadata DB 205.

The specification data generation unit 201 generates the specification data to be transmitted to the vehicle along with the update data to be written to the target ECU 19, the specification data including the type, the attribute, the update data related information, and the information indicating the rewrite environment related to the data update for the target ECU 19 on the basis of the information stored in the configuration information DB 208 and the ECU metadata DB 205. The package generation unit 202 generates the distribution package including the specification data and the reprogramming data, and registers the distribution package in the package DB 206. The package distribution unit 203 distributes the registered distribution package to the vehicle-side system 4. Thus, the vehicle-side system 4 receives the specification data transmitted along with the update data, and can thus appropriately select the target ECU 19 on the basis of the specification data, and appropriately control a write process by using the update data.

Since the specification data generation unit 201 generates specification data for a plurality of ECUs 19 as one file, and the package generation unit 202 further packages the file into one file along with the reprogramming data for the plurality of ECUs 19, the vehicle-side system 4 can write the update data into the plurality of ECUs 19 when a single distribution package is received.

Since the vehicle related information as the specification data includes group information in which some of a plurality of ECUs 19 are grouped, the vehicle-side system 4 can select a target ECU 19 according to an order defined by the group information, and can write update data. For example, when there are a plurality of ECUs 19 that are improvement targets of a certain function, by setting the group 1 as the body system ECU 19, the group 2 as the traveling system ECU 19, and the group 3 as the MM system ECU 19, program update in the vehicle-side system 4 can be divisionally executed three times. Therefore, the waiting time of a user for each update time can be shortened compared with a case where the program update is executed collectively in all the ECUs.

Since the rewrite environment information includes the "vehicle condition (IG ON state)" and the "battery load" related to the vehicle and the "bus load table" related to the ECU 19, the vehicle-side system 4 can determine a timing or the like for writing update data on the basis of the information. That is, a service provider using the OEM or the center device 3 can operate flexible program update by designating execution restriction conditions for the vehicle as the rewrite environment information.

Since the specification data generation unit 201 generates specification data in accordance with predetermined data structures in order by using information related to the ECU 19 having the earlier rewrite order set in advance, the vehicle-side system 4 can write update data in accordance with the location order of ECU IDs in the specification data. That is, since the ECUs 19 having mutually cooperative process are grouped into one group and an ECU order is defined by considering a content of the mutually cooperative process, even in a case where an update timing to the new program is not completely synchronized in the vehicle-side system 4, the program update can be completed without inconvenience. For example, in a case where a new program of the ECU (ID1) has a process of transmitting a predetermined message to the ECU (ID2), and a new program of the ECU (ID2) has a process of generating a timeout error when the predetermined message transmitted from the ECU (ID1) cannot be received, it is preferable to define an ECU order such that the ECU (ID1) is subjected to update first and the ECU (ID2) is subjected to update later.

Second Embodiment

Figure 254:
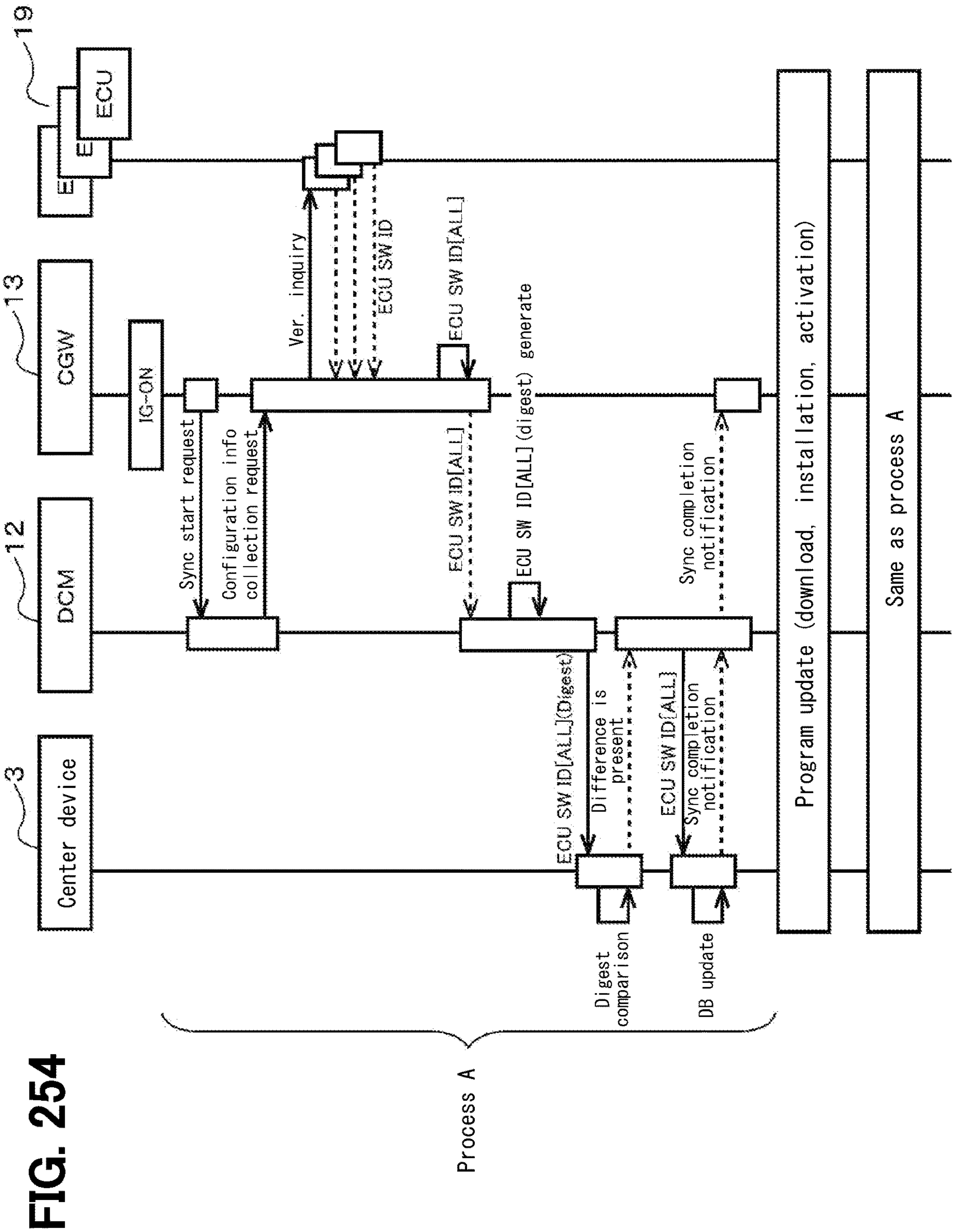
FIG. 254 is a sequence diagram illustrating processing procedures executed between a center device and a vehicle-side system in a second embodiment.

As illustrated in FIG. 254, the second embodiment relates to "vehicle configuration information synchronization" that is initially transmitted from the vehicle-side system 4 to the center device 3 in FIG. 241. When, on the vehicle side, the IG switch 37 is turned on, the CGW 13 transmits a "synchronization initiation request" to the DCM 12 with the turning-on as a trigger. The DCM 12 receives the synchronization initiation request, and returns a "configuration information collection request" to the CGW 13. The CGW 13 inquires each ECU 19 for a program version. Each ECU 19 returns an "ECU SW ID" to the CGW 13. The ECU 19 of which a memory configuration is the double-bank or the suspend also returns bank information indicating which of a plurality of banks is an active bank and which is an inactive bank to the CGW 13. Each ECU 19 may also transmit calibration information of a control target actuator or the like, license information for receiving a program update service, and a trouble code occurring in the ECU 19 to the CGW 13.

When reception of the "ECU SW ID" from each ECU 19 is completed, the CGW 13 transmits all the pieces of information to the DCM 12 along with the "VIN". In this case, the "Vehicle SW ID" and the "Sys ID" managed by the CGW 13 may also be transmitted to the DCM 12. The DCM 12 receives the information, and generates a single hash value that is a digest value for all of the "ECU SW IDs" by using, for example, a hash function. As described above, in a case where SHA-256 is used as the hash function, data values obtained by serially connecting values of all of the "ECU SW IDs" to each other are divided into message blocks every 64 bytes, the data values of the first message block is applied to an initial hash value to obtain a hash value with 32-byte length, and the data values of the succeeding message block is sequentially applied to the hash value, and, finally, a hash value of 32-byte length is obtained. Here, the DCM 12 may generate a single hash value not only for all of the "ECU SW IDs" but also for values including the "Vehicle SW ID", the "Sys ID", the bank information, and the calibration information.

The DCM 12 transmits the digest value of the "ECU SW ID" obtained as described above to the center device 3 along with the "VIN". The DCM 12 may transmit the trouble code or the license information along with the digest value. Hereinafter, the digest value may be referred to as a "configuration information digest", and all data values of the "ECU SW IDs" that are a basis thereof may be referred to as "configuration information all". The "configuration information all" may include the "Vehicle SW ID", the "Sys ID", the bank information, and the calibration information.

As will be described later, the center device 3 compares digest values or updates the individual vehicle information DB 213. The center device 3 synchronized with the configuration information checks availability of program update, and notifies the vehicle-side system 4 of the campaign information in a case where the program update is available. Thereafter, the vehicle-side system 4 downloads a distribution package, installs the distribution package in the target ECU 19, and activates a new program. The CGW 13 transmits a "synchronization initiation request" to the DCM 12 with completion of the update process as a trigger, and then performs the same process as described above until a synchronization completion notification is performed. The above-described process that is performed with turning-on of the IG switch 37 as a trigger may also be performed after the program is updated.

Figure 255:
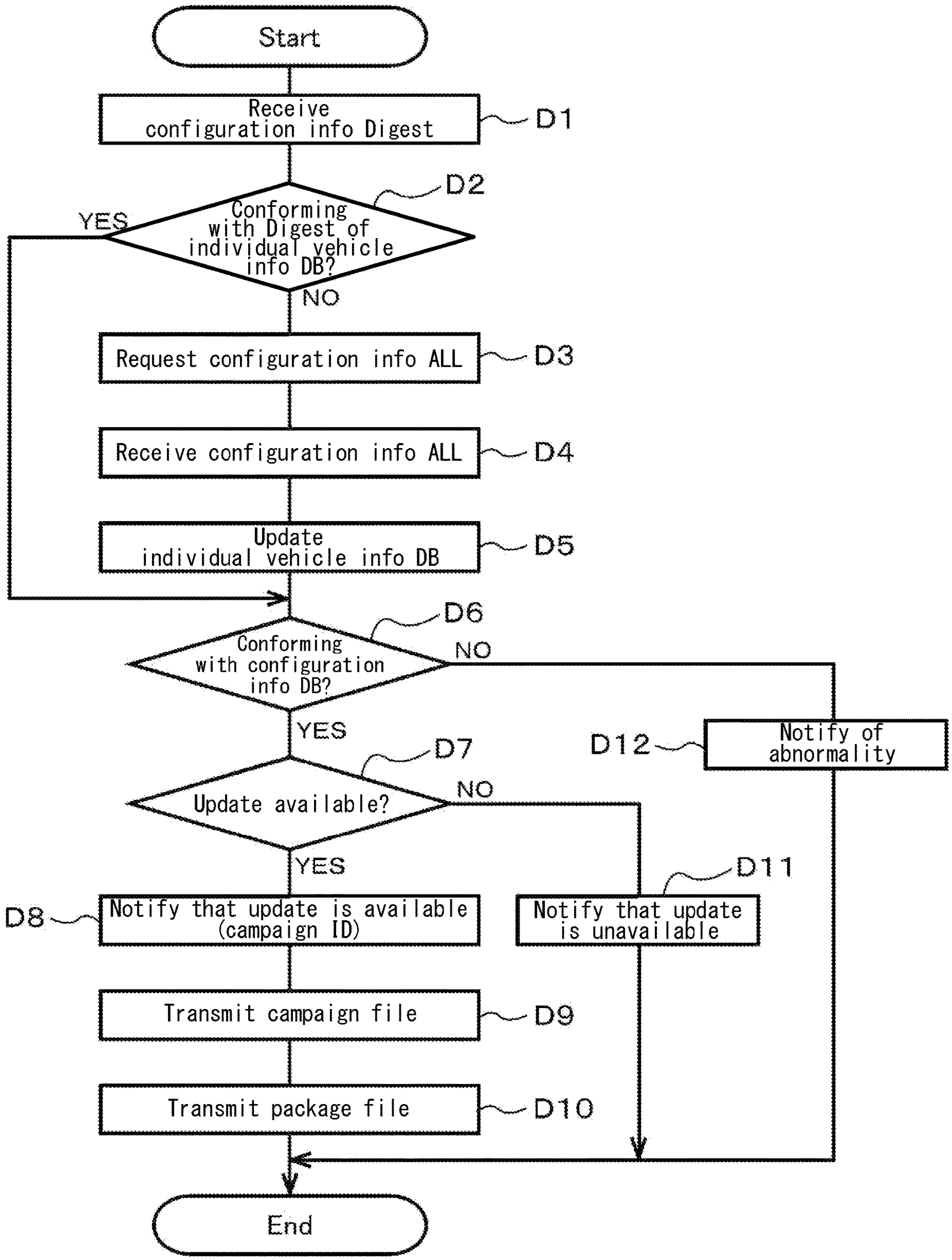
FIG. 255 is a flowchart illustrating a process performed by the center device.
Figure 257:
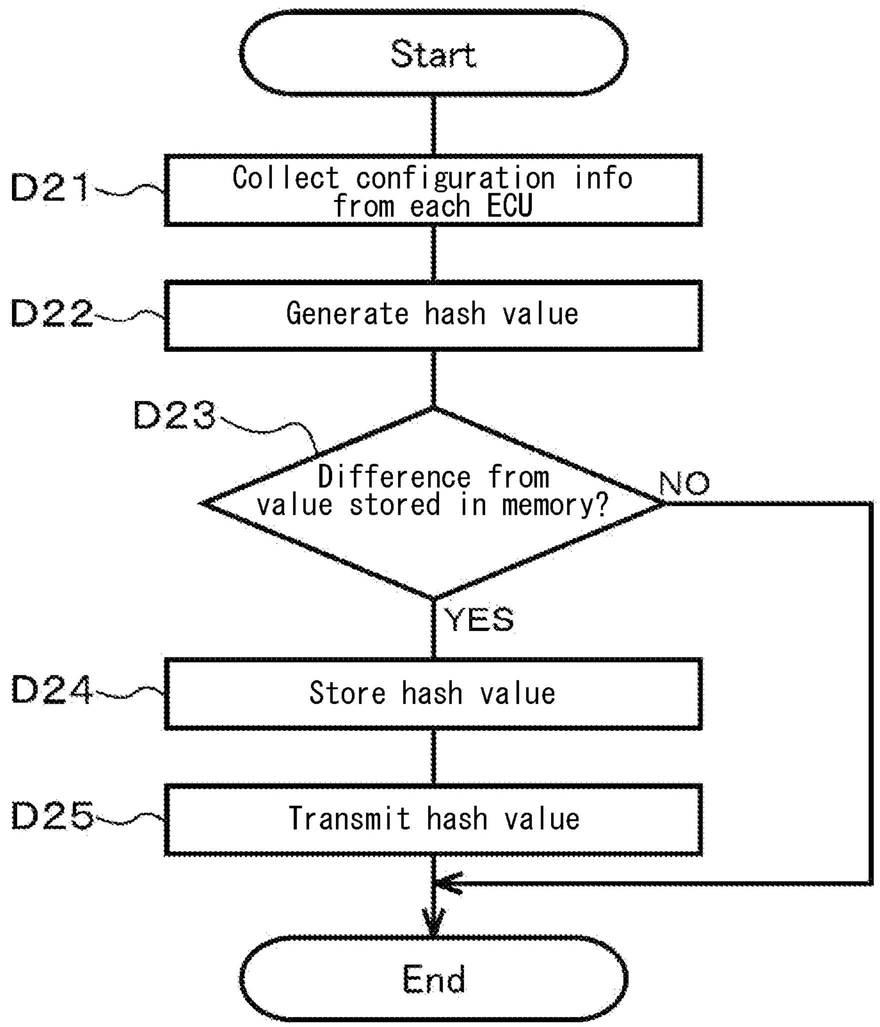
FIG. 257 is a flowchart illustrating a process in a case where a hash value is transmitted from the vehicle-side system to the center device.

As illustrated in FIG. 255, when the "configuration information digest" is received from the vehicle-side system 4 (D1), the individual vehicle information management unit 3C of the center device 3 collates the "configuration information digest" with a "configuration information digest" of a corresponding vehicle registered in the individual vehicle information DB 213 at that time, and determines whether or not both of the digests match each other (D2). As the "individual vehicle information digest", a value calculated in advance may be registered in the individual vehicle information DB 213, or a digest value may be calculated by using the configuration information registered in the individual vehicle information DB 213 at the time of reception from the vehicle-side system 4. When both of the digests match each other (YES), it is determined whether or not the individual vehicle information of the vehicle conforms to an approved combination registered in the configuration information DB 208 (D6). Since there is a probability that the configuration information DB 208 may be updated at a predetermined timing, the determination in step D6 is performed both in a case where both of the digests match each other in step D2 (YES) and in a case where both of the digests do not match each other (NO).

Here, for example, as illustrated in FIG. 256, in order to determine the conformity, it is checked whether or not the combination of the "Vehicle SW ID" and the "ECU SW ID" of the configuration information uploaded from the vehicle-side system 4 is approved. In a list illustrated in the same figure, an "ECU SW ID" of "ECU ID=ADS" corresponding to "Vehicle SW ID=0001" registered in the configuration information DB 208 is "ads_001", an "ECU SW ID" of "ECU ID=BRK" is "brk_001", and an "ECU SW ID" of "ECU ID=EPS" is "eps_010".

In contrast, the vehicle C with VIN=300 is also "Vehicle SW ID=0001", but an "ECU SW ID" of "ECU ID=ADS" is "ads_002" and an "ECU SW ID" of "ECU ID=BRK" is "brk_003". These two ECUs 19 are different from the configuration information registered in the configuration information DB 208. Therefore, in step D6, "NO", that is, it is determined to be disapproved and "NG", and the configuration information check unit 210 notifies the vehicle-side system 4 and the management device 220 illustrated in FIG. 241 that is a device managing information regarding a vehicle produced by the OEM or the like, of an abnormality (D12). The notification of the abnormality is performed by, for example, the SMS transmission control unit 212 by using an SMS. The SMS transmission control unit 212 is an example of a communication unit. Even when the two ECUs 19 are not update target ECUs using new programs, the center device 3 determines that the vehicle is disapproved, and does not perform the processes in step D7 and the subsequent steps.

On the other hand, the vehicle A with VIN=100 has "Vehicle SW ID=0001", the "ECU SW ID" of "ECU ID=ADS" is "ads_001", and the "ECU SW ID" of "ECU_ID=BRK" is "brk_001", all of which match the configuration information registered in the configuration information DB 208. Therefore, in step D6, "YES", that is, it is determined to be approved and "OK", and the process proceeds to step D7. Here, the configuration information check unit 210 may determine whether the combination of "ECU SW IDs" of the vehicle C is present in the configuration information DB 208 to determine whether the vehicle C is approved or disapproved. The "Sys ID" may also be used for determination in addition to the "Vehicle SW ID".

Next, the update availability check unit 211 accesses the campaign DB 217 via the campaign management unit 3D to check availability of update using a new program (D7). The availability of update is determined by comparing the "Vehicle SW ID" uploaded from the vehicle-side system 4 with the "pre-update Vehicle SW ID" of the campaign DB 217. For example, as illustrated in FIG. 23, since the vehicle A with VIN=100 has "Vehicle SW ID=0001" before the update, it is determined that the update is available in the vehicle A (YES). In this case, the update availability check unit 211 notifies the vehicle-side system 4 of the vehicle A of the corresponding campaign ID "Cpn_001" (D8). The campaign information corresponds to update notification information, and the campaign DB 217 is an example of an update notification information storage unit.

When the campaign DB 217 stores "Sys IDs" before and after update, availability of the update can be checked by using the "Sys IDs". Instead of the "Vehicle SW ID", the uploaded "ECU SW ID" list may be compared with the "pre-update ECU SW ID list" of the campaign DB 217 to determine update availability.

The vehicle-side system 4 acquires a campaign file corresponding to the ID from the center device 3 by using the notified campaign ID as a key (D9). The campaign file includes text statements that describe a campaign content, restrictions on execution of program update, and so on. The restrictions are conditions for executing download or installation, and include, for example, a remaining battery charge, a free capacity of the RAM required for downloading a distribution package, and the current position of the vehicle. The vehicle-side system 4 analyzes the campaign file and displays the campaign content by using the in-vehicle display 7. The user refers to a message displayed on the in-vehicle display 7 according to the campaign content, and decides whether or not to update an application program of the ECU 19. When the user's approval operation is received via the in-vehicle display 7, the CGW 13 notifies the center device 3 of the approval for the update via the DCM 12. The center device 3 transmits the distribution package file with the package ID corresponding to the campaign ID and the integrity verification data to the vehicle-side system 4 (D10).

When the update is unavailable in step D7 (NO), the vehicle-side system 4 is notified of "update unavailable" (D11). For example, as illustrated in FIG. 256, since the vehicle A with VIN=200 has "Vehicle SW ID=0002" after update which does not match any of the "pre-update Vehicle SW IDs" of the campaign DB 217, it is determined that the update is unavailable.

On the other hand, when the collation result of the "configuration information digest" shows mismatch (NO) in step D2, the center device 3 requests the vehicle-side system 4 to transmit the "configuration information all" (D3). This transmission corresponds to an "entire data transmission request notification". When the vehicle-side system 4 transmits the "configuration information all" in response to the request, the center device 3 receives the "configuration information all" (D4). The individual vehicle information management unit 3C of the center device 3 updates the information regarding the vehicle registered in the individual vehicle information DB 213 (D4). The process proceeds to step D6. The individual vehicle information DB 213 is an example of a vehicle-side configuration information storage unit. The CGW 13 may transmit the "synchronization initiation request" at a timing at which the IG switch 37 is turned off.

As described above, according to the second embodiment, when configuration information regarding a configuration of each ECU 19 is received from a plurality of ECUs 19, the vehicle-side system 4 generates a hash value on the basis of data values of a plurality of pieces of configuration information, and transmits the hash value to the center device 3. The center device 3 includes the individual vehicle information DB 213, and compares the hash value transmitted from the vehicle-side system 4 with a hash value of the vehicle configuration information stored in the individual vehicle information DB 213. When both of the values do not match each other, a request for transmission of "configuration information all" is transmitted to the vehicle-side system 4. The vehicle-side system 4 receives the transmission of the request, and transmits the "configuration information all" to the center device 3. When the "configuration information all" is received, the center device 3 updates the configuration information stored in the individual vehicle information DB 213 on the basis of data values thereof.

With this configuration, the vehicle-side system 4 initially transmits the hash value of the configuration information to the center device 3, and transmits all data values of the configuration information to the center device 3 only when a comparison result of the hash values in the center device 3 shows mismatch. Consequently, since a size of data transmitted from the vehicle-side system 4 can be reduced, even when the vehicle-side system 4 is mounted on a plurality of vehicles, it is possible to reduce a total amount of communication. In particular, in a case where the configuration information is uploaded at a predetermined timing such as IG-on in the vehicle-side system 4, a time period in which the communication concentrates may occur. Thus, an amount of transmitted data is reduced by using a hash value, and thus it is possible to reduce a communication load.

The CGW 13 receives the configuration information from all the rewrite target ECUs 19 of update data, and generates a hash value on the basis of all data values thereof, and the DCM 12 transmits the hash value at a timing at which the ignition switch 37 of the vehicle is turned on or off. Therefore, it is possible to transmit the hash value to the center device 3 at a timing at which traveling of the vehicle is initiated or finished. Thus, the center device 3 can appropriately synchronize the configuration information of the individual vehicle information DB 213 with that of the vehicle.

When an "ECU SW ID" of each ECU 19 is received from a plurality of ECUs 19, the vehicle-side system 4 transmits a configuration information list in which a "Vehicle SW ID" is combined therewith to the center device 3. The center device 3 compares the "ECU SW ID" list transmitted from the vehicle-side system 4 with an approved "ECU SW ID" list of a corresponding vehicle stored in the configuration information DB 208", and transmits abnormality detection to the vehicle-side system 4 and the management device 220 when it is determined that the transmitted lists of combinations are disapproved.

With this configuration, the center device 3 can detect, as an abnormality, that a combination of the configuration information of the vehicle is in a state in which the plurality of ECUs 19 cannot cooperate with each other and traveling of the vehicle is hindered, and notify the vehicle-side system 4 of the abnormality. Thus, the vehicle-side system 4 can perform measures such as prohibiting traveling of the vehicle.

The center device 3 does not perform the update availability check process (D7) on a vehicle in which a combination of vehicle configuration information is disapproved. Thus, it is possible to prevent program update from being executed in a disapproved vehicle. Even when the disapproved ECU 19 is not an update target ECU of a new program, the center device 3 does not execute the update availability check process (D7). In the vehicle-side system 4, when program update is executed, control for the ECU 19 which is not an update target is also generated. Therefore, in a vehicle having a disapproved ECU 19, there is a probability that the program update may not be normally completed, and thus the center device 3 prevents the program update from being executed in the vehicle.

The center device 3 includes the campaign DB 217 in which the campaign information used to notify the vehicle side that update using a new program has occurred is stored, and, for a vehicle determined to be approved, checks availability of the campaign information of the corresponding vehicle. When the update is available, the campaign information is transmitted to the vehicle-side system 4. Consequently, the campaign information can be presented to a user, and thus update of an application program can be prompted. Synchronization of the configuration information, determination of whether or not the configuration information is approved, and checking of update availability are executed as a series of processes by the center device 3 with upload of the configuration information from a vehicle as a trigger, and thus it is possible to promptly notify an adequate vehicle of update of a program.

The second embodiment may be modified and implemented as follows. The center device 3 may transmit the "synchronization initiation request" to the vehicle-side system 4, and the DCM 12 may transmit the "configuration information collection request" to the CGW 13 when the "synchronization initiation request" is received. For example, when the configuration information DB 208 of "vehicle type=aaa" is updated, the center device 3 transmits the "synchronization initiation request" to a vehicle of the vehicle type.

The hash value may be transmitted to the center device 3 at a timing when rewriting is completed in the rewrite target ECU 19 of the update data. That is, the flowchart of steps D1 to D12 illustrated in FIG. 255 is executed even when update of programs of all the rewrite target ECUs 19 is completed.

The center device 3 requests the vehicle-side system 4 to transmit a combination list of the configuration information of the respective ECUs 16 when a comparison result of both hash values shows match. When the combination list is received, the processes in steps D6 to D12 may be performed.

Even when the comparison result of both of the hash values shows match, the center device 3 may refer to the campaign DB 217 to check availability of the campaign information of a corresponding vehicle.

The transmission of a hash value from the vehicle-side system 4 to the center device 3 may be performed as illustrated in FIG. 256. FIG. 256 is a flowchart illustrating a process in the CGW 13. For example, when the IG switch 37 is turned on, the CGW 13 collects configuration information from each ECU 19 (D21), and generates a hash value for data values of the collected configuration information (D22). The generated hash value is compared with a hash value (previously generated value) stored in the flash memory 24*d*, and thus it is determined whether or not there is a difference therebetween (D23). When there is a difference (YES), the hash value generated this time is stored in the flash memory 24*d* (D24), and the hash value is transmitted to the center device 3. When there is no difference between both of the hash values in step D23, the process is finished (NO). A hash value for initial values of the configuration information is assumed to be stored in advance in the flash memory 24*d*. As a result, the number of times of uploading the configuration information from the vehicle-side system 4 to the center device 3 can be reduced.

Third Embodiment

Figure 258:
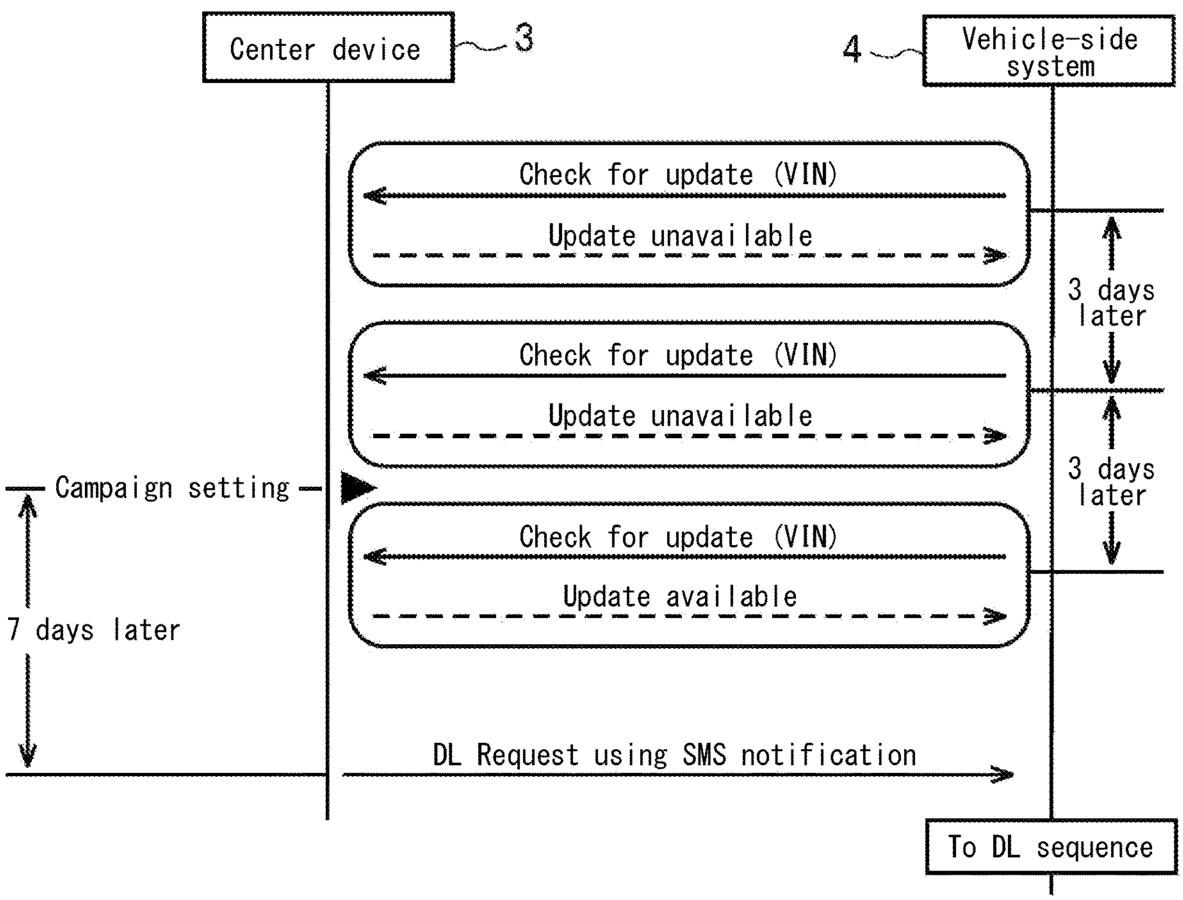
FIG. 258 is a sequence diagram illustrating processing procedures executed between a center device and a vehicle-side system in a third embodiment.

The third embodiment relates to a function executed by a campaign management unit 3D of the center device 3 in order to improve a rate of updating an application program in the vehicle-side system 4. As illustrated in FIG. 258, for example, in the vehicle-side system 4, a user sets an HTTP polling interval to about three days by using a Config files, and thus the vehicle-side system 4 periodically checks update availability of an application program with respect to the center device 3. Consequently, when the update is checked after the campaign information of a VIN of a vehicle corresponding to the campaign DB 217 is set, the center device 3 notifies the vehicle-side system 4 that "the update is available". That is, as described in the second embodiment, the process in which the center device 3 checks the update with upload of the configuration information using HTTP from the vehicle-side system 4 as a trigger is executed at the timing of IG-on after three days have elapsed.

In above-described way, in the configuration in which update availability is checked with a notification from a vehicle as a trigger, the center device 3 does not need to transmit campaign information from the center device 3 to all the vehicles that are campaign targets at the time at which the campaign information is set. However, in a case where a user does not use a vehicle for a long period of time, the user does not check update availability using HTTP during that time. Thus, it is supposed that the user does not know that a new campaign has been issued, and an application program may not be updated in the vehicle.

Figure 259:
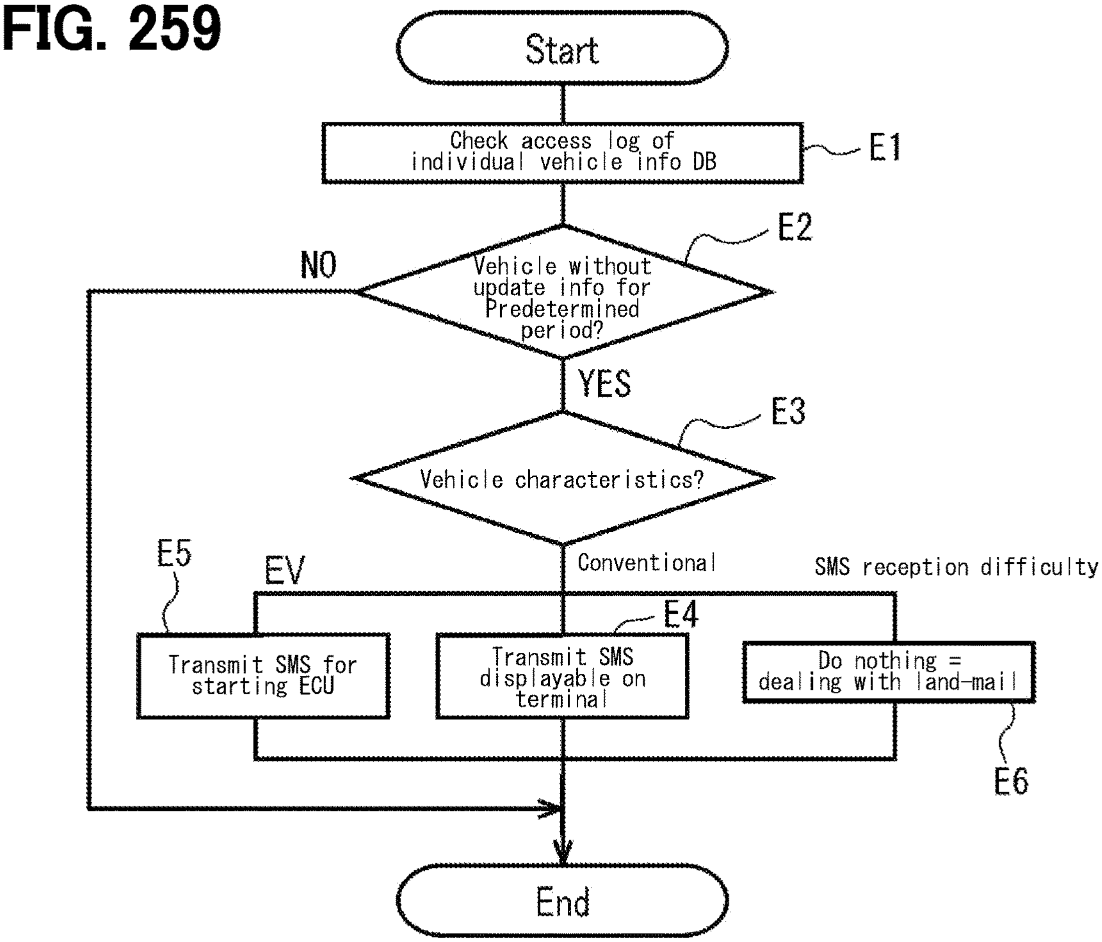
FIG. 259 is a flowchart illustrating a process performed by the center device.

Therefore, as illustrated in FIG. 259, the SMS transmission control unit 212 of the center device 3 checks an access log of each vehicle by referring to the individual vehicle information DB 213 at regular or predetermined timings (E1). It is determined whether or not there is a vehicle that has not made access to the center device 3, that is, a vehicle that has not transmitted configuration information for checking update of an application program for a predetermined period (E2). The predetermined period is, for example, about seven days, with the day when a new campaign is set in the campaign DB 217 as the starting day of reckoning. That is, the SMS transmission control unit 212 specifies a vehicle in which update has not been checked for seven days, for vehicles of which "Vehicle SW IDs" of the individual vehicle information DB 213 correspond to "pre-update Vehicle SW IDs" of the campaign DB 217. The SMS transmission control unit 212 may specify a vehicle in which update has not been checked for a predetermined period for all the vehicles.

In the individual vehicle information DB 213, initial data is registered by the OEM when a vehicle is produced in a factory, and, thereafter, an initial access log is input due to a notification from the OEM in response to, for example, sales of the vehicle. This access log substantially corresponds to a notification for validating subsequent program update. A vehicle for which an access log has not been input is excluded from the determination in step E2.

When there is a vehicle for which the update has not been checked for a predetermined period (YES), the SMS transmission control unit 212 determines characteristics of the vehicle on the basis of the vehicle type in the individual vehicle information DB 213, equipment information, and the like (E3). Here, as the characteristics, the SMS transmission control unit 212 determines whether the vehicle is an electric vehicle, an EV capable of receiving a short message service (SMS), a conventional gasoline engine vehicle capable of receiving an SMS, that is, a conventional engine vehicle (conventional vehicle), or a vehicle for which it is difficult to receive an SMS. For example, in a case where the DCM 12 mounted on the vehicle does not have a function of receiving an SMS or does not have a contract for receiving an SMS, it is determined that it is difficult for the vehicle to receive an SMS.

Figure 260:
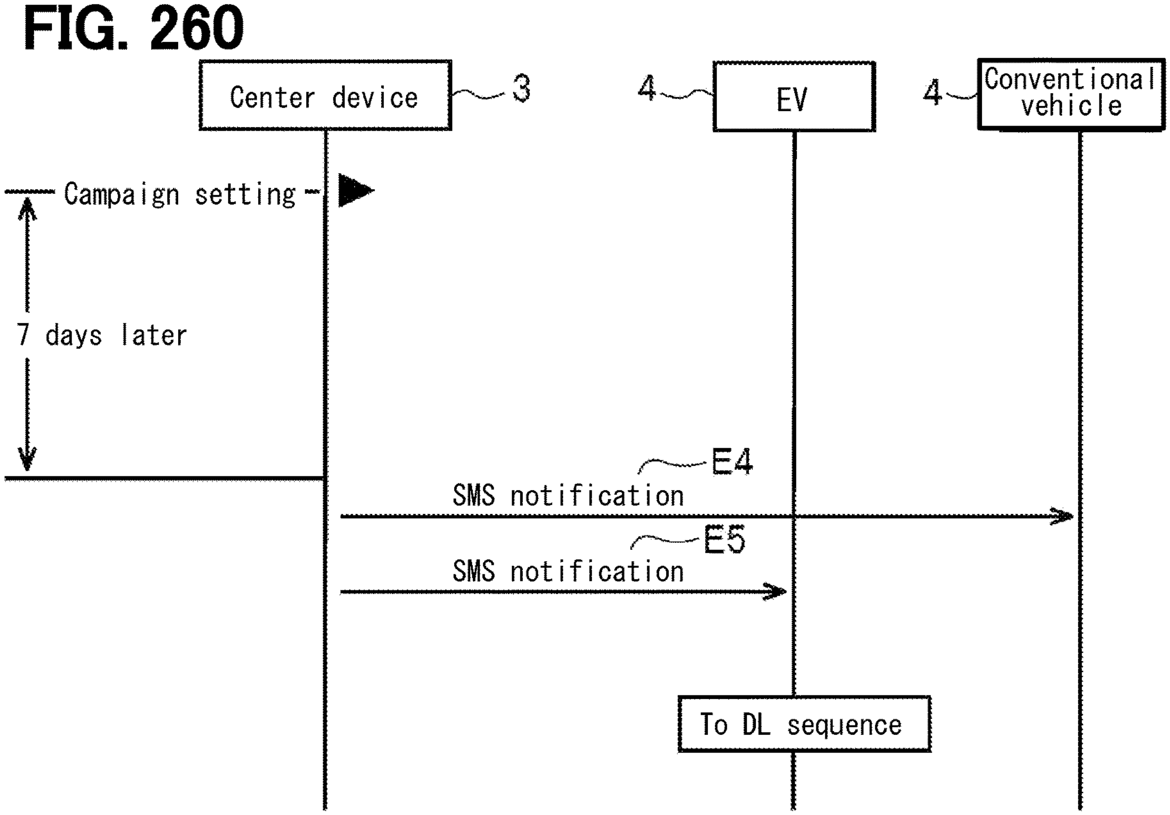
FIG. 260 is a sequence diagram illustrating a state in which the center device notifies an EV vehicle and a conventional vehicle by using an SMS.

In a case of the EV, an SMS for initiating a configuration information transmission sequence by starting the ECU 19 of the vehicle is transmitted (E5; refer to FIG. 260). When the DCM 12 receives the SMS and executes a command described in the SMS, the IG-on power supply state is entered, and the started CGW 13 transmits the configuration information to the center device 3 via the DCM 12. Thereafter, as in steps D1 to D12 illustrated in FIG. 255, update is checked, and a distribution package or the like is downloaded. In the case of the EV, since a capacity of the battery is large, it is considered that it is sufficiently possible to download the program in the IG-on power supply state in the parking state. Therefore, the ECU 19 is started by using an SMS, and a sequence after update check and download is automatically initiated.

In a case where a remaining battery charge of the battery of the EV vehicle is small, the vehicle-side system 4 refers to the rewrite specification data illustrated in FIG. 250, and, in a case where a remaining battery charge is smaller than a designated quantity, installation is controlled not to be initiated. Alternatively, in a case where a remaining battery charge described as restrictions in the campaign file transmitted by the center device 3 in step D9 is referred to and is smaller than a designated remaining battery charge, the vehicle-side system 4 is controlled not to initiate download of the distribution package.

In the conventional vehicle, the SMS transmission control unit 212 transmits an SMS that is displayable on the in-vehicle display 7 to a vehicle which is ready to receive the SMS in a period in which the DCM 12 is intermittently started (E4; refer to FIG. 260). For example, the CGW 13 instructs the in-vehicle display 7 to display text statements described in the received SMS at the next IG-on timing. In a case where information of the user's mobile terminal 6 is registered in the individual vehicle information DB 213, the SMS may be transmitted to the mobile terminal 6. For example, a text message is displayed, such as "there is campaign information; and execute IG-on" The individual vehicle information DB 213 is an example of a user information storage unit. On the other hand, a vehicle in a state in which an SMS is difficult to receive is not subjected to anything, and coping is performed, for example, by separately sending a mail to a user (E6).

As described above, according to the third embodiment, the vehicle-side system 4 transmits the configuration information of a plurality of ECUs 19 to the center device 3, and the individual vehicle information DB 213 stores the configuration information transmitted from the respective vehicles along with the transmission date thereof. The campaign DB 217 stores, as campaign information, a target VIN list for identifying a campaign ID and a data update target vehicle. The center device 3 refers to the individual vehicle configuration DB 213, and, when there is no transmission of the configuration information within a predetermined period from the transmission date linked to a target vehicle, transmits a message for prompting data update to the vehicle-side system 4 of the target vehicle by using an SMS.

With this configuration, even in a case where the situation is continued in which the configuration information is not transmitted to the center device 3 because a user does not have an opportunity to ride on a vehicle, the center device 3 transmits a message for prompting data update to the vehicle-side system 4 of the target vehicle when a predetermined period has elapsed from the transmission date stored in the individual vehicle information DB 213. Therefore, the user can recognize that the data update is necessary by referring to the message.

The center device 3 refers to the individual vehicle information DB 213 and the campaign DB 217 to determine a program update target vehicle. That is, the individual vehicle information DB 213 stores the date on which the configuration information is transmitted from each vehicle, and the campaign DB 217 stores a target VIN list. Therefore, the center device 3 can determine a program update target vehicle on the basis of the transmission date of the configuration information from each vehicle and the target VIN list.

When the configuration information is received from each ECU 19 with turning-on of the ignition switch 37 as a trigger, the vehicle-side system 4 transmits the configuration information to the center device 3. Therefore, when the user rides on the vehicle, the configuration information can be reliably transmitted to the center device 3.

When the target vehicle is an electric vehicle, the center device 3 transmits a message including a command for starting an ECU of the target vehicle, and the vehicle-side system 4 having received the message starts the ECU 19 to execute a process related to data update. That is, since the electric vehicle has a relatively large capacity of the battery, the ECU 19 can execute processes related to data update without waiting for a user operation. Therefore, it is possible to execute the data update efficiently.

When the target vehicle is a conventional vehicle, the center device 3 transmits at least text information displayable on the in-vehicle display 7 of the target vehicle as a message. Therefore, a user of the conventional vehicle can recognize that the data update is necessary by referring to the text information displayed on the in-vehicle display 7.

When a transmission destination of the user's mobile terminal 6 is stored in the individual vehicle information DB 213, the center device 3 transmits text information displayable on the mobile terminal 6 as a message. As a result, the user can recognize that the data update is necessary by referring to the text information displayed on the mobile terminal 6 even when there is no opportunity to ride on the vehicle.

When the user transmits the transmission date and a transmission destination of a campaign to the center device 3 in advance via the mobile terminal 6, the center device 3 stores the transmission date and the transmission destination in the individual vehicle information DB 213. For example, the user designates the day after the campaign is issued as the transmission date, and designates the mobile terminal 6 as the transmission destination instead of the in-vehicle display 7. The user designates a predetermined time at which the user does not ride as the transmission date, designates the vehicle as the transmission destination, and performs an operation of approving that a program is automatically updated. Consequently, the center device 3 transmits the campaign information to the transmission destination on the transmission date regardless of whether or not the configuration information is transmitted. Therefore, when the user knows in advance that there is no opportunity to ride on the vehicle for a while, the campaign information can be set to be received on the transmission date set by the user.

The third embodiment may be modified and implemented as follows.

The user information storage unit may be provided separately from the individual vehicle information DB 213.

The campaign information may be transmitted by using means other than SMS.

Instead of storing the transmission date in the individual vehicle information DB 213, the center device 3 may store, for example, a day on which no data is transmitted from the vehicle, and may transmit a message for prompting data update when the day continues for seven consecutive days.

Fourth Embodiment

Figure 261:
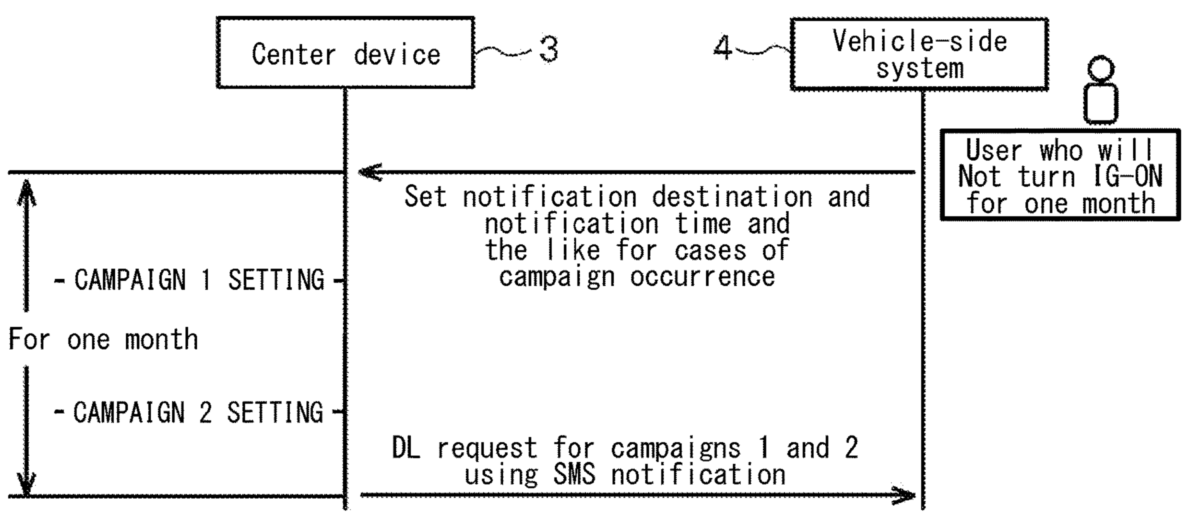
FIG. 261 is a sequence diagram illustrating processing procedures executed between a center device and a vehicle-side system in a fourth embodiment.

The fourth embodiment relates to a case where a user designates campaign information and a message notification method. For example, a case is supposed that the user does not ride for about one month, and that it is determined in advance that there is no opportunity to turn on the IG switch 37. As illustrated in FIG. 261, the user transmits settings of a notification destination and the notification date and time at the time of occurrence of a campaign to the center device 3 by using the mobile terminal 6. For example, it is set that the mobile terminal 6 will be notified of campaign information one month later. Consequently, the individual vehicle information management unit 3C stores information indicating the notification destination and the notification date and time in the individual vehicle information DB 213, and notifies the user of the information according to the settings. For example, when two campaigns (1, 2) are set during one month, the SMS transmission control unit 212 notifies the user's mobile terminal 6 of information regarding the campaigns (1, 2) one month later to prompt program update.

As described above, according to the fourth embodiment, when the user transmits the transmission date and a transmission destination of campaign information to the center device 3 via the mobile terminal 6, the center device 3 stores the transmission date and the transmission destination in the individual vehicle information DB 213. The center device 3 transmits the campaign information to the transmission destination on the stored transmission date. Consequently, it is possible to stop transmission of unnecessary campaign information from the center device 3 when it is determined that the user does not ride on the vehicle for a certain period.

Fifth Embodiment

Figure 262:
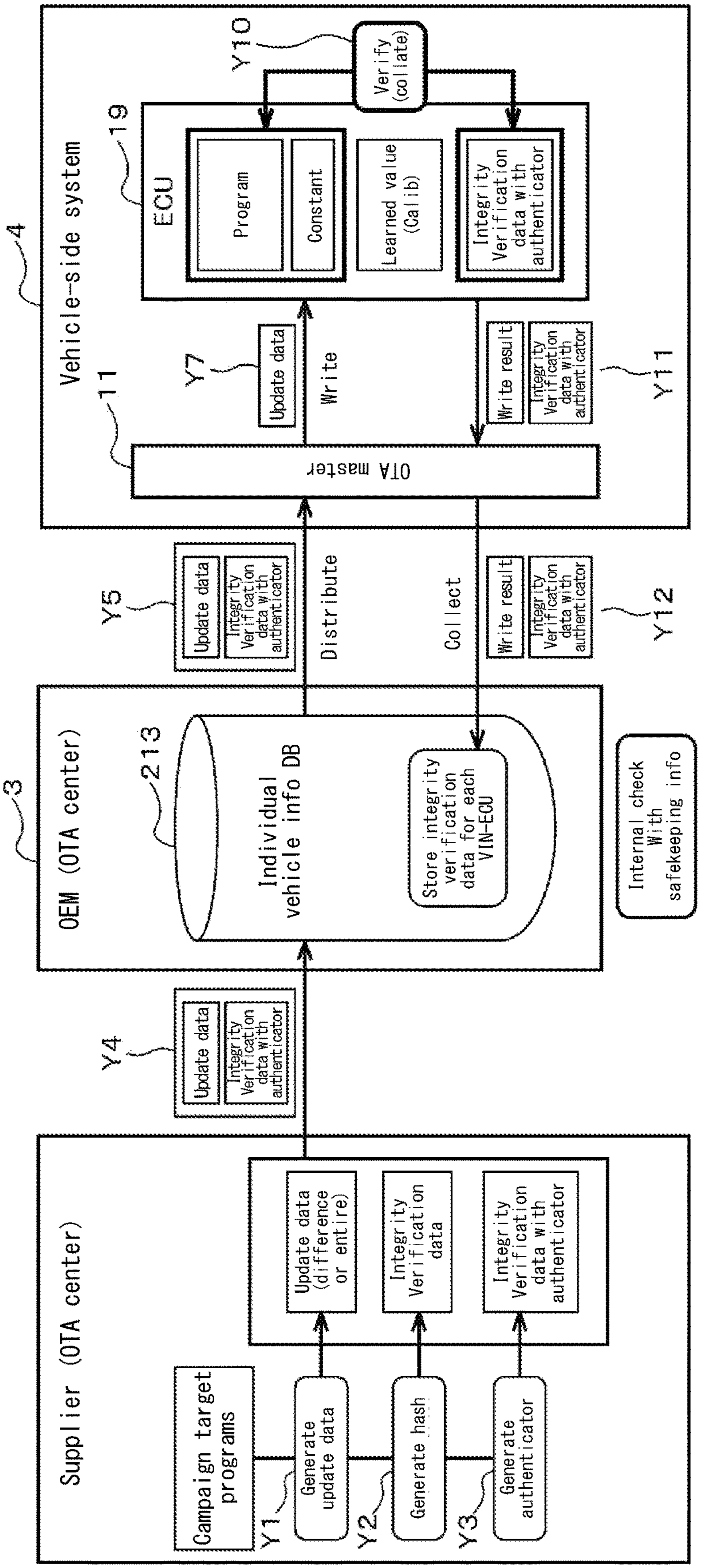
FIG. 262 is an image diagram illustrating processes performed among a supplier, a center device, and a vehicle-side system in a fifth embodiment.
Figure 263:
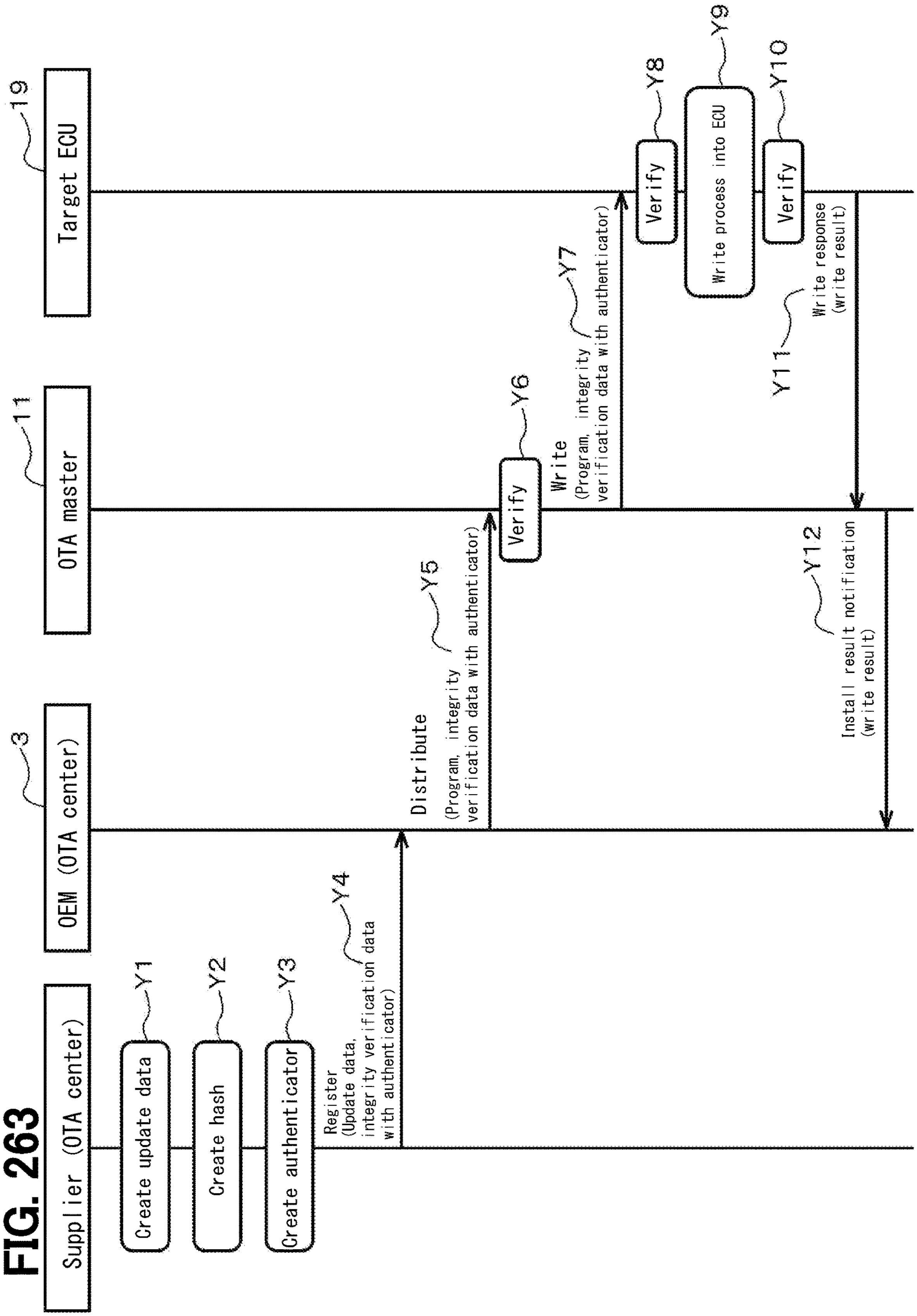
FIG. 263 is a sequence diagram (first) illustrating processing procedures performed among the supplier, the center device, and the vehicle-side system.

The fifth embodiment relates to a function of adding verification data used for the vehicle-side system 4 to verify the integrity of data when the center device 3 transmits data of an update program to the vehicle-side system 4. As illustrated in FIGS. 262 and 263, a supplier creates data to be registered in the ECU reprogramming data DB 204 by using the package management unit 3A. Specifically, the package management unit 3A creates new difference data for rewriting an old program to a new program as update data (Y1), and creates a hash value that is integrity verification data for the new program of the ECU 19 and a hash value for the new difference data (Y2). Here, in a case where the ECU has a single-bank memory, old difference data for rewriting the new program to the old program as rollback data may be created, and a hash value for the old program for the ECU 19 and a hash value for the old difference data may be created.

The package management unit 3A generates an authenticator by applying encryption using a key value which is a predetermined key for each hash value (Y3). The package management unit 3A transmits the update data and the integrity verification data with each authenticator, and stores the transmitted data in the ECU reprogramming data DB 204 (Y4). As described above, the package management unit 3A generates a package, generates integrity verification data for the package, and transmits the integrity verification data to the vehicle-side system 4 (Y5).

The master device (OTA master) 11 calculates the integrity verification data for the package, compares a calculated value with the integrity verification data of the received package, and verifies the integrity of the package (Y6). When the package integrity verification is successful, the master device 11 transmits the update data and the integrity verification data of the ECU to the rewrite target ECU 19 (target ECU) (Y7).

The rewrite target ECU 19 calculates the integrity verification data for the update data, compares a calculated value with the integrity verification data of the received update data, and verifies the integrity of the update data (Y8). When the update data integrity verification is successful, the rewrite target ECU 19 restores the difference data that is the update data and writes the data into the flash memory 28*d* (Y9). When the writing is completed, the rewrite target ECU 19 calculates the integrity verification data for the data written in the flash memory 28*d*, compares a calculated value with the integrity verification data of the received new program, and verifies the integrity of the flash memory 28*d* (Y10). The rewrite target ECU 19 transmits the verification result to the master device 11 (Y11), and the master device 11 transmits the received verification result to the center device 3 as an installation result notification (Y12).

For example, as illustrated in FIG. 243, the package management unit 3A generates the following integrity verification data for the latest "ECU SW ID". In a case where a memory configuration of the ECU is the double-bank memory or the suspend, the following (3) and (4) may be omitted.

(1) A hash value that is integrity verification data for a new program of the ECU is generated. A functional portion for performing this process is an example of a first verification value generation unit (step A1).

(2) Update data that is difference data for update to a new program on the basis of an old program of the ECU, and a hash value that is integrity verification data of the update data, are generated. The functional portion for performing this process is an example of a second verification value generation unit in step A4.

(3) A hash value that is the integrity verification data for the old program of the ECU is generated. A functional portion for performing this process is an example of a fourth verification value generation unit in step A5.

(4) Update data that is difference data for update to the old program on the basis of the new program of the ECU, and a hash value that is integrity verification data of the update data, are generated. A functional portion for performing this process is an example of a fifth verification value generation unit in step A7.

The "program" includes constant data to be used in the program. When "ECU SW ID=ads_002", a hash value x1 is generated for update data "Adsfile001-002". As a hash function, for example, SHA-256 is used as described above. The hash value corresponds to a verification value. Here, the package management unit 3A may be configured to generate integrity verification data with an authenticator by generating an authenticator by applying encryption by using a key value that is a predetermined key to the hash value.

Next, the supplier generates integrity verification data with an authenticator by applying encryption using a key value that is a predetermined key to the integrity verification data, and provides the OEM with the update data and the integrity verification data with the authenticator in correlation with each other. In other words, the package management unit 3A provides the OEM with each program and integrity verification data with an authenticator for the program registered in the ECU reprogramming data DB 204. In response to an instruction from the OEM, the package management unit 3A generates rewrite specification data as described above by using the ECU reprogramming data DB 204 or the like, generates a distribution package, and registers it in the package DB 206. When a download request for update data is generated from the vehicle-side system 4, the center device 3 distributes a distribution package including the update data and the integrity verification data with the authenticator to the vehicle-side system 4 in response to the download request. The "integrity verification data" in the claims includes both a hash value only and integrity verification data with an authenticator including encryption using a key.

When the distribution package is received, the master device 11 of the vehicle-side system 4 verifies the validity of the distribution package by using the integrity verification data (third verification value) added to the distribution package. Specifically, integrity verification data calculated by using the distribution package is compared with the received integrity verification data, and, when the pieces of data match each other, it is determined to be normal. When it is checked that the distribution package is normal as a result of the verification, the master device 11 unpackages the distribution package into data for each ECU (refer to FIG. 239). The master device 11 transfers the update data and the integrity verification data with the authenticator to the destination the ECU 19.

The ECU 19 verifies the validity of the update data by using integrity verification data with the authenticator (second verification value). Specifically, the integrity verification data calculated by using the received update data is compared with the received integrity verification data, and when the data matches, it is determined to be normal. When it is checked to be normal as a result of the verification, the CPU 28*a* of the ECU 19 performs a write process on the flash memory 28*d*. When the write process is completed, the ECU 19 uses the integrity verification data with the authenticator (first verification value) to read the data written in the flash memory 28*d* and verify its validity. Specifically, integrity verification data calculated by using the read data is compared with the received integrity verification data, and, when the pieces of data match each other, it is determined to be normal. The integrity verification data is stored in a predetermined area of the flash memory 28*d* for use when the ECU 19 is started. When these processes are completed, the ECU 19 transmits a write response to the master device 11, including the verification results. The master device 11 notifies the center device 3 of an installation result. The "target ECU" in the figure is synonymous with a "target ECU" and the "OTA master" is synonymous with a "DCM". The CPU 28*a* is an example of a write processing unit.

Here, in a case where program update cancellation occurs during installation, the ECU 19 performs a rollback process. The ECU 19 writes the update data and verifies the validity of the rollback difference data by using the integrity verification data with the authenticator (fifth verification value). Specifically, the integrity verification data calculated by using the rollback difference data is compared with the received integrity verification data, and when the data matches, it is determined to be normal. When it is checked to be normal as a result of the verification, the ECU 19 initiates writing using the rollback difference data after writing of the update data is completed. After the writing is completed, the ECU 19 reads the data written in the flash memory 28*d* by using the integrity verification data with the authenticator (fourth verification value), and verifies its validity. The integrity verification of the received difference data (the update data or the rollback difference data) may be performed by the master device 11 instead of the ECU 19.

Figure 264:
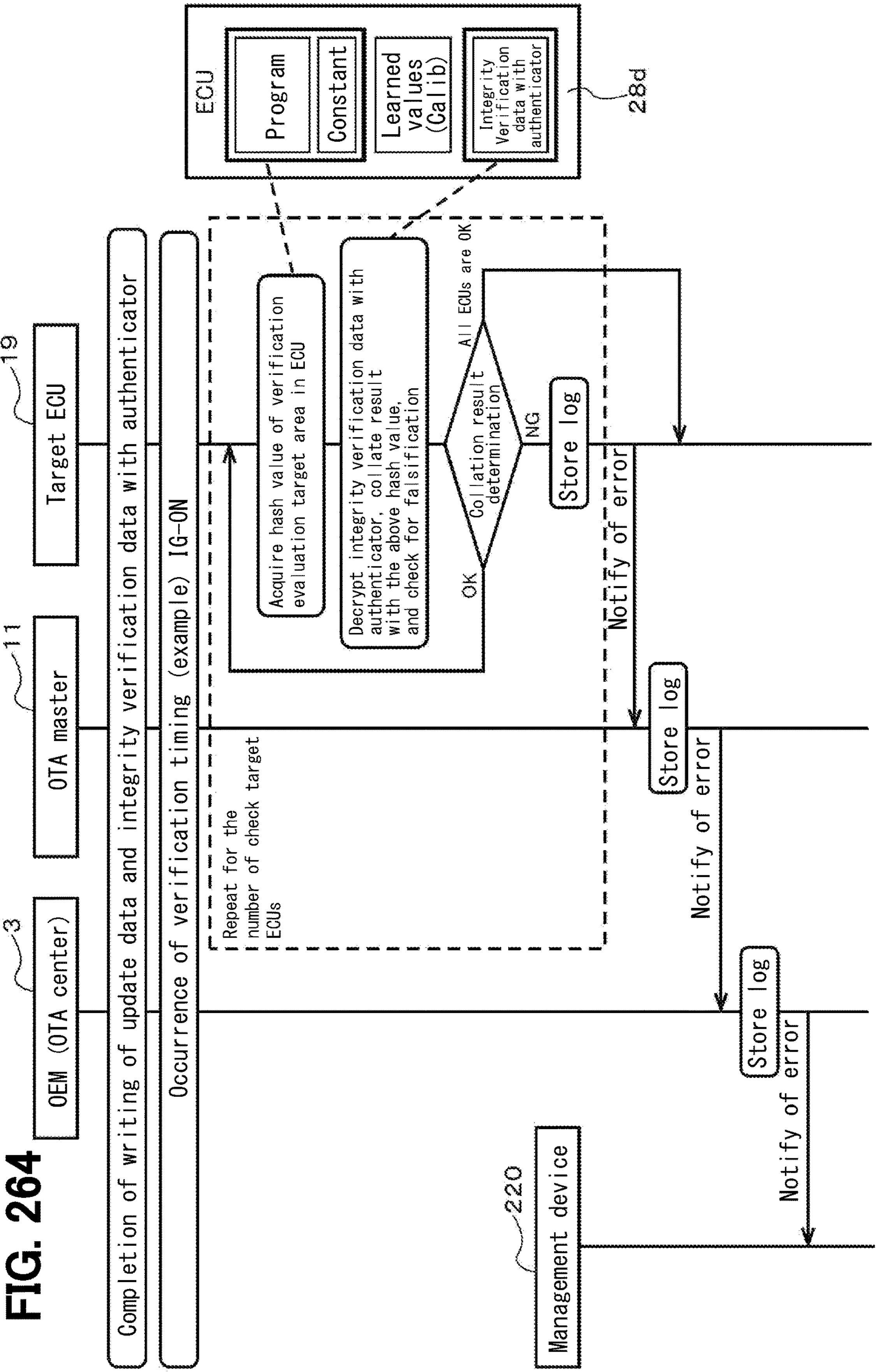
FIG. 264 is a sequence diagram (second) illustrating the processing procedures performed among the supplier, the center device, and the vehicle-side system.

As illustrated in FIG. 264, thereafter, when the IG switch 37 of the vehicle is turned on, the ECU 19 performs data verification at the time of start with turning-on thereof as a trigger. The ECU 19 verifies the integrity of a started program or the like started by using the integrity verification data with the authenticator (the first verification value or the fourth verification value). First, in the flash memory 28*d*, a hash function is applied to data values of an evaluation target area in which an updated program or constant data is written, and thus a hash value is acquired. Next, the integrity verification data with the authenticator is decrypted, and a hash value (expected value) included in the decryption result is collated with the acquired hash value (calculated value), and it is determined whether or not the program or the like written in the flash memory 28*d* has been falsified. When both hashes value match each other and thus it is determined to be "OK", the ECU 19 performs a start process as usual. The same process is performed on each ECU 19, and, when results in all the evaluation target ECUs 19 evaluated are "OK", the process is finished.

On the other hand, when a result of verification for any ECU 19 is abnormal, that is, "NG", the ECU 19 stores a log of the process and notifies the master device 11 of the error. The master device 11 similarly stores the log and notifies the center device 3 of the error. The center device 3 similarly stores the log and notifies the management device 220 of the OEM or the like of an error. The notification sent to the management device 220 is performed, for example, by the SMS transmission control unit 212 by using SMS, or through transmission of an e-mail via an Internet line.

Figure 265:
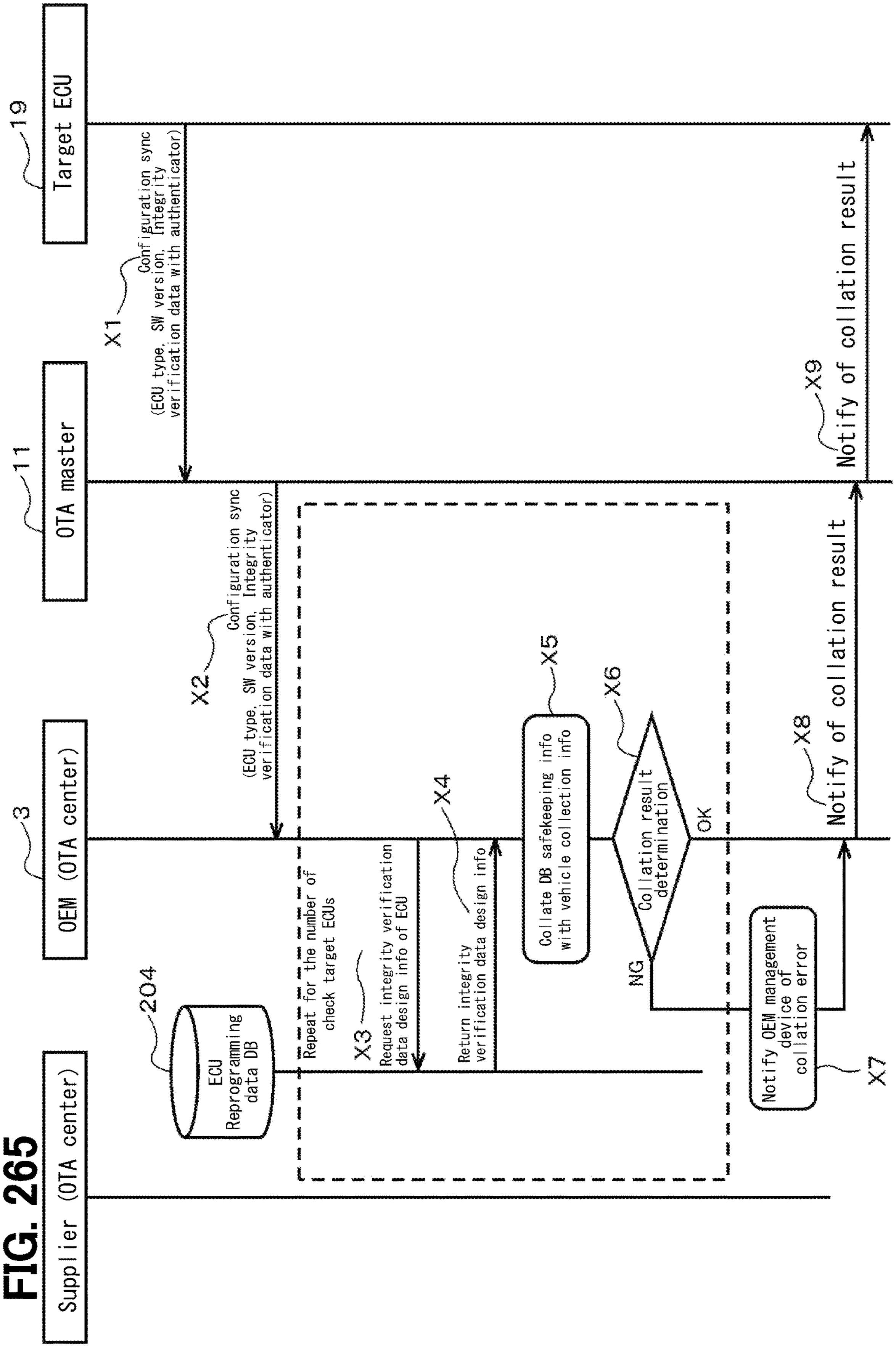
FIG. 265 is a sequence diagram (third) illustrating the processing procedures performed among the supplier, the center device, and the vehicle-side system.

In the embodiment described above, the vehicle-side system 4 is configured to verify the integrity. In FIG. 265, a description will be made of a case where verification of the integrity (comparison with an expected value) is performed by the center device 3. In FIG. 265, for example, when version information of an updated application program is transmitted to the master device 11 at a timing of IG-on or the like, the ECU 19 generates and transmits integrity verification data with an authenticator in the same manner as described above along with the version information (X1). The ECU 19 calculates integrity verification data for the data in the flash memory **28*d* and transmits the calculated value to the master device 11. The master device 11 transmits configuration information including the integrity verification data with the authenticator to the center device 3 (X2**).

The center device 3 accesses the ECU reprogramming data DB 204, acquires integrity verification data with an authenticator that matches the "ECU SW ID" of the target ECU 19 (X3 and X4), and verifies the acquired data with the integrity verification data uploaded from the vehicle (X5). Specifically, integrity verification data of the new program corresponding to the "ECU SW ID" is acquired from the ECU reprogramming data DB and is collated with the uploaded integrity verification data. When a result of the collation is inconsistent, that is, NG (X6; NG), the management device 220 of the OEM is notified of an abnormality (X7). A function of this processing unit corresponds to an abnormality notification unit.

The center device 3 transmits the collation result to the master device 11 (X8), and the master device 11 transmits the received collation result to the rewrite target ECU 19 (X9). In a case where the collation result is OK, the rewrite target ECU 19 operates an application program as usual. In a case where the collation result is NG, the application program is not operated. In the present embodiment, the package management unit 3A may omit the integrity verification data generation (step A1) of a new program and the integrity verification data generation (step A5) of an old ECU program.

In the above description, the ECU 19 verifies the integrity of update data at a timing at which the IG switch 37 of the vehicle is turned on after the update data is written, but, instead, the integrity of the update data may be verified immediately after the update data is written.

In the above embodiment, the integrity verification data with an authenticator is added to only update data, but this may be implemented as follows.

A new program and corresponding update data are acquired from the ECU reprogramming data DB 204 (data acquisition procedure; step A1).

The first verification value generation unit generates a first hash value for the new program (first verification value generation procedure; step A2).

The second verification value generation unit generates a second hash value for the update data (second verification value generation procedure; step A4). The package generation unit 202 causes the update data, specification data, and the first and second hash values to be included in a distribution package (distribution package generation procedure). The update data correspond to new difference data.

The third verification value generation unit generates a third hash value for the distribution package (third verification value generation procedure; step C4).

The package distribution unit 203 transmits the distribution package and the third hash value to the vehicle-side system 4.

An authenticator may be added only to the distribution package and the third hash value, or may be added in each stage of generating each hash value. The package distribution unit 203 corresponds to a transmission unit.

In this case, in the vehicle-side system 4:

The DCM 12 that is a reception processing unit receives the distribution packages and the third hashing values.

The third verification processing unit compares a hash value generated from the distribution package data with the received third hash value, and verifies the integrity of the distribution package data.

The second verification processing unit compares a hash value generated from the update data with the received second hash value, and verifies the integrity of the update data.

The CPU **28*a* that is an example of a write processing unit writes the update data into the flash memory 28*d***.

The first verification processing unit writes the update data to generate a hash value for data values in the flash memory **28*d***, serving as a new program, and compares the hash value with the received first hash value to verify the integrity of the new program.

When a verification result of the update data is NG, writing into the flash memory **28*d* is stopped. When a verification result of the new program written in the flash memory 28*d* is NG, the new program is invalidated, and a rollback process is performed as necessary. The first to third verification processing units may be realized by the CPU 28*a*. When any of the verification results in the first to third verification processing units is NG, the DCM 12 as a transmission processing unit notifies the center device 3** of an abnormality.

In addition to the above configuration, as illustrated in FIG. 243, when rollback data for return to a state of the old program before the update data is written is present, the following process may be performed as follows.

The fourth verification value generation unit generates a fourth hash value for the old program (fourth verification value generation procedure; step A5).

The fifth verification value generation unit generates a fifth hash value for the rollback data for returning the new program to the old program (fifth verification value generation procedure; step A7). The rollback data indicates rollback difference data and corresponds to old difference data.

The package generation unit 202 causes the update data, the rollback difference data, rewrite specification data, and the first, second, third, and fourth hash values to be included in a distribution package (distribution package generation procedure).

In this case, in the vehicle-side system 4, while the update data is rewritten into the flash memory **28*d*, for example, when the user gives an instruction for stopping the rewriting, the rewriting is cancelled, and restoration to the old program, that is, rollback is performed. This corresponds to only a case where a memory configuration of the ECU 19** is a single-bank memory.

The second verification processing unit calculates a hash value for the rollback data included in the distribution package, compares the calculated hash value with the fifth hash value, and verifies the integrity of the rollback data.

The CPU 28*a* performs writing into the flash memory 28*d* by using the rollback data.

The first verification processing unit calculates a hash value for the old program restored through writing into the flash memory 28*d*, compares the calculated hash value with the fourth hash value, and verifies the integrity of the old program.

As described above, according to the fifth embodiment, the ECU reprogramming data DB 204 stores new program of the target ECU 19 that is a rewrite target, an old program, and update data that is new difference data for update from the old program to the new program. The first verification value generation unit generates a first hash value by using the new program, and the second verification value generation unit generates a second hash value by using the update data. The package generation unit 202 generates a package including the update data, first and second verification values, and specification data for a plurality of target ECUs 19. The third verification value generation unit generates a third hash value by using the distribution package, and the package distribution unit 203 transmits the distribution package to the vehicle-side system 4 along with the third hash value.

When the vehicle-side system 4 receives the distribution package and the third hash value, the third verification processing unit calculates a hash value for the distribution package and verifies the integrity of the distribution package by comparing the hash value with the third hash value. The second verification processing unit calculates a hash value for the update data corresponding to the target ECU 19 included in the distribution package, compares the hash value with the second hash value included in the distribution package, and verifies the integrity of the update data.

The CPU 28*a* writes the update data into the flash memory 28*d*, and the first verification processing unit calculates a hash value for data of the updated new program in the flash memory 28*d*, compares the hash value with the first hash value, and verifies the integrity of the data of the new program. Thus, each hash value can be used to verify the integrity of each data value in a plurality of stages. The integrity of the new program can be verified in triplicate, and thus it is possible to prevent the vehicle-side system 4 from writing an incomplete new program and operating with an incorrect new program.

When the rollback data is present in the ECU reprogramming data DB 204, the fourth verification value generation unit generates a fourth hash value for the old program, and the fifth verification value generation unit generates a fifth hash value for the rollback data. The package generation unit 202 causes the update data, the first and second hash values, the rollback data, and the fourth and fifth hash values to be included in a distribution package.

When rollback is performed in the vehicle-side system 4, the second verification processing unit calculates a hash value for the rollback data included in the distribution package, and verifies the integrity of the rollback data by comparing the hash value with the fifth hash value. The CPU 28*a* perform writing into the flash memory 28*d* by using the rollback data. The first verification processing unit calculates a hash value for the old program restored through writing into the flash memory 28*d*, and verifies the integrity of the old program by comparing the hash value with the fourth hash value. Consequently, the integrity of the old program that has been rolled back can be verified. In the above description, the first to fifth verification value generation units are functional blocks in the package management unit 3A of the center device 3. The first, second, fourth, and fifth verification processing units are functional blocks in the target ECU 19 of the vehicle-side system 4. The third verification processing unit is a functional block in the master device 11 of the vehicle-side system 4 (OTA master 11).

Modification Example 1 of First Embodiment

Figure 266:
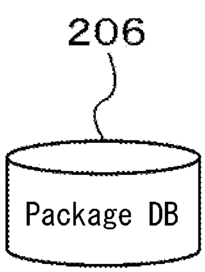
FIG. 266 is a diagram illustrating a modification example (first) of the first embodiment and illustrating a data format of the package DB in a case where a plurality of packages correspond to a single campaign.
Figure 267:
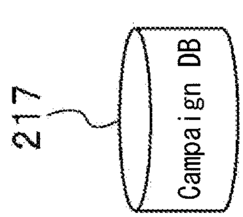
FIG. 267 is a diagram illustrating a data format of the campaign DB in a case where a plurality of packages correspond to a single campaign.

As illustrated in FIGS. 266 and 267, a plurality of packages "pkg_001_1" and "pkg_001_2" may correspond to one campaign "cpn_001". A plurality of packages may be grouped into a plurality of groups. In the above-described embodiments, one package includes a plurality of groups. In the present modification example, one package is generated for one group, and a plurality of packages are distributed for one campaign. For example, the package "pkg_001_1" includes the "ADS" and the "BRK" which are ECUs belonging to the group 1, and the package "pkg_001_2" includes the "EPS" which is an ECU belonging to the group 2.

Figure 268:
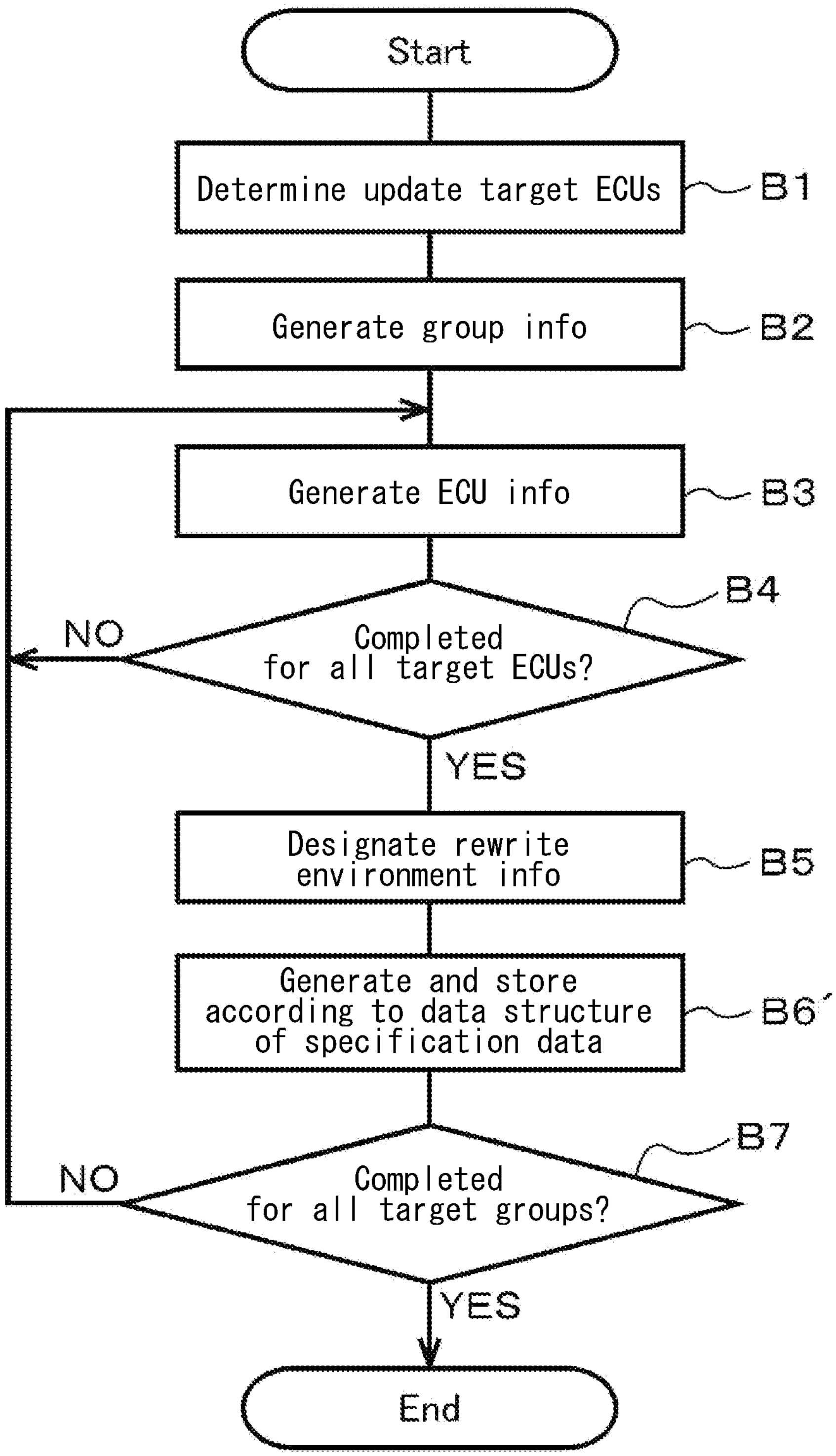
FIG. 268 is a diagram corresponding to FIG. 242 in a case where specification data is generated for each group.
Figure 269:
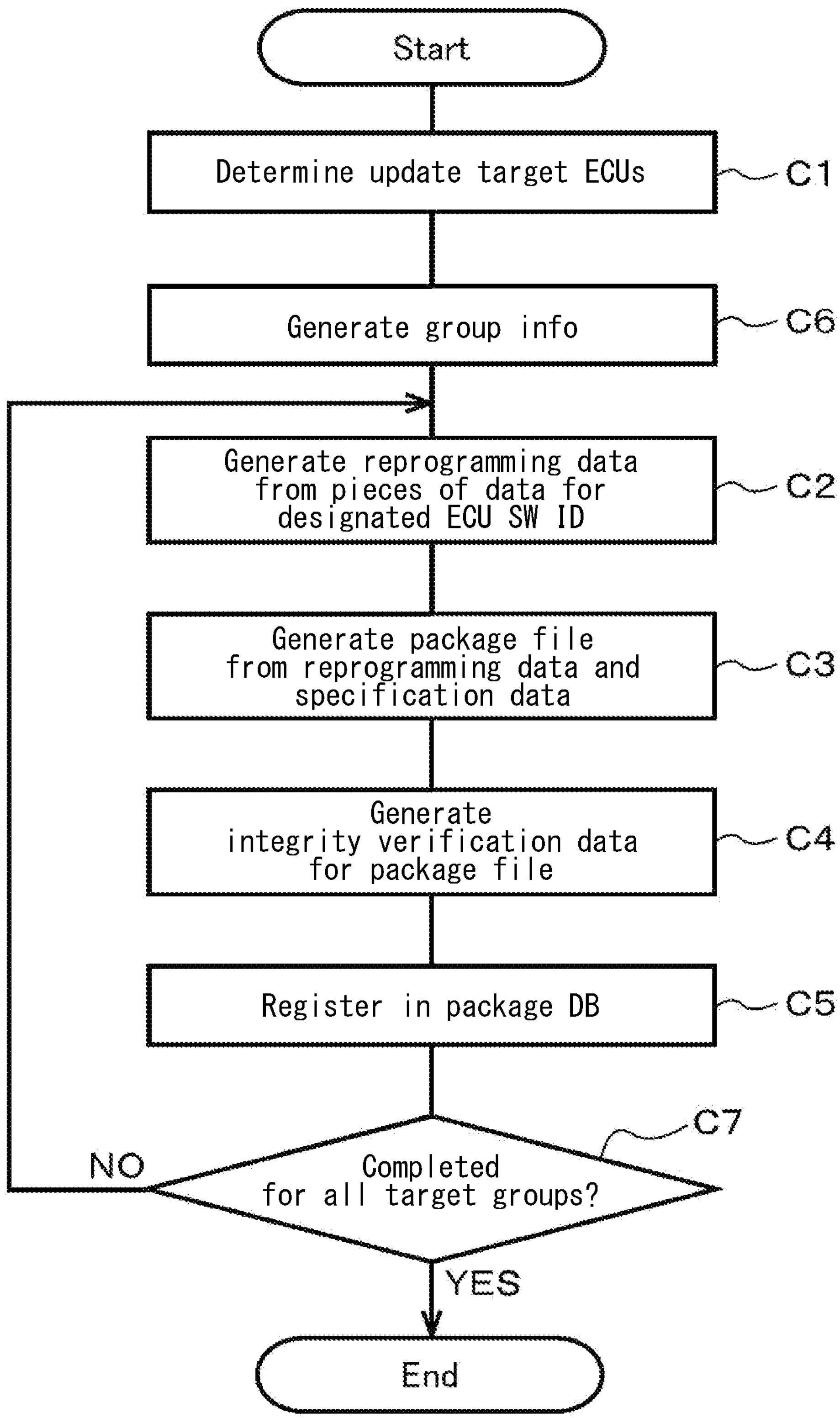
FIG. 269 is a diagram corresponding to FIG. 245 in a case where a distribution package is generated for each group.

In this case, as illustrated in FIGS. 268 and 269, specification data and a distribution package are individually generated for each group. In FIG. 268, the specification data generation unit 201 generates, for example, first specification data describing ECU information of the "ADS" and the "BRK" as specification data of the group 1. The specification data generation unit 201 generates, for example, second specification data describing ECU information of the "EPS" as specification data of the group 2. In FIG. 269, the package generation unit 202 generates reprogramming data in which, for example, update data of the "ADS" and the "BRK" belonging to the group 1 are integrated according to an ECU order, and generates a package file "pkg001_1.dat" by integrating the generated reprogramming data with the first specification data. The package generation unit 202 generates reprogramming data by using update data of the "EPS" belonging to the group 2, and generates a package file "pkg001_2.dat" by integrating the generated reprogramming data with the second specification data.

Modification Example 2 of First Embodiment

Figure 270:
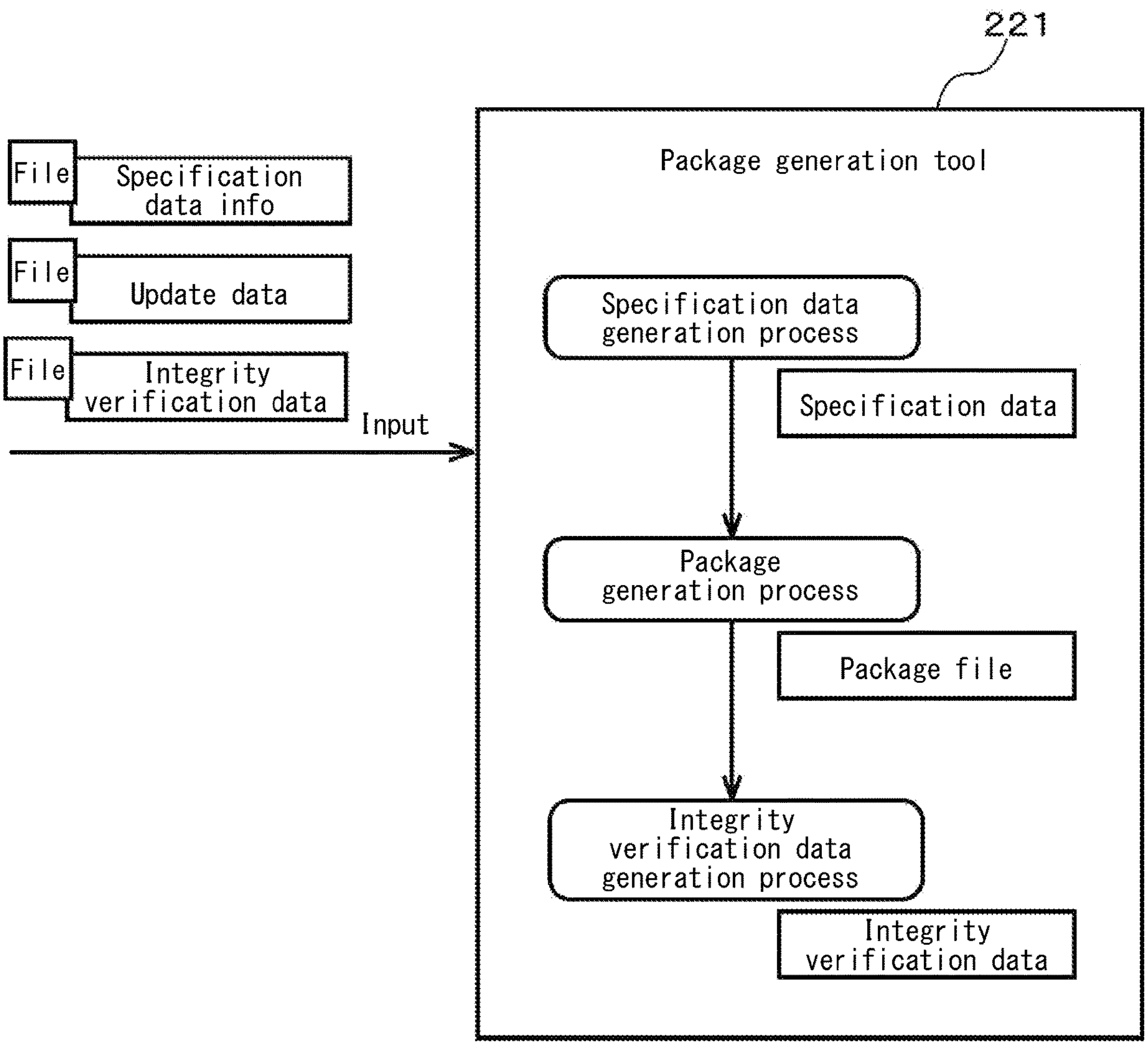
FIG. 270 is a diagram illustrating a modification example (second) of the first embodiment and illustrating a process content in package generation tool.

FIG. 270 illustrates a process content in a case where the functions of the specification data generation unit 201 and the package generation unit 202 are integrated to configure one package generation tool 221. Hereinafter, each process will be described again.

In the specification data generation process, a value input by an operator as specification data information is output in a data structure in which the number of bits or an order of arrangement is determined in advance, and specification data is generated. The specification data information is, for example, values exemplified in FIG. 250, and information in units of vehicles or systems (groups) is input in addition to information in units of ECUs such as the ECU (ID1), the ECU (ID2), and the ECU (ID3). The information in units of vehicles is, for example, the rewrite environment information illustrated in FIG. 250, and the information in units of systems is, for example, the group information or the ECU order information illustrated in FIG. 250. Input information in units of vehicles and input information in units of systems may be different files. The specification data generation process may have a function of automatically calculating some values such as a file size of update data and reflecting the calculated values in specification data.

In the package generation process, generated specification data, update data of each ECU, and a value and a file input as integrity verification data for each ECU are output in a data structure in which the number of bits or the arrangement order is determined in advance, and a file of a distribution package is generated. The update data and the integrity validation data for each ECU are arranged in an ascending order of groups, or an ascending order of ECU orders. Here, in addition to the update data (new difference data), rollback data (old difference data) may also be input. As the integrity verification data, "integrity verification data of an ECU program (new)" and "integrity verification data of update data" are input. In a case where rollback data is also added, "integrity verification data of an ECU old program" and "integrity verification data of old difference data" are also input.

In the integrity verification data generation process, integrity verification data is generated for the generated package file as described in step C4 of FIG. 252.

The generated package file or the integrity verification data generated for the package file is registered in the package DB 206 by an operator.

The functions executed by the center device 3 may be realized by hardware or software. The functions may be realized by hardware and software in cooperation.

The rewrite data may be not only an application program, but also data such as a map or data such as control parameters.

A content of the configuration information is not limited to the example, and may be appropriately selected according to individual design.

A content of the specification data is not limited to the example.

The campaign information and the distribution specification data may be included in a distribution package and transmitted to the vehicle side, or may be transmitted to the vehicle side separately from the distribution package.

In the fifth embodiment, the distribution package and the third verification value may be stored in the package storage unit in advance, and the package transmission unit 213 may transmit the distribution package and the third verification value linked to a request to the in-vehicle-side system 4 in response to the request from the in-vehicle-side system 4.

According to the present embodiment, the following advantages can be obtained by performing the above-mentioned activation execution control process (13). In the rewrite target ECU 19, when the activation execution condition is determined to be satisfied, the second data storage bank is activated as the active bank based on the active bank information after restarting. Thus, when an ECU 19 having double data storage banks is a rewrite target, activation can be appropriately controlled based on an instruction from outside.

In the rewrite target ECU 19, the execution conditions are that the software reset request is given by the CGW 13, the power reset request is given by the CGW 13, and communication interruption with the CGW 13 continues for a predetermined time. Thus, the execution conditions are that the software reset request is given by the CGW 13, the power reset request is given by the CGW 13, and communication interruption with the CGW 13 continues fora predetermined time, and after restarting, the second data storage bank can be activated as the active bank based on the active bank information.

In the rewrite target ECU 19, if the activation request is given by the CGW 13 when rewriting of a program on the second data storage bank is not completed, the negative response is notified to the CGW 13. Thus, it is possible to notify CGW 13 that the activation request has been instructed but rewriting of the program on the second data storage bank has not yet been completed.

In the rewrite target ECU 19, if the activation request is given by the CGW 13 when rewriting of a program on the second data storage bank is completed but the data verification shows a negative result, the negative response is notified to the CGW 13. Thus, it is possible to notify CGW 13 that rewriting of the program on the second data storage bank has been completed, but the data verification after rewriting is rejected.

Although the present disclosure has been described in accordance with the embodiments, it is understood that the present disclosure is not limited to the embodiments and structures described above. The present disclosure encompasses various modification examples or variations within the scope of equivalents. Various combinations or forms as well as other combinations or forms including only one element, one or more elements, or one or less elements, fall within the scope or the spirit of the present disclosure.

The control unit and the method described in the present disclosure may be realized by a dedicated computer provided by configuring a processor and a memory programmed to execute one or more functions embodied by a computer program. Alternatively, the control unit and the method described in the present disclosure may be realized by a dedicated computer provided by configuring a processor with one or more dedicated hardware logic circuits. Alternatively, the control unit and the method described in the present disclosure may be realized by one or more dedicated computers configured by a combination of a processor and a memory programmed to execute one or more functions and a processor configured by one or more hardware logic circuits. The computer program may also be stored on a computer readable and non-transitory tangible recording medium as instructions executed by a computer.

The invention claimed is:

1. An electronic control unit, comprising:

a non-volatile memory that has a double bank structure with a first data storage bank and a second data storage bank, the electronic control unit configured to receive update data from a vehicle master device and to write the received update data into the second data storage bank to rewrite a program on the second data storage bank while executing a program on the first data storage bank; and at least one processor programmed to:

update active bank information indicative of which bank is an active bank between the first data storage bank and the second data storage bank when the vehicle master device gives an instruction for an activation request to activate the second storage bank and the program rewrite on the second data storage bank is completed, determine whether an activation execution condition is satisfied;

activate the second data storage bank as the active bank based on the active bank information after restarting the electronic control unit when determining that the activation execution condition is satisfied; and notify the vehicle master device of a negative response as notification information when the vehicle master device gives the instruction for an activation request but at least one of two conditions (1) the program rewrite on the second data storage bank is completed and (2) data verification regarding the rewriting is positive is not met.

2. The electronic control unit according to claim 1, wherein the at least one processor is further programmed to determine that the execution condition is satisfied if the vehicle master device gives an instruction for a software reset request, the vehicle master device gives an instruction for a power reset request, or communication interruption with the vehicle master device continues for a predetermined time.

3. The electronic control unit according to claim 1, wherein the at least one processor is programmed to notify the vehicle master device of the negative response when the program rewrite on the second data storage bank is completed but the data verification performed subsequent to the program rewrite is rejected.

4. A vehicle electronic control system, comprising:

a vehicle master device that is configured to acquire update data from outside, distribute the acquired update data to a rewrite target electronic control unit (ECU), and instruct the rewrite target ECU for a program rewrite; and the rewrite target ECU that includes a non-volatile memory having a double bank structure with a first data storage bank and a second data storage bank and is configured to receive update data from the vehicle master device and to write the received update data into the second data storage bank to rewrite a program on the second data storage bank while executing a program on the first data storage bank, wherein the rewrite target ECU further includes:

an active bank information update unit that is configured to update active bank information indicative of which bank is an active bank between the first data storage bank and the second data storage bank when the vehicle master device gives an instruction for an activation request to activate the second data storage bank and the program rewrite on the second data storage bank is completed, an execution condition determination unit that is configured to determine whether an activation execution condition is satisfied;

an execution control unit that is configured to activate the second data storage bank as the active bank based on the active bank information after restarting the electronic control unit when the execution condition determination unit determines that the activation execution condition is satisfied; and a notification unit that is configured to notify the vehicle master device of a negative response as notification information when the vehicle master device gives the instruction for an activation request but at least one of two conditions (1) the program rewrite on the second data storage bank is completed and (2) data verification regarding the rewriting is positive is not met.

5. An activation execution control method for an electronic control unit that includes a non-volatile memory having a double bank structure with a first data storage bank and a second data storage bank and is configured to receive update data from a vehicle master device and to write the received update data into the second data storage bank to rewrite a program on the second data storage bank while executing a program on the first data storage bank, the method comprising the steps of:

updating active bank information indicative of which bank is an active bank between the first data storage bank and the second data storage bank when the vehicle master device gives an instruction for an activation request to activate the second data storage bank and the program rewrite on the second data storage bank is completed;

determining whether an activation execution condition is satisfied;

activating the second data storage bank as the active bank based on the active bank information after restarting the electronic control unit when the activation execution condition is determined to be satisfied; and notifying the vehicle master device of a negative response as notification information when the vehicle master device gives the instruction for an activation request but at least one of two conditions (1) the program rewrite on the second data storage bank is completed and (2) data verification regarding the rewriting is positive is not met.

6. A non-transitory computer readable storage medium storing a computer program for an electronic control unit that includes a processor and a non-volatile memory having a double bank structure with a first data storage bank and a second data storage bank, the electronic control unit being configured to receive update data from a vehicle master device and to write the received update data into the second data storage bank to rewrite a program on the second data storage bank while executing a program on the first data storage bank, the computer program stored on the computer readable medium comprising instructions configured to, when executed, cause the processor to:

update active bank information indicative of which bank is an active bank between the first data storage bank and the second data storage bank when the vehicle master device gives an instruction for an activation request to activate the second data storage bank and the program rewrite on the second data storage bank is completed;

determine whether an activation execution condition is satisfied;

activate the second data storage bank as the active bank based on the active bank information after restarting the electronic control unit when the activation execution condition is determined to be satisfied; and notify the vehicle master device of a negative response as notification information when the vehicle master device gives the instruction for an activation request but at least one of two conditions (1) the program rewrite on the second data storage bank is completed and (2) data verification regarding the rewriting is positive is not met.

* * * * *